US012271381B2

(12) United States Patent
Gladwin et al.

(10) Patent No.: US 12,271,381 B2
(45) **Date of Patent: *Apr. 8, 2025**

(54) QUERY EXECUTION VIA COMMUNICATION WITH AN OBJECT STORAGE SYSTEM VIA AN OBJECT STORAGE COMMUNICATION PROTOCOL

(71) Applicant: Ocient Holdings LLC, Chicago, IL (US)

(72) Inventors: S. Christopher Gladwin, Chicago, IL (US); George Kondiles, Chicago, IL (US); Jason Arnold, Chicago, IL (US); Greg R. Dhuse, Chicago, IL (US); Joseph Jablonski, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,002

(22) Filed: Jan. 3, 2024

(65) Prior Publication Data

US 2024/0256541 A1 Aug. 1, 2024

Related U.S. Application Data

(60) Provisional application No. 63/482,497, filed on Jan. 31, 2023, provisional application No. 63/482,485, (Continued)

(51) Int. Cl.
*G06F 16/245* (2019.01)
*G06F 16/22* (2019.01)
(Continued)

(52) U.S. Cl.
CPC ........ *G06F 16/24544* (2019.01); *G06F 16/22* (2019.01); *G06F 16/24532* (2019.01); (Continued)

(58) Field of Classification Search
CPC .............. G06F 16/24544; G06F 16/22; G06F 16/24537; G06F 16/24542; G06F 16/258
See application file for complete search history.

(56) References Cited

U.S. PATENT DOCUMENTS 5,548,770 A 8/1996 Bridges
6,230,200 B1 5/2001 Forecast
(Continued)

OTHER PUBLICATIONS

U.S. Appl. No. 18/485,861, filed Oct. 12, 2023, Schieferstein et al.
(Continued)

*Primary Examiner* — Baoquoc N To
(74) *Attorney, Agent, or Firm* — Garlick & Markison; Katherine C. Stuckman; Bruce E. Stuckman

(57) ABSTRACT

A data processing system is operable to determining a query for execution and generate a query operator execution flow for the query that includes a first at least one operator serially before a second at least one operator. The first at least one operator of the query operator execution flow is executed based on generating a request for rows in accordance with an object storage communication protocol indicating filtering parameter data parameter, sending the request to an object storage system, and receiving a response indicating a filtered row set from the object storage system. The second at least one operator of the query operator execution flow is executed based on processing the filtered row set indicated in the response in accordance with the second at least one operator to produce the query resultant.

20 Claims, 148 Drawing Sheets

Related U.S. Application Data filed on Jan. 31, 2023, provisional application No. 63/482,504, filed on Jan. 31, 2023.

(51) Int. Cl.

| | |
|---|---|
| ***G06F 16/2453*** | (2019.01) |
| ***G06F 16/25*** | (2019.01) |

(52) U.S. Cl.

CPC .. *G06F 16/24537* (2019.01); *G06F 16/24542* (2019.01); *G06F 16/258* (2019.01)

(56) References Cited

U.S. PATENT DOCUMENTS

| | | | | |
|---|---|---|---|---|
| 6,633,772 | B2 | 10/2003 | Ford | |
| 7,499,907 | B2 | 3/2009 | Brown | |
| 7,908,242 | B1 | 3/2011 | Achanta | |
| 11,106,679 | B2 | 8/2021 | Gladwin et al. | |
| 11,314,743 | B1 | 4/2022 | Baptist | |
| 11,645,273 | B2 | 5/2023 | Dhuse et al. | |
| 11,803,544 | B2 | 10/2023 | Veselova et al. | |
| 11,822,532 | B2 | 11/2023 | Dhuse et al. | |
| 2001/0051949 | A1 | 12/2001 | Carey | |
| 2002/0032676 | A1 | 3/2002 | Reiner | |
| 2004/0162853 | A1 | 8/2004 | Brodersen | |
| 2006/0069703 | A1* | 3/2006 | Carr | G06F 9/526 |
| 2006/0106970 | A1* | 5/2006 | Matsuda | G06F 3/0605 711/111 |
| 2008/0133456 | A1 | 6/2008 | Richards | |
| 2009/0063893 | A1 | 3/2009 | Bagepalli | |
| 2009/0183167 | A1 | 7/2009 | Kupferschmidt | |
| 2010/0082577 | A1 | 4/2010 | Mirchandani | |
| 2010/0241646 | A1 | 9/2010 | Friedman | |
| 2010/0274983 | A1 | 10/2010 | Murphy | |
| 2010/0312756 | A1 | 12/2010 | Zhang | |
| 2011/0219169 | A1 | 9/2011 | Zhang | |
| 2012/0109888 | A1 | 5/2012 | Zhang | |
| 2012/0151118 | A1 | 6/2012 | Flynn | |
| 2012/0185866 | A1 | 7/2012 | Couvee | |
| 2012/0254252 | A1 | 10/2012 | Jin | |
| 2012/0311246 | A1 | 12/2012 | Mcwilliams | |
| 2013/0332484 | A1 | 12/2013 | Gajic | |
| 2014/0047095 | A1 | 2/2014 | Breternitz | |
| 2014/0136510 | A1 | 5/2014 | Parkkinen | |
| 2014/0188841 | A1 | 7/2014 | Sun | |
| 2015/0205607 | A1 | 7/2015 | Lindholm | |
| 2015/0244804 | A1 | 8/2015 | Warfield | |
| 2015/0248366 | A1 | 9/2015 | Bergsten | |
| 2015/0293966 | A1 | 10/2015 | Cai | |
| 2015/0310045 | A1 | 10/2015 | Konik | |
| 2016/0034547 | A1 | 2/2016 | Lerios | |
| 2020/0053292 | A1* | 2/2020 | Janjic | G01S 5/16 |

OTHER PUBLICATIONS

A new high performance fabric for HPC, Michael Feldman, May 2016, Intersect360 Research.

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. . com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 node 37 data set query processing system 2510 query execution module
2504 database system 10 database system 10 query execution module 2504 database system 10 database system 10 database system 10 database system 10 database system 10 database system 10 step 2588 database system 10 database system 10 database system 10 database system 10 database system 10 database system 10 filtered row set generator module 3329

QUERY EXECUTION VIA COMMUNICATION WITH AN OBJECT STORAGE SYSTEM VIA AN OBJECT STORAGE COMMUNICATION PROTOCOL

CROSS-REFERENCE TO RELATED APPLICATIONS

The present U.S. Utility Patent Application claims priority pursuant to 35 U.S.C. § 119(e) to U.S. Provisional Application No. 63/482,485, entitled "QUERY PROCESSING APPLIED TO OBJECTS OF AN OBJECT STORAGE SYSTEM", filed Jan. 31, 2023; and U.S. Provisional Application No. 63/482,497, entitled "QUERY EXECUTION VIA INDEXING OBJECTS OF AN OBJECT STORAGE SYSTEM", filed Jan. 31, 2023, and U.S. Provisional Application No. 63/482,504, entitled "QUERY EXECUTION VIA COMMUNICATION WITH AN OBJECT STORAGE SYSTEM", filed Jan. 31, 2023, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

Figure 37A:
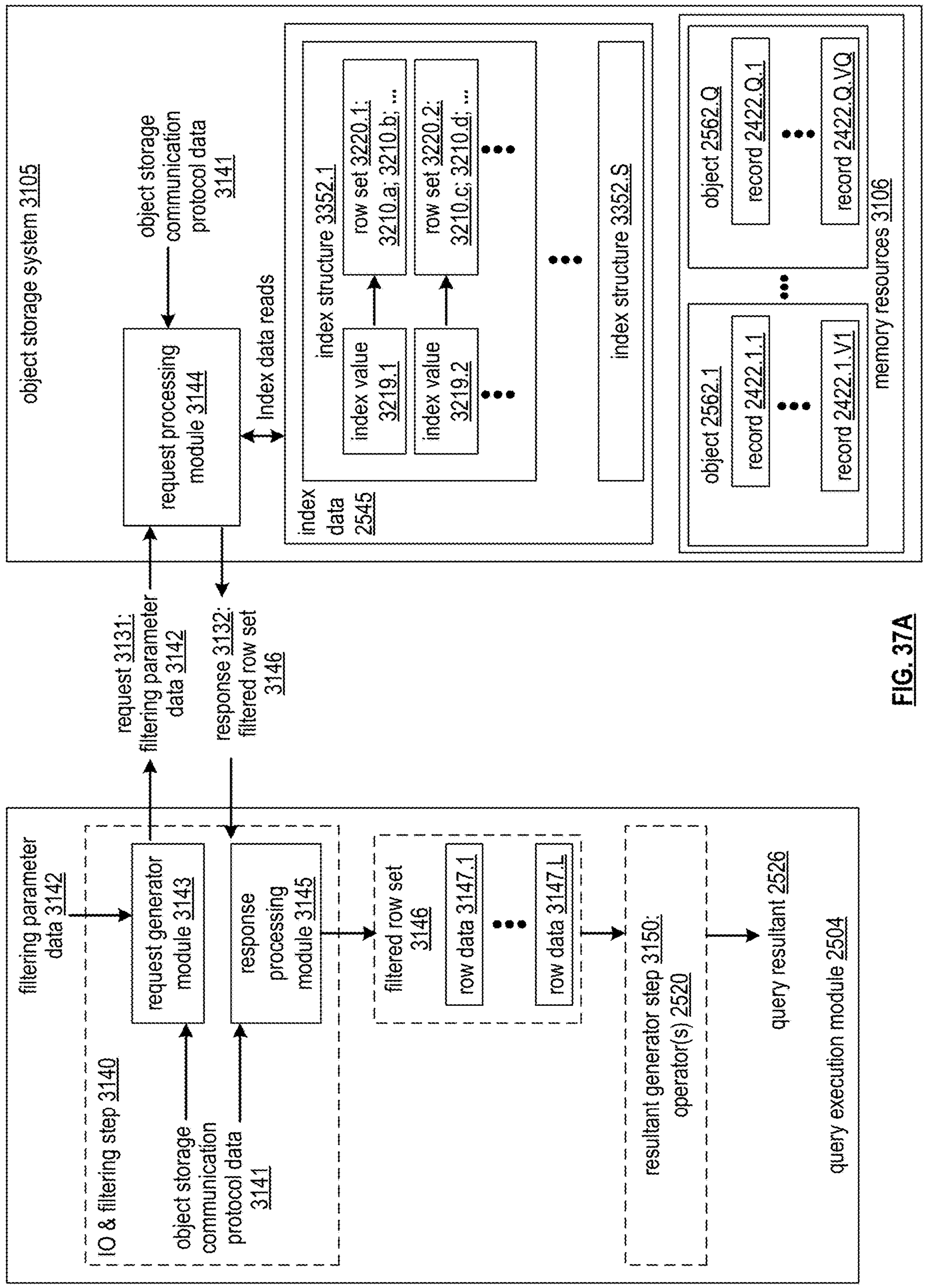
FIG. 37A is a schematic block diagram illustrating query execution of a query based on a query execution module communicating with an object storage system that reads index data in accordance with various embodiments.
Figure 37B:
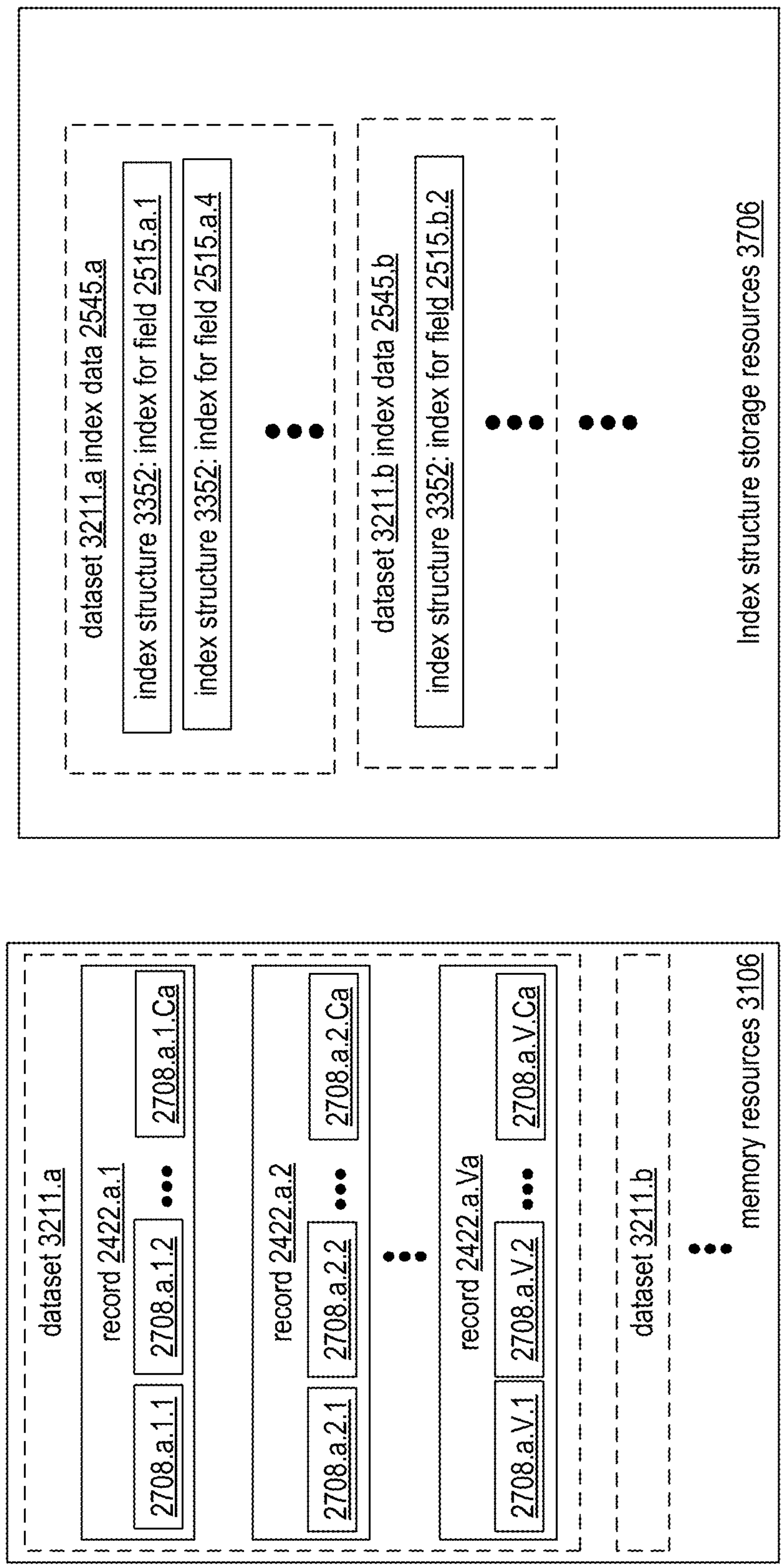
FIG. 37B illustrates index structure storage resources storing a plurality of index data for a plurality of datasets stored in memory resources of an object storage system, where index data of each dataset stores at least one index structure for at least one field in accordance with various embodiments.
Figure 37C:
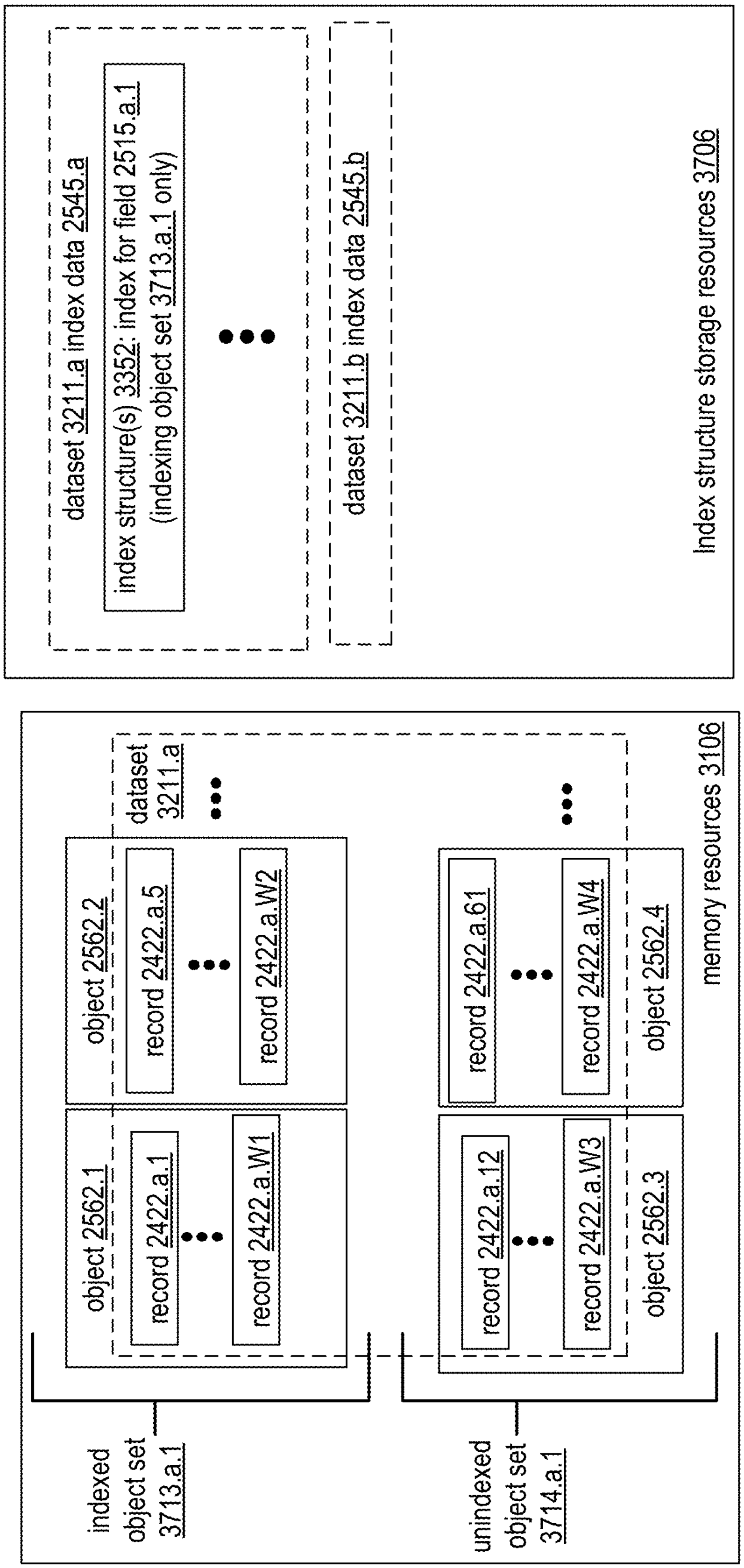
FIG. 37C illustrates index structure storage resources storing an index structure for a field of a dataset, indexing records of the dataset in an indexed object set and not indexing record of the dataset in an unindexed object set in accordance with various embodiments.
Figure 37D:
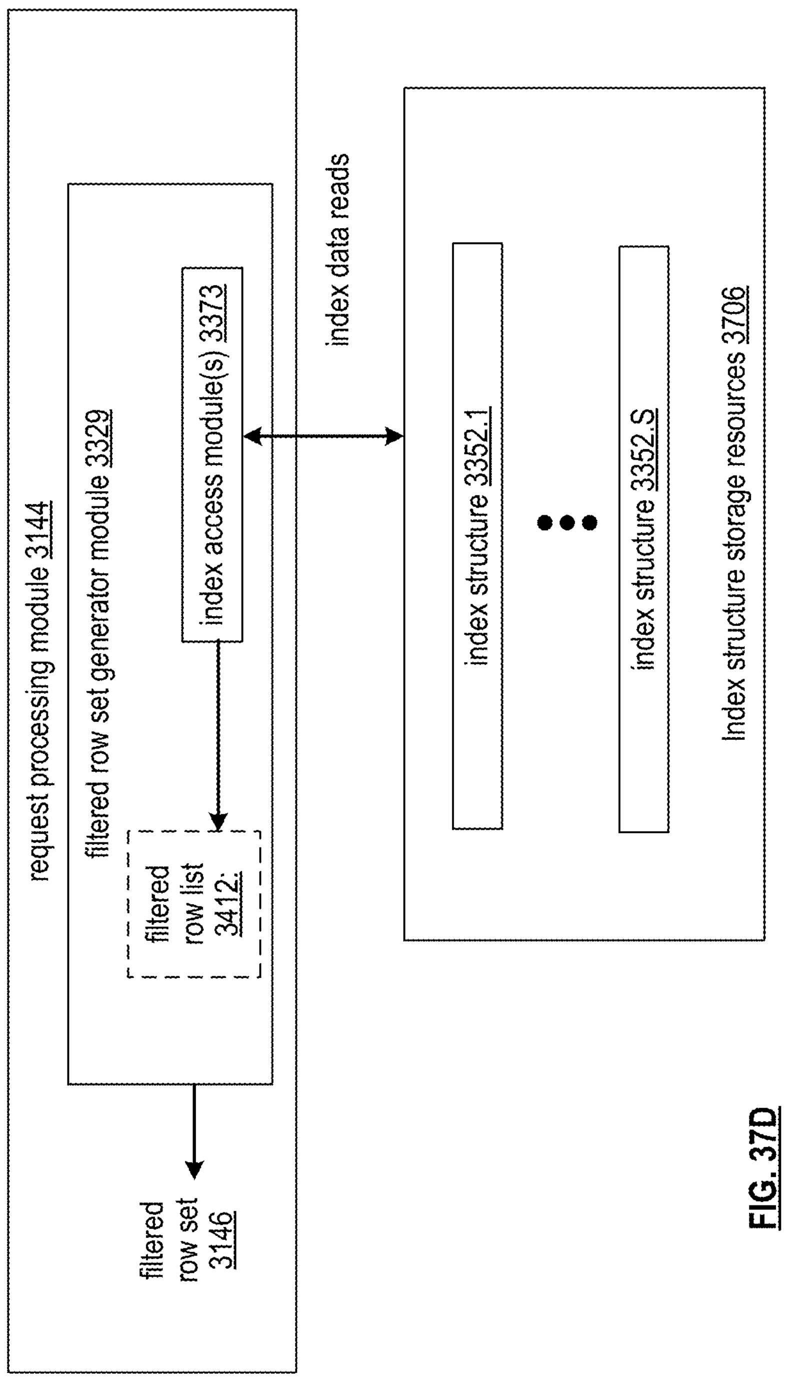
FIG. 37D is a schematic block diagram illustrating a filtered row set generator module of a request processing module that implements an index access module that accesses at least one index structure in index structure storage resources in accordance with various embodiments.
Figure 37E:
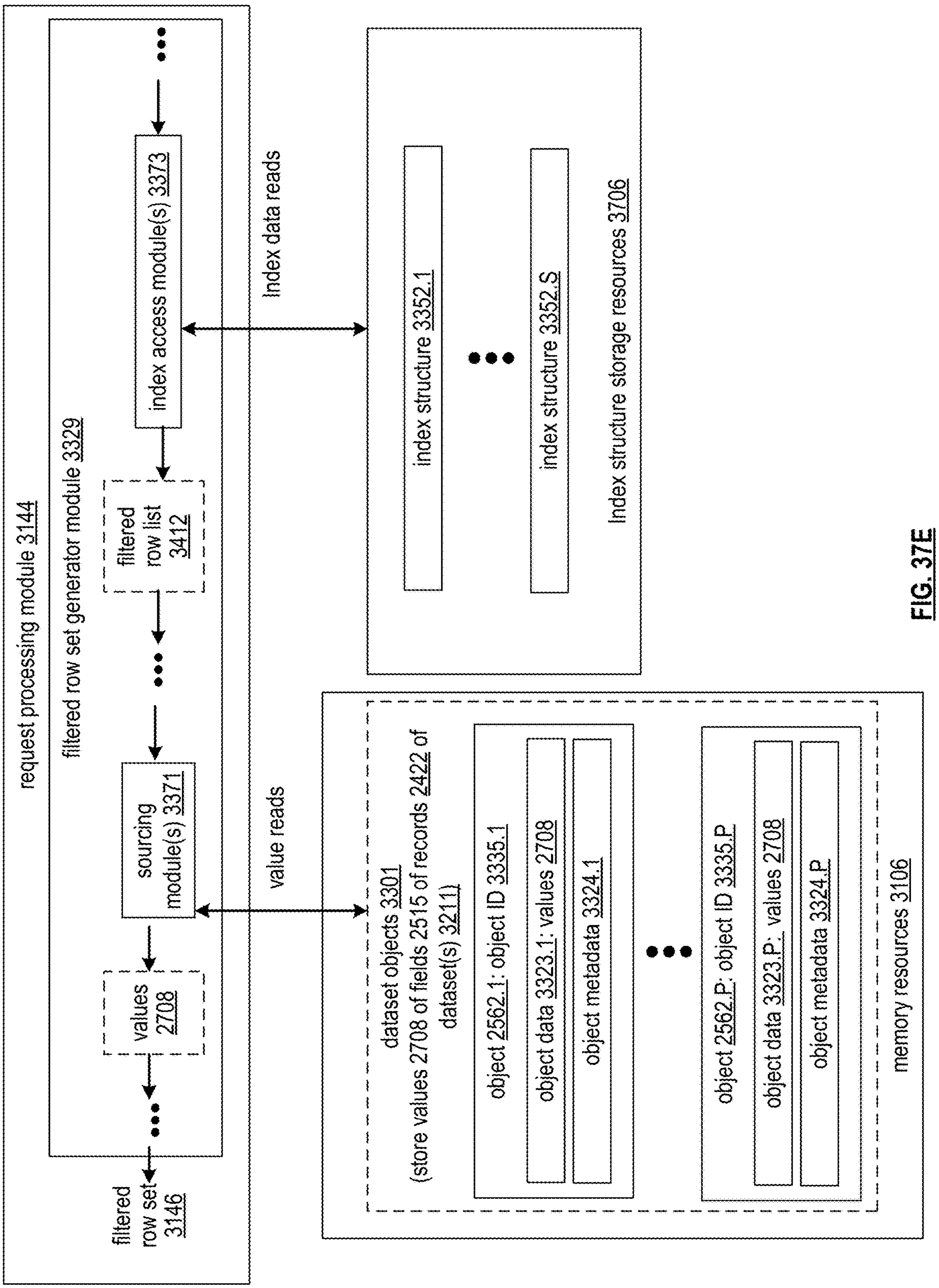
Figure 37F:
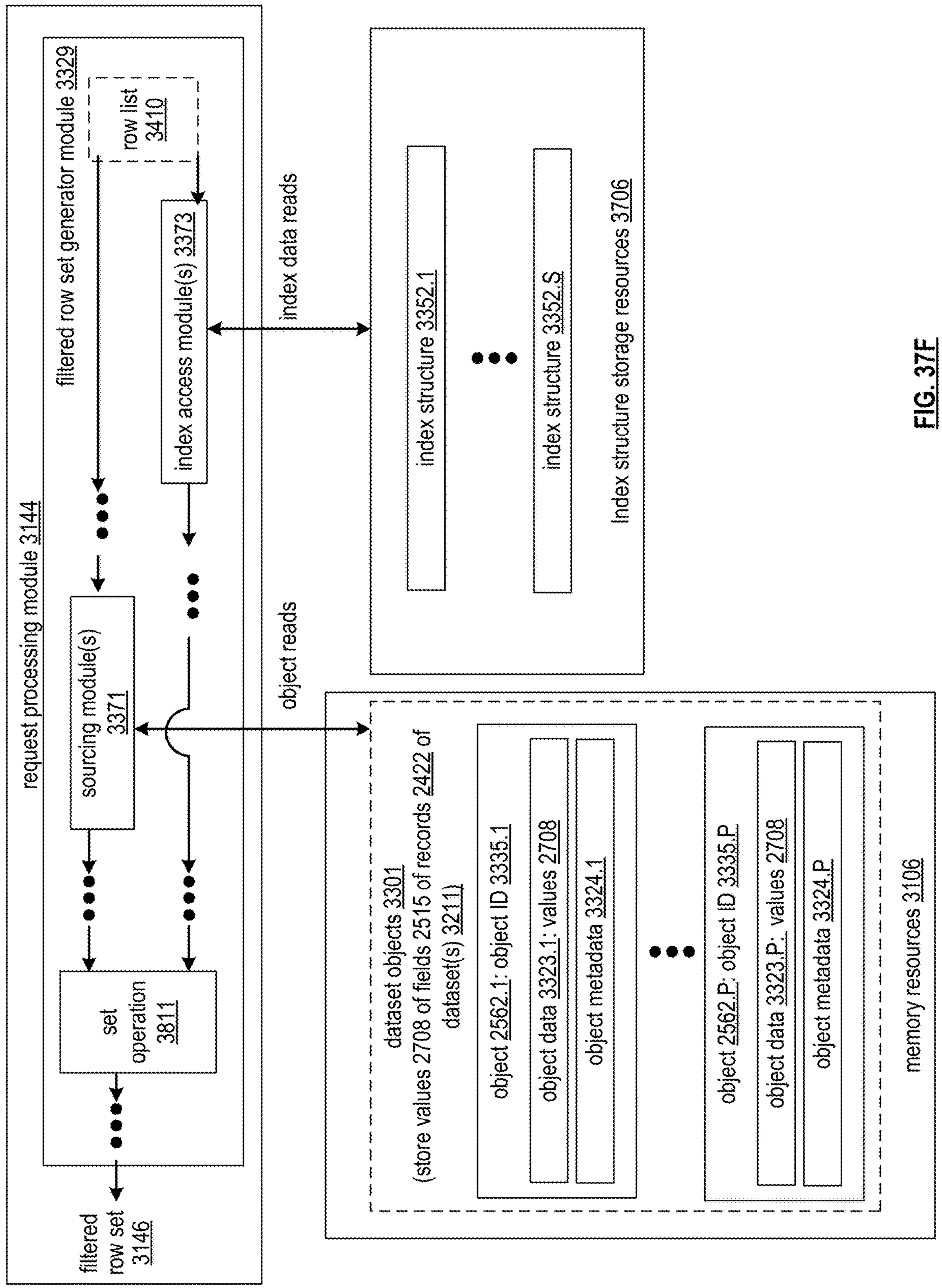
Figure 37G:
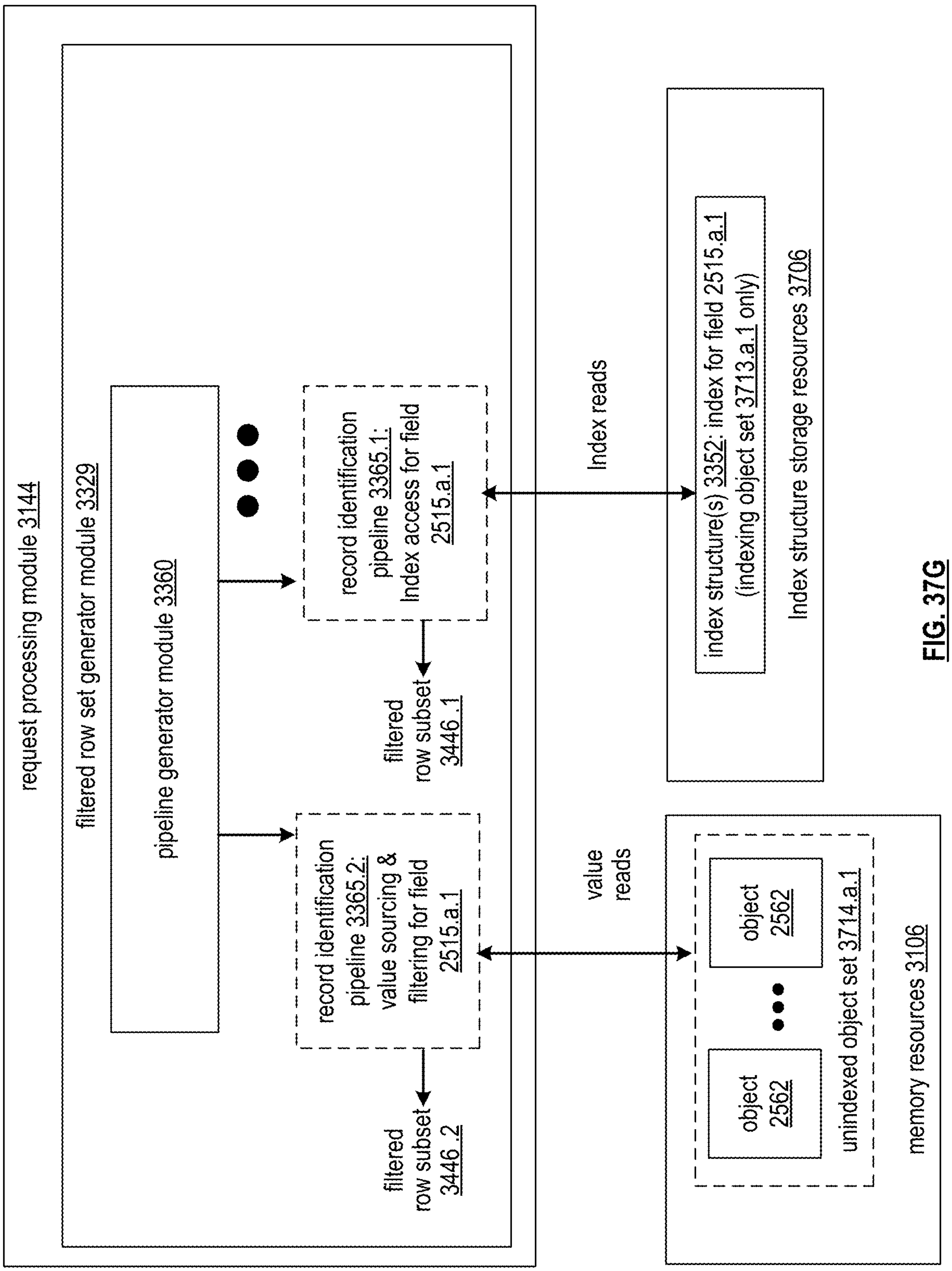
Figure 37H:
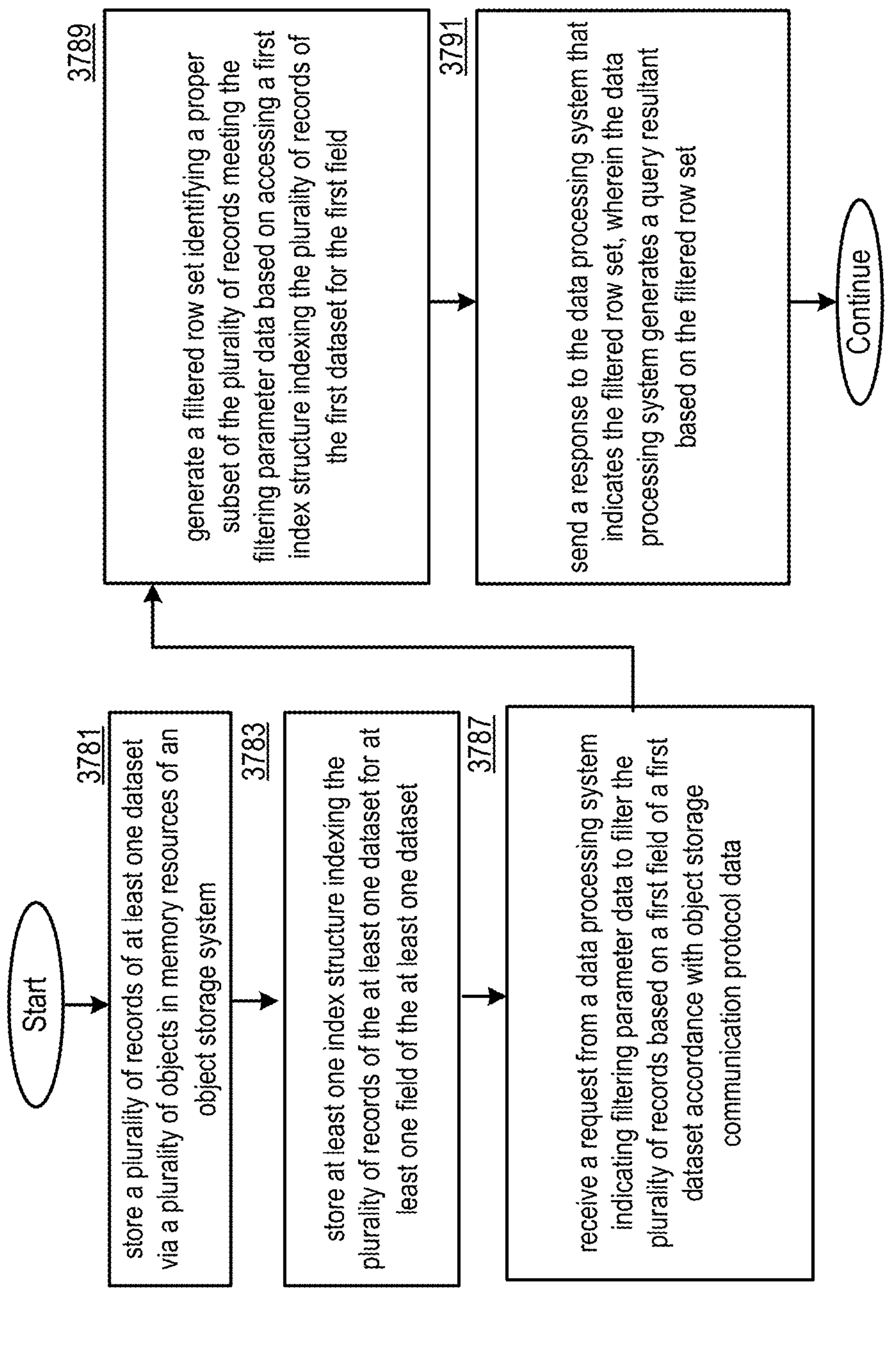
Figure 38A:
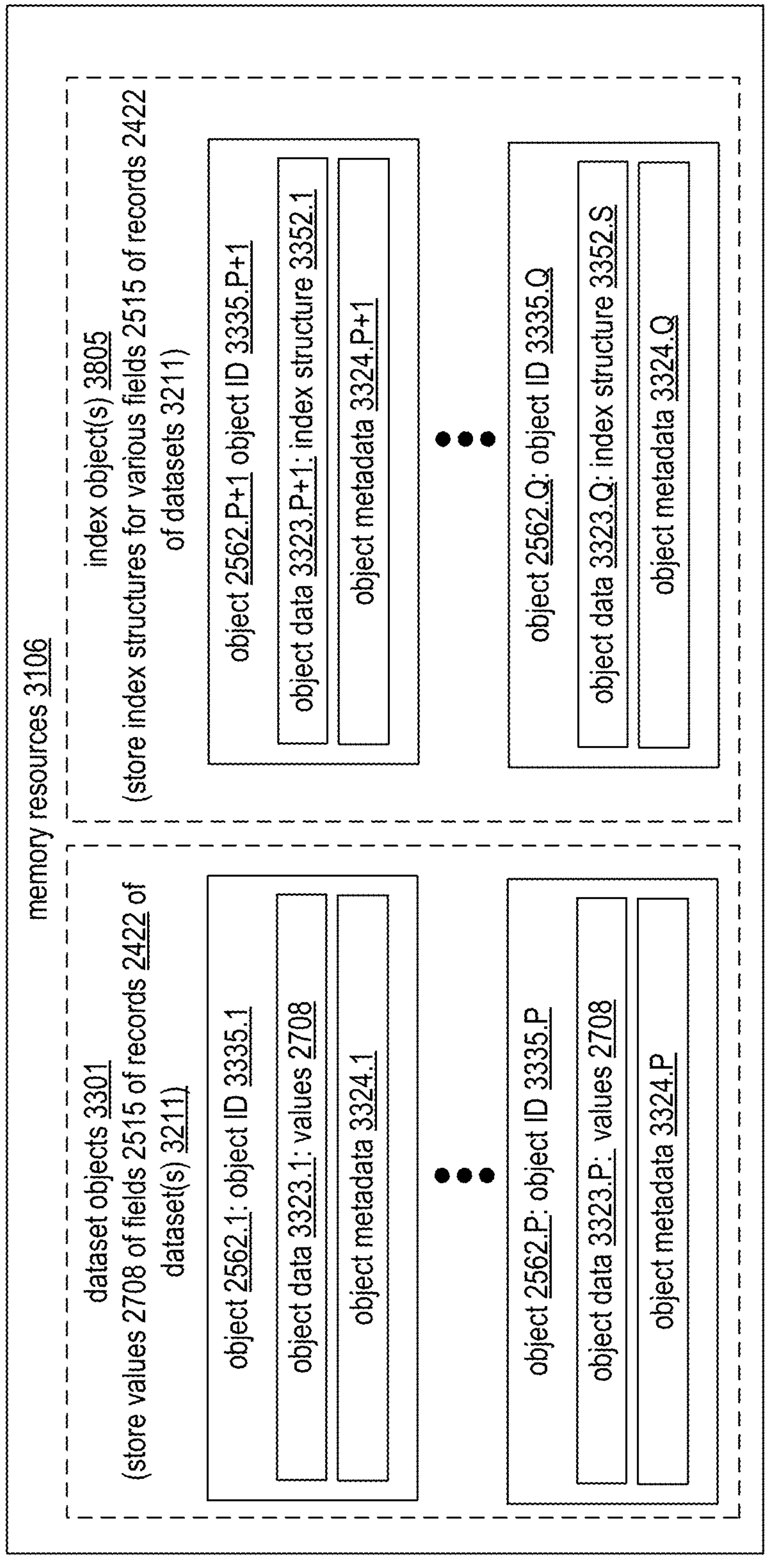
Figure 38B:
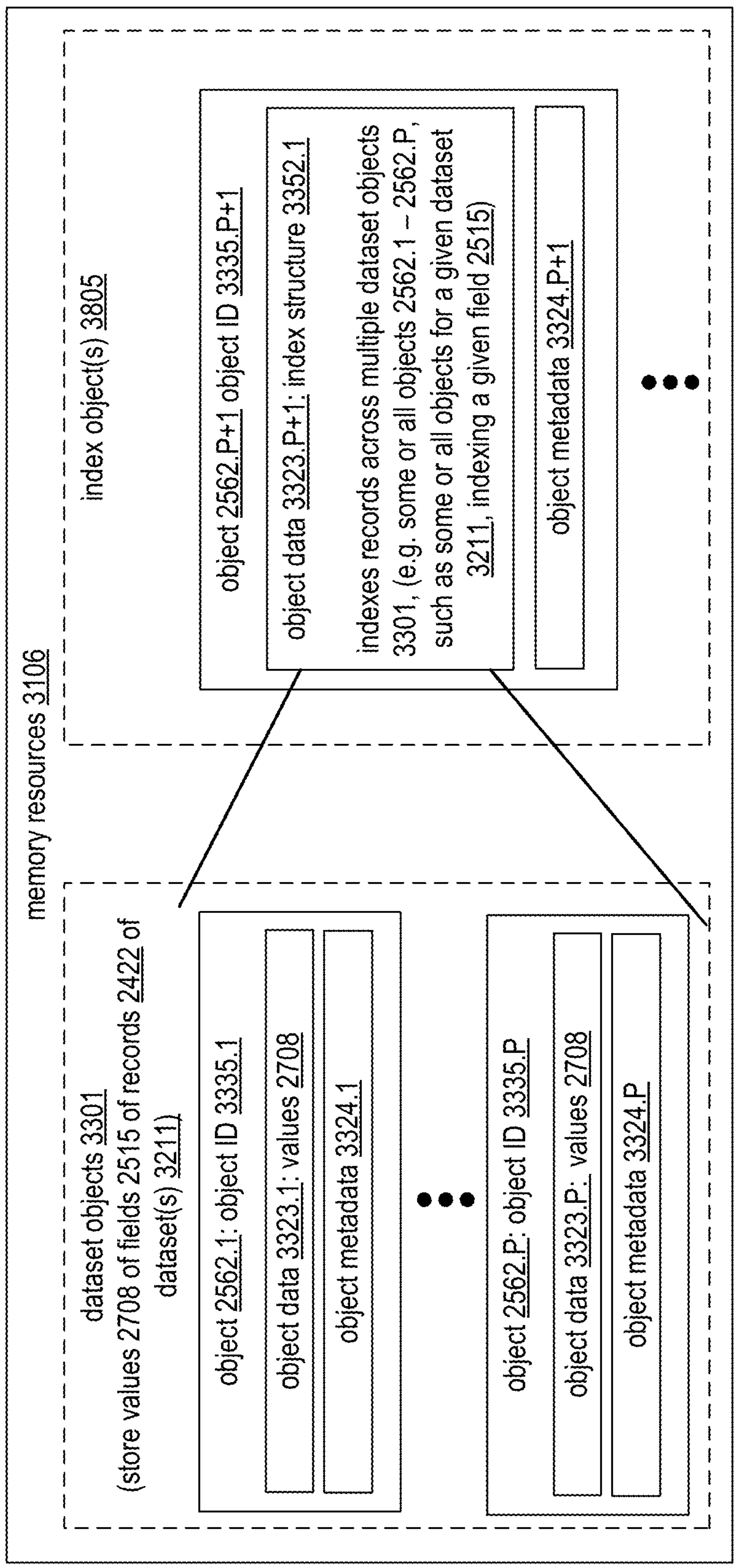
Figure 38C:
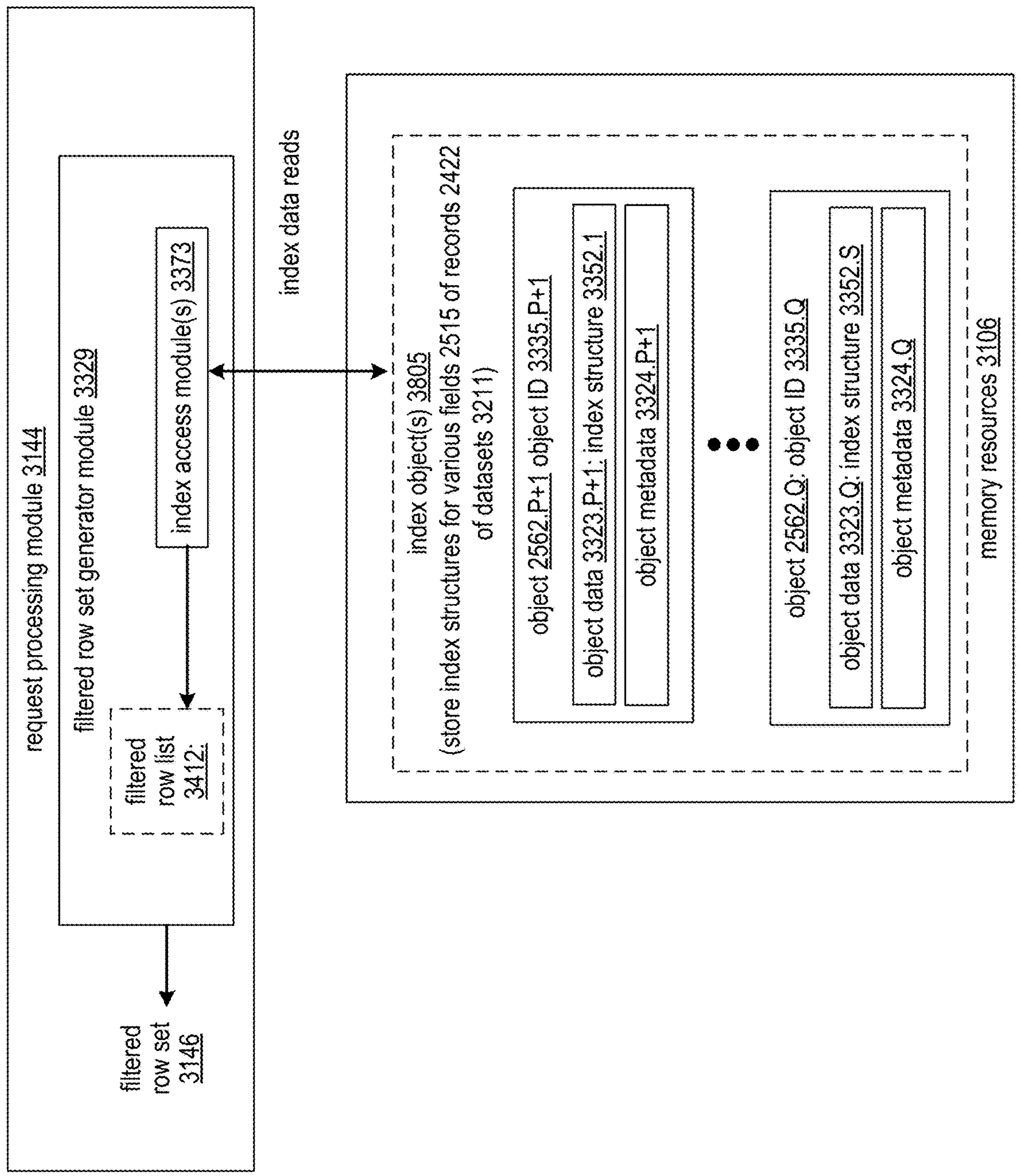
Figure 38D:
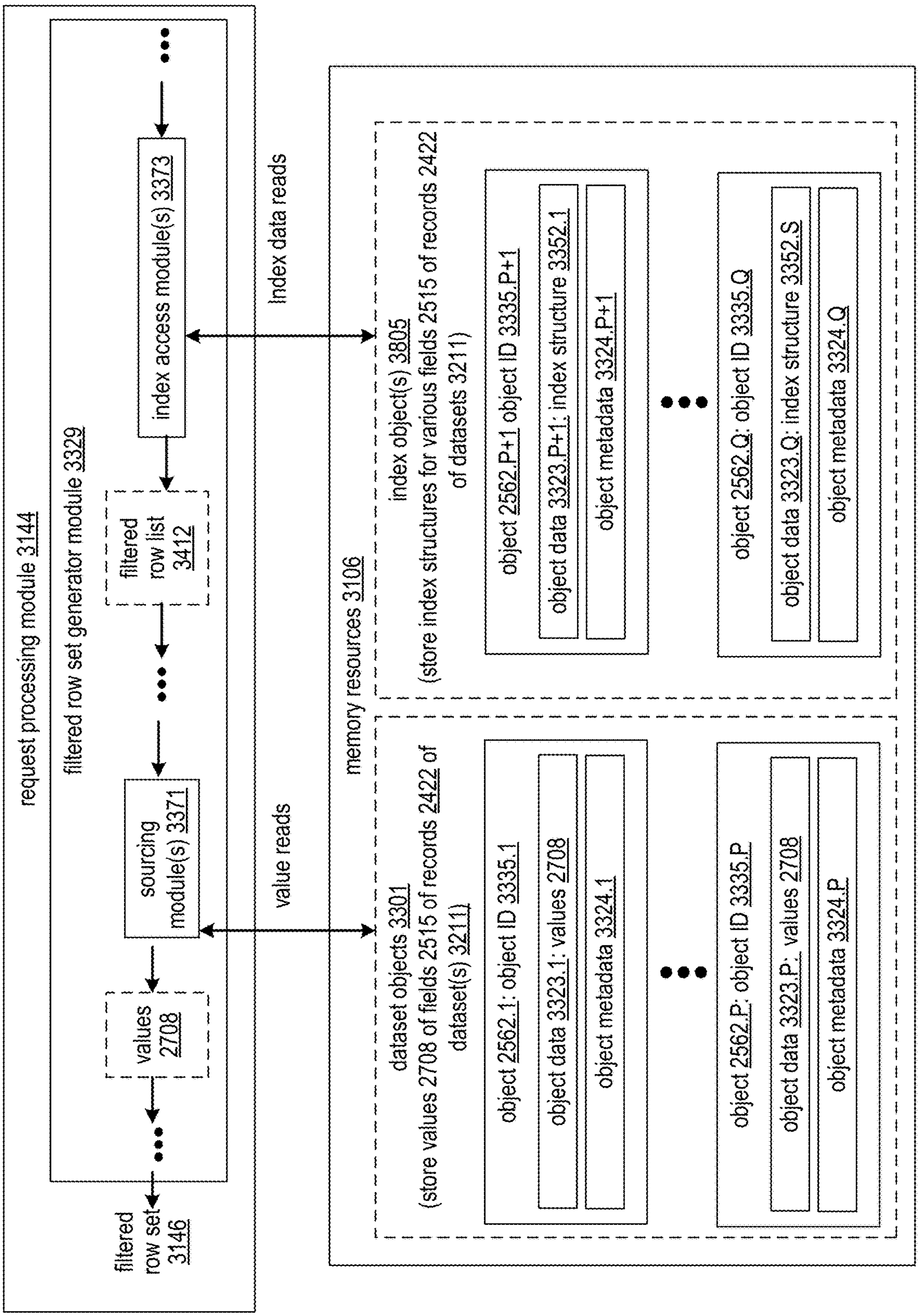
Figure 38E:
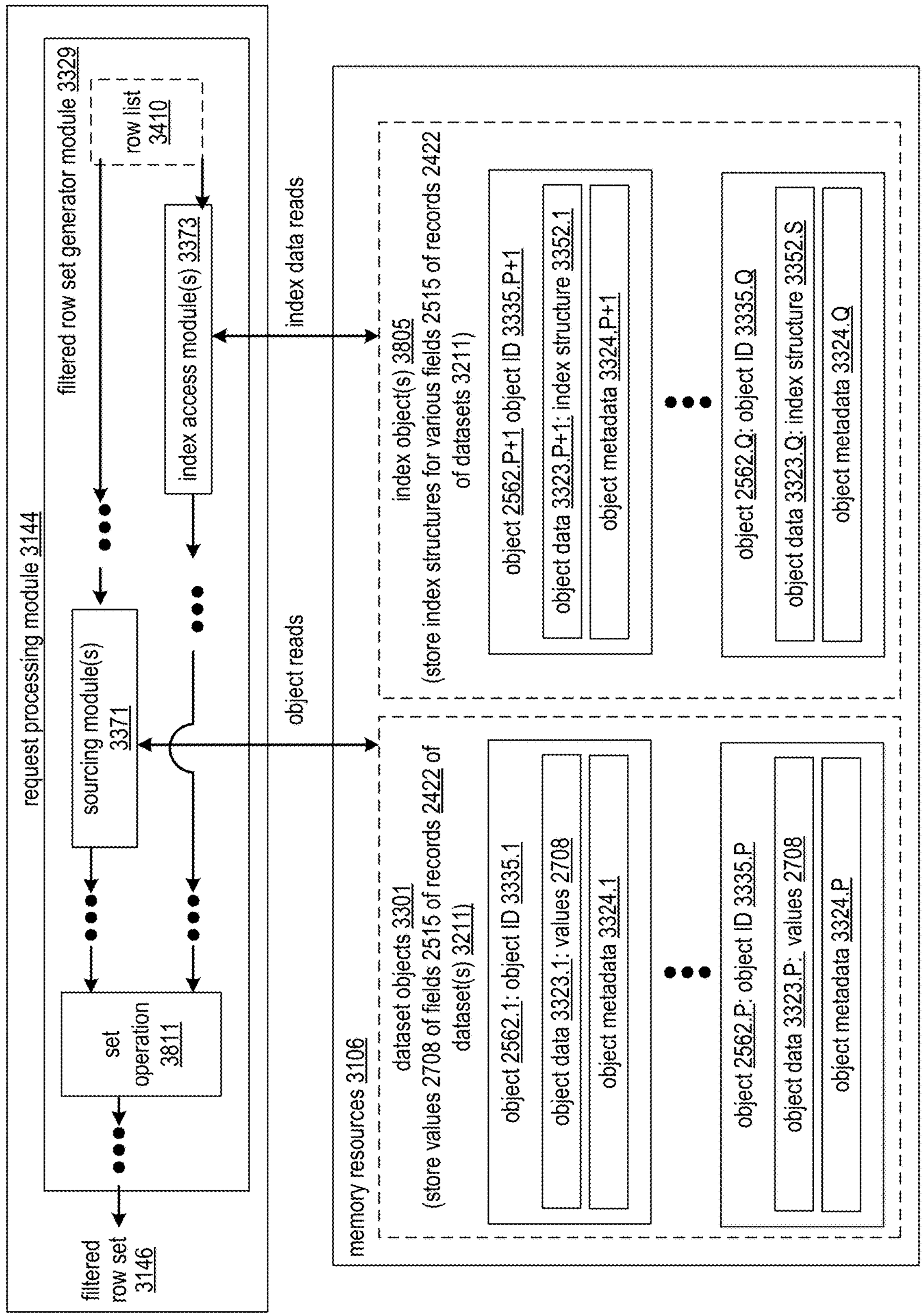
Figure 38F:
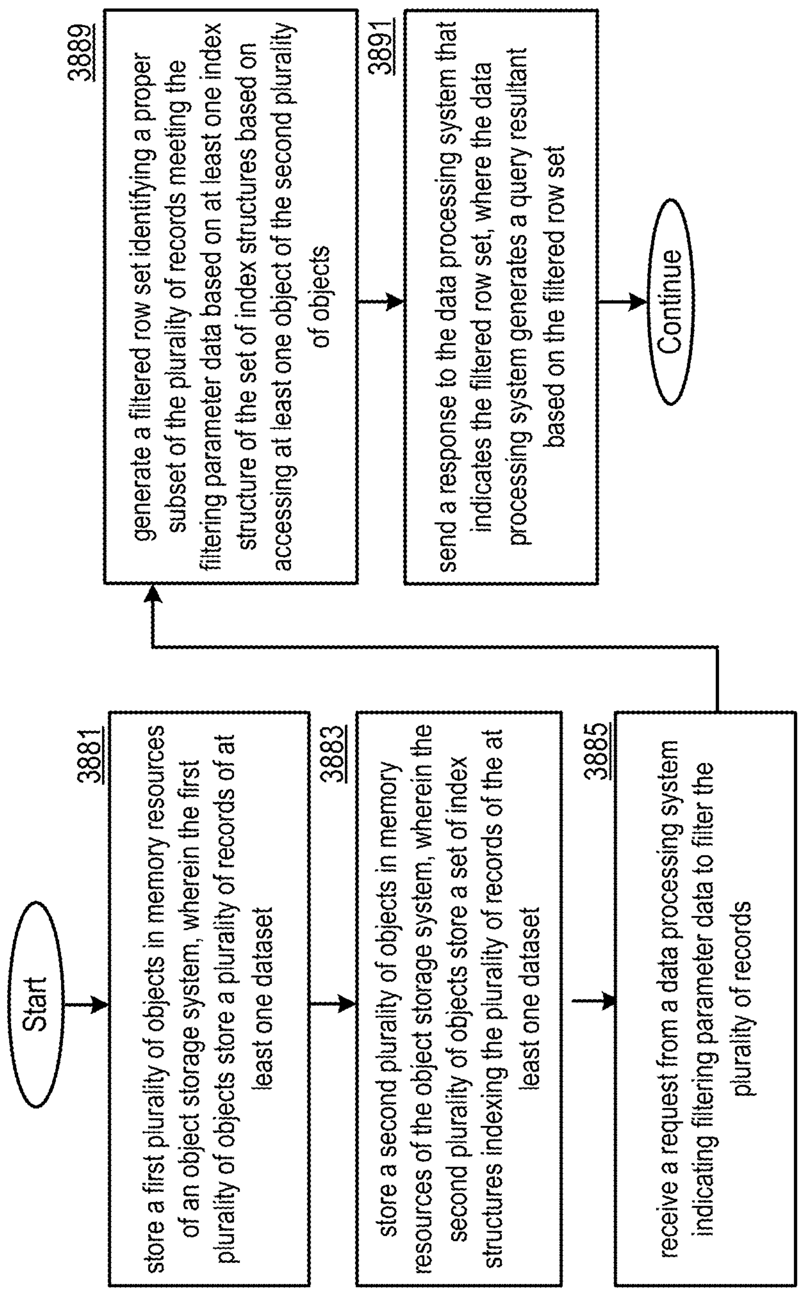
Figure 39A:
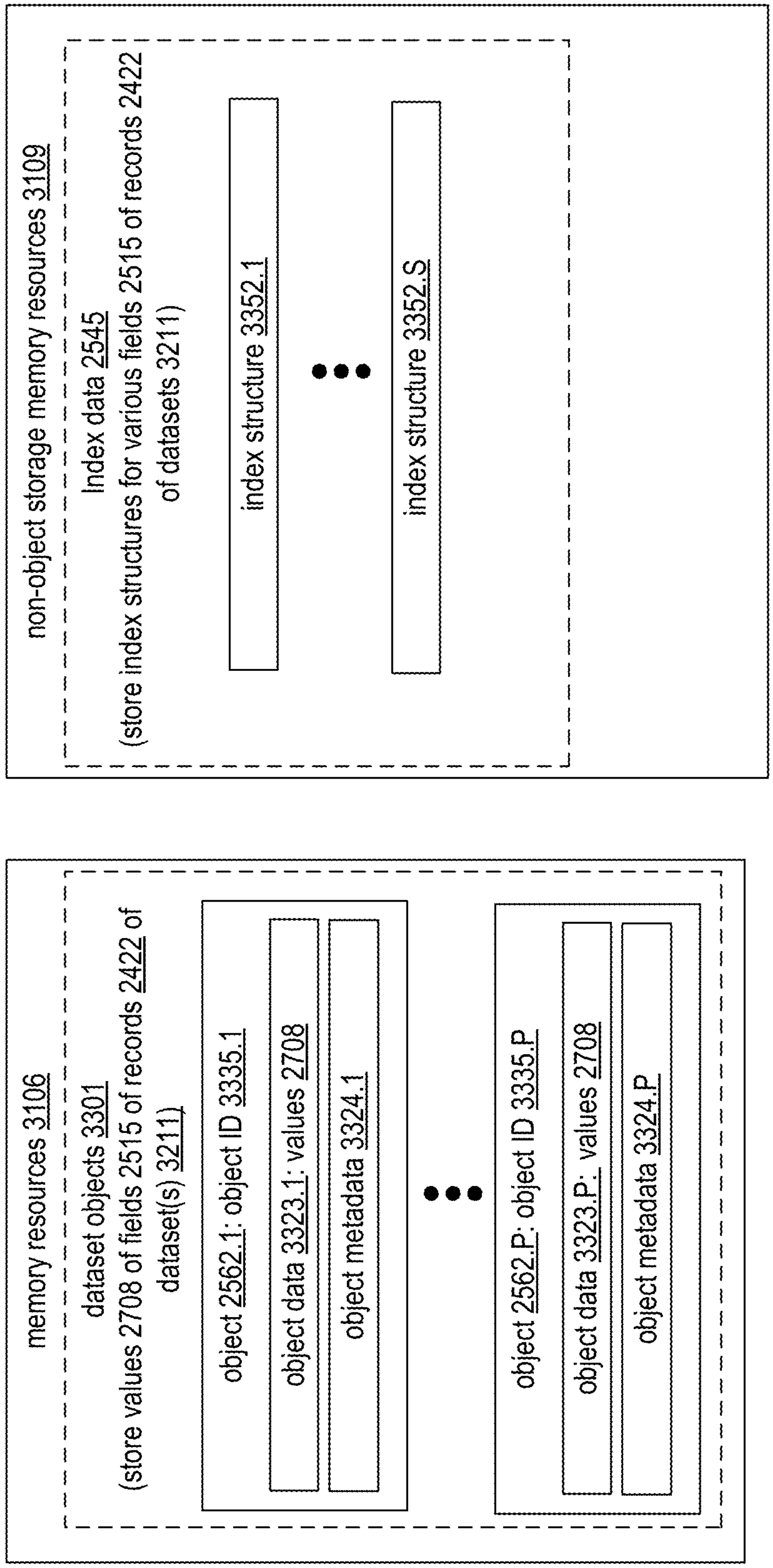
Figure 39B:
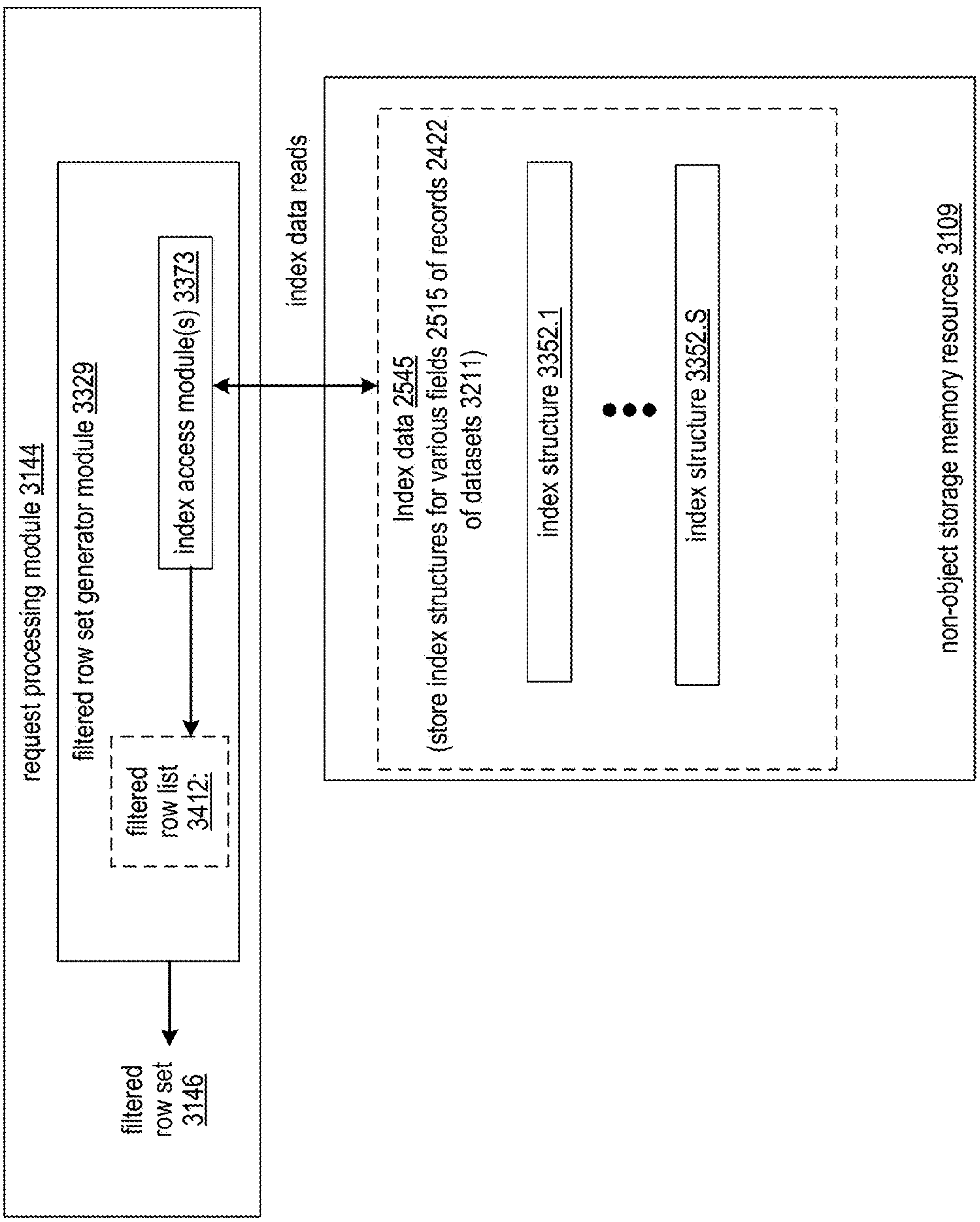
Figure 39C:
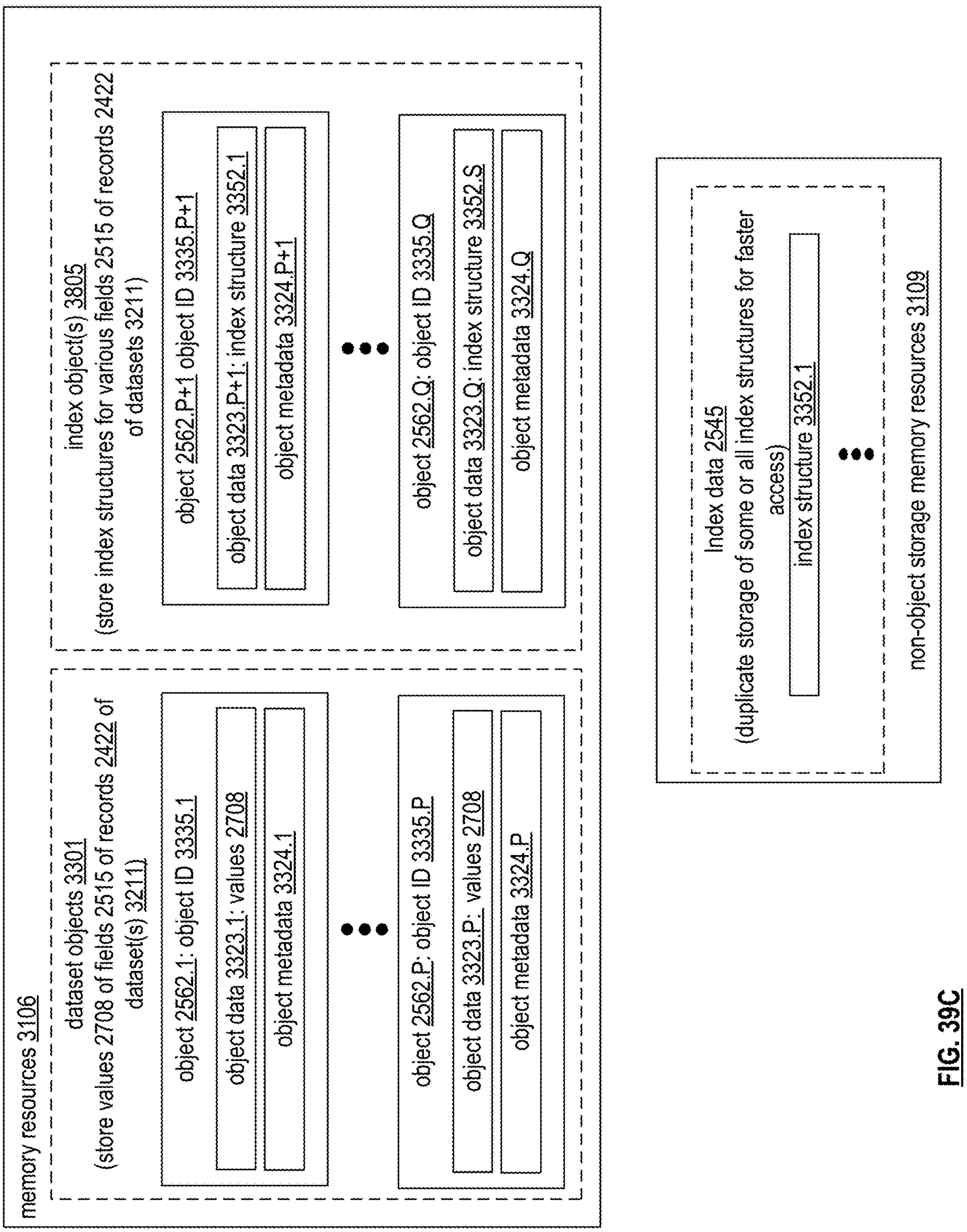
Figure 39D:
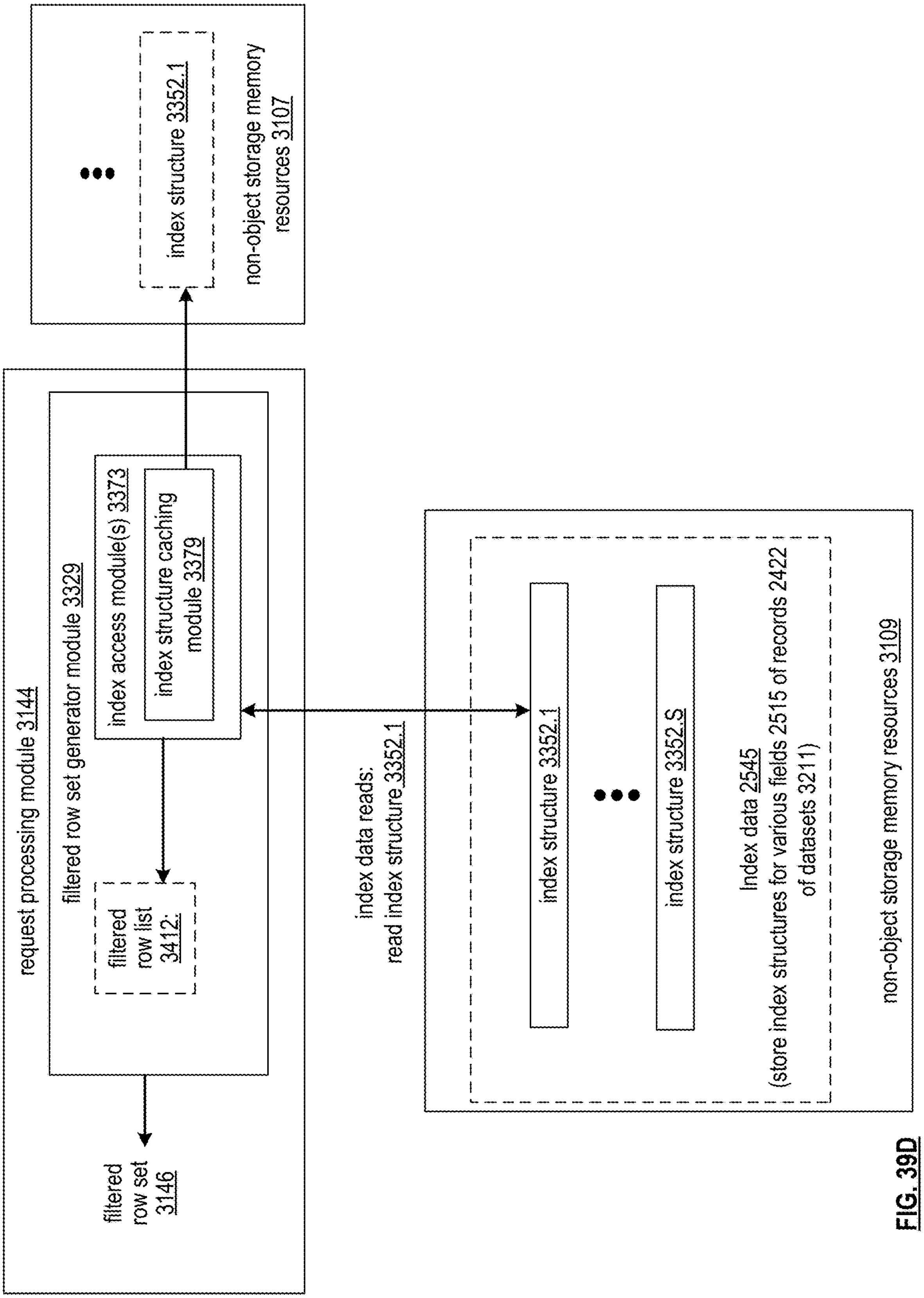
Figure 39E:
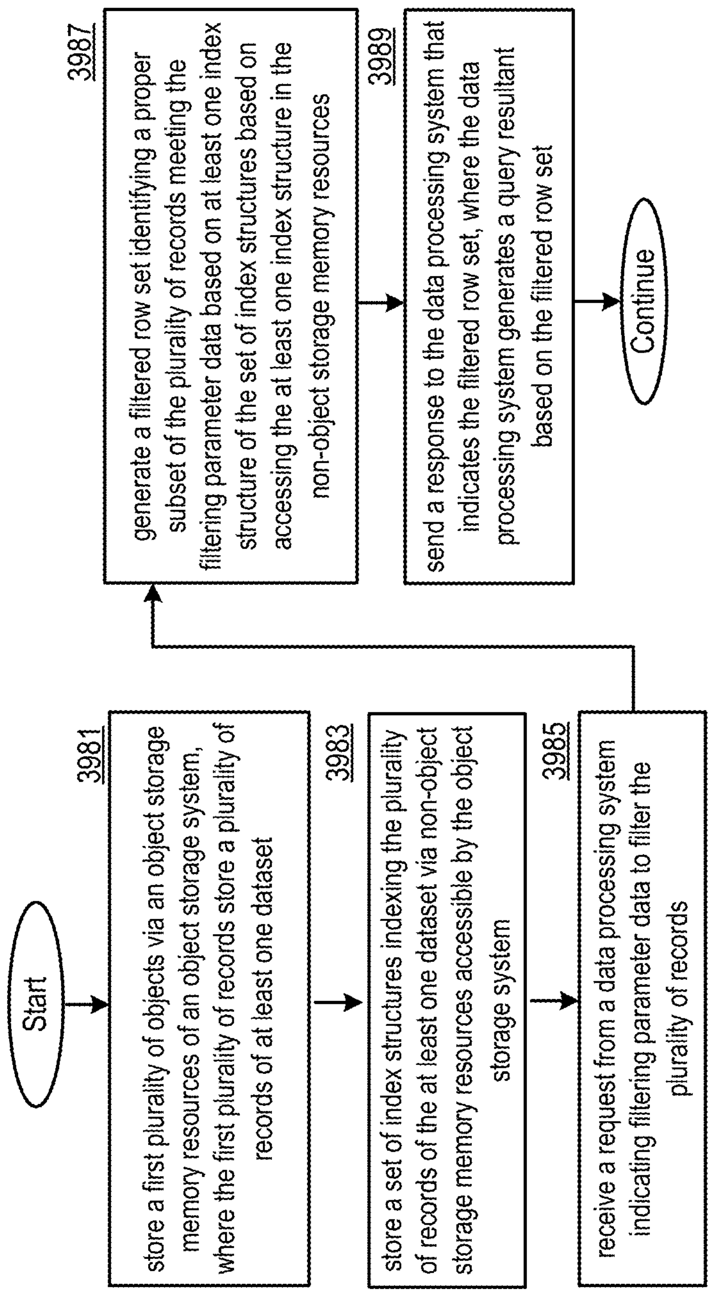
Figure 40A:
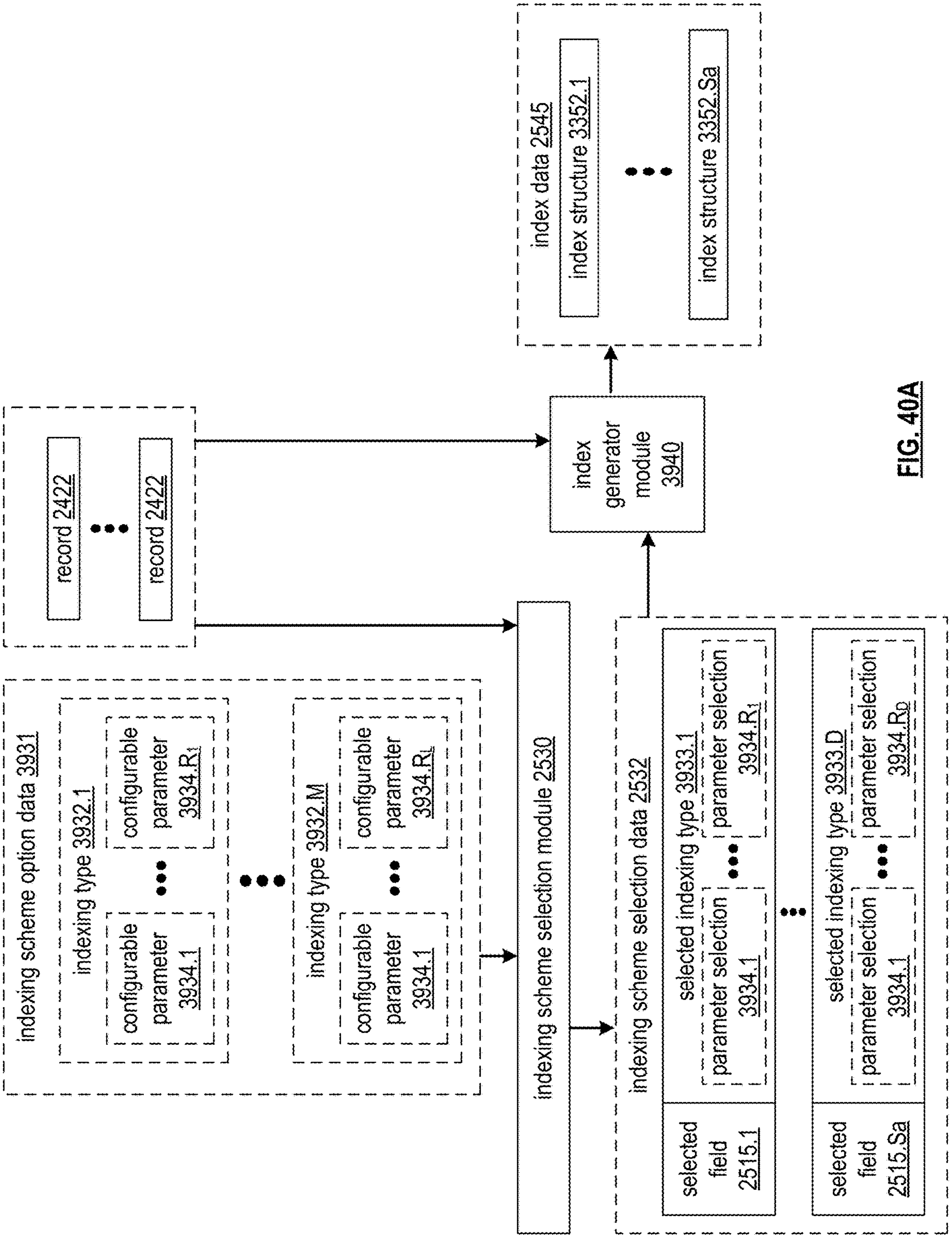
Figure 40B:
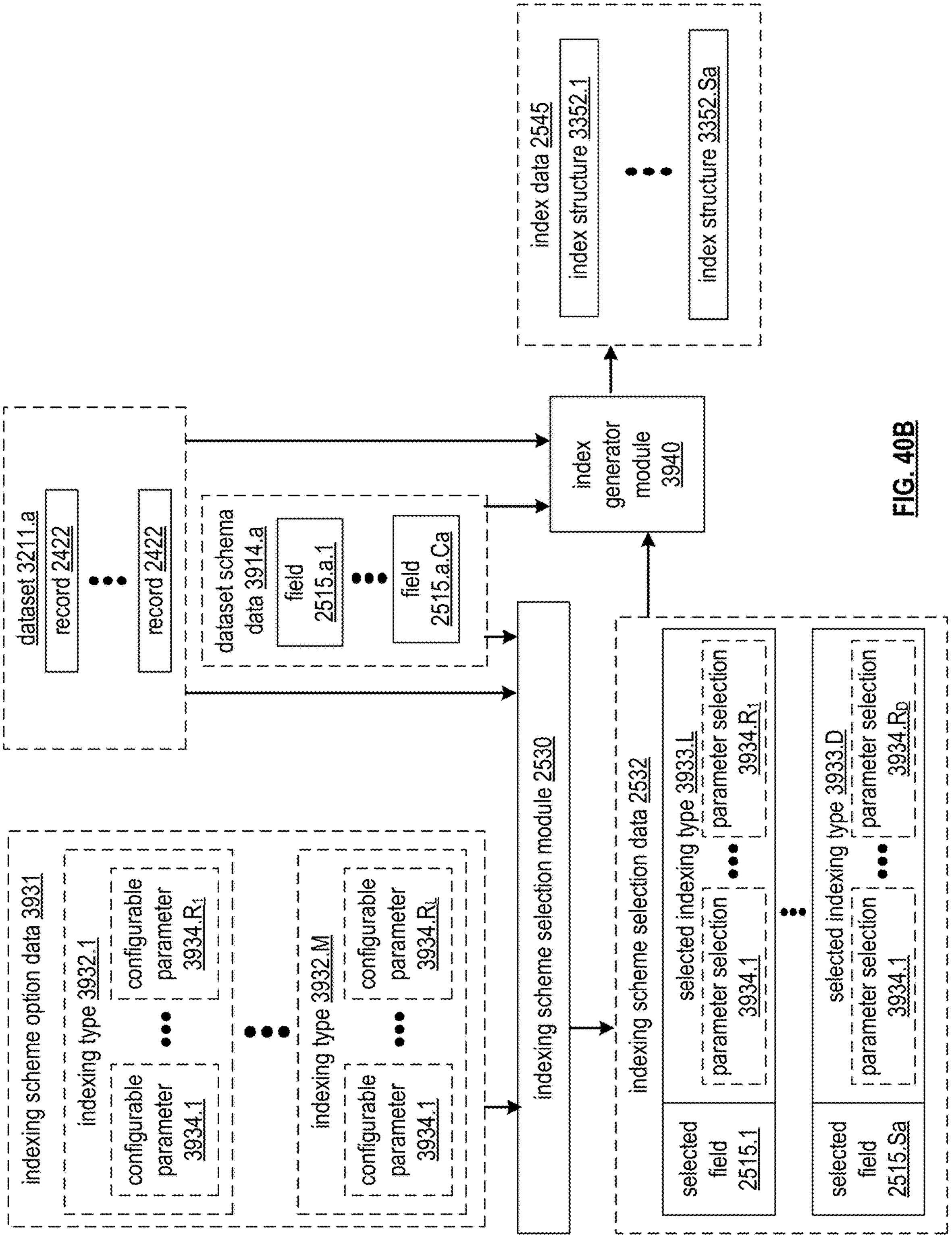
Figure 40C:
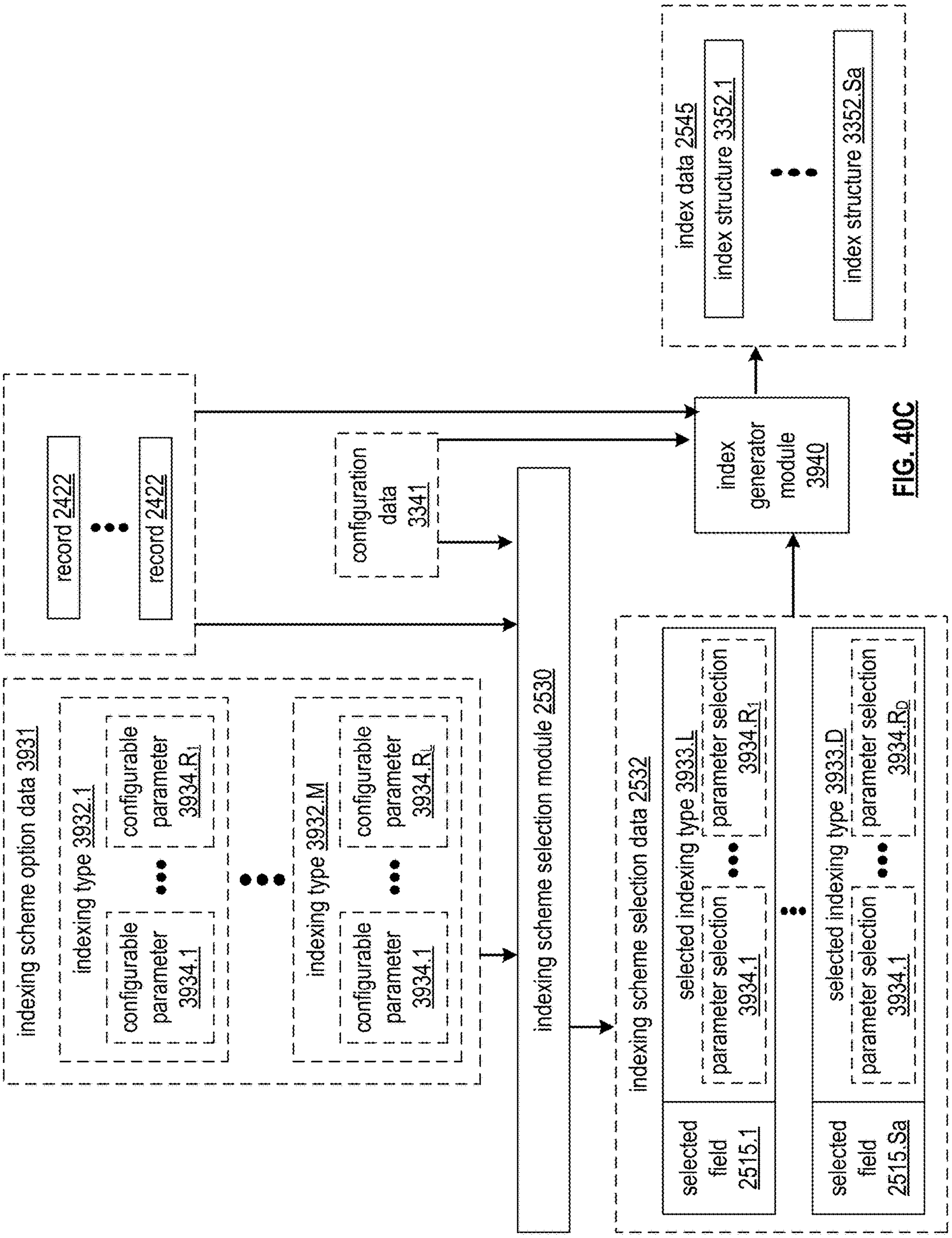
Figure 40D:
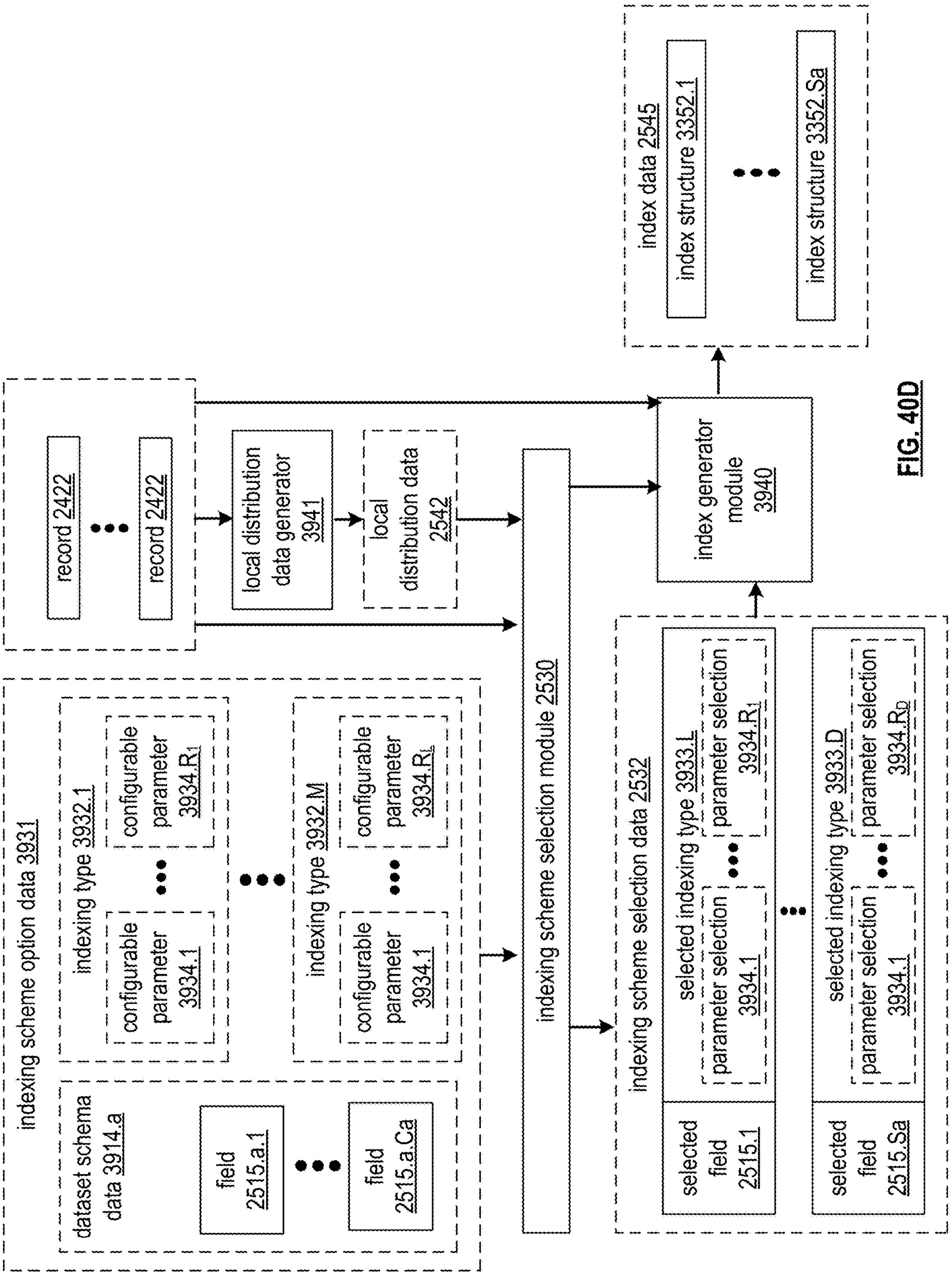
Figure 40E:
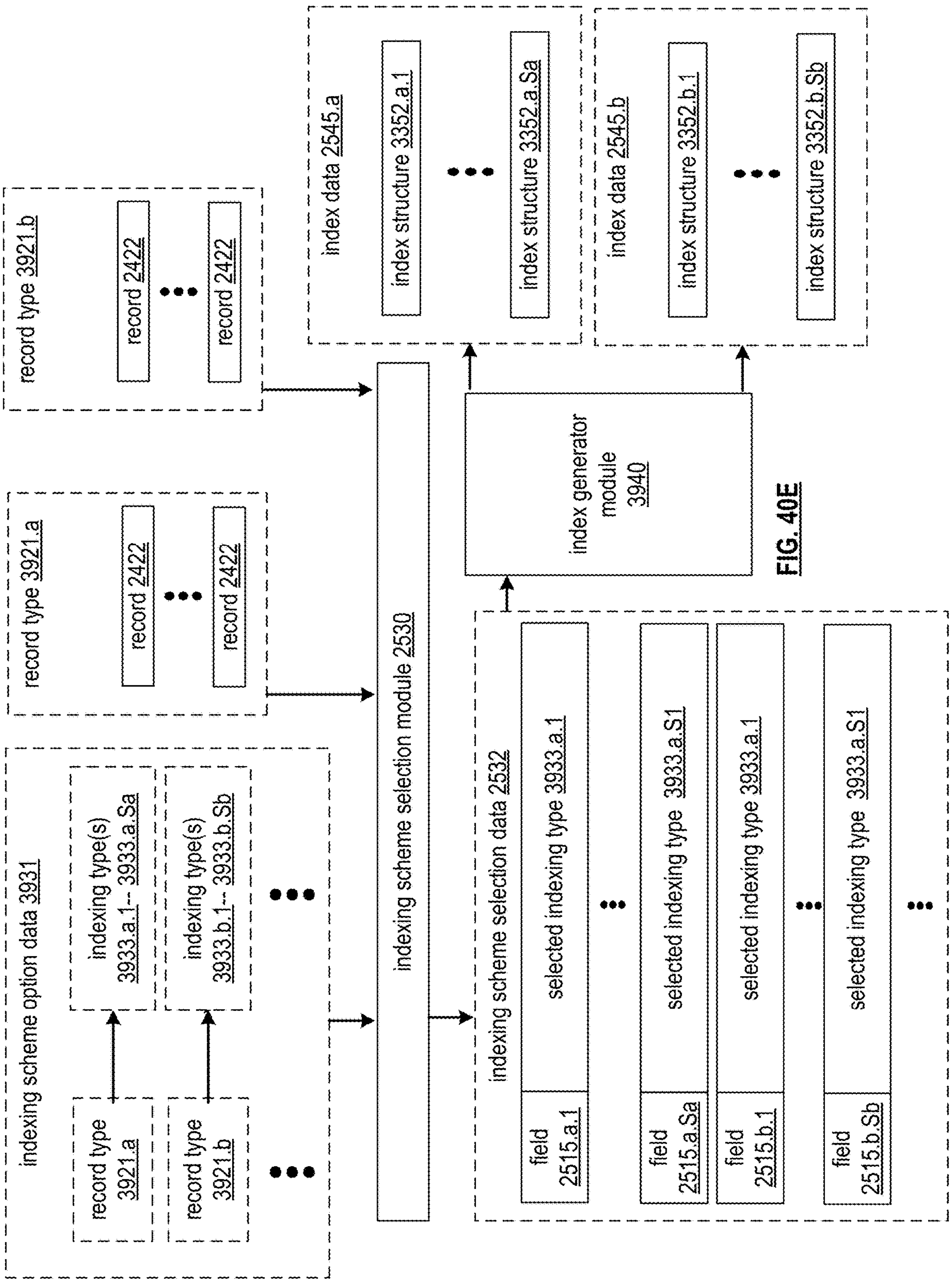
Figure 40F:
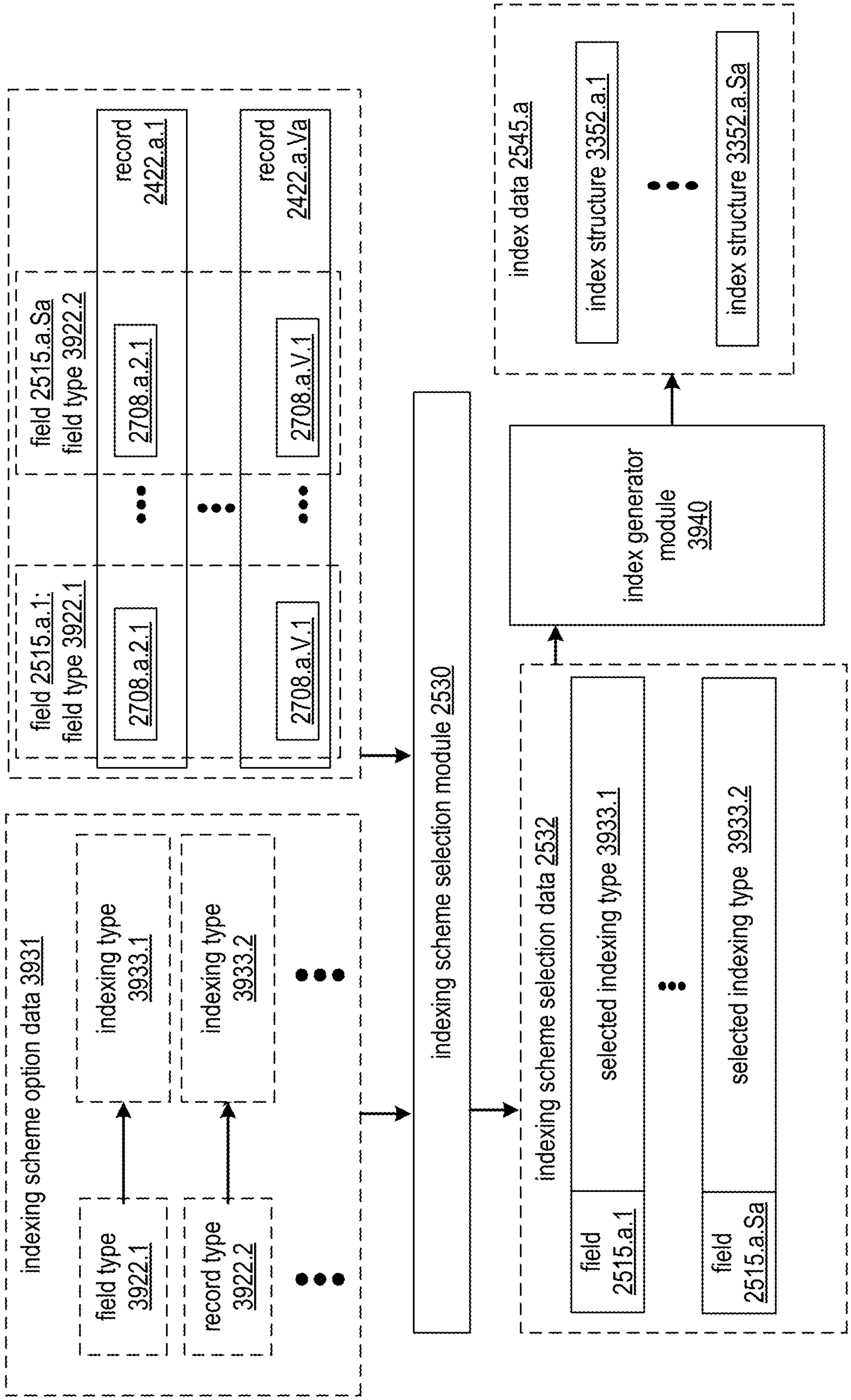
Figure 40G:
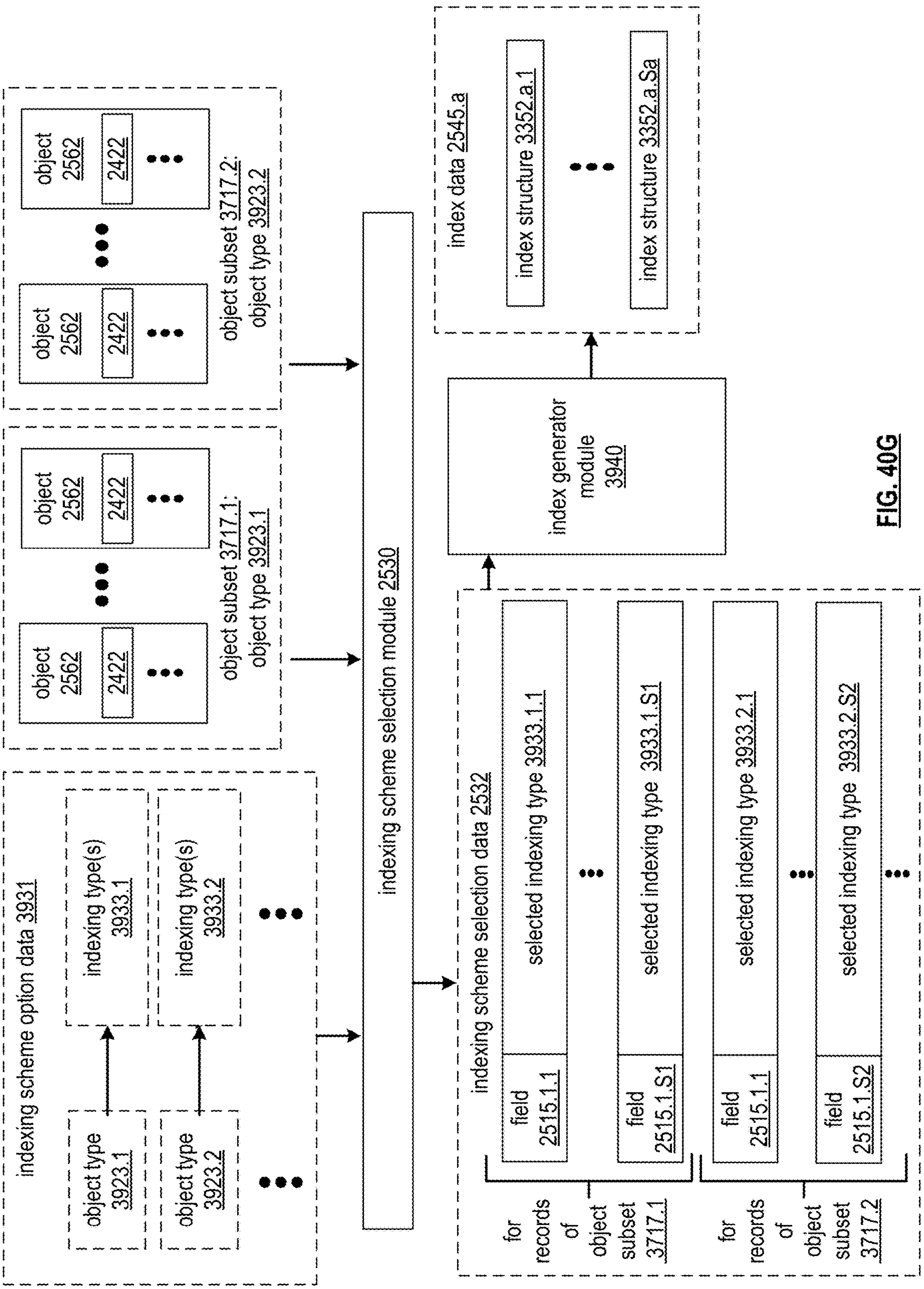
Figure 40H:
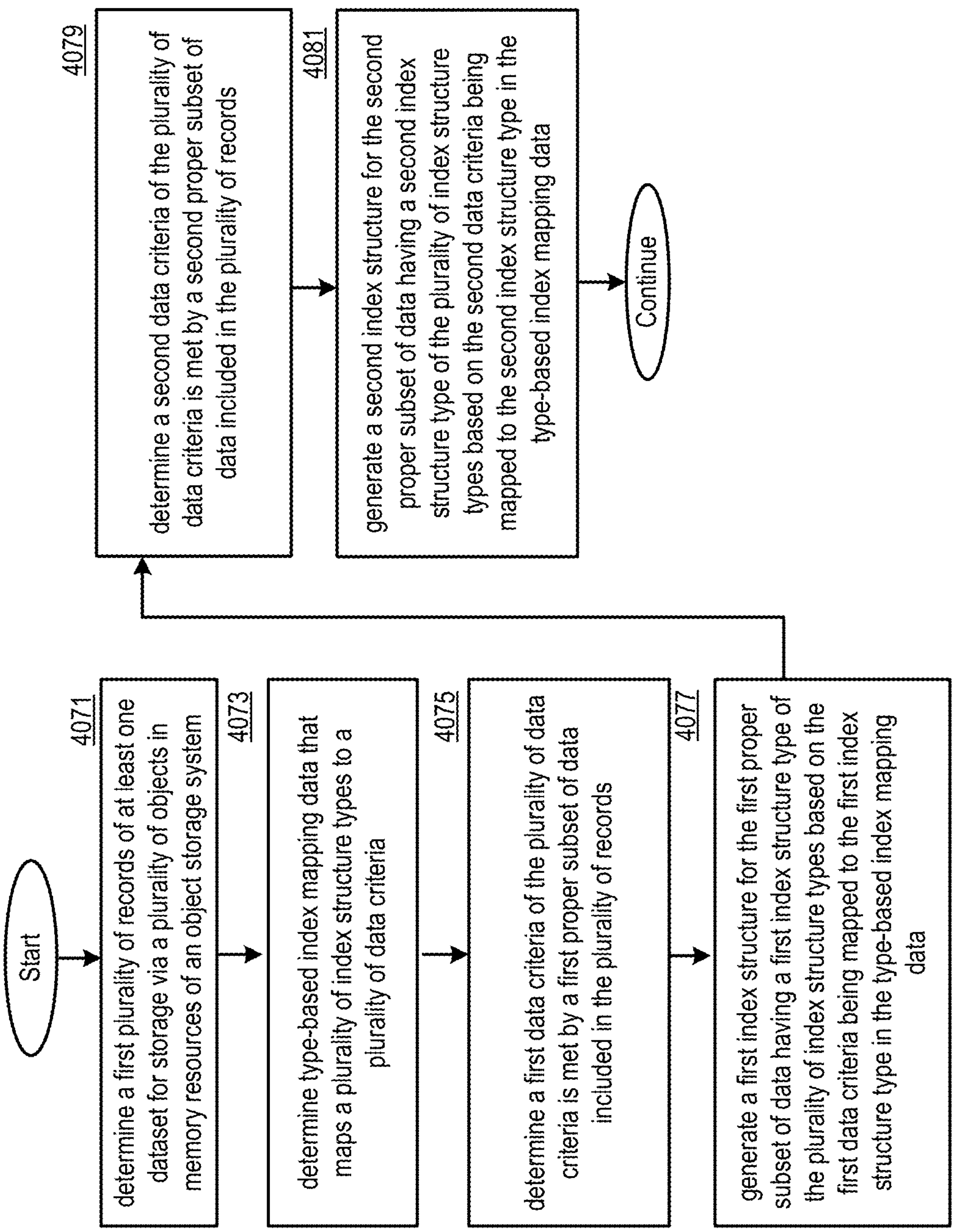
Figure 40I:
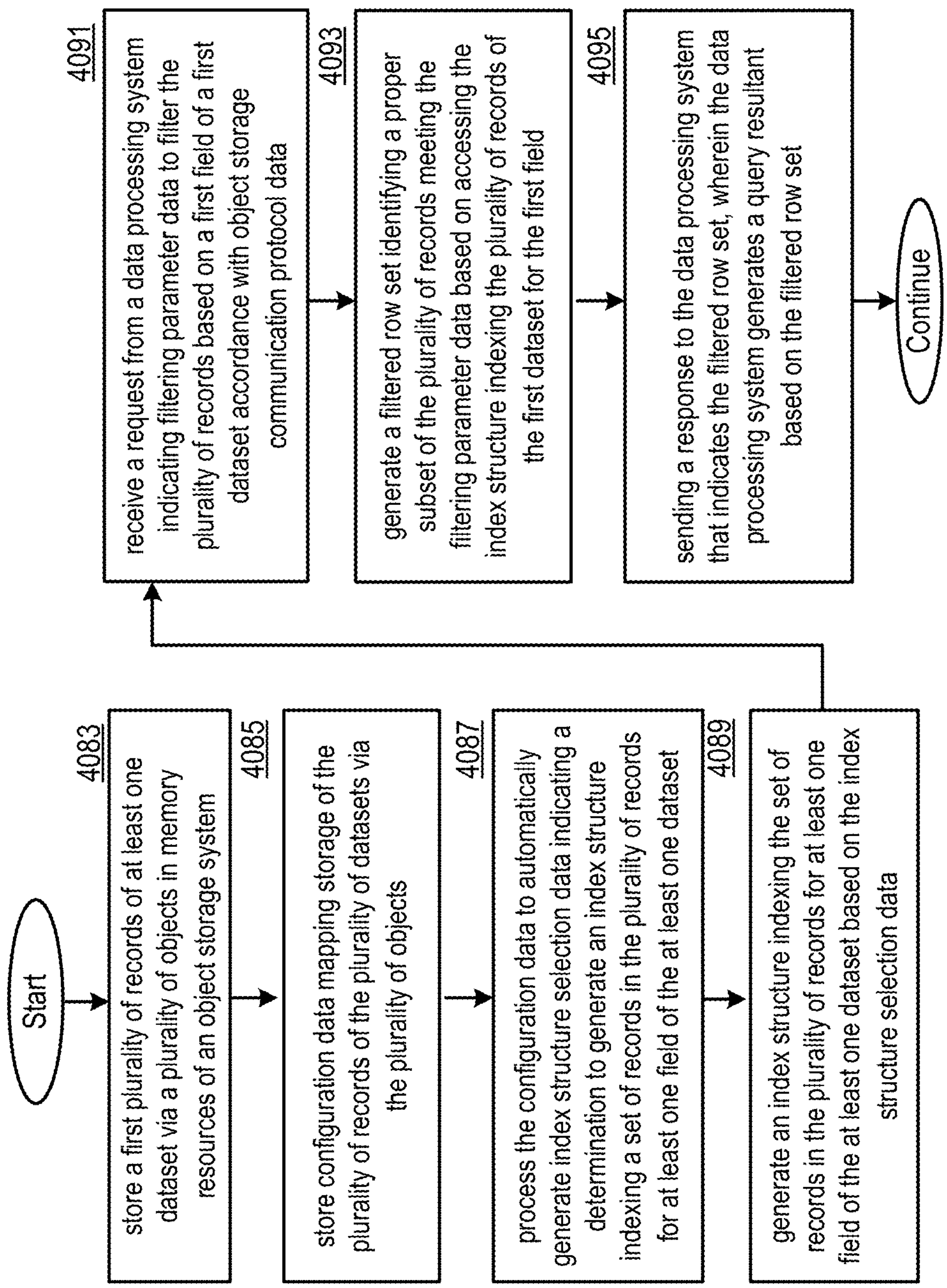
Figure 41A:
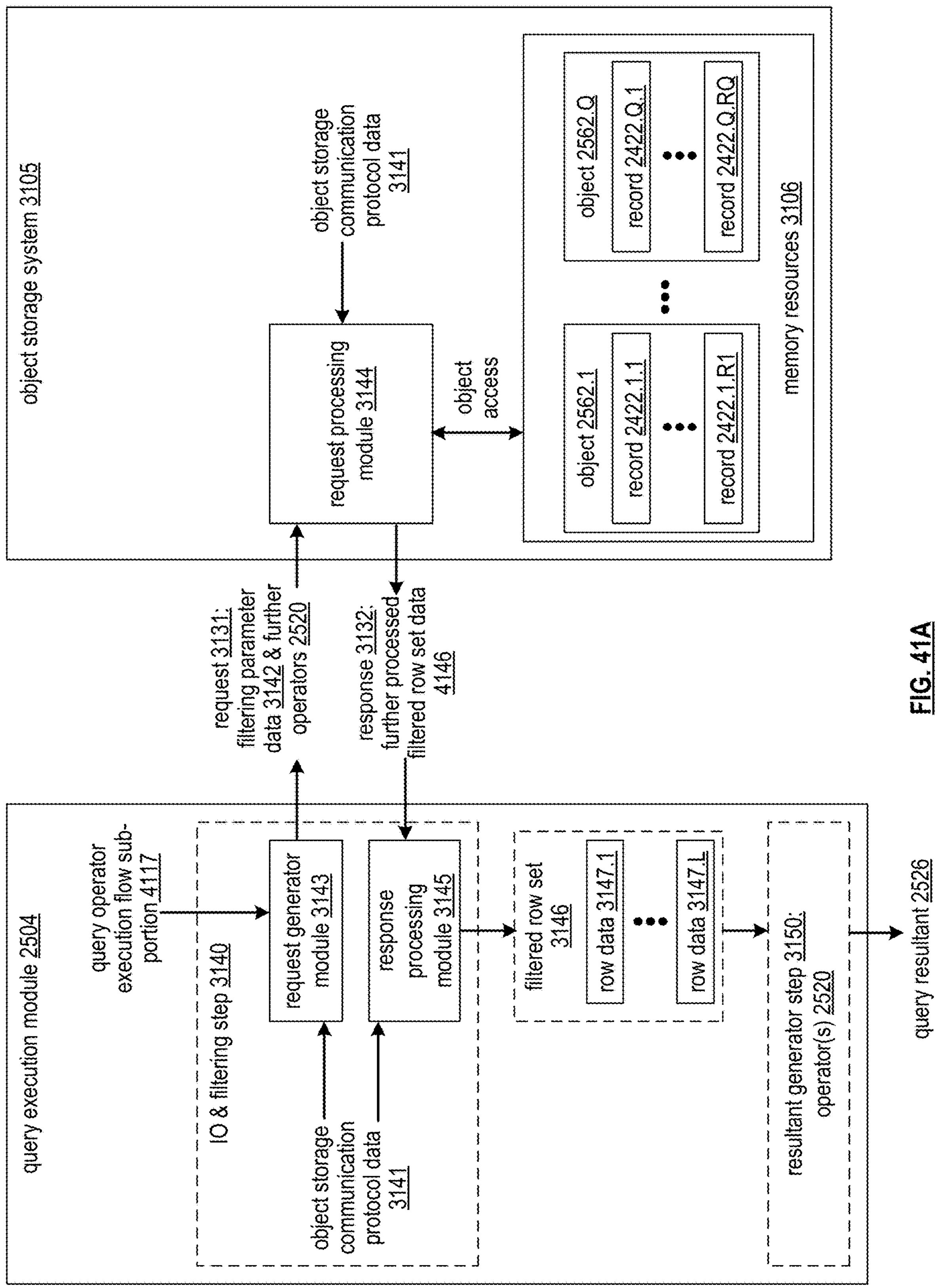
Figure 41B:
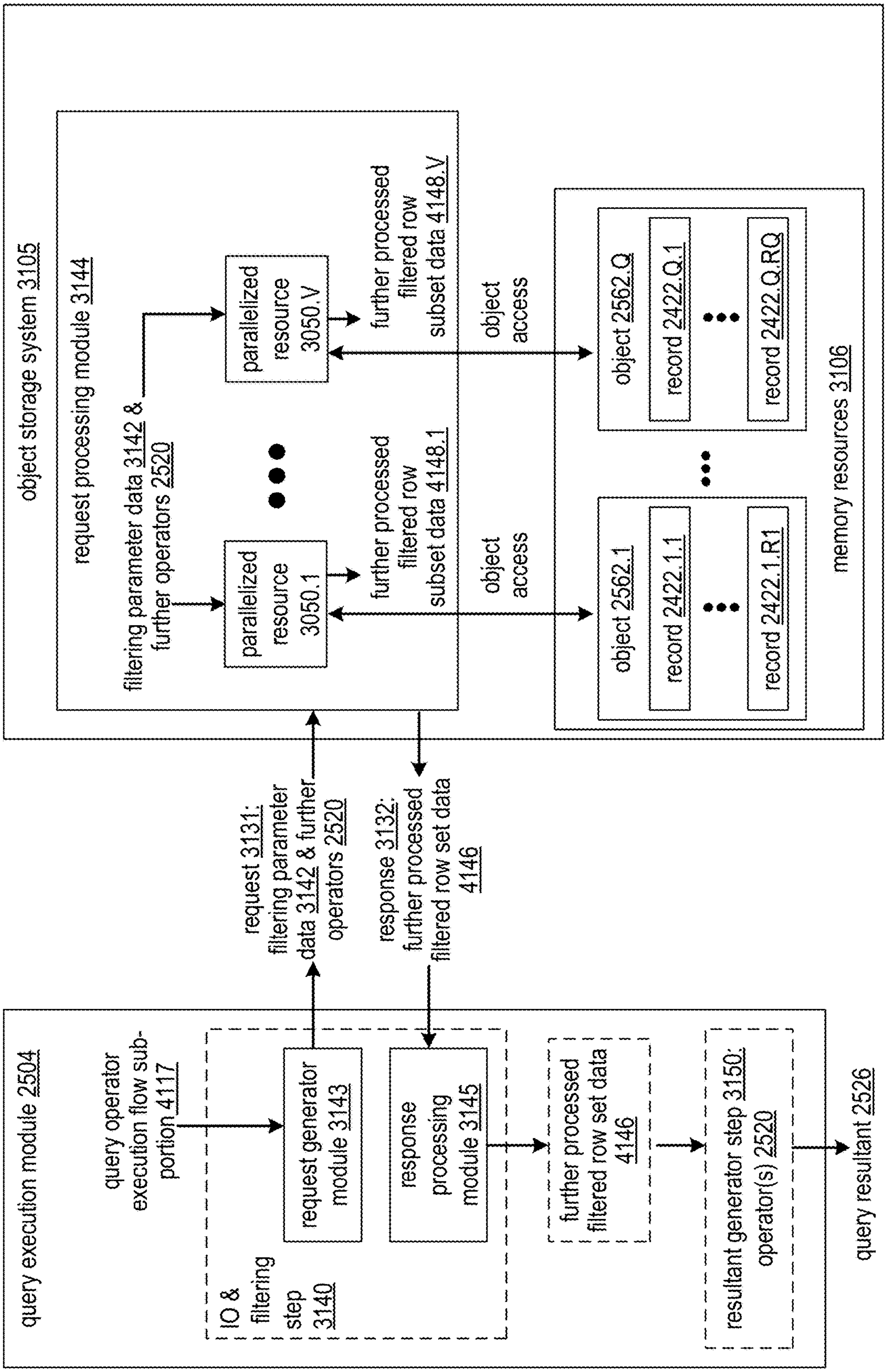
Figure 41C:
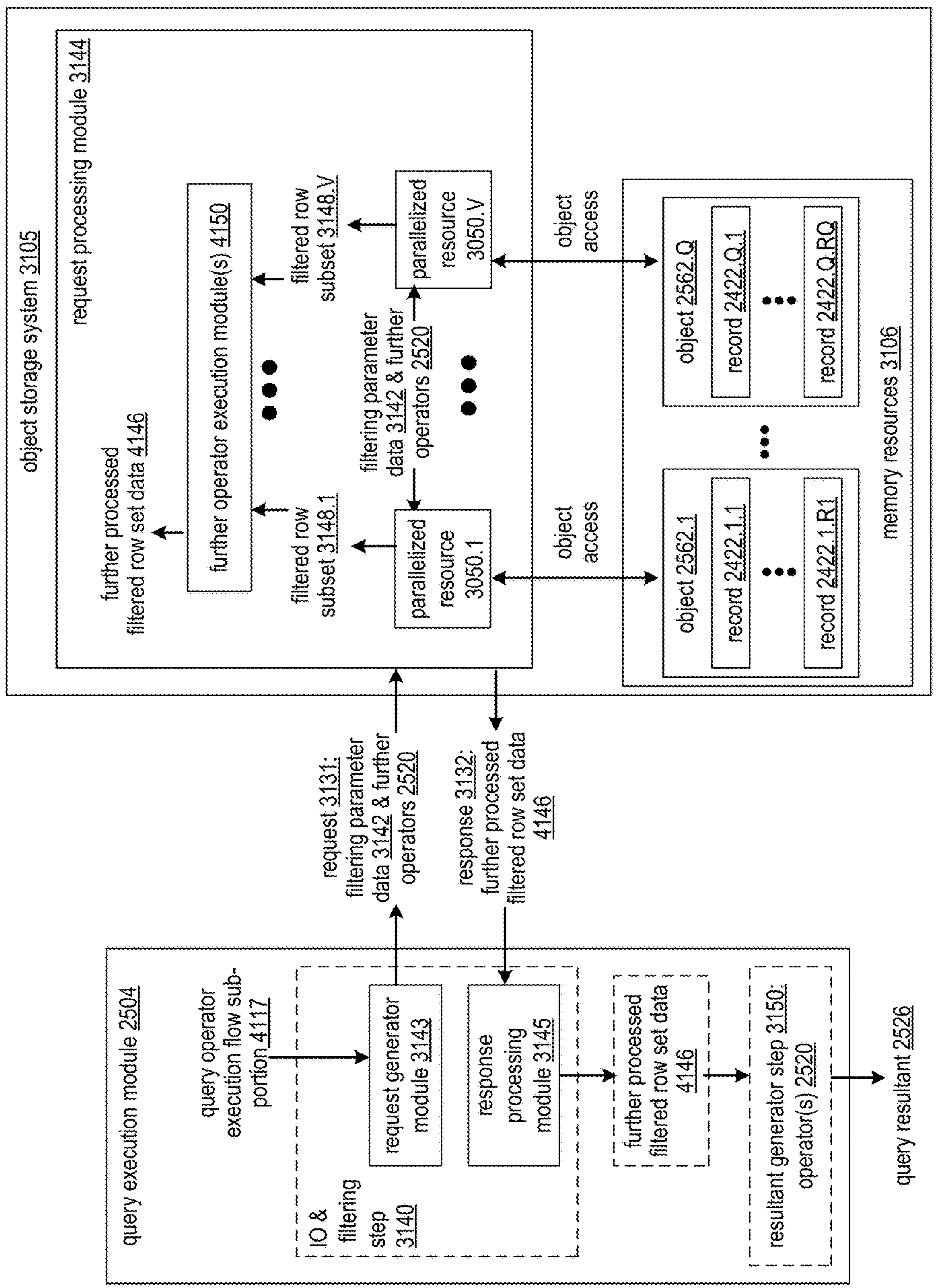
Figure 41D:
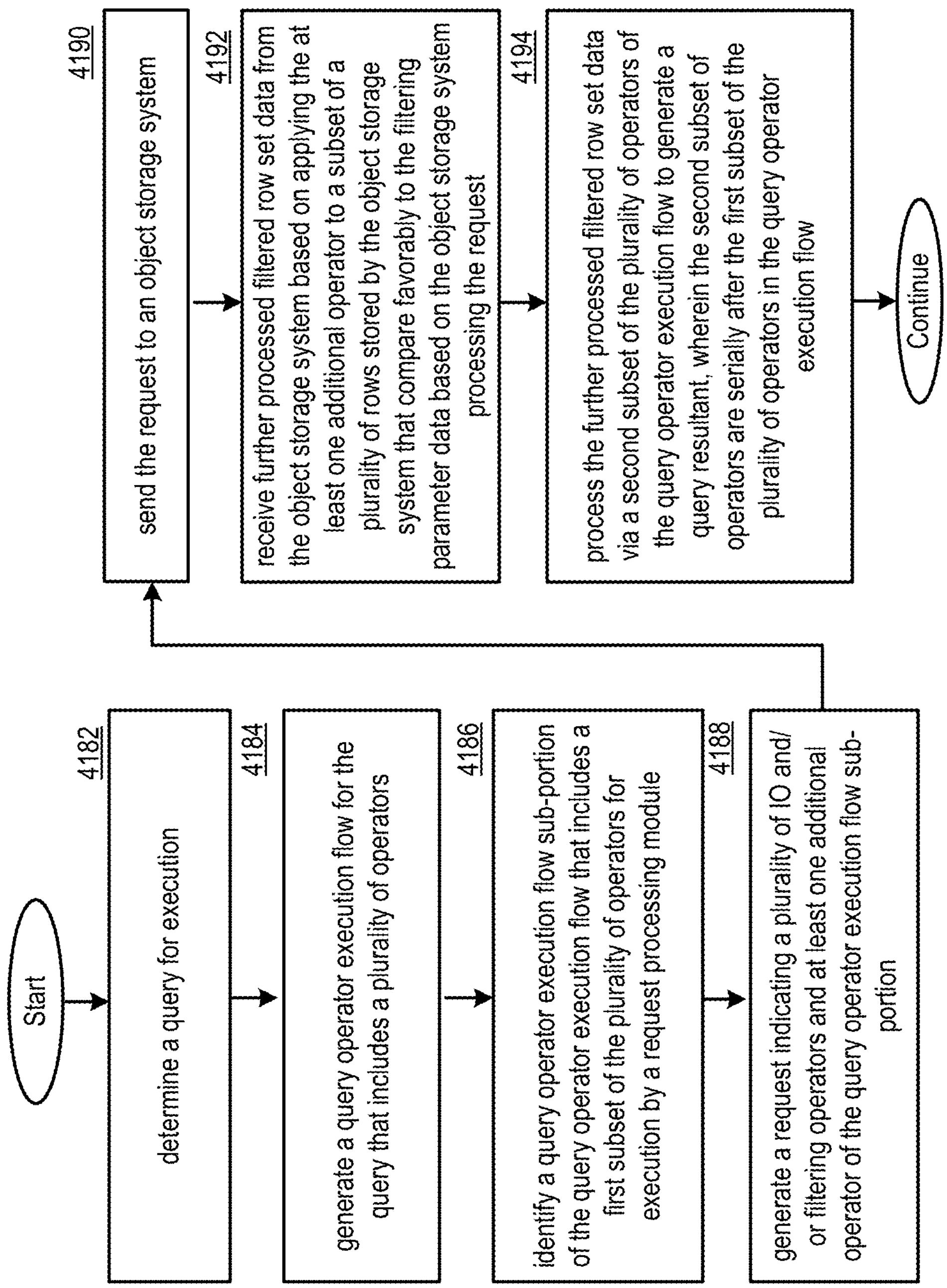
Figure 41E:
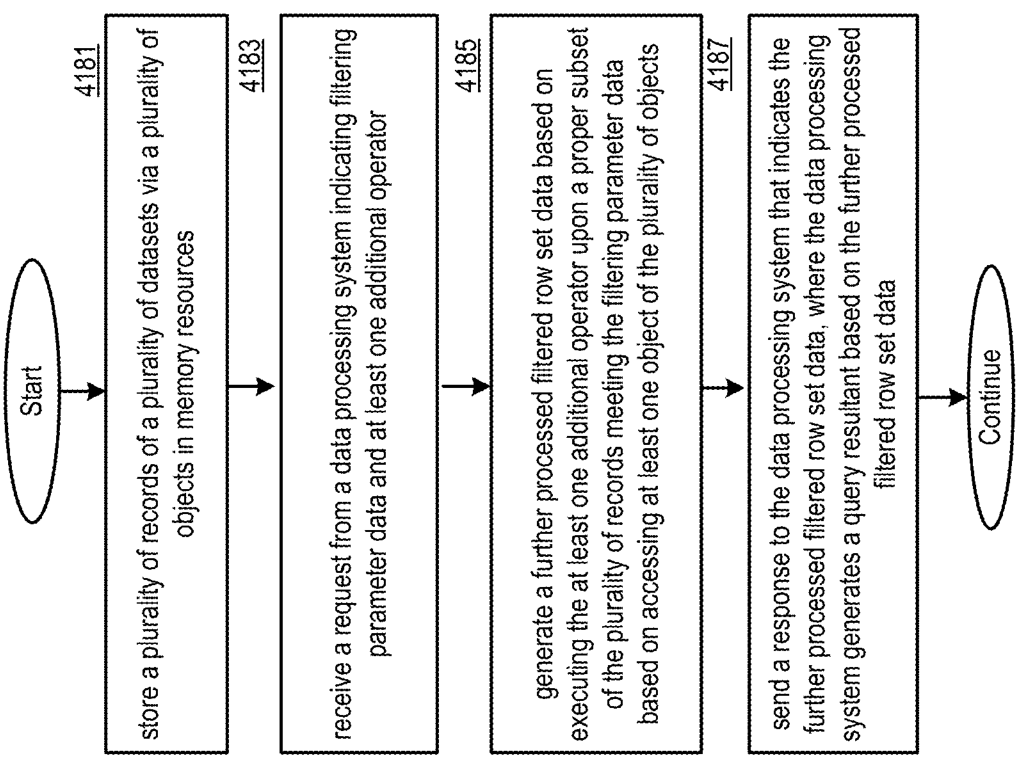

FIG. 37E is a schematic block diagram illustrating a filtered row set generator module of a request processing module that implements an index access module that accesses at least one index structure in index structure storage resources, and that further implements at least one sourcing module that accesses at least one value of at least one record in memory resources of an object storage system in accordance with various embodiments;

FIG. 37F is a schematic block diagram illustrating a filtered row set generator module of a request processing module that implements an index access module that accesses at least one index structure in index structure storage resources, and that further implements at least one sourcing module that accesses at least one value of at least one record in memory resources of an object storage system in accordance with various embodiments;

FIG. 37G is a schematic block diagram a filtered row set generator module of a request processing module that executes a first record identification pipeline to generate a first filtered row subset based on accessing at least one index structure indexing records in an indexed object set, and that further executes a second record identification pipeline to generate a second filtered row subset based on reading values from objects in an unindexed object set in accordance with various embodiments;

FIG. 37H is a logic diagram illustrating a method for execution in accordance with various embodiments;

FIG. 38A illustrates memory resources of an object storage system that stores a plurality of dataset objects and a plurality of index objects in accordance with various embodiments;

FIG. 38B illustrates memory resources of an object storage system that stores a plurality of dataset objects and an index object storing an index structure indexing records across multiple dataset objects of the plurality of dataset objects in accordance with various embodiments;

FIG. 38C is a schematic block diagram illustrating a filtered row set generator module of a request processing module that generates a filtered row set based on accessing at least one index object in memory resources of an object storage system in accordance with various embodiments;

FIG. 38D is a schematic block diagram illustrating a filtered row set generator module of a request processing module that generates a filtered row set based on accessing at least one index object in memory resources of an object storage system, and based on further reading values from at least one dataset object in the memory resources of the object storage system in accordance with various embodiments;

FIG. 38E is a schematic block diagram illustrating a filtered row set generator module of a request processing module that generates a filtered row set based on accessing at least one index object in memory resources of an object storage system, and based on further reading values from at least one dataset object in the memory resources of the object storage system in accordance with various embodiments;

FIG. 38F is a logic diagram illustrating a method for execution in accordance with various embodiments;

FIG. 39A illustrates non-object storage memory resources that stores index data indexing records included in a plurality of dataset objects stored in memory resources of an object storage system;

FIG. 39B is a schematic block diagram illustrating a filtered row set generator module of a request processing module that generates a filtered row set based on accessing index data in non-object storage memory resources in accordance with various embodiments;

FIG. 39C illustrates non-object storage memory resources that stores index data that includes at least one index structure that is also stored in at least one index object stored in memory resources of an object storage system;

FIG. 39D is a schematic block diagram illustrating a filtered row set generator module of a request processing module that caches an index structure in non-object storage memory resources based on accessing the index structure in memory resources of an object storage system to generate a filtered row set in accordance with various embodiments;

FIG. 39E is a logic diagram illustrating a method for execution in accordance with various embodiments;

FIG. 40A is a schematic block diagram illustrating an index generator module that generates index data based on indexing scheme selection data generated by an indexing scheme selection module in accordance with various embodiments;

FIG. 40B is a schematic block diagram illustrating an indexing scheme selection module that generates indexing scheme selection data for indexing a dataset based on dataset schema data for the dataset in accordance with various embodiments;

FIG. 40C is a schematic block diagram illustrating an indexing scheme selection module that generates indexing scheme selection data for indexing a plurality of rows based on configuration data for the plurality of rows in accordance with various embodiments;

FIG. 40D is a schematic block diagram illustrating an indexing scheme selection module that generates indexing scheme selection data for indexing a plurality of records based on indexing scheme option data and local distribution data of the plurality of records in accordance with various embodiments;

FIG. 40E is a schematic block diagram illustrating an indexing scheme selection module that generates indexing scheme selection data for indexing a plurality of records based on record types of different ones of the plurality of records and further based on indexing scheme option data mapping different record types to corresponding indexing types in accordance with various embodiments;

FIG. 40F is a schematic block diagram illustrating an indexing scheme selection module that generates indexing scheme selection data for indexing a plurality of records based on field types of different fields of the plurality of records and further based on indexing scheme option data mapping different field types to corresponding indexing types in accordance with various embodiments;

FIG. 40G is a schematic block diagram illustrating an indexing scheme selection module that generates indexing scheme selection data for indexing a plurality of records based on object types of different objects that include different subsets of the plurality of records and further based on indexing scheme option data mapping different object types to corresponding indexing types in accordance with various embodiments;

FIG. 40H is a logic diagram illustrating a method for execution in accordance with various embodiments;

FIG. 40I is a logic diagram illustrating a method for execution in accordance with various embodiments;

FIG. 41A is a schematic block diagram illustrating query execution based on a query execution module communicating with an object storage system that generates further processed filtered row set data based on processing a request in accordance with various embodiments;

FIG. 41B is a schematic block diagram illustrating query execution based on a query execution module communicating with an object storage system that generates further processed filtered row set data via a plurality of parallelized resources based on processing a request in accordance with various embodiments;

FIG. 41C is a schematic block diagram illustrating query execution based on a query execution module communicating with an object storage system that generates further processed filtered row set data via a plurality of parallelized resources and at least one further operator execution module based on processing a request in accordance with various embodiments;

FIG. 41D is a logic diagram illustrating a method for execution in accordance with various embodiments; and FIG. 41E is a logic diagram illustrating a method for execution in accordance with various embodiments.

DETAILED DESCRIPTION OF THE INVENTION

Figure 1:
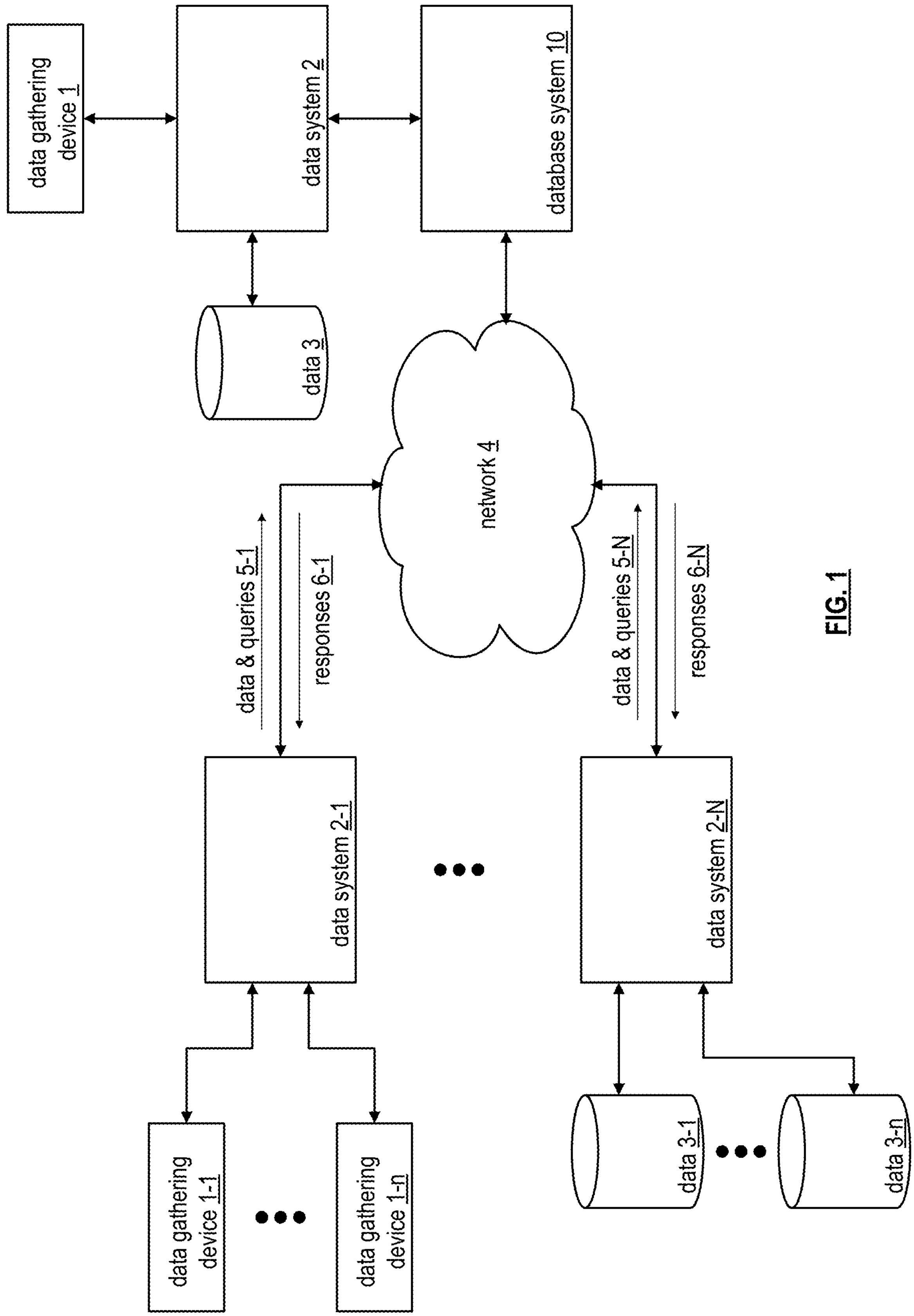
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
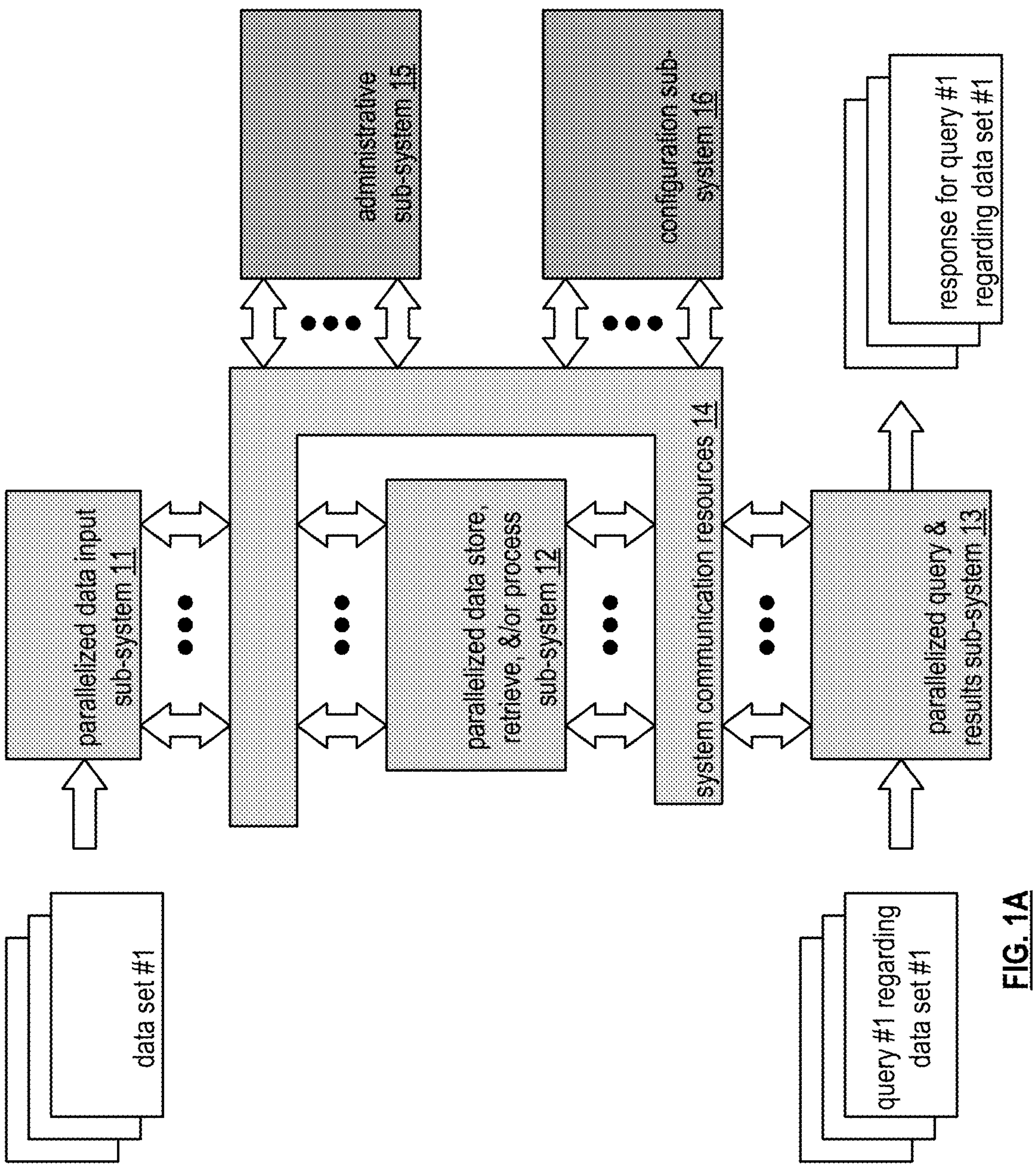
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
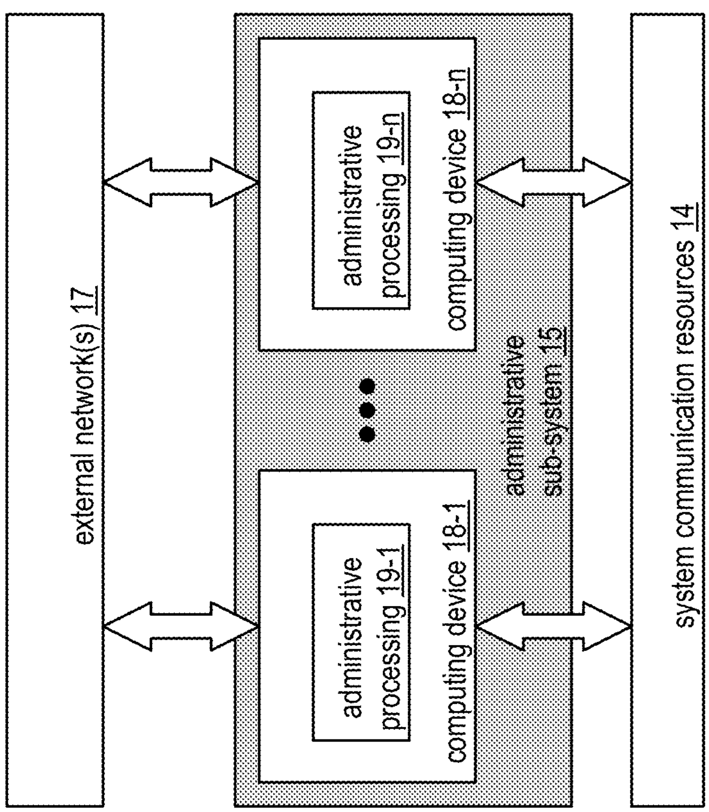
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-*n*. Each of the computing devices executes an administrative processing function utilizing a corresponding administrative processing of administrative processing 19-1 through 19-*n* (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
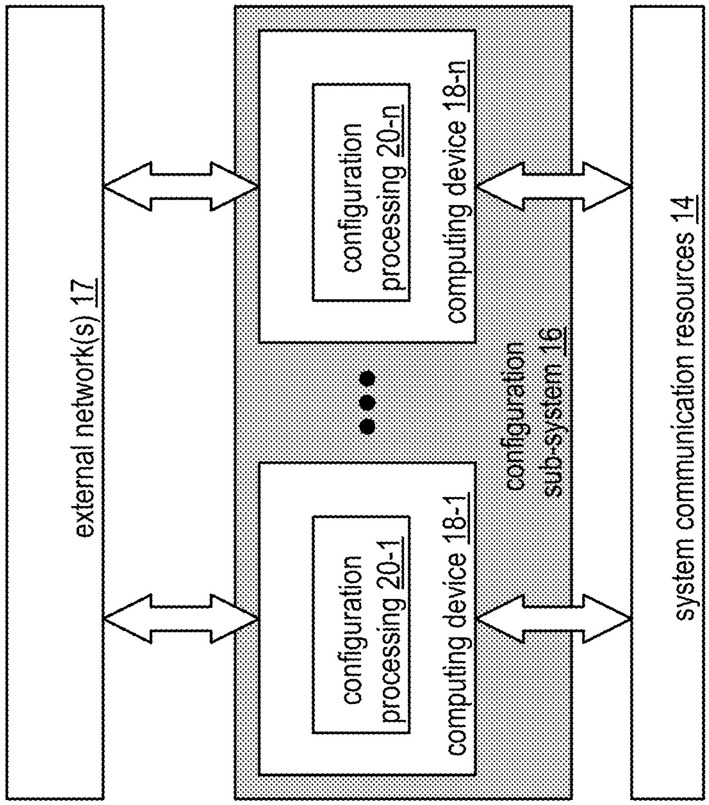
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
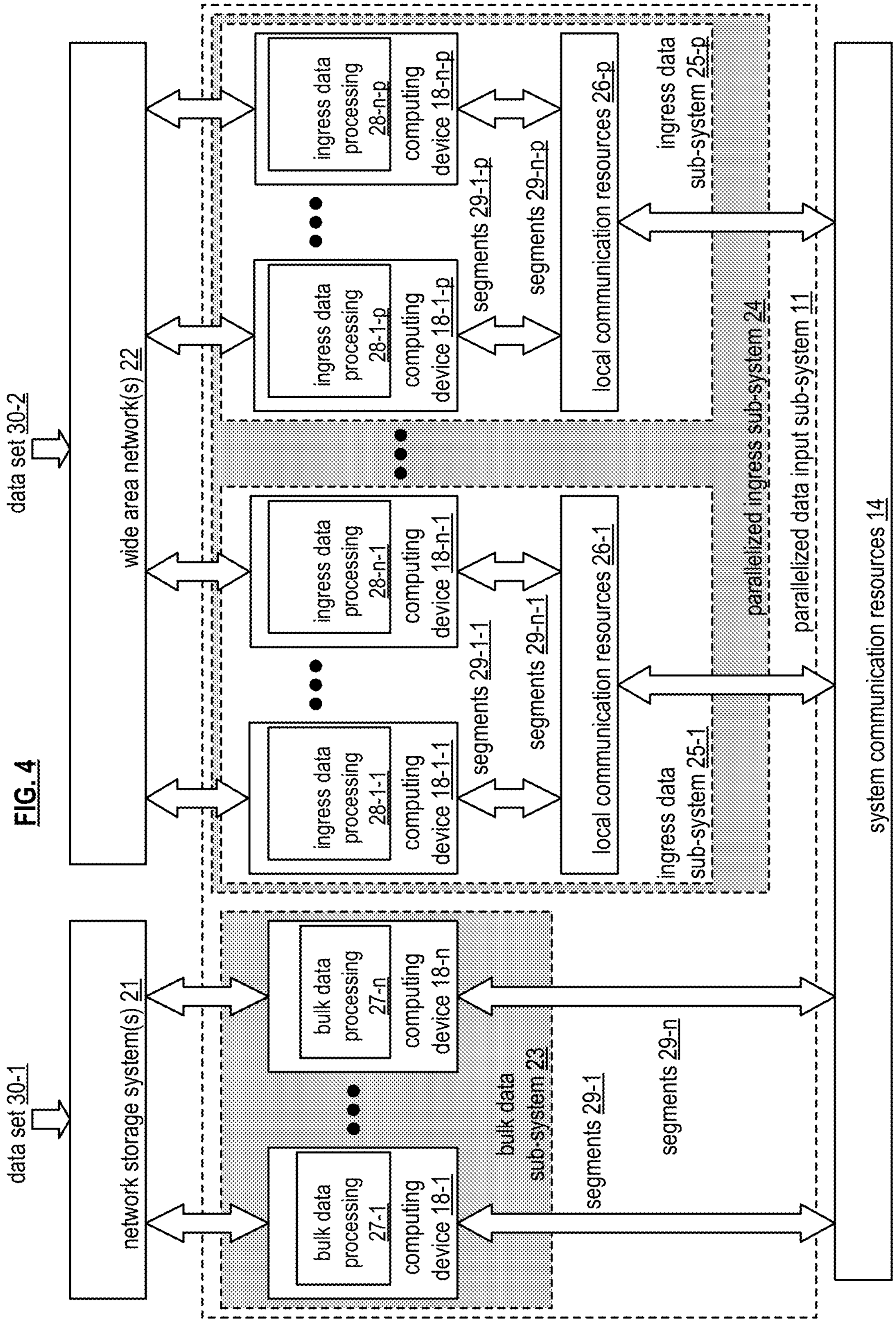
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
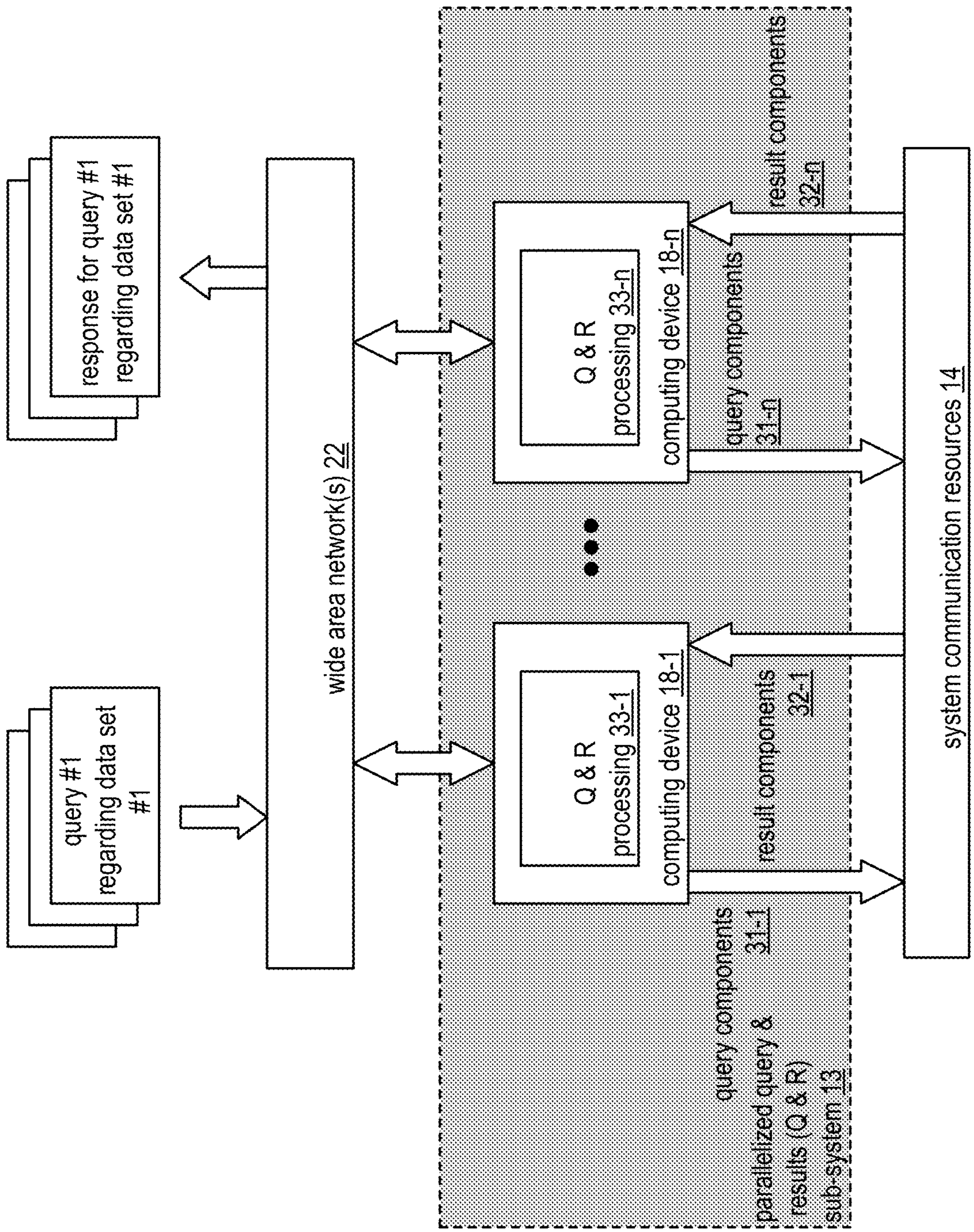
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
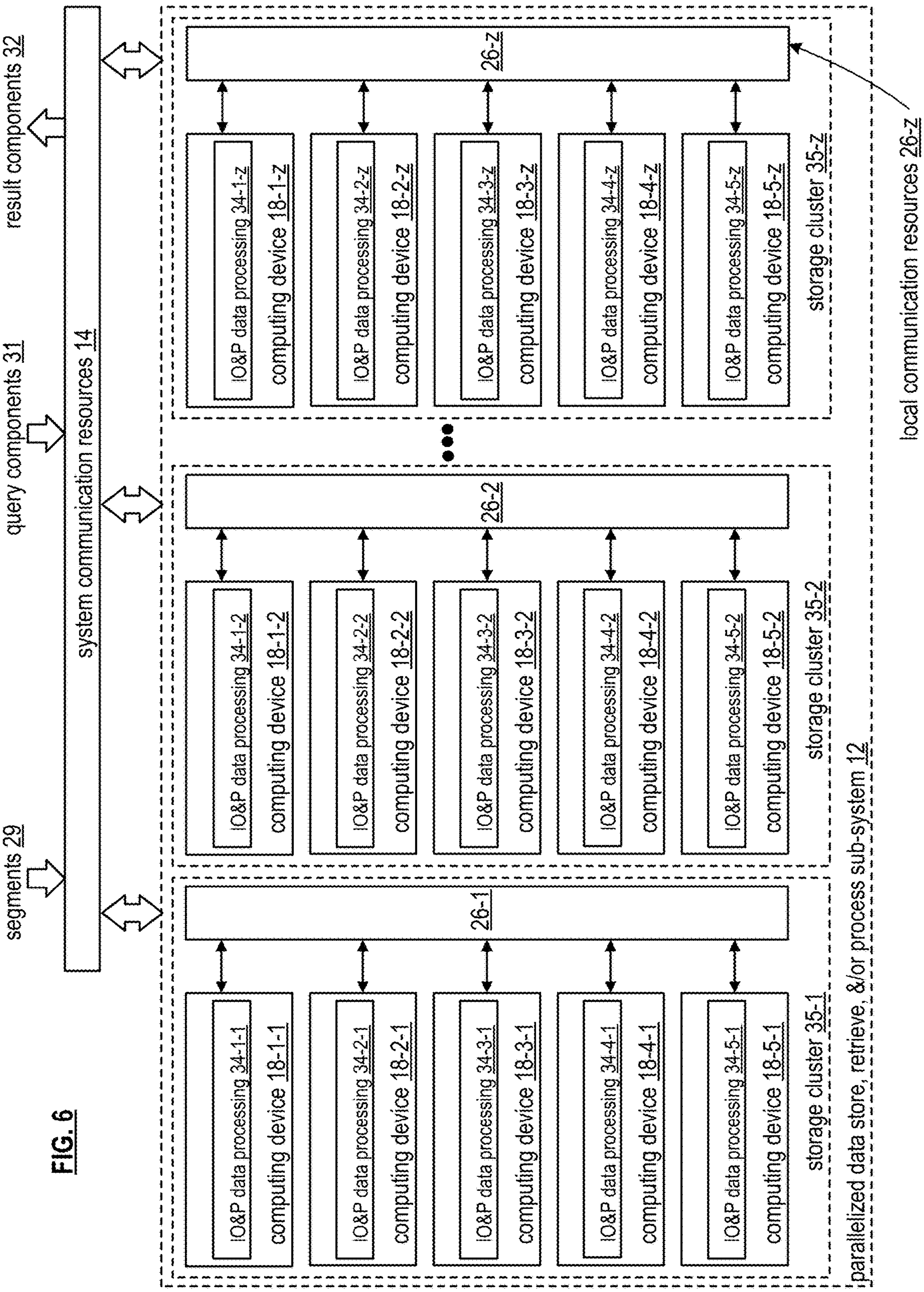
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partition is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
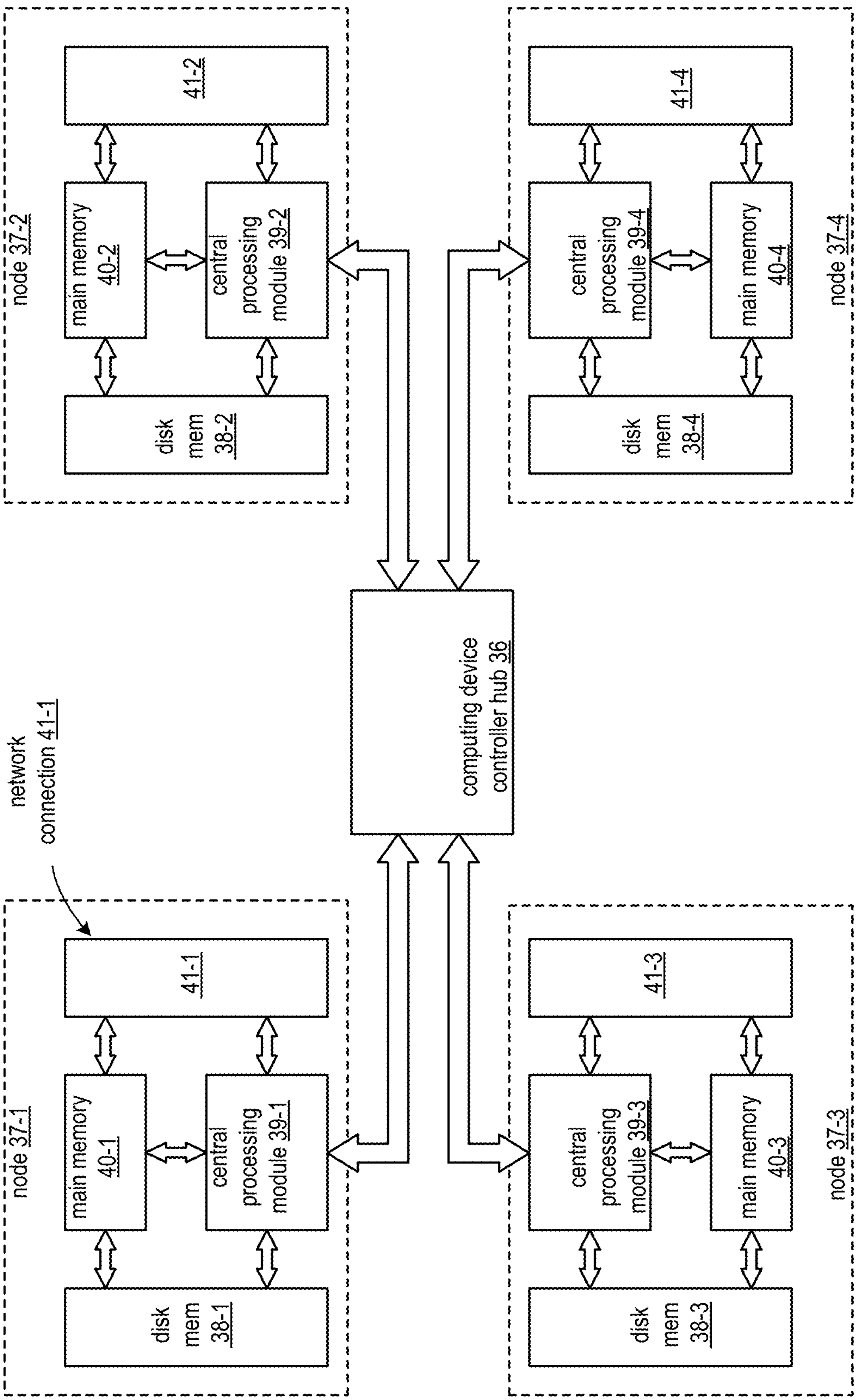
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
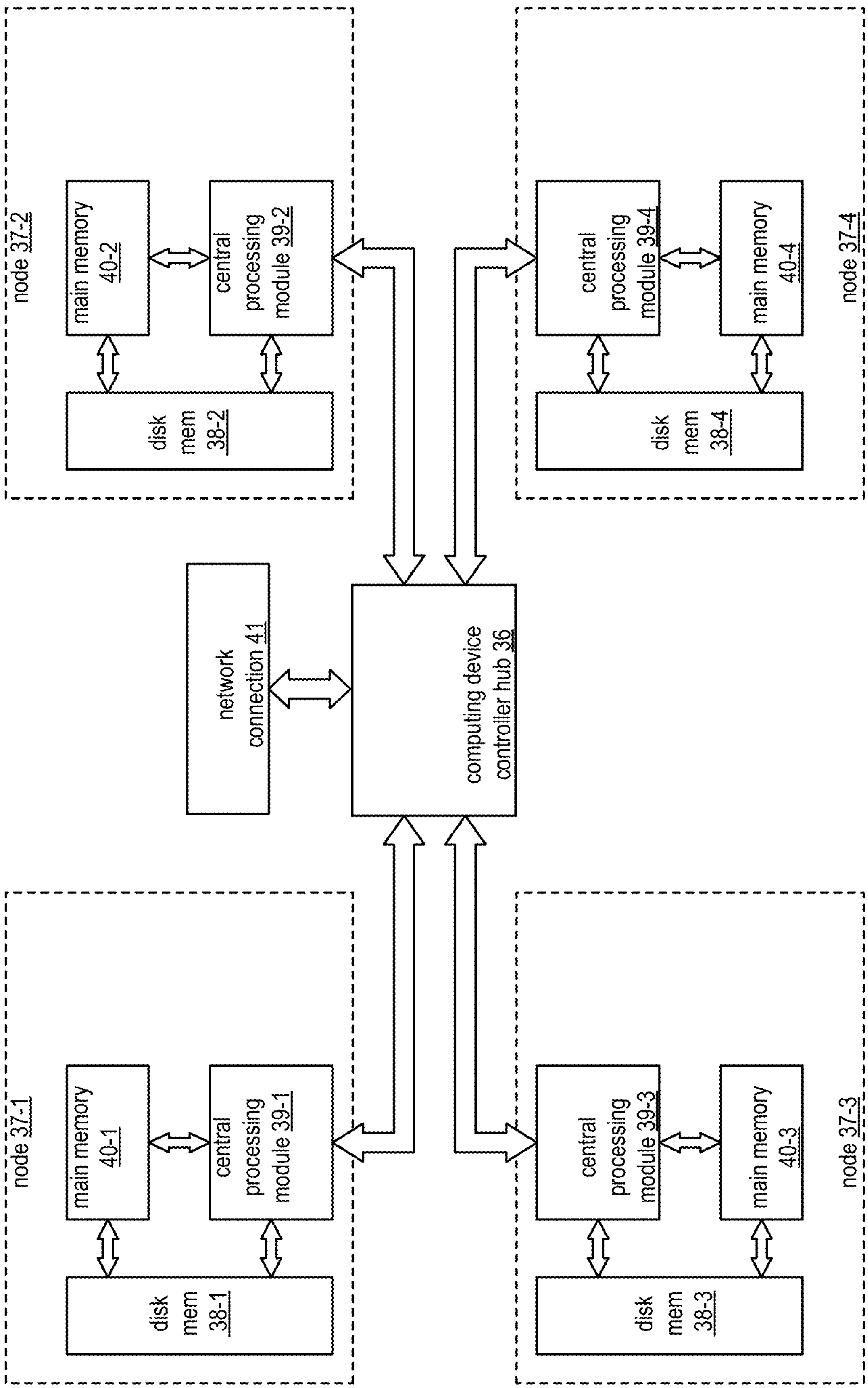
FIG. 8 is a schematic block diagram of another embodiment of a computing device in accordance with the present invention.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
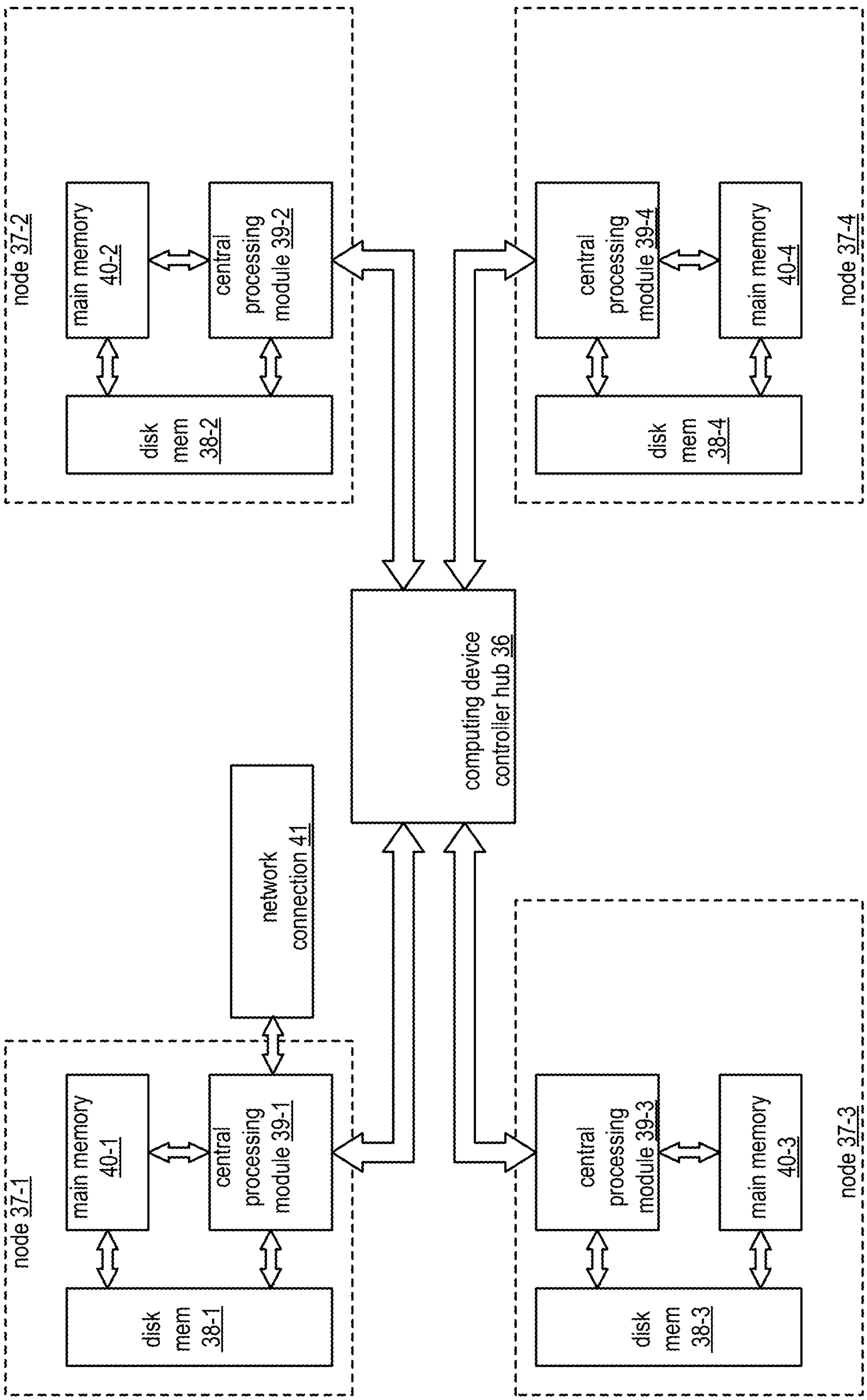
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
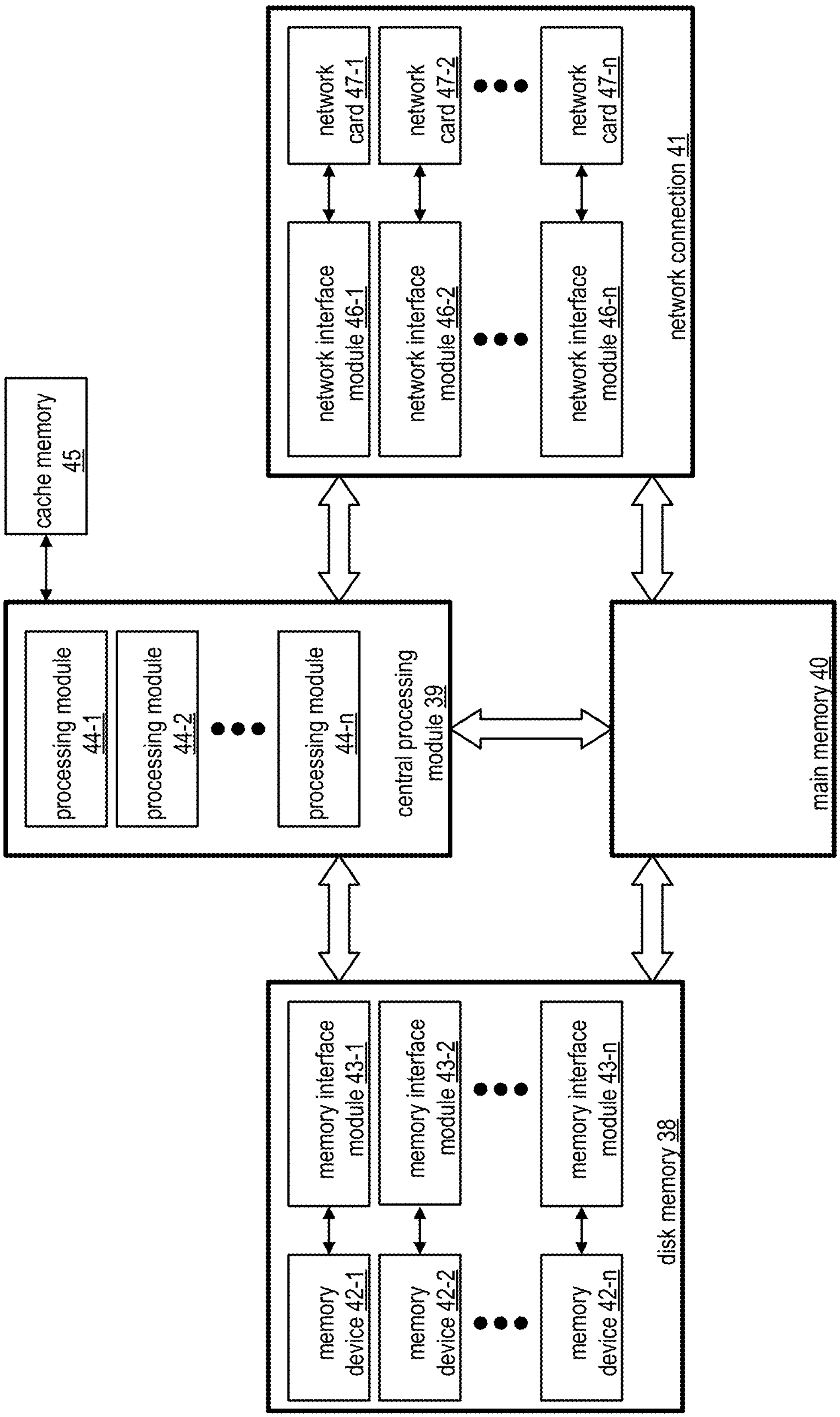
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through **44-*n* and an associated one or more cache memory 45**. A processing module is as defined at the end of the detailed description.

The disk memory 38 includes a plurality of memory interface modules 43-1 through **43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n*** is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through **46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
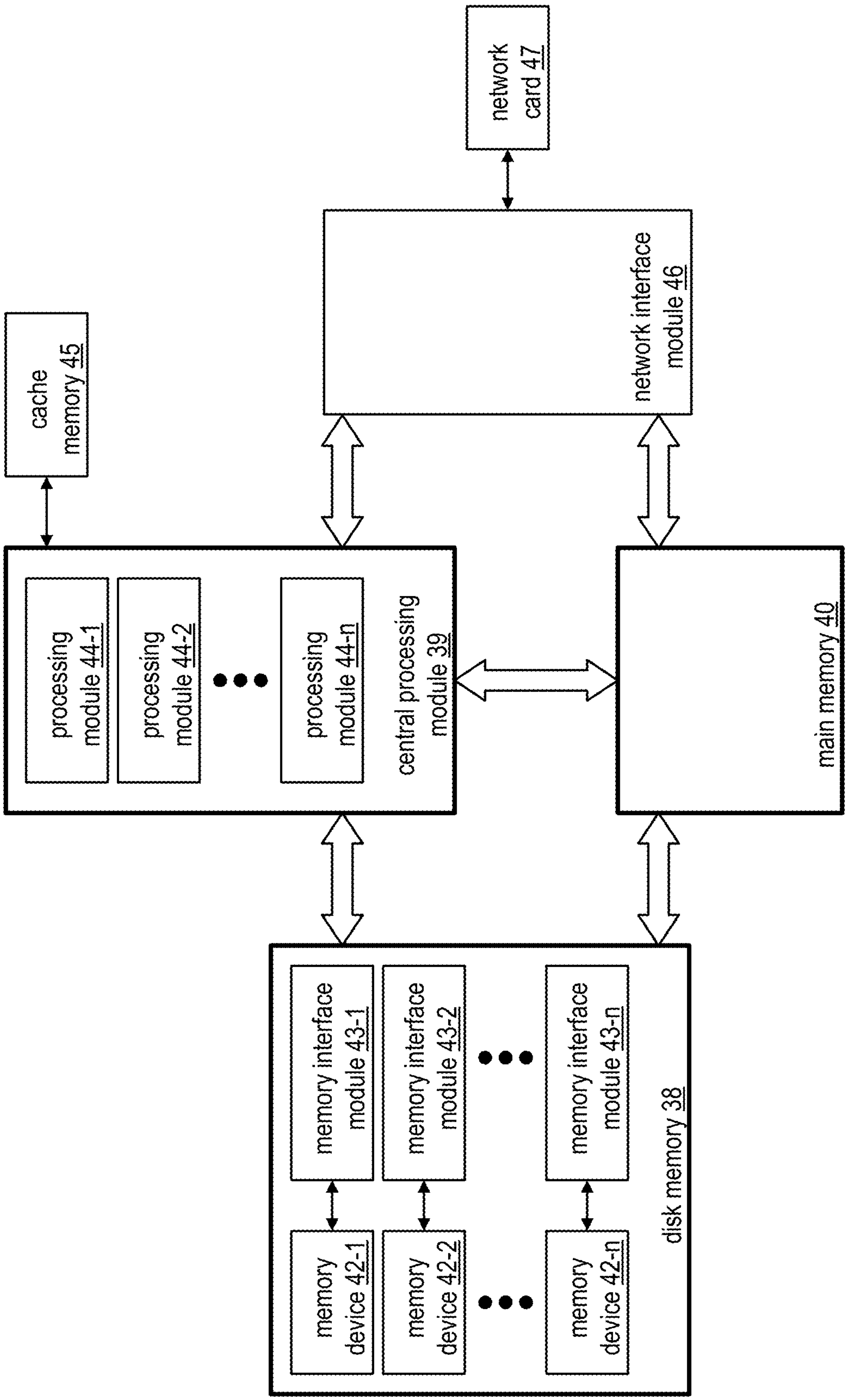
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
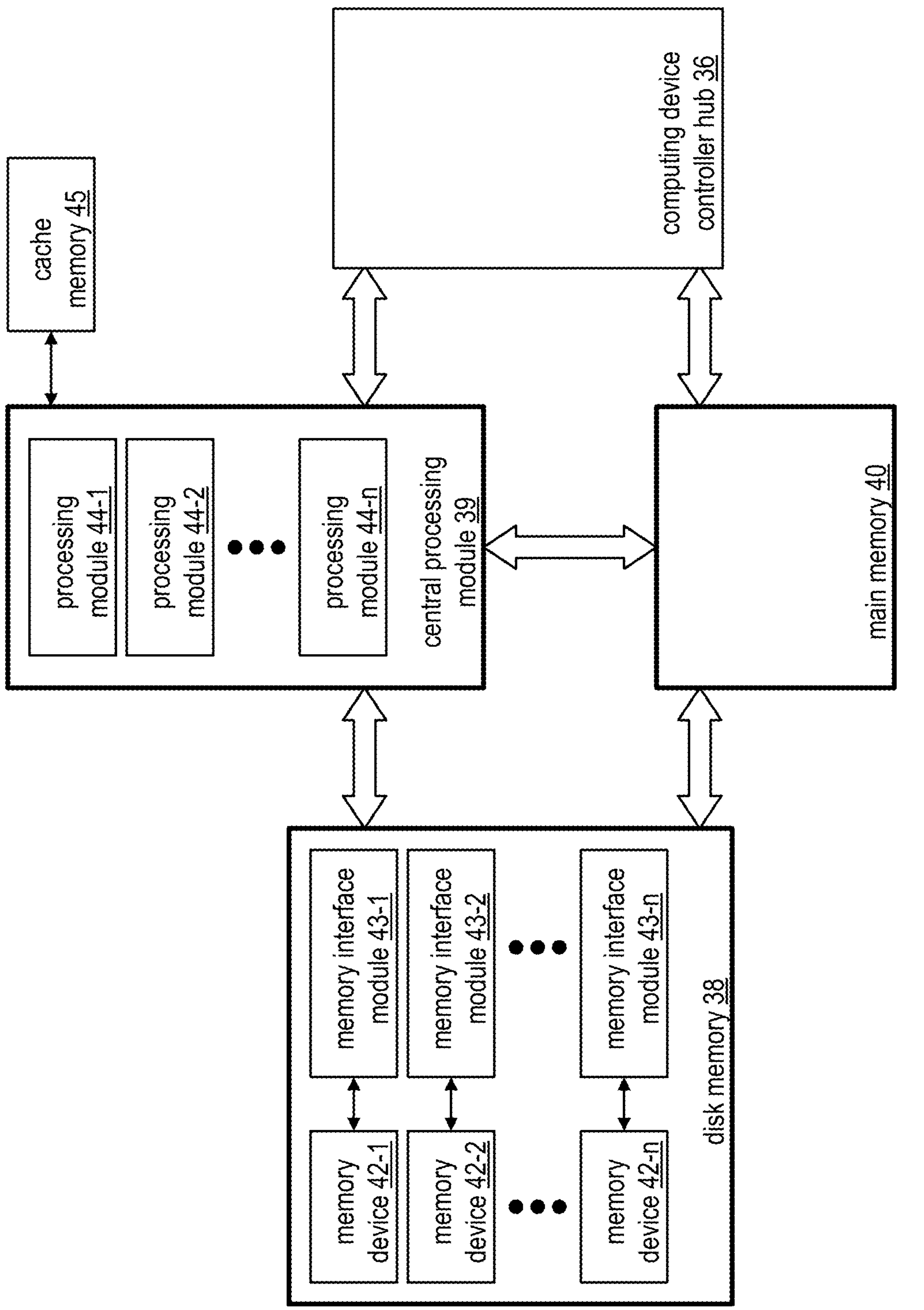
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
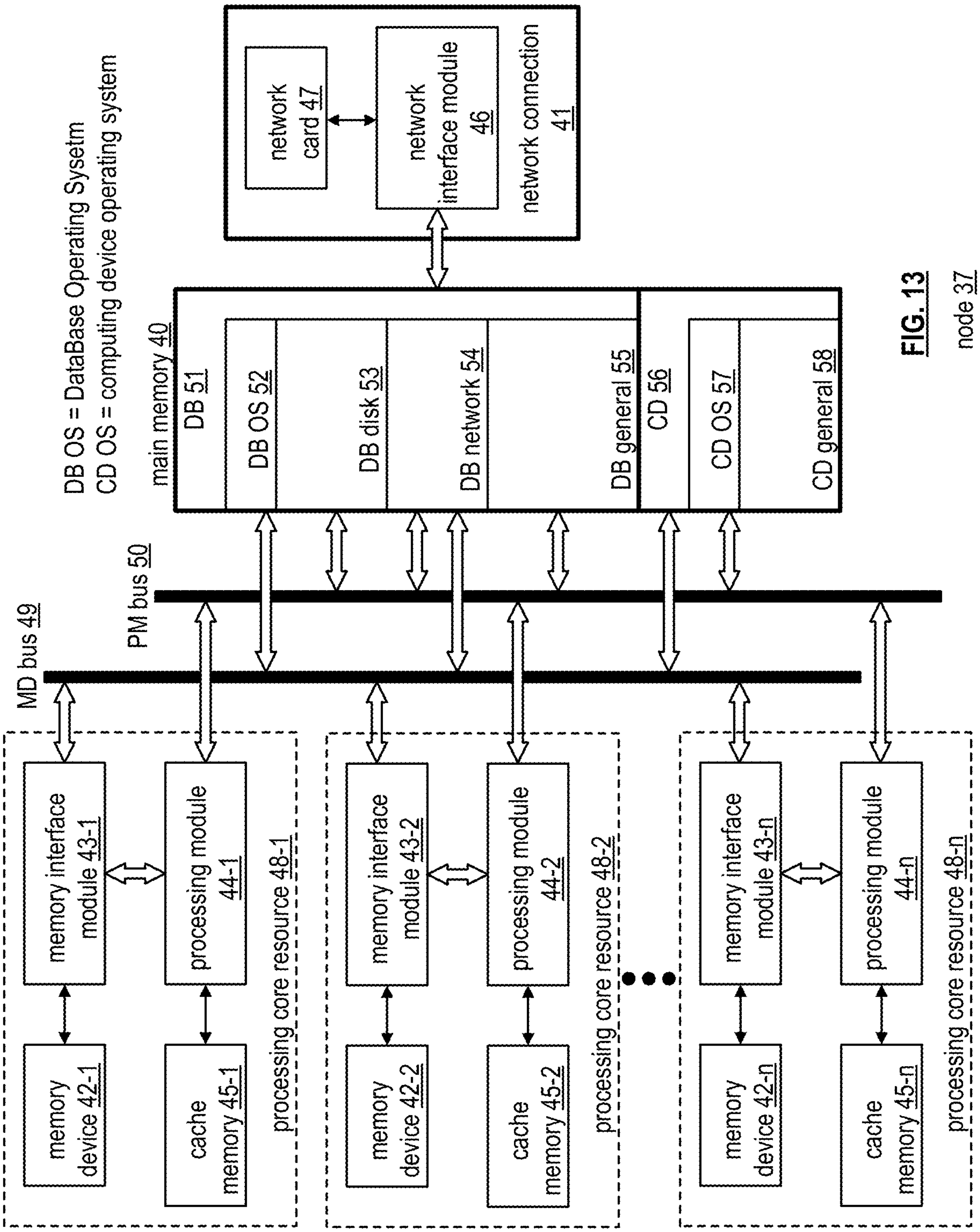
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through **48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
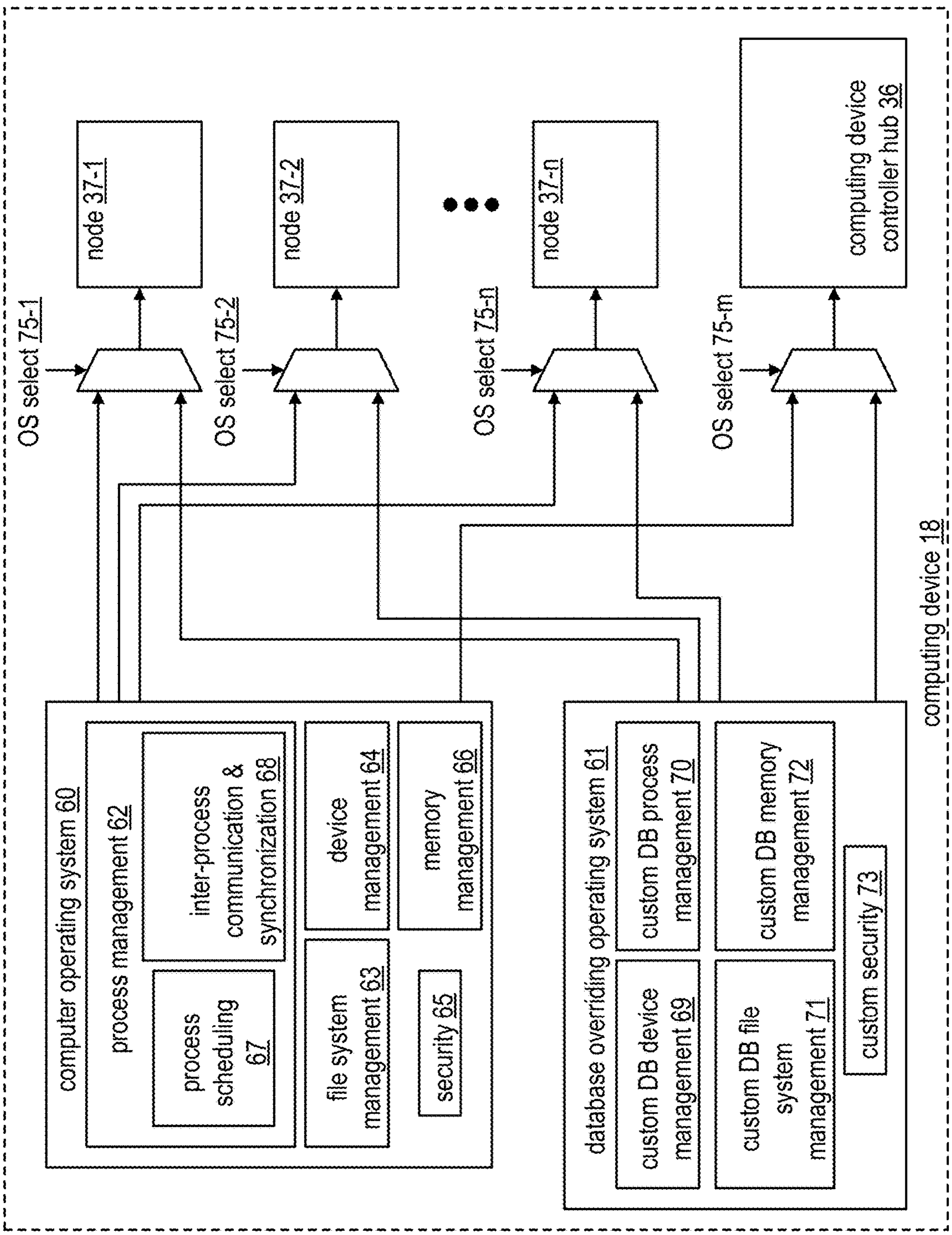
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Terabytes, Petabytes, and/or Exabytes of data. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform multiple independent processes, such as hundreds, thousands, and/or millions of independent processes, in parallel and/or within overlapping time spans. The database system 10 improves the technology of database system by enabling data to be processed at a massive scale efficiently and/or reliably.

In particular, the database system 10 can be operable to receive data and to store received data at a massive scale. For example, the parallelized retrieval of data and/or query processing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records massive scale in conjunction with query execution, where millions, billions, and/or trillions of records that collectively include many Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale cannot practically be performed by the human mind. The processing of queries at this massive scale improves database system by facilitating greater depth and/or insights of query resultants for queries performed upon this massive scale of data.

Furthermore, the database system 10 can be operable to perform multiple queries concurrently upon data at a massive scale. For example, the parallelized retrieval and processing data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves database system by facilitating greater numbers of users and/or greater numbers of analyses to be serviced within a given time frame and/or over time.

Figure 15:
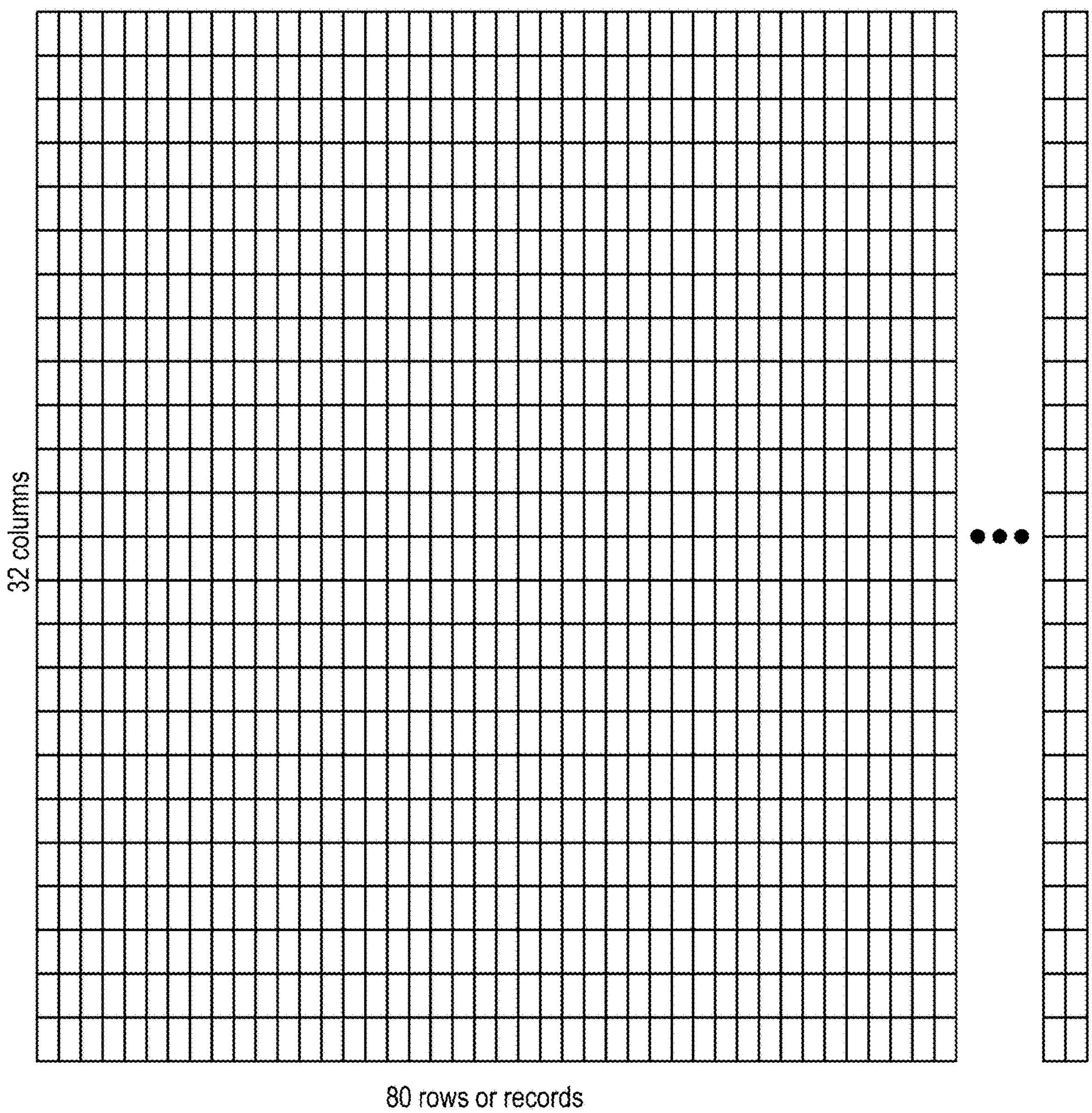
FIGS. 15-23 are schematic block diagrams of an example of processing a table or data set for storage in the database system in accordance with the present invention.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
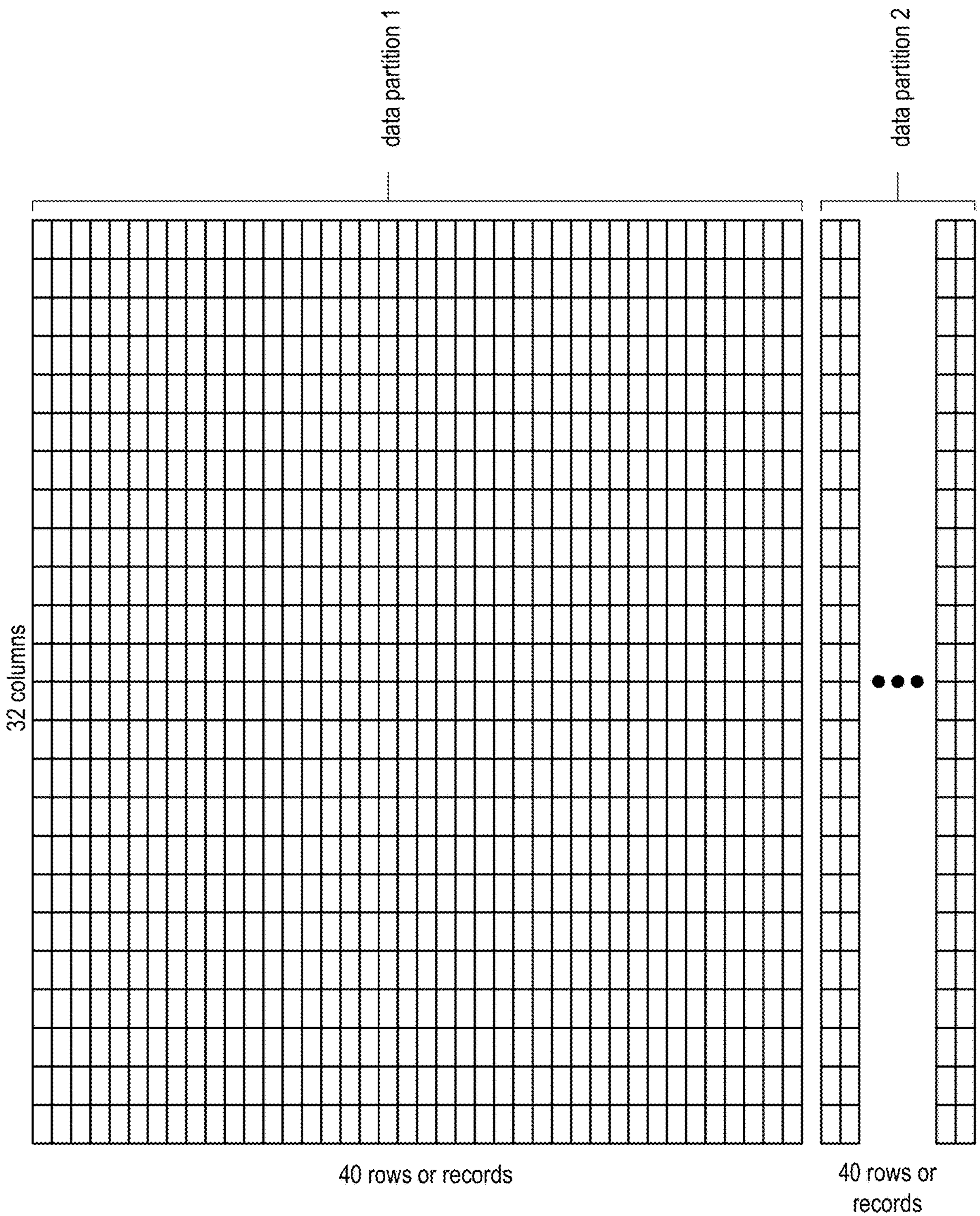

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
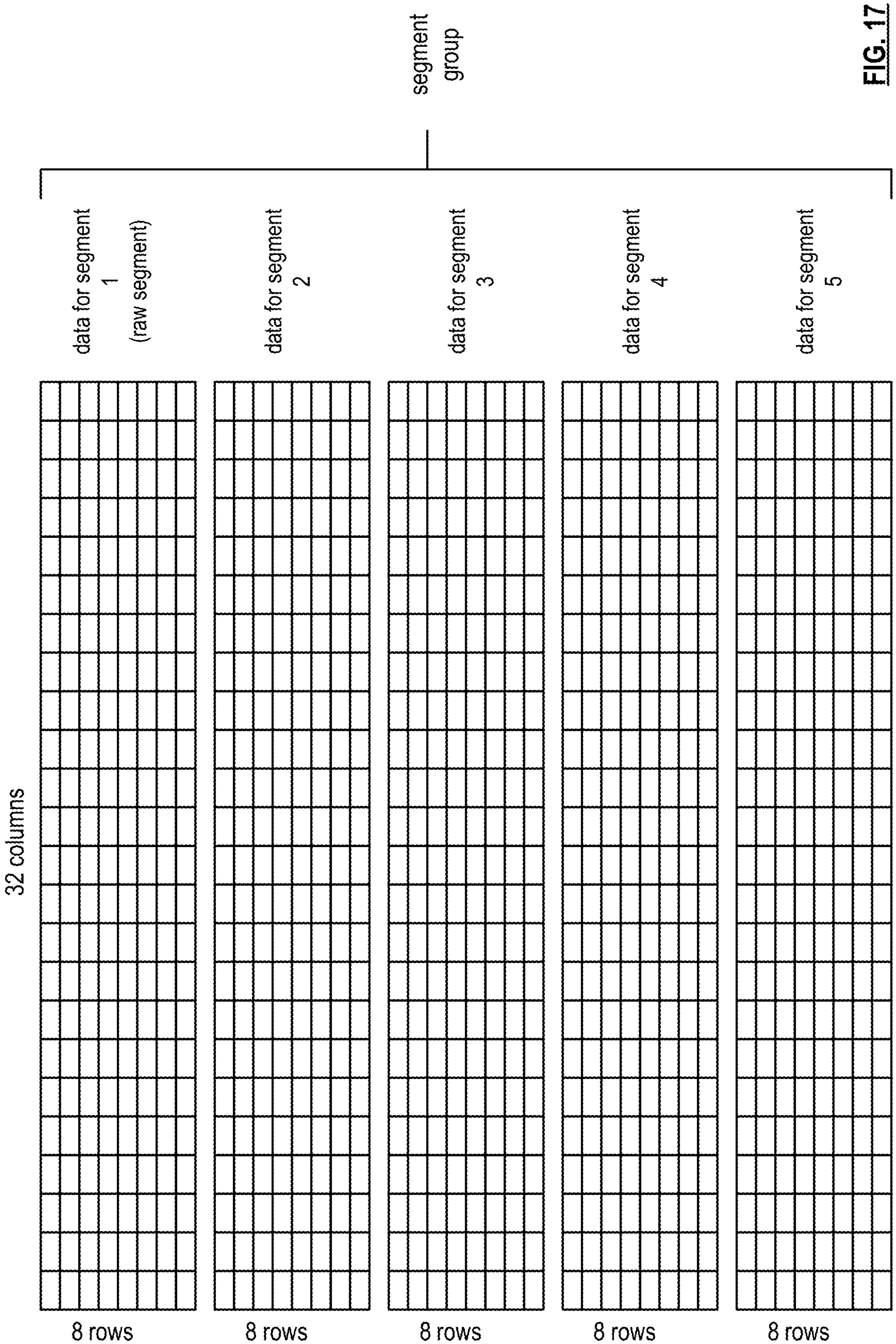

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figure 18:
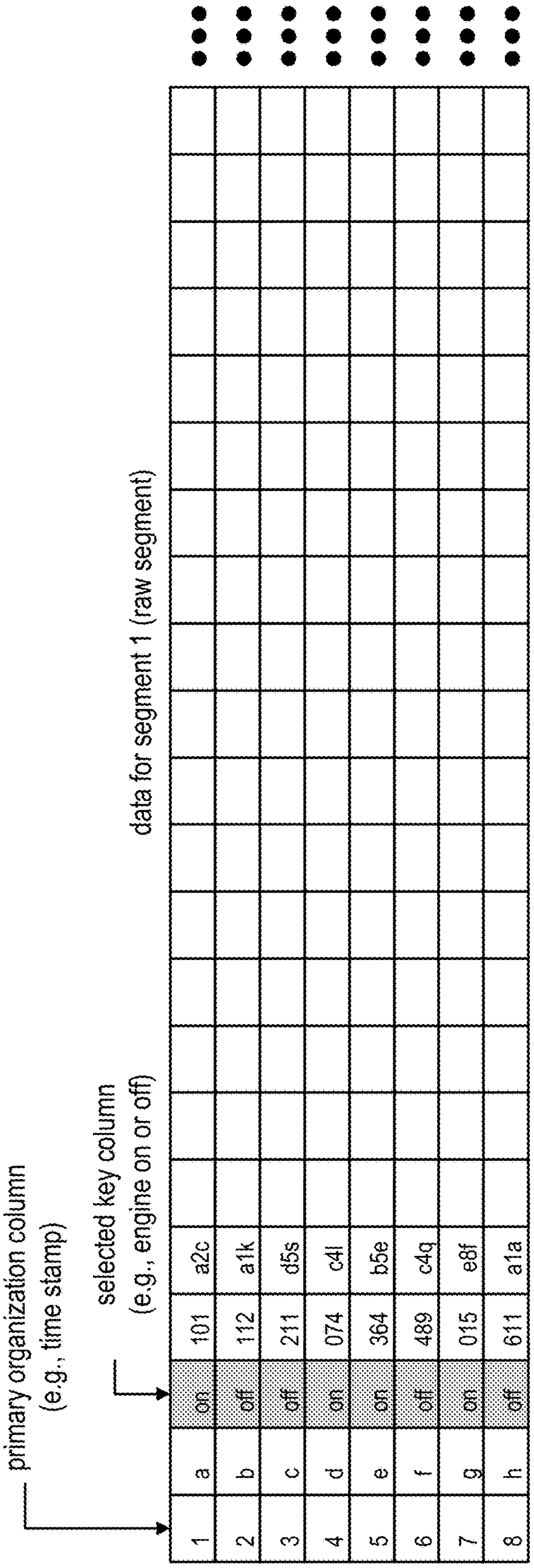

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

Figure 19:
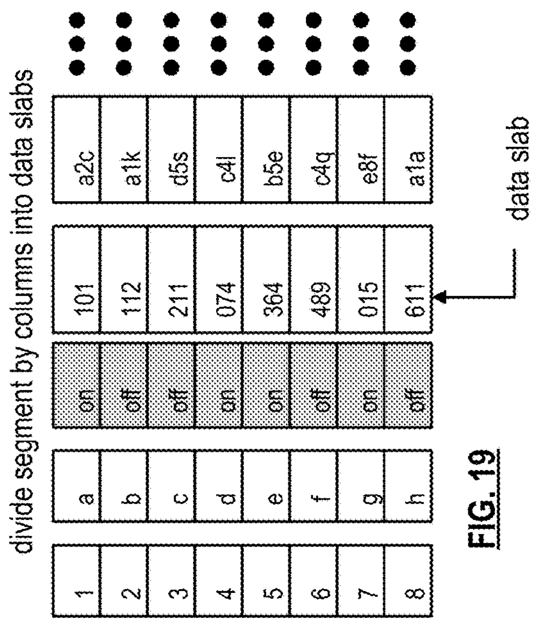

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

Figure 20:
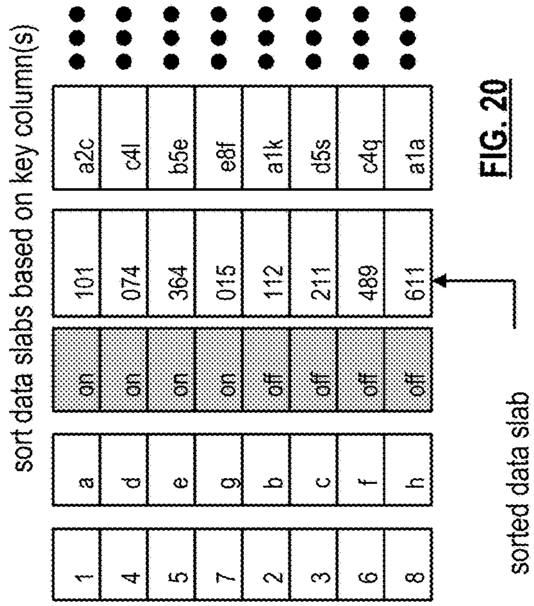

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
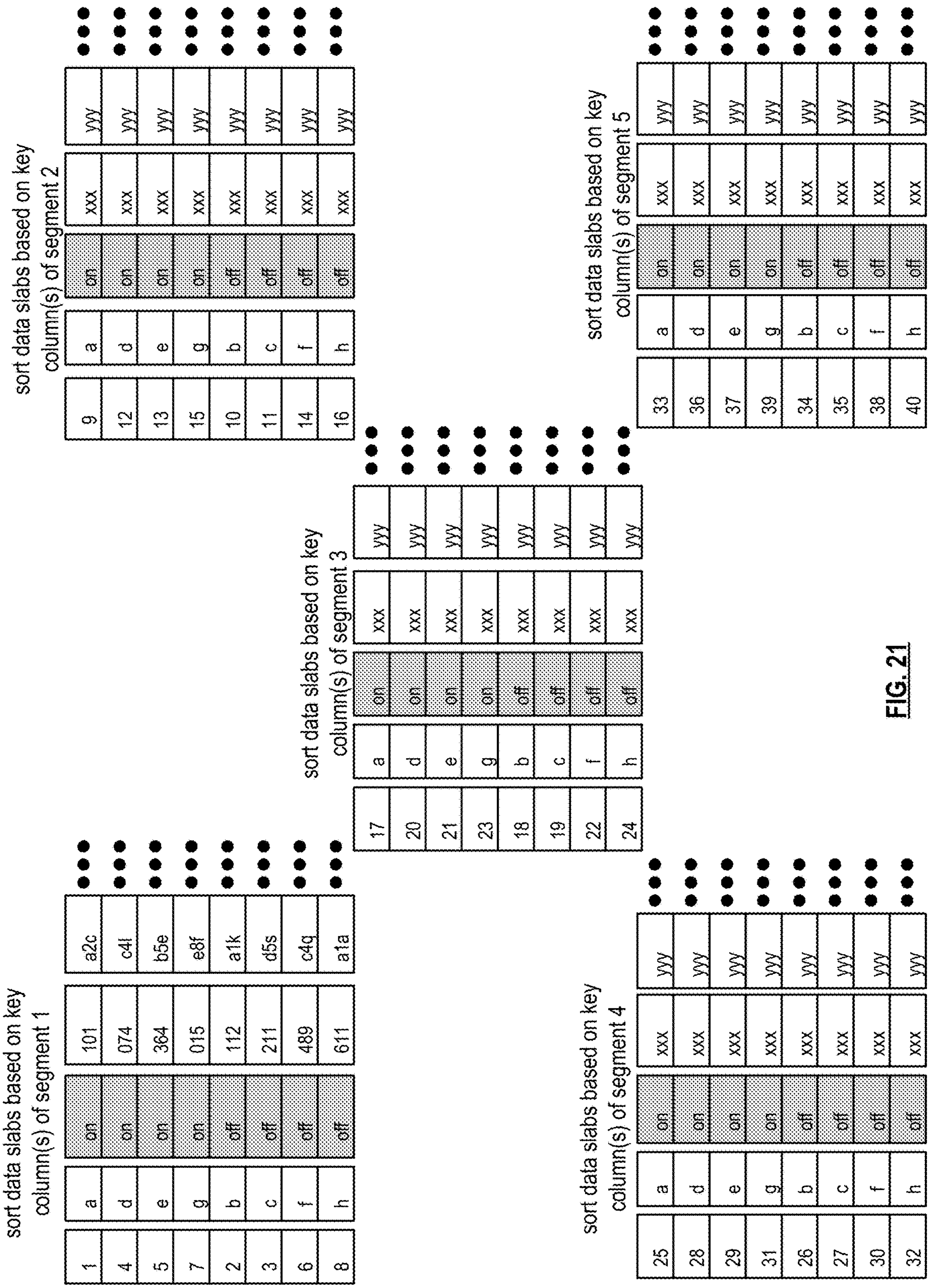

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
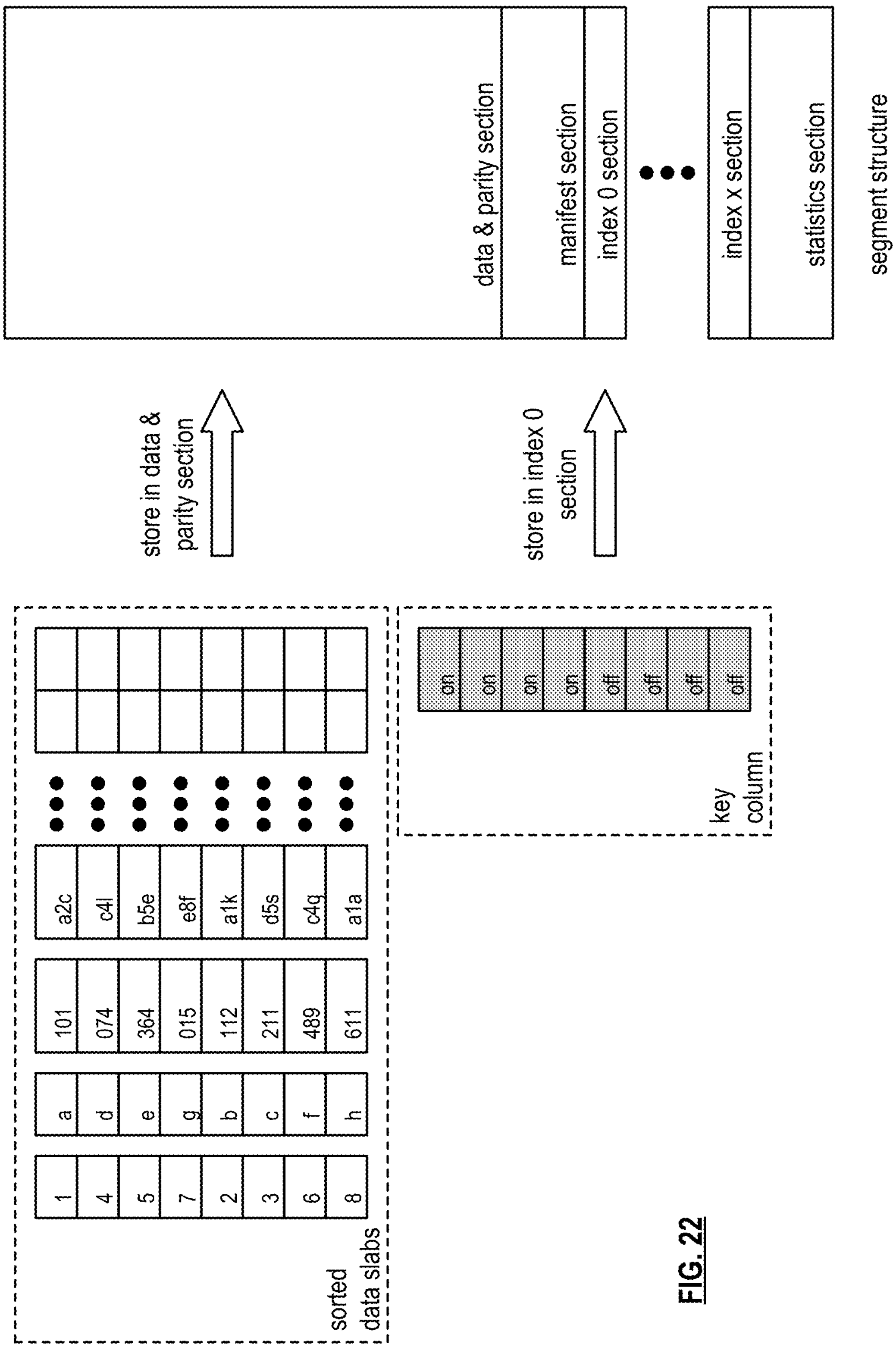

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
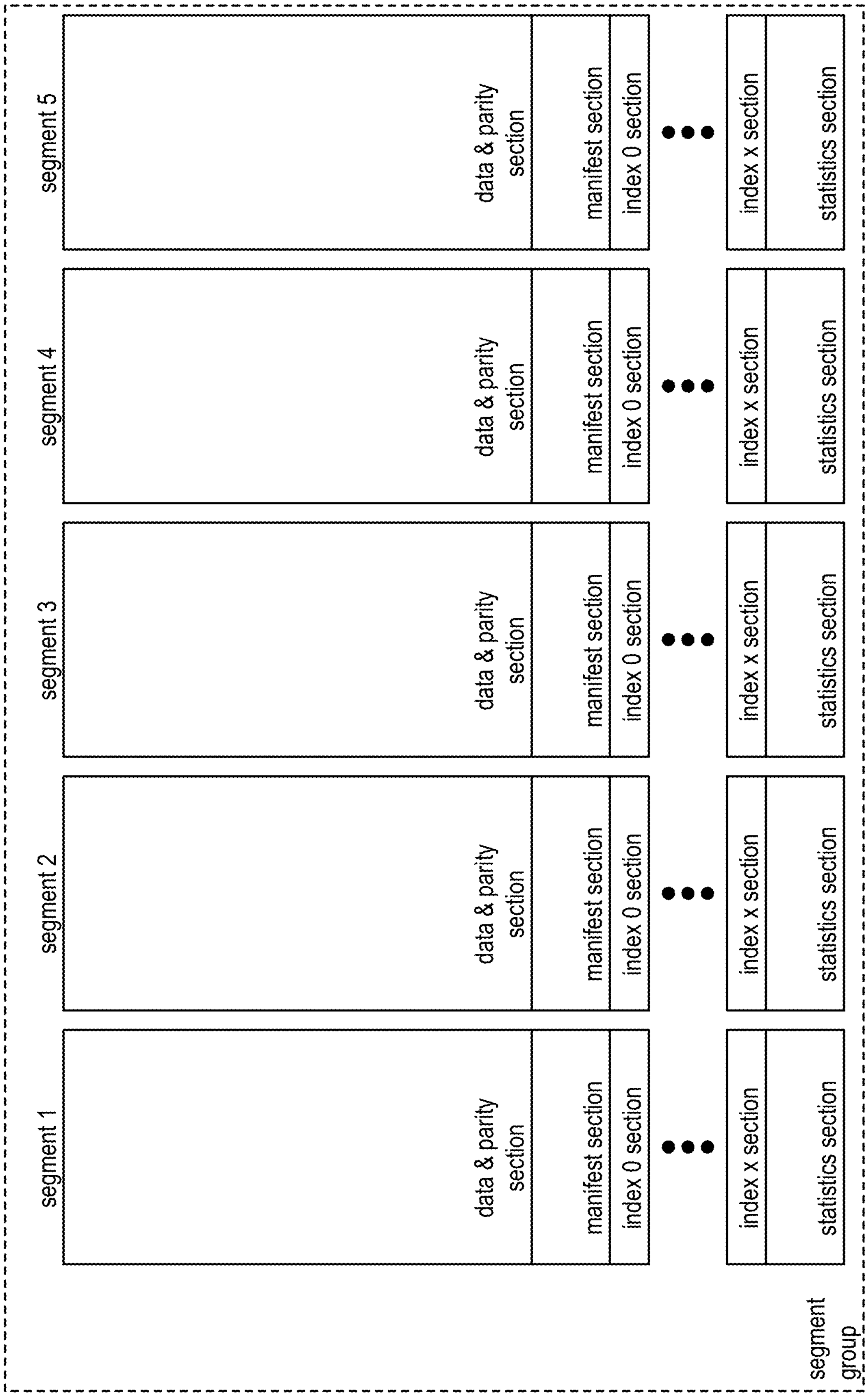

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
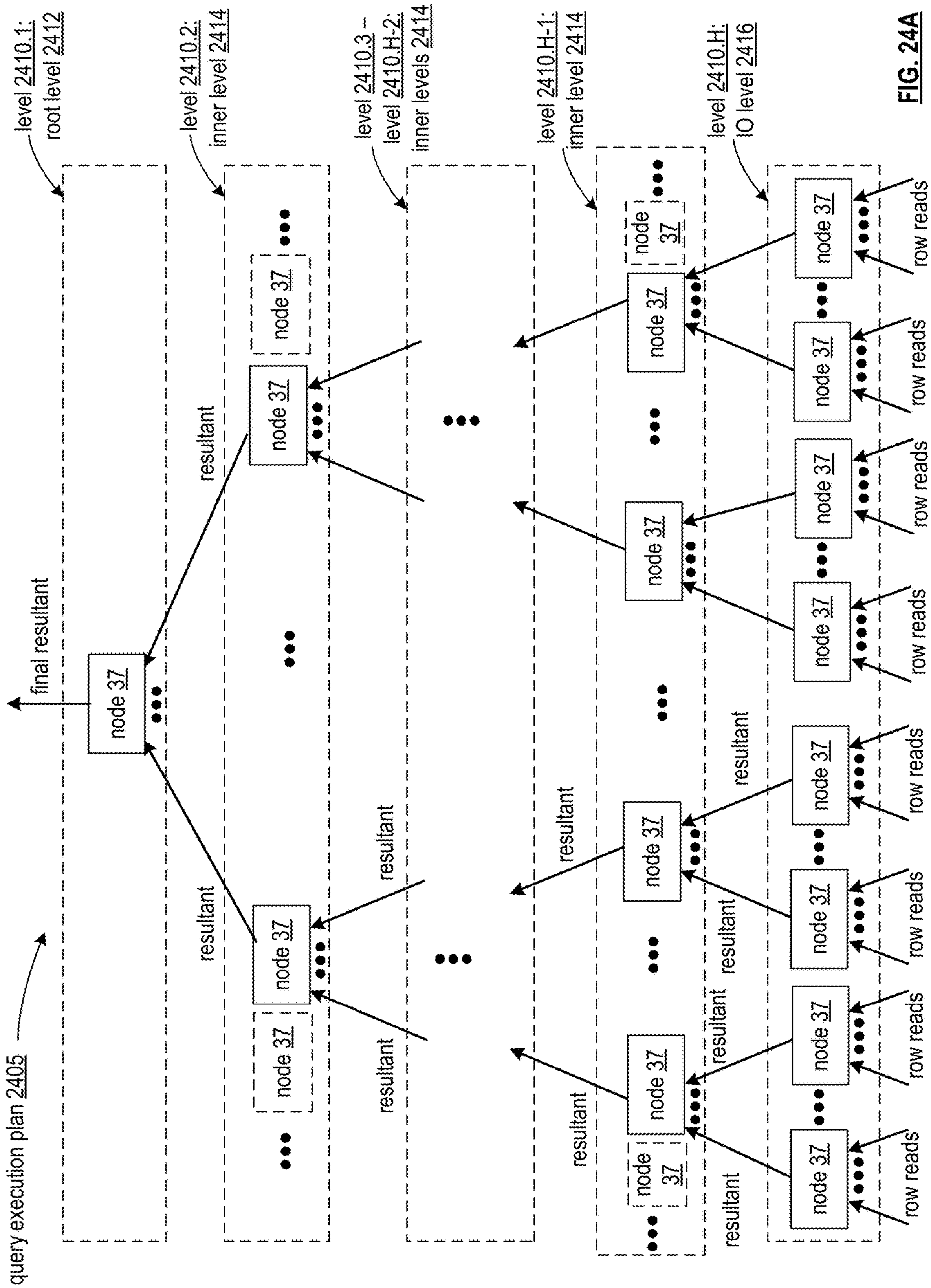
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H−1, and there are no other inner levels 2410.3-2410.H−2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H−1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H−1 includes at least one node from the IO level 2416 in the possible set of nodes. In such cases, while each selected node in level 2410.H−1 is depicted to process resultants sent from other nodes 37 in FIG. 24A, each selected node in level 2410.H−1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
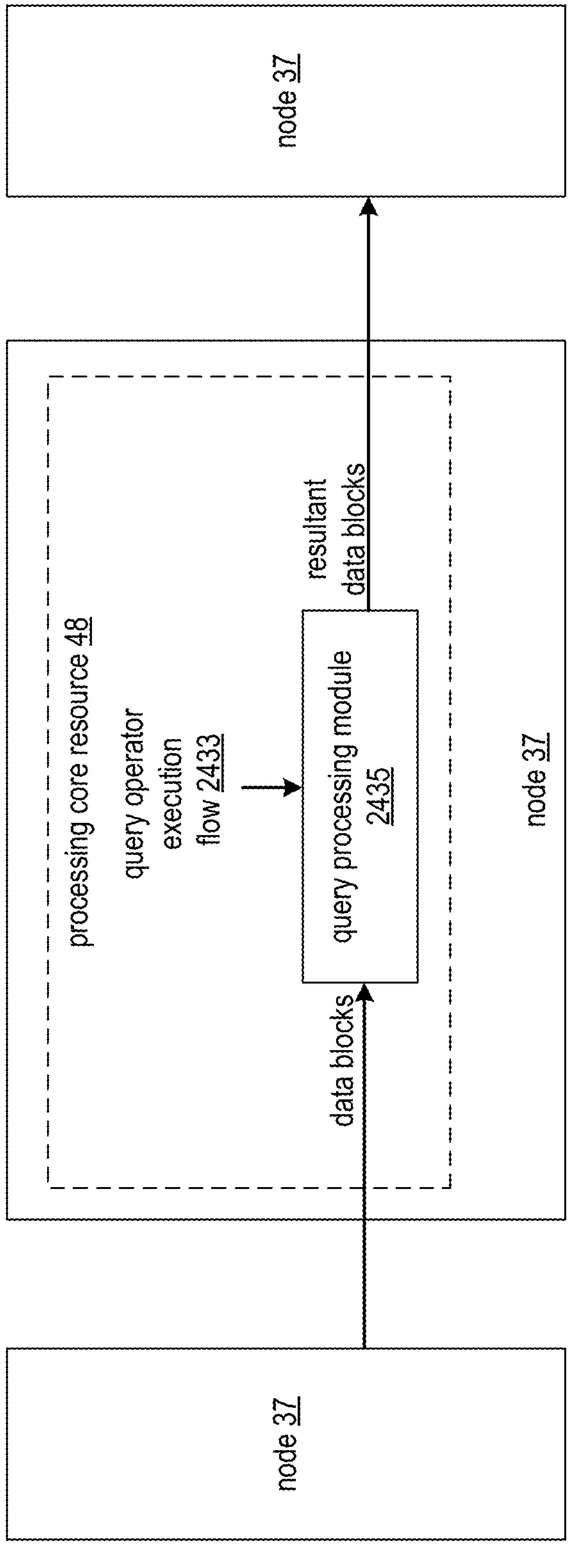
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices **18-1-18-*n*, for example, of the of the parallelized data store, retrieve, and/or process sub-system 12, and/or of the parallelized query and results sub-system 13**.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-*n* of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
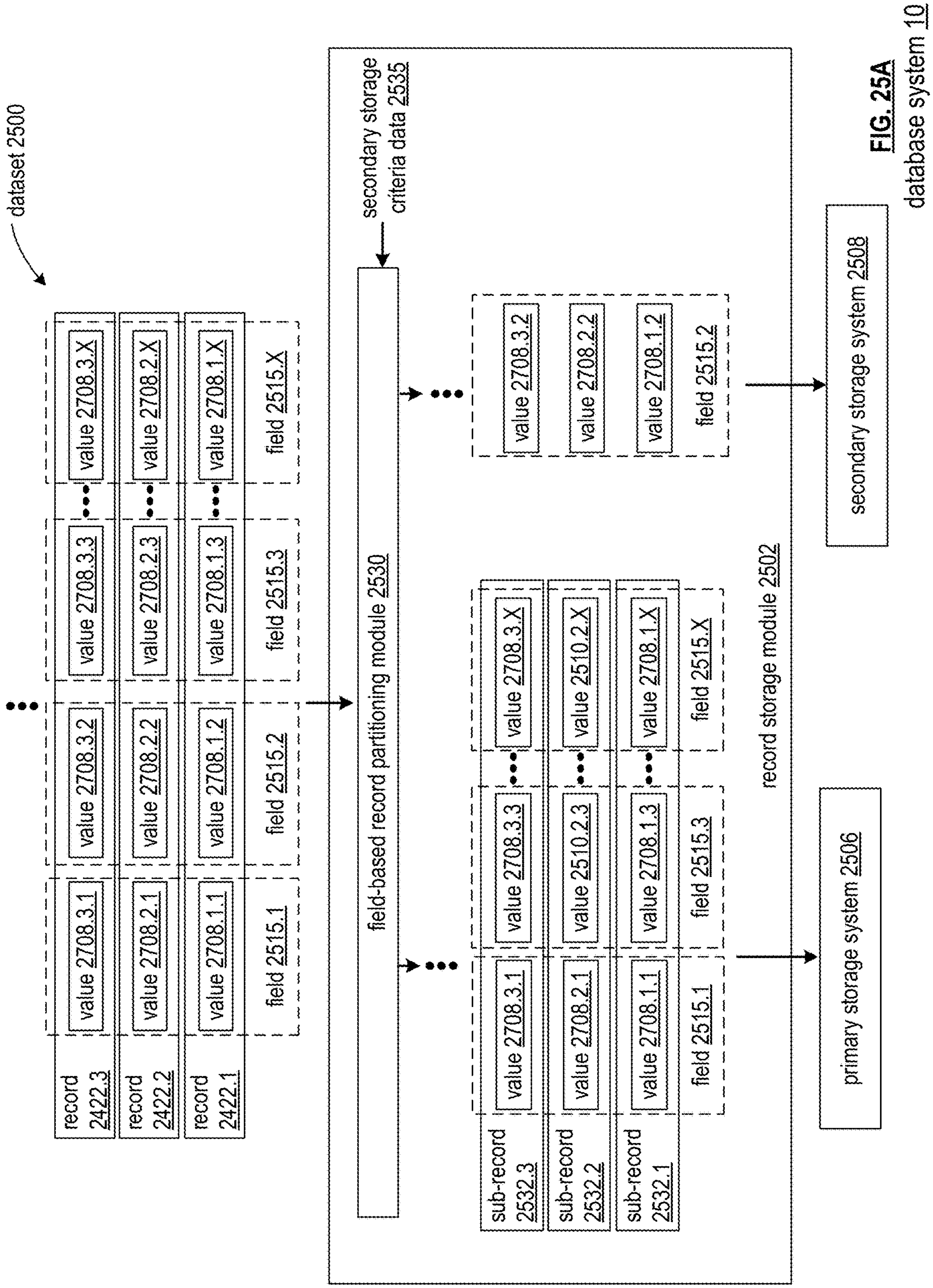
FIG. 25A is a schematic block diagram of a database system that stores records via a primary storage system and a secondary storage system by implementing a record storage module in accordance with various embodiments.
Figure 25B:
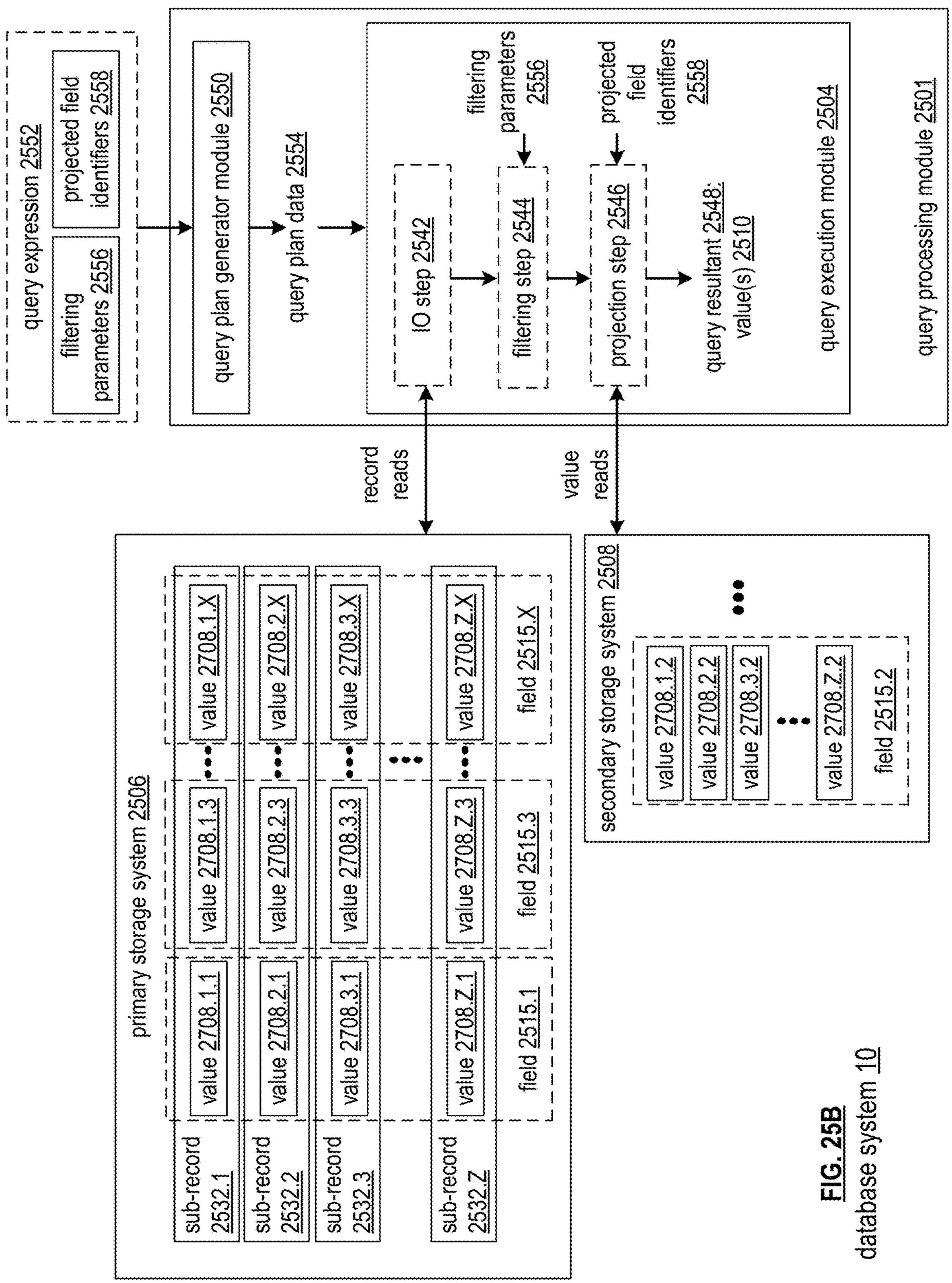
FIG. 25B-25D are schematic block diagrams of a database system that implements a query processing module that accesses the primary storage system and a secondary storage system in query execution in accordance with various embodiments.
Figure 25C:
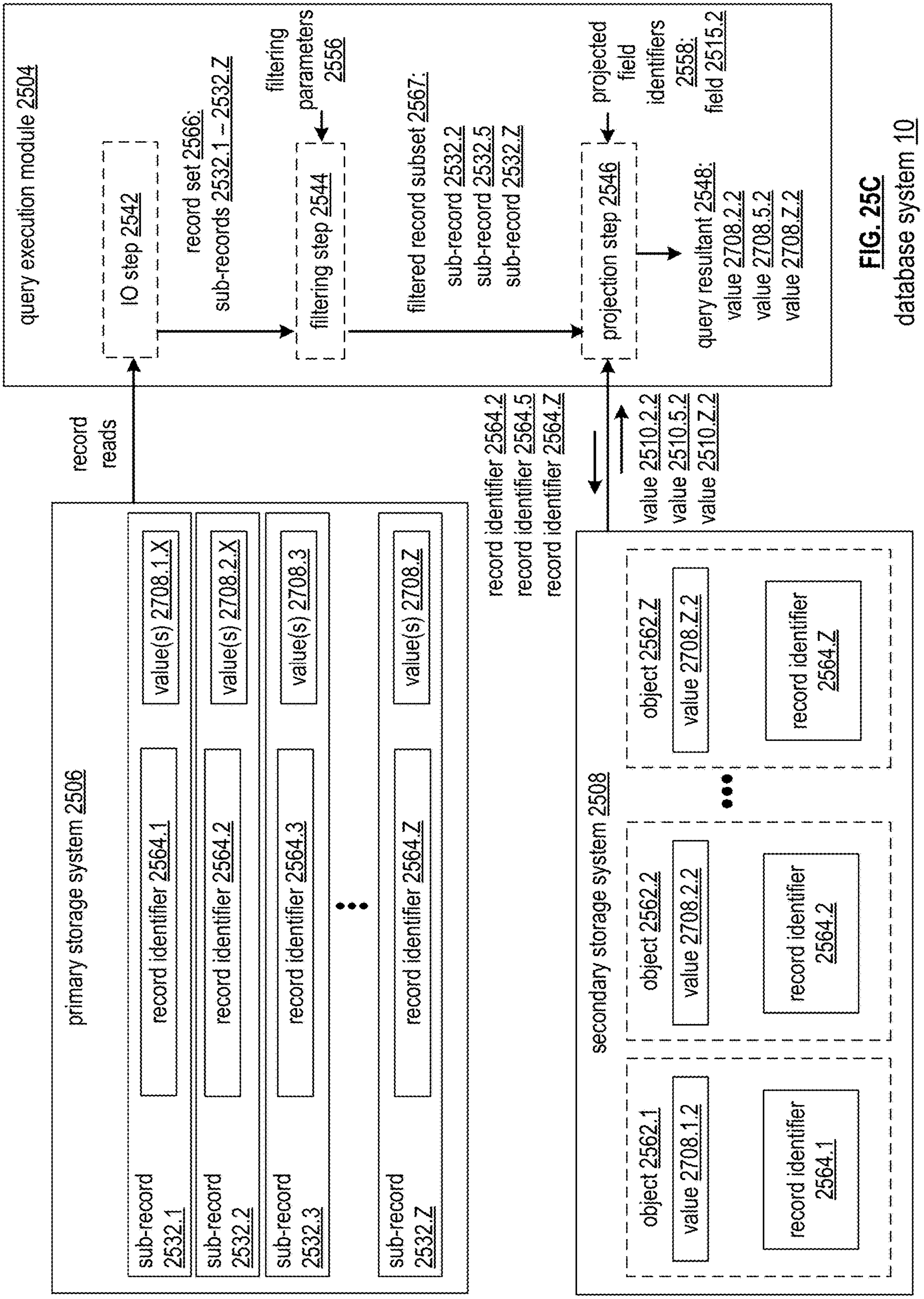

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
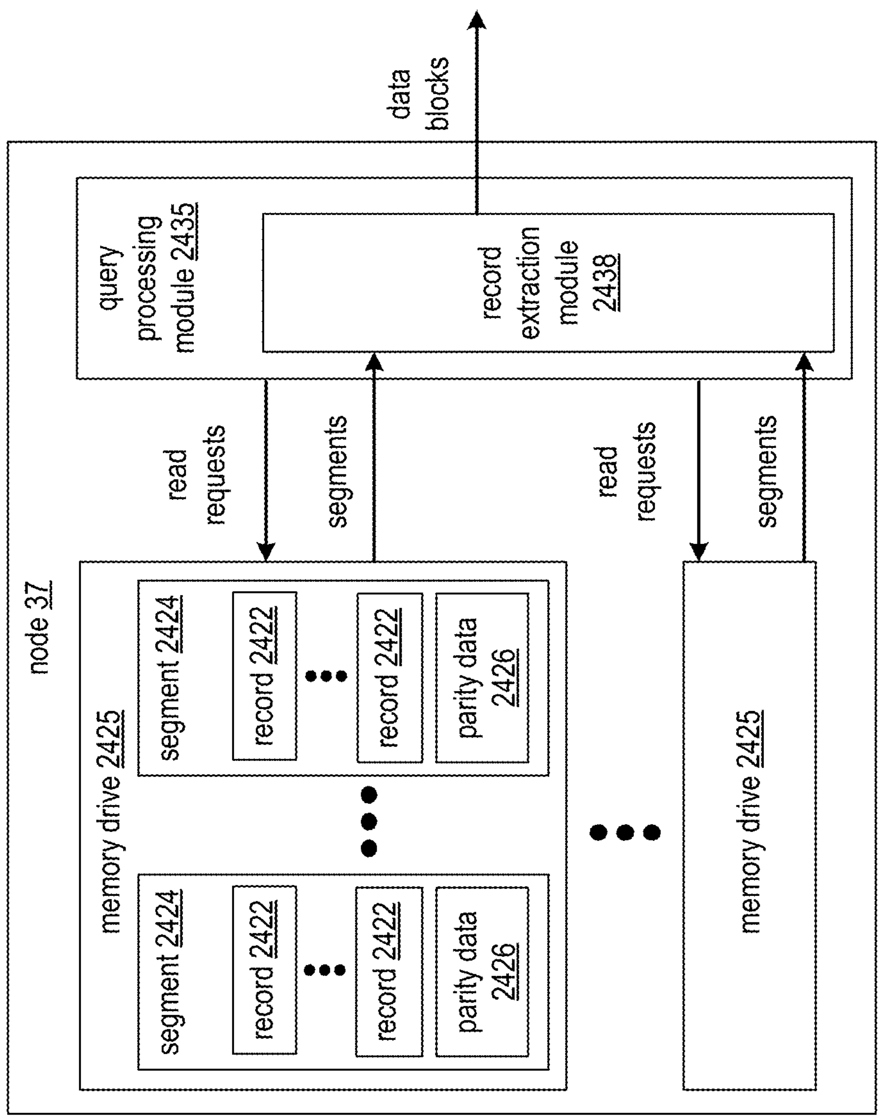
Figure 24D:
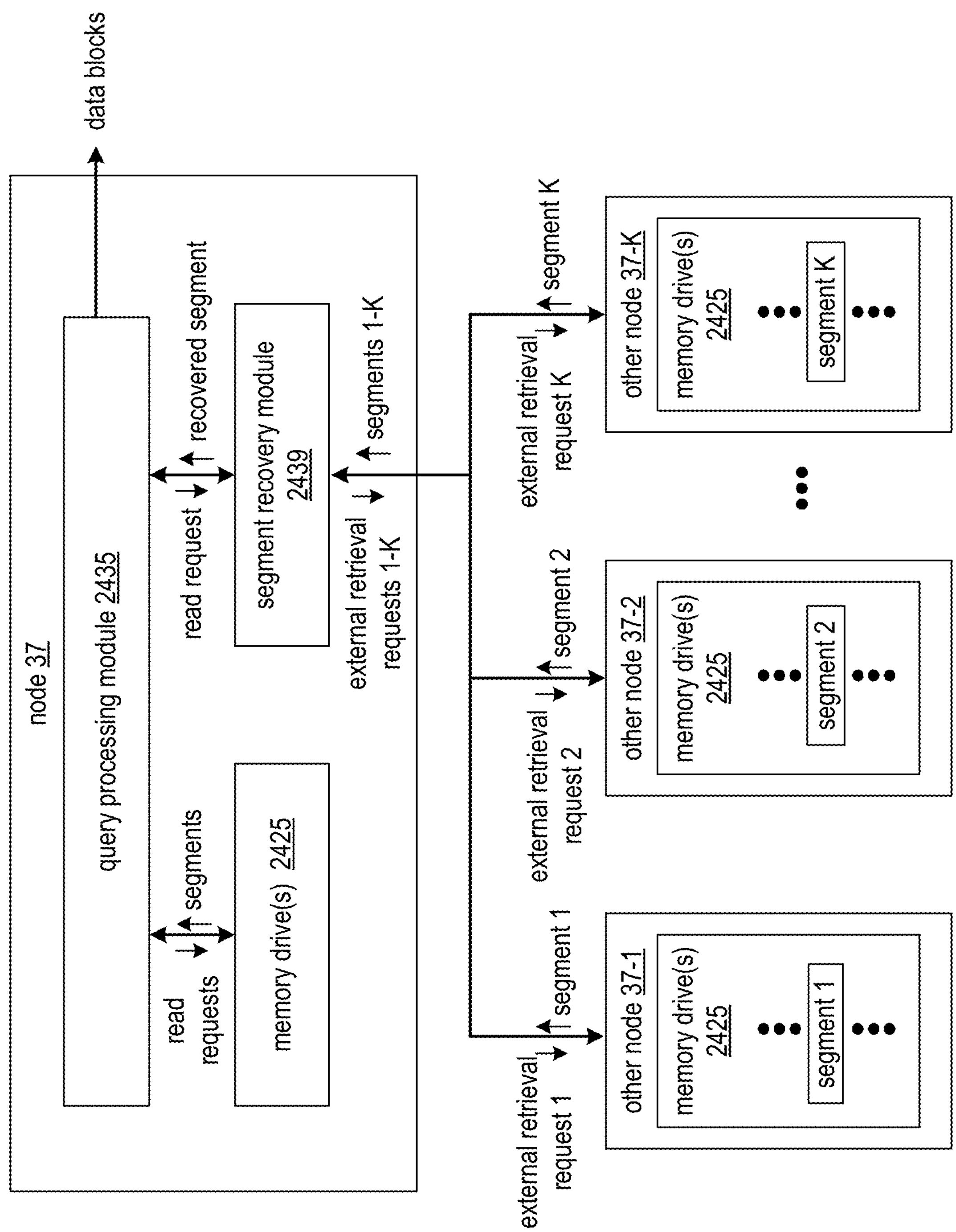

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. This can be achieved based on accessing parity data 2426 stored in segment 2424. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
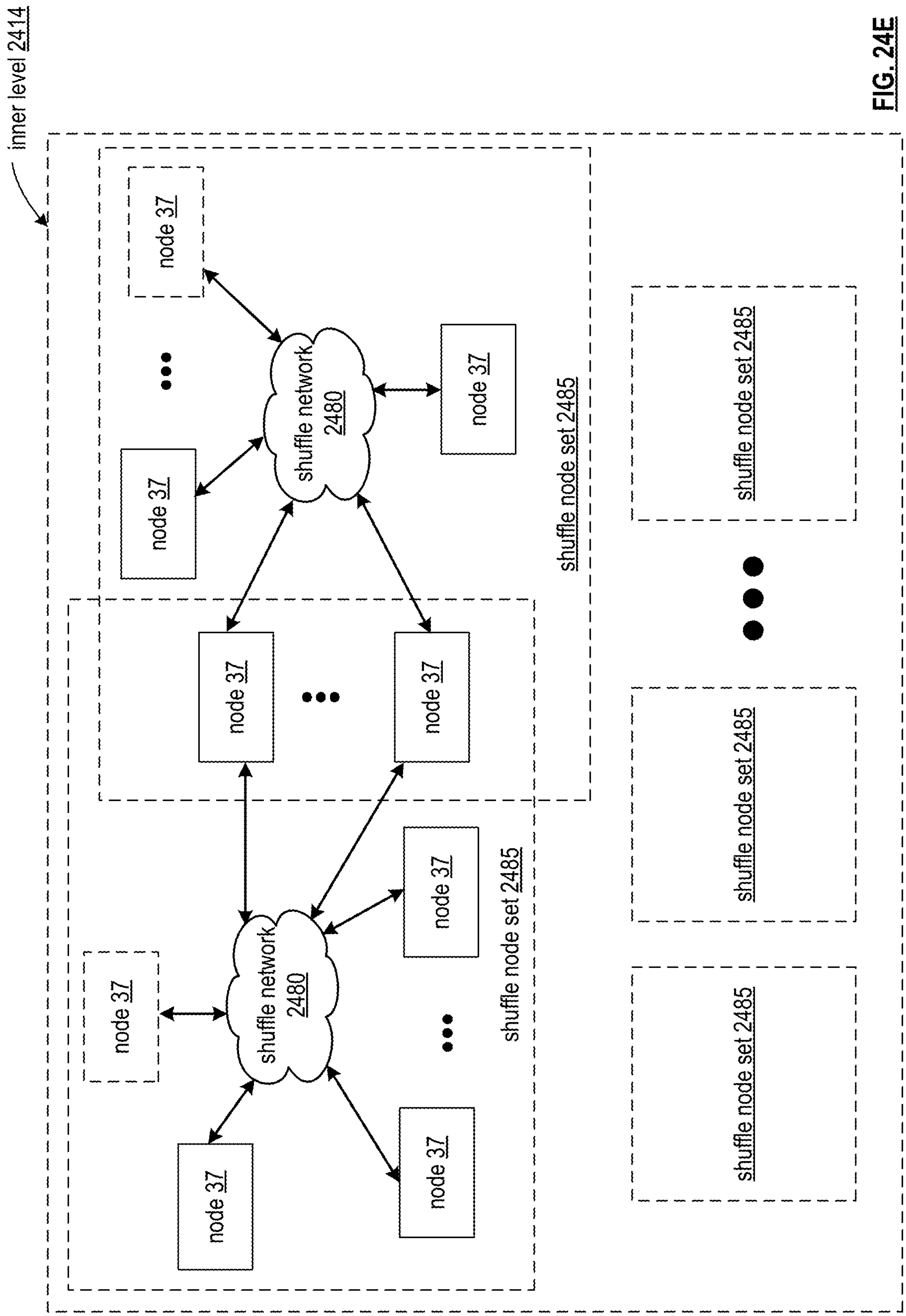
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were accessed in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set that do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
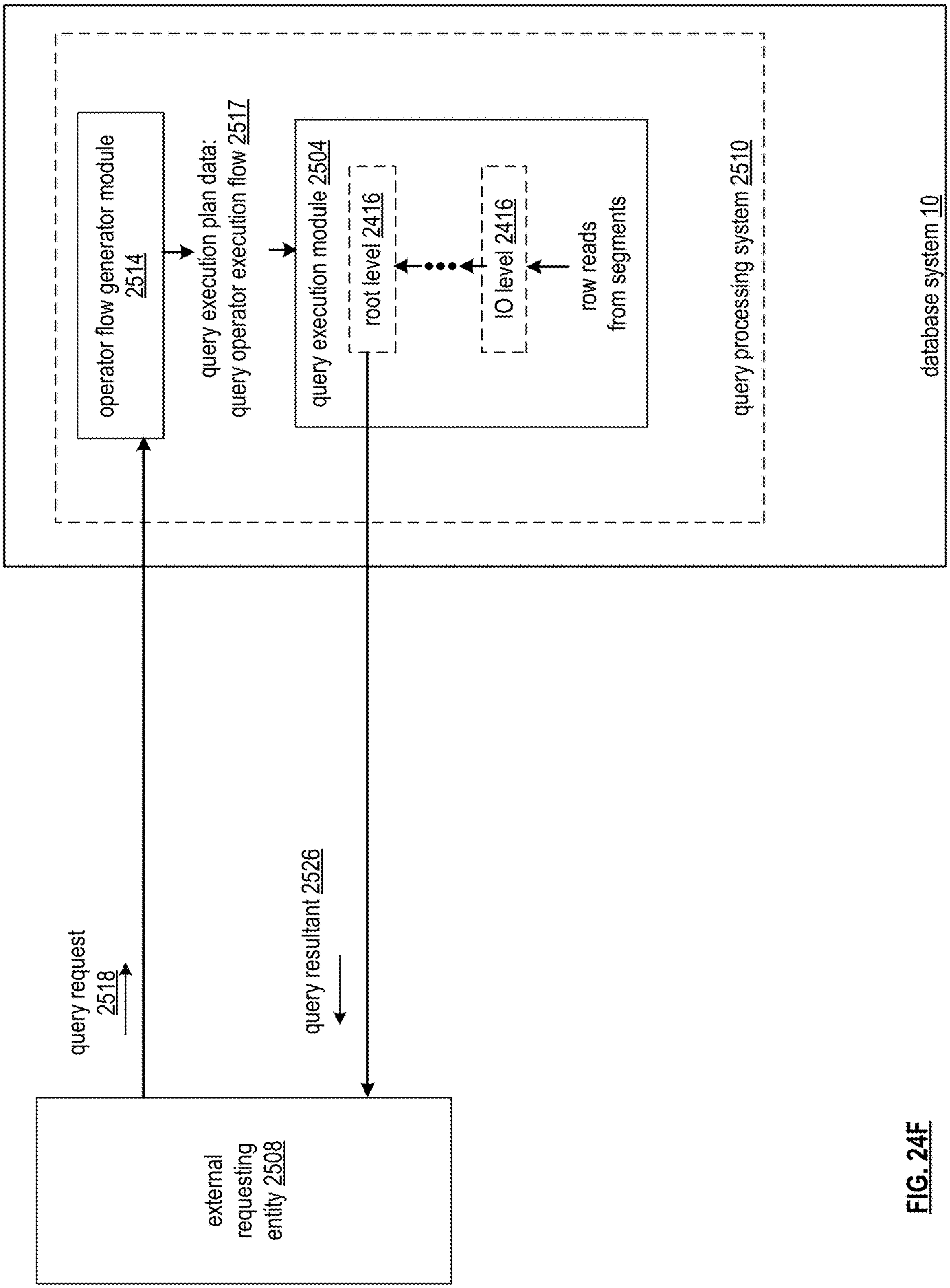
FIG. 24F is a schematic block diagram of a database system communicating with an external requesting entity in accordance with various embodiments.

FIG. 24F illustrates an embodiment of a database system that receives some or all query requests from one or more external requesting entities 2508. The external requesting entities 2508 can be implemented as a client device such as a personal computer and/or device, a server system, or other external system that generates and/or transmits query requests 2518. A query resultant 2526 can optionally be transmitted back to the same or different external requesting entity 2508. Some or all query requests processed by database system 10 as described herein can be received from external requesting entities 2508 and/or some or all query resultants generated via query executions described herein can be transmitted to external requesting entities 2508.

For example, a user types or otherwise indicates a query for execution via interaction with a computing device associated with and/or communicating with an external requesting entity. The computing device generates and transmits a corresponding query request 2518 for execution via the database system 10, where the corresponding query resultant 2526 is transmitted back to the computing device, for example, for storage by the computing device and/or for display to the corresponding user via a display device.

Figure 24G:
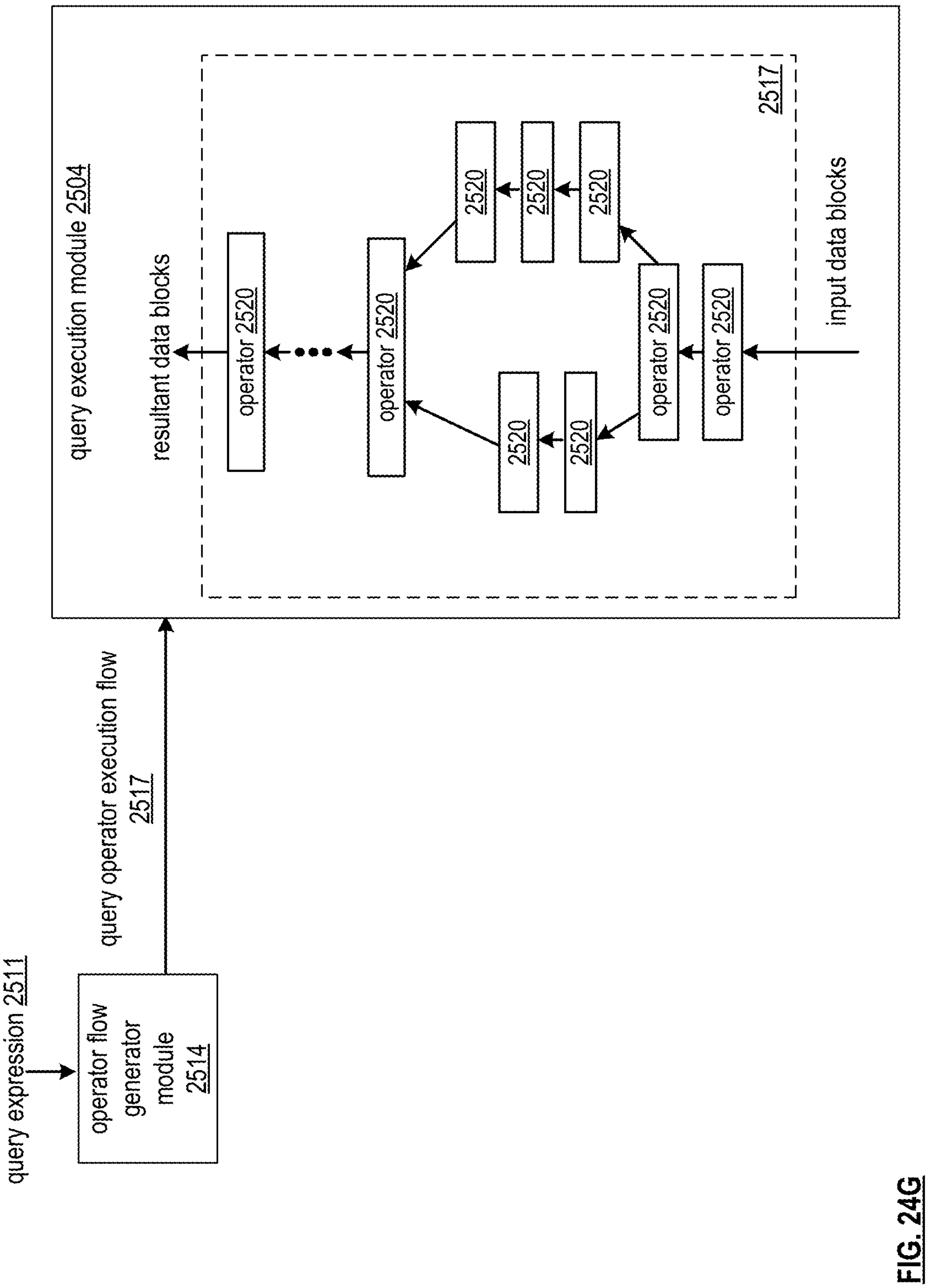
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Figure 24H:
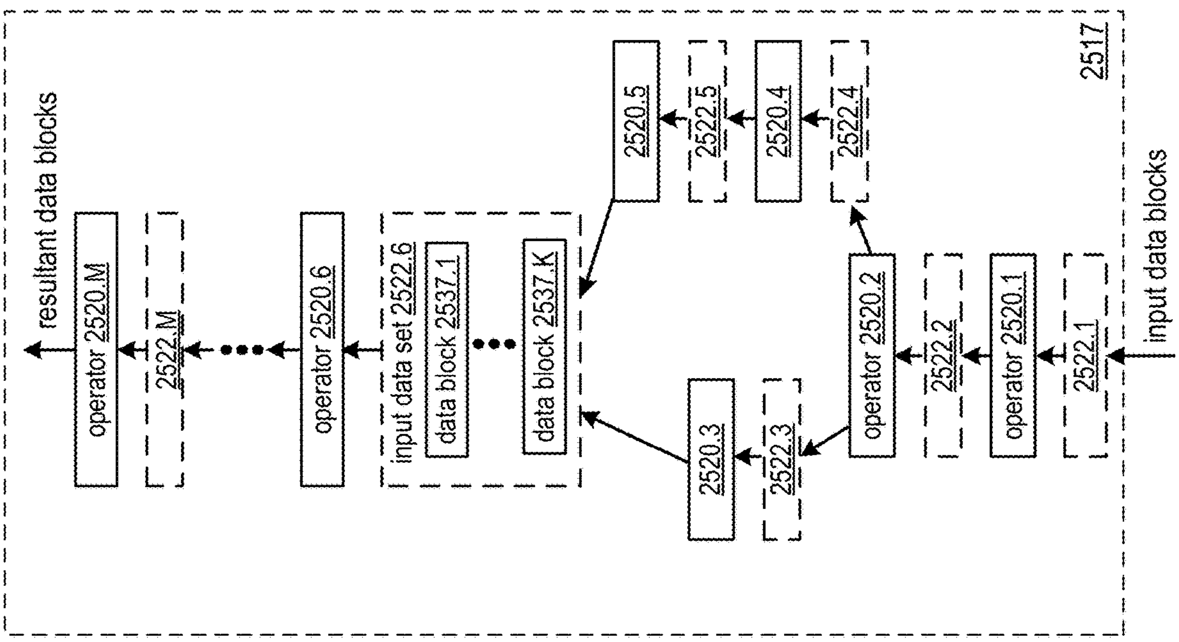
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.*i* this common query operator execution flow 2433 can be sent to the one or more other nodes 37 in a same shuffle node set as input data blocks to be added to the input data set 2522 the next operator 2520.*i*+1, with respect to the serialized ordering of the query of this common query operator execution flow 2433 of the one or more other nodes 37. For example, the output generated via a node's execution of a particular operator 2520.*i* is added input data set 2522 the next operator 2520.*i*+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

As used herein, a child operator of a given operator corresponds to an operator immediately before the given operator serially in a corresponding query operator execution flow and/or an operator from which the given operator receives input data blocks for processing in generating its own output data blocks. A given operator can have a single child operator or multiple child operators. A given operator optionally has no child operators based on being an IO operator and/or otherwise being a bottommost and/or first operator in the corresponding serialized ordering of the query operator execution flow. A child operator can implement any operator 2520 described herein.

A given operator and one or more of the given operator's child operators can be executed by a same node 37 of a given node 37. Alternatively or in addition, one or more child operators can be executed by one or more different nodes 37 from a given node 37 executing the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow, and/or an operator from which the given operator receives input data blocks for processing in generating its own output data blocks. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator. A parent operator can implement any operator 2520 described herein.

A given operator and one or more of the given operator's parent operators can be executed by a same node 37 of a given node 37. Alternatively or in addition, one or more parent operators can be executed by one or more different nodes 37 from a given node 37 executing the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more shuffle operators of a shuffle operation. For example, a set of lateral operators are implemented via corresponding plurality of parallel processes 2550, for example, of a join process or other operation, to facilitate transfer of data such as right input rows received for processing between these operators. As another example, data is optionally transferred between lateral network operators via a corresponding shuffle and/or broadcast operation, for example, to communicate right input rows of a right input row set of a join operation to ensure all operators have a full set of right input rows.

A given operator and one or more lateral network operators lateral with the given operator can be executed by a same node 37 of a given node 37. Alternatively or in addition, one or lateral network operators can be executed by one or more different nodes 37 from a given node 37 executing the given operator lateral with the one or more lateral network operators. For example, different lateral network operators are executed via different nodes 37 in a same shuffle node set 37.

Figure 24I:
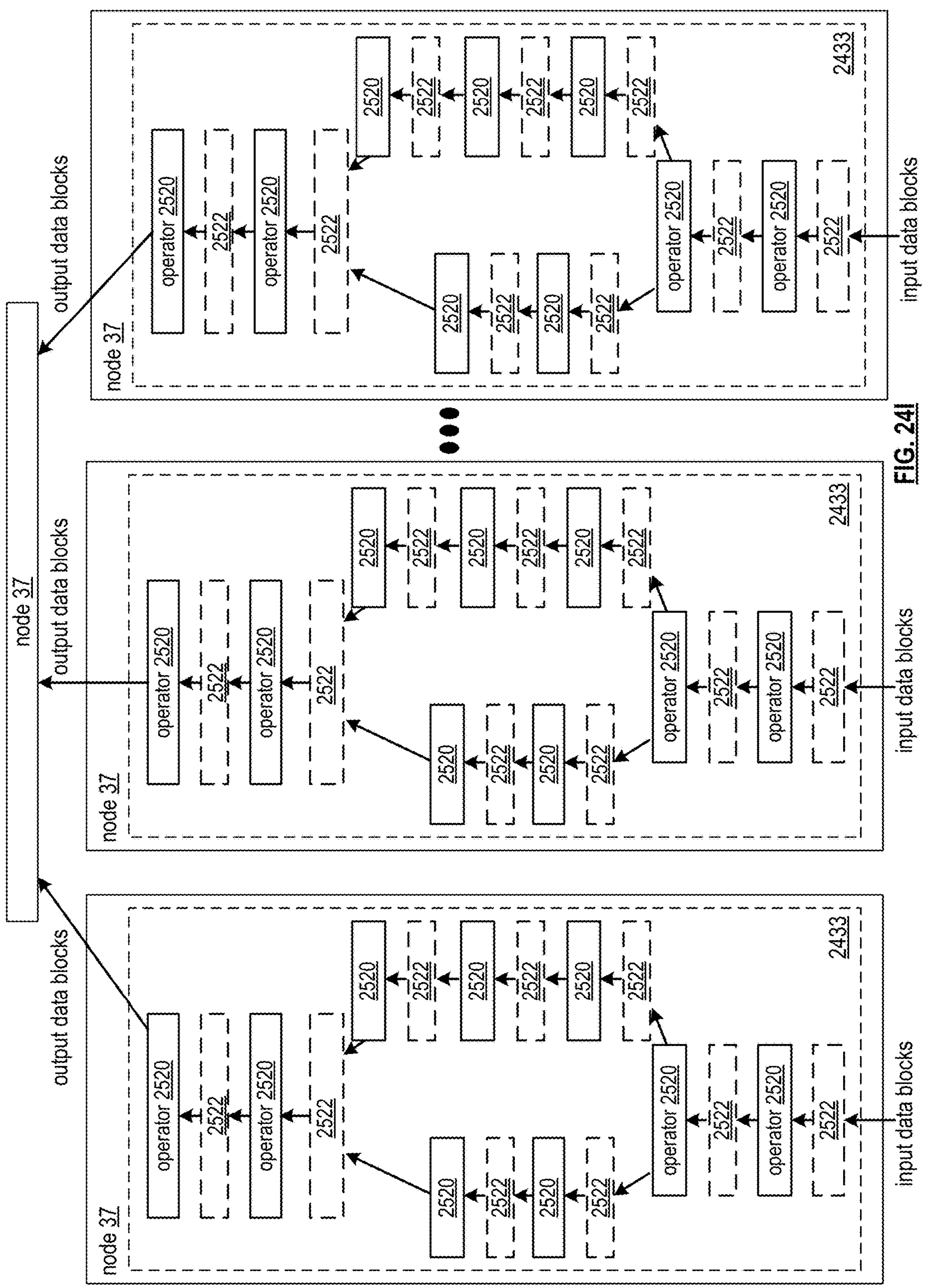
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
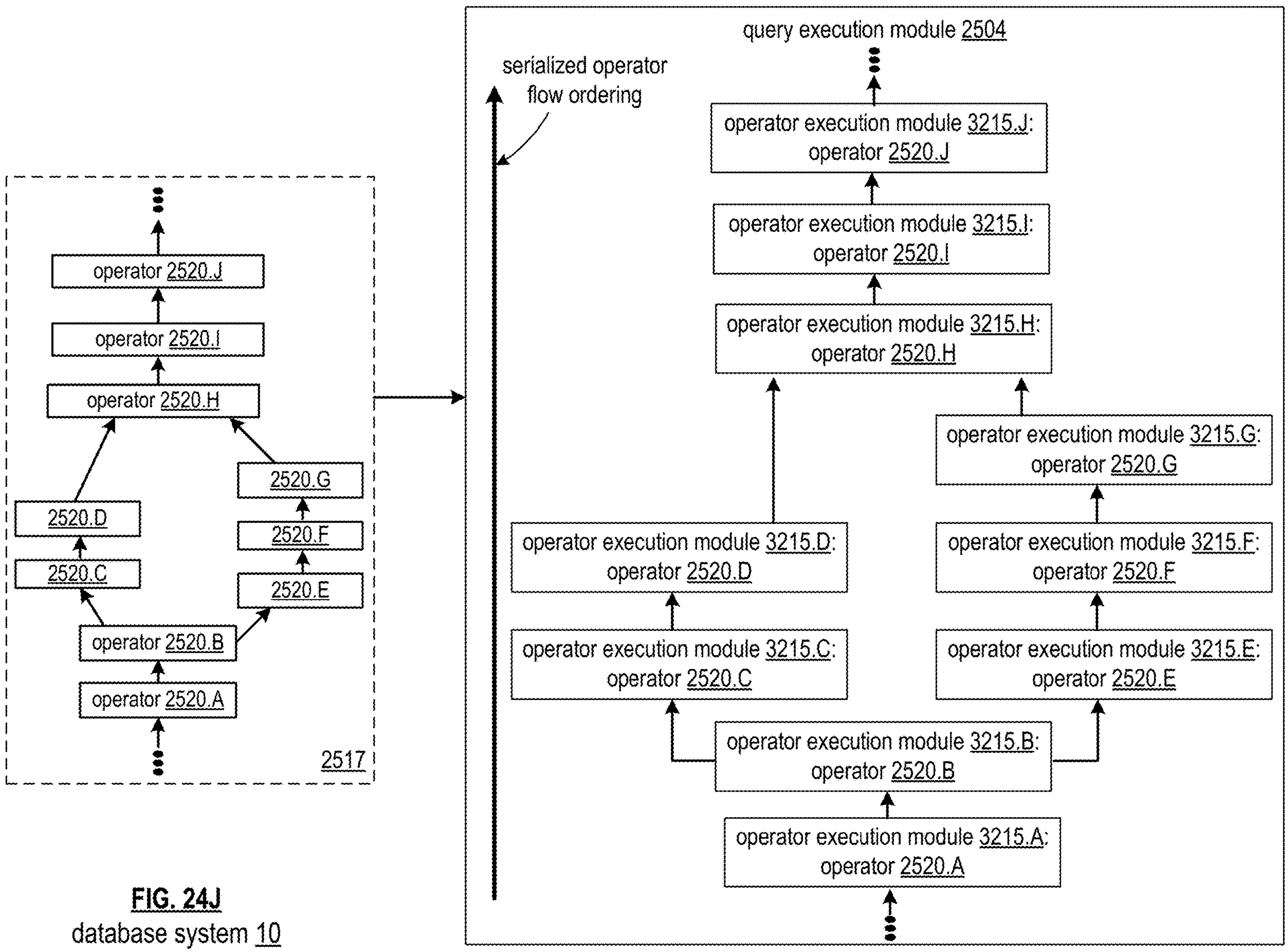
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 32A can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
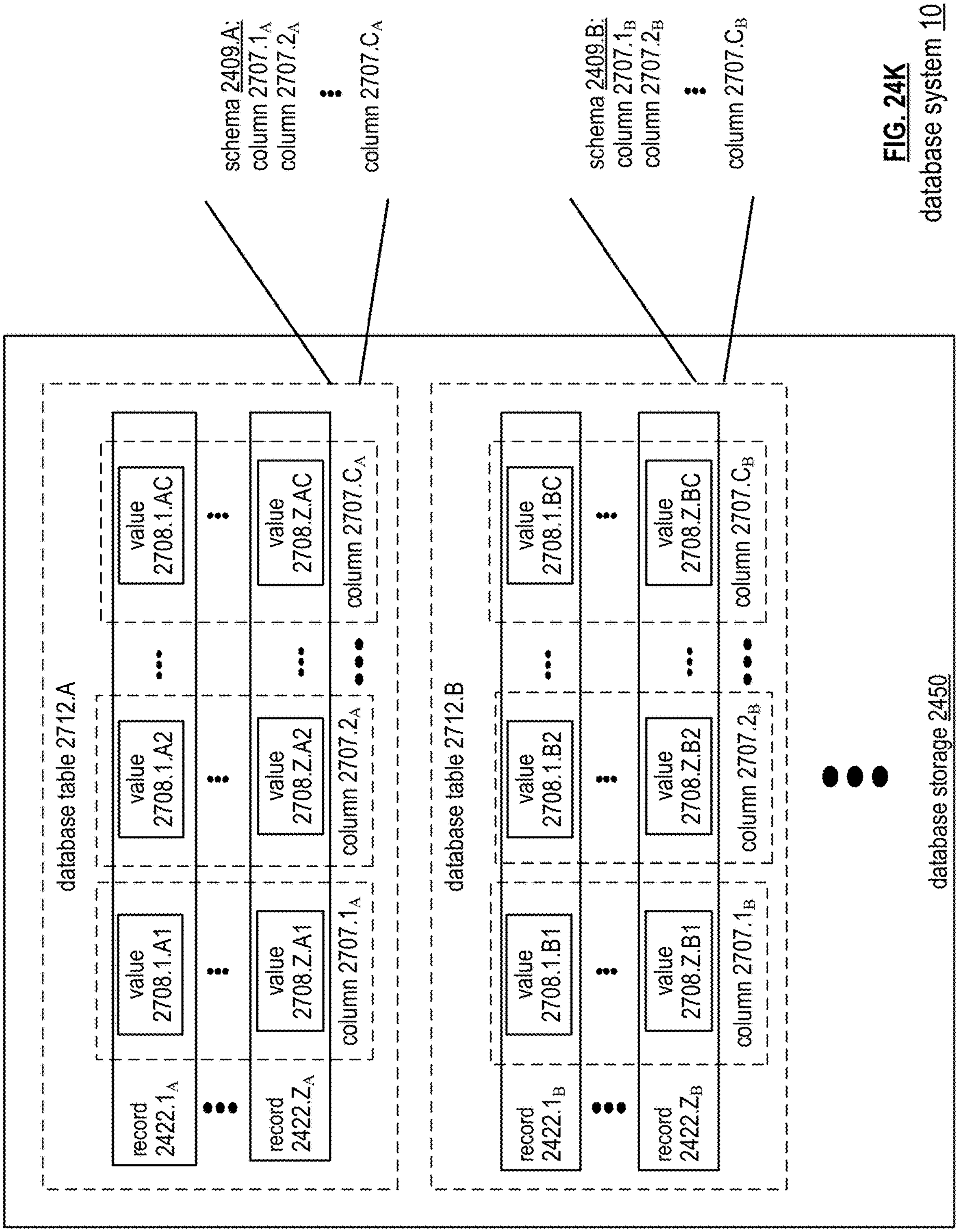
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns 2707.$1_A$-2707.$C_A$ of schema 2709.A for database table 2712.A can have a different number of columns than and/or can have different datatypes for some or all columns of the set of columns 2707.$1_B$-2707.$C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
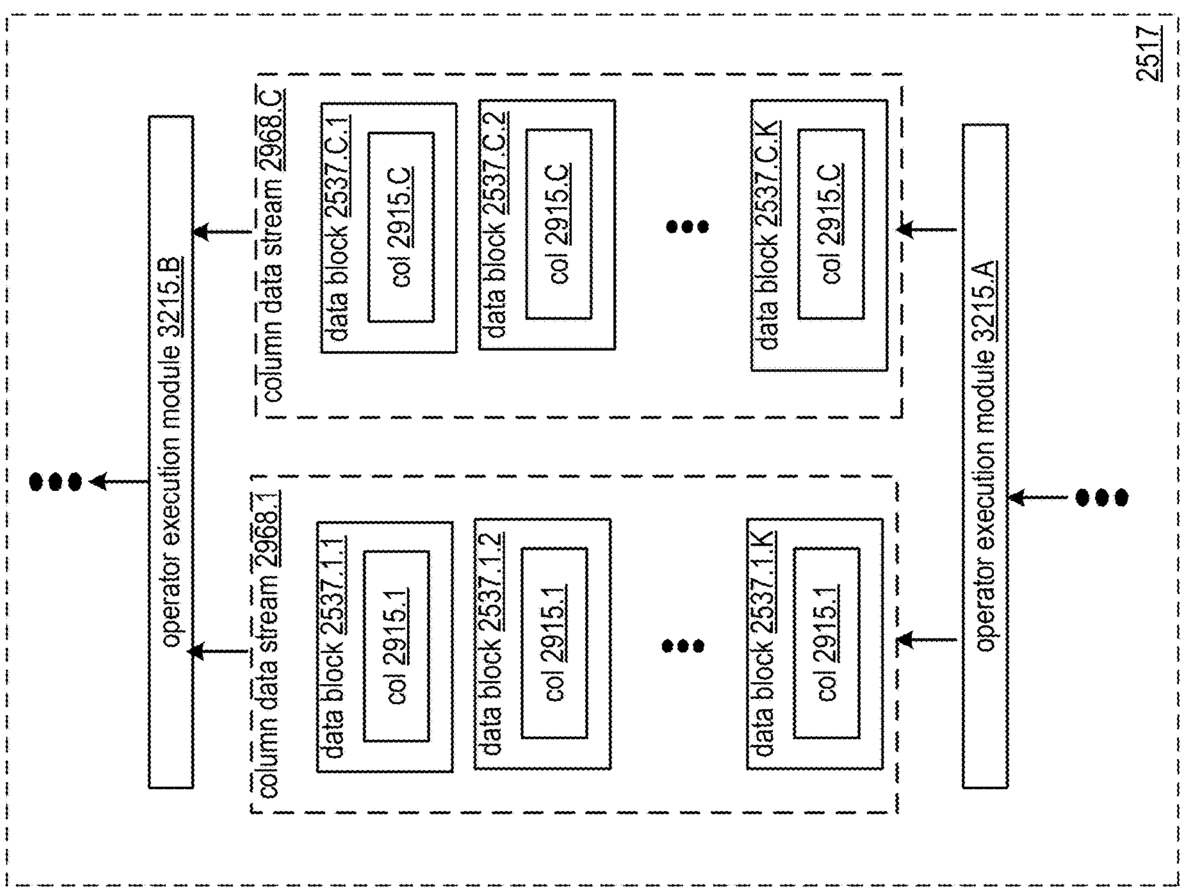
FIG. 24L is a schematic block diagram of a query execution module that implements a plurality of column data streams in accordance with various embodiments.
Figure 24M:
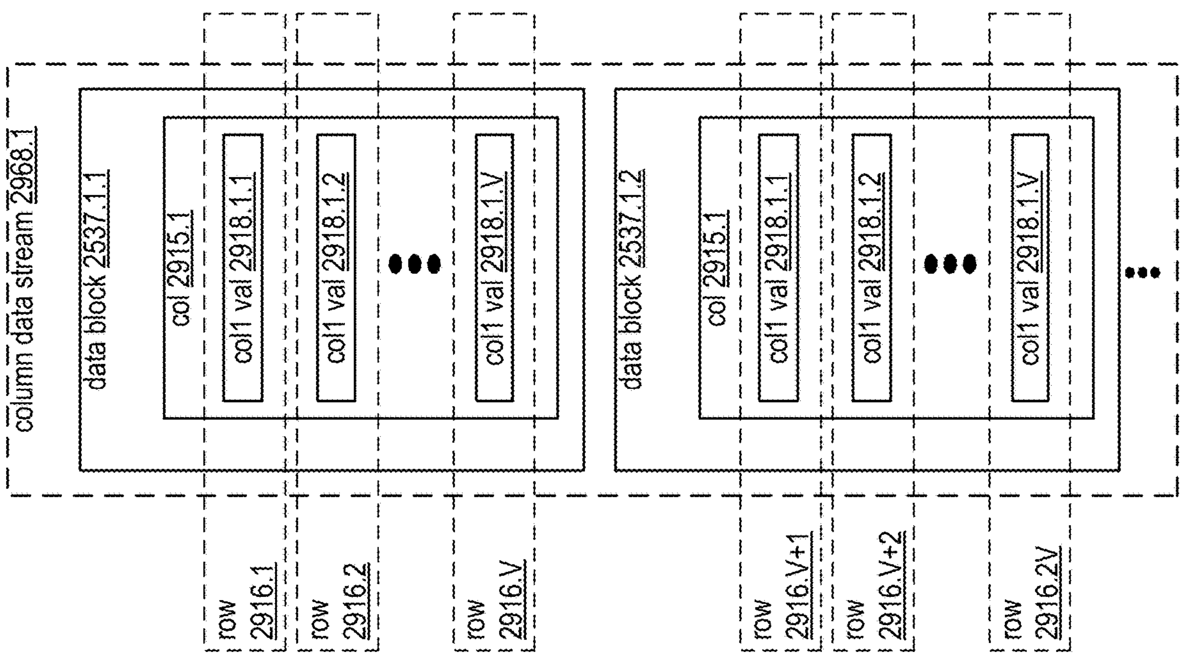
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
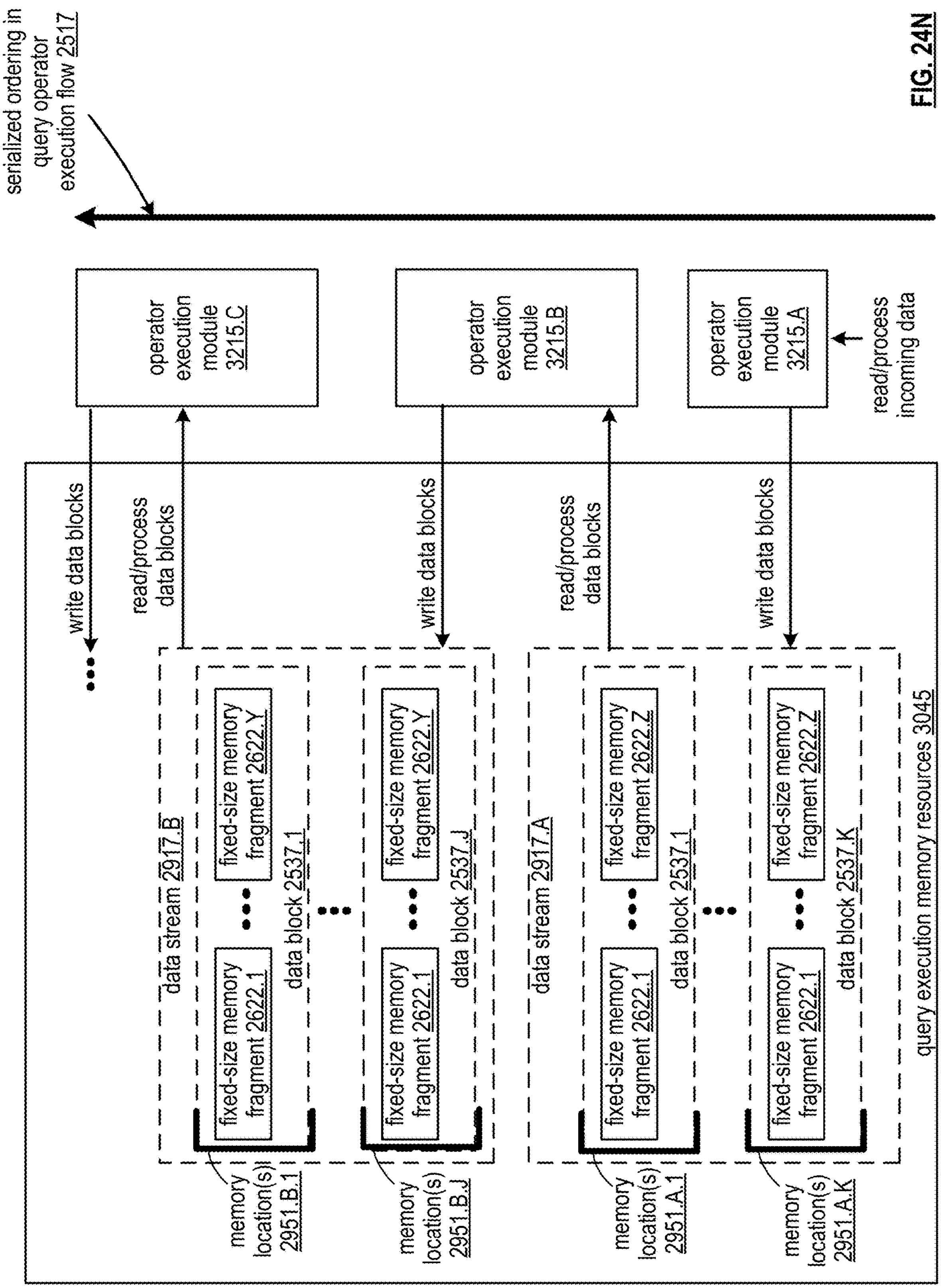
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations to filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

FIGS. 25A-25G present embodiments of a database system 10 that stores records, such as records 2422, rows of a database table, and/or other records of one or more data sets via multiple storage mechanisms. In particular, different fields of records in a given dataset, such as particular columns of a database table, can be stored via different storage mechanisms. Some or all features and/or functionality of the database system 10 discussed in conjunction with FIGS. 25A-25G can be utilized to implement any embodiment of database system 10 discussed herein.

Storing different fields via different storage mechanisms in this fashion can be particularly useful for datasets stored by database system 10 that have large binary data and/or string data populating one or more fields. For example, a field of a set of records in dataset can be designated to and/or large files such as multimedia files and/or extensive text. This data is often only required for projections in query execution, for example, where access to this data is not required in evaluating query predicates or other filtering parameters. Rather than storing this data via the same resources and/or mechanism utilized for storage of other fields of the dataset, such as fields corresponding to structured data and/or data utilized in query predicates to filter records in query execution to render a query resultant, this large and/or unstructured data can be stored via different resources and/or via a different mechanism. As a particular example, the large and/or unstructured data can be stored as objects via an object storage system that is implemented by memory resources of the database system 10 and/or that is implemented via a third party service communicating with the database system 10 via at least one wired and/or wireless network, such as one or more external networks 17.

By storing the large data of particular data fields separately, this data can be accessed separately from the remainder of records in query execution, for example, only when it is needed. Furthermore, the large data can be stored in a more efficient manner than in column-formatted segments with the remainder of fields of records, for example, as discussed in conjunction with FIGS. 15-23. In particular, the memory resources of nodes 37 that retrieve records during IO in query execution, such as memory drives 2425 of nodes 37 as illustrated in FIG. 24C, can be alleviated from the task of storing these large data fields that aren't necessary in IO and/or filtering in the query.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Storing and accessing different fields via different storage mechanisms based on size and/or data type of different fields in this fashion as presented in FIGS. 25A-25G improves the technology of database systems by increasing query processing efficiency, for example, to improve query execution speeds based reducing the amount of data that needs to be access and passed during query execution due to fields containing large data only being accessed as a final step of a query via a completely separate storage mechanism. Storing and accessing different fields via different storage mechanisms based on size and/or data type of different fields in this fashion improves the technology of database systems by increasing memory resource efficiency by reducing the amount of data that needs to be stored by the more critical resources that access memory frequently, such as nodes 37 at IO level 2416, which can improve resource allocation and thus improve performance of these nodes 37 in query execution.

This can be particularly useful in massive scale databases implemented via large numbers of nodes, as greater numbers of communications between nodes are required, and minimizing the amount of data passed and/or improving resource allocation of individual nodes can further improve query executions facilitated across a large number of nodes, for example, participating in a query execution plan 2405 as discussed in conjunction with FIG. 24A. Storing and accessing different field via different storage mechanisms based on size and/or data type of different fields in this fashion further improves the technology of database systems by enabling processing efficiency and/or memory resource allocation to be improved for many independent elements, such as a large number of nodes 37, that operate in parallel to ensure data is stored and/or that queries are executed within a reasonable amount of time, despite the massive scale of the database system.

As another example, sensitive data fields, such as data fields with stricter security requirements than other data fields and/or data fields requiring encryption, can be stored via a different storage mechanism data in a same or similar fashion, separate from fields that are less sensitive, have looser security requirements, and/or that do not require encryption. Storing and accessing different fields via different storage mechanisms based on the sensitivity and/or security requirements of different fields in this fashion improves the technology of database systems by providing more secure storage and access to sensitive data that is stored separately, while still processing queries efficiently and guaranteeing query correctness.

FIG. 25A presents an embodiment of database system 10 that can be utilized to implement some or all of this functionality. As illustrated in FIG. 25A, one or more datasets 2500 that each include a plurality of records 2422 can be received by a record storage module 2502 of database system 10 that is operable to store received records of dataset 2500 in storage resources of database system 10 for access during query execution. The plurality of records 2422 of a given dataset 2500 can have a common plurality of X fields 2515.1-2515.X, for example, in accordance with a common schema for the dataset. For example, the plurality of fields 2515.1-2515.X can correspond to X columns of a database table corresponding to the dataset and/or the plurality of records can correspond to rows of this database table. For example, in the case of a relational database table, a field 2515 can be implemented as a column 2707.

The dataset 2500 can be received by the record storage module 2502 as a stream of records received from one or more data sources over time via a data interface and/or via a wired and/or wireless network connection, and/or can be received as a bulk set of records that are optionally stored via a single storage transaction. The record storage module 2502 can be implemented by utilizing the parallelized ingress sub-system 11 of FIG. 4, for example, where dataset 2500 is implemented as data set 30-1 and/or data set 30-2, and/or where dataset 2500 is received utilizing one or more network storage systems 21 and/or one or more wide area networks 22. The record storage module 2502 can be implemented by any one or more computing devices 18, such as plurality of computing devices that each receive, process and/or store their own subsets of dataset 2500 separately and/or in parallel. The record storage module 2502 can be implemented via at least one processor and at least one memory, such as processing and/or memory resources of one or more computing devices 18 and/or any other processing and/or memory resources of database system 10. For example, the at least one memory of record storage module 2502 can store operational instructions that, when executed by the at least one processor of the record storage module 2502, cause the record storage module 2502 to perform some or all functionality of record storage module 2502 discussed herein.

As illustrated in FIG. 25A, data values 2708 for a first subset of these fields can be stored via a primary storage system 2506, and data values 2708 for a second subset of these fields can be stored via a secondary storage system 2508. The first subset and second subset can be collectively exhaustive with respect to the set of fields, for example, to ensure that data values of all fields in the dataset 2500 are stored.

As described herein, the primary storage system 2506 and/or the secondary storage system 2508 can implement some or all of the database storage 2450 of FIG. 24K and/or any other database storage described herein. The primary storage system 2506 and/or the secondary storage system 2508 can optionally implement any other type of storage of any data that does not necessarily correspond to records of a relational and/or non-relational database.

The primary storage system 2506 can be implemented to store values for fields included in the first subset of fields via a first storage mechanism, for example, by utilizing a first set of memory devices, a first set of storage resources, a first set of memory locations, and/or a first type of storage scheme. The secondary storage system 2508 can be implemented to store values for fields included in the second subset of fields via a second storage mechanism, for example, by utilizing: a second set of memory devices that are different from some or all of the first set of memory devices of the first storage mechanism; a second set of storage resources that are different from some or all of the first set of storage resources of the first storage mechanism; a second set of memory locations that are different from some or all of the first set of memory locations of the first storage mechanism; and/or a second type of storage scheme that is different from the first type of storage scheme.

In some embodiments, the primary storage system 2506 can be implemented utilizing faster memory resources that enable more efficient access to its stored values as required for IO in query execution. The secondary storage be implemented utilizing slower memory resources than those of the primary storage system 2506, as less efficient access to the values for projection is required in query execution. For example, the primary storage system 2506 is implemented via a plurality of non-volatile memory express (NVMe) drives, the secondary storage system 2508 is implemented via an object storage system and/or a plurality of spinning disks, and the plurality of NVMe drives enable more efficient data access than the object storage system and/or the plurality of spinning disks.

Alternatively or in addition, the primary storage system 2506 can be implemented utilizing more expensive memory resources, for example that require greater memory utilization and/or have a greater associated cost for storing records and/or data values, and the secondary storage be implemented utilizing less expensive memory resources than those of the primary storage system 2506 that require less memory utilization and/or have a lower associated cost to store records and/or data values. For example, the primary storage system 2506 is implemented via a plurality of NVMe drives corresponding to more expensive memory resources than an object storage system and/or a plurality of spinning disks utilized to implement the secondary storage system 2508.

Alternatively or in addition, the primary storage system 2506 can be implemented via a plurality of memory drives 2425 of a plurality of nodes 37, such as some or all nodes 37 that participate at the IO level 2416 of query execution plans 2405. For example, the primary storage system 2506 is implemented via a plurality NVMe drives that implement the memory drives 2425 of the plurality of nodes 37. In such embodiments, the secondary storage system 2508 can be implemented by plurality of memory drives 2425 of different plurality of nodes 37, is optionally not implemented by any memory drives 2425 of nodes 37 that participate at IO level 2416, and/or is optionally not implemented by any memory drives 2425 of any nodes 37 of computing devices 18 of database system 10. Such embodiments are discussed in further detail in conjunction with FIG. 25G.

Alternatively or in addition, the primary storage system 2506 can be implemented via a storage scheme that includes generating a plurality of segments 2424 for storage, for example, by performing some or all of the steps discussed in conjunction with FIGS. 15-23 to generate segments. In such embodiments, the secondary storage system 2508 is implemented via a different storage scheme, for example, that does not include generating a plurality of segments 2424 for storage. Such embodiments are discussed in further detail in conjunction with FIG. 25F.

Alternatively or in addition, the primary storage system 2506 can be implemented via a storage scheme that utilizes a non-volatile memory access protocol, such as a non-volatile memory express (NVMe) protocol. In such embodiments, the secondary storage system 2508 is implemented via a different storage scheme, for example, that does not utilize a non-volatile memory access protocol and/or that utilizes a different non-volatile memory access protocol.

Alternatively or in addition, the secondary storage system 2508 is implemented via an object storage system, where data values of fields stored in the secondary storage system 2508 are stored as objects and/or where data values of fields stored in the secondary storage system 2508 are accessed via a communication and/or access protocol for the object storage system. In such embodiments, the primary storage system 2506 is implemented via a different storage scheme, for example, that is not implemented as an object storage system. For example, the primary storage system 2506 can instead corresponds to a file storage system. Such embodiments are discussed in further detail in conjunction with FIG. 25C and FIG. 25D.

Alternatively or in addition, the secondary storage system 2508 is implemented via a storage scheme that includes securely storing and/or encrypting the values of corresponding fields in the second subset of fields for storage via secondary storage system 2508. These values can be decrypted and/or retrieved securely when read from secondary storage system 2508 for projection in query resultants. In such embodiments, the primary storage system 2506 is implemented via a different storage scheme, for example, that does not include encrypting values of the corresponding fields in the first subset of fields for storage via primary storage system 2506 and/or that includes storing the values via a looser security level than the secure storage of the secondary storage system 2508.

Alternatively or in addition, the primary storage system 2506 implements a long term storage system that implements storage of a database for access during query executions in all, most, and/or normal conditions. In such embodiments, the secondary storage system 2508 is not implemented as a long term storage system and/or in any, most, and/or normal conditions. For example, the secondary storage system 2508 is only accessed to access and/or decrypt large data for projection. As another example, the secondary storage system 2508 is only and/or usually accessed to recover data stored via primary storage system 2506, and/or is implemented as redundant storage for primary storage system 2506. Such embodiments are discussed in further detail in conjunction with FIGS. 26A-27E.

The data values 2708 of the first subset of fields can still maintain a record-based structure in the storage scheme of primary storage system 2506 as sub-records 2532, where data values belonging to same records 2422 preserve their relation as members of the same record 2422. For example, a sub-record 2532 is stored for each record 2422 in primary storage system 2506, where a set of Z sub-records 2532.1-2532.Z are stored in primary storage system 2506 based on the dataset 2500 including a set of Z corresponding records 2422.1-2422.Z.

Sub-records 2532 do not include values for field 2515.2 based on field 2515.2 not being stored in primary storage system 2506, but can include values for all fields of the first subset of these fields, such as field 2515.1 and/or some or all of fields 2515.3-2515.X. The set of data values 2708 of a given sub-record can be stored collectively, can be recoverable from a storage format of the primary storage system, and/or can otherwise be mapped to a same record and/or identifier indicating these values are all part of the same original record 2422. For example, the plurality of sub-records 2532 can be stored in a column-based format in one or more segments 2424, where all values of a given sub-record are all stored in a same segment 2424 and/or in a same memory drive 2425. Values of various fields 2515 of the sub-records 2532 can be accessed where the identifier and/or other information regarding the original record 2422 is optionally utilized to perform access to a particular record and/or is preserved in conjunction with the retrieved value.

The data values 2708 of the second subset of fields can be stored separately, for example, as distinct objects of an object storage system. In some embodiments, multiple fields 2515 are included in the second subset of fields based on multiple fields having large data types and/or data types that meet the secondary storage criteria data 2535. Values of these multiple fields for same records 2422 can be stored as sub-records and/or can be stored together and/or can be mapped together in secondary storage system 2508. Alternatively, values of these multiple fields for same records 2422 can be stored separately, for example, as distinct objects of an object storage system, despite their original inclusion in a same record 2422.

The first subset of fields and second subset of fields can be determined and/or data values of records 2422 in dataset 2500 can be extracted, partitioned in accordance with the first and second subset of fields, and/or structured for storage via primary storage system 2506 and secondary storage system 2508, respectively, by utilizing a field-based record partitioning module 2530. The field-based record partitioning module 2530 can be implemented via at least one processor and at least one memory, such as processing and/or memory resources of one or more computing devices 18 and/or any other processing and/or memory resources of database system 10.

The field-based record partitioning module 2530 can utilize secondary storage criteria data 2535 indicating identifiers of, types of, sizes of, and/or other criteria identifying which fields of one or more datasets 2500 be selected for inclusion in the first subset of fields and/or which fields of one or more datasets 2500 be selected for inclusion in the second subset of fields. This secondary storage criteria data 2535 can be: automatically generated by the record storage module 2502; received by the record storage module 2502; stored in memory accessible by the record storage module 2502; configured via user input; and/or otherwise determined by the record storage module 2502.

As a particular example, a user and/or administrator can configure: which particular fields of one or more particular datasets 2500 be stored in primary storage system 2506; which particular fields of one or more particular datasets 2500 be stored in secondary storage system 2508; which types of fields be stored in secondary storage system 2508; which data types for data values of fields be stored in primary storage system 2506; which data types for data values of fields be stored in secondary storage system 2508; which file type and/or file extensions for data values of fields be stored in secondary storage system 2508; which maximum, minimum, and/or average sizes of data values correspond to a threshold size requiring that a corresponding field be stored in secondary storage system 2508; and/or other criteria designating which fields be stored in secondary storage system.

In some embodiments, the user enters this information configuring secondary storage criteria data 2535 via an interactive interface presented via a display device of a client device that is integrated within database system 10, that communicates with database system 10 via a wired and/or wireless connection, and/or that executes application data corresponding to database system 10. Alternatively or in addition, the secondary storage criteria data 2535 is configured by utilizing administrative sub-system 15 and/or configuration sub-system 16.

The same secondary storage criteria data 2535 can be applied to multiple different datasets 2500, such as all datasets 2500. Alternatively different datasets 2500 can have different secondary storage criteria data 2535. For example, the same or different users can configure secondary storage criteria data 2535 for particular datasets 2500.

In this example, and in the further examples presented via FIGS. 25B-25G, field 2515.2 is included in the second subset of fields, while other fields including some or all of field 2515.1 and/or 2515.3-2515.X are included in the first subset of fields. Furthermore, in the further examples presented via FIGS. 25B-25G, field 2515.2 is not included in the first subset of fields. For example, field 2515.2 is included in this second subset of fields, and not in the first subset of fields, based on meeting and/or otherwise comparing favorably to the secondary storage criteria data 2535.

Different datasets 2500 can have different numbers of fields included in the second subset of fields, where a given dataset 2500 can have no fields, a single field, and/or multiple fields included in the second subset of fields. In some cases, all datasets 2500 must include at least one field, and/or at least a unique key set of multiple fields, in the first subset of fields. The record storage module 2502 can be operable to partition store different numbers of and/or sets of fields for multiple datasets 2500 received for storage in the primary storage system 2506 and secondary storage system 2508 accordingly.

As a particular example, field 2515.2 is included in this second subset of fields accordingly based on having data values 2708 corresponding to large binary data, unstructured data, variable-length data, extensive text data, image data, audio data, video data, multimedia data, document data, application data, executable data, compressed data, encrypted data, data that matches a data type and/or is stored in accordance with a file type and/or file extension indicated in secondary storage criteria data 2535, data that is larger than and/or compares unfavorably to a data size threshold indicated in secondary storage criteria data 2535, data that is very large relative to data values of other fields, data that is only utilized in projections when queries are executed, data that is rarely and/or never utilized in query predicates when queries are executed, data that is sensitive, data with a security requirement that is stricter than and/or compares favorably to a security requirement threshold indicated in secondary storage criteria data 2535, data that requires encryption, and/or data that is otherwise deemed for storage via the secondary storage system 2508 rather than the primary storage system 2506. For example, the secondary storage criteria data 2535 indicates corresponding criteria denoting that field 2515.2 be included in this second subset of fields.

Some or all other fields 2515 are not included in the second subset of fields based on not meeting and/or otherwise comparing unfavorably to the secondary storage criteria data 2535, and are thus included in the first subset of fields. As a particular example, some or all of fields 2515.1 and/or 2515.3-2515.X are not included in this second subset of fields accordingly based on having data values 2708 that correspond to fixed-length data values, primitive data types, simple data types, data that does not match any data types indicated in secondary storage criteria data 2535, data that is smaller than and/or compares favorably to a data size threshold, data indicated in secondary storage criteria data 2535, data that is small and/or normal in size relative to data values of other fields, data that is always, often, and/or sometimes utilized in query predicates when queries are executed, and/or data that is otherwise deemed for storage via the primary storage system 2506 rather than the secondary storage system 2508.

Some fields that compare unfavorably to the secondary storage criteria data 2535 may still be included in the second subset of fields, for example, in addition to the first subset of fields. For example, one or more fields correspond to a unique key field set and/or fields that otherwise identify corresponding records can optionally be stored in conjunction with the large data of field 2515.2. This can be utilized to identify and retrieve data values 2708 of field 2515.2 for particular records filtered via query predicates, whose data values of field 2515.2 are therefore required to be reflected in the query resultant, based on having a matching set of one or more identifying fields. This ensures that queries are executed correctly, where data values of field 2515.2 for records required to be included in the resultant based on filtering requirements of the corresponding query are identified and retrieved from secondary storage system 2508, and where data values of field 2515.2 for records required to be not included in the resultant based on filtering requirements of the corresponding query are not identified and thus not retrieved from secondary storage system 2508. Storing and utilizing record identifiers to access data values of field 2515.2 from secondary storage system 2508 is discussed in further detail in conjunction with FIG. 25C and FIG. 25D.

FIG. 25B illustrates an embodiment of a database system 10 that implements a query processing system 2501 that accesses a primary storage system 2506 and/or secondary storage system 2508. Some or all features and/or functionality of the database system 10 of FIG. 25B can be utilized to implement the database system 10 of FIG. 25A and/or any other embodiment of the database system 10 described herein. The primary storage system 2506 and/or secondary storage system 2508 of FIG. 25B can be implemented as the primary storage system 2506 and/or secondary storage system 2508 of FIG. 25A. The query processing system 2501 of FIG. 25B can be implemented to execute queries against one or more datasets, including dataset 2500 of FIG. 25A once it is stored via primary storage system 2506 and/or secondary storage system 2508 via record storage module 2502 of FIG. 25A. The query processing system 2501 can implement some or all features and/or functionality of the query processing system 2510 of FIGS. 24F-24G and/or any other embodiment of query processing system described herein.

The query processing system 2501 can be implemented by utilizing the parallelized query and results sub-system 13 of FIG. 5. The query processing system 2501 can be implemented by any one or more computing devices 18, such as plurality of nodes 37 of a plurality of computing devices that process queries separately and/or in parallel, for example, in accordance with participation in a query execution plan 2405. The query processing system 2501 can be implemented via at least one processor and at least one memory, such as processing and/or memory resources of one or more computing devices 18 and/or any other processing and/or memory resources of database system 10. For example, the at least one memory of query processing system 2501 can store operational instructions that, when executed by the at least one processor of the query processing system 2501, cause the query processing system 2501 to perform some or all functionality of query processing system 2501 discussed herein.

Queries can be executed via a query execution module 2504 of the query processing system 2501 based on corresponding query expressions 2552. These query expressions 2552 can received by the query processing system 2501, for example, is by utilizing system communication resources 14 and/or one or more network one or more wide area networks 22; can be configured via user input to interactive interfaces of one or more client devices integrated within and/or communicating with the database system 10 via a wired and/or wireless connection; can be stored in memory accessible by the query processing system 2501; can be automatically generated by the query processing system 2501, and/or can otherwise be determined by the query processing system 10.

The query expression 2552 can correspond to a Structured Query Language (SQL) query and/or can be written in SQL. The query expression 2552 can be written in any query language and/or can otherwise indicate a corresponding query for execution.

A given query expression 2552 can indicate an identifier of one or more datasets including dataset 2500 and/or can otherwise indicate the query be executed against and/or via access to records of dataset 2500.

A given query expression 2552 can include filtering parameters 2556. The filtering parameters 2556 can correspond to query predicates and/or other information regarding which records 2422 have data values 2708 of one or more fields reflected in the query resultant. The filtering parameters 2556 can indicate particular requirements that must be met for data values 2708 of one or more fields 2515 for records that will be included in, aggregated for representation in, and/or otherwise utilized to generate a query resultant 2548 corresponding to execution of a query corresponding to this query expression. For example, the filtering parameters 2556 include query predicates of a SQL query, such as predicates following a WHERE clause of a SELECT statement.

A given query expression 2552 can include projected field identifiers 2558. The projected field identifiers 2558 can include column identifiers for and/or can otherwise indicate which fields 2515 have data values 2708 of one or more records 2422 reflected in the query resultant. In particular, once records are filtered via filtering parameters 2556 to render a filtered subset of records, only data values of fields indicated via projected field identifiers 2558 are included in and/or reflected in query resultant 2548. For example, the projected field identifiers 2558 follow a SELECT statement to indicate which fields be projected in a final query resultant to be outputted by the query and/or to be outputted in an intermediate stage of query execution for further processing.

The filtering parameters 2556, projected field identifiers 2558, and/or other structure and/or portions of a given query expression 2552 can be utilized by a query plan generator module 2550 to generate query plan data 2554. The query plan data can indicate how the query be executed, which memory be accessed to retrieve records, a set and/or ordering of query operators to be executed in series and/or in parallel, one or more query operator execution flows 2433 for execution by one or more nodes 37, instructions for nodes 37 regarding their participation at one or more levels of query execution plan 2405, or other information regarding how a query for the given query expression be executed. In particular, the query plan data 2554 can indicate that data values 2708 for some or all fields of some or all sub-records 2532 of dataset 2500 be accessed via primary storage system 2506 based on which fields are required to apply filtering parameters 2556; that these accessed values be utilized to filter records by applying filtering parameters 2556; and that values of fields indicated in projected field identifiers be retrieved from secondary storage system 2508 for inclusion in query resultant 2548 and/or for further processing for only the records that met the requirements of filtering parameters 2556.

The query plan data 2554 can be utilized by a query execution module 2504 to execute the corresponding query expression 2552. This can include executing the given query in accordance with the filtering parameters 2556 and the projected field identifiers 2558 of the query expression 2552. In particular, the query execution module 2504 can facilitate execution of a query corresponding to the query expression 2552 via an IO step 2542, a filtering step 2544, and/or a projection step 2546 to ultimately generate a query resultant 2548. IO step 2542, a filtering step 2544, and/or a projection step 2546 can be performed via distinct sets of resources, such as distinct sets of computing devices 18 and/or nodes 37, and/or via shared resources such as a shared set of computing devices 18 and/or nodes 37.

The IO step 2542 can include performing a plurality of record reads. In particular, data values 2708 for some or all fields of some or all sub-records 2532 of dataset 2500 be accessed via primary storage system 2506, for example, based on which fields are: indicated in filtering parameters 2556, required to apply filtering parameters 2556; and/or indicated for projection in producing the query resultant. This can include reading values from all sub-records 2532 for a given dataset 2500 for filtering via filtering step 2544. Performing IO step 2542 can include accessing only primary storage system 2506, where only values from sub-records 2532 are read, and where values are not read from secondary storage system 2508 in performing IO step 2542.

The filtering step 2544 can include filtering the set of records read in the IO step. In particular, data values 2708 for some or all fields of some or all sub-records 2532 of dataset 2500 that were accessed via primary storage system 2506 in the IO step 2542 can be filtered in accordance with the filtering parameters 2556. This can include generating and/or indicating a filtered subset of sub-records from the full set of accessed sub-records 2532 based on including only ones of the full set of accessed sub-records that meet the filtering parameters 2556 in the filtered subset of sub-records.

In some embodiments, some or all of filtering step 2544 can be integrated within IO step 2542 based on performing one or more index probe operations and/or based on a plurality of indexes stored in conjunction with the plurality of sub-records 2532, where only a subset of records are read for further processing based on some or all of filtering parameters 2556 being applied utilizing the plurality of indexes and/or the index probe operations. Such embodiments are discussed in further detail in conjunction with FIG. 25E.

The projection step 2546 can include accessing and emitting the data values 2708 of fields indicated in projected field identifiers 2558 for only records 2422 corresponding to the filtered subset of sub-records 2532 to produce a query resultant 2548 that includes and/or is based on these data values 2708. In some embodiments, these data values 2708 for each record of the filtered subset of sub-records 2532 are included in the query resultant 2548. In some embodiments, further aggregation and/or processing is performed upon these data values 2708 to render the query resultant. The projection step 2546 optionally includes decrypting the data values 2708 prior to their inclusion in the query resultant if these values are encrypted in the secondary storage system 2508.

For projected field identifiers 2558 corresponding to fields included in the second subset of fields stored via secondary storage system 2508, this can include performing value reads to retrieve values from only records 2422 indicated in the filtered subset of sub-records, as illustrated in FIG. 25B. For example, data values of field 2515.2 are emitted and included in query resultant 2548 based on field 2515.2 being indicated in projected field identifiers 2558. In particular, this access to secondary storage system 2508 to perform projection step 2546 can correspond to the first and/or only access to secondary storage system 2508 to execute the query.

While not illustrated in FIG. 25B, the projection step 2546 can alternatively or additionally include emitting data values 2708 of fields stored in sub-records 2532 based on these fields being indicated in projected field identifiers 2558. For example, data values of field 2515.1 are emitted and included in query resultant 2548 for records indicated in the filtered subset of sub-records 2532 instead of or in addition to data values of field 2515.2 based on field 2515.1 being indicated in projected field identifiers 2558. If values of field 2515.1 were previously read via IO step 2542 and/or filtered via filtering step 2544, these values need not be re-read, and can simply be outputted in filtering step 2544 and emitted directly in projection step 2546. If values of field 2515.1 were not previously read via IO step 2542 based on not being necessary for filtering via filtering step 2544, performing the projection step 2546 can include reading these values via primary storage system 2506, for example, in a same or similar fashion as performed in IO step 2542.

In some embodiments, the filtering parameters 2556 only indicate requirements that must be met for data values 2708 of only fields 2515 included in the first subset of fields that are stored in primary storage system 2506. For example, the filtering parameters 2556 do not include any filtering parameters regarding the value of field 2515.2 based on field 2515.2 being included in the second subset of fields stored via secondary storage system 2508. This can be ideal in ensuring that secondary storage system 2508 need not be accessed in IO step 2542 and/or filtering step 2544 of query execution, as field 2515.2 need not be accessed in filtering records.

In such cases, the query expression can be restricted to include filtering parameters 2556 only indicating requirements that must be met for data values 2708 of only fields 2515 included in the first subset of fields, where a query will only be executed if it does not include any parameters regarding the fields included in the second subset of fields. For example, field 2515.2 is designated as a "projection-only" field, and cannot be utilized to filter records via filtering parameters 2556. In such embodiments, these "projection-only" fields can be optionally configured via user input, can be determined based on secondary storage criteria data 2535 identifying the "projection-only" fields, and/or can be automatically selected based on fields selected for inclusion in the second subset of fields for storage in secondary storage system 2508.

Such restrictions can be implemented by the query processing system 2501 upon receiving query expressions to determine whether a query expression can be executed based on whether or not it references any "projection-only" fields in filtering parameters 2556. Such restrictions can be implemented by a client device, for example, in conjunction with execution of application data corresponding to the database system 10, that: restricts users from entering query expression that reference "projection-only" fields in filtering parameters 2556; prompts users to re-write query expressions entered via user input that reference "projection-only" fields in filtering parameters 2556; and/or that only transmits query expressions entered via user input that do not reference "projection-only" fields. In such embodiments, these "projection-only" fields can be sent to these client devices by the database system 10, for example, in conjunction for storage by memory resources of the client device enable processing resources of the client device to restrict the user from entering and/or sending query expression referencing these "projection-only" fields in filtering parameters 2556.

In other embodiments, the filtering parameters 2556 can indicate requirements that must be met for data values 2708 of at least one field 2515 included in the second subset of fields that are stored in secondary storage system 2508. For example, the filtering parameters 2556 include filtering parameters regarding the value of field 2515.2. In such cases, rather than accessing secondary storage system 2508 to determine and utilize values 2708 of field 2515.2 to perform filtering, the IO step 2542 and/or filtering step 2544 can still be performed via only access to primary storage system 2506, based on the sub-records 2532 being indexed by a plurality of indexes generated based on field 2515.2. Such embodiments are discussed in further detail in conjunction with FIG. 25E.

The query resultant 2548 can be sent to another computing device for download, display and/or further processing, such as a computing device 18, a client device associated with a requesting entity that requested execution of the query, and/or any other computing device that is included in and/or communicates with the database system 10. For example, the query resultant 2548 is sent to a client device that generated the query expression 2552. The query execution module 2504 can send the data values of the query resultant 2548 to this receiving computing device via a wired and/or wireless connection with the receiving computing device, for example, by utilizing system communication resources 14 and/or one or more external networks 17.

The receiving computing device that receives the query resultant 2548 from the database system 10 can display image data, video data, multimedia data, text data, and/or other data of data values 2708 of the query resultant 2548 corresponding to field 2515.2 via one or more screens or other one or more display devices of the receiving computing device. Alternatively or in addition, the receiving computing device that receives the query resultant 2548 from the database system 10 can utilize one or more speakers of the receiving computing device to emit sound corresponding to playing of the audio data, multimedia data, and/or other data of data values 2708 of the query resultant 2548 corresponding to field 2515.2.

In some embodiments, the database system 10*s* stores and/or packages the data values of the query resultant 2548 in accordance with one or more audio, image, video, text, document, and/or multimedia files via a corresponding audio, image, video, text, document, and/or multimedia file format and/or in accordance with a compressed and/or uncompressed file format. For example, some or all data values 2708 of the query resultant 2548 corresponding to field 2515.2 are stored by secondary storage system 2508 and/or are packaged by the database system 10 for transmission to the receiving computing device in accordance with a .JPEG, PNG, GIF, AVI, WMV, MPG, MP3, MP4, WAV, TXT, EXE, ZIP, and/or another file format corresponding to a data type of field 2515.2. The audio, image, video, text, document, and/or multimedia files can be stored via memory resources of the receiving computing device and/or can be opened via one or more applications of the of the receiving computing device for display and/or further processing by the receiving computing device.

In some embodiments, the database system stores data of the field 2515.2 in a compressed and/or encrypted format, for example, based on the corresponding data values corresponding to sensitive data and/or large data requiring compression in storage. The database system can optionally decrypt and/or decompress the data values included in the query resultant 2548 prior to transmission to the receiving computing device. For example, data values are decrypted by the query execution module 2504 and/or other processing resources of the database system 10 based on performing a decompression and/or decryption algorithm, and/or in accordance with key data or authentication data received from the receiving computing device, for example, in conjunction with the query expression.

In other embodiments, database system sends the data values included in the query resultant 2548 in their encrypted and/or compressed format. The receiving computing device decrypts and/or decompresses this data for display, use, and/or further processing via processing resources of the receiving computing device. For example, the receiving computing device performs a decompression and/or decryption algorithm via processing resources of the receiving computing device. As another example, the receiving computing device utilizes key data and/or authentication data that is stored in memory of the receiving computing device, that is received by the receiving computing device, that is entered via user input to the receiving computing device, and/or that corresponds to a user of the receiving computing device to decrypt the data values of the query resultant.

FIG. 25C illustrates another embodiment of primary storage system 2506, secondary storage system 2508, and query execution module 2504 of database system 10. Some or all features and/or functionality of the database system 10 of FIG. 25C can be utilized to implement the database system 10 of FIG. 25B and/or any other embodiment of database system 10 described herein.

The secondary storage system 2508 can be implemented as an object storage system that stores values of fields in the second subset of fields as objects 2562. In this example, a set of Z objects 2562.1-2562.Z are stored based on the dataset including Z records, and each object 2562 includes the data value 2708 for field 2515.2 based on field 2515.2 being included in the second subset of fields.

For example, the record storage module 2502 implements an object generator module that generates objects 2562.1-2562.Z that each include a corresponding value 2708 of field 2515.2, and the record storage module 2502 sends each object 2562.1-2562.Z to the secondary storage system 2508 for storage. Alternatively, the record storage module 2502 simply sends the values 2708.1-2708.Z to the secondary storage system 2508 for storage as corresponding objects 2562.1-2562.Z, where the secondary storage system 2508 implements an object generator module that generates objects 2562.1-2562.Z from values 2708.1-2708.Z received from the record storage module 2502.

In some embodiments, the database system 10 can map values 2708 of sub-records 2532 in primary storage system and values 2708 of objects 2562 in secondary storage system to record identifiers 2564 identifying the original corresponding record 2422.

As illustrated in FIG. 25C, each object 2562 can optionally include, indicate, and/or be mapped to a record identifier 2564 and/or each sub-record 2532 can optionally include, indicate, and/or be mapped to a record identifier. For example, the record storage module 2502 can generate and send sub-records 2532 that include values 2708 for the first subset of fields as well as record identifier 2564 to the primary storage system 2506 for storage. The record storage module 2502 can generate and send objects 2562 that include a value 2708 and a corresponding identifiers 2564 to secondary storage system 2508 for storage, and/or can generate and send record identifiers 2564 in conjunction with the corresponding to the secondary storage system 2508 for storage in same objects 2562.

These record identifiers 2564 can be utilized to identify which objects 2562 be accessed to enable projection of their values 2708 based on only accessing objects 2562 with identifiers 2564 matching those of records 2422 identified in the output of filtering step 2544. In particular, objects with a data value 2708 extracted from a particular record 2422 can have a same object identifier 2564 as the sub-record 2532 with data values 2708 extracted from this same particular record 2422, and can be different from all other sub-records 2532 with data values 2708 extracted different records. The record storage module 2502 can extract and/or generate record identifiers 2564 for each incoming record 2422, can facilitate storage of a sub-record 2532 via primary storage system indicating and/or mapped to this record identifier 2564, and/or can facilitate storage of an object 2562 via primary storage system indicating and/or mapped to this record identifier 2564.

Record identifiers 2564 can be unique from record identifiers of other records to uniquely identify each record. Record identifiers 2564 can be generated via a hash function. Record identifiers 2564 can correspond to values 2708 of a unique identifier field set of records 2422. Record identifiers 2564 can correspond to pointers to and/or memory locations of sub-records and/or objects in memory. For example, a record identifier 2564 of a given sub-record of a particular record 2422 denotes the memory location and/or retrieval location for the object 2562 corresponding to the particular record 2422, where the record identifier 2564 of the object 2562 corresponds to the retrieval information and/or location of the object 2562.

In this example, at least one field 2515 for all sub-records 2532.1-2532.Z, corresponding to all possible records of the dataset 2500, are read in IO step 2542 and/or are filtered in filtering step 2544 based on filtering parameters 2556 to render a filtered record subset 2567 indicating a subset of the set of records filtered from the record set 2566. The IO step 2542 can include reading the identifiers 2564 of sub-records 2532 from primary storage system 2506 as part of reading the at least on field 2515 for all sub-records 2532.1-2532.Z indicates sub-record 2532.2, 2532.5, and 2532.Z. Alternatively, the reading the identifiers 2564 of only the sub-records 2532 included in the filtered record subset 2567 are read from primary storage system 2506 after filtering step 2544 is performed.

Next, projection step 2546 is performed based on the filtered record subset 2567 to project the appropriate values of field 2515.2 based on projected field identifiers 2558 indicating field 2515.2. Record identifiers 2564.2, 2564.5, and 2565.Z corresponding to records 2422.2, 2422.5, and 2422.Z can be utilized to access the corresponding values 2708 of field 2515.2 for these 2422.2, 2422.5, and 2422.Z, based on accessing the corresponding objects 2562 that indicate and/or are mapped to these record identifiers 2564.2, 2564.5, and 2565.Z. For example, the record identifiers 2564 are stored as metadata of the objects 2562, and identifying the set of objects 2562 to be accessed includes performing a metadata search utilizing these record identifiers. The corresponding values 2708.2.2, 2708.5.2, and 2708.Z.2, correspond to the field 2515.2 value of the original records 2422.1, 252.5 and 2422.Z, respectively, are then read based on accessing, by utilizing these record identifiers, the appropriate objects 2562 in secondary storage system 2508 for projection in query resultant 2548.

Figure 25D:
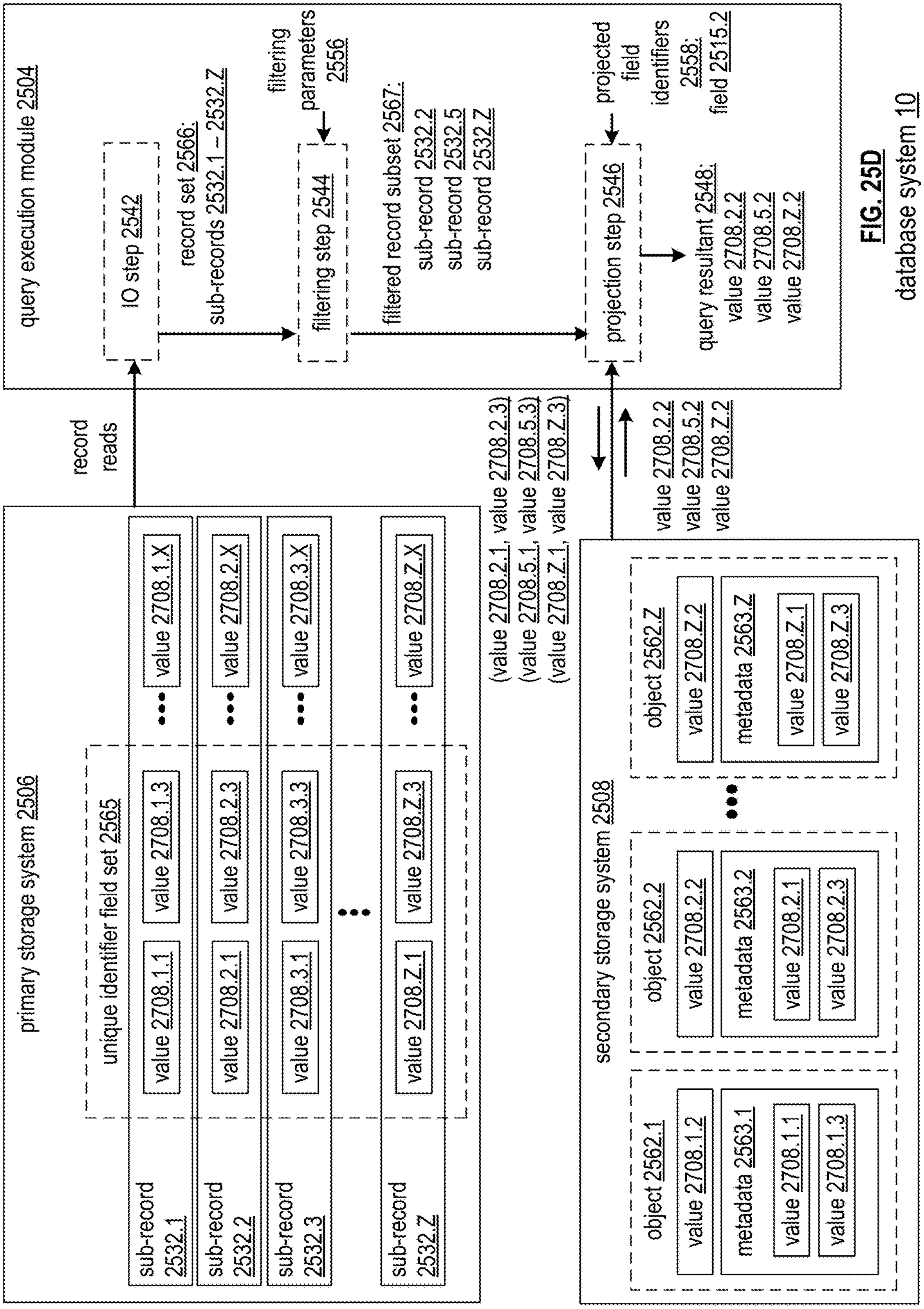

FIG. 25D illustrates an embodiment where record identifiers 2564 are implemented as values of a unique identifier field set 2565. The database system 10 of FIG. 25D can be utilized to implement the database system 10 of FIG. 25C and/or any other embodiment of database system 10 described herein.

The unique identifier field set 2565 can be implemented as a unique key set of one or more fields 2515 and/or values of any set of fields 2515 whose values uniquely identify records 2422, where values of unique identifier field set 2565 for any given record 2422 is guaranteed to be distinct from values of this unique identifier field set 2565 for all other records 2422. In the example of FIG. 25D, values of field 2515.1 and field 2515.3 can uniquely identify records 2422, and where a unique identifier field set 2565 of records 2422 thus includes field 2515.1 and field 2515.3. The sub-records 2532 need not include additional identifiers 2564, as the set of values in the unique identifier field set 2565 already uniquely identify each record 2422.

The values of the unique identifier field set 2565 are also stored in conjunction with each corresponding value 2515.2 in secondary storage system 2508, for example, as metadata 2563 of corresponding objects 2562, to ensure that each value 2515.2 in secondary storage system 2508 is mapped to their corresponding record and/or is retrievable based on values of the unique identifier field set 2565 retrieved from the primary storage system 2506.

In particular, extending the example of FIG. 25C, the projection step includes retrieving values 2708.2.2, 2708.5.2, and 2708.Z.2 based on searching and/or otherwise accessing the corresponding objects 2562.2, 2562.5, and 2562.Z by utilizing the corresponding values of fields 2515.1 and 2515.3 in the unique identifier field set 2565 for records 2422.2, 2422.5, and 2422.Z based on records 2422.2, 2422.5, and 2422.Z being included in the filtered record subset 2567. For example, accessing objects 2562.2, 2562.5, and 2562.Z includes performing a metadata search utilizing the corresponding values of fields 2515.1 and 2515.3 in the unique identifier field set 2565 for records 2422.2, 2422.5, and 2422.Z.

In some embodiments, values of other fields, such as some or all fields 2515 of sub-records 2532, are also stored in conjunction with each corresponding value 2515.2 in secondary storage system 2508, for example, as metadata 2563 of corresponding objects 2562. For example, accessing objects 2562 to retrieve corresponding values for projection in the resultant includes performing a metadata search utilizing the corresponding values of some or all fields, for example, that were accessed and/or utilized in the IO step 2542 and/or the filtering step 2544 based on filtering parameters 2556, from sub-records indicated in the filtered record subset 2567. In such cases, the set of values of these sets of fields may not be guaranteed to be unique, but still render correct query resultants when used in metadata searches for corresponding object values for projection, regardless of whether a given set of set of values map to and returns the value of a single object 2562 or multiple objects 2562, based on these particular sets of values of these sets of fields meeting the requirements of filtering step 2544.

In some embodiments, the projection step includes retrieving values 2708.2.2, 2708.5.2, and 2708.Z.2 based on performing a JOIN operation, such as an inner join operation and/or other type of join operation. The JOIN operation can be performed upon a first table corresponding to the filtered record subset 2567 and upon a second table corresponding to the full set of values 2708 stored in secondary storage system 2508 for the dataset 2500. In particular, an equality condition corresponding to equality of the one or more values of the unique identifier field set 2565 and/or other set of fields of the first table with values of a set of corresponding one or more fields of the second table can be utilized to perform the JOIN operation. Output of the JOIN operation thus corresponds to only ones of the set of values 2708 stored in secondary storage system 2508 storing metadata values for the unique identifier field set 2565 and/or other set of fields that match the values of the unique identifier field set 2565 and/or other set of fields for at least one sub-record in the filtered record subset 2567, corresponding to only ones of the set of values 2708 from the same original records 2522 as the sub-records in the filtered record subset 2567. In some embodiments, this JOIN operation is performed in performing projection step 2546 based on being indicated in the query plan data 2554 and/or being included in a query operator execution flow determined for the query.

Figure 25E:
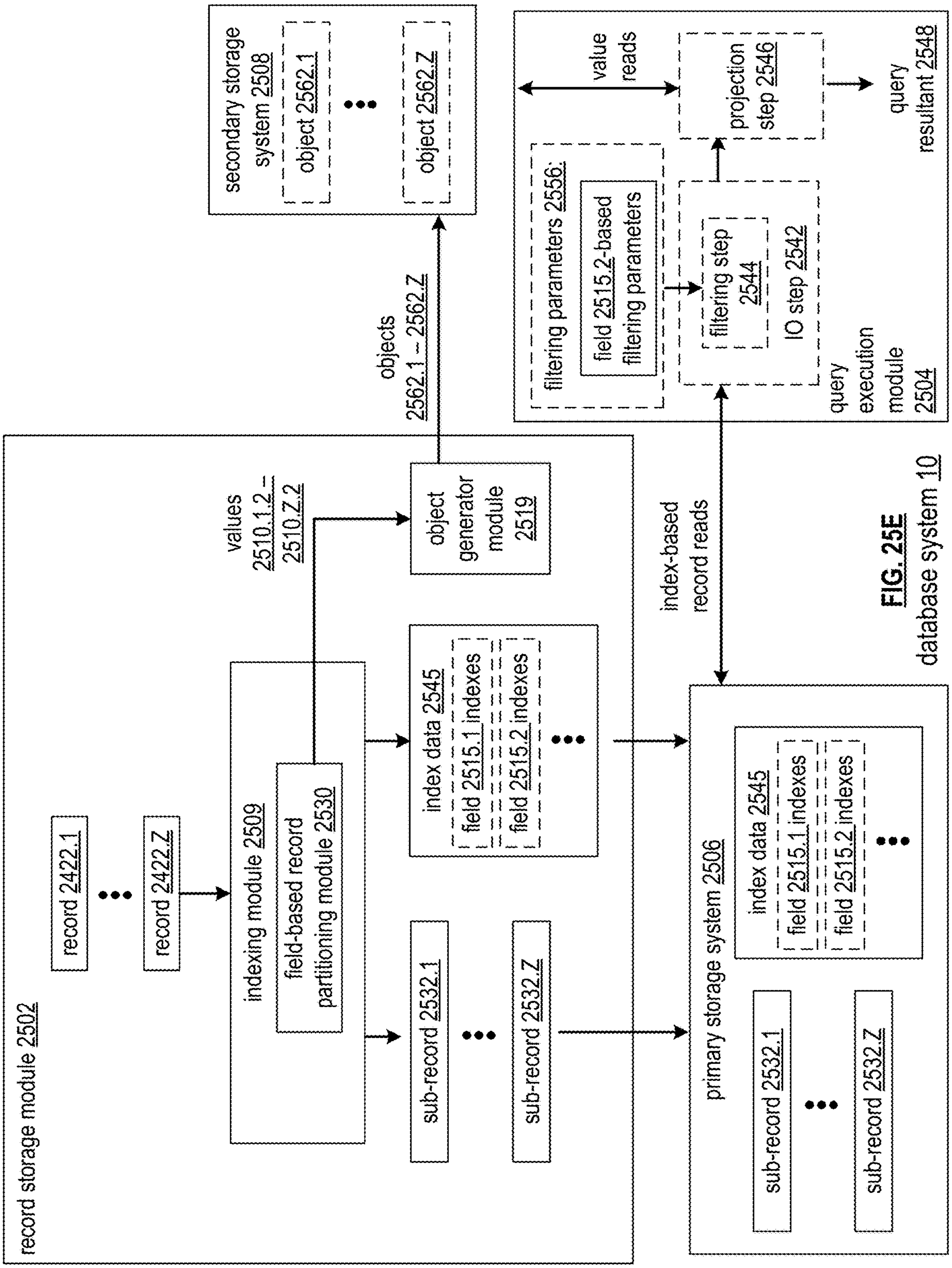
FIG. 25E is a schematic block diagram illustrating a record storage module that implements an index generator module in accordance with various embodiments.

FIG. 25E illustrates an example of a database system 10 where sub-records are indexed via a plurality of indexes in primary storage system 2506. Some or all features and/or functionality of the database system 10 of FIG. 25E can be utilized to implement the database system 10 of FIG. 25A and/or FIG. 25B, and/or any other embodiment of database system 10 described herein.

As illustrated in FIG. 25E, the record storage module can implement an index generator module 2509 to generate index data 2545 that includes indexes corresponding to one or more fields. The index data 2545 can include, for one or more fields 2515, primary indexes, secondary indexes, unique indexes, non-unique indexes, clustered indexes, non-clustered indexes, partitioned indexes, non-partitioned indexes, bidirectional indexes, expression-based indexes, modification state indexes, a bloom filter, a projection index, a data-backed index, a filtering index, a composite index, a zone map, a bit map, and/or a B-tree.

The record storage module 2502 can facilitate storage of index data 2545 via primary storage system 2506 in conjunction with storing the sub-records 2532. Alternatively or in addition, record storage module 2502 can facilitate storage of sub-records 2532 via primary storage system 2506 in accordance with their indexes of index data 2545, where the location, organization, and/or grouping of sub-records 2532 in storage resources of primary storage system 2506 is based on their respective indexes of index data 2545.

The stored index data 2545 can be accessible by query execution module 2504 when performing IO step 2542 to access sub-records 2532, and/or the sub-records 2532 can be accessible in their respective locations by query execution module 2504 when performing IO step 2542 to access sub-records 2532 based on index data 2545. As illustrated in FIG. 25E, some or all of filtering step 2544 can be integrated within IO step 2542. In particular, some records are not accessed via IO step 2542 based on utilizing index data 2545 to apply some or all filtering parameters 2556, for example, via an index probing operator of the query in IO step 2542. In such cases, rather than the IO step 2542 outputting some or all values 2708 of all sub-records 2532 in the dataset 2500, the IO step 2542 outputs values and/or identifiers of a filtered subset of sub-records 2532 in the dataset 2500 based on utilizing the index data 2545 and some or all of filtering parameters 2556. Additional filtering of filtering step 2544 can optionally be applied to the output of IO step 2542, for example, to apply additional filtering parameters 2556 that could not be applied by utilizing the index data 2545 alone, to apply logical operators such as AND or OR operators indicated in the filtering parameters, and/or to apply additional filtering parameters 2556 for fields 2515 that were not indexed in index data 2545.

In some embodiments, some or all of the plurality of indexes can optionally correspond to fields that are not included in sub-records 2532 based on being stored instead via secondary storage system 2508. However, the corresponding values can optionally be indexed all the same. These indexes can be smaller than the corresponding data itself, and can be appropriate for storage in the primary storage system 2506 in sub-records 2532, along with the values of other fields 2515 of sub-records 2532.

This can further improve the technology of database systems by allowing data that is large and/or that can be indexed compactly to be efficiently stored, improving memory utilization. This can further improve the technology of database systems by enabling IO in query execution to be performed efficiently based on indexes for large fields, even if the values of these large fields are stored elsewhere. This can further improve the technology of database systems by ensuring, via the presence of indexes for these fields, that certain types of filtering conditions that would fail unless indexes were present do not fail to guarantee query correctness, while allowing these large data values to be stored elsewhere.

For example, as illustrated in FIG. 25E, index data 2545 includes indexes for field 2512.2, despite being included in the second subset of fields with values stored in secondary storage system 2508, and thus not having its values included in sub-records 2532. Index data 2545 can alternatively or additionally include indexes for fields of the first subset of the set of fields stored in primary storage system 2506, such as indexes for field 2512.1 as illustrated in FIG. 25E. Index data 2545 can optionally include index data for all fields of records 2422 and/or for only a proper subset of fields of records 2422.

Index data 2545 can include a plurality of indexes, where an index for field 2515.2 is generated for each sub-record 2532. For example, index data for field 2515.2 corresponding to a particular sub-record 2532 can indicate and/or be based on some or all of the value 2708; based on a range of values for the particular field; based on whether one or more particular substring values, words, and/or other small individual values are included within a full value, such as a large binary data and/or extensive text data, of the data value 2708; based on metadata, a file type, and/or a file name the value 2708 for field 2515.2 for the corresponding record 2422; and/or based on one or more other characteristics of the value 2708 for field 2515.2 for the corresponding record 2422, even though the data for this value of field 2515.2 is not stored as part of sub-record 2532. These indexes can be included in corresponding sub-records 2532, can be mapped to corresponding sub-records 2532, can be utilized to sort, organize, and/or structure the sub-records 2532 in primary storage system 2506, and/or can be utilized to determine storage location of corresponding sub-records 2532 in primary storage system 2506.

Indexes of index data 2545 corresponding to field 2515.2 can be generated based on their respective values in conjunction with the partitioning and/or extracting these values from the respective records 2422 to generate sub-records 2532. For example, as illustrated in FIG. 25E, the index generator module 2509 can be implemented in conjunction with the field-based record partitioning module 2530 to enable sub-records 2532 to be indexed for field 2515.2 as their respective values 2708 for field 2515.2 are extracted for storage in secondary storage system 2508. For example, as values 2708 of each given record 2422 are processed and/or extracted, via field-based record partitioning module 2530, into a corresponding sub-record 2532, and/or as its value 2708 for field 2515.2 is extracted and/or processed, via field-based record partitioning module 2530, for storage as a corresponding object 2562, the index generator module 2509 further generates one or more indexes for the corresponding sub-record 2532 based on this extracted value for field 2515.2. In other embodiments, the field-based record partitioning module 2530 can be implemented separately from the index generator module 2509. In some embodiments, the index generator module 2509 generates index data 2545 based on accessing values 2708 stored in secondary storage system 2508.

Furthermore, as values 2708 of field 2515.2 are extracted, an object generator module 2519 of the record storage module 2502 can generate corresponding objects 2562, and these objects can be sent to secondary storage system 2508 for storage. Alternatively, as values 2708 of field 2515.2 are extracted, these values can be sent to secondary storage system 2508 for storage, and the secondary storage system 2508 can implement the object generator module 2519 to generate the corresponding objects 2562.

The filtering parameters 2556 of a query expression that indicate filtering records 2422 based on field 2515.2 can be applied by leveraging this index data 2545, where at least some records are not read in IO step 2542 based on having indexes for field 2515.2 indicating these records do not meet field 2515.2-based requirements of filtering parameters 2556, and thus need not be accessed for further processing in the query. As illustrated in FIG. 25E, some or all of filtering step 2544 can be integrated within IO step 2542, where some records are not accessed via IO step 2542 based on utilizing index data 2545 to apply some or all filtering parameters 2556, for example, via an index probing operator of the query in IO step 2542.

For example, the filtering parameters 2556 indicate particular characteristics of the value of field 2515.2, that are required for the corresponding value 2515.2 to be included in the query resultant, such as requirements indicating the value of field 2515.2 must include a particular word or substring, have particular metadata, have particular time and/or date information relating to creation and/or access, have a particular file name or file type, and/or have other characteristics, for example, that are extracted from field 2515.2 to index sub-records 2532 and/or that correspond to query predicates in query expressions relating to field 2515.2.

For example, a first subset of sub-records 2532 can be grouped for storage together based on having same or similar indexes of index data 2545 based on the corresponding records 2422 having field 2515.2 values within a same range of values and/or with same and/or similar characteristics. A second subset of sub-records 2532 can be also grouped for storage together based on having same or similar indexes of index data 2545 based on the corresponding records 2422 having field 2515.2 values within a same first range of values and/or with same and/or similar first characteristics, but are grouped for separate storage from the first subset of sub-records based on the corresponding records 2422 of the second subset of records having field 2515.2 values within a same second ranges of values and/or with same or similar second characteristics, where the second ranges of values and/or second characteristics are different from the first range of values and/or the first characteristics. The first subset of sub-records 2532 can be stored via a first set of memory resources, via a first node 37, and/or are included within a same first segment 2424, while the second subset of sub-records 2532 are stored via a second set of memory resources that is distinct from the first set of memory resources, are stored via a second node 37 that is different from the first node 32, and/or are included within a same second segment 2424 that is different from the first segment. In query execution, the IO step 2542 can include accessing only the first subset of sub-records 2532 via the first set of memory resources and not the second subset of sub-records via the second set of memory resources based on the filtering records 2422 indicating that only records with field 2512.2 values within the first range of values, and/or not within the second range of values, be included in the query resultant, and/or based on the filtering records 2422 indicating that only records with field 2512.2 values with the first characteristics, and/or not with the second characteristics, be included in the query resultant.

Alternatively or in addition, one or more additional fields 2515 can be generated for inclusion in sub-records 2532 with values indicating some or all of this metadata and/or characteristics for the corresponding data value 2708 of field 2515.2. In such cases, these one or more additional fields 2515 can be indexed and/or can otherwise be utilized in applying filtering step 2544 to filter records based on field 2515.2, even though field 2515.2 need not be accessed.

In other embodiments, when filtering parameters indicate requirements relating to field 2515.2, data values of field 2515.2 can optionally be accessed via secondary storage system 2508 to perform some or all of filtering step 2544, where only data values of field 2515.2 meeting requirements of corresponding filtering parameters are retrieved and projected in the resultant.

Figure 25F:
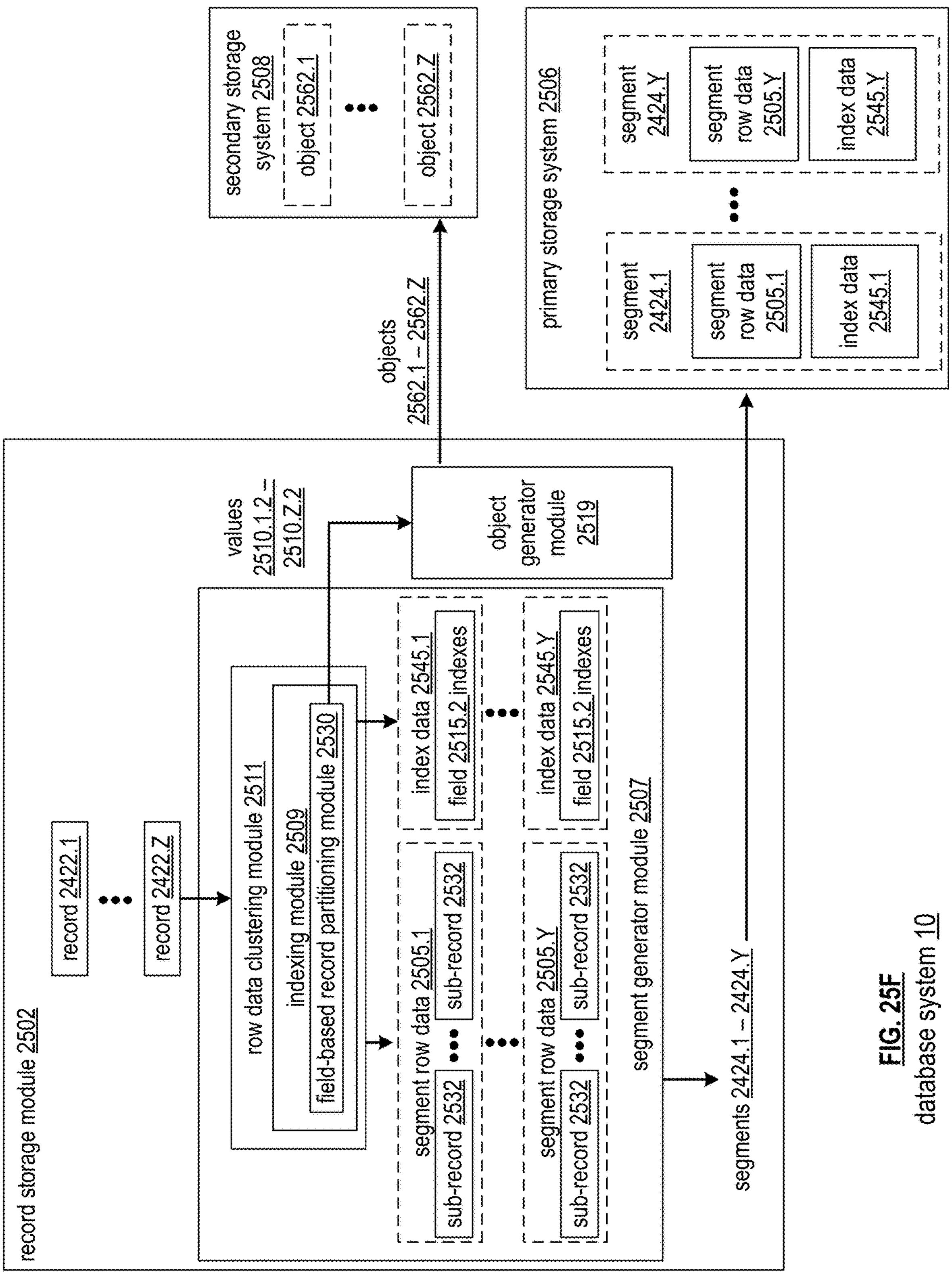
FIG. 25F is a schematic block diagram illustrating a record storage module that implements a row data clustering module in accordance with various embodiments.

FIG. 25F illustrates an example of a database system 10 that implements a segment generator module 2507 that groups sub-records 2532 for storage as segments 2424 in primary storage system 2506 Some or all features and/or functionality of the database system 10 of FIG. 25F can be utilized to implement the database system 10 of FIG. 25A and/or FIG. 25B, and/or any other embodiment of database system 10 described herein.

The segment generator module 2507 can implement a row data clustering module 2511. The row data clustering module 2511 can sort and/or group a plurality of records 2422, such as some or all records of dataset 2500, into a plurality of distinct groups of segment row data 2505. Each segment row data 2505 can be generated to include a distinct set of sub-records 2532, where sub-record is stored in included in exactly one segment row data 2505, and where every sub-record 2532 is included in a corresponding segment row data 2505. Different segment row data 2505 can include the same or different number of sub-records.

This can include generating a plurality of Y segment row data 2505.1-2505.Y by grouping sub-records 2532 into different segment row data 2505. This grouping of sub-records 2532 can be based on the value 2708 of one or more of fields 2515. This can include grouping sub-records 2532 into different segment row data 2505 based on the value 2708 of one or more of its fields 2515 included in the first subset of fields designated for storage via primary storage system. This can include grouping sub-records 2532 into different segment row data 2505 based on the value 2708 of one or more fields 2515 included in the second subset of fields designated for storage via secondary storage system.

For example, sub-records 2532 are grouped into different segment row data 2505 based on values 2708 of a single fields 2515 and/or a set of multiple fields corresponding to a primary key field and/or a cluster key field. For example, sub-records 2532 with same or similar values for the key field and/or a cluster key field are included in same segment row data, while sub-records 2532 with different values for the key field and/or a cluster key field are included in different segment row data. Alternatively or in addition, sub-records 2532 are grouped into different segment row data 2505 based on indexes generated for each sub-record 2532 in conjunction with generating the index data 2545 of FIG. 25E.

As a particular example, a similarity function, such as a Euclidian distance function and/or equality function can be utilized to measure a similarity between different ones of the plurality of records, for example, based on the values of one more fields designated for use in generating the segment row data 2505. Sets of records with most favorable similarities measured via the similarity function are grouped together in same segment row data 2505, while sets of records with less favorable similarities measured via the similarity function are grouped separately in different segment row data 2505. As another particular example, a clustering algorithm can identify a plurality of subsets of the sub-records 2532 for inclusion in a plurality of corresponding segment row data 2505 based on identifying records for each given subset of the plurality of subsets that have a favorable similarity score measured via the similarity function with other records in the given subset, for example, that compares favorably to a similarity score threshold. As another particular example, a clustering algorithm can identify the plurality of subsets of the sub-records 2532 for inclusion in a plurality of corresponding segment row data 2505 based on selecting a most similar group of records and/or a subset of records with a highest ranked similarity of some or all possible subsets of records for inclusion in a corresponding one of the segment row data 2505.

Each given segment row data 2505 can be further processed to generate a corresponding segment 2424. The segment row data 2505 and/or resulting segments 2424 can optionally be generated from a set of segment row data for a set of segments in a same segment group, for example, as discussed in conjunction with FIG. 27A.

For example, the segment row data 2505 and/or resulting segments 2424 are generated from a full set of sub-records 2532 in a same or similar fashion as discussed in conjunction with FIGS. 15-23. However, unlike the example of FIGS. 15-23, one or more columns of the original records 2422 are not included in the segment row data 2505, and are thus not included in the resulting segments 2424. For example, the field-based record partitioning module 2530 first extracts and/or removes these columns to generate the rows of FIGS. 15-23 as sub-records 2532 that do not include one or more columns, such as a column corresponding to field 2515.2.

The resulting segments 2424 can store the plurality of sub-records 2532 of its segment row data 2505, for example, in accordance with column-based format and/or in accordance with some or all features of the format discussed in conjunction with FIG. 23. The data values 2708 of the plurality of sub-records 2532 can be included in the data and parity section of FIG. 23. Parity data can be optionally generated for segment row data 2505 and can be further included in the data and parity section of FIG. 23. A manifest section, a plurality of index sections, and/or a statistics section can be further generated and included in resulting segments 2424.

Performance of IO step 2542 by query execution module 2504 to read values of sub-records 2532 can include accessing segment row data 2505 of some or all segments 2424, and reading the values of some or all fields for some or all sub-records 2532 in the segment row data 2505. For example, the record extraction module 2438 of query processing module is utilized to read sub-records 2532 from segments as discussed in conjunction with FIG. 25F. However, values of fields designated for storage in the secondary storage system 2508, such as field 2515.2, cannot be read from segments 2424 in IO step 2542 because the segments 2424 do not store the values for field 2515.2. These values are instead read via access to secondary storage system 2508 as discussed previously, for example, in performing projection step 2546.

The segment generator module 2507 can further implement an index generator module 2509 as discussed in conjunction with FIG. 25E, where each segments 2424 can further include and/or be mapped to index data 2545. For example, as illustrated in FIG. 25F, index data 2545.1-2425.Y can be generated, where each index data 2545 in the set of index data 2545.1-2425.Y corresponds to one of the set of segment row data 2505.1-2505.Y. In such cases, given index data 2545 can include indexes for and/or can be generated based on only sub-records 2532 included in the segment row data 2505 for the corresponding segment row data 2505. Each index data 2545 can be generated in a same or similar fashion as discussed in conjunction with FIG. 25F, where the row data clustering module 2511 is implemented by the segment generator module 2507 in conjunction with the index generator module 2509. The row data clustering module 2511 can optionally be implemented separately from the index generator module 2509, where index data 2545 is generated separately from generating segment row data 2505 and/or segments 2424.

Each index data 2545 can be mapped to and/or stored in conjunction with the corresponding segment 2424, for example in one or more index sections 0-x as discussed in conjunction with FIG. 23. The index data 2545 of a given segment can be accessed and utilized in performing IO step 2542 to read values of sub-records 2532 from the segment row data 2505 of the given segment. Performing IO step 2542 to read values of sub-records 2532 from the segment row data 2505 of segments 2424 can implement some or all of filtering step 2544 based on index data 2545 of the segment as discussed previously.

In particular, as illustrated in FIG. 25F, the index data 2545 for some or all segments can include indexes generated based on field 2515.2 of the second subset of the set of fields designated for storage in the secondary storage system 2508 as discussed in conjunction with FIG. 25F. In such embodiments, performing IO step 2542 to read values of sub-records 2532 from the segment row data 2505 of segments 2424 can implement some or all of filtering step 2544 to filter sub-records 2532 based on values 2708 of field 2515.2 for the corresponding record 2422 as discussed in conjunction with FIG. 25E. In other embodiments, the index data 2545 for some or all segments can alternatively or additionally include indexes generated based on fields of the first subset of the set of fields designated for storage in the primary storage system 2506, such as field 2515.1. In such embodiments, performing IO step 2542 to read values of sub-records 2532 from the segment row data 2505 of segments 2424 can implement some or all of filtering step 2544 to filter sub-records 2532 based on values 2708 of these fields, such as field 2515.1. for the corresponding sub-record 2532.

Figure 25G:
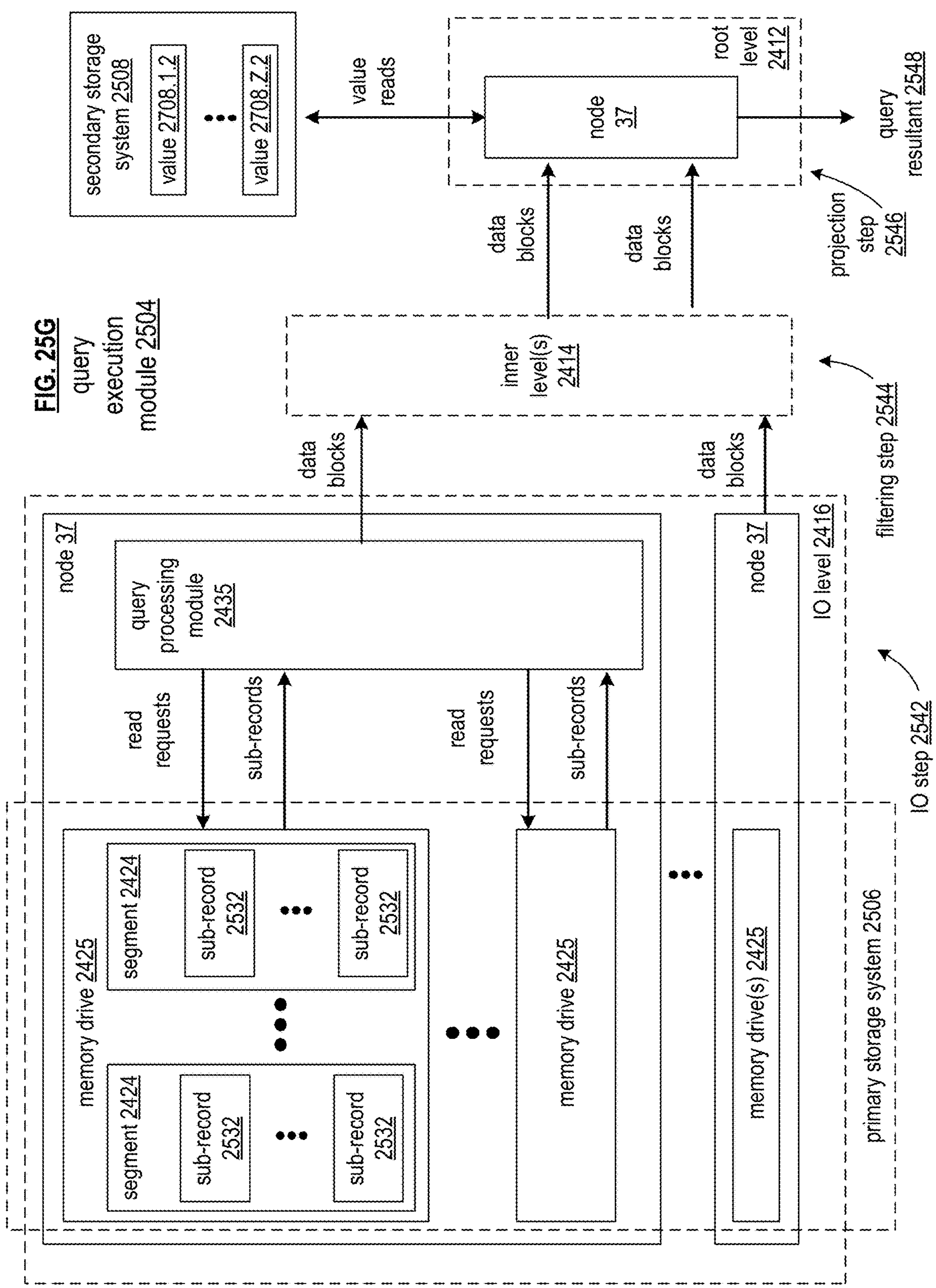
FIG. 25G is a schematic block diagram illustrating a plurality of nodes that implement a query execution module in accordance with various embodiments.

FIG. 25G illustrates an example of a query execution module 2504 of a database system 10 that is implemented via a plurality of nodes 37. Some or all features and/or functionality of the query execution module 2504 of FIG. 25G can be utilized to implement the query execution module 2504 of FIG. 25B. Some or all features and/or functionality of nodes 37 of the query execution module 2504 of FIG. 25G can be utilized to implement the plurality of nodes 37 of query execution plan 2405 of FIG. 24A and/or can be utilized to implement nodes 37 of FIGS. 24B-24D. Some or all features and/or functionality of nodes 37 of FIGS. 24A-24D can be utilized to implement some or all nodes 37 of FIG. 25G.

A query execution module 2504 can perform the IO step 2542 by utilizing a first plurality of nodes 37 participating at IO level 2416 of a query execution plan 2405. For example, this first plurality of nodes 37 is assigned for participation at IO level 2416 based on the query plan data 2554 generated by the query plan generator module 2550 and/or are assigned as discussed in conjunction with FIG. 24A.

Each of these nodes 37 participating at IO level 2416 can include one or more memory drives 2425 that each store one or more segments 2424. For example, these nodes are implemented to store and access segments 2424 as discussed in conjunction with FIG. 24B.

These segments 2424 can each include a plurality of sub-records 2532, such as the plurality of sub-records 2532 of corresponding segment row data 2505 of FIG. 25F. For example, the record storage module 2502 of FIG. 25F sends each segments 2424 to one node 37 for storage in a memory drive 2425 of the node 37, and/or a given node 37 otherwise receives the segment 2424 generated by the record storage module 2502 and stores the segment 2424 via at least one of its memory drives 2425. Thus, the memory drives 2425 of this first plurality of nodes 37 participating at IO level 2416 can implement some or all of the primary storage system 2506.

Performing the IO step 2542 can include each of this first plurality of nodes 37 participating at IO level 2416 of a query execution plan 2405 utilizing a query processing module 2435 to access some or all segments 2424 in their memory drives 2425 to read values of some or all fields of some or all sub-records 2532. For example, the first plurality of nodes 37 read values of some or all fields of some or all sub-records 2532 from segments 2424 in a same or similar fashion as discussed in conjunction with FIG. 24B. This can optionally include performing an index probing operation and/or utilizing index data 2545 of segments 2424 to access sub-records 2532 as discussed previously.

These nodes can send these values of some or all fields of some or all sub-records 2532 read from their segments 2424 to nodes 37 at an inner level 2414. For example, each node 37 sends these values as data blocks to one assigned parent node 37 as illustrated and discussed in conjunction with FIG. 24A. Each node 37 at one or more inner levels 2414 processes received data blocks from its children as illustrated and discussed in conjunction with FIG. 24 to apply filtering parameters 2556 and/or to otherwise facilitate performance of some or all of filtering step 2544 of the query.

Nodes 37 at a final inner level 2414 can send data blocks indicating the filtered subset of the set of sub-records to a root node 37 at root level 2412, for example, indicating the filtered record subset 2567. This root node can perform the projection step 2546 by accessing secondary storage system 2508 to read values 2708 of field 2515.2 based on the filtered record subset 2567 received in data blocks from its child nodes 37. The root node can emit the query resultant as one or more data blocks that include the values 2708 of field 2515.2 read from secondary storage system 2508. This can be ideal in minimizing a number of nodes 37 of a query execution plan 2405 that access the secondary storage system in query executions, which can be particularly ideal if access to secondary storage system 2508 is slower than access to primary storage system 2506, and/or can improve query execution efficiency by freeing up processing and/or memory utilization of other nodes 37 for use in executing other queries concurrently being processed by the query execution module 2504.

In other embodiments, the projection step 2546 is alternatively performed via a plurality of nodes 37 at one or more inner levels 2414. For example, each of a plurality of nodes 37 at an inner level 2414: receives its own portion of the filtered record subset 2567 from its children; accesses values 2708 of field 2515.2 for corresponding records 2422 by each accessing secondary storage system 2508; and/or emits its read values 2708 of field 2515.2 as a portion of the query resultant 2548. For example these values are emitted by each of these nodes as output data blocks sent to a root level node 2412, where the root level node emits the query resultant as a union of the values 2708 received from its children. This can be ideal in cases where retrieval of values 2708 from secondary storage system 2508 would take a lengthy amount of time if performed by a single node, for example, due to the large size of values 2708, where the execution time of queries is improved via implementing the projection step 2546 via plurality of nodes 37 accessing different values 2708 required for the query resultant in parallel.

In some embodiments, as illustrated in FIG. 25G, the secondary storage system 2508 is separate from node 37 at root level 2412 that implements the projection step 2546 and/or the nodes 37 at an inner level 2414 that that implements the projection step 2546. For example, one or more nodes 37 implement the projection step 2546 by communicating with secondary storage system 2508 via system communication resources 14, via one or more external networks 17, and/or via another wired and/or wireless network connection with secondary storage system 2508, to request the values 2708 from secondary storage system 2508, for example, via corresponding record identifiers 2564 as discussed in conjunction with FIG. 25C and/or to receive the requested values 2708 from secondary storage system 2508 in response. In other embodiments, one or more nodes 37 implement the secondary storage system 2508 via their own memory resources, such as one or more of its own memory drives 2425 that store the values 2708 of field 2515.2, and can implement the projection step 2546 implements the projection step 2546 by retrieving values 2708 via access requests to its own memory drives 2425.

Storing and/or accessing different fields of datasets via different storage mechanisms based on size and/or data type of different fields in this fashion as presented in FIGS. 25A-25G can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the record storage module 2502, the query execution module 2504, the primary storage system 2506, and/or the secondary storage system 2508 can be implemented by a large number, such as hundreds, thousands, and/or millions of computing devices 18, nodes 37, and/or processing core resources 48 that perform independent processes in parallel and/or in overlapping time spans, for example, with minimal or no coordination, to implement some or all of the features and/or functionality discussed in conjunction with FIGS. 25A-25G at a massive scale.

The partitioning of records for storage via different storage mechanisms and/or execution of queries by accessing different fields stored via different storage mechanisms as presented in FIGS. 25A-25G cannot practically be performed by the human mind, particularly when the database system 10 is implemented to store and perform queries against records at a massive scale as discussed previously. In particular, the human mind is not equipped to perform partitioning of records for storage via different storage mechanisms and/or execution of queries by accessing different fields different storage mechanisms for millions, billions, and/or trillions of records stored as many Terabytes, Petabytes, and/or Exabytes of data. Furthermore, the human mind is not equipped to distribute and perform partitioning of records for storage via different storage mechanisms and/or execution of queries by accessing different fields different storage mechanisms as multiple independent processes, such as hundreds, thousands, and/or millions of independent processes, in parallel and/or within overlapping time spans.

In various embodiments, a database system includes at least one processor and a memory that stores operational instructions. The operational instructions, when executed by the at least one processor, cause the database system to receive a plurality of records of a dataset for storage. Each of the plurality of records can include a plurality of values corresponding to a plurality of fields of the dataset. The operational instructions, when executed by the at least one processor, can further cause the database system to store, for each of the plurality of records, ones of the plurality of values corresponding to a first subset of the plurality of fields via a first storage mechanism. The operational instructions, when executed by the at least one processor, can further cause the database system to facilitate storage of, for each of the plurality of records, ones of the plurality of values corresponding to a second subset of the plurality of fields via a second storage mechanism based on a data type corresponding to the second subset of the plurality of fields. The second storage mechanism can be different from the first storage mechanism. The operational instructions, when executed by the at least one processor, can further cause the database system to determine a query for execution against the dataset; and/or to facilitate execution of the query. The operational instructions, when executed by the at least one processor, can further cause the database system to facilitate execution of the query by: accessing, via the first storage mechanism, values of at least one first field included in the first subset of the plurality of fields; accessing, via the second storage mechanism, values of at least one second field included in the second subset of the plurality of fields; and/or generating a query resultant for the query based on the values of the at least one first field and the values of the at least one second field.

Figure 25H:
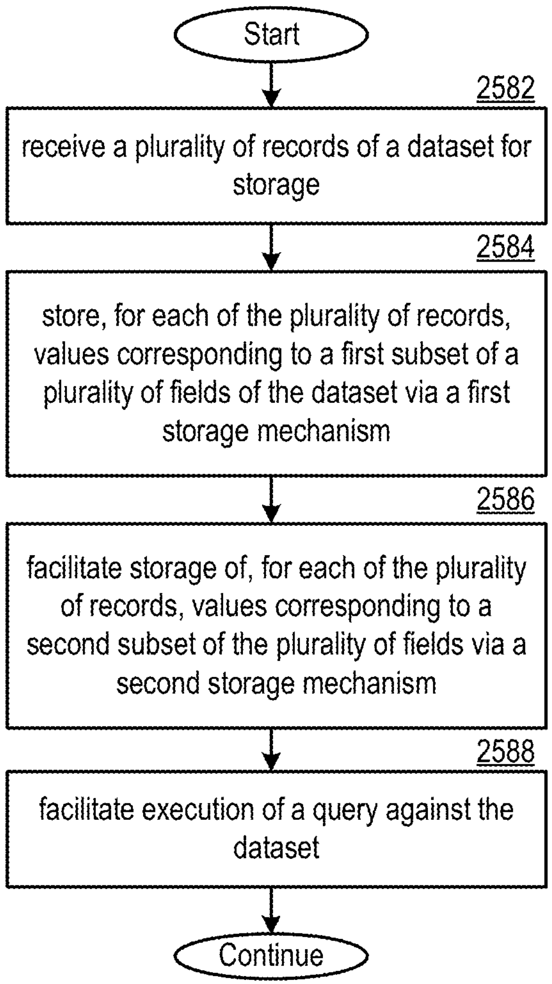
FIGS. 25H and 25I are logic diagrams illustrating a method of executing a query via access to records stored via multiple field-based storage mechanisms in accordance with various embodiments.
Figure 25I:
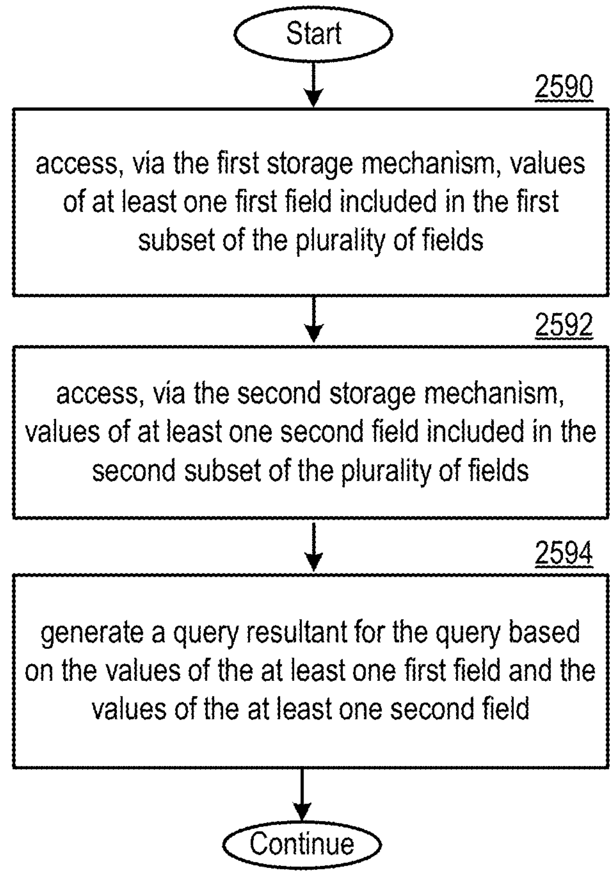

FIGS. 25H and FIG. 25I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25H and/or FIG. 25I. In particular, a node 37 can utilize the query processing module 2435 to execute some or all of the steps of FIG. 25H and/or FIG. 25I, where multiple nodes 37 implement their own query processing modules 2435 to independently execute some or all of the steps of FIG. 25H and/or FIG. 25I, for example, to facilitate execution of a query as participants in a query execution plan 2405. Some or all of the method of FIG. 25H and/or FIG. 25I can be performed by utilizing the record storage module 2502, the query processing system 2501, the primary storage system 2506, and/or the secondary storage system 2508 in accordance with some or all features and/or functionality described in conjunction with FIGS. 25A-25G. Some or all of the method of FIG. 25H and/or FIG. 25I can be performed via a query execution module 2504. Some or all of the steps of FIG. 25H and/or FIG. 25I can optionally be performed by any other processing module of the database system 10. Some or all of the steps of FIG. 25H and/or FIG. 25I can be performed to implement some or all of the functionality of the record storage module 2502, the query processing system 2501, the primary storage system 2506, and/or the secondary storage system 2508 as described in conjunction with FIGS. 25A-25D. Some or all of the steps of FIG. 25H and/or FIG. 25I can be performed to implement some or all of the functionality regarding execution of a query via the plurality of nodes in the query execution plan 2405 as described in conjunction with FIGS. 24A-24D. Some or all steps of FIG. 25H and/or FIG. 25I can be performed by database system 10 in accordance with other embodiments of the database system 10 and/or nodes 37 discussed herein.

Step 2582 includes receiving a plurality of records of a dataset for storage. Each of the plurality of records can include a plurality of values corresponding to a plurality of fields of the dataset. For example, the plurality of records corresponds to a plurality of rows of one or more relational database tables, and/or the plurality of fields correspond to a plurality of columns of one or more relational database tables. The plurality of records of the dataset can be received as a stream of records that are received and stored over time, and/or can be received as a bulk set of records that are received and stored at a given time. The plurality of records of the dataset can be received via a wired and/or wireless connection with a data source supplying plurality of records, such as one or more computing devices communicating with and/or integrated within database system 10.

Step 2584 includes storing, for each of the plurality of records, values corresponding to a first subset of the plurality of fields via a first storage mechanism. This can include storing ones of the plurality of values of each record that correspond to the first subset of the plurality of fields via the first storage mechanism. The first subset of the plurality of fields can be non-null, can include a single field, and/or can include multiple fields. The first storage mechanism can correspond to a first one or more storage locations; a first one or more storage drives, memory resources and/or computing devices; a first storage scheme; and/or a first storage and/or retrieval protocol. In some embodiments, storing the values corresponding to the first subset of the plurality of fields via the first storage mechanism includes storing the values in a set of memory devices integrated within the database system. The first storage mechanism can be implemented utilizing some or all features and/or functionality of the primary storage system 2506 of FIGS. 25A-25G.

Step 2586 includes facilitating storage of, for each of the plurality of records, values corresponding to a second subset of the plurality of fields via a second storage mechanism. This can include storing ones of the plurality of values of each record that correspond to the second subset of the plurality of fields via the second storage mechanism. The second storage mechanism can be implemented utilizing some or all features and/or functionality of the secondary storage system 2508 of FIGS. 25A-25G.

A set difference between the second subset of the plurality of fields and the first subset of the plurality of fields can be non-null. The second subset of the plurality of fields and the first subset of the plurality of fields can be collectively exhaustive with respect to the plurality of fields. The second subset of the plurality of fields and the first subset of the plurality of fields can be mutually exclusive. Alternatively, at least one field in the first subset of the plurality of fields, such as one or more fields of a key field and/or a unique set field set of can also be included in the second subset of the plurality of fields.

The second storage mechanism can be different from the first storage mechanism. In various embodiments, the first storage mechanism includes storage via a first set of memory devices, and the second storage mechanism includes storage via a second set of memory devices that are distinct from the first set of memory devices. For example, the second storage mechanism can correspond to: a second one or more storage locations that are different from some or all of the first one or more storage locations of the first storage mechanism; a second one or more storage drives of the first storage mechanism, memory resources and/or computing devices that are different from some or all of the first one or more storage drives, memory resources and/or computing devices of the first storage mechanism; a second storage scheme that is different from the first storage scheme of the first storage mechanism; and/or a second storage and/or retrieval protocol that is different from the first storage and/or retrieval protocol of the first storage mechanism. In various embodiments, the first set of memory devices correspond to a first access efficiency level, and the second set of memory devices correspond to a second access efficiency level that is less favorable than the first access efficiency level. In various embodiments, the first storage mechanism corresponds to a file storage system and/or utilizes a non-volatile memory access protocol, such as a non-volatile memory express (NVMe) protocol. In various embodiments, the second storage mechanism corresponds to an object storage system. In various embodiments, the second storage mechanism corresponds to a collection of binary data stored as a single entity, for example, via a database management system. In various embodiments, the second storage mechanism corresponds to a Binary Large Object (BLOB), basic large object, and/or binary data type storage system.

In some embodiments, the second storage mechanism can include physical hardware and/or a storage scheme that is integrated within and/or managed by the database system 10. In such embodiments, facilitating storage of the values corresponding to the second subset of the plurality of fields via the second storage mechanism can include the database system storing these values utilizing its own storage resources as one or more storage transactions. For example, storage values via the second storage mechanism includes storing these values as objects in an object storage system implemented by one or more computing devices and/or storage resources of the database system 10.

Alternatively, the second storage mechanism can include physical hardware and/or a storage scheme that is managed by a separate object storage service, a third party storage service, a cloud storage service, and/or another storage entity that is distinct from the storage resources of the database system 10 but is accessible by the database system 10 via a wired and/or wireless network connection. For example, an object storage service, such as Amazon Simple Storage Service (S3), Azure Blob storage, Google Cloud Platform (GCP), Oracle Cloud Infrastructure Object Storage service, IBM Cloud Object Storage, and/or other object storage services can be utilized to implement the second storage mechanism. In such cases, facilitating storage of the values corresponding to the second subset of the plurality of fields via the second storage mechanism includes sending these values to a server system associated with this object storage service, third party storage service, cloud storage service, and/or other storage entity for storage via the storage resources of the object storage service, third party storage service, cloud storage service, and/or other storage entity. Facilitating storage of the values corresponding to the second subset of the plurality of fields via the second storage mechanism can include receiving storage confirmation data indicating successful storage of these values from the object storage service, third party storage service, cloud storage service, and/or other storage entity. In some embodiments, storing the values corresponding to the first subset of the plurality of fields via the first storage mechanism can also include sending these values to the same or different object storage service, third party storage service, cloud storage service, and/or other storage entity for storage, rather than storing these values via storage resources of the database system 10.

The storage of values corresponding to a second subset of the plurality of fields via the second storage mechanism, rather than the first storage mechanism, can be based on a data type corresponding to the second subset of the plurality of fields and/or other characteristics of values of the data included in the second subset of the plurality of fields. For example, the storage of values corresponding to a second subset of the plurality of fields via the second storage mechanism can be based on the second subset of the plurality of fields meeting predefined criteria for storage via the second storage system.

The second subset of the plurality of fields can be non-null, can include a single field, and/or can include multiple fields. The second subset of the plurality of fields can be null for some datasets stored via the database system, for example, based on determining none of the plurality of fields of the datasets have data types meeting the predefined criteria for storage via the second storage system.

The second subset of the plurality of fields can be automatically selected; can be predetermined; can be configured via user input; can be determined based on accessing information identifying the second subset of the plurality of field in memory; can be determined based on receiving information identifying the second subset of the plurality of fields; can be configured via administration sub-system 15 and/or configuration sub-system 16; and/or can otherwise be determined. The second subset of the plurality of fields can be automatically selected based on determining whether field in the plurality of fields meets the predefined criteria for storage via the second storage system, where fields that meet the predefined criteria for storage via the second storage system are included in the second subset of the plurality of fields.

In various embodiments the method includes receiving configuration data generated based on user input, and further includes determining the second subset of the plurality of fields based on the configuration data indicating selection of the second subset of the plurality of fields. The configuration data can be generated via a client device and/or another computing device communicating with the database system 10 and/or integrated within the database system 10, for example, based on user input to the client device in response to one or more prompts presented via an interactive user interface displayed via a display device of the client device. The configuration data can include identifiers indicating exactly which ones of the plurality of fields of a particular dataset be included in the second subset. The predefined criteria for storage via the second storage system can correspond to fields that are configured for storage via the second storage system in the configuration data. The configuration data can alternatively include other information, such as the predefined criteria for storage via the second storage system, indicating how fields of various datasets received by the database system for storage be automatically identified for inclusion in the second subset.

In various embodiments, some or all of the second subset of the plurality of fields correspond to an unstructured data type. The method can include selecting the second subset of the plurality of fields based on identifying at least one of the plurality of fields that corresponds to an unstructured data type. The predefined criteria for storage via the second storage system can indicate fields with unstructured datatypes be stored via the second storage system. In such embodiments, some or all of the first subset of the plurality of fields can correspond to a structured data type. For example, the first subset of the plurality of fields are not selected for storage via the second storage mechanism based on having structured data types.

In various embodiments, some or all of the second subset of the plurality of fields correspond to fields that exceed and/or otherwise compare unfavorably to a data size threshold. The data size threshold can be automatically selected; can be predetermined; can be configured via user input; can be determined based on accessing information identifying the data size threshold in memory; can be determined based on receiving information identifying the data size threshold; can be configured via administration sub-system 15 and/or configuration sub-system 16; and/or can otherwise be determined. The method can include selecting the second subset of the plurality of fields based on identifying at least one of the plurality of fields that compares unfavorably to the data size threshold. For example, the at least one of the plurality of fields is determined to compare unfavorably to the data size threshold based on: having values for all records exceeding the data size threshold; having no bounds limiting a size of the value to fall within the data size threshold; based on the field corresponding to an unstructured data type; having values for at least one record exceeding the data size threshold; having values with an average data size exceeding the data size threshold; and/or based on other criteria. The predefined criteria for storage via the second storage system can indicate fields that compare unfavorably to the data size threshold be stored via the second storage system. In such embodiments, some or all of the first subset of the plurality of fields can fall within, and/or otherwise compare favorably to, the data size threshold. For example, the first subset of the plurality of fields are not selected for storage via the second storage mechanism based on comparing favorably to the data size threshold.

In various embodiments, some or all of the second subset of the plurality of fields correspond to long and/or variable-length binary data, long and/or variable-length string data, audio data, image data, video data, and/or multimedia data. The method can include selecting the second subset of the plurality of fields based on identifying at least one of the plurality of fields that corresponds to long and/or variable-length binary data, long and/or variable-length string data, audio data, image data, video data, and/or multimedia data. The predefined criteria for storage via the second storage system can indicate fields be stored via the second storage system if they correspond to: long and/or variable-length binary data, long and/or variable-length string data, audio data, image data, video data, and/or multimedia data. In such embodiments, some or all of the first subset of the plurality of fields do not correspond to long and/or variable-length binary data, long and/or variable-length string data, audio data, image data, video data, and/or multimedia data. For example, the first subset of the plurality of fields are not selected for storage via the second storage mechanism based on not corresponding to long and/or variable-length binary data, long and/or variable-length string data, audio data, image data, video data, and/or multimedia data.

In various embodiments, some or all of the second subset of the plurality of fields correspond to sensitive data fields and/or data fields with values requiring encryption. The method can include selecting the second subset of the plurality of fields based on identifying at least one of the plurality of fields that corresponds to sensitive data fields and/or data fields with values requiring encryption. Determining whether a field is sensitive and/or requires encryption can be based on: an automatic selection; predetermined information; configuration of these fields via user input; accessing information identifying which fields require encryption in memory; receiving information identifying which fields require encryption; configuration via administration sub-system 15 and/or configuration sub-system 16; and/or another determination. The method can further include generating encrypted data corresponding to the at least one of the plurality of fields for each of the plurality of records. The predefined criteria for storage via the second storage system can indicate fields be stored via the second storage system if they correspond to sensitive data fields and/or correspond to data fields with values requiring encryption. Facilitating storage of the ones of the plurality of values corresponding to the second subset of the plurality of fields via the second storage mechanism for each of the plurality of records can include storing the encrypted data corresponding to the at least one of the plurality of fields via the second storage mechanism. In such embodiments, some or all of the first subset of the plurality of fields do not correspond to sensitive data fields and/or do not have values requiring encryption. For example, the first subset of the plurality of fields are not selected for storage via the second storage mechanism based on not corresponding to sensitive data fields and/or do not having values requiring encryption.

Step 2588 includes facilitating execution of a query against the dataset. The query for execution against the dataset can be received and/or otherwise determined. The method can include receiving and/or determining the query. The query can correspond to a query expression entered and/or selected via user input, such as a SQL query expression and/or a query expression written in any query language. The query can be generated via a client device and/or another computing device communicating with the database system 10 and/or integrated within the database system 10, for example, based on user input to the client device in response to one or more prompts presented via an interactive user interface displayed via a display device of the client device.

Performing step 2588 of FIG. 25H can include performing some or all of steps 2590, 2592, and/or 2594 of FIG. 25I. Step 2590 includes accessing, via the first storage mechanism, values of at least one first field included in the first subset of the plurality of fields. Step 2592 includes accessing, via the second storage mechanism, values of at least one second field included in the second subset of the plurality of fields. Step 2594 includes generating a query resultant for the query based on the values of the at least one first field and the values of the at least one second field. The at least one first field can include a single field or multiple fields. The at least one second field can include a single field or multiple fields.

The method can further include displaying the query resultant via a display device and/or sending the query to another computing device for display and/or further processing. For example, the query resultant is sent to the client device that sent the query expression or otherwise requested the query. The query resultant can be displayed via the interactive user interface of the client device and/or via a display device of the client device.

In various embodiments, the method further includes identifying a subset of the plurality of records with values of the at least one first field that compares favorably to filtering parameters of the query. The query resultant can be generated to include a set of values of the at least one second field corresponding to only ones of the plurality of records included in the subset of the plurality of records.

In various embodiments, the plurality of fields of the dataset includes a unique identifier field set, where the unique identifier field set is included in the first subset of the plurality of fields, and/or where the unique identifier field set is included in the second subset of the plurality of fields. The unique identifier field set can include one or more fields that are guaranteed to have values unique to the corresponding record in the plurality of records. In some embodiments, the unique identifier field set includes a proper subset of fields of the first subset of the plurality of fields. In some embodiments, the unique identifier field set includes all fields of the first subset of the plurality of fields.

In various embodiments, facilitating execution of the query further includes identifying a set of unique identifier values by retrieving, via the first storage mechanism, values of the unique identifier field set for only records in the subset of the plurality of records. Facilitating execution of the query can further include identifying the set of values by retrieving, via the second storage mechanism, values of the second subset of the plurality of fields for only records of the plurality of records having one of the set of unique identifier values.

In various embodiments, facilitating execution of the query further includes identifying a first relational table that includes values of a union of the at least one first field and the unique identifier field set for records in the subset of the plurality of records. Facilitating execution of the query can further include identifying a second relational table that includes values of a union of the at least one second field and the unique identifier field set for records in the plurality of records. Facilitating execution of the query can further include performing a join operation upon the first relational table and the second relational table to identify the set of values, where a join predicate of the join operation indicates equality of values for the unique identifier field set of the first table and for the unique identifier field set of the second table. The set of values can correspond to only ones of the at least one second field that are outputted via execution of the join operation.

In various embodiments, the second storage mechanism corresponds to an object storage system. Facilitating storage of ones of the plurality of values corresponding to the second subset of the plurality of fields via the second storage mechanism can include, for each record of the plurality of records, facilitating storage of the value for the at least one second field of the each record as a corresponding object in the object storage system. Facilitating storage of ones of the plurality of values corresponding to the second subset of the plurality of fields via the second storage mechanism can include, for each record of the plurality of records, facilitating storage of the value of the unique identifier field set of the each record as object metadata of the corresponding object in the object storage system. The set of values can be identified based on identifying a corresponding set of objects in the object storage system with object metadata indicating a value of unique identifier field set that matches a corresponding one of the set of unique identifier values.

In various embodiments, the method can further include determining the filtering parameters and the at least one first field based on a query expression of the query indicating the filtering parameters be applied to the at least one first field. For example, the filtering parameters are indicated as one or more query predicates, and/or are included as predicates and/or parameters following a WHERE clause of a SELECT statement. The filtering parameters can correspond to a selection portion of the query expression and/or can indicate criteria defining which records be included in and/or utilized to generate the query resultant.

In various embodiments, the method can further include determining the at least one second field based on the query expression of the query indicating projection and/or output of the at least one second field. For example, the query expression indicates values of the at least one second field be included in the query resultant and/or be utilized to generate the query resultant for any records that meet the filtering parameters. The at least one second field can be indicated for projection in a SELECT statement of the query expression.

In various embodiments, selecting the second subset of the plurality of fields is based on identifying at least one of the plurality of fields that corresponds to a projection-only column type for the dataset. The projection-only column type can be configured, predefined as the criteria for a field being included in the second subset of the plurality of fields, and/or can be otherwise determined. The second subset of the plurality of fields can include the at least one second field based on determining the at least one second field corresponds to the projection-only column type. The filtering parameters of the query are not applied to the at least one second field based on the at least one second field corresponding to the projection-only column type.

In various embodiments, the method can further include generating query expression restriction data indicating the at least one of the plurality of fields that corresponds to the projection-only column type for the dataset. The query expression restriction data to a client device, for example, for display, storage and/or for use in conjunction with execution of application data corresponding to the database system via the client device. The method can include receiving the query expression from the client device, where the client device generated the query expression based on user input and further based on the query expression restriction data. As a particular example, the client device can disallow sending of and/or execution requests for query expressions that include filtering parameters that utilize columns identified as projection-only columns for the dataset based on their indication in the query expression restriction data. The user can be prompted to edit and/or re-enter queries based on the user having entered and/or requested a query expression that includes filtering parameters utilizing columns identified as projection-only columns via the interactive user interface. The client device can send query expressions for execution via the database system only if they do not include filtering parameters utilizing columns identified as projection-only columns and/or if they otherwise adhere to the query expression restriction data. Alternatively or in addition, the database system only executes received query expressions if they do not include filtering parameters utilizing columns identified as projection-only columns and/or if they otherwise adhere to the query expression restriction data.

In various embodiments, the method includes generating a first plurality of indexes corresponding to the at least one first field. The method can further include generating a second plurality of indexes corresponding to the at least one second field. In some cases, some or all individual fields of the first subset of the plurality of fields and/or the second subset of the plurality of fields are indexed, separately or in conjunction, via a corresponding plurality of indexes. Storage of the ones of the plurality of values of the first subset of the plurality of fields via the first storage mechanism can include storing values of first subset of the plurality of fields in conjunction with the first plurality of indexes and the second plurality of indexes via the first storage mechanism. For example, an indexing scheme is utilized to store the values of the first subset of the plurality of fields based on the first plurality of indexes and/or the second plurality of indexes.

The second plurality of indexes can be generated based on values and/or other information in the at least one second field. For example, the values of first subset of the plurality of fields for each given record are clustered, organized, and/or are otherwise stored and/or indexed in accordance with indexes generated based on the original values of at least one second field of the given record. The second plurality of indexes can be substantially smaller than and/or can be stored more efficiently than the original values of the corresponding at least one second field.

In such embodiments, the query expression of the query can further indicate the filtering parameters be applied to the at least one second field. In some cases, the query expression of the query can indicate the filtering parameters be applied to only the at least one second field and not to any fields in the first subset of the plurality of fields. The subset of the plurality of records can be identified based on utilizing the second plurality of indexes, where the subset of the plurality of records is filtered by applying filtering parameters to regarding the at least one second field. In some embodiments, the actual values of the at least one second field are not accessed via the second storage mechanism, despite the filtering parameters involving these fields, yet the query is executed correctly due to the generation and use of the second plurality of indexes via access of records via the first storage mechanism to determine the subset of the plurality of records.

In various embodiments, storing the ones of the plurality of values corresponding to the first subset of the plurality of fields via the first storage mechanism for each of the plurality of records includes generating a plurality of segments corresponding to a plurality of mutually exclusive proper subsets of the plurality of records. Each of the plurality of segments stores, in accordance with a column-based format, the values corresponding to the first subset of the plurality of fields for records included in a corresponding one of the plurality of mutually exclusive proper subsets of the plurality of records. Each segment can be included in a segment group that includes a set of multiple segments. In such cases, each segment can further include parity data utilized to recover other segments in the same segment group.

In various embodiments, storing the ones of the plurality of values corresponding to the first subset of the plurality of fields via the first storage mechanism for each of the plurality of records includes storing the plurality of segments via a plurality of computing devices of the first storage mechanism. Facilitating execution of the query can include identifying, via each of the plurality of computing devices, a computing device subset of the plurality of records with values of the at least one first field that compares favorably to filtering parameters of the query based on accessing ones of the plurality of segments stored by the each of the plurality of computing devices, where the subset of the plurality of records is identified as a union of a plurality of computing device subsets identified via the plurality of computing devices.

For example, the subset of the plurality of records is identified by a particular node based on data blocks received from each of a set of child nodes in a query execution plan as discussed in conjunction with FIGS. 24A-24D. The data blocks received from a given child node indicate only ones of the set of records stored by and/pr accessible by the node that meet filtering parameters of the corresponding query. In such cases, the parent node can facilitate projection of the set of values included in the resultant via accessing these values via the second storage mechanism. For example, accessing values of the at least one second field via the second storage mechanism is performed as an intermediate and/or final step of the query execution via one or more inner level nodes and/or a root level node after the filtered subset of records is first identified based on a union of subsets generated by a plurality of IO level nodes.

Alternatively, each IO level node and/or multiple inner level nodes can optionally retrieve their own subset of projected values, via accessing values of the at least one second field via the second storage mechanism, based on first identifying their own subset of their own stored records by applying the filtering parameters, where these projected values are included in data blocks emitted by these nodes, and where a parent node, such as a root level node, identifies the query resultant as a union of projected values received from a set of child nodes.

In various embodiments, a non-transitory computer readable storage medium includes at least one memory section that stores operational instructions that, when executed by a processing module that includes a processor and a memory, causes the processing module to: receive a plurality of records of a dataset for storage, where each of the plurality of records include a plurality of values corresponding to a plurality of fields of the dataset; store, for each of the plurality of records, ones of the plurality of values corresponding to a first subset of the plurality of fields via a first storage mechanism; facilitate storage of, for each of the plurality of records, ones of the plurality of values corresponding to a second subset of the plurality of fields via a second storage mechanism that is different from the first storage mechanism based on a data type corresponding to the second subset of the plurality of fields; determining a query for execution against the dataset; and/or facilitate execution of the query. The operational instructions, when executed by the processing module that includes a processor and a memory, can cause the processing module to facilitate execution of the query by: accessing, via the first storage mechanism, values of at least one first field included in the first subset of the plurality of fields; accessing, via the second storage mechanism, values of at least one second field included in the second subset of the plurality of fields; and/or generating a query resultant for the query based on the values of the at least one first field and the values of the at least one second field.

Figure 26A:
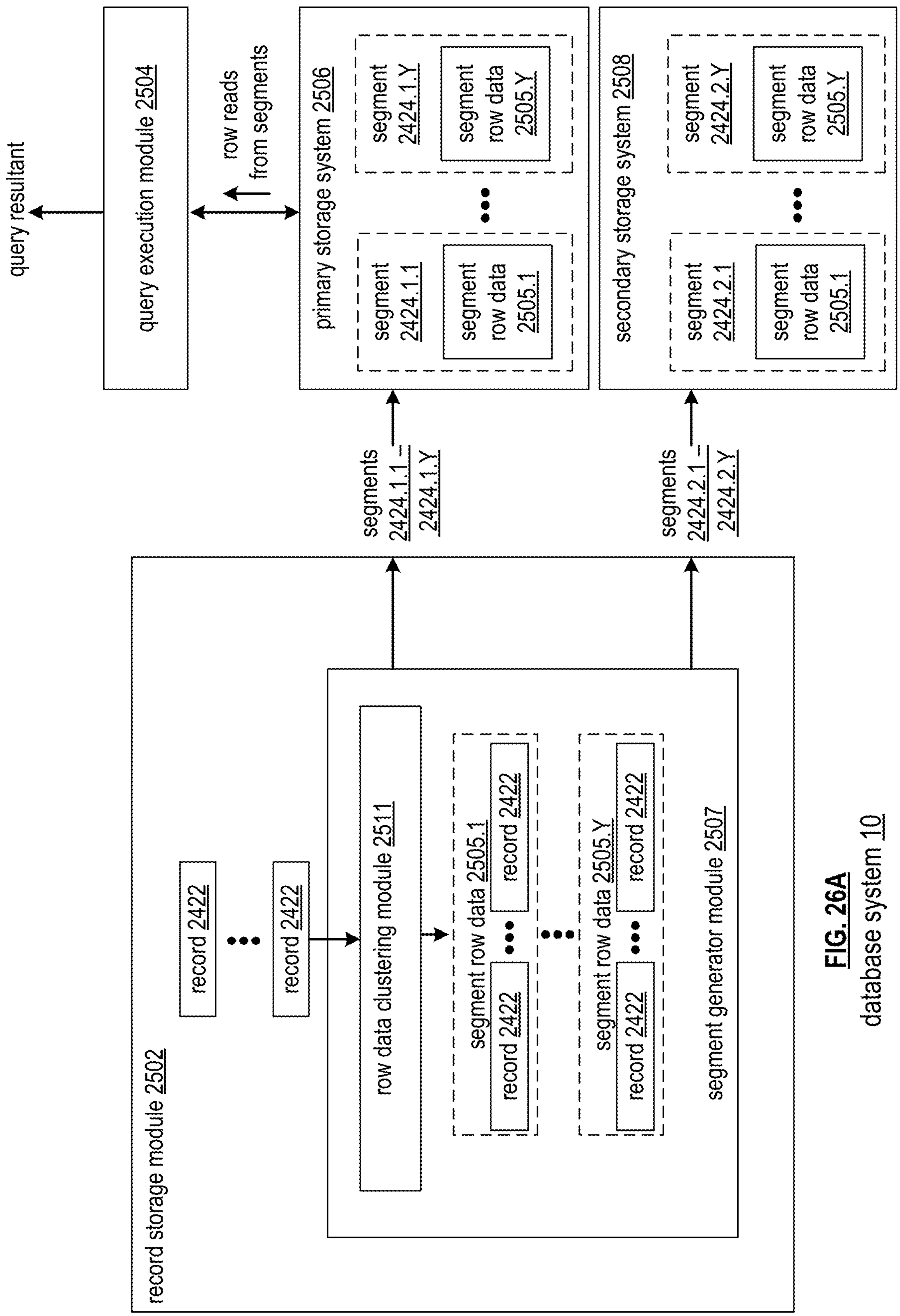
FIG. 26A is a schematic block diagram illustrating a record storage module that in accordance with various embodiments.
Figure 26B:
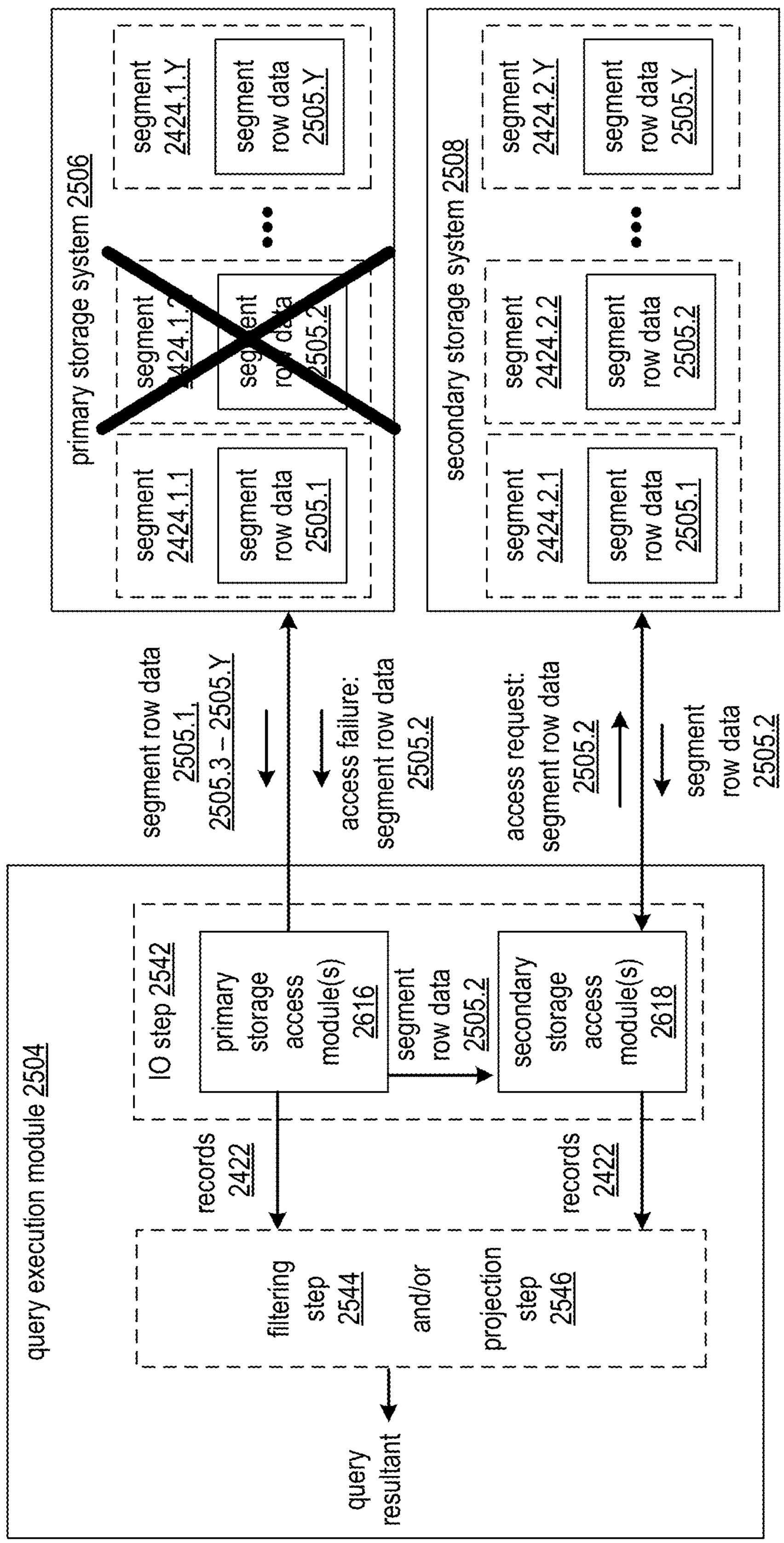
FIG. 26B is a schematic block diagram illustrating a query execution module in accordance with various embodiments.
Figure 26C:
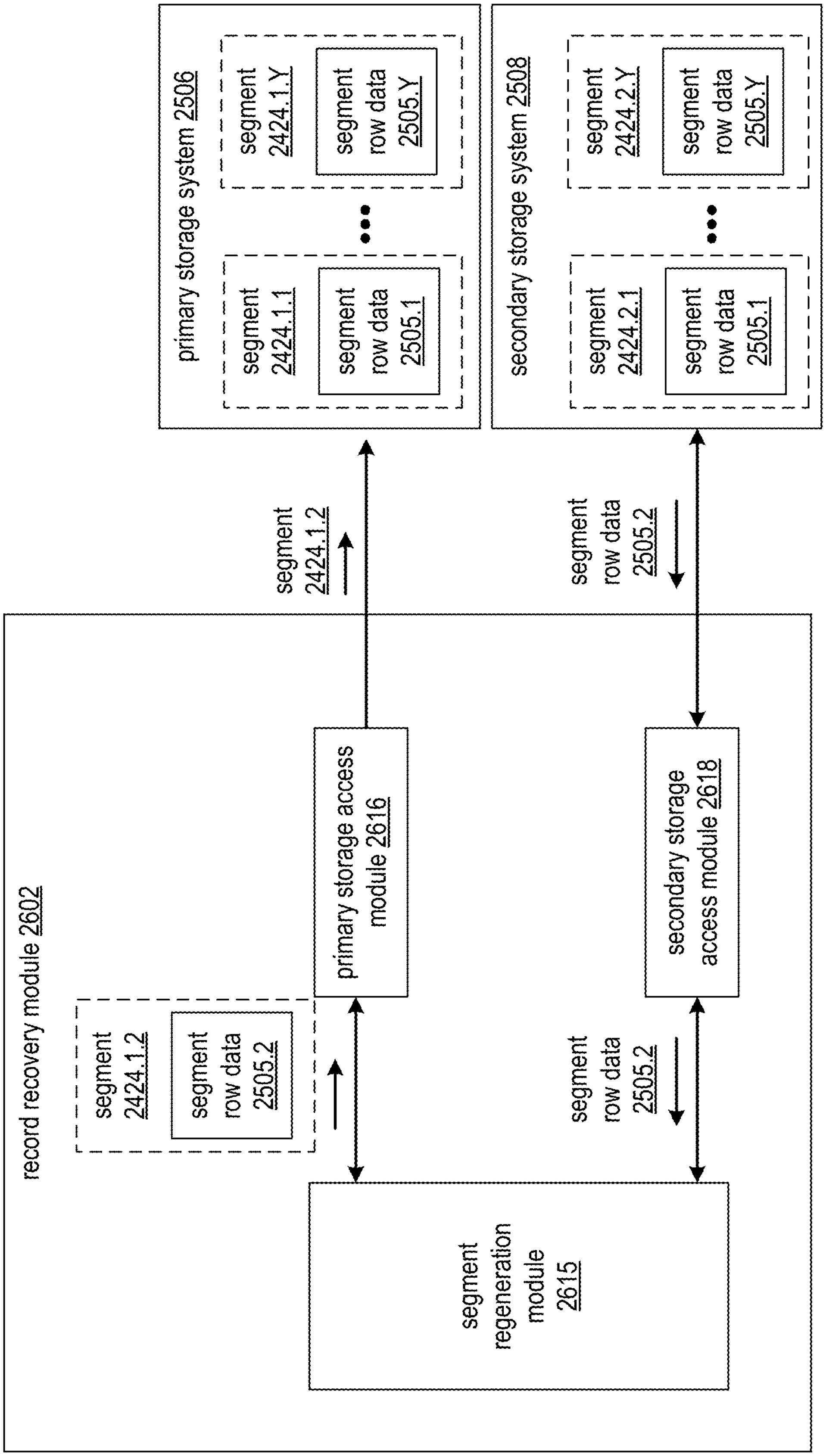
FIG. 26C is a schematic block diagram illustrating a record recovery module in accordance with various embodiments.

FIGS. 26A-26C illustrate another embodiment of a database system that stores and access records via multiple storage mechanisms. Alternatively or additionally to storing different fields of records via a primary storage system 2506 and a secondary storage system 2508 as discussed in conjunction with FIGS. 25A-25I, the database system 10 can be implemented to store segment row data that includes values for some or all fields of records 2422 of one or more datasets via a primary storage system 2506 and a secondary storage system 2508. Some or all features and/or functionality of the database system 10 of FIGS. 26A-26C can be utilized to implement the database system 10 of FIG. 1 and/or FIG. 1A, and/or any other embodiments of the database system 10 described herein.

In some embodiments, alternatively or in addition to generating segments in same segment groups of multiple segments for recovery with parity data, a segment can be generated such that every segment is written once to a primary storage system 2506 and once to a secondary storage system 2508. For example, the primary storage system 2506 can be implemented as a long term storage system and/or a plurality of NVMe drives that are accessed to implement query execution in all, most, and/or normal conditions, while the secondary storage system 2508 can be implemented as an object storage system and/or a plurality of spinning disks that are accessed to implement query execution in abnormal condition, rarely, and/or never. For example, the primary purpose of the primary storage system 2506 can be to facilitate query executions, while the primary purpose of the secondary storage system 2508 can be to redundantly store the records for access and/or recovery if a failure of storage resources and/or access to records via the primary storage system 2506 occurs. The primary storage system 2506 can be implemented via any features and/or functionality of the primary storage system 2506 discussed in conjunction with FIGS. 25A-25G and/or the secondary storage system 2508 can be implemented via any features and/or functionality of the secondary storage system 2508 discussed in conjunction with FIGS. 25A-25G.

Data stored via the secondary storage system 2508 can be stored in accordance with a higher durability than data stored via the primary storage system 2506. For example, the secondary storage system 2508 is implemented utilizing multi-site durability and/or otherwise enables restoring the data via a different site if necessary. In some embodiments, the primary storage system 2506 is not implemented utilizing multi-site durability and/or otherwise does not enable restoring the data via a different site. For example, recovery of data stored via the primary storage system 2506 requires corresponding data to be accessed via the secondary storage system 2508.

In such embodiments, nodes 37 that implement the primary storage system 2506 and/or the query execution module 2504 optionally do not implement the functionality of FIG. 24D and/or otherwise do not participate in the recovery of segments 2424. The functionality of FIG. 24D and/or other recovery of segments 2424 can optionally be performed instead by different nodes 37 that implement the secondary storage system 2508 and/or other processing and/or memory resources of the secondary storage system 2508.

Storing records via a primary storage system 2506 and secondary storage system 2508 in this fashion improves the technology of database system by increasing the efficiency of storage and/or processing resources utilized to facilitate query executions. For example, memory drives 2425 of nodes 37 of IO level 2416 utilized to implement the primary storage system and/or a plurality of NVMe drives utilized to implement the primary storage system are treated as more transient storage and/or are not utilized to rebuild data. This can enable these storage and/or processing resources to direct all resources upon executing queries rather than durably storing data and/or recovering data, improving the efficiency of query executions.

Meanwhile, as this data is durably stored and recoverable via the secondary storage system 2508, query correctness can still be guaranteed and/or data is guaranteed to be recoverable based on a fault-tolerance level dictated by the durability and/or storage scheme of the secondary storage system 2508. Processing and/or memory resources of the secondary storage system 2508, such as a distinct set of computing devices 18 that are separate from computing devices 18 with nodes 37 that implement the query execution module 2405, can perform rebuilds and/or recover data as failures occur, ensuring all data remains accessible while not affecting normal performance in query execution and/or without affecting performance of nodes 37 implementing the query execution module 2405.

Storing records via a primary storage system 2506 and secondary storage system 2508 in this fashion can further improve the technology of database system by implementing redundancy via memory resources of the secondary storage system 2508, such as an object storage system and/or a plurality of spinning disks, that are less expensive than memory resources of the primary storage system 2506, such as a plurality of NVMe drives. Storing records via a primary storage system 2506 and secondary storage system 2508 in this fashion can further improve the technology of database system by implementing redundancy via memory resources of the secondary storage system 2508, such as an object storage system and/or a plurality of spinning disks, that enable less efficient access than memory resources of the primary storage system 2506, such as a plurality of NVMe drives In particular, the higher access efficiency resources are accessed to perform query executions, which occur more frequently and/or which require faster access to ensure queries are performed efficiently and/or in a timely fashion, while lower cost resources are utilized to perform data rebuilds for failures that occur less frequently and/or that do not need to be completed in a timely fashion.

Storing records via a primary storage system 2506 and secondary storage system 2508 in this fashion can further improve the technology of database system by enabling smaller segment groups to be generated. In particular, rather than generating segments via segment groups that includes a larger number of segments to improve fault-tolerance in cases where segments become unavailable as discussed previously, same or similar levels of fault-tolerance can be achieved via redundant storage via the secondary storage system 2508. Thus the segments generated for storage via the via the primary storage system 2506 and/or the secondary storage system 2508 can be in accordance with a segment group that includes a single segment and/or a smaller number of segments. Enabling segment generation via segment groups that includes a smaller number of segments can improve the clustering attained by each segment group and/or each individual segment, and/or can reduce the number of records required for processing into segments at a given time. This reduction in records required to generate segments of a segment group at a given time can increase the rate at which incoming data is redundantly stored via the database system 10 and/or can increase the rate at which incoming data becomes available for access in query executions. This reduction in records required to generate segments of a segment group at a given time can reduce the amount of memory resources required to generate segments at a given time, for example, where a smaller number of nodes are allocated to generate segments, allowing other nodes to be utilized to perform other tasks of the database system 10, thus improving efficiency of performance of these other tasks.

This functionality can also be particularly useful in massive scale databases implemented via large numbers of nodes, as the efficiency of IO level nodes is improved, and/or the resource allocation of individual nodes is improved to further increase efficiency of query executions facilitated across a large number of nodes, for example, participating in a query execution plan 2405 as discussed in conjunction with FIG. 24A. This can further improve the technology of database systems by enabling processing efficiency and/or memory resource allocation to be improved for many independent elements, such as a large number of nodes 37, that operate in parallel to ensure data is stored and/or that queries are executed within a reasonable amount of time, despite the massive scale of the database system, while ensuring that data is still recoverable in the case of failure.

FIG. 26A illustrates an embodiment of a database system 10 that generates and stores segments via a primary storage system 2506 and a secondary storage system 2508. Some or all features and/or functionality of the database system 10 of FIG. 26A can be utilized to implement the database system of FIG. 1, of FIG. 1A, and/or of any other embodiment of database system 10 described herein.

The database system can implement a record storage module 2502. The record storage module 2502 of FIG. 26A can be implemented utilizing some or all features and/or functionality of the record storage module 2502 discussed in conjunction with FIGS. 25A-25G and/or FIG. 27A. The record storage module 2502 of FIG. 26A can optionally operate in a different fashion from the record storage module 2502 discussed in conjunction with FIGS. 25A-25G and/or FIG. 27A.

The record storage module 2502 can receive a plurality of records 2422, for example, of one or more datasets 2500. Each record 2422 can include data values for some or all of a plurality of fields of a corresponding dataset 2500 as discussed previously.

A segment generator module 2507 can generate segments 2424 for storage via primary storage system and secondary storage system from the plurality of records. The segment generator module 2507 can be implemented in a same or similar fashion as the segment generator module 2507 of FIG. 25F.

A row data clustering module 2511 can generate a plurality of segment row data 2505.1-2505.Y from the plurality of records 2422, for example, in a same or similar fashion as the row data clustering module 2511 of FIG. 25F. Unlike the embodiment of FIG. 25F, each segment row data 2505 can optionally full records 2422, where values of all fields of each record are included. This can include performing a similarity function, clustering algorithm, and/or grouping records based on values of one or more fields, such as primary key fields and/or cluster key fields. This can include performing some or all functionality discussed in conjunction with FIGS. 15-23.

In some embodiments, a plurality of sets of segment row data 2505 can each correspond to one of a plurality of segment groups, where each segment group includes a same number of segment row data 2505, and/or where each segment row data 2505 is included in exactly one segment group. In such embodiments, segments 2424 can further include parity data, such as parity data 2426, which can be utilized to rebuild segments 2424, for example, as discussed in conjunction with FIG. 25D. For example, segments 2424 are generated to include parity data 2426 based on a set of segment row data 2505 included in a same segment group by performing a redundancy storage encoding function in accordance with a redundancy storage encoding scheme. As a particular example, segment groups and/or parity data are generated in a same or similar fashion as discussed in conjunction with FIG. 27A by performing a corresponding redundancy storage encoding function, where parity data is included in corresponding segments rather than being stored separately.

In some embodiments, a single set of segments 2424.1-2424.Y that include a plurality of records are generated, and this single set of segments 2424.1-2424.Y is stored once in primary storage system 2506 and once in secondary storage system 2508. In such embodiments, every segment 2424 is stored in exactly two locations: one location via primary storage system 2506, and one location via secondary storage system 2508. Thus, every record 2422 is stored in exactly two locations: one location via primary storage system 2506 in a corresponding segment 2424, and one location via secondary storage system 2508 in a corresponding segment 2424.

Alternatively, in other embodiments, two different sets of segments can be generated from the plurality of records. As illustrated in FIG. 26B, a first set of segments 2424.1.1-2424.1.Y are generated for storage via primary storage system 2506, and a second set of segments 2424.2.1-2424.2.Y are generated for storage via primary storage system 2506. In some embodiments, for example, as illustrated in FIG. 26A, each given segment row data 2505 is stored exactly twice, via one segment in the primary storage system 2506, and via a second segment in the secondary storage system 2508.

For example, segment row data 2505.1 is stored in primary storage system 2506 as part of segment 2424.1.1, and is also stored in secondary storage system 2508 as part of segment 2424.2.1. However, despite including the same segment row data 2505.1, segment 2424.1.1 and segment 2424.2.1 can be different, for example, based on: being in accordance with different structures and/or formats; based on having different parity data, different index data, and/or different metadata; being generated in accordance with different redundancy storage encoding schemes; and/or based on otherwise being generated in a different fashion, while still including segment row data 2505.1.

As a particular example, segment 2424.1.1 includes no parity data based on being generated for storage via the primary storage system 2506, while segment 2424.2.1 includes parity data based on being generated for storage via the secondary storage system 2508. As another particular example, segment 2424.1.1 includes first parity data generated via a first redundancy storage encoding scheme, and segment 2424.2.1 includes second parity data generated via a second redundancy storage encoding scheme that is more durable and/or has a higher fault-tolerance than the first redundancy storage encoding scheme.

As another particular example, segment 2424.1.1 includes first parity data generated from a corresponding first segment group segment that includes a first number of segments, and 2424.2.1 includes second parity data generated via a second segment group segment that includes a second number of segments that is larger than the first number of segments. In such cases, the segment 2424.1.1 is not recoverable from other segments stored in the primary storage system 2506, while the segment 2424.2.1 is recoverable from other segments stored in the secondary storage system 2508 to render the secondary storage system 2508 having a higher durability than the primary storage system 2506.

As another particular example, the second number of segments can be in accordance with a corresponding second redundancy storage encoding scheme that is more durable and/or has a higher fault-tolerance than a first redundancy storage encoding scheme corresponding to the first number of segments. For example, the second number of segments in the second segment group being larger than the first number of segments in the first segment group can enable a greater number of failures while guaranteeing recovery of segments in the second segment group than in the first segment group. In such cases, the number of segments in the first segment group can be equal to 1, or can be strictly greater than 1. In cases where the number of segments in the first segment group is strictly greater than 1, both the first set of segments stored via the primary storage system 2506 and the second set of segments stored via the secondary storage system include parity data, where the segments in the primary storage system 2506 can be optionally recovered via other segments from the same segment group stored via the primary storage system 2506.

Alternatively or in addition to having different structures, types of parity data, redundancy storage encoding schemes, and/or segment group sizes, segment 2424.1.1 and segment 2424.2.1 can be different based on storing different segment row data 2505.1, for example, where the segment row data 2505 of both segment 2424.1.1 and segment 2424.2.1 include a first particular record 2422, where the segment row data 2505 of segment 2424.1.1 includes a second particular record 2422, and where the segment row data 2505 of segment 2424.2.1 does not include the second particular record 2422 based on the second particular record 2422 being included in different segment row data 2505 of another segment stored via the secondary storage system 2508. In such embodiments, the first set of segments 2424.1.1-2424.1.Y can have a number of segments $Y_1$ that is different from the number of segments $Y_2$ of the second set of segments 2424.1.1-2424.1.Y based on the segment row data 2505 of the first set of segments being generated to cluster records differently and/or to include different numbers of records than the segment row data 2505 of the second set of segments.

For example, the segment row data 2505 of each of the first number of segments includes a first number of records and/or is selected in accordance with a first clustering scheme, and the segment row data 2505 of each of the second number of segments includes a different, second number of records and/or is selected in accordance with a different, second clustering scheme. The differences in clustering of records to render different segment row data 2505 can be based on differences in storage schemes of primary storage system 2506 and secondary storage system 2508, such as differences in their respective redundancy storage encoding schemes and/or differences in the number of segments in segment groups utilized to generate segments for storage in the primary storage system 2506 and secondary storage system 2508, respectively.

As illustrated in FIG. 26A, the query execution module 2504 can execute queries via access to the primary storage system via row reads from segments 2424 stored in the primary storage system. For example, access to segments via primary storage system 2506 implements an IO step 2542 performed by query execution module 2504 in executing a corresponding query. Alternatively or in addition, access to segments via primary storage system 2506 is performed by nodes 37 at IO level 2416 participating in a query execution plan 2405 implemented by query execution module to execute a corresponding query. In particular, primary storage system 2506 can be implemented via storage resources, such as memory drives 2425, of nodes 37 that participate at IO level 2416 for some or all queries. In such embodiments, the nodes 37 can perform the row reads in a same or similar fashion discussed in conjunction with FIG. 24C. The query execution module 2504 can optionally perform a filtering step 2544 and/or projection step 2546 in accordance with a corresponding query expression, for example, as discussed in conjunction with FIG. 25B, where values read in the projection step 2546 are read from the primary storage system 2506, for example, as an additional part of the IO step 2542 and/or as part of reading the respective records 2422 from segments 2424 stored via the primary storage system 2506.

In some embodiments, all record reads utilized to facilitate IO in query executions are performed by accessing corresponding segments 2424 that store these records 2422 in primary storage system 2506, where secondary storage system 2508 is never accessed to facilitate query executions. For example, secondary storage system 2508 is only accessed to recover segments that become unavailable and/or encounter storage failures in primary storage system 2506. In such cases, secondary storage system 2508 purely serves the purposes of redundant segment storage and segment recovery.

In other embodiments, in some cases and/or in rare cases, some record reads utilized to facilitate IO in query executions are performed by accessing corresponding segments 2424 that store these records 2422 in secondary storage system 2508, where secondary storage system 2508 is sometimes accessed to facilitate query executions. For example, secondary storage system 2508 is accessed in query execution to read records and/or corresponding segments that are unavailable and/or encounter storage failures in primary storage system 2506.

As these records may be required to ensure a query resultant is correct, rather than awaiting the recovery of these segments upon primary storage system 2506, the query execution module 2504 can read corresponding segments and/or records from secondary storage system 2508 as part of the IO step 2542. This can further improve the technology of database systems by reducing the wait time for query execution, while enabling most processing resources to perform optimally via access to only primary storage system 2506. In particular, in some or all given queries, only a small proportion of records and/or segments are read from the secondary storage system 2508 based on a failure rate of primary storage system 2506 being correspondingly small and/or based on a recovery rate of re-storing unavailable records being correspondingly fast.

FIG. 26B illustrates an embodiment of database system 10 where the query execution module accesses the secondary storage system 2508 to read records via one or more segments 2424 stored via secondary storage system 2508 whose corresponding segments 2424 in primary storage system 2506 are unavailable. Some or all features and/or functionality of the database system 10 of FIG. 26B can be utilized to implement the database system 10 of FIG. 26A and/or any other embodiment of database system 10 described herein.

In the example illustrated in FIG. 26B, segment 2424.1.2 is unavailable for access via the primary storage system 2506. For example segment 2424.1.2 is unavailable for access via the primary storage system 2506 due to a corresponding failure condition, such as the memory drive 2425 of primary storage system 2506 that stores segment 2424.1.2 failing and/or a node 37 of primary storage system 2506 that stores and/or accesses segment 2424.1.2 failing and/or being offline.

The query execution module 2405 can implement one or more primary storage access modules 2616. For example, the one or more primary storage access modules 2616 are implemented via a plurality of nodes 37 participating at IO level 2416 of a corresponding query that access segments 2424 stored via primary storage system 2506 by accessing segments 2424 stored in their own memory drives 2425, where memory drives 2425 of node 37 participating at IO level 2416 implement some or all memory resources of the primary storage system 2506 as discussed previously. All available segments required for execution of a corresponding query, and/or a set of segments assigned to nodes 37 for access via IO level 2416 based on assignment data and/or recent storage health and/or availability data, can have their corresponding records 2422 read from primary storage system 2506 via the primary storage access modules 2616 in accordance with the query execution.

However, at least one segment, such as segment 2424.1.2 in this example, can be unavailable for access due to a storage failure. Corresponding segment row data 2505 can be read from corresponding segments stored in secondary storage system 2508 via a secondary storage access module. For example, as illustrated in the example of FIG. 26B, at least one primary storage access module 2616 sends a notification to one or more secondary storage access modules 2618 indicating segment row data 2505.2 must be read from secondary storage system 2508. For example, the primary storage access module 2616 sends this notification based on encountering an access failure and/or detecting the failure condition when attempting to read segment row data 2505. As another example, the segment row data 2505.2 was already determined to be unavailable, for example, based on previous detection of the corresponding failure condition, and/or secondary storage access modules 2618 determines to read segment row data 2505.2 from secondary storage system 2508 based on a prior request and/or determination.

As illustrated via FIG. 26B, the segment row data 2505 can be read based on an access request to read segment row data 2505.2 and/or based on a request to read segment row data from a corresponding segment 2424.2.2 that is the same as or different from segment 2424.1.2. Some or all of the segment row data 2505 can be read in response. In embodiments where segment row data 2505 of segment stored in secondary storage system is different for segments stored in primary storage system, the one or more secondary storage access modules can otherwise determine and/or request particular records and/or particular segments storing the particular records that are unavailable for access via primary storage system 2506.

Thus, raw and/or processed records 2422 outputted via primary storage access modules 2616 and secondary storage access modules 2618 can render a full set of required record reads and/or IO data blocks for the corresponding query. The secondary storage access modules 2618 can output substantially less records than primary storage access modules 2616 based on a small proportion of segments being unavailable at any given time. This can be ideal in ensuring that records are predominantly accessed via the more efficient access to primary storage system 2506 in query executions. Further processing, such as filtering step 2544 and/or projection step 2546 and/or one or more query operators performed upon data values of records in accordance with the query, can be performed to ultimately render the query resultant.

The one or more secondary storage access modules 2618 can be implemented via distinct processing and/or memory resources from the one or more primary storage access modules 2616. For example, the one or more primary storage access modules 2616 are implemented via a first set of nodes 37 and/or computing devices 18, and the one or more secondary storage access modules 2618 are implemented via a second set of nodes 37 and/or computing devices 18 that are distinct from the first set of nodes 37 and/or computing devices 18. Alternatively, some or all of the one or more secondary storage access modules 2618 can be implemented via shared processing and/or memory resources with the one or more primary storage access modules 2616.

For example, one or more nodes 37 participating at the IO level of the query execution plan 2405 and/or having memory drives 2425 that implement the primary storage system 2506 can be further operable to communicate with the secondary storage system 2508. For example, a given node 37 implementing one or more primary storage access modules 2616 reads a first set of records from segments 2424 stored via primary storage system, for example via access to its own memory drives 2425, and/or reads a second set of records from other segments 2424 stored via secondary storage system 2508.

As a particular example, this given node 37 can read the second set of records from other segments 2424 stored via secondary storage system 2508 based on being assigned to read these records from corresponding segments stored via one of its own memory drives 2425, and further based on determining these records are not available for access via the one of its own memory drives 2425, for example, due to a failure of the one of its own memory drives 2425.

The given node 37 can be separate from the secondary storage system 2508, where the node 37 does not have memory drives or other storage resources implementing the secondary storage system 2508. In such embodiments, the given node 37 can send access requests to the secondary storage system 2508 that is implemented via a separate set of memory devices, where the given node 37 communicates with the secondary storage system 2508 via system communication resources 14, one or more external networks 17, and/or via another wired and/or wireless connection with the secondary storage system 2508 to request and receive the corresponding segment row data accordingly.

In other embodiments, secondary storage system 2508 is optionally implemented via additional memory drives 2425 and/or other types of memory devices of nodes 37 participating at IO level 2416, such as slower and/or less efficient memory devices of nodes 37. A given node 37 can access a first set of its memory resources, such as its own memory drives 2425, to read the first set of records, and also accesses a second set of its memory resources, such as other memory devices, to read the second set of records.

In other embodiments, some nodes 37 only implement storage resources of the secondary storage system. For example these nodes 37 only participate at IO level of query execution plans when they store segments via secondary storage system 2508 whose records are required for the query and are not available for access via the primary storage system 2506.

FIG. 26C illustrates an embodiment of database system 10 that implements a record recovery module 2602 to recover segment row data 2505 of one or more segments. The record recovery module 2602 can be implemented via one or more computing devices 18 and/or via other processing and/or memory resources of the database system 10. Some or all features and/or functionality of the database system 10 of FIG. 26C can be utilized to implement the database system 10 of FIG. 26A and/or any other embodiment of database system 10 described herein.

The record recovery module 2602 can determine to recover particular segment row data 2505 based on detecting a storage failure of the particular segment row data 2505. This can include determining a node 37 and/or memory drive 2425 storing the segment row data 2505 has failed, gone offline, is performing unfavorably, and/or otherwise encounters a failure condition. This can include determining a segment is unavailable for access, for example, when attempting to read the segment in query execution as discussed in conjunction with FIG. 26B. In this example, segment 2424.1.2 is determined to be unavailable, for example, based on the access failure illustrated in FIG. 26B.

The record recovery module 2602 can retrieve segment row data 2505.2 from segment 2424.2.2 stored in secondary storage system via a secondary storage access module 2618, which can be the same or different from the one or more secondary storage access modules 2618 of FIG. 26B. This access to segment row data 2505.2 can be the same access performed by secondary access storage module 2618 utilized by query execution module 2504 as part of the IO step of the query execution in FIG. 26B. This access to segment row data 2505.2 can alternatively be separate from an IO step of a query execution and/or can be for the purposes of re-storing the segment row data 2505.2 in primary storage system 2506 only.

In cases where segment row data 2505 for segments in secondary storage system is different from segment row data 2505 for segments in primary storage system, multiple segments and/or portions of multiple different segment row data 2505 that includes all records of a single segment row data 2505 of the primary storage system can be accessed in the secondary storage system to recover all appropriate records 2422 for inclusion in the recovered segment accordingly.

The retrieved segment row data 2505.2 can be processed via a segment regeneration module 2615 to regenerate a corresponding segment 2424.1.2 in primary storage system 2506. This can include regenerating corresponding parity and/or index data, performing a corresponding redundancy storage encoding function, generating a segment in accordance with a corresponding structure of segments stored via primary storage system from 2505.1, and/or extracting only a subset of relevant portions of accessed segment 2424.2.2 to render the segment 2424.1.2.

This recovered segment 2424.1.2 can then be re-stored in primary storage system 2506 via a primary storage access module 2616, which can be the same or different from the one or more primary storage access modules 2616 of FIG. 26B. This recovered segment 2424.1.2 can be re-stored in different storage resources, such as a different node 37 and/or memory drive 2425, due to the prior node 37 and/or memory drive 2425 encountering a failure. Alternatively, the recovered segment 2424.1.2 can be re-stored in the original storage resources, such as a same node 37 and/or memory drive 2425, for example, if these resources became again available and/or if the failure condition was due to other circumstances not relating to failure of these resources.

In embodiments where the segments 2424 stored in primary storage system 2506 are identical to the segments 2424 stored in secondary storage system 2508, the segment regeneration module 2615 need not be implemented. Instead, the corresponding segment, such as segment 2424.2.2 can be simply retrieved from secondary storage system 2508 and can then be stored in primary storage system 2506, for example, as segment 2424.1.2.

In various embodiments, database system includes at least one processor and a memory that stores operational instructions. The operational instructions, when executed by the at least one processor, can cause the database system to: receive a plurality of records of a dataset for storage; generate a plurality of segment row data from the plurality of records; store the plurality of segment row data via a first storage mechanism corresponding to a first durability level; facilitate storage of the plurality of segment row data via a second storage mechanism corresponding to a second durability level that is more durable than the first durability level; facilitate execution of a plurality of queries against the dataset by accessing the plurality of segment row data via the first storage mechanism; detect a storage failure of one of the plurality of segment row data via the first storage mechanism; and/or recover the one of the plurality of segment row data for storage via the first storage mechanism based on accessing at least one of the plurality of segment row data via the second storage mechanism.

Figure 26D:
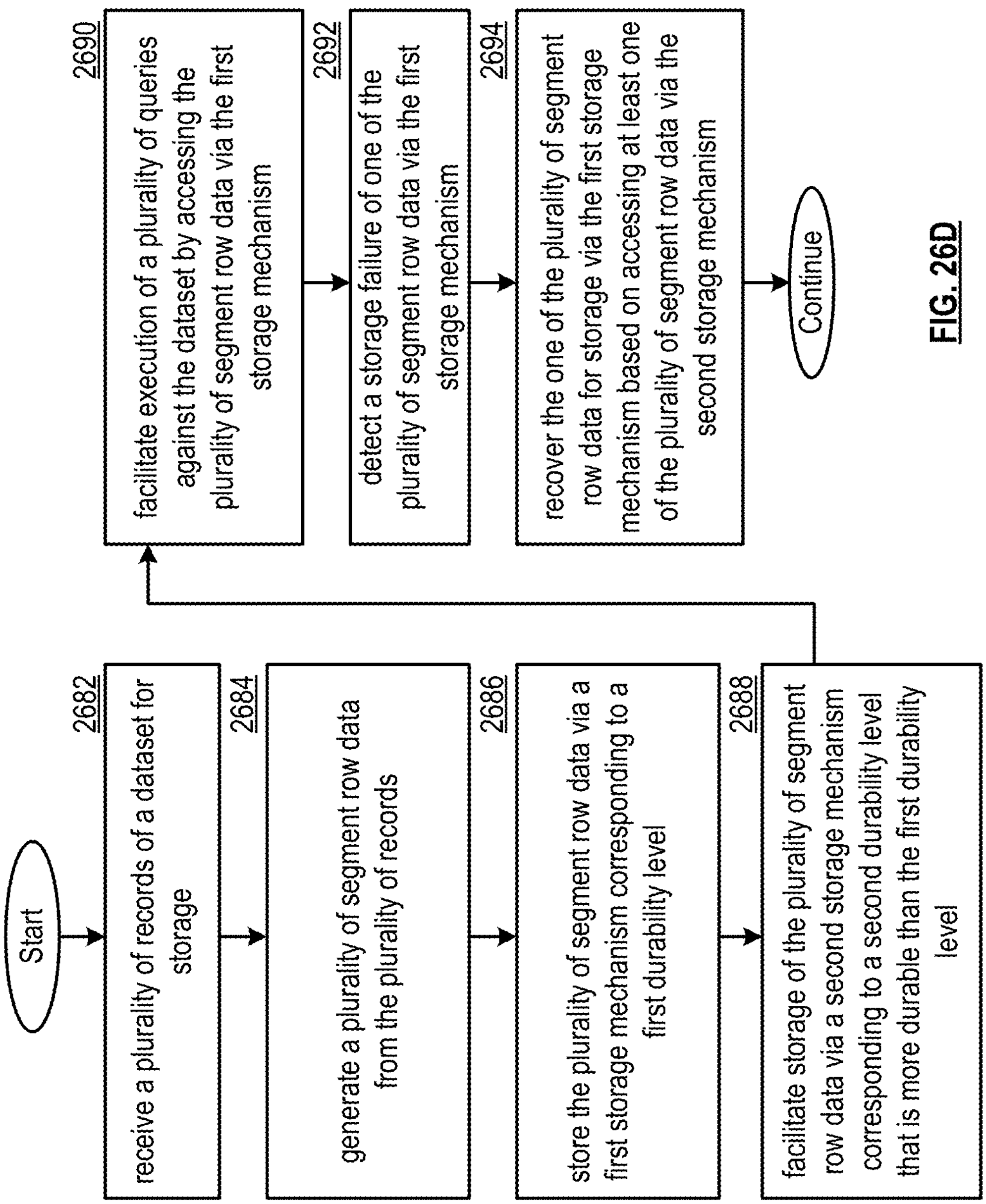
FIG. 26D is a logic diagram illustrating a method of storing records via multiple storage mechanisms in accordance with various embodiments.

FIG. 26D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26D. In particular, a node 37 can utilize the query processing module 2435 to execute some or all of the steps of FIG. 26D, where multiple nodes 37 implement their own query processing modules 2435 to independently execute some or all of the steps of FIG. 26D, for example, to facilitate execution of a query as participants in a query execution plan 2405. Some or all of the method of FIG. 26D can be performed by utilizing the record storage module 2502, the query processing system 2501, the record recovery module 2602, the primary storage system 2506, and/or the secondary storage system 2508 in accordance with some or all features and/or functionality described in conjunction with FIGS. 26A-26C. Some or all of the method of FIG. 26D can be performed via a query execution module 2504. Some or all of the steps of FIG. 26D can optionally be performed by any other processing module of the database system 10. Some or all of the steps of FIG. 26D can be performed to implement some or all of the functionality of the record storage module 2502, the query processing system 2501, the record recovery module 2602, the primary storage system 2506, and/or the secondary storage system 2508 as described in conjunction with FIGS. 26A-26C. Some or all of the steps of FIG. 26D can be performed to implement some or all of the functionality regarding execution of a query via the plurality of nodes in the query execution plan 2405 as described in conjunction with FIGS. 24A-24D. Some or all steps of FIG. 26D can be performed by database system 10 in accordance with other embodiments of the database system 10 and/or nodes 37 discussed herein.

Step 2682 includes receiving a plurality of records of one or more datasets for storage. For example, some or all of the plurality of records each include a plurality of values corresponding to a plurality of fields of a corresponding one of the one or more datasets.

Step 2684 includes generating a plurality of segment row data from the plurality of records. Each segment row data can include a proper subset of the plurality of records. A plurality of proper subset of the plurality of records corresponding to the plurality of segment row data can be mutually exclusive and/or collectively exhaustive with respect to the plurality of records. The plurality of records can be grouped to form the plurality of segment row data based on at least one key field, at least one cluster key field, and/or values of any one or more fields of the plurality of records designated for use in generating the plurality of segment row data. For example, ones of the plurality of records with same and/or similar values for these one or more fields are grouped into the same segment row data, while ones of the plurality of records with different values for these one or more fields are grouped into the different segment row data. This can include applying a similarity function and/or clustering algorithm to generate the plurality of segment row data.

Step 2686 includes storing the plurality of segment row data via a first storage mechanism corresponding to a first durability level. The first storage mechanism can be implemented by utilizing some or all features and/or functionality of the primary storage system 2506. The first storage mechanism can be implemented via a plurality of memory drives 2425 of a plurality of nodes 37. The first storage mechanism can alternatively or additionally be implemented via a plurality of NVMe drives of the database system 10. The first storage mechanism can alternatively or additionally be implemented by utilizing a first redundancy storage encoding scheme to store and/or recover the plurality of segment row data.

For example, the plurality of segment row data is stored via the first storage mechanism as a first plurality of segments, where each segment of the first plurality of segments includes a corresponding one of the plurality of segment row data. Generating a segment of the first plurality of segments from corresponding segment row data can include generating column-formatted data from the segment row data for inclusion in the segment. Generating a segment of the first plurality of segments from corresponding segment row data can include performing some or all functionality discussed in conjunction with FIGS. 15-23.

Generating the first plurality of segments can include generating segments in a plurality of first segment groups, where generating segments in a given first segment group includes generating parity data for the given segment based on a set of segment row data included in the same first segment group. This can include applying a first redundancy storage encoding scheme to generate the first plurality of segments to include parity data. Alternatively, the first plurality of segments includes no parity data. For example, the size of a given first segment group implemented as discussed in conjunction with FIGS. 15-23 includes only a single segment.

Step 2688 includes storing the plurality of segment row data via a second storage mechanism corresponding to a second durability level. The second durability level can be more durable than the first durability level. The second storage mechanism can be implemented by utilizing some or all features and/or functionality of the secondary storage system 2508. The second storage mechanism can be implemented via a plurality of spinning disks and/or an object storage system. The second storage mechanism can be implemented via a plurality of memory devices that have less efficient access than another plurality of memory devices that implement the first storage mechanism. Alternatively or in addition, the second storage mechanism can be implemented via a plurality of memory devices that have less efficient access than another plurality of memory devices that implement the first storage mechanism.

The second storage mechanism can alternatively or additionally be implemented by utilizing a second plurality of memory devices that are more reliable than, have a higher fault-level than, have a lower failure rate than, and/or are otherwise more durable than a first plurality of memory devices utilized to implement the first storage mechanism. The second durability level of the second storage mechanism can be more durable than the first durability level of the first storage mechanism based on the second storage mechanism being implemented by utilizing the second plurality of memory device, based on the first storage mechanism being implemented by utilizing the first plurality of memory devices, and based on the second plurality of memory device being more durable than the first plurality of memory devices.

The second storage mechanism can alternatively or additionally be implemented by utilizing a second redundancy storage encoding scheme to store and/or recover the plurality of segment row data, for example, where the second redundancy storage encoding scheme corresponds to a higher redundancy level than the first redundancy storage encoding scheme. The second durability level of the second storage mechanism can be more durable than the first durability level of the first storage mechanism based on the second storage mechanism being implemented by utilizing the second redundancy storage encoding scheme, based on the first storage mechanism being implemented by utilizing the first redundancy storage encoding scheme, and based on the second redundancy storage encoding scheme or having a more favorable fault-tolerance level and/or otherwise being more durable than the first redundancy storage encoding scheme.

For example, the plurality of segment row data is stored via the second storage mechanism as a second plurality of segments, where each segment of the second plurality of segments includes a corresponding one of the plurality of segment row data. Generating a segment of the second plurality of segments from corresponding segment row data can include generating column-formatted data from the segment row data for inclusion in the segment. Generating a segment of the second plurality of segments from corresponding segment row data can include performing some or all functionality discussed in conjunction with FIGS. 15-23.

Generating the second plurality of segments can include generating segments in a plurality of second segment groups, where generating segments in a given second segment group includes generating parity data for the given segment based on a set of segment row data included in the same second segment group. This can include applying a second redundancy storage encoding scheme to generate the first plurality of segments to include parity data. For example, the second redundancy storage encoding scheme is more durable than the first redundancy storage encoding scheme based on each of the plurality of second segment groups including more segments than each of the plurality of first segment groups. As a particular example, the second redundancy storage encoding scheme is more durable than the first redundancy storage encoding scheme based on each of the plurality of second segment groups including more than one segment to enable recovery of each segment via access to other segments in the same segment group stored via the second storage system, and based on each of the plurality of first segment groups including exactly one segment. Alternatively, the second plurality of segments include no parity data. For example, the size of a given second segment group implemented as discussed in conjunction with FIGS. 15-23 includes only a single segment.

The first plurality of segments generated for storage in via the second storage mechanism can be different from the second plurality of segments generated for storage in via the first storage mechanism. For example, the first plurality of segments is different from the second plurality of segments based on being generated with different parity data, having different fault-tolerance levels, and/or being generated via different redundancy storage encoding schemes. Alternatively, the first plurality of segments generated for storage in via the first storage mechanism are utilized as the second plurality of segments that are stored via the second storage mechanism, where the first plurality of segments and the second plurality of segments are identical.

Step 2690 includes facilitating execution of a plurality of queries against the dataset by accessing the plurality of segment row data via the first storage mechanism. For example, the second storage mechanism is not utilized to access the plurality of segment row data during query execution. The query can be executed via a plurality of nodes 37 participating in a query execution plan 2405, for example, where nodes 37 at an IO level 2416 access the plurality of segment row data via their own memory drives 2425 that implement the first storage mechanism.

Step 2692 includes detecting a storage failure of one of the plurality of segment row data via the first storage mechanism. For example, detecting a storage failure include determining a failure of a memory drives 2425 of a node 37 that stores the one of the plurality of segment row data. As another example, detecting the storage failure include determining a failure of node 37 that stores the one of the plurality of segment row data via one of its memory drives 2425. As another example, detecting the storage failure includes determining a memory device and/or location storing the one of the plurality of segment row data has failed, is offline, has a current performance that compares unfavorably to a performance threshold, is corrupted, and/or is otherwise encountering a storage failure condition. As another example, detecting the storage failure includes attempting access to the one of the plurality of segment row data via the first storage mechanism, for example, in conjunction with a query execution, where the storage failure is detected based on the attempted access failing. As another example, detecting the storage failure includes receiving a notification of a failure, receiving and/or determining a command and/or instruction to recover the one of the plurality of segment row data, and/or otherwise determining the storage failure and/or that the one of the plurality of segment row data need be recovered in the first storage mechanism.

Step 2694 includes recovering the one of the plurality of segment row data, for example, based on detecting the storage failure of the one of the plurality of segment row data. This can include accessing at least one of the plurality of segment row data via the second storage mechanism. For example, the same, duplicate segment row data stored in the second storage system is retrieved and re-stored via the first storage mechanism. As another example, if the same, duplicate segment row data stored in the second storage system is not available, other ones of the plurality of segment row data, such as segment row data of some or all of a set of segments in a same segment group, are accessed to rebuild the segment row data in accordance with a decoding process corresponding to the redundancy storage encoding scheme and/or by utilizing parity data of the some or all of the set of segments in the same segment group.

Step 2694 can include re-storing the one of the plurality of segment row data, once recovered via the second storage mechanism, in different memory resources of the first storage mechanism that are different from failed memory resources of the first storage mechanism. For example, if a first memory drive and/or a first node of the first storage mechanism that previously stored the one of the plurality of segment row data failed, this one of the plurality of segment row data, once recovered, is stored in a different memory drive and/or a different node, for example, that is operating correctly and/or not undergoing a failure condition. Restoring the one of the plurality of segment row data can include regenerating a corresponding segment for storage via the first storage mechanism and/or can include regenerating parity data for the corresponding segment based on other segments in a same segment group.

In cases where detecting the storage failure of the one of the plurality of segment row data via the first storage mechanism is based on detecting a failed memory drive 2425, failed node 37, and/or another failed one or more memory devices, step 2694 can include recovering multiple ones of the plurality of segment row data, such as all segment row data that was stored via the failed memory drive 2425, failed node 37, and/or another failed one or more memory devices. Step 2694 can include accessing corresponding ones of the plurality of segment row data stored via the second storage mechanism, and/or re-storing the multiple ones of the plurality of segment row data via the first storage mechanism.

In some embodiments, the method further includes facilitating execution of at least one other query by accessing segment row data via the second storage mechanism. For example, consider a query that is executed after the storage failure of the one of the plurality of segment row data and prior to the recovery of the one of the plurality of segment row data. As a particular example, detecting the storage failure includes attempting access to the one of the plurality of segment row data via the first storage mechanism in conjunction with execution of the at least one other query, where the storage failure is detected based on the attempted access failing. Based one of the plurality of segment row data being unavailable for use in the query execution via the first storage mechanism due to the storage failure, rather than delaying query execution until this one of the plurality of segment row data is recovered in the first storage mechanism, the query execution can proceed based on accessing this one of the plurality of segment row data via the second storage mechanism. This access of the one of the plurality of segment row data via the second storage mechanism can be slower than access of ones of the plurality of segment row data stored via the first storage mechanism, for example, based on the first storage mechanism having more efficient access than the second storage mechanism.

In some embodiments, this access of the one of the plurality of segment row data via the second storage mechanism to facilitate execution of the query can be utilized to implement the access of step 2694 utilized to recover the one of the plurality of segment row data via the first storage mechanism. For example, the one of the plurality of segment row data, once accessed to facilitate query execution, is then re-stored via the first storage mechanism, rather than a separate second access to the one of the plurality of segment row data being performed to recover the one of the plurality of segment row data in step 2694.

The method can further include detecting a storage failure of another one of the plurality of segment row data via the second storage mechanism and/or recovering this other one of the plurality of segment row data for storage via the second storage mechanism. This can include accessing multiple other ones of the plurality of segment row data that are different from this other one of the plurality of segment row data, such as segment row data of some or all of a set of segments in a same segment group, to rebuild the another one of the plurality of segment row data in accordance with a decoding process corresponding to the redundancy storage encoding scheme and/or by utilizing parity data of the some or all of the set of segments in the same segment group. For example, the another one of the plurality of segment row data is rebuilt in this fashion, even if corresponding segment row data is available via the first storage mechanism, so that the first storage mechanism is not disrupted with additional access requests to preserve access to the first storage mechanism for query execution only. Alternatively, recovering this other one of the plurality of segment row data for storage via the second storage mechanism includes accessing the corresponding segment row data is available via the first storage mechanism.

In various embodiments, a non-transitory computer readable storage medium includes at least one memory section that stores operational instructions. The operational instructions, when executed by a processing module that includes a processor and a memory, can cause the processing module to: receive a plurality of records of a dataset for storage; generate a plurality of segment row data from the plurality of records; store the plurality of segment row data via a first storage mechanism corresponding to a first durability level; facilitate storage of the plurality of segment row data via a second storage mechanism corresponding to a second durability level that is more durable than the first durability level; facilitate execution of a plurality of queries against the dataset by accessing the plurality of segment row data via the first storage mechanism; detect a storage failure of one of the plurality of segment row data via the first storage mechanism; and/or recover the one of the plurality of segment row data for storage via the first storage mechanism based on accessing at least one of the plurality of segment row data via the second storage mechanism.

FIGS. 27A-27E illustrate another embodiment of a database system that stores and access records via multiple storage mechanisms. Alternatively or additionally to storing different fields of records via a primary storage system 2506 and a secondary storage system 2508 as discussed in conjunction with FIGS. 25A-25I, and/or alternatively or additionally to storing segments via both a primary storage system 2506 and a secondary storage system 2508 as discussed in conjunction with FIGS. 26A-2D, the database system 10 can be implemented to store segment row data that includes values for some or all fields of records 2422 of one or more datasets via a primary storage system 2506, and to store parity data corresponding to recovery of this segment row data via a secondary storage system 2508. Some or all features and/or functionality of the database system 10 of FIGS. 27A-27E can be utilized to implement the database system 10 of FIG. 1 and/or FIG. 1A, and/or any other embodiments of the database system 10 described herein.

In some embodiments, alternatively or in addition to generating segments in same segment groups of multiple segments for recovery with parity data, a segment can be generated such that its segment row data 2505 and/or some or all other metadata of the segment is written to a primary storage system 2506, and its parity data is written to a secondary storage system 2508. For example, the primary storage system 2506 can be implemented as a long term storage system and/or a plurality of NVMe drives that are accessed to implement query execution in all, most, and/or normal conditions, while the secondary storage system 2508 can be implemented as an object storage system and/or a plurality of spinning disks that are accessed to implement query execution in abnormal condition, rarely, and/or never. For example, the primary purpose of the primary storage system 2506 can be to facilitate query executions, while the primary purpose of the secondary storage system 2508 can be to store corresponding parity data for access and/or recovery if a failure of storage resources and/or access to records via the primary storage system 2506 occurs.

The primary storage system 2506 can be implemented via any features and/or functionality of the primary storage system 2506 discussed in conjunction with FIGS. 25A-25G and/or the secondary storage system 2508 can be implemented via any features and/or functionality of the secondary storage system 2508 discussed in conjunction with FIGS. 25A-25G. In some embodiments, the primary storage system 2506 and secondary storage system 2508 utilize the same types of memory devices and/or memory resources, but utilize distinct of memory devices and/or memory resources and/or correspond to memory in different physical and/or virtual locations.

Data stored via the secondary storage system 2508 can be stored in accordance with a higher durability than data stored via the primary storage system 2506. For example, the secondary storage system 2508 is implemented utilizing multi-site durability and/or otherwise enables restoring the data via a different site if necessary. In some embodiments, the primary storage system 2506 is not implemented utilizing multi-site durability and/or otherwise does not enable restoring the data via a different site. For example, recovery of data stored via the primary storage system 2506 requires corresponding parity data to be accessed via the secondary storage system 2508.

In such embodiments, nodes 37 that implement the primary storage system 2506 and/or the query execution module 2504 optionally do not implement the functionality of FIG. 24D and/or otherwise do not participate in the recovery of segments 2424. The functionality of FIG. 24D and/or other recovery of segments 2424 can optionally be performed instead by different nodes 37 that implement the secondary storage system 2508 and/or other processing and/or memory resources of the secondary storage system 2508.

Storing records via a primary storage system 2506 and secondary storage system 2508 in this fashion improves the technology of database system by increasing the efficiency of storage and/or processing resources utilized to facilitate query executions. For example, memory drives 2425 of nodes 37 of IO level 2416 utilized to implement the primary storage system and/or a plurality of NVMe drives utilized to implement the primary storage system are treated as more transient storage and/or are not utilized to rebuild data. This can enable these storage and/or processing resources to direct all resources upon executing queries rather than durably storing data and/or recovering data, improving the efficiency of query executions.

Meanwhile, as this data is recoverable via the parity data stores via secondary storage system 2508, query correctness can still be guaranteed and/or data is guaranteed to be recoverable based on a fault-tolerance level dictated by the durability and/or storage scheme of the secondary storage system 2508, and/or a fault-tolerance level dictated by a redundancy storage encoding scheme utilized to generate the parity data. Processing and/or memory resources of the secondary storage system 2508, such as a distinct set of computing devices 18 that are separate from computing devices 18 with nodes 37 that implement the query execution module 2405, can perform rebuilds and/or recover data as failures occur, ensuring all data remains accessible while not affecting normal performance in query execution and/or without affecting performance of nodes 37 implementing the query execution module 2405.

Storing records via a primary storage system 2506 and secondary storage system 2508 in this fashion can further improve the technology of database system by implementing redundancy via memory resources of the secondary storage system 2508, such as an object storage system and/or a plurality of spinning disks, that are less expensive than memory resources of the primary storage system 2506, such as a plurality of NVMe drives. Storing records via a primary storage system 2506 and secondary storage system 2508 in this fashion can further improve the technology of database system by implementing redundancy via memory resources of the secondary storage system 2508, such as an object storage system and/or a plurality of spinning disks, that enable less efficient access than memory resources of the primary storage system 2506, such as a plurality of NVMe drives In particular, the higher access efficiency resources are accessed to perform query executions, which occur more frequently and/or which require faster access to ensure queries are performed efficiently and/or in a timely fashion, while lower cost resources are utilized to perform data rebuilds for failures that occur less frequently and/or that do not need to be completed in a timely fashion. For example, even though the same amount of total data needs to be stored to ensure recovery at an appropriate level of fault-tolerance, the parity data can be stored more cheaply. Less efficient access to the parity data via storage in the secondary storage system 2508 may be acceptable if segment rebuilds are not required frequently.

This functionality can also be particularly useful in massive scale databases implemented via large numbers of nodes, as the efficiency of IO level nodes is improved, and/or the resource allocation of individual nodes is improved to further increase efficiency of query executions facilitated across a large number of nodes, for example, participating in a query execution plan 2405 as discussed in conjunction with FIG. 24A. This can further improve the technology of database systems by enabling processing efficiency and/or memory resource allocation to be improved for many independent elements, such as a large number of nodes 37, that operate in parallel to ensure data is stored and/or that queries are executed within a reasonable amount of time, despite the massive scale of the database system, while ensuring that data is still recoverable in the case of failure.

Figure 27A:
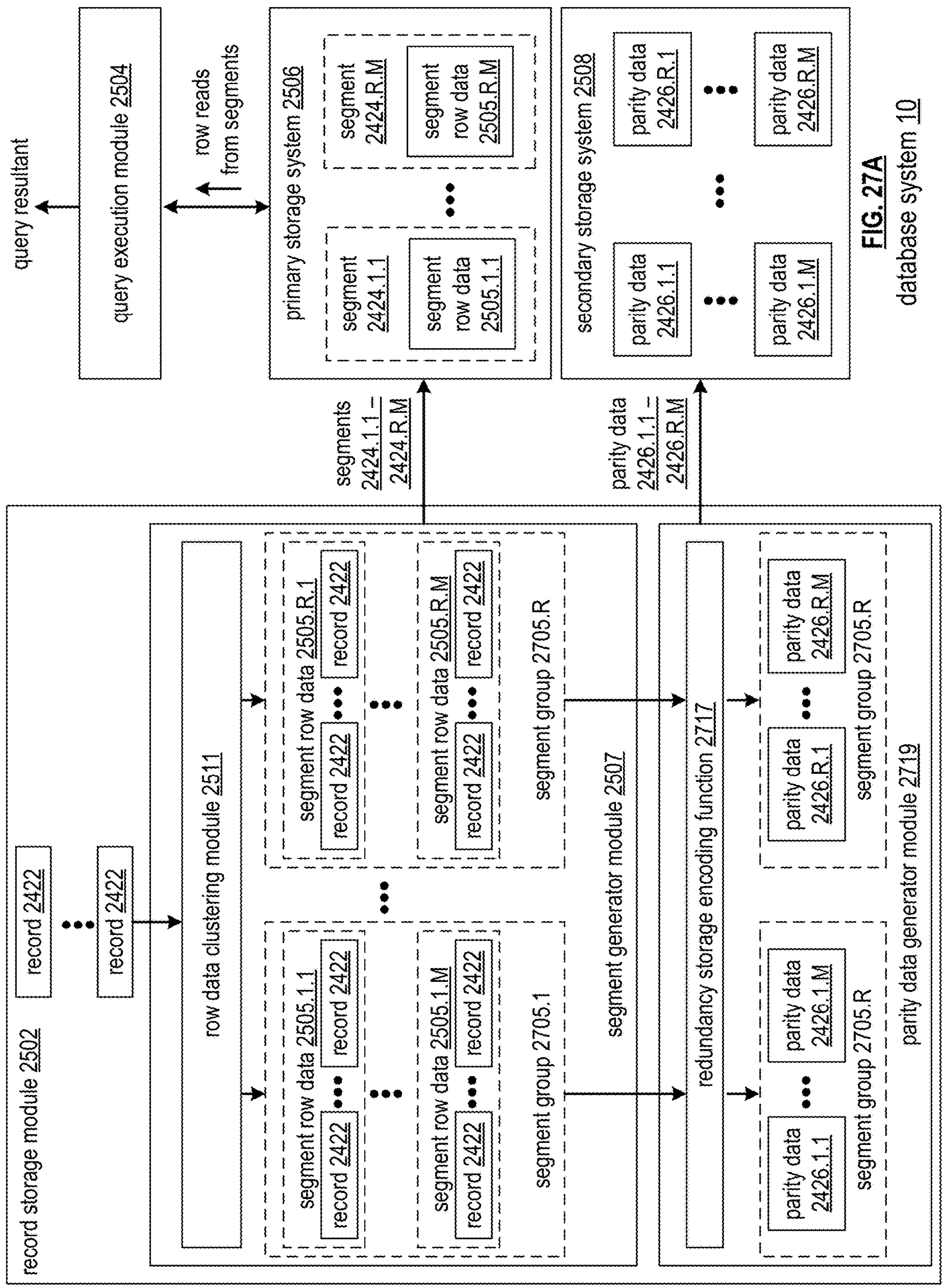
FIG. 27A is a schematic block diagram illustrating a record storage module that in accordance with various embodiments.

FIG. 27A illustrates an embodiment of a database system 10 that generates and stores segments via a primary storage system 2506, and generates and stores parity data for these segments via a secondary storage system 2508. Some or all features and/or functionality of the database system 10 of FIG. 27A can be utilized to implement the database system of FIG. 1, of FIG. 1A, and/or of any other embodiment of database system 10 described herein.

The database system can implement a record storage module 2502. The record storage module 2502 of FIG. 27A can be implemented utilizing some or all features and/or functionality of the record storage module 2502 discussed in conjunction with FIGS. 25A-25G and/or the record storage module of FIG. 26A. The record storage module 2502 of FIG. 27A can optionally operate in a different fashion from the record storage module 2502 discussed in conjunction with FIGS. 25A-25G and/or the record storage module of FIG. 26A.

The record storage module 2502 can receive a plurality of records 2422, for example, of one or more datasets 2500. Each record 2422 can include data values for some or all of a plurality of fields of a corresponding dataset 2500 as discussed previously.

A segment generator module 2507 can generate segments 2424 for storage via primary storage system and secondary storage system from the plurality of records. The segment generator module 2507 can be implemented in a same or similar fashion as the segment generator module 2507 of FIG. 25F and/or FIG. 26A.

A row data clustering module 2511 can generate a plurality of segment row data 2505.1-2505.Y from the plurality of records 2422, for example, in a same or similar fashion as the row data clustering module 2511 of FIG. 26A. This can include performing a similarity function, clustering algorithm, and/or grouping records based on values of one or more fields, such as primary key fields and/or cluster key fields. This can include performing some or all functionality discussed in conjunction with FIGS. 15-23.

Furthermore, the plurality of segment row data 2505 can be generated as a plurality of sets of segment row data 2505, where each set of segment row data 2505 corresponds to one of a plurality of R segment groups 2705. Each segment group 2705 includes a same number M of segment row data 2505. Each segment row data 2505 is included in exactly one segment group 2705. For example, a total plurality of Y segments is generated, where Y is equal to M*R. The segment groups can be determined in a same or similar fashion as discussed in conjunction with FIGS. 15-23.

The record storage module 2502 can further implement a parity data generator module 2719 that generates parity data 2426 for each segment row data based on the segment row data of some or all other segments in the same segment group 2705. The parity data generator module 2719 can generate a set of M parity data 2426 for a given segment group 2705 by performing a redundancy storage encoding function 2717 upon segment row data 2505 of the given segment group 2705. The redundancy storage encoding function 2717 can be in accordance with a corresponding redundancy storage encoding scheme, such as a RAID scheme, an error correction coding scheme, and/or any other scheme that enables recovery of data via parity data.

The record storage module 2502 can store the plurality of segment row data 2505 via primary storage system 2506, for example, as a plurality of segments 2424 that do not include parity data 2426. The record storage module 2502 can instead store the plurality of parity data 2426 via the secondary storage system 2508. The storage resources of the record storage module 2502 can be distinct from the storage resources of the secondary storage system 2508.

The parity data 2426 of a given segment 2424 can correspond to the same type of parity data 2426 discussed in conjunction with FIGS. 15-23, FIG. 24B, and/or FIG. 24D. For example, the parity data 2426.1.1 corresponds to the parity data for segment 2424.1.1. However, rather than being stored within segment 2424.1.1 as discussed in conjunction with FIGS. 15-23, FIG. 24B, and/or FIG. 24D, this parity data 2426.1.1 is stored separately, via secondary storage system 2508. Alternatively, in other embodiments, in addition to the parity data 2426 for each given segment 2424 being stored separately, via secondary storage system 2508, the parity data 2426 can also be included within each given segments 2424, for example, to enable segments to be recovered via access to primary storage system in some and/or in rare cases, and/or to increase the fault-tolerance of the system.

The parity data 2426 for a given segment 2424 can be is mapped to the corresponding segment to enable the corresponding parity data to be identified. For example, the parity data 2426.1.1 can be determined from segment 2424.1.1 via an identifier of parity data 2426.1.1, pointer to parity data 2426.1.1, memory location information for parity data 2426.1.1 in secondary storage system, and/or other access information indicating how to identify and/or access the parity data 2426.1.1. This access information for a given parity data 2426 can be stored within the corresponding segment 2424 and/or can be mapped to the corresponding segment 2424 via other memory resources.

As illustrated in FIG. 27A, the query execution module 2504 can execute queries via access to the primary storage system via row reads from segments 2424 stored in the primary storage system. For example, access to segments via primary storage system 2506 implements an IO step 2542 performed by query execution module 2504 in executing a corresponding query. Alternatively or in addition, access to segments via primary storage system 2506 is performed by nodes 37 at IO level 2416 participating in a query execution plan 2405 implemented by query execution module to execute a corresponding query. In particular, primary storage system 2506 can be implemented via storage resources, such as memory drives 2425, of nodes 37 that participate at IO level 2416 for some or all queries. In such embodiments, the nodes 37 can perform the row reads in a same or similar fashion discussed in conjunction with FIG. 24C. The query execution module 2504 can optionally perform a filtering step 2544 and/or projection step 2546 in accordance with a corresponding query expression, for example, as discussed in conjunction with FIG. 25B, where values read in the projection step 2546 are read from the primary storage system 2506, for example, as an additional part of the IO step 2542 and/or as part of reading the respective records 2422 from segments 2424 stored via the primary storage system 2506.

Figure 27B:
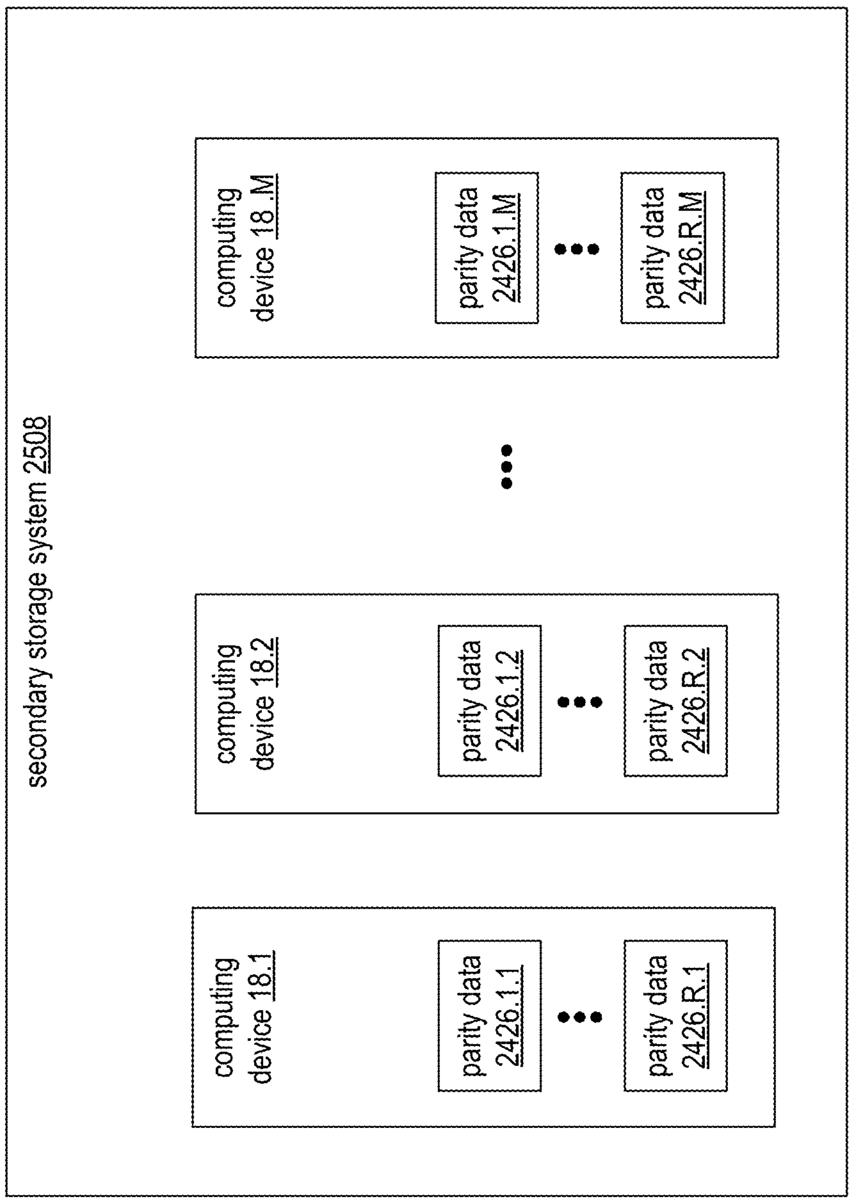
FIG. 27B is a schematic block diagram illustrating a secondary storage system in accordance with various embodiments.

FIG. 27B illustrates an embodiment of a secondary storage system 2508 that includes a plurality of computing devices 18 that store parity data 2426. The embodiment of secondary storage system 2508 of FIG. 27B can be utilized to implement the secondary storage system 2508 of FIG. 27A and/or any other embodiment of secondary storage system 2508 described herein.

The secondary storage system 2508 can include plurality of at least M computing devices 18 to enable separate storage of the set of parity data 2426 in same segment groups 2705. In particular, for some or all segment groups 2705, the corresponding set of M parity data 2426 is stored via M different computing devices 18. For example, the set of M parity data 2426 is stored via M different computing devices 18 in a same or similar fashion as discussed in conjunction with FIG. 23. In particular, the plurality of at least M computing devices 18 of the secondary storage system 2508 can be implemented via physically separate computing devices in different physical locations and/or upon different servers. This can help ensure that multiple parity data of a same segment group will not become unavailable at a given time due to being stored via common resources and becoming unavailable due to a same failure, increasing the fault-tolerance of the system.

In such embodiments, the M segment row data 2505 of segments 2424 in a same segment group 2705 need not be stored via physically separate resources in primary storage system 2506. In particular, as other segments in a same segment group are not utilized to recover unavailable segments due to the parity data of secondary storage system 2508 being utilized for this purpose, the restrictions upon storage of segments 2424 discussed in conjunction with FIG. 23 are not necessary, as these restrictions need only be applied to the parity data for recovery of segments. In such cases, segments 2424 in the same segment group can be stored via any set of memory devices in same and/or different physical locations.

In other embodiments, some or all of the set of M parity data 2426 of a same segment group is stored via a same memory device and/or computing device, for example, to simplify retrieval of parity data for the purposes of segment recovery via access to a single device. This embodiment can be utilized in cases where the second storage system is implemented via more robust and/or reliable memory devices and/or computing devices, where fault-tolerance is still achieved via the reliability of the memory devices and/or computing devices themselves.

Figure 27C:
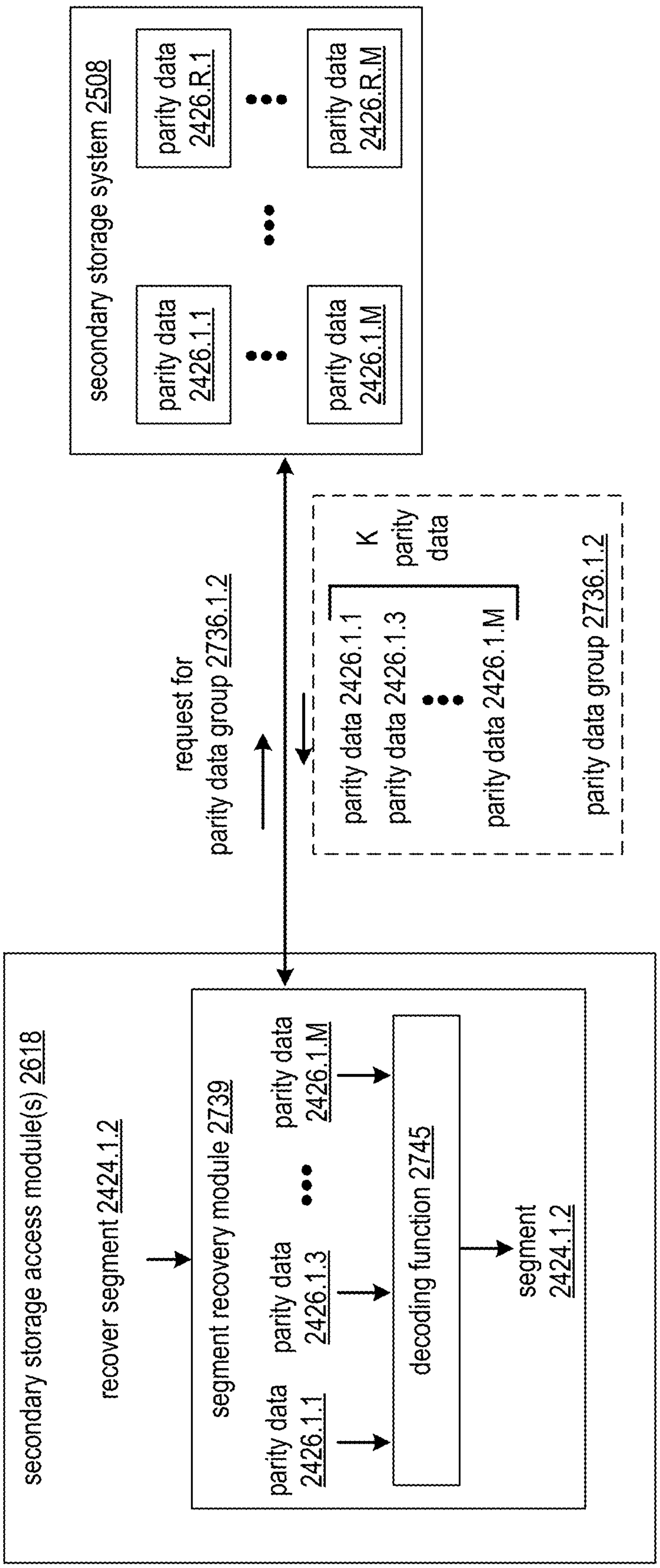
FIG. 27C is a schematic block diagram illustrating a segment recovery module in accordance with various embodiments.

FIG. 27C illustrates an embodiment of a database system 10 that implements a segment recovery module 2739 that communicates with a secondary storage access module 2618 to retrieve and utilize parity data stored in secondary storage system 2508 to recover segments. The segment recovery module 2739 can be implemented in a same or similar fashion as the segment recovery module 2439 of FIG. 24D. The embodiment of database system 10 of FIG. 27C can be utilized to implement the database system 10 of FIG. 27A and/or any other embodiment of database system 10 described herein.

As discussed previously, a given segment 2424 can be recovered by utilizing a set of parity data of other segments in the same segment group 2705. For a given segment, a parity data group 2736 can correspond to a set of parity data that is required to and/or can be utilized for recovery of some or all of the corresponding segment 2424, such as the segment row data 2505 of the corresponding segment, and optionally any other additional metadata such as index sections, manifest sections, and/or statistics sections of the corresponding segment.

In particular, a parity data group 2736 can include a set of K segments, where K is less than M. For example, K can be equal to M minus 1 and/or M minus another positive integer that is greater than one, where the magnitude of this positive integer is optionally an increasing function of fault-tolerance of a corresponding error encoding scheme. The values of M, K and/or the difference M minus K can be dictated by the corresponding redundancy storage encoding scheme and/or can denote the fault-tolerance imposed by use of the corresponding redundancy storage encoding scheme.

The segment recovery module 2739 can determine to recover a given segment, for example, based on detecting the segment is unavailable and/or receiving a request to recover the given segment. In this example, the segment recovery module 2739 determines to recover segment 2424.1.2.

The segment recovery module 2739 requests the set of K parity data 2426 of parity data group 2736.1.2 that can be utilized to recover segment 2424.1.2. In this case, the set of K parity data 2426 of parity data group 2736.1.2 in this case includes at least: parity data 2426.1.1 corresponding to segment 2424.1.1; parity data 2426.1.3 corresponding to segment 2424.1.3; and parity data 2426.1.M corresponding to segment 2424.1.M. Note that the parity data 2426.1.2 is not included in the parity data group 2736.1.2, for example, based on the parity data corresponding to the segment 2424 that failed, and/or based on utilizing a corresponding redundancy storage encoding scheme generating parity data under an assumption that parity data is stored in conjunction with the corresponding segment row data 2505.

Alternatively, the parity data 2426.1.2 is included in the parity data group 2736.1.2, for example, based on the parity data corresponding to the segment 2424 that failed, and/or based on utilizing a modified corresponding redundancy storage encoding scheme that generates the parity data. This modified corresponding redundancy storage encoding scheme can be modified from other redundancy storage encoding schemes discussed herein in accordance with the knowledge that parity data of a given segment is not stored in conjunction with the corresponding segment row data 2505, and thus can be utilized to recover the corresponding segment row data 2505 of the given segment alternatively or in addition to the parity data of other segments.

The segment recovery module 2739 can be implemented utilizing common resources with the one or more secondary storage access modules 2618 to request the parity data group 2736.1.2 from the secondary storage system 2508 and to receive the corresponding set of K parity data in response. Alternatively, the segment recovery module 2739 can be separate from and communicates with the one or more secondary storage access modules 2618, and this request is sent to secondary storage system 2508, where the secondary storage system 2508 accesses the corresponding set of K parity data and sends the set of K parity data to the segment recovery module 2739.

The request can indicate identifiers and/or other access information for the K parity data 2426, for example, based on corresponding information retrieved from other corresponding segments in the same segment group. The identifiers and/or other access information for the K parity data 2426 can otherwise be mapped to in memory resources accessible by the segment recovery module 2739 and/or can be otherwise determined based on an identifier for segment 2424.1.2.

The one or more secondary storage access modules 2618 can receive the K parity data of parity data group 2736.1.2 based on the request. For example, a same secondary storage access module 2618 retrieves the each of the K parity data via K different computing devices 18 storing the parity data. As another example, K different secondary storage access modules 2618 each retrieve a corresponding one of the set of K parity data via access to a single corresponding computing devices 18 storing the corresponding one of the set of K parity data.

The segment recovery module 2739 can perform a decoding function 2745 upon the K parity data of parity data group 2736.1.2 to regenerate and/or rebuild segment 2424.1.2. The decoding function 2745 can correspond to an inverse of the redundancy storage encoding function 2717 and/or can otherwise correspond to a same redundancy storage encoding scheme as redundancy storage encoding function 2717.

Figure 27D:
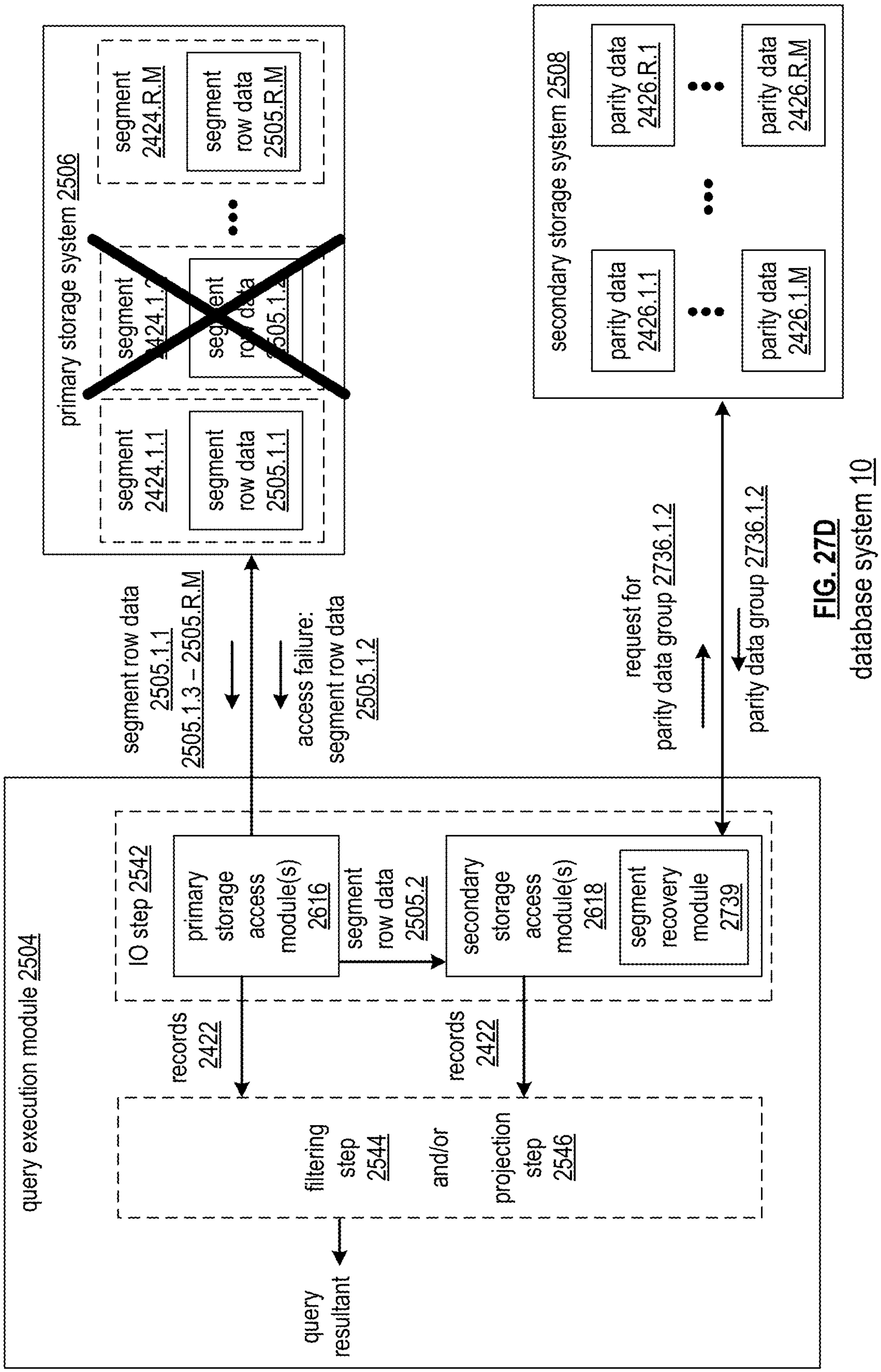
FIG. 27D is a schematic block diagram illustrating a query execution module in accordance with various embodiments.
Figure 27E:
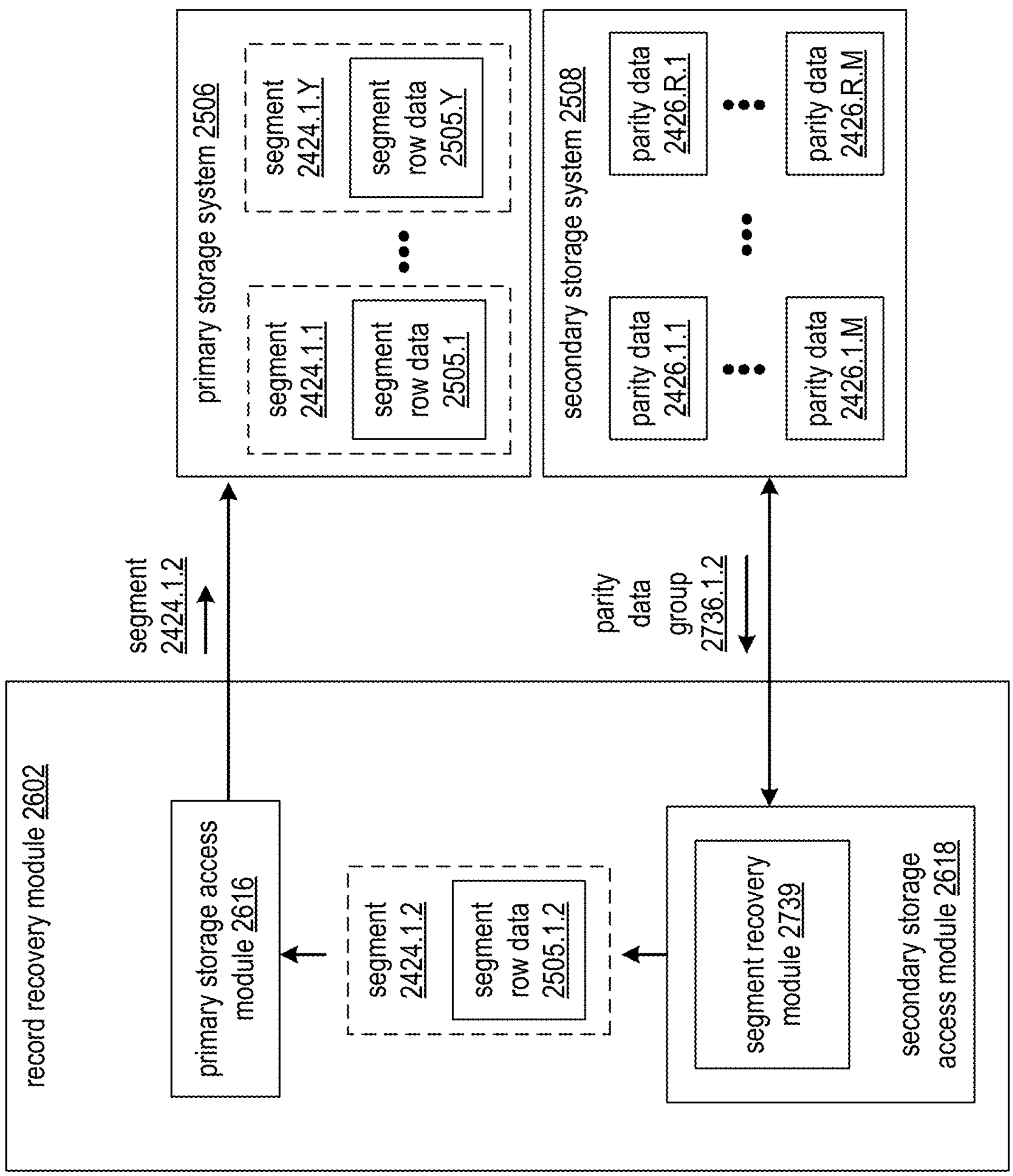
FIG. 27E is a schematic block diagram illustrating a record recovery module in accordance with various embodiments.

This recovery mechanism performed via segment recovery module 2739 via access to parity data in secondary storage system 2508 to recover segments 2424 can be utilized to service queries when required segments 2424 are unavailable, and/or to re-store unavailable segments in primary storage system 2508, for example, as discussed in conjunction with FIGS. 27D and 27E, respectively.

FIG. 27D illustrates an embodiment of a database system 10 that recovers segments 2424 can be utilized to service queries when required segments 2424 are unavailable via access to parity data in secondary storage system 2508 by utilizing the segment recovery module 2739 of FIG. 27C. The embodiment of database system 10 of FIG. 27D can be utilized to implement the database system 10 of FIG. 27A and/or any other embodiment of database 10 described herein.

In some embodiments, all record reads utilized to facilitate IO in query executions are performed by accessing corresponding segments 2424 that store these records 2422 in primary storage system 2506, where secondary storage system 2508 is never accessed to facilitate query executions. For example, secondary storage system 2508 is only accessed to recover segments that become unavailable and/or encounter storage failures in primary storage system 2506. In such cases, secondary storage system 2508 purely serves the purposes of redundant segment storage and segment recovery.

In other embodiments, in some cases and/or in rare cases, some record reads utilized to facilitate IO in query executions are performed by accessing and utilizing parity data in secondary storage system 2508 to recover the corresponding segments that include these records, where secondary storage system 2508 is sometimes accessed to facilitate query executions. For example, secondary storage system 2508 is accessed in query execution to read and utilize parity data to recover the records and/or corresponding segments that are unavailable and/or encounter storage failures in primary storage system 2506.

As these records may be required to ensure a query resultant is correct, rather than awaiting the recovery of these segments upon primary storage system 2506, the query execution module 2504 can, as part of the IO step 2542, read corresponding parity data from secondary storage system 2508, and then utilize this corresponding parity data to recover the corresponding segment row data, enabling the corresponding records to be read. This can further improve the technology of database systems by reducing the wait time for query execution, while enabling most processing resources to perform optimally via access to only primary storage system 2506. In particular, in some or all given queries, only a small proportion of records are read via recovery of corresponding segments via access to parity data stored in the secondary storage system 2508, based on a failure rate of primary storage system 2506 being correspondingly small and/or based on a recovery rate of restoring unavailable records being correspondingly fast.

In the example illustrated in FIG. 27D, segment 2424.1.2 is unavailable for access via the primary storage system 2506. For example segment 2424.1.2 is unavailable for access via the primary storage system 2506 due to a corresponding failure condition, such as the memory drive 2425 of primary storage system 2506 that stores segment 2424.1.2 failing and/or a node 37 of primary storage system 2506 that stores and/or accesses segment 2424.1.2 failing and/or being offline.

The query execution module 2405 can implement one or more primary storage access modules 2616. For example, the one or more primary storage access modules 2616 are implemented via a plurality of nodes 37 participating at IO level 2416 of a corresponding query that access segments 2424 stored via primary storage system 2506 by accessing segments 2424 stored in their own memory drives 2425, where memory drives 2425 of node 37 participating at IO level 2416 implement some or all memory resources of the primary storage system 2506 as discussed previously. All available segments required for execution of a corresponding query, and/or a set of segments assigned to nodes 37 for access via IO level 2416 based on assignment data and/or recent storage health and/or availability data, can have their corresponding records 2422 read from primary storage system 2506 via the primary storage access modules 2616 in accordance with the query execution.

However, at least one segment, such as segment 2424.1.2 in this example, can be unavailable for access due to a storage failure. Corresponding segment row data 2505 can be read by recovering corresponding segments via parity data stored in secondary storage system 2508 via a secondary storage access module. For example, as illustrated in the example of FIG. 27D, at least one primary storage access module 2616 sends a notification to one or more secondary storage access modules 2618 indicating segment row data 2505.2 must be read from secondary storage system 2508. For example, the primary storage access module 2616 sends this notification based on encountering an access failure and/or detecting the failure condition when attempting to read segment row data 2505. As another example, the segment row data 2505.2 was already determined to be unavailable, for example, based on previous detection of the corresponding failure condition, and/or secondary storage access modules 2618 determines to read segment row data 2505.2 from secondary storage system 2508 based on a prior request and/or determination.

As illustrated via FIG. 27D, the secondary storage access modules 2618 can recover by implementing and/or communicating with the segment recovery module 2739 of FIG. 27C. This can include retrieving the set of K parity data in the parity data group for segment 2424.1.2 from K corresponding computing devices 18 of secondary storage system 2508, and/or can include performing a decoding function 2745 upon the retrieved set of K parity data to regenerate the corresponding segment 2424.1.2, as discussed in conjunction of FIG. 27C. Some or all of the segment row data 2505 can be read from the regenerated segment 2424.1.2 to extract corresponding records 2422. These records 2422 can be outputted via the secondary storage access modules 2618 in accordance with the query execution.

Thus, raw and/or processed records 2422 outputted via primary storage access modules 2616 and secondary storage access modules 2618 can render a full set of required record reads and/or IO data blocks for the corresponding query. The secondary storage access modules 2618 can output substantially less records than primary storage access modules 2616 based on a small proportion of segments being unavailable at any given time. This can be ideal in ensuring that records are predominantly accessed via the more efficient access to primary storage system 2506 in query executions. Further processing, such as filtering step 2544 and/or projection step 2546 and/or one or more query operators performed upon data values of records in accordance with the query, can be performed to ultimately render the query resultant.

The one or more secondary storage access modules 2618 can be implemented via distinct processing and/or memory resources from the one or more primary storage access modules 2616. For example, the one or more primary storage access modules 2616 are implemented via a first set of nodes 37 and/or computing devices 18, and the one or more secondary storage access modules 2618 are implemented via a second set of nodes 37 and/or computing devices 18 that are distinct from the first set of nodes 37 and/or computing devices 18. Alternatively, some or all of the one or more secondary storage access modules 2618 can be implemented via shared processing and/or memory resources with the one or more primary storage access modules 2616.

For example, one or more nodes 37 participating at the IO level of the query execution plan 2405 and/or having memory drives 2425 that implement the primary storage system 2506 can be further operable to communicate with the secondary storage system 2508. For example, a given node 37 implementing one or more primary storage access modules 2616 reads a first set of records from segments 2424 stored via primary storage system, for example via access to its own memory drives 2425, and/or reads a second set of records via recovery of other segments 2424 by retrieving parity data of corresponding parity data groups 2736 stored via secondary storage system 2508.

As a particular example, this given node 37 can read the second set of records by recovering other segments 2424 stored via accessing the parity data in secondary storage system 2508 based on being assigned to read these records from corresponding segments stored via one of its own memory drives 2425, and further based on determining these records are not available for access via the one of its own memory drives 2425, for example, due to a failure of the one of its own memory drives 2425.

The given node 37 can be separate from the secondary storage system 2508, where the node 37 does not have memory drives or other storage resources implementing the secondary storage system 2508. In such embodiments, the given node 37 can send access requests to the secondary storage system 2508 that is implemented via a separate set of memory devices, where the given node 37 communicates with the secondary storage system 2508 via system communication resources 14, one or more external networks 17, and/or via another wired and/or wireless connection with the secondary storage system 2508 to request and receive the corresponding segment row data accordingly. For example, the given node 37 implements its own segment recovery module 2739 in a same or similar fashion as implementing segment recovery module 2439 of FIG. 24D, where the other nodes 37 of FIG. 24D implement the secondary storage system and store only parity data 2426.

In other embodiments, some nodes 37 only implement storage resources of the secondary storage system. For example these nodes 37 only participate at IO level of query execution plans when they store parity data via secondary storage system 2508 utilized to recover segments 2424 whose records are required for the query and are not available for access via the primary storage system 2506.

FIG. 27E illustrates an embodiment of a database system 10 that recovers segments 2424 for storage via primary storage system in response to a detected failure by utilizing the segment recovery module 2739 of FIG. 27C. The record recovery module 2602 can be implemented via one or more computing devices 18 and/or via other processing and/or memory resources of the database system 10. Some or all features and/or functionality of the database system 10 of FIG. 27E can be utilized to implement the database system 10 of FIG. 26A and/or any other embodiment of database system 10 described herein.

The record recovery module 2602 can determine to recover particular segment row data 2505 based on detecting a storage failure of the particular segment row data 2505. This can include determining a node 37 and/or memory drive 2425 storing the segment row data 2505 has failed, gone offline, is performing unfavorably, and/or otherwise encounters a failure condition. This can include determining a segment is unavailable for access, for example, when attempting to read the segment in query execution as discussed in conjunction with FIG. 27D. In this example, segment 2424.1.2 is determined to be unavailable, for example, based on the access failure illustrated in FIG. 26B.

The record recovery module 2602 can retrieve the set of K parity data of the corresponding parity data group 2736.1.2 stored in secondary storage system via a secondary storage access module 2618, which can be the same or different from the one or more secondary storage access modules 2618 of FIG. 27D. This access to the parity data of parity data group 2736.1.2 can be the same access performed by secondary access storage module 2618 utilized by query execution module 2504 as part of the IO step of the query execution in FIG. 27D. This access to the parity data of parity data group 2736.1.2 can alternatively be separate from an IO step of a query execution and/or can be for the purposes of re-storing the segment 2424.1.2 in primary storage system 2506 only.

The record recovery module 2602 can regenerate the segment 2424.1.2 from this set of K parity data of the corresponding parity data group 2736.1.2 as discussed previously, for example, by performing the decoding function 2745 and/or by otherwise utilizing the segment recovery module 2739.

This recovered segment 2424.1.2 can then be re-stored in primary storage system 2506 via a primary storage access module 2616, which can be the same or different from the one or more primary storage access modules 2616 of FIG. 27D. This recovered segment 2424.1.2 can be re-stored in different storage resources, such as a different node 37 and/or memory drive 2425, due to the prior node 37 and/or memory drive 2425 encountering a failure. Alternatively, the recovered segment 2424.1.2 can be re-stored in the original storage resources, such as a same node 37 and/or memory drive 2425, for example, if these resources became again available and/or if the failure condition was due to other circumstances not relating to failure of these resources.

In various embodiments, database system includes at least one processor and a memory that stores operational instructions. The operational instructions, when executed by the at least one processor, can cause the database system to: receive a plurality of records of a dataset for storage; generate a plurality of segment row data from the plurality of records, where each segment row data includes a proper subset of the plurality of records; generate a plurality of parity data corresponding to the plurality of segment row data; store the plurality of segment row data via a first storage mechanism; facilitate storage of the plurality parity data via a second storage mechanism; facilitate execution of a plurality of queries against the dataset by accessing the plurality of segment row data via the first storage mechanism; detect a storage failure of one of the plurality of segment row data via the first storage mechanism; and/or recover the one of the plurality of segment row data for storage via the first storage mechanism based on accessing at least one of the plurality of parity data via the second storage mechanism.

Figure 27F:
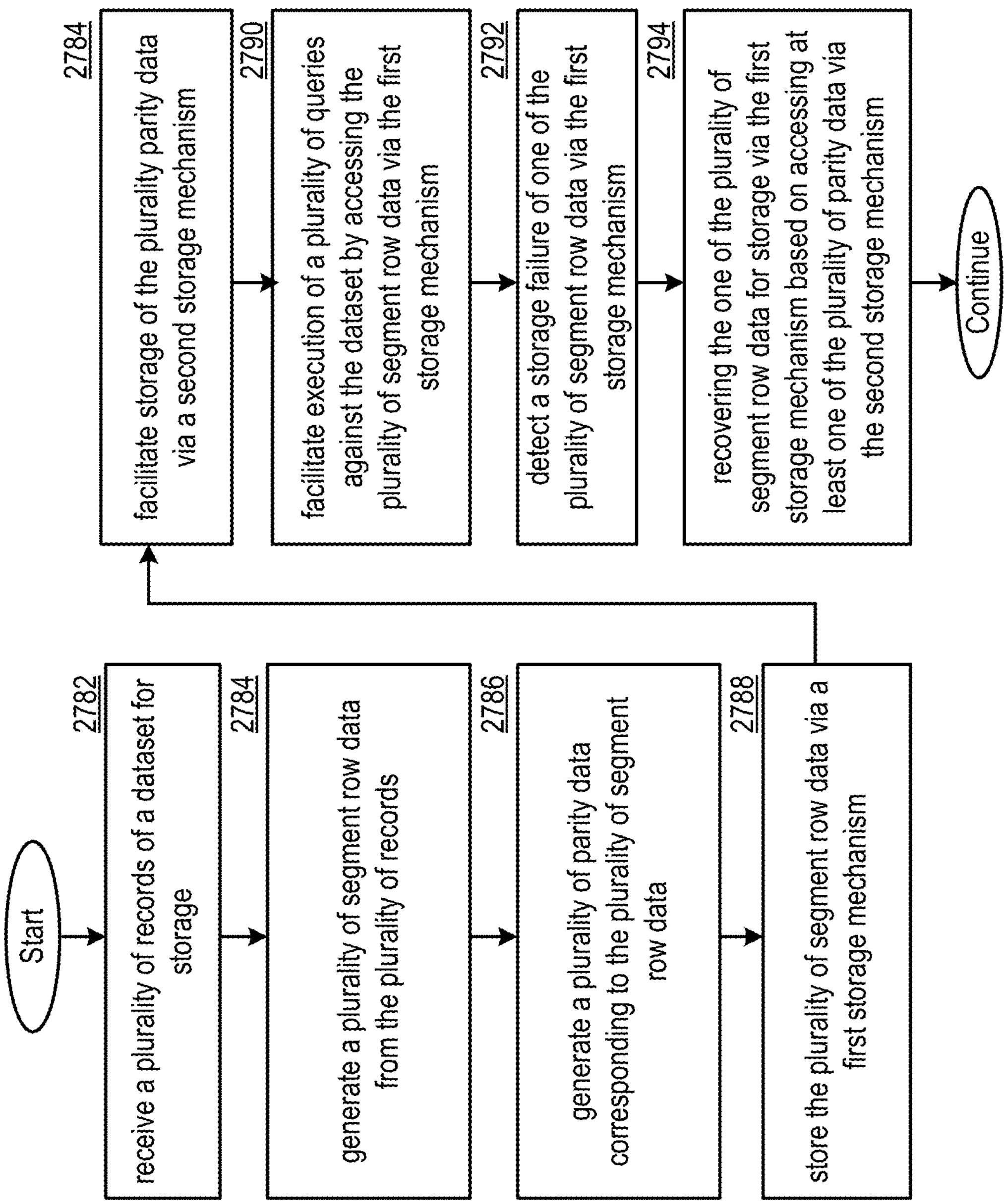
FIG. 27F is a logic diagram illustrating a method of storing records via multiple storage mechanisms in accordance with various embodiments.

FIG. 27F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27F. In particular, a node 37 can utilize the query processing module 2435 to execute some or all of the steps of FIG. 27F, where multiple nodes 37 implement their own query processing modules 2435 to independently execute some or all of the steps of FIG. 27F, for example, to facilitate execution of a query as participants in a query execution plan 2405. Some or all of the method of FIG. 27F can be performed by utilizing the record storage module 2502, the query processing system 2501, the segment recovery module 2739, the record recovery module 2602, the primary storage system 2506, and/or the secondary storage system 2508 in accordance with some or all features and/or functionality described in conjunction with FIGS. 27A-27C. Some or all of the method of FIG. 27F can be performed via a query execution module 2504. Some or all of the steps of FIG. 27F can optionally be performed by any other processing module of the database system 10. Some or all of the steps of FIG. 27F can be performed to implement some or all of the functionality of the record storage module 2502, the query processing system 2501, the segment recovery module 2739, the record recovery module 2602, the primary storage system 2506, and/or the secondary storage system 2508 as described in conjunction with FIGS. 27A-27C. Some or all of the steps of FIG. 27F can be performed to implement some or all of the functionality regarding execution of a query via the plurality of nodes in the query execution plan 2405 as described in conjunction with FIGS. 24A-24D. Some or all steps of FIG. 27F can be performed by database system 10 in accordance with other embodiments of the database system 10 and/or nodes 37 discussed herein.

Step 2782 includes receiving a plurality of records of a dataset for storage. For example, some or all of the plurality of records each include a plurality of values corresponding to a plurality of fields of a corresponding one of the one or more datasets.

Step 2784 includes generating a plurality of segment row data from the plurality of records. Each segment row data can include a proper subset of the plurality of records. A plurality of proper subset of the plurality of records corresponding to the plurality of segment row data can be mutually exclusive and/or collectively exhaustive with respect to the plurality of records. The plurality of records can be grouped to form the plurality of segment row data based on at least one key field, at least one cluster key field, and/or values of any one or more fields of the plurality of records designated for use in generating the plurality of segment row data. For example, ones of the plurality of records with same and/or similar values for these one or more fields are grouped into the same segment row data, while ones of the plurality of records with different values for these one or more fields are grouped into the different segment row data. This can include applying a similarity function and/or clustering algorithm to generate the plurality of segment row data.

Step 2786 includes generating a plurality of parity data corresponding to the plurality of segment row data. The parity data can be generated in accordance with a redundancy storage encoding scheme, such as a RAID scheme, an error correction coding scheme, and/or another scheme that involves generating parity data for use in recovery of data.

The method can optionally include generating a plurality of segments from the plurality of segment row data. Generating a segment from corresponding segment row data can include generating column-formatted data from the segment row data for inclusion in the segment. Generating a segment of the plurality of segments from corresponding segment row data can include performing some or all functionality discussed in conjunction with FIGS. 15-23. Segments of the plurality of segments can include index data, manifest data, and/or statistics data as illustrated in FIG. 23.

Generating a segment of the first plurality of segments can include generating corresponding parity data of the plurality of parity data in conjunction with step 2786, for example, as discussed in conjunction with FIGS. 15-23. However, rather than storing the parity data as part of the segment in conjunction with corresponding segment row data, the parity data is stored elsewhere via the secondary storage mechanism, for example, mapped to an identifier of the corresponding segment row data. In some embodiments, each segment of the first plurality of segments is generated to include, indicate, and/or be mapped to an identifier, pointer, access memory location information, and/or other information for accessing the corresponding parity data in memory of the second storage mechanism.

Generating the plurality of parity data can include segregating segment row data into a plurality of segment groups and/or generating segments via a plurality of segment groups. Each segment group can include a same number of multiple segment row data from the plurality of segment row data. Every segment row data can be included in exactly one segment group.

Parity data for each of a set of multiple segment row data of a given segment group can be based on some or all other ones of the set of multiple segment row data included in this same segment group. This can include applying a redundancy storage encoding scheme to a set of segment row data included in this same segment group generate parity data corresponding to each segment row data in the segment group. A size of the segment groups can correspond to a fault-tolerance level of the redundancy storage encoding scheme.

Parity data of the plurality of parity data can be implemented as parity data 2426 of FIG. 24C. However, unlike the embodiment of parity data 2426 illustrated in FIG. 24C, the parity data 2426 of each given segment 2424 is not stored in conjunction with the records 2422 of the segment 2424, and is instead stored via a different, second storage mechanism.

Step 2788 includes storing the plurality of segment row data via a first storage mechanism. The first storage mechanism can be implemented by utilizing some or all features and/or functionality of the primary storage system 2506. The first storage mechanism can be implemented via a plurality of memory drives 2425 of a plurality of nodes 37. The first storage mechanism can alternatively or additionally be implemented via a plurality of NVMe drives of the database system 10. Storing the plurality of segment row data via a first storage mechanism can include storing the plurality of segment row data as a plurality of segments generated from the segment row data.

Step 2790 includes facilitating execution of a plurality of queries against the dataset by accessing the plurality of segment row data via the first storage mechanism. For example, the second storage mechanism is not utilized to access the plurality of segment row data during query execution. The query can be executed via a plurality of nodes 37 participating in a query execution plan 2405, for example, where nodes 37 at an IO level 2416 access the plurality of segment row data via their own memory drives 2425 that implement the first storage mechanism.

Step 2792 includes detecting a storage failure of one of the plurality of segment row data via the first storage mechanism. For example, detecting a storage failure include determining a failure of a memory drives 2425 of a node 37 that stores the one of the plurality of segment row data. As another example, detecting the storage failure include determining a failure of node 37 that stores the one of the plurality of segment row data via one of its memory drives 2425. As another example, detecting the storage failure includes determining a memory device and/or location storing the one of the plurality of segment row data has failed, is offline, has a current performance that compares unfavorably to a performance threshold, is corrupted, and/or is otherwise encountering a storage failure condition. As another example, detecting the storage failure includes attempting access to the one of the plurality of segment row data via the first storage mechanism, for example, in conjunction with a query execution, where the storage failure is detected based on the attempted access failing. As another example, detecting the storage failure includes receiving a notification of a failure, receiving and/or determining a command and/or instruction to recover the one of the plurality of segment row data, and/or otherwise determining the storage failure and/or that the one of the plurality of segment row data need be recovered in the first storage mechanism.

Step 2794 includes recovering the one of the plurality of segment row data, for example, based on detecting the storage failure of the one of the plurality of segment row data. This can include accessing at least one of the plurality of parity data via the second storage mechanism. For example, a set of parity data corresponding to other ones of the plurality of segment row data, such as parity data for segment row data of some or all of a set of segments in a same segment group, are accessed to rebuild the segment row data, for example, in accordance with a decoding process corresponding to the redundancy storage encoding scheme that utilizes the set of parity data as input. This can include a similar process as discussed in conjunction with FIG. 24D, where parity data is accessed via the second storage mechanism rather than from segments stored in other nodes 37 at the IO level of a query execution plan.

Step 2794 can include re-storing the one of the plurality of segment row data, once recovered via parity data read from the second storage mechanism, in different memory resources of the first storage mechanism that are different from failed memory resources of the first storage mechanism. For example, if a first memory drive and/or a first node of the first storage mechanism that previously stored the one of the plurality of segment row data failed, this one of the plurality of segment row data, once recovered, is stored in a different memory drive and/or a different node, for example, that is operating correctly and/or not undergoing a failure condition. Re-storing the one of the plurality of segment row data can include regenerating a corresponding segment for storage via the first storage mechanism.

In cases where detecting the storage failure of the one of the plurality of segment row data via the first storage mechanism is based on detecting a failed memory drive 2425, failed node 37, and/or another failed one or more memory devices, step 2794 can include recovering multiple ones of the plurality of segment row data, such as all segment row data that was stored via the failed memory drive 2425, failed node 37, and/or another failed one or more memory devices. Step 2794 can include accessing sets of the plurality of parity stored via the second storage mechanism, regenerating each segment row data via a corresponding set of the plurality of parity data, and/or re-storing the multiple ones of the plurality of segment row data via the first storage mechanism.

In some embodiments, the method further includes facilitating execution of at least one other query by accessing parity data via the second storage mechanism. For example, consider a query that is executed after the storage failure of the one of the plurality of segment row data and prior to the recovery of the one of the plurality of segment row data. As a particular example, detecting the storage failure includes attempting access to the one of the plurality of segment row data via the first storage mechanism in conjunction with execution of the at least one other query, where the storage failure is detected based on the attempted access failing. Based one of the plurality of segment row data being unavailable for use in the query execution via the first storage mechanism due to the storage failure, rather than delaying query execution until this one of the plurality of segment row data is recovered in the first storage mechanism, the query execution can proceed based on recovering this one of the plurality of segment row data via access of a corresponding set of parity data via the second storage mechanism. This recovery of the one of the plurality of segment row data via access of a corresponding set of parity data via the second storage mechanism can be slower than access of ones of the plurality of segment row data stored via the first storage mechanism, for example, based on the first storage mechanism having more efficient access than the second storage mechanism and/or based on a length of time and/or resources required to recover segment row data.

In some embodiments, this recovery of the one of the plurality of segment row data via access to a corresponding set of parity data via the second storage mechanism to facilitate execution of the query can be utilized to implement the access of step 2694 utilized to recover the one of the plurality of segment row data via the first storage mechanism. For example, the one of the plurality of segment row data, once recovered via the corresponding set of parity data to facilitate query execution, is then re-stored via the first storage mechanism, rather than a separate second access to the one of the plurality of segment row data being performed to recover the one of the plurality of segment row data in step 2694.

The method can further include detecting a storage failure of parity data of the plurality of parity via the second storage mechanism and/or recovering this parity data of the plurality of parity data for storage via the second storage mechanism. This can include accessing multiple other ones of the plurality of parity data that are different from this failed parity data, such as parity data of some or all of a set of segments in a same segment group, to rebuild the another given parity data in accordance with a decoding process corresponding to the redundancy storage encoding scheme. For example, the parity data stored in the second storage mechanism is generated in accordance with a redundancy storage encoding scheme that enable the corresponding decoding process to recover all data of a full segment, including both the parity data and the segment row data of the segments, despite being stored in separate locations.

In various embodiments, a non-transitory computer readable storage medium includes at least one memory section that stores operational instructions. The operational instructions, when executed by a processing module that includes a processor and a memory, can cause the processing module to: receive a plurality of records of a dataset for storage; generate a plurality of segment row data from the plurality of records, where each segment row data includes a proper subset of the plurality of records; generate a plurality of parity data corresponding to the plurality of segment row data; store the plurality of segment row data via a first storage mechanism; facilitate storage of the plurality parity data via a second storage mechanism; facilitate execution of a plurality of queries against the dataset by accessing the plurality of segment row data via the first storage mechanism; detect a storage failure of one of the plurality of segment row data via the first storage mechanism; and/or recover the one of the plurality of segment row data for storage via the first storage mechanism based on accessing at least one of the plurality of parity data via the second storage mechanism.

In some cases, the embodiments of FIGS. 27A-27E that store segments and parity data separately may be a preferred mechanism over the duplicated storage of segment row data presented in conjunction with FIGS. 26A-26C. In particular, the embodiments of FIGS. 27A-27E only require that segment row data, and thus each record, be stored once, while the embodiments of FIGS. 26A-26C require that segment row data, and thus each record, be stored twice, which can be unideal if memory resources of the secondary storage system and/or total memory resources are limited. However, in other cases, the embodiments of FIGS. 26A-26C over the embodiments of FIGS. 27A-27E in cases where storage resources are more ample, particularly in cases where failures occur more frequently and/or where recovering segments via retrieving multiple corresponding parity data from multiple locations, and by performing a decoding function of a corresponding redundancy storage error encoding scheme is timely and/or expensive. In such cases, it can be more ideal to store duplicated segment row data, where simple retrieval of duplicate segment row data can be utilized to recover segments rather than this more timely recovery of segments is not required.

A trade-off between total memory utilization requirements and record recovery efficiency of each embodiment can be utilized to dictate whether the embodiments of FIGS. 26A-26C over the embodiments of FIGS. 27A-27E are preferred for different implementations of database system 10 and/or for different datasets. This trade-off can further be based on a failure rate of nodes, memory drives, and/or computing devices of the database system, where higher failure rates can indicate the embodiments of FIGS. 26A-26C are more preferred, and where lower failure rates can indicate the embodiments of FIGS. 27A-27E are preferred. This trade-off can further be based on an access rate and/or query rate, as infrequent access to data can enable data to take longer to be recovered, where higher access rates can indicate the embodiments of FIGS. 26A-26C are more preferred, and where lower access rates can indicate the embodiments of FIGS. 27A-27E are preferred. This trade-off can further be based on a size of parity data relative to the size of segment row data, where greater sizes of parity data relative of the size of segment row data can indicate the embodiments of FIGS. 26A-26C are more preferred, and where smaller sizes of parity data relative of the size of segment row data can indicate the embodiments of FIGS. 27A-27E are preferred.

In some cases, different implementations and/or portions of database system 10 can utilize different embodiments, and/or different datasets can be stored via different embodiments, where some datasets are stored via the embodiments of FIGS. 26A-26C, and where other datasets are stored via the embodiments of FIGS. 27A-27E. This can be configured via user input and/or can be determined automatically based on the type of data in the datasets, the access rate and/or querying rate to the dataset, the fault-tolerance, memory capacity, and/or processing speed of the computing devices being utilized to store the datasets, and/or based on another determination.

FIGS. 28A-41E illustrate embodiments of an object storage system 3105. Some or all features and/or functionality of the object storage system 3105 presented in one or more embodiments of FIGS. 28A-41E can implement some or all of database storage 2450 and/or other storage of records 2422 (e.g. rows) of one or more database tables 2712. Some or all features and/or functionality of the object storage system 3105 presented in one or more embodiments of FIGS. 28A-41E can implement some or all of the parallelized data store, retrieve, and/or process sub-system 12. Some or all features and/or functionality of the object storage system 3105 presented in one or more embodiments of FIGS. 28A-41E can implement the primary storage system 2506 and/or the secondary storage system 2508 as discussed in one or more of FIGS. 25A-27F. Some or all features and/or functionality of the object storage system 3105 presented in one or more embodiments of FIGS. 28A-41E can implement some or all of database system 10. Some or all features and/or functionality of the object storage system 3105 presented in one or more embodiments of FIGS. 28A-41E can implement memory drives and/or other storage resources of one or more nodes 37 and/or one or more computing devices 18, and/or can store data via other centralized or dispersed storage resources. Some or all features and/or functionality of the object storage system 3105 presented in one or more embodiments of FIGS. 28A-41E can implement any other type of object storage system.

For example, an object storage service, such as Amazon Simple Storage Service (S3), Azure Blob storage, Google Cloud Platform (GCP), Oracle Cloud Infrastructure Object Storage service, IBM Cloud Object Storage, can implement the object storage system 3105. Alternatively or in addition, the object storage system 3105 is implemented to store a plurality of objects via a flat storage structure, for example without hierarchy of the plurality of objects, and/or without folder-based storage for storing the plurality of objects. For example, the object storage system 3105 is implemented without folders, directories, files, or other hierarchies. Alternatively or in addition, the object storage system 3105 is implemented via cloud-based storage resources. Alternatively or in addition, the object storage system 3105 is implemented to store each of a plurality of large and/or unstructured data as a corresponding one of a plurality of objects. Alternatively or in addition, the object storage system 3105 is implemented to store a plurality of objects that each include a data portion, an object metadata portion, and/or an identifier, such as a globally unique identifier.

FIGS. 28A-41E further illustrate embodiments of a data processing system 3107. Some or all features and/or functionality of the data processing system 3107 presented in one or more embodiments of FIGS. 28A-41E can implement some or all of query processing system 2510, such as query execution module 2504, and/or some or all of parallelized query and results sub-system 13. For example, the data processing system 3107 is implemented as query processing system 2510 and/or as query processing system 2501. Some or all features and/or functionality of the data processing system 3107 presented in one or more embodiments of FIGS. 28A-41E can implement the database system 10. Some or all features and/or functionality of the object storage system 3105 presented in one or more embodiments of FIGS. 28A-41E can implement processing core resources 48 and/or other storage resources of one or more nodes 37 and/or one or more computing devices 18, and/or can process data via other centralized or dispersed processing resources.

Some or all features and/or functionality of the data processing system 3107 presented in one or more embodiments of FIGS. 28A-41E can be implemented by a client device, user device, computing device, and/or other processing and/or memory resources implemented by a requesting entity (e.g. end user that generates query requests for execution, based on communicating with object storage system and/or executing some or all of the query itself), such as an external requesting entity 2518. Some or all features and/or functionality of the data processing system 3107 presented in one or more embodiments of FIGS. 28A-41E can be implemented by a computing device and/or other processing and/or memory resources implemented by a data provider (e.g. computing devices/equipment/company/etc. that generates/collects/sends for storage the records to be storage, against which queries are then executed). Some or all features and/or functionality of the data processing system 3107 presented in one or more embodiments of FIGS. 28A-41E can be implemented via a data processing/query processing system and/or service (e.g. implemented by an entity such as SPARK, etc.). Some or all features and/or functionality of the data processing system 3107 presented in one or more embodiments of FIGS. 28A-41E can implement any system operable to: process and/or send data for storage, for example, in an object storage system 3105; retrieve data from storage, for example, from an object storage system 3105; receive, generate, process, optimize, and/or execute queries against datasets, such as data stored in object storage system 3105; perform data analytics; interface with an object storage system; and/or perform other functionality to process records 2422 or other data, for example, sent to and/or received from storage in an object storage system 3105.

In some embodiments, some or all data stored by object storage system 3105 is sent to and/or accessible by one or more data processing systems 3107 via a wired and/or wireless network connection. As discussed in further detail herein, a data processing system 3107 can utilize a wired and/or wireless communication connection with one or more object storage systems 3105 to facilitate storage of new data in object storage system 3105 and/or retrieve data stored in object storage system 3105 in conjunction with executing queries. Alternatively or in addition, as discussed in further detail herein, an object storage systems 3105 can utilize a wired and/or wireless communication connection with one or more data processing systems 3107 (e.g. multiple different database systems operated by different companies/entities; utilizing different storage resources; etc.) to store data for access by these one or more data processing systems 3107, for example, for use by data processing systems 3107 in query execution.

In some embodiments, such communications between one or more data processing systems 3107 and one or more object storage systems 3105 can be accordance with an object storage communication protocol, such as an Application Programming Interface (API) implemented to facilitate communications between data processing systems 3107 and object storage systems 3105, and/or between object storage systems 3105 and other systems operable to send data for storage; retrieve data from storage; process data from storage; perform queries and/or analytics upon stored data; and/or other processing and/or storage of data. Such an object storage communication protocol (e.g. API) can be indicated by object storage communication protocol data 3141 of FIGS. 28A-41E, which can be known to and utilized by both data processing systems 3107 and object storage systems 3105. For example, the API can be implemented as an HTTP application programming interface.

In some embodiments, this API can optionally be implemented via some or all features and/or functionality an existing API, for example, implemented by an existing service providing object storage system 3105. For example, some or all features and/or functionality of the representational state transfer (REST) API, RESTful API, Simple Object Access Protocol (SOAP) API, HTTP, HTTPS, XML, JSON, are implemented by the object storage communication protocol of FIGS. 28A-41E. Alternatively or in addition, the object storage communication protocol of FIGS. 28A-41E includes and/or is based on commands (e.g. of HTTP methods utilized by the API) such as: GET, PUT, POST, PATCH, DELETE. The object storage communication protocol of FIGS. 28A-41E can include and/or can be based on any other existing commands.

In such embodiments, existing structure of the existing API (e.g. existing commands) can be leveraged to enable communications utilized to implement some or all features and/or functionality described in conjunction with one or more of FIGS. 28A-41E. For example, a custom arrangement and/or custom modification of existing commands of the existing API are implemented to render some or all features and/or functionality described in conjunction with one or more of FIGS. 28A-41E. As another example, existing commands of the existing API are interpreted by data processing systems 3107 and/or by object storage system 3105 in a custom fashion to render some or all features and/or functionality described in conjunction with one or more of FIGS. 28A-41E. Some or all embodiments of the object storage communication protocol described in conjunction with FIGS. 28A-41E can optionally be implemented via an existing API in this fashion.

In some embodiments, this API can be implemented via custom functionality of a custom API. This custom API can be configured for standardization, for example, to render a new, common set of commands that can be leveraged to enable communications utilized to implement some or all features and/or functionality described in conjunction with one or more of FIGS. 28A-41E. For example, new, custom commands of the API are implemented to render some or all features and/or functionality described in conjunction with one or more of FIGS. 28A-41E. Some or all embodiments of the object storage communication protocol described in conjunction with FIGS. 28A-41E can optionally be implemented via a custom API in this fashion.

In such embodiments, the new, custom commands of the API are optionally interpreted as and/or converted to existing instructions of an existing API to render some or all features and/or functionality described in conjunction with one or more of FIGS. 28A-41E based on corresponding predetermined mapping associated with the API mapping new commands to corresponding commands of the existing API. The new commands of the new API included in a given request to the object storage system 3107 that were generated in accordance with the new API can thus be converted by the object storage system 3107 into commands of the existing API based on the corresponding predetermined mapping, where the object storage system 3107 then executes the commands of the existing API.

Alternatively or in addition, custom commands of the API facilitate new functionality of a corresponding object storage system 3107, such as advanced filtering, aggregation, query processing, and/or analytics that go beyond simple object storage and retrieval. For example, the object storage system 3107 is a new type of object storage system and/or is implemented via extended functionality of an existing object storage system. The new commands of the new API included in a given request to the object storage system 3107 that were generated in accordance with the new API can thus be executed by the object storage system 3107 in accordance with the new functionality.

Such custom application/modification of the existing API and/or such a new, custom API can be implemented as a standardized object storage communication protocol. The standardization of object storage communication protocol can be ideal in rendering predictable and/or identical functionality when used across multiple platforms (e.g. when used by any data processing systems 3107 communicating with a given object storage system 3105 and/or when used by any object storage system 3105 when communicating with a given data processing systems 3107). The object storage communication protocol can be configured via a set of genericized commands that can be used across multiple platforms/types of data/types of data retrieval or processing/types of object formats/etc., enabling standardization across multiple companies/datasets/data types/analytics types/industries accordingly. Embodiments of object storage communication protocol that render such generalization suitable for a standard are discussed in further detail herein.

In some embodiments, the object storage communication protocol described herein can be implemented as an industry standard and/or can otherwise be implemented by multiple different data processing systems 3107 (e.g. different database services/analytics services/other data processing services hosted by different companies) and/or by multiple different object storage system 3105 (e.g. different object storage services hosted by different companies).

In some embodiments, the object storage communication protocol corresponds to a particular object storage system 3105 (e.g. hosted by a particular company), where the object storage communication protocol is implemented as a company-specific standard specific to this particular object storage system 3105, and is optionally utilized by multiple different data processing systems 3107 that communicate with/use this particular object storage system 3105 (e.g. for storage of some or all of its data)

In some embodiments, the object storage communication protocol corresponds to a particular data processing systems 3107 (e.g. hosted by a particular company), where the object storage communication protocol is implemented as a company-specific standard specific to this particular data processing systems 3107, and is optionally utilized by multiple different object storage system 3105 that communicate with/use this particular data processing system 3107 (e.g. for analysis/sourcing/querying/other processing of some or all of its stored data)

Such communication between one or more data processing systems 3107 and one or more object storage systems 3105 can implement functionality of a given database system 10 that includes both the data processing systems 3107 (e.g. for execution of its queries, for example, implementing query processing system 2510, query processing system 2501, and/or parallelized query & results bus-system 13) and the one or more object storage systems 3105 (e.g. for storage of its data, for example, implementing parallelized data store; retrieve; and/or process sub-system 12). In such embodiments, a given database system 10 can implement some or all of its functionality based on including one or data processing systems 3107 and one or more object storage systems 3105 that communicate (e.g. via internal communications of the database system 10) in this fashion, where a given database system 10 implements some or all features and/or functionality of the object storage systems 3105 and the data processing systems 3107 discussed in conjunction with one or more FIGS. 28A-41E. In such embodiments, the database system 10 can implement an analytics service and/or storage service that stores some or all of its data via object storage and also execute queries against this data/performs analytics upon this data.

Alternatively or in addition, a given database system 10 implements a given data processing systems 3107, which executes queries against data stored via a separate one object storage systems 3105 via such communications, where a given database system 10 thus communicates with or more and one or more object storage systems 3105 that are separate from database system 10 as discussed previously. In some embodiments, object storage system 3105 can be separate from database system 10, for example, based on: being operated by a different company/entity; storing data in accordance a different storage format; utilizing different storage resources; storing data in a different one or more locations; and/or other differences. For example, the object storage system 3105 can include physical hardware and/or a storage scheme that is managed by a separate object storage service, a third party storage service, a cloud storage service, and/or another storage entity that is distinct from the storage resources of the database system 10.

As used herein, "rows" can be interchangeably referred to as "records". As used herein, "columns" can be interchangeably referred to as "fields". As used herein, a row is not necessarily a relational database row, but can correspond to any type of record/any type of data stored in memory resources and/or processed during query execution, even if not in relational database format and/or even if not stored by a relational database. A record/row can have a single value, or multiple values, for example, corresponding to multiple different fields. As used herein, a column is not necessarily a relational database column, but can correspond to any type of field, for example, where a given record has values for a set of fields, which can be the same or different from sets of fields for which other records of the same object and/or the same dataset have values.

Figure 28A:
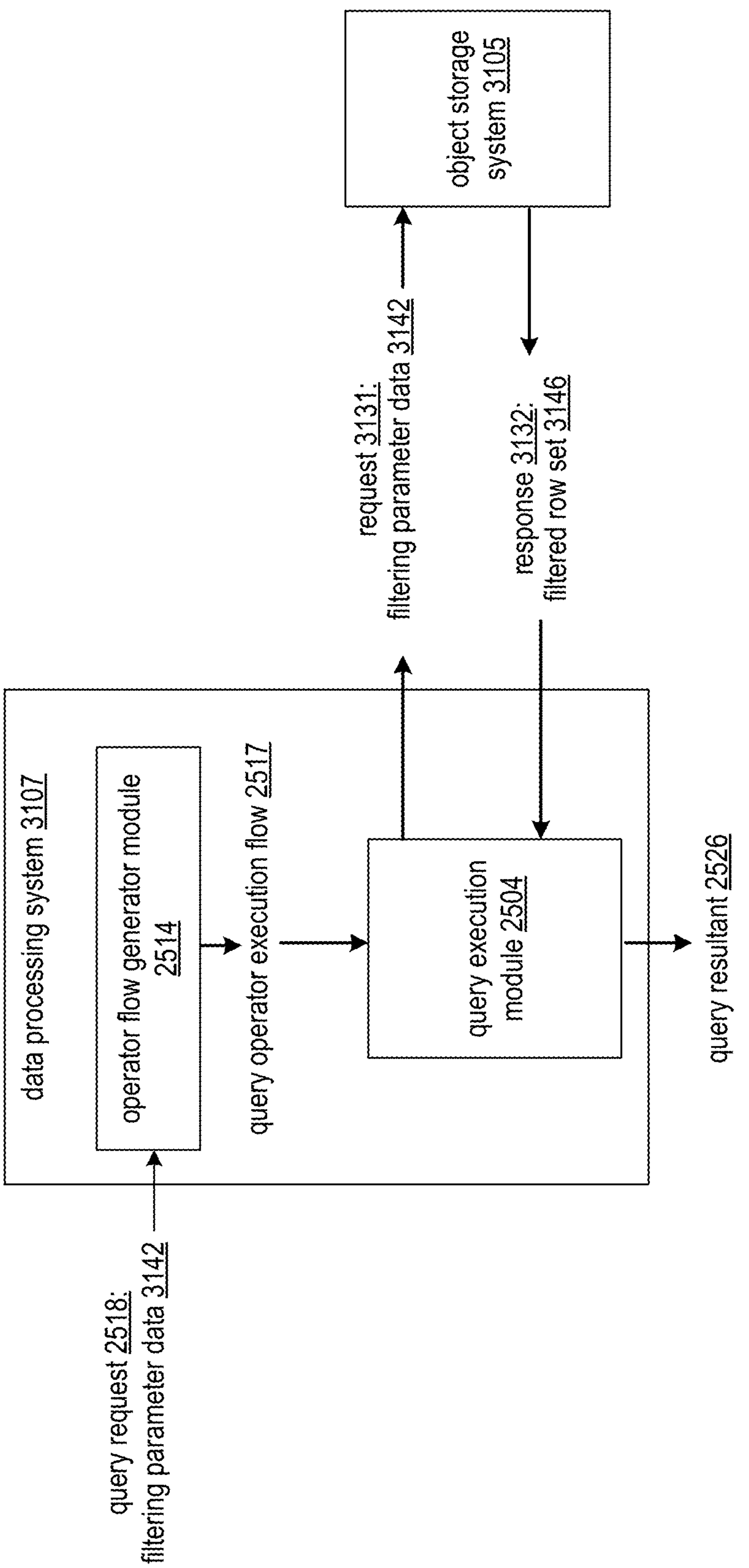
FIG. 28A is a schematic block diagram of a data processing system that includes a query execution module communicating with an object storage system in accordance with various embodiments.

FIG. 28A illustrates an embodiment of a data processing system 3107 that includes an operator flow generator module 2514 and a query execution module 2504. The operator flow generator module 2514 can generate a query operator execution flow 2517 for a given query request 2518 that indicates filtering parameter data 3142. The query operator execution flow 2517 can indicate a serialized and/or parallelized arrangement of a plurality of operators for execution as discussed previously. The operator flow generator module 2514 and/or query operator execution flow 2517 of FIG. 28A can be implemented via any embodiment of operator flow generator module and/or query operator execution flow described herein. Some or all features and/or functionality of the query execution of FIG. 28A can implement any embodiment of query execution described herein.

The query request 2518 can be implemented via any embodiment of a query request, query expression, or query described herein. The query request 2518 can be generated based on user input to a computing device, for example, indicating an expression written by a user in a query language such as SQL and/or a custom language that implements instructions corresponding to an object storage communication protocol. The query request 2518 can be generated automatically by at least one processor, for example, indicating an expression written automatically based on detecting at least one condition and/or based on other information, for example, in a query language such as SQL and/or a custom language that implements instructions corresponding to an object storage communication protocol.

The query execution module 2504 can process the query operator execution flow 2517 to generate a query resultant 2526. The query execution module 2504 can be implemented via one or more nodes 37, such as nodes of a query execution plan 2405 as discussed previously, and/or can be implemented via any other processing resources. The query resultant can indicate a set of rows identified based on the filtering parameter data 3142 and/or can be based on further processing of a set of rows identified based on the filtering parameter data 3142.

The query execution module 2504 can generate query resultant 2526 based on communicating with an object storage system 3105. As illustrated in FIG. 28A, the query execution module 2504 can generate and/or send at least one request 3131 to the object storage system 3105. The request 3131 can indicate some or all of the filtering parameter data 3142 and/or can be otherwise based on the filtering parameter data 3142. The request 3131 can correspond to a request to access and/or identify a set of records stored by the object storage system that meet and/or otherwise compare favorably to the filtering parameter data 3142. For example, the filtering parameter data 3142 of the given request 2518 can correspond to at least one query predicate, at least one conditional expression, and/or other parameters dictating which rows be identified for inclusion in the 2526 and/or be identified for further processing to generate the query resultant 2526.

The object storage system 3105 can receive and/or process the request 3131 to identify a filtered row set 3146. The object storage system 3105 can generate and/or send the response 3132 to the data processing system 3107, where the response 3132 include and/or is based on the filtered row set 3146 identified based on processing the request 3131.

The query execution module 2504 can receive and/or process the response 3132 to generate the query resultant 2526. For example, the query resultant 2526 is generated to include column values of rows indicated in the filtered row set 3146. As another example, the query resultant 2526 is generated based on further processing column values of rows indicated in the filtered row set 3146, for example, in accordance with corresponding query operators indicated by query request 2518 and/or indicated by query operator execution flow 2517.

In embodiments where the query execution module 2504 is implemented via many processing entities (e.g. many nodes), different computing devices/nodes/processing core resources can be responsible for different portions of the query execution as discussed previously. In particular, one or more first nodes can generate one or more corresponding requests 3131. In some embodiments, the same one or more first nodes receive corresponding responses 3132 to these one or more requests. In other embodiments, one or more second nodes receive corresponding responses 3132 to these one or more requests for processing, where some or all of the one or more second nodes are distinct from the one or more first nodes.

The communications between the data processing system 3107 and object storage system 3105 can be achieved via corresponding communication resources implemented via: at least one wired and/or wireless communications link; at least one local area network; at least one wide area network; at least one cellular network; the Internet; at least one satellite communication link; at least one corresponding communication network; at least one shared memory resource accessible by data processing system 3107 and object storage system 3105 where requests 3131 are stored for access by object storage system 3105 and/or where responses 3132 are stored for access by object storage system 3105; and/or other communication resources.

Figure 28B:
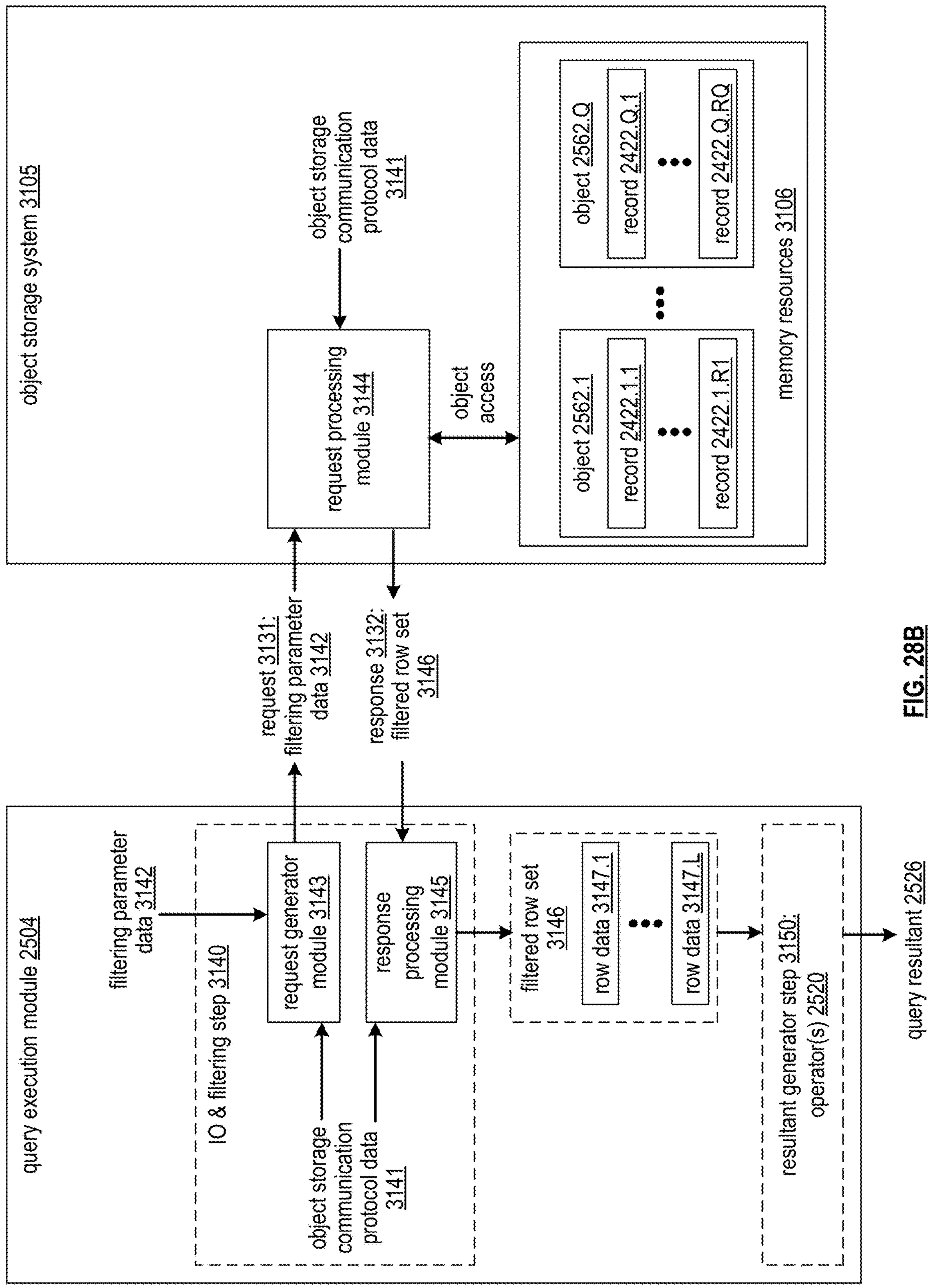
FIG. 28B is a schematic block diagram illustrating query execution based on a query execution module communicating with an object storage system when performing an IO and filtering step to generate a filtered row set in accordance with various embodiments.

FIG. 28B illustrates an embodiment of a query execution module 2504 communicating with an object storage system 3105. Some or all features and/or functionality of the query execution module 2504 of FIG. 28B can implement the query execution module 2504 of FIG. 28A. Some or all features and/or functionality of the object storage system 3105 of FIG. 28B can implement the object storage system 3105 of FIG. 28A. Some or all features and/or functionality of the query execution of FIG. 28B can implement any embodiment of query execution described herein.

The query execution module 2504 can generate query resultant 2526 for a given query based on performing an IO and filtering step 3140 and/or a resultant generator step 3150. The IO and filtering step 3140 and/or a resultant generator step 3150 can be based on corresponding operators of the query operator execution flow 2517 being processed by query execution module 2504 as illustrated in FIG. 28A. For example, a first set of operators of the query operator execution flow which are executed to implement the IO & filtering step are serially before a second set of operators of the query operator execution flow which are executed to implement the resultant generator step 3150.

The IO & filtering step 3140 can be implemented to generate a filtered row set 3146 based on communication with object storage system 3105. A request generator module 3143 can be implemented to generate request 3131 from the filtering parameter data 3142 of the query.

The request generator module 3143 can generate the request 3131 in accordance with object storage communication protocol data 3141. For example, the object storage communication protocol data 3141 indicates an API for interfacing with object storage system 3105. In particular, a syntax and/or structure of the request 3131 can be in accordance with syntax and/or rules indicated by the object storage communication protocol data 3141.

The request processing module 3144 of the object storage system 3105 can interpret and execute the request 3131 correctly based on processing the request and/or extracting the filtering parameter data 3142 and/or other corresponding instructions in accordance with the object storage communication protocol data 3141. Executing the request 3131 can include performing various object access to objects and/or object metadata of memory resources 3106 of the object storage system to identify objects 2562, and/or records 2422 stored within/as objects 2562, that meet the filtering parameter data 3142 indicated by the request 3131.

In some embodiments request 3131: is implemented in a same or similar fashion as a GET request of an existing object storage system framework; is implemented in a same or similar fashion as a GET HTTP verb, includes the keyword "GET"; and/or is interpreted via request processing module 3144 to render request processing module 3144 performing the corresponding request based on performing at least one GET request of an existing object storage system framework and/or via GET HTTP verb.

The memory resources of object storage system 3105 can be implemented as one or more memory devices across one or more physical locations storing a plurality of objects 2562 of the object storage system 3105. The plurality of objects 3105 can be associated with one or more customers of the object storage system 3105 and/or one or more data providers of the object storage system 3105.

The request processing module 3144 can identify a filtered row set 3146 indicating a set of records that meet the filtering parameter data 3142. The filtered row set 3146 can be guaranteed to include all rows meeting the filtering parameter data 3142, and can be further guaranteed to include only rows meeting the filtering parameter data 3142, for example, in conjunction with guaranteeing query correctness as required by the data processing system 3107.

Generating the filtered row set 3146 can be based on filtering predicates of the filtering parameter data 3142, and identifying which records 2422 satisfy these filtering predicates. This can be based on accessing the records 2422 directly in one or more objects 2562 and determining which records satisfy the filtering parameter data 3142. This can alternatively or additionally be based on accessing one or more index structures indexing the records 2422 across one or more objects. This can alternatively or additionally be based on accessing object metadata included within and/or associated with one or more objects to identify a list or records and/or types of records stored within one or more objects.

The records 2422 can be implemented via some or all functionality of records and/or rows discussed herein, for example, having one or more fields (i.e. relational database columns), where the object storage system is operable to store rows of a relational database for access by one or more data processing systems 3107 in conjunction with query execution against a relational database (e.g. SQL query execution). Some or all records 2422 can correspond to static data and/or data that is expected to be modified infrequently, for example, where object storage is favorable.

Alternatively or in addition, some or all records 2422 are optionally not structured as relational database rows, and can include unstructured data stored as objects 2562, for example where object storage is favorable. For example, some or all records 2422 are optionally implemented as audio data, video data, image data, multimedia data, text documents, other documents/files, and/or any other type of data stored as objects in object storage.

In some embodiments, some or all records 2422 are optionally implemented as a portion of the underlying data of one or more objects. For example, a document or other data formatted in accordance with a given format stored as an object, and includes a plurality of records 2422 that are stored in accordance with the corresponding format and are extractable from the object in accordance with the corresponding format. For example, various objects of object storage system 3105 are stored in accordance with a corresponding file formats such as: CSV, Parquet, JSON, Avro, ORC, Delta, Arrow, Pickle, Feather, hdf5, or other file formats for data storage, such as file formats implemented for big data storage. As another example, a text document includes a plurality of separate records in accordance with a known structuring of the text document. As another example, one or more objects are implemented via some or all features and/or functionality of the formatting of segments 2424 described herein, where different segments 2424 are stored via different objects. In some embodiments, the records 2422 extracted from a given unstructured object can be implemented/treated as/similarly to relational database rows themselves, where queries are executed to filter records included within/extracted from one or more objects based on the underlying file format and/or other known structure of the data. Instructions to apply such extraction/filtering upon such objects can be identified and/or executed by the object storage system 3105 based on corresponding sets of instructions of the request 3131 in accordance with the object storage communication protocol data 3141, for example, based on the request 3131 having been generated by request generator module 41343 in accordance with this object storage communication protocol data 3141.

Alternatively or in addition, some or all records 2422 are optionally implemented as one or more attributes of the object/underlying data, For example, a given record 2422 corresponding to a given object has a plurality of fields populated with values corresponding to name, ID, size/length, age, time since/date of last modification/read, access frequency, access permissions, creator/owner/provider of the data, one or more classifiers for the data, information indicating relation with one or more other objects, and/or other predetermined and/or measurable attributes of the respective data. In some embodiments, these fields are stored as object metadata of the corresponding object, and are accessible in object metadata of the corresponding object. Alternatively, these fields are stored separately and/or are otherwise determinable/accessible for one or more corresponding objects via access to the memory resources. In some embodiments, such records 2422 corresponding to sets of attributes corresponding to various unstructured objects and/or identifying various unstructured objects can be implemented/treated as/similarly to relational database rows themselves, where queries are executed to filter objects based on identifying which objects have attributes indicated in the filtering parameter data 3142. Instructions to apply such filtering upon such attributes of various objects can be identified and/or executed by the object storage system 3105 based on corresponding sets of instructions of the request 3131 in accordance with the object storage communication protocol data 3141, for example, based on the request 3131 having been generated by request generator module 41343 in accordance with this object storage communication protocol data 3141.

The request processing module 3144 can generate and send a response 3132 to request 3131 indicating a set of records 2422 meeting the filtering parameter data 3142, in accordance with processing the corresponding request 3131. For example, the row data 3147 of the filtered row data 3147 is extracted from the response 3132 based on the object storage communication protocol data 3141, where the response 3132 is generated and processed in accordance with a corresponding API. The row data 3147 of the filtered row data 3147 can include values of the identified set of meeting the filtering parameter data 3142. Alternatively, the values may not be necessary in executing the query at this point, and each row data 3147 of filtered row data can optionally include identifiers for, data locations of, and/or other information identifying and/or regarding the corresponding record 2422. Alternatively or in addition, the filtered row data can optionally simply indicate a number of rows included in the set of records 2422 meeting the filtering parameter data 3142, for example, where the identifiers and/or values for the actual records themselves are not required.

The response 3132 can thus indicate a filtered row set 3146 that includes row data 3147 for each row in the identified set of records 2422, which can be further processed by the data processing system 3147. As illustrated in FIG. 28B, the filtered row set 3146 indicates row data 3146.1-3146.L for a corresponding set of L rows identified as satisfying the filtering parameter data. L can optionally correspond to any number of rows, such as a large number of rows. L optionally is one, where exactly one row satisfying the filtering parameter data 3142. L is optionally zero, where no rows satisfy the filtering parameter data 3142.

The row data 3147.1-3147.L filtered row set 3148 can be further processed in conjunction with executing other operators 2520 to generate the query resultant. For example, additional filtering, aggregation, JOIN operations, and/or other operations are more efficiently executed via the data processing system 3107 and/or are not possible to perform by the object storage system, and are thus performed by the data processing system 3107 upon the received filtered row set 3146. In some embodiments, the set of rows (e.g. their values) indicated by filtered row set 3146 indicated in response 3122 are simply outputted without further processing, for example, based on all required filtering and/or additional processing having been performed by request processing module 3144 based on all required filtering and/or additional processing having been indicated in instructions of the corresponding request 3131.

In some embodiments, the set of rows indicated by filtered row set 3146 are counted, averaged, otherwise aggregated to render query resultant 2526. Alternatively or in addition, multiple set of rows indicated by filtered row set 3146 (e.g. based on different row sets corresponding to different parameters applied to the same or different field) are processed via conditional statements (e.g. AND/OR/NOR/UNION/INTERSECT/JOIN operations applied to multiple sets of rows) to generate the query resultant 2526. In some embodiments, the query resultant 2526 is generated in accordance with executing SQL operators upon filtered row set 3146 in conjunction with executing a SQL query. In some embodiments, the filtered row set 3146 is generated in accordance with executing SQL operators in conjunction with executing any other query/request upon the filtered row set 3146.

In some embodiments, more advanced statistical processing, machine learning, artificial intelligence, and/or data analytics is applied render query resultant 2526, for example, where query resultant indicates statistical/analytics information denoting deeper insights into the data of filtered row set 3146 and/or a trained model (e.g. AI model/machine learning model/regression model/statistical model) for execution at a later time. In some embodiments, a previously generated model generated as a query resultant 2526 for execution of a prior query via access to the same or different objects of the same or different object storage system 3105 and/or other data storage system is applied to the filtered row set 3146 of a given query to generate the query resultant, for example, corresponding to validation of the trained model, updating of the trained model, and/or inference data for the filtered row set (e.g. predicted values for the corresponding records 2422 included in the filtered row set).

Figure 28C:
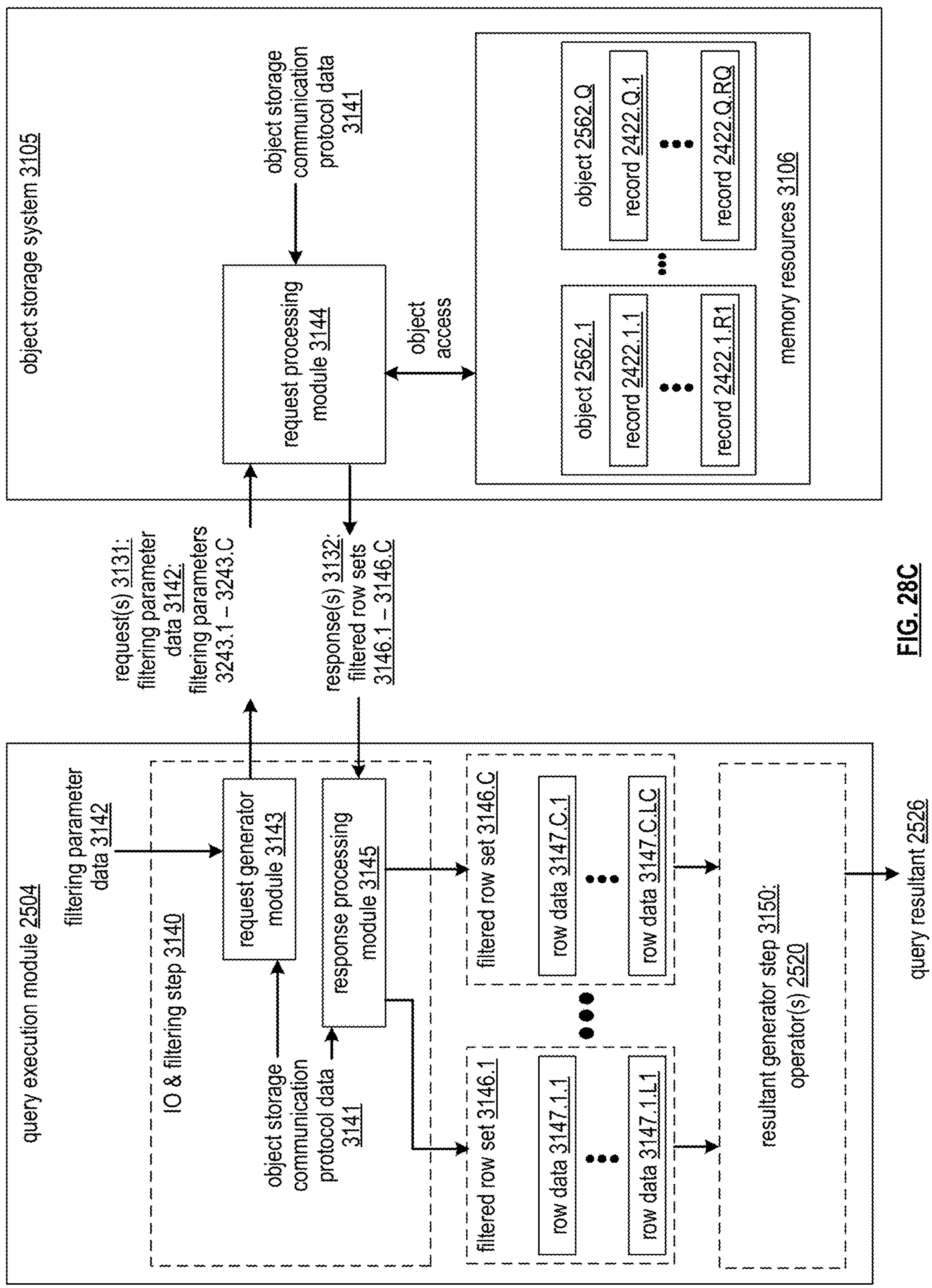
FIG. 28C is a schematic block diagram illustrating query execution based on a query execution module communicating with an object storage system when performing an IO and filtering step to generate multiple filtered row sets in accordance with various embodiments.

FIG. 28C illustrates an example of processing a query based on communication with object storage system 3105 to generate multiple filtered row sets 3146 corresponding to different fields 2515. Some or all features and/or functionality of requesting/generating/receiving/processing a given filtered row set 3146 of FIG. 28C can implement the requesting/generating/receiving/processing of filtered row set 3146 of FIG. 28B. Some or all features and/or functionality of the query execution of FIG. 28C can implement any embodiment of query execution described herein.

In some embodiments, the filtering parameter data 3142 indicates a set of different filtering parameters 3143.1-3143.C for generating a set of C different filtered for sets 3146 for processing. For example, the different filtering parameters are applied to different fields of the records to render generation of filtered row sets corresponding to records satisfying the filtering parameters applied to the different fields. The different filtering parameters can otherwise correspond to filtering parameters for operands/predicates of operators to be performed in operator step 3150 (e.g. different operands of a JOIN operator, an AND operator/INTERSECT operator, or other operator), for example, as required by the query request.

Requests for multiple different filtered row sets 3146 corresponding to multiple different filtering parameters 3243 can be requested in a same request 3131 in accordance with the object storage communication protocol data 3141. Requests for multiple different filtered row sets 3146 corresponding to multiple different filtering parameters 3243 can alternatively be requested in different requests 3131 in accordance with the object storage communication protocol data 3141, for example, based on being requested by different nodes that separately generate these requests, and/or based on the object storage communication protocol data 3141 requiring requests for distinct row sets be requested separately.

The multiple different filtered row sets can be included in a same response 3132 in accordance with the object storage communication protocol data 3141 for example, based on having been requested in a same corresponding request 3131 and/or despite having been requested in multiple corresponding requests 3131. The multiple different filtered row sets can be included in different responses 3132 in accordance with the object storage communication protocol data 3141 for example, based on having been requested in a different corresponding requests 3131 and/or despite having been requested in a same corresponding request 3131.

Figure 28D:
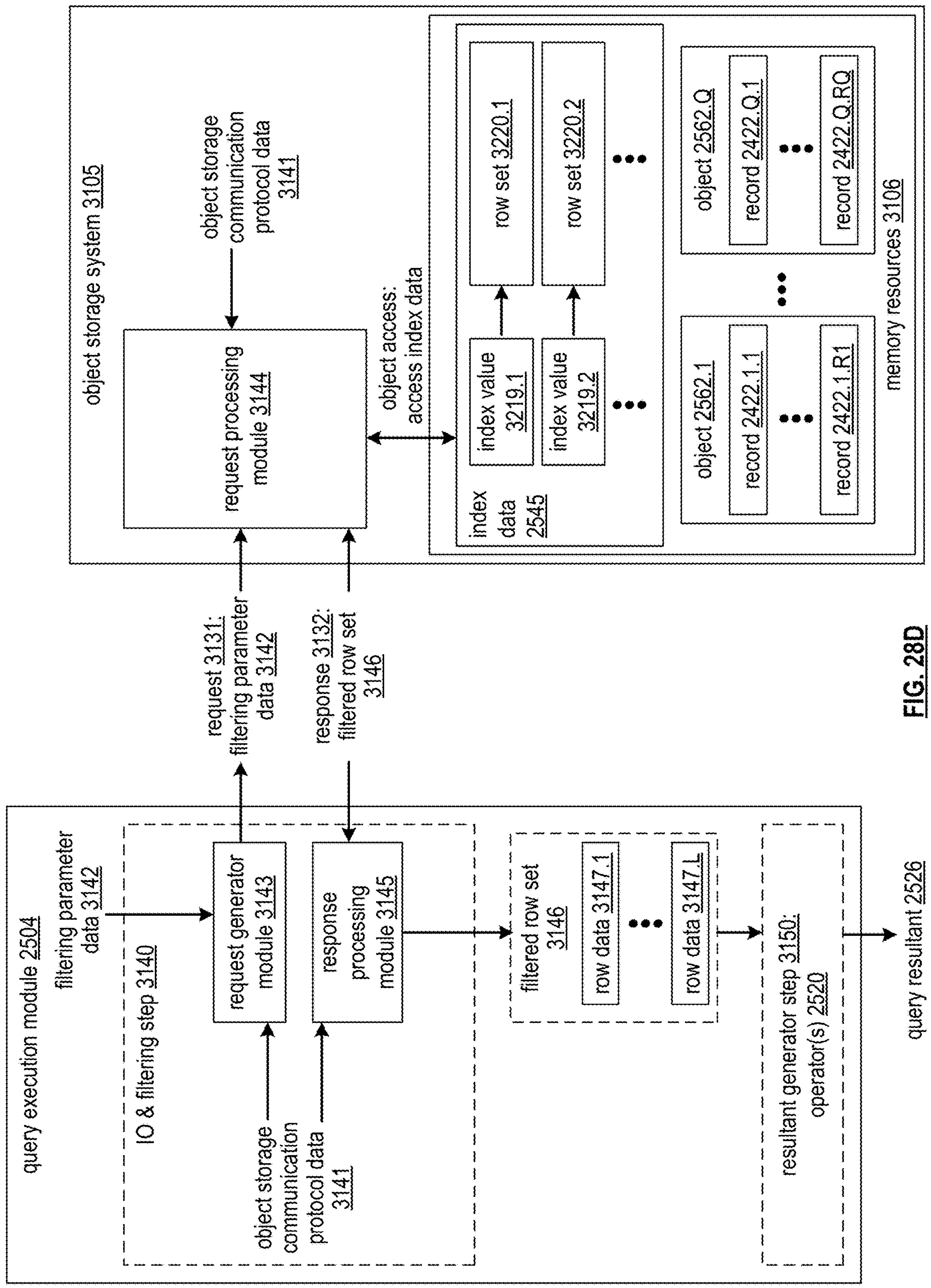
FIG. 28D is a schematic block diagram illustrating query execution based on a query execution module communicating with an object storage system that accesses index data in accordance with various embodiments.

FIG. 28D illustrates an example of processing a query based on communication with object storage system 3105 to a filtered row sets 3146 based on accessing index data 2545 stored by memory resources 3106 of the object storage system 3105. Some or all features and/or functionality of requesting/generating/receiving/processing the filtered row set 3146 of FIG. 28D based on accessing index data 2545 can implement the requesting/generating/receiving/processing of filtered row set 3146 of FIG. 28B. Some or all features and/or functionality of the query execution of FIG. 28D can implement any embodiment of query execution described herein.

In some embodiments, the request processing module 3144 of object storage system identifies the filtered row set 3146 based on accessing index data 2545 indicating identifiers/storage locations/corresponding objects for rows. For example, as indicated in FIG. 28D, a given index value 3219 in index data 2545 can indicate a corresponding row set 3220, where the index value 3219 corresponds to a value and/or range of values for a corresponding condition that can be indicated by filtering parameter data.

The index data can be stored within one or more objects 3162. For example, a given object 3162 stores its own index data indexing its own records. Alternatively or in addition, designated objects store index data indexing records 2422 stored dataset stored across multiple objects.

A given row set 3220 can indicate one or more records 2422 that correspond to the given index value (e.g. match/meet conditions indicated by the index value 3219). The row set 3220 can indicate these records by row number/unique identifier associated with the various records 2422 utilized to differentiate records. The row set 3220 can identify the set of objects corresponding to only the objects storing the records, for example, by unique identifier of these objects, where only the objects identified in row set 3220 need be read to render extraction of all required records 2422 corresponding to the given index value, but where other objects need not be accessed. The row set 3220 can optionally identify, for each record that corresponds to the given index value, the object the record is stored in and the location of the record within the respective object (e.g. an offset for the record and/or a set of offsets corresponding to a set of fields of the record, and/or a total size of the record/of each field). This can be utilized to identify the location of records within a given object, which can reduce the need to needlessly read an entire object/extract all records from an object.

The index data 2545 can be implemented as one or more index structures. Different index structures can be implemented for different datasets/different types of records/different types of objects/different cardinality of corresponding values. Multiple different index structures can be implemented for different corresponding sets of rows (e.g. different data sets/different types of objects/etc.). Multiple different index structures can be implemented for a same corresponding sets of records (e.g. same datasets/same types of object/etc.), where different fields/attributes of this set of records are indexed via the different index structure.

In some embodiments, instructions for indexing can be determined/generated/received. These instructions can be determined/generated/received on a per-dataset/per-object storage basis, where a request to store given data (e.g. in accordance with object storage communication protocol data) is accompanied with index data. Alternatively, predetermined instructions can indicate predetermined requirements that be applied across multiple datasets/multiple objects received for storage over time. Such instructions can be executed by the object storage system 3105 to generate index data for storage and/or store pre-generated index data based on: being received from a data processing system 3107, for example, in a request accordance with the object storage communication protocol data 3141; being received from a data provider providing corresponding datasets/records/objects for storage; being accessed in memory; being configured via user input, for example, by a user associated with configuring operation of the object storage system; being automatically generated by the object storage system; or otherwise being determined.

In some embodiments, the entity responsible for dictating how data be indexed is the same as an entity that also requests/processes the data in query execution. As another example, a given data processing system 3107 dictates how data be indexed in some requests, and also requests filtered row sets be identified from this data, which is accomplished based on the indexed data, in other requests. As another example, a given data processing system 3107 dictates how data be indexed in some requests, and also requests filtered row sets be identified from this data, which is accomplished based on the indexed data, in other requests. As another example given user/requesting entity interacting with one or more data processing systems 3107 generates query requests for execution, and further provides user input dictating how the data be indexed. Alternatively, while a given data processing system may be responsible for executing user-generated query requests, some or all corresponding users do not dictate/interact with index data, where data indexing is unseen to the end user.

In some embodiments, the indexing of data accessed in query execution is not configured by/is unknown to the data processing system 3107 requesting the corresponding filtered row set in executing a corresponding query. For example, a given data processing system 3107 requests queries for execution, where the correct identification of filtered row set 3146 is based on the object storage system's access to index data (if applicable), but how/whether this data is indexed/whether this index data was used in executing the query is unknown to the data processing system 3107.

In some embodiments, the entity responsible for dictating how data be indexed is the same as a storage provider entity that also provides this data for storage by the object storage system. Such a storage provider can also interact with the object storage system to send requests to store data, for example, in conjunction with the object storage communication protocol data 3141. Entities providing the data stored by the object storage system can be the same or different from entities (e.g. data processing system(s) 3107) requesting queries executed against this data. Such data providers can optionally further generate the index data themselves and send the index data to the object storage system for storage (e.g. in a corresponding request in accordance with the object storage communication protocol data indicating that such data is index data for respective data/object(s)/records), where the object storage system need not generate the index data itself. Alternatively, these data providers simply provide the data for storage and do not configure/have no knowledge of the indexing of this data by the object storage system 3105.

The index data 2545 can be generated by the object storage system for a given set of records automatically, for example, upon receipt of the set of records and determining to index the set of records, for example, based on the set of records meeting predetermined requirements indicated by predetermined instructions. These predetermined requirements can be configured via user input, for example, by an administrator/software engineer of the object storage system responsible for configuring functionality applied by the object storage system universally across all datasets. These predetermined requirements can alternatively or additionally be configured via a requests, for example, in accordance with object storage communication protocol data 3141, received from a data processing system 3107 in conjunction with configuring index data for a given dataset to be applied: across some or all data sent by the data processing system 3107 for storage by object storage system; and/or across some or all data that is accessed in queries processed by data processing system 3107. For example, the object storage communication protocol data 3141 enables inclusion of indexing instructions in requests to the object storage system to render configuring of corresponding indexing. These predetermined requirements can be further configured, for example, in requests from a given data processing system 3107 and/or instructions native to the object storage system itself, to render generation of different indexing of records for different datasets and/or for different types of records/different types of objects. Future data received to be stored as new objects can be indexed automatically in accordance with the predetermined requirements. The predetermined requirements can be updated over time (e.g. via user input/requests in accordance with object storage communication protocol data 3141/automatic triggering in response to detection of a corresponding condition), where all new data is indexed via the updated predetermined requirements, and/or where old data is re-indexed via the updated predetermined requirements.

Generation and access to index data during query execution is discussed in further detail herein.

Figure 28E:
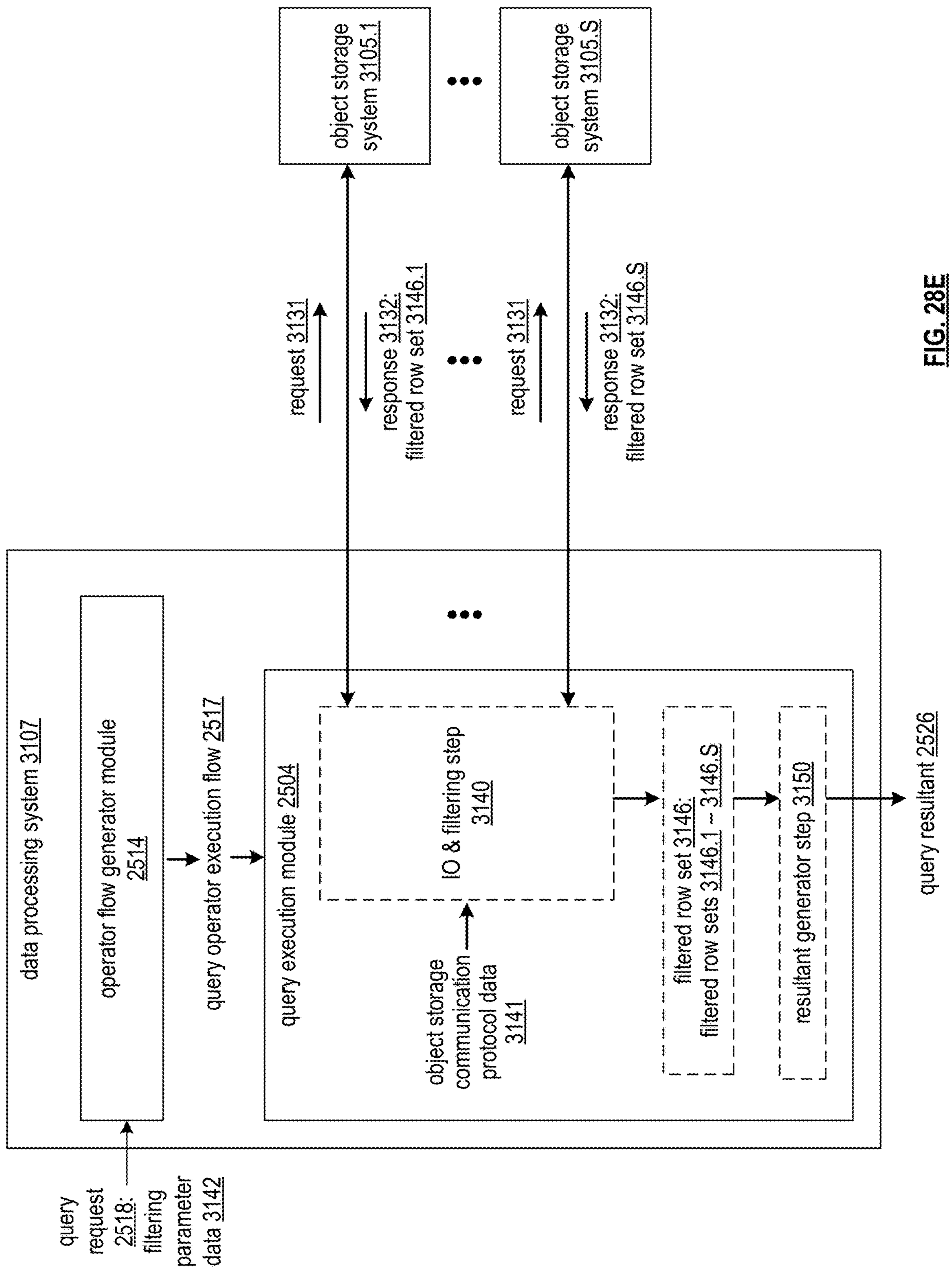
FIG. 28E is a schematic block diagram illustrating query execution based on a data processing system communicating with multiple object storage systems in accordance with various embodiments.

FIG. 28E illustrates a data processing system 3107 that executes a given query via access to multiple different object storage systems. Some or all features and/or functionality of the query execution by data processing system 3107 of FIG. 28E can implement the query execution by data processing system 3107 of FIG. 28A and/or any other embodiment of query execution described herein.

Different object storage systems 3105.1-3105.S can correspond to object storage systems 3105 implemented by shared or distinct memory resources 3106; can correspond to object storage systems 3105 storing same or different datasets; can correspond to object storage systems 3105 storing same or different types of objects; can correspond to object storage systems 3105 implemented by same or different architecture; can correspond to object storage systems 3105 implemented by same or different $3^{rd}$ party object storage services; and/or can otherwise correspond to different object storage systems 3105 having some or all of the same or different characteristics. In some embodiments, different requests 3131 to different storage systems are all generated in accordance with the object storage communication protocol data 3141, for example, based on corresponding to a standardized API applied across multiple object storage systems, for example, despite the different object storage systems processing corresponding requests differently in accordance with their respective architecture/type of data being stored/internally used commands/etc. Different object storage systems 3105 can thus be guaranteed/expected to process a given request 3131 in the same fashion based on all utilizing the standardized API.

For example, the identical requests 3131 indicating the same filtering parameter data 3142 are sent to all object storage systems 3105, where respective records meeting these requirements are indicated in respective responses 3132 from the different object storage system 3105, where a full filtered row set corresponds to a union of the filtered row sets 3146.1-3146.S. Alternatively, based on different object storage systems storing different types of data/different datasets, the requests to different datasets are optionally different, for example, to render different filtered row sets meeting different requirements, utilized as different operands to a given operator such as a JOIN operator or an INTERSECT/AND operator, and/or otherwise processed separately.

In other embodiments, a given query request is processed by data processing system 3107 via access to only one object storage system. Other query requests can be processed by data processing system via access to the same object storage system, and/or to different object storage systems (e.g. based on storing different respective datasets against which different queries are executed).

Figure 28F:
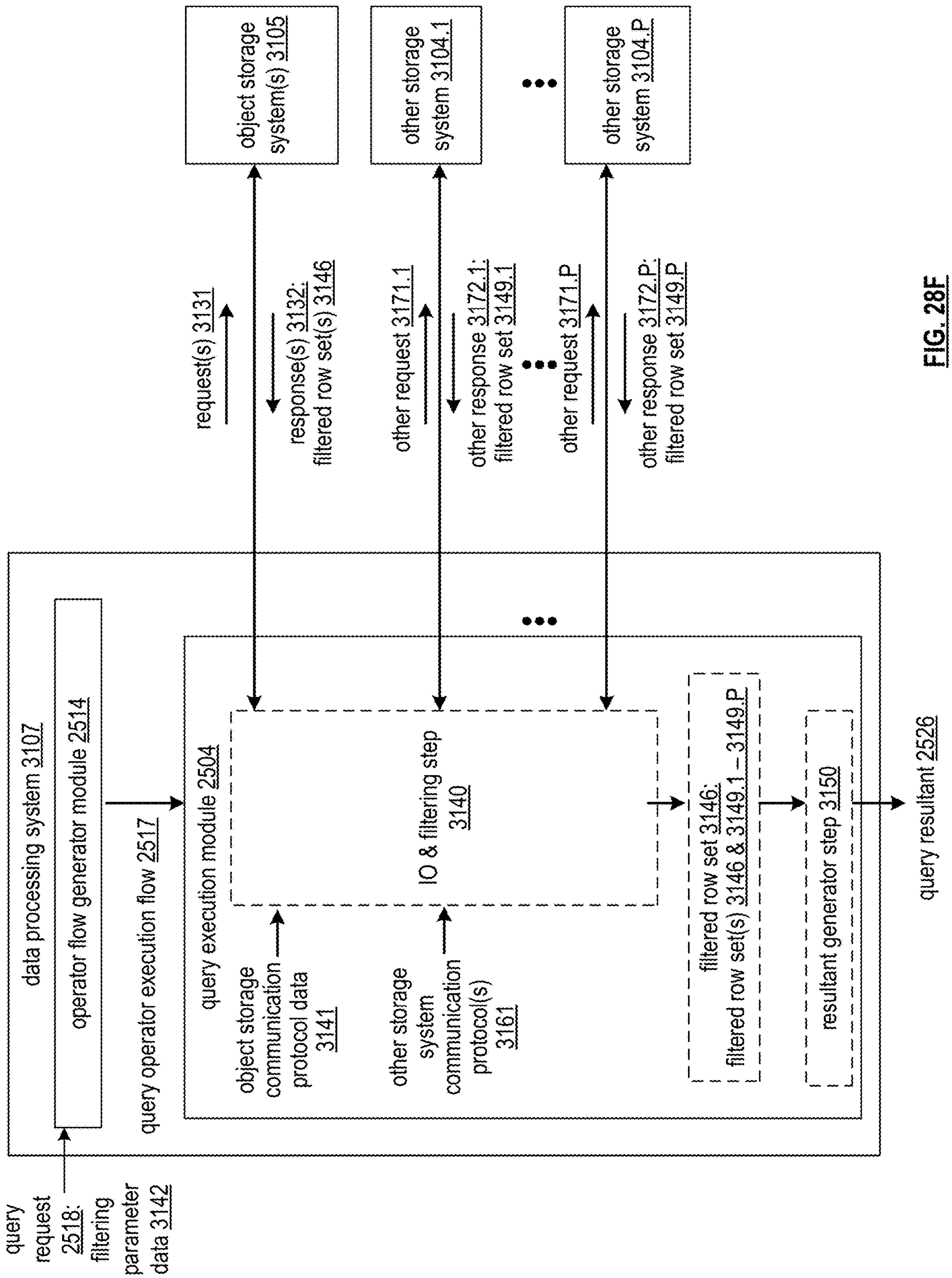
FIG. 28F is a schematic block diagram illustrating query execution based on a data processing system communicating with an object storage system and at least one other storage system in accordance with various embodiments.

FIG. 28F illustrates a data processing system 3107 that executes a given query via access to one or more other storage systems 3104 in addition to the one or more object storage systems. Some or all features and/or functionality of the query execution by data processing system 3107 of FIG. 28F can implement the query execution by data processing system 3107 of FIG. 28A and/or any other embodiment of query execution described herein.

Some filtered row sets required for query execution may be stored elsewhere, via non-object storage of another storage system 3104. For a given query, the data stored in such non-object storage can be accessed via other requests 3171 in accordance with one or more corresponding other storage system communication protocol data 3161, which can be different from the object storage communication protocol data 3141. For example, request 3131 to an object storage system is syntactically structured in accordance with object storage communication protocol data 3141, and is correctly processed by the object storage system 3105 in accordance with the object storage communication protocol data 3141 accordingly to render a response 3132 that includes a filtered row set 3146 meeting the filtering parameter data 3142 specified by the respective request 3131. Meanwhile, another request 3171 to a corresponding other storage system is syntactically structured in accordance with a corresponding other storage communication protocol data 3171, and thus renders the request 3171 being syntactically/structurally different from 3141, even if requesting a filtered row set satisfying the same filtering parameter data 3142 as that requested by request 3131 to the object storage system. Requests to other storage systems can optionally correspond to requests for data satisfying different filtering parameters, for example, based on different storage systems storing different types of data/different datasets, for example, rendering different filtered row sets meeting different requirements, utilized as different operands to a given operator such as a JOIN operator or an INTERSECT/AND operator, and/or otherwise processed separately. In some embodiments, one or more other storage systems 3104 are operable to process requests and generate responses in accordance with the object storage communication protocol data 3141, despite not being object storage systems themselves, based on the standardization of object storage communication protocol data 3141 across many types of storage systems.

One or more given other storage systems 3104 can be implemented as memory resources implemented by memory resources of the data processing system 3107 itself, such as database storage 2450, memory drives 2425, and/or a primary storage system 2506. For example, the data processing system 3107 stores its own data locally in non-object storage, and also accesses data in object storage for some or all queries. One or more given other storage systems 3104 can be implemented via other 3$^{rd}$ party storage systems and/or other storage systems external to/separate from the data processing system 3107. For example, the one or more given other storage systems 3104 are implemented as file storage systems, and/or block storage systems. As another example, requests to the one of more given other storage systems 3104 are implemented via web scraping of the Internet and/or other requests to other external structured or unstructured data.

In some embodiments, documents/files stored as by other storage systems 3104 (e.g. as files of a file system) have a same type as documents/files stored as objects 2562 by one or more object storage systems 3105. For example, execution of a given query can include accessing records included in multiple files/documents of a same or different type stored across different types of storage systems, where corresponding requests are formatted differently and/or processed differently based on the different types of storage systems storing their respective files in accordance with different storage architecture.

Figure 28G:
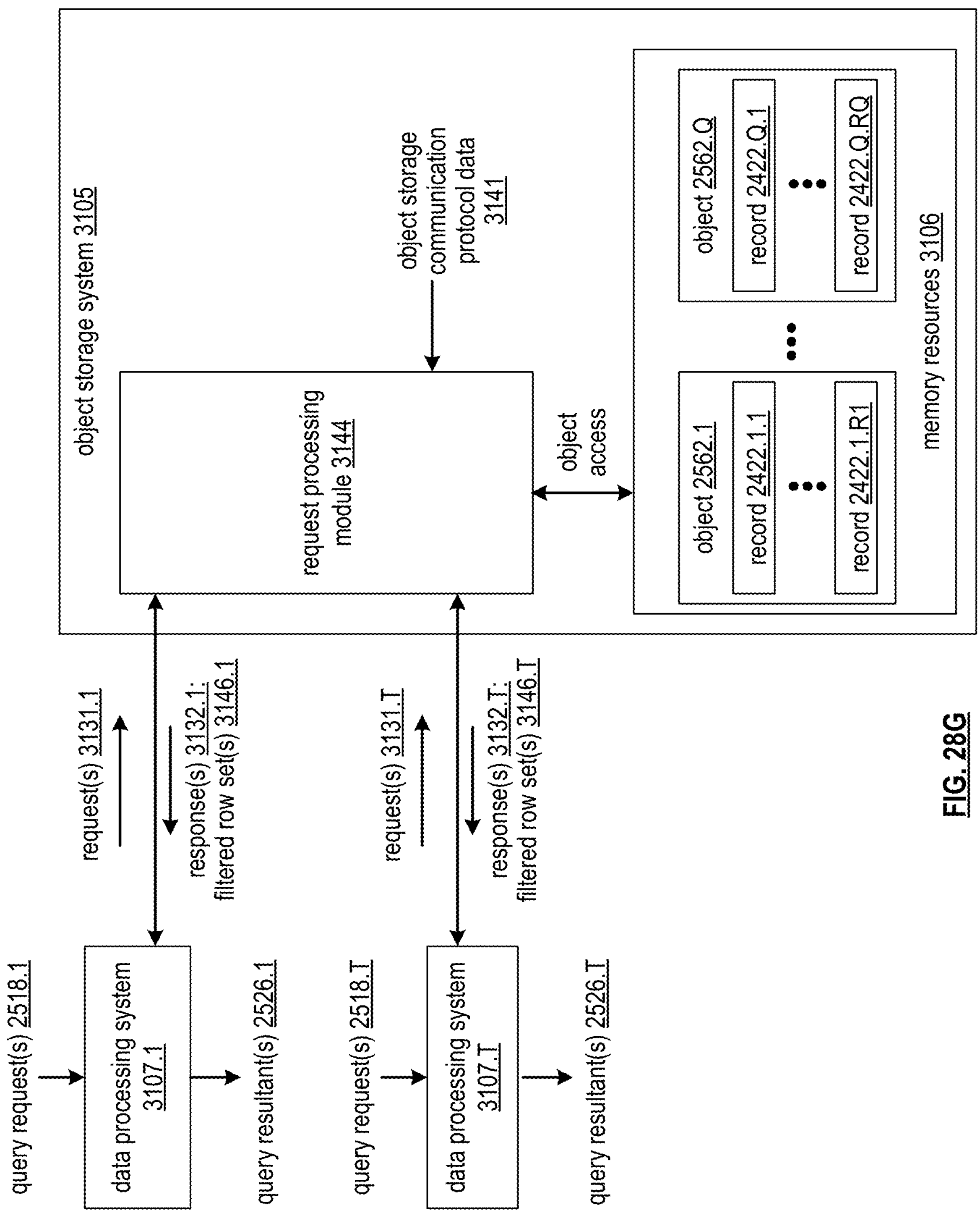
FIG. 28G is a schematic block diagram illustrating an object storage system communicating with multiple data processing systems that execute queries in accordance with various embodiments.

FIG. 28G illustrates an object storage system 3105 that processes requests 3131 received from one or more different data processing systems 3105. Some or all features and/or functionality of the query execution by each data processing system 3107 of FIG. 28F can implement the query execution by data processing system 3107 of FIG. 28A and/or any other embodiment of query execution described herein. Some or all features and/or functionality of the request processing of the requests 3131.1-3131.T by object storage system 3105 can implement the request processing of a given request by object storage system 3105 of FIG. 28B and/or any other embodiment of request processing and/or query execution described herein.

Different data processing systems 3107 can all execute their own respective queries via requests 3131 generated in accordance with the object storage communication protocol, for example, based on the object storage communication protocol being standardized and/or otherwise known to the data processing systems 3107. One or more of the different data processing systems 3107 can be further operable to send requests to additional object storage systems and/or other storage systems as illustrated in conjunction with FIG. 28E and/or 28F. Different data processing systems 3107 can correspond to different analytics services, different data processing services, different data providers, different end users, and/or different client devices/computing devices generating different requests.

Figure 28H:
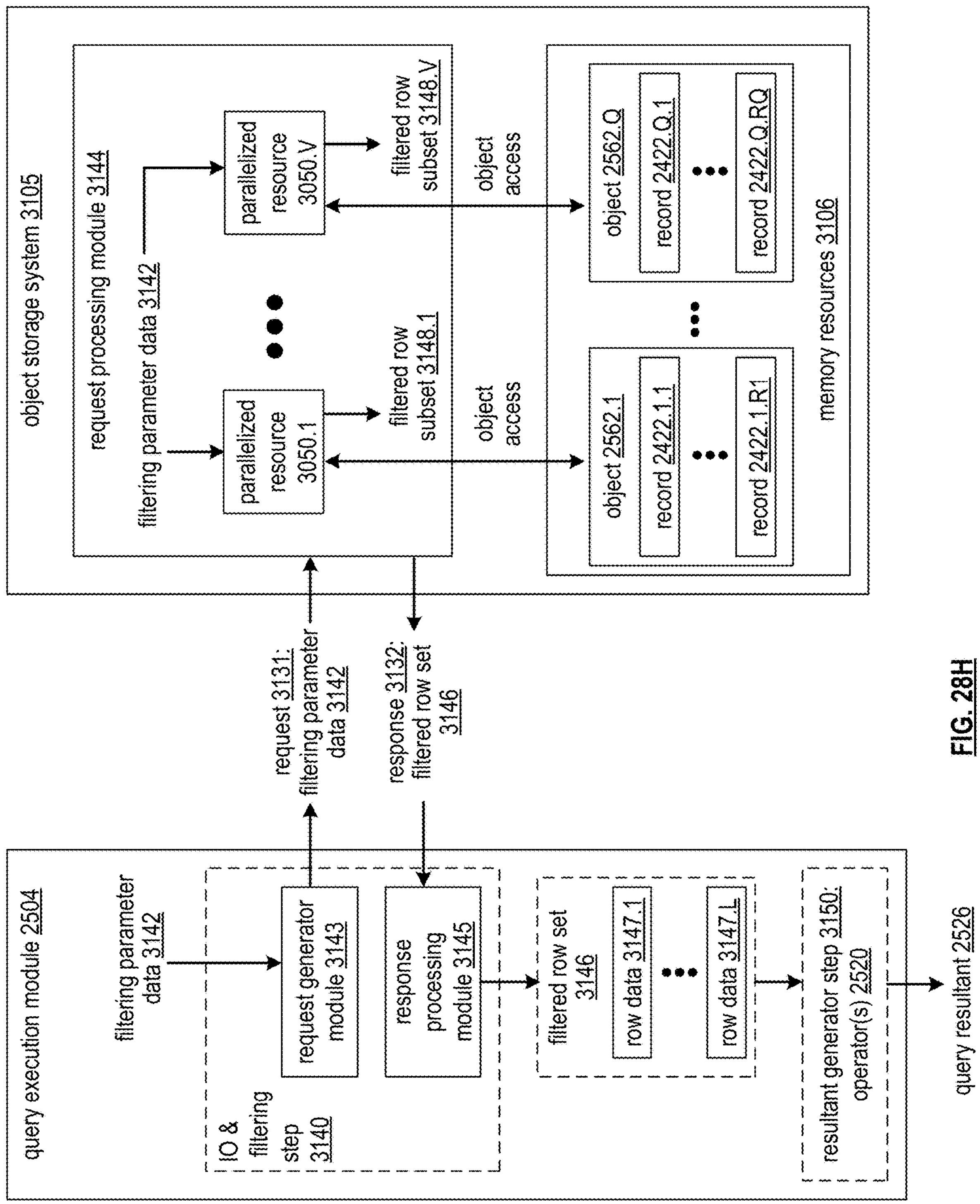
FIG. 28H is a schematic block diagram illustrating a data processing system that communicates with an object storage system that processes a request via a set of parallelized processing resources.

FIG. 28H illustrates an embodiment of an object storage system 3105 that implements request processing module 3144 to generate response 3132 indicating filtered row set 3142 based on utilizing a plurality of parallelized resources 3050 to access some or all of the plurality of objects in parallel and/or to identify a plurality of corresponding filtered row subsets 3148.1-3148.V for the set of objects (or optionally only an identified proper subset of objects requiring access) in parallel, for example, independently and/or without coordination. In some embodiments, the parallelized resources 3050 can be implemented in a same or similar fashion as nodes 37 and/or processing core resources 48. A given parallelized resource can be responsible for accessing a single corresponding object and/or multiple objects. Each objects can be processed by exactly one parallelized resources (e.g. to ensure records aren't duplicated). Some parallelized resources optionally access index data instead of or in addition to reading records/respective values from objects. Some or all features and/or functionality of the request processing module 3144 of FIG. 28H can implement the request processing module of FIG. 28A and/or any embodiment of the request processing module 3144 described herein.

Figure 28I:
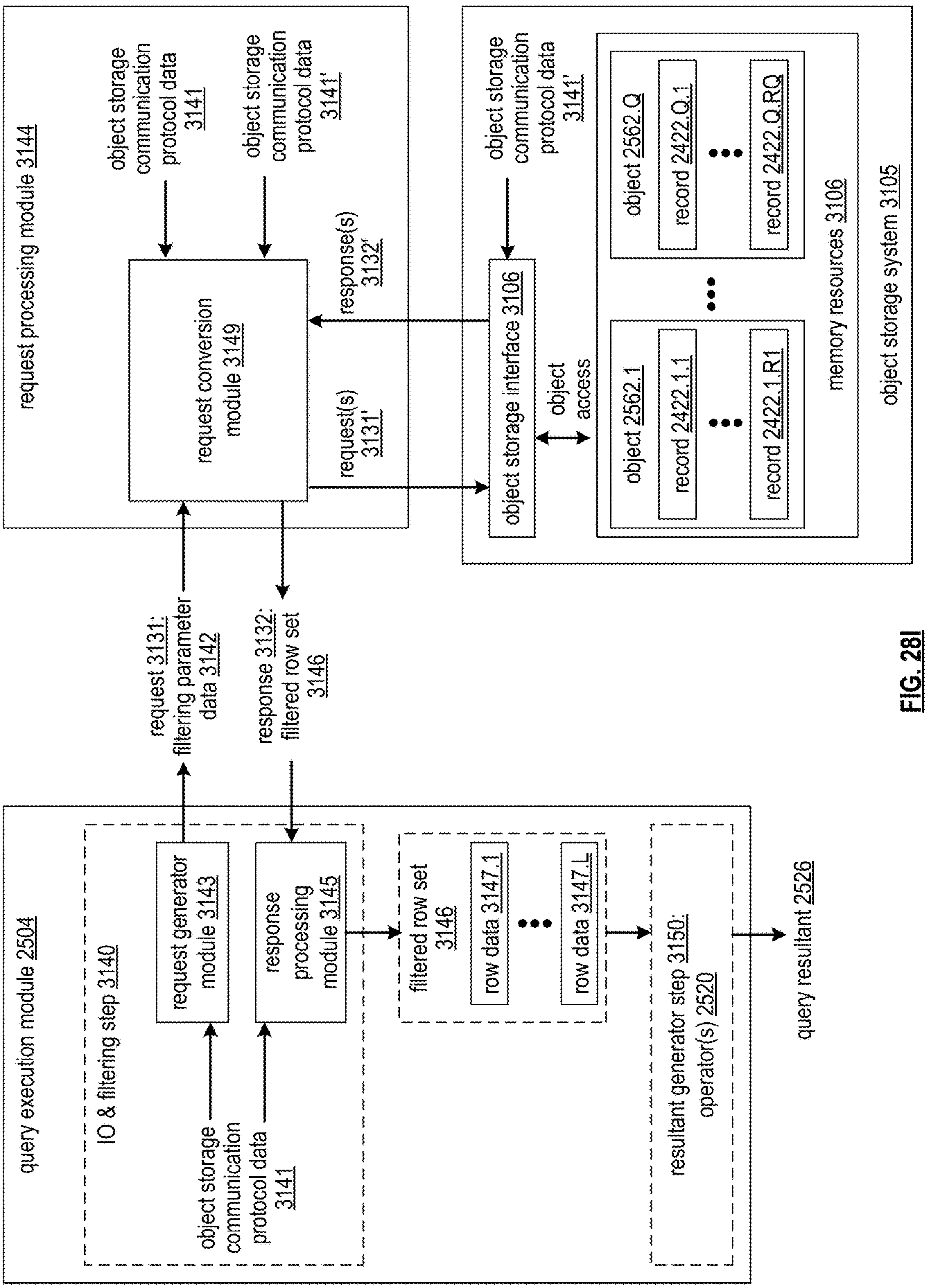
FIG. 28I is a schematic block diagram illustrating a request processing module that communicates with an object storage system and a data processing system in accordance with various embodiments.

FIG. 28I illustrates an embodiment where request processing module 3144 is not implemented by the object storage system, but by processing resources/an entity different from the object storage systems. For example, some or all functionality of the request processing module 3144 described herein is performed by an intermediate entity communicating with data processing module 3107 and object storage system 3105, such as processing and/or memory resources distinct from the data processing module 3107 and object storage system 3105. Alternatively, some or all processing and/or memory resources of resources of any embodiment of request processing module 3144 described herein are shared with, and/or are owned by/controlled by a same entity as, the data processing module 3107 and/or object storage system 3105.

In either case, in some embodiments, the request processing module 3144 can be operable to convert the one or more requests 3131 generated in conjunction with the object storage communication protocol data 3141 into equivalent requests that are in accordance with other object storage communication protocol data 3141', for example that is known by/native to the object storage system. Alternatively or in addition, the request processing module 3144 can be operable to convert the one or more responses 3132 generated in conjunction with the object storage communication protocol data 3141 into equivalent requests that are in accordance with other object storage communication protocol data 3141'.

The other object storage communication protocol data 3141' can be different from the object storage communication protocol data 3141, where requests 3131 and 3131' have different structuring/syntax/etc. and/or where responses 3132 and 3132' have different structuring/syntax/etc. However, requests and responses of object storage communication protocol data 3141' can be adapted as requests and responses of object storage communication protocol data 3131, and/or vice versa. For example, object storage communication protocol data 3131 can be ideal for use as a standard, for example based on simplifying requests to the object storage system generated by query execution modules and/or end users for the purposes of various query execution described herein.

In other embodiments, no such conversion occurs, and/or the object storage system processes the requests via the request processing module 3144 directly.

Figure 29A:
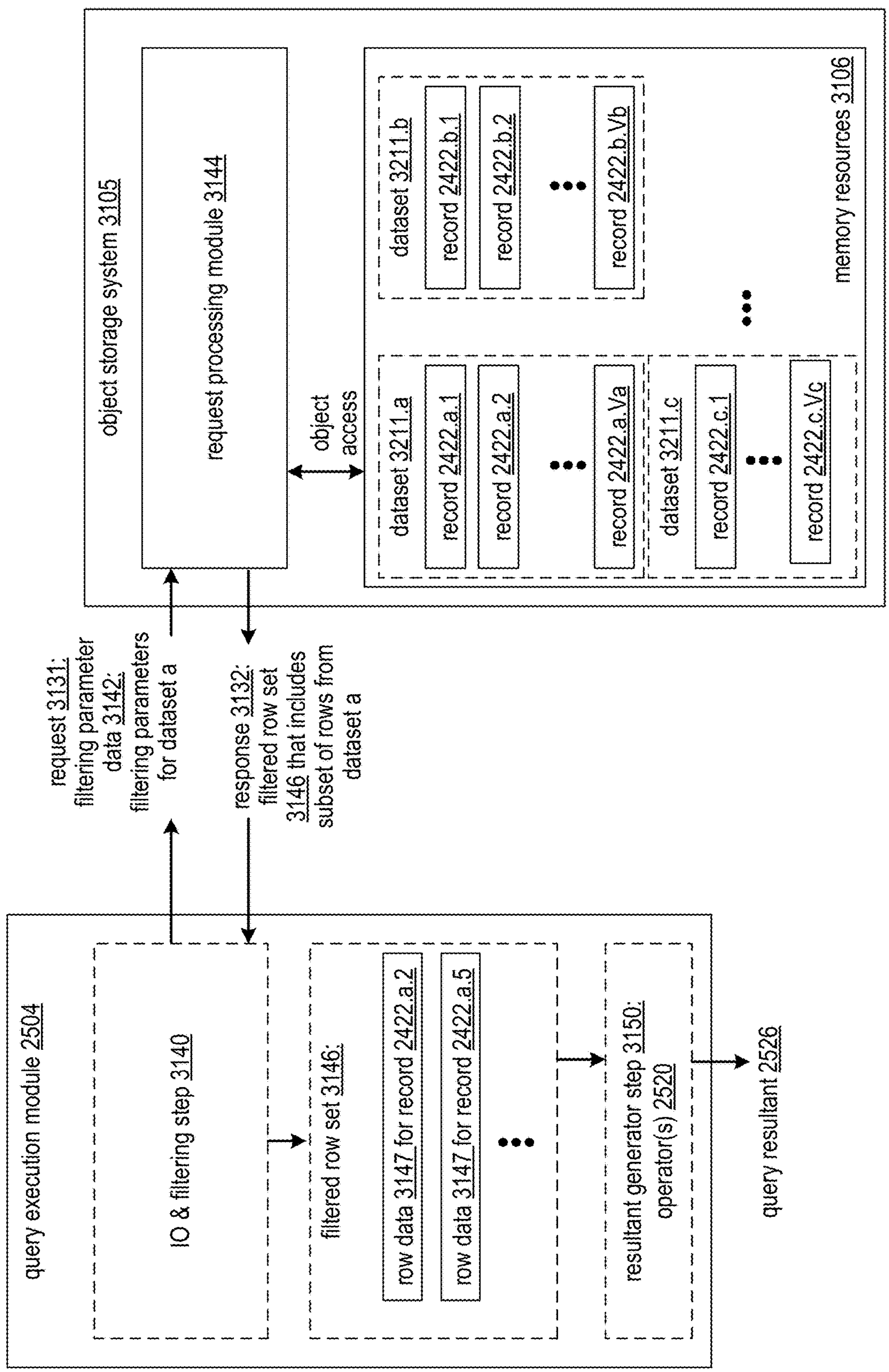
FIG. 29A is a schematic block diagram illustrating query execution based on a query execution module communicating with an object storage system to generate a filtered row set indicating a subset of records of a dataset in accordance with various embodiments.

FIG. 29A illustrates query execution based on a query execution module communicating with an object storage system to generate a filtered row set indicating a subset of records of a dataset. Some or all features and/or functionality of the query execution module 2504 of FIG. 29A can implement the query execution module 2504 of FIG. 28B and/or any embodiment of the query execution module described herein. Some or all features and/or functionality of the object storage system 3105 of FIG. 29A can implement the object storage system of FIG. 28B and/or any embodiment of the object storage system described herein. Some or all features and/or functionality of the query execution of FIG. 29A can be implemented via the query execution of FIG. 28B and/or any embodiment of query execution described herein.

As illustrated in FIG. 29A, the memory resources 3106 of object storage system 2105 stores a plurality of datasets 3211 that includes dataset 3211.*a*, 3211.*b*, 3211.*c*. For example, the different datasets correspond to different data provided by different data providers, different relational datasets that include one or more relational database systems, a single corresponding object, a collection of multiple related objects having a same or similar type, same or similar content, same or similar origin, same or similar creation time, and/or other relation/similarities; and/or other factors grouping various records 2422 into different datasets. In some embodiments, all records 2422 of an object storage system are included in a same, single dataset. Different datasets can include different numbers V of records. Different datasets can have different types/numbers of fields for each record 2422. Different datasets can have different types of records 2422 and/or can have records stored in different types of objects 2562.

The request 3131 can denote filtering parameters applied to a given dataset. In this example, the filtering parameters are applied to dataset 3211.*a*. The designation of dataset 3211.*a* can be indicated in the request 3131 in accordance with syntax/structuring/commands dictated by the object storage communication protocol data 3141. The response can include a filtered row set 3146 indicating a subset of rows from dataset 3211.*a* meeting the filtering parameter data 3142. For example, only objects from dataset 3211.*a*, and not other datasets, are included in the filtered row set 3146 based on the request designating that the parameters be applied to dataset 3211.*a* (e.g. the request 3131 indicates filtering of records included in the dataset 3211 "table_a", for example, based on query request indicating a FROM clause indicating records be selected "FROM table_a"). The filtered row set 3146 can further correspond to a proper subset of dataset 3211.*a* based on some records 2422 in dataset 3211.*a* being determined to not meet the respective filtering parameters 3142. In particular, the filtered row set 3146 can be guaranteed to include all records 2422 in dataset 3211.*a* meeting the filtering parameters 3142, and can be further guaranteed to include only records 2422 in dataset 3211.*a* meeting the filtering parameters 3142.

In this example, while dataset 3211.*a* includes a set of Va records that includes records 2422.*a*.1-242.*a*.Va, row filtered row set 3146 indicates row data 3147 for a proper subset of these records that includes at least records 2422.*a*.2 and 2422.*a*.5, and not at least records 2422.*a*.1 2422.*a*.3, and 2422.*a*.4.

In some embodiments, the request processing module's processing of request 3131 to generate the filtered row set 3146 can be based on extracting the indication of dataset 3211.*a* from the request. For example, extracting the indication of dataset 3211.*a* from the request is based on a known structuring of the request based on the corresponding use of the API indicated by object storage communication protocol data 3141. The dataset 3211.*a* can be identified via a name/unique identifier for the corresponding dataset/one or more corresponding tables that is indicated in the request 3131.

In some embodiments, the request processing module's processing of request 3131 to generate the filtered row set 3146 can alternatively or additionally be based on identifying all of a set of objects that include records 2422 of dataset 3211.*a*, for example, as denoted by the extracted indication of dataset 3211.*a* from the request. Identifying all of a set of objects that include records 2422 of dataset 3211.*a* can be based on accessing dataset mapping data stored in the memory resources 3106 of the object storage system. For example, each given name/identifier of a given dataset 3211 is mapped to a set of records 2422/objects 2562 in dataset mapping data. The datasets that given records/objects are mapped to can be specified when data is added to the object storage system and/or can be automatically determined by the object storage system based on measurable attributes of the received data (e.g. the data provider; the time/date when the data is added/was originally created; the object type of the object; underlying metadata; etc.) Dataset mapping data can optionally further specify schema data for the corresponding dataset (e.g. a set of fields/columns, data types for each field, restrictions for various fields, whether each field is required, whether different fields are variable length or fixed length, etc.

In some embodiments, dataset mapping data is stored as object metadata within some or all objects 2624, indicating identifiers/names for which one or more datasets the given object includes/is included within. For example, object tags included in a tag set for the given object in the object's metadata denote which datasets the given object is included, where a plurality of datasets map to a plurality of corresponding tags that can be included in object metadata of various objects. The objects storing the records of the given dataset 3211.*a* can be based on accessing the object metadata for some or all objects, and/or can be based on accessing index data for the object metadata indicating which objects have object metadata indicating dataset 3211.*a*. Alternatively or in addition, a lookup table/other metadata of the memory resources 3106, separate from the respective objects 2624 that include records of the given dataset, can store the dataset mapping data that maps which objects store records for which datasets. For example, the dataset mapping data is stored by one or more additional objects designated for storing the dataset mapping data, where these one or more additional objects are separate from the objects stored in the respective one or more datasets indicated by the dataset mapping data. This dataset mapping data can be implemented as some or all index data 2545 of the object storage system mapping row sets 3220 to dataset 3211, where index values 3219 of a given index structure correspond to identifiers of different datasets.

In some embodiments, the request processing module's processing of request 3131 to generate the filtered row set 3146 can alternatively or additionally be based on reading the set of records 2422 of dataset 3211.*a*. This can include accessing some or all objects 2562 identified set of objects that include records 2422 of dataset 3211.*a*, and reading some or all records 2422 from these objects. This can include accessing some or all objects 2562 in the identified set of objects that include records 2422 of dataset 3211.*a*, and reading only the records 2422 from these objects that are included in dataset 3211.*a*, for example, based on the dataset mapping data and/or other determination designating which records of the object are included in the dataset 3211.*a*. In some embodiments, all records included in some or all objects 2562 in the identified set of objects determined to include records 2422 of dataset 3211.*a* are included in dataset 3211.*a*, for example, based on some or all objects only storing records from one dataset.

Reading the records 2422 from these objects can include, for each object, reading only a field relevant to the filtering parameter data, whose value(s) can be compared to one or more values/evaluated against corresponding conditions specified by filtering parameter data to determine whether the respective record meets the filtering parameter data 3142. For example, other fields not relevant to determining whether the record be included in the filtered row set are optionally not read (e.g. the filtering parameter data requires col_a=1, for example, based on the query request indicating a WHERE clause requiring col_a=1 as one of its predicates, and only the values for field "col_a", and not other fields of the dataset 3211, are read for comparison against the value 1).

Alternatively, other fields not relevant to determining whether the record be included in the filtered row set are optionally read anyways, for example, based on the request 3131 indicating these values be included in filtered row set 3146, for example, based on the query request indicating the values for this field be projected (e.g. the query request indicates "SELECT col_b FROM table_a, WHERE col_a=1", where all, and only, records of dataset 3211 corresponding table_1 having values for field col_a equal to one are identified, and the values of column_b for these identified records are included in response 3132 to be projected for inclusion in query resultant 2526, or to otherwise be processed/manipulated to generate query resultant 2526).

Reading some or all records 2422 from an object 3162 can be based on extracting the records 2422 from the objects in accordance with known formatting of the object. This known formatting can be indicated in the object metadata for the object. For example, offset data indicating the location of some or all records is indicated in the object metadata for the object, and/or a fixed record size is indicated in the object metadata for the object. The object metadata for the object can further indicate the location for one or more fields of each record and/or the fixed size of a fixed set of fields. For example, only the one or more fields relevant to the processing of the query are read. Alternatively, the object metadata indicates a given object type, and different metadata stored elsewhere indicates a mapping of object types to fixed offset data/structure of the object and/or instructions for extracting records from this type of object. For example, these common instructions/the common structure, when applied to any object of the given object type, can render correct extraction of its embedded records 2422.

Reading some or all records 2422 from an object 3142 can alternatively or additionally be based on extracting field values from the object metadata, where the object itself is not read. For example, one or more records of a given object correspond to attributes describing the underlying object. This can include extracting only field values of a field relevant to the filtering parameter data, whose value(s) can be compared to one or more values/evaluated against corresponding conditions specified by filtering parameter data to determine whether the respective record meets the filtering parameter data 3142.

In some embodiments, the request processing module's processing of request 3131 to generate the filtered row set 3146 can alternatively or additionally be based on filtering the set of records 2422 of dataset 3211.*a* that meet filtering parameters 3142, for example, based on comparing the extracted values of the relevant fields to a constant and/or otherwise comparing the extracted values of the relevant fields against a conditional expression. Only rows from the extracted set of rows meeting the requirements of the filtering parameter data 3142 are included in the response 3132.

In some embodiments, alternatively or in addition to reading some or all records 2422 from some or all objects of the given dataset, corresponding row sets meeting the filtering parameters and/or belonging to the dataset are identified in index data 2545. For example, one or more index values 3219 corresponding to records meeting the filtering parameter data 3142 are determined, and the corresponding row sets 3220 for these index values 3219 are accessed to determine which object stores each given row of row set 3220, to further determine which location within the given object stores the given row of row set 3220, and/or to further determine which location within the given object stores one or more corresponding fields for the given row of row set 3220. In such embodiments, reading of the respective values may not be necessary if the index data alone is sufficient in identifying the filtered row set, for example, in embodiments where the filtered row set 3146 does not include values of rows.

In some embodiments, the request processing module's processing of request 3131 to generate the response 3132 can alternatively or additionally be based on generating the row data 3147 for each identified row. In some embodiments, the row data 3147 of a given record 2422 of the filtered row set 3146 can be generated to indicate the row number/unique identifier for this given identified record 2422. In some embodiments, each given row data 3147 can be generated to indicate location data for the corresponding identified record 2422 of the filtered row set 3146, where this location data indicates an identifier/other location data for the respective object storing the given record; and/or where the location data further indicates an offset/other location data specifying the location of the given record within the identified object. In some embodiments, the row data 3147 can be generated to indicate an offset/other location data further specifying the location of value of at least one corresponding field of the given record within the identified object. In some embodiments, the row data 3147 can be generated to include the raw value (and/or a compressed version of the raw value) of the corresponding record 2422 for one or more fields, for example, as required. The type of information included in row data 3147 of the filtered row set 3146 can be configured in the request 3131, for example, in accordance with the object storage communication protocol data 3141. For example, the query execution module 2504 determines which level of detail is needed in executing the remainder of the query (e.g. field values are required if further processing is performed upon these field values directly and/or if these field values are projected; identifiers/row numbers are sufficient if the corresponding values are never required).

In some embodiments, the filtered row set 3146 is implemented via some or all features and/or functionality of one or more column data streams 2968 described herein, where a given column stream includes a set of column values across one or more data blocks based on these column values having been received as row data 3147 in response 3131. In the case of multiple filtered row subsets, some or all filtered row subsets can include column values for a filtered set of rows as a corresponding column data stream, which can correspond to the same or different set of records from other filtered row subsets.

In some embodiments, some or all filtering predicates of the incoming query request are not applied by object storage system 3105 and are applied to the received filtered row set 3146 via one or more corresponding operators of the resultant generator step 3150. For example, some filtering is not possible and/or is less efficient when performed by the object storage system 3105, where a superset of rows is generated as the filtered row set, and where the true filtered set of rows meeting the query predicates includes further filtering by the query processing module 2504. In some embodiments, the object storage system 3105 rejects a filtering request and/or indicates in response 3132 which one or more filtering parameters of request 3131 were not applied in generating the result and that need be applied by the data processing module. In some embodiments, the request 3131 indicates only filtering parameters that can be processed by object storage system 3105, for example, as dictated by constraints induced by object storage communication protocol data 3141. In some embodiments, the data processing system 3107 automatically selects some filtering to be performed in the resultant generator step 3150 based on determining such processing will increase query processing efficiency, even though this filtering can be performed by object storage system 3105.

In some embodiments, some or all further processing as required by the incoming query request are also applied by object storage system 3105, and are thus not are applied via one or more corresponding operators of the resultant generator step 3150. For example, the filtered row set is generated as query resultant 2526, where the data processing system simply emits the received filtered row set as the query resultant 2526. Alternatively, some additional processing is also applied by object storage system 3105 and the response 3231 is further processed by corresponding operators of the resultant generator step 3150 to generate the query resultant 2526.

In some embodiments, multiple field/columns are accessed/required for query execution, multiple filtered row subsets can be included in filtered row set 3146. When different filtering parameters 3243 are applied to generate the filtered row subsets for different columns (e.g. fields), each filtered row subset optionally has row data for a different set of rows, based on different sets of rows meeting the different filtering parameters 3243 of filtering parameter data 3142. Such filtered row subsets can be implemented as the multiple filtered row sets 3146.1-3146.C of FIG. 28C. Examples of multiple filtered row subsets are also discussed in conjunction with FIGS. 29G and 29H.

In some embodiments, for a given query, some filtered row subsets for some fields have row data corresponding to row identifier only, for example, based on the corresponding values of the respective field not being needed for query execution. Meanwhile, for the given query, other filtered row subsets for other fields can have row data corresponding to values of the given field, for example, based on the corresponding values of the respective field being needed for query execution. The row identifiers can also be included, enabling filtering as dictated by further filtering, to enable evaluating of predicates across filtered row subsets of multiple fields (e.g. for query expression "SELECT col_2 FROM table_A WHERE col_1=1 AND col_2>10", a filtered row subset for field col_1 includes row identifiers only for rows having field col_1 equal to one; and filtered row subset for field col_2 optionally includes both row identifiers for rows having col_2 values greater than 10, as well as the actual values of col_2 for these rows; the intersection is applied to these two filtered row subsets in resultant generator step 3150 to render only emitting col_2 values for records with col_1=1 based on emitting only col_2 values in row data of filtered row subset for field col_2 having row identifiers in this row data that is also included in the filtered row subset for field col_1).

In some embodiments, some or all such filtering applied via an intersection/other condition across multiple columns is performed by object storage system (e.g. for query expression "SELECT col_2 FROM table_A WHERE col_1=1 AND col_2>10", a filtered row set corresponds to only rows with col_1=1 AND col_2>10, for example, based on the object storage system 3105 applying this intersection to records accessed/determined via index data, for example, in a same or similar fashion as would be applied by resultant generator step 3150 as discussed above; the row data of response 3132 can include the col_2 values only, which can be emitted directly by the query execution module 2504 as query resultant 2526).

Figure 29B:
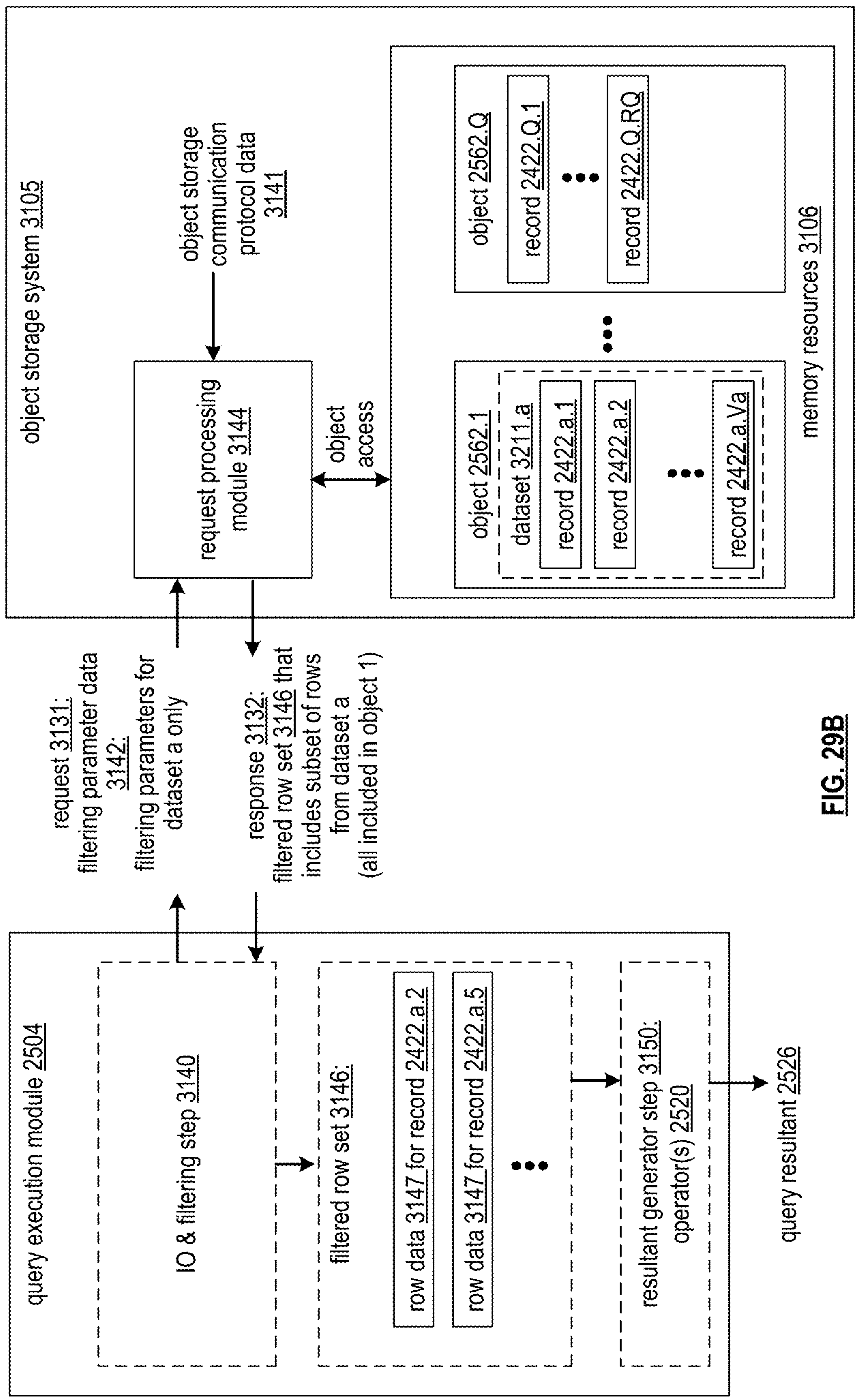
FIG. 29B is a schematic block diagram illustrating query execution based on a query execution module communicating with an object storage system to generate a filtered row set indicating a subset of records stored in a same object in accordance with various embodiments.

FIG. 29B illustrates query execution based on a query execution module communicating with an object storage system to generate a filtered row set indicating a subset of records stored in a same object. For example, in the case where a given dataset 3211.*a* is included in a same object, the request processing module optionally identifies that the entire dataset 3211.*a* indicated in the request 3131 is included in the given object 2562.1, and only reads records from object 2562.1. This can be based on first accessing dataset mapping data as discussed previously to determine all of dataset 3211.*a* is stored in object 2562.1. These extracted records can be compared against the filtering parameter data 3142 to determine whether each record of dataset 3211.*a* be included in filtered row set 3132. Alternatively or in addition, index data is accessed to determine the filtered row set, where object 2562.1 is optionally not accessed based on record values not being required.

Some or all features and/or functionality of the query execution module 2504 of FIG. 29B can implement the query execution module 2504 of FIG. 29A and/or any embodiment of the query execution module described herein. Some or all features and/or functionality of the object storage system 3105 of FIG. 29B can implement the object storage system of FIG. 29A and/or any embodiment of the object storage system described herein. Some or all features and/or functionality of the query execution of FIG. 29B can be implemented via the query execution of FIG. 29A and/or any embodiment of query execution described herein.

Figure 29C:
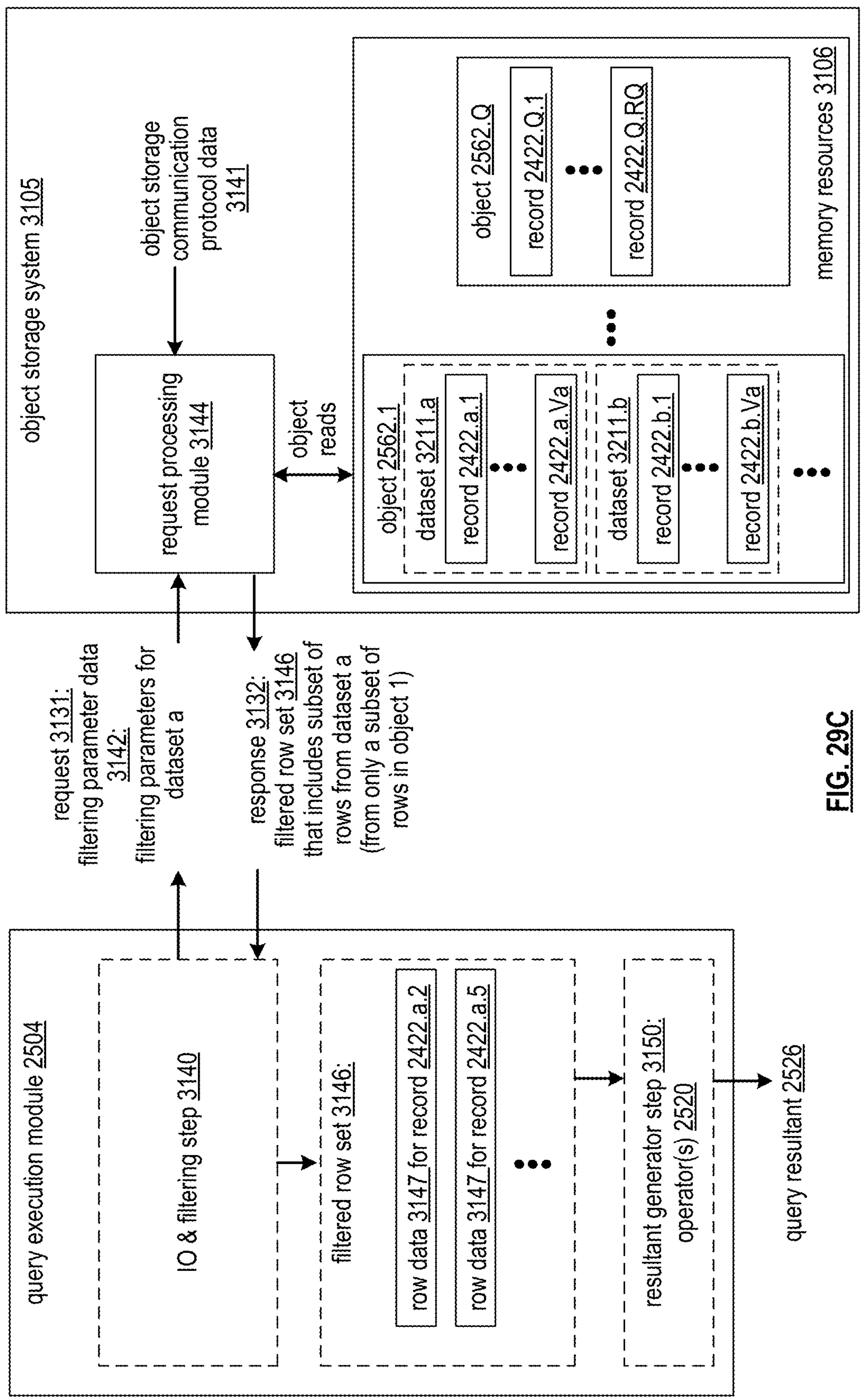
FIG. 29C is a schematic block diagram illustrating query execution based on a query execution module communicating with an object storage system to generate a filtered row set indicating a subset of records of a dataset stored in an object that includes multiple dataset in accordance with various embodiments.

FIG. 29C illustrates query execution based on a query execution module communicating with an object storage system to generate a filtered row set indicating a subset of records of a dataset stored in an object that includes multiple datasets. For example, in the case where a given object stores all records from multiple datasets, the request processing module generates the filtered row set to include only records from the object 2562.1 that are included in dataset 3211.*a*. This can include accessing/extracting only records of object 2562.1 from dataset 3211.*a*, and not dataset 3211.*b*, for example, based on corresponding location data/structuring data indicated by dataset mapping data. Alternatively, all records are extracted, and records included in dataset 3211.*a* are identified from the extracted records, where only these identified records of dataset 3211.*a* are evaluated against filtering parameter data 3142. Alternatively or in addition, index data is accessed to determine the filtered row set, where object 2562.1 is optionally not accessed based on record values not being required.

Some or all features and/or functionality of the query execution module 2504 of FIG. 29C can implement the query execution module 2504 of FIG. 29A and/or any embodiment of the query execution module described herein. Some or all features and/or functionality of the object storage system 3105 of FIG. 29C can implement the object storage system of FIG. 29A and/or any embodiment of the object storage system described herein. Some or all features and/or functionality of the query execution of FIG. 29C can be implemented via the query execution of FIG. 29A and/or any embodiment of query execution described herein.

Figure 29D:
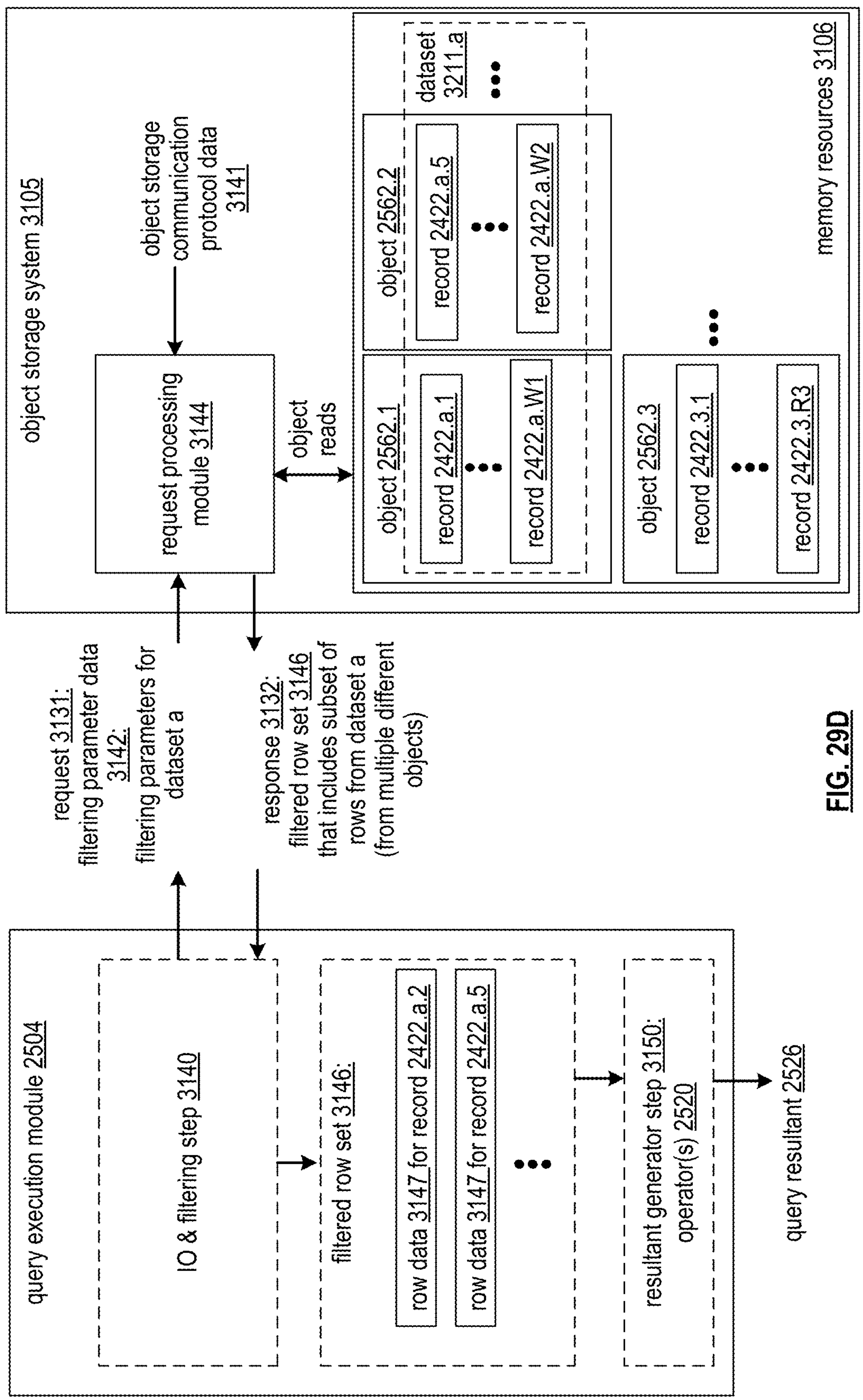
FIG. 29D is a schematic block diagram illustrating query execution based on a query execution module communicating with an object storage system to generate a filtered row set indicating a subset of records of a dataset stored across multiple objects in accordance with various embodiments.

FIG. 29D illustrates query execution based on a query execution module communicating with an object storage system to generate a filtered row set indicating a subset of records of a dataset stored across multiple objects. For example, in the case where a given dataset 3211.*a* is stored across multiple objects that includes at least object 2562.1 and 2652.2, but not at least object 2562.3, the request processing module optionally identifies that the dataset 3211.*a* indicated in the request 3131 is included in the set of objects that includes object 2562.1 and 2652.2, and only reads records from objects included in this set of objects (e.g. reads records from 2562.1 and 2562.2, but not 2562.3). This can be based on first accessing dataset mapping data as discussed previously to determine all of dataset 3211.*a* is stored in a set of objects that includes object 2562.*a*, 2562.*b* but not 2562.*c*. These extracted records can be compared against the filtering parameter data 3142 to determine whether each record of dataset 3211.*a* be included in filtered row set 3132. Alternatively or in addition, index data is accessed to determine the filtered row set, where objects 2562.1 and/or 2562.2 are optionally not accessed based on record values not being required.

Some or all features and/or functionality of the query execution module 2504 of FIG. 29D can implement the query execution module 2504 of FIG. 29A and/or any embodiment of the query execution module described herein. Some or all features and/or functionality of the object storage system 3105 of FIG. 29D can implement the object storage system of FIG. 29A and/or any embodiment of the object storage system described herein. Some or all features and/or functionality of the query execution of FIG. 29D can be implemented via the query execution of FIG. 29A and/or any embodiment of query execution described herein.

Figure 29E:
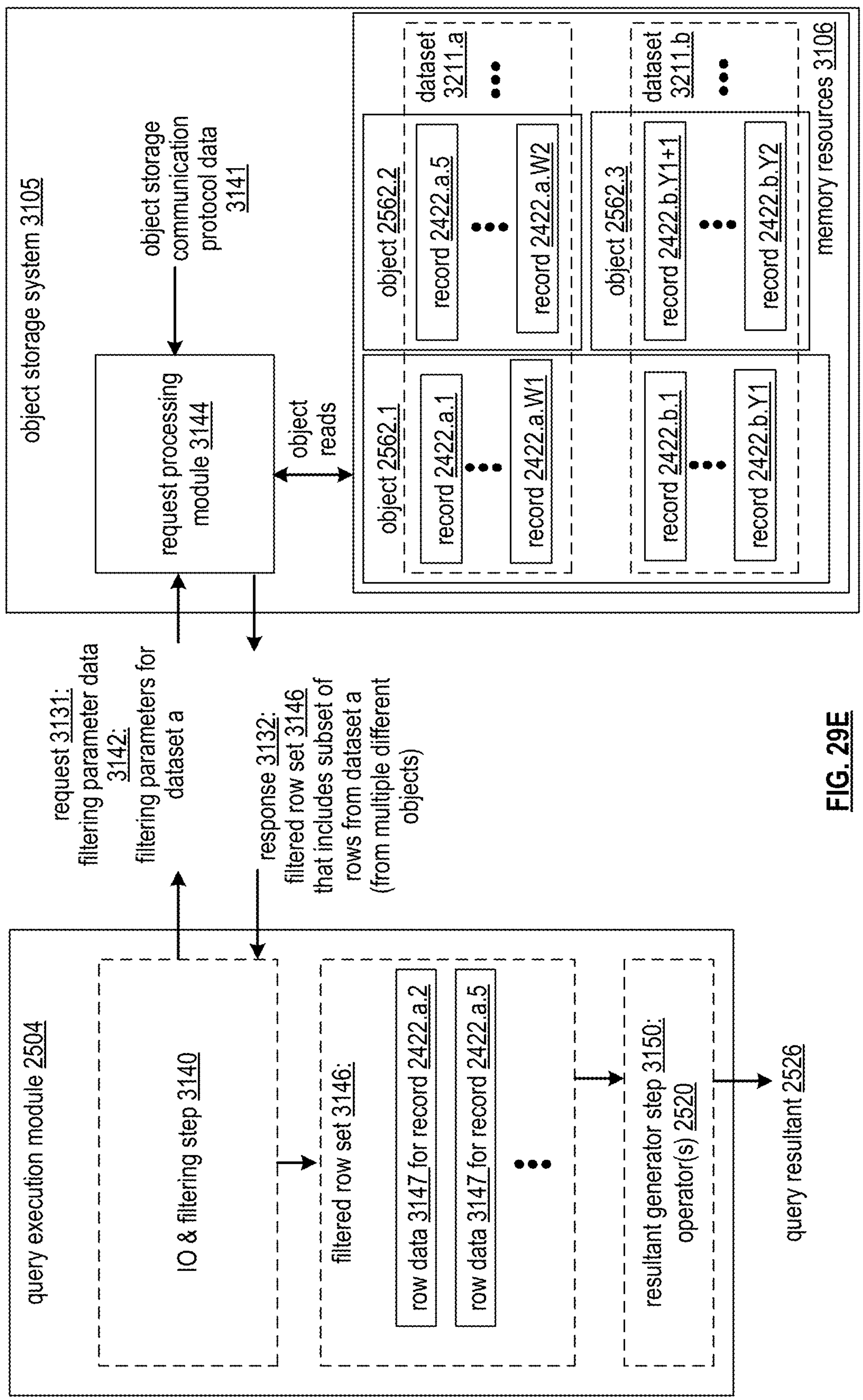
FIG. 29E is a schematic block diagram illustrating query execution based on a query execution module communicating with an object storage system to generate a filtered row set indicating a subset of records of a dataset stored across multiple objects that collectively store multiple datasets in accordance with various embodiments.

FIG. 29E illustrates query execution based on a query execution module communicating with an object storage system to generate a filtered row set indicating a subset of records of a dataset stored across multiple objects that collectively store multiple datasets. For example, in the case where multiple objects store a given dataset 2511.*a* and also store additional datasets, the request processing module identifies the set of objects (including at least objects 2562.1 and 2562.2) that include the dataset 2611.*a*, for example, based on dataset mapping data. The request processing module can generate the filtered row set to include only records from this identified set of objects that are included in dataset 3211.*a*. This can include accessing/extracting only records of object 2562.1, object 2562, etc. from dataset 3211.*a*, and not dataset 3211.*b*/other datasets, for example, based on corresponding location data/structuring data indicated by dataset mapping data. Alternatively, all records are extracted, and records included in dataset 3211.*a* are identified from the extracted records, where only these identified records of dataset 3211.*a* are evaluated against filtering parameter data 3142. Alternatively or in addition, index data is accessed to determine the filtered row set, where objects 2562.1 and 2562.2 are optionally not accessed based on record values not being required.

Some or all features and/or functionality of the query execution module 2504 of FIG. 29E can implement the query execution module 2504 of FIG. 29A and/or any embodiment of the query execution module described herein. Some or all features and/or functionality of the object storage system 3105 of FIG. 29E can implement the object storage system of FIG. 29A and/or any embodiment of the object storage system described herein. Some or all features and/or functionality of the query execution of FIG. 29E can be implemented via the query execution of FIG. 29A and/or any embodiment of query execution described herein.

Figure 29F:
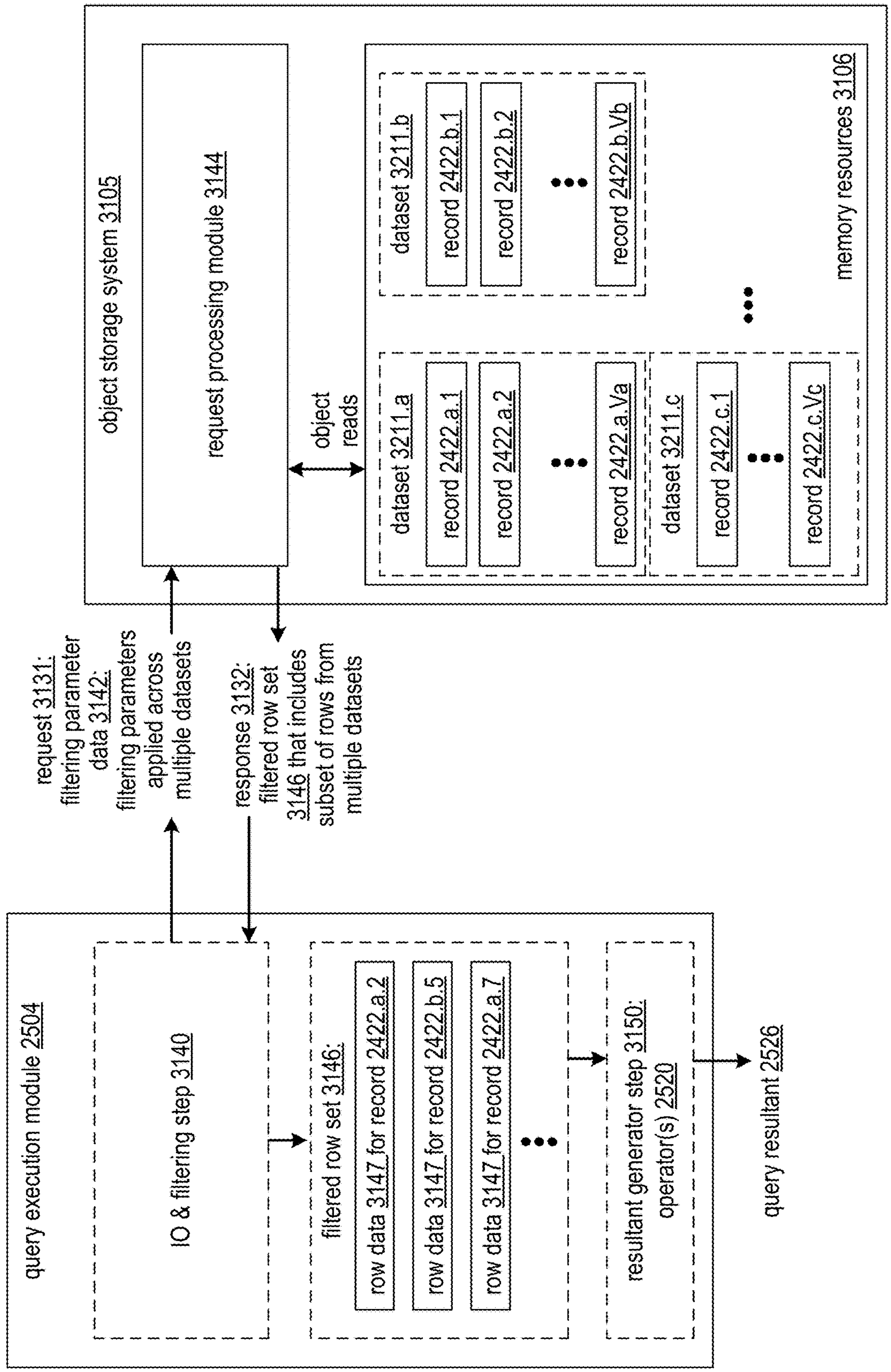
FIG. 29F is a schematic block diagram illustrating query execution based on a query execution module communicating with an object storage system to generate a filtered row set indicating a subset of records from multiple datasets in accordance with various embodiments.

FIG. 29F illustrates query execution based on a query execution module communicating with an object storage system to generate a filtered row set indicating a subset of records from multiple datasets. For example, in the case where multiple different datasets that include at least dataset 3211.*a* and 3211.*b* are indicated in the request 3131, the request processing module optionally identifies the objects storing records from any of these multiple datasets, and only reads records from these objects. This can be based on first accessing dataset mapping data as discussed previously. These extracted records can be compared against the filtering parameter data 3142 to determine whether each record be included in filtered row set 3132. Alternatively or in addition, index data is accessed to determine the filtered row set, where object 2562.1 is optionally not accessed based on record values not being required.

Some or all features and/or functionality of the query execution module 2504 of FIG. 29F can implement the query execution module 2504 of FIG. 29A and/or any embodiment of the query execution module described herein. Some or all features and/or functionality of the object storage system 3105 of FIG. 29F can implement the object storage system of FIG. 29A and/or any embodiment of the object storage system described herein. Some or all features and/or functionality of the query execution of FIG. 29F can be implemented via the query execution of FIG. 29A and/or any embodiment of query execution described herein.

Figure 29G:
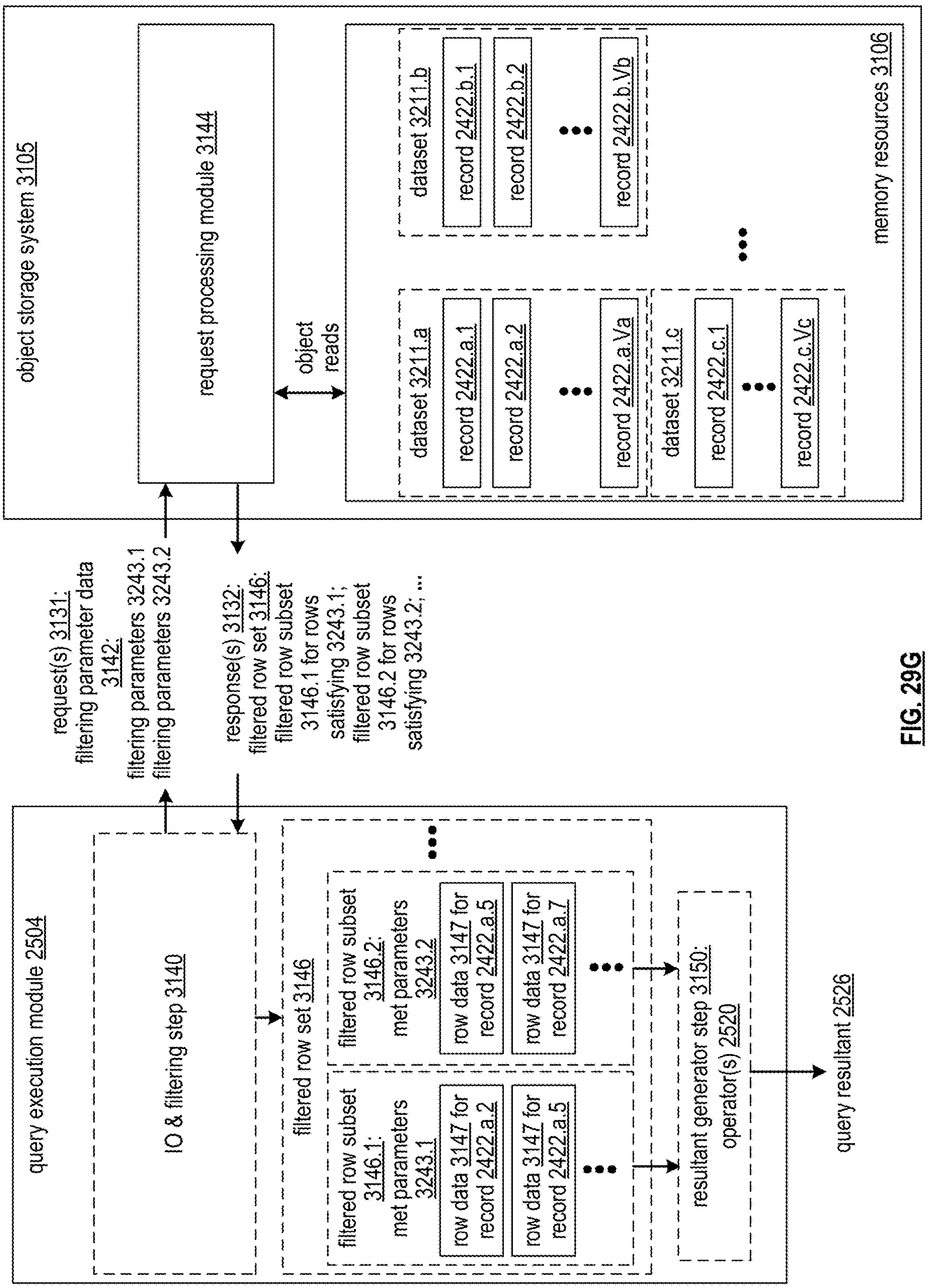
FIG. 29G is a schematic block diagram illustrating query execution based on a query execution module communicating with an object storage system to generate a filtered row set indicating multiple filtered row subsets based on multiple filtering parameters in accordance with various embodiments.

FIG. 29G illustrates query execution based on a query execution module communicating with an object storage system to generate a filtered row set indicating multiple filtered row subsets based on multiple filtering parameters. For example, first filtering parameters 3243.1 indicate how a first filtered row subset 3146.1 be generated; and second filtering parameters 3243.2 indicate how a second filtered row subset 3146.2 be generated. The request processing module 3144 can optionally process the different filtering parameters separately, for example, as though from separate requests 3131 even if included in the same request 3131. Alternatively, if the filtering parameter data 3142 is in regard to records of a same dataset/a same set of records, records can be accessed once, and then evaluated against all filtering parameters 3243 to determine which filtered row subsets this row being included within, rather than being accessed multiple separate times.

The different row subsets 3243 can be differentiated within a given response 3132 in accordance with the object storage communication protocol data 3141, or can be sent in separate responses. Different filtered row subsets can thus indicate different sets of records. In this example, both filtered row sets 3146.1 and 3146.2 include record 2422.*a*.5 based on record 2422.*a*.5 meeting parameters 3243.1 and also 3243.2. However, record 2422.*a*.2 is only included in filtered row subset 3146.*a*.1 based on record 2422.*a*.2 meeting parameters 3243.1 but not 3243.2. In the case where resultant generator step 3150 applies an intersection to filtered row subsets 3146.1 and 3146.2, the resulting set would include record 2422.*a*.5 but not record 2422.*a*.2. Alternatively, other types of query processing, such as execution of a JOIN operator, is applied to the multiple filtered row subsets.

Some or all features and/or functionality of the query execution module 2504 of FIG. 29G can implement the query execution module 2504 of FIG. 29A and/or any embodiment of the query execution module described herein. Some or all features and/or functionality of the object storage system 3105 of FIG. 29G can implement the object storage system of FIG. 29A and/or any embodiment of the object storage system described herein. Some or all features and/or functionality of the query execution of FIG. 29G can be implemented via the query execution of FIG. 29A and/or any embodiment of query execution described herein. Some or all features and/or functionality of the multiple filtered row subsets 3146 of FIG. 29G can implement the multiple filtered row sets of FIG. 28C.

Figure 29H:
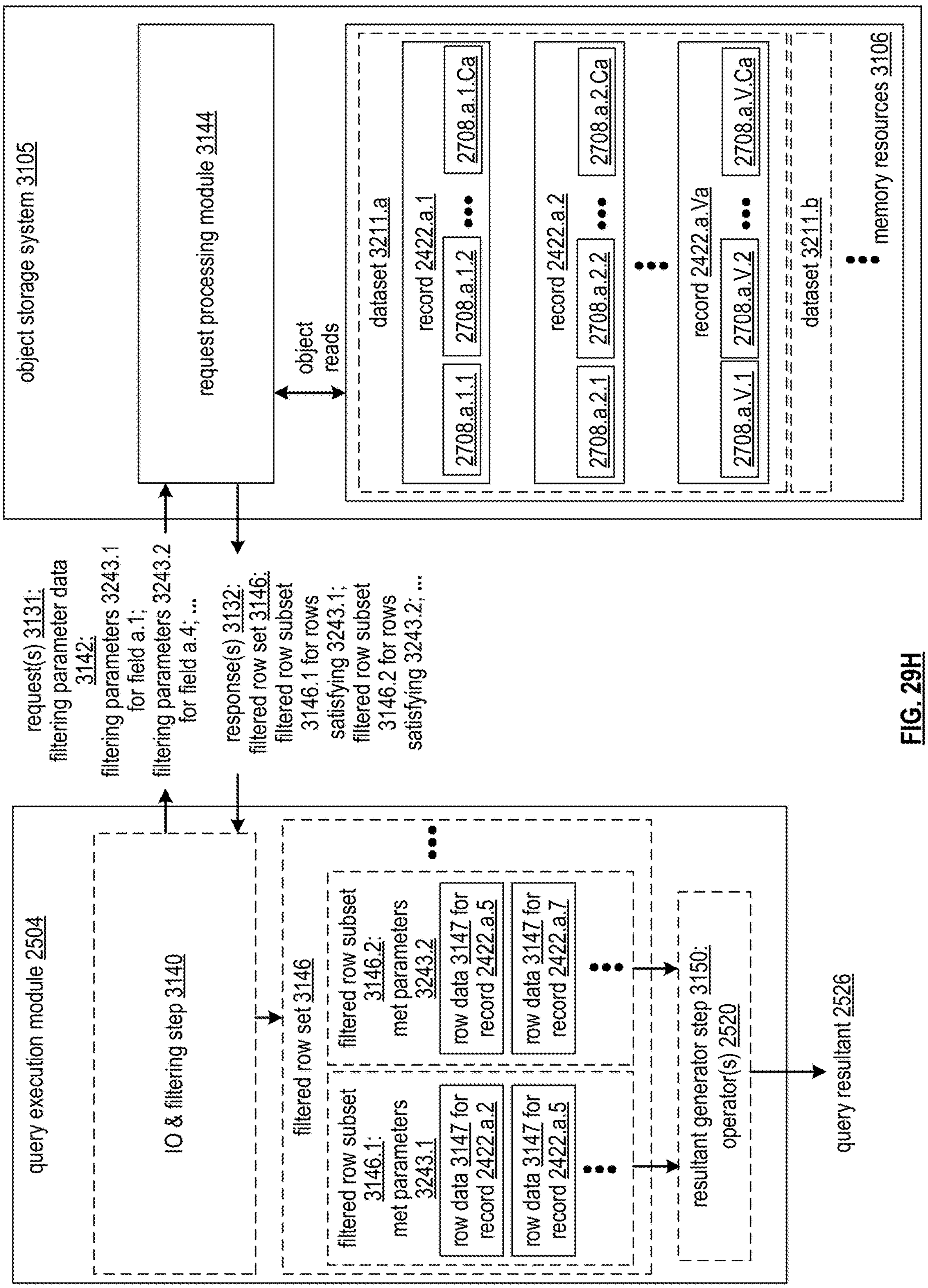
FIG. 29H is a schematic block diagram illustrating query execution based on a query execution module communicating with an object storage system to generate a filtered row set indicating multiple filtered row subsets based on multiple filtering parameters corresponding to multiple fields in accordance with various embodiments.

FIG. 29H illustrates query execution based on a query execution module communicating with an object storage system to generate a filtered row set indicating multiple filtered row subsets based on multiple filtering parameters corresponding to multiple fields. For example, first filtering parameters 3243.1 indicate how a first filtered row subset 3146.1 be generated based on parameters applied to a field a.1; and second filtering parameters 3243.2 indicate how a second filtered row subset 3146.2 be generated based on parameters applied to a field a.4.

The corresponding filtered row sets can optionally indicate row data denoting the record values of these respective fields, where row data 3147 for record 2422.*a*.5 of filtered row subset 3146.1 indicates different information from row data 3147 for record 2422.*a*.5 of filtered row subset 3146.2. Alternatively, the row data denotes the records in the same way for the different filtered row subsets, where row data 3147 for record 2422.*a*.5 of filtered row subset 3146.1 indicates same information as row data 3147 for record 2422.*a*.5 of filtered row subset 3146.2.

Generating filtered row subset 3146.1 can include extracting value 2708 for field a.1 (e.g. 2708.*a*.1.1 of record 2422.*a*.1; 2708.*a*.2.1 of record 2422.*a*.2; etc.) for comparison against filtering parameter data 3142 for this field a.1. Generating filtered row subset 3146.2 can include extracting value 2708 for field a.4 for comparison against filtering parameter data 3142 for this field a.4. In some cases, the extraction is performed in tandem (e.g. record 2422.1 is located to render extraction of value 2708.*a*.1.1 for comparison against filtering parameter data 3142 and also value 2708.*a*.1.4 for comparison filtering parameter data 3142, rather than locating record 2422.1 in a respective object multiple times). Alternatively, in the case where different fields of a same record are stored separately, this extraction is optionally performed separately.

In some embodiments, a given field is implemented as an object reference field implemented to store a reference/memory location to another object of the object storage system For example, the field corresponds to a large type of data such as media data; one object stores all field values for a set of records, but values for large fields are compressed via storing the location data such as object ID for the underlying and/or offset of the respective record within this object, if applicable. In such embodiments, a given value 2708 stored within one object can be implemented as a reference to the location of the actual value (e.g. an entire other object, or a portion of data within another object).

Note that other filtering parameter data 3142 described herein that renders a single filtered row set 3146 which does not include multiple separate row subsets can similarly involve a combination of different filtering parameters as illustrated in FIG. 29G, for example, applied to different fields as illustrated in FIG. 29H. For example, filtering parameters 3142 can require "col_1=1 AND col_2>10", where field a.1 is identified as "col_1" and where field a.4. is identified as "col_2". Rather than sending filtered row subsets for rows meeting filtering parameter 3243.1 of "col_1=1" and filtering parameter 3243.2 of "col_2>10" to have the intersection evaluated by query execution module 2504 in resultant generator step 3150, this intersection can be performed by the request processing module in evaluating the condition as a whole: for each record, fields a.1 and a.2 can be extracted, and only records satisfying both conditions are included in the filtered row set 3146 (e.g. filtered row set includes record 2422.*a*.5 having a col_1 value of 1 and a col_2 value of 11, but not 2422.*a*.2 having a col_1 value of 1 and a col_2 value of 4). Other evaluation of multiple simply query predicates, in a complex query statement (e.g. in CNF form, DNF form, or a non-normalized form) can be similarly performed to render a single filtered row set (optionally based on first converting the filtering expression into CNF form or DNF form). For example, all filtering indicated in query predicates of the query can be pushed to the object storage system 3105 for evaluation. However, even when all filtering is pushed to the object storage system 3105 for evaluation, multiple different filtered row subsets/column streams may be required based on the query (e.g. as operands in performing a JOIN expression; to generate a new field for a set of records as a function of multiple field values via an expression evaluation; etc.)

Some or all features and/or functionality of the query execution module 2504 of FIG. 29H can implement the query execution module 2504 of FIG. 29G and/or any embodiment of the query execution module described herein. Some or all features and/or functionality of the object storage system 3105 of FIG. 29H can implement the object storage system of FIG. 29G and/or any embodiment of the object storage system described herein. Some or all features and/or functionality of the query execution of FIG. 29H can be implemented via the query execution of FIG. 29G and/or any embodiment of query execution described herein. Some or all features and/or functionality of the multiple filtered row subsets 3146 of FIG. 29H can implement the multiple filtered row sets of FIG. 28C.

Figure 29I:
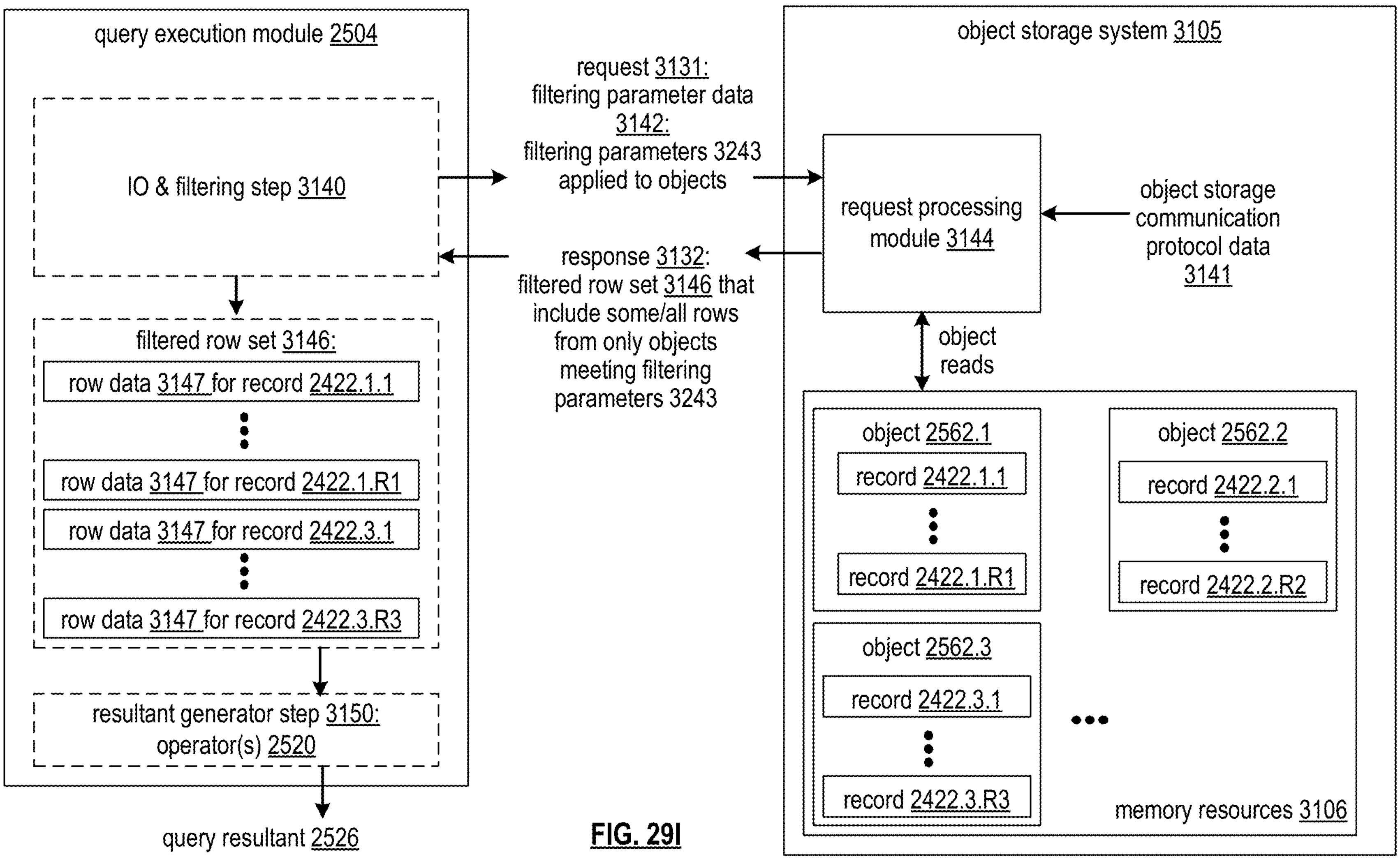
FIG. 29I is a schematic block diagram illustrating query execution based on a query execution module communicating with an object storage system to generate a filtered row set of records included in objects based on filtering parameters applied to objects in accordance with various embodiments.

FIG. 29I illustrates query execution based on a query execution module communicating with an object storage system to generate a filtered row set of records included in objects based on filtering parameters applied to objects. For example, filtering parameter data 3142 indicates filtering parameters that be applied to objects (e.g. to object metadata of the objects, etc.) The records of filtered row set correspond to all records included in objects meeting the filtering parameters. This can include extracting the records from the objects and/or otherwise including row data for all of a the full set of rows included within each object. For example, a row set indicating row numbers/identifiers is included in the object metadata, which is accessed to determine the object meets the filtering parameters 3243 and is further accessed to determine the row data 3147 without accessing other portions of the object. In some embodiments, rather than generating the filtered row set, the identified objects as a whole are sent in response 3132 to have records extracted by the query execution module. In some cases, the filtering parameter data further includes additional parameters 3243 to be applied to the records within the filtered objects, where only record data for these specified objects are included in filtered row set 3146. In some embodiments, index data is utilized to identify the objects, and/or the corresponding row sets, meeting the filtering parameters applied to objects based on indexing rows by objects in which they are included and/or based on indexing objects by one or more various attributes.

Some or all features and/or functionality of the query execution module 2504 of FIG. 29I can implement the query execution module 2504 of FIG. 29A and/or any embodiment of the query execution module described herein. Some or all features and/or functionality of the object storage system 3105 of FIG. 29I can implement the object storage system of FIG. 29A and/or any embodiment of the object storage system described herein. Some or all features and/or functionality of the query execution of FIG. 29I can be implemented via the query execution of FIG. 29A and/or any embodiment of query execution described herein.

Figure 29J:
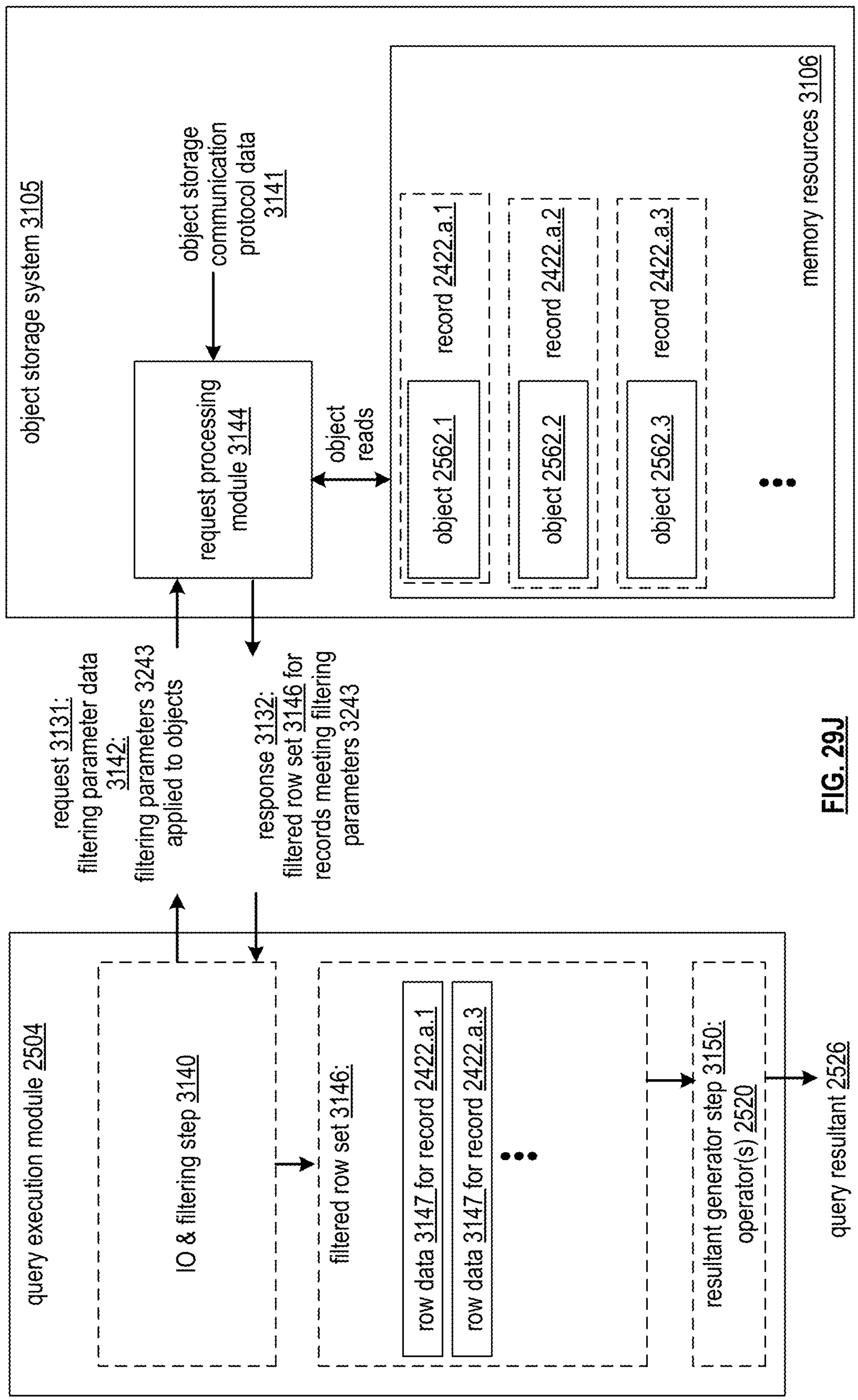
FIG. 29J is a schematic block diagram illustrating query execution based on a query execution module communicating with an object storage system to generate a filtered row set of indicating a set of objects based on filtering parameters applied to objects in accordance with various embodiments.

FIG. 29J illustrates query execution based on a query execution module communicating with an object storage system to generate a filtered row set of indicating a set of objects based on filtering parameters applied to objects. In this case, some or all records 2422 correspond to an entire object. The each row data 3147 of filtered row set can thus indicate a corresponding object meeting the filtering parameters 3243. While not illustrated, one or more records 2422 optionally includes multiple objects.

Some or all features and/or functionality of the query execution module 2504 of FIG. 29J can implement the query execution module 2504 of FIG. 29I and/or any embodiment of the query execution module described herein. Some or all features and/or functionality of the object storage system 3105 of FIG. 29J can implement the object storage system of FIG. 29I and/or any embodiment of the object storage system described herein. Some or all features and/or functionality of the query execution of FIG. 29J can be implemented via the query execution of FIG. 29I and/or any embodiment of query execution described herein.

Figure 29K:
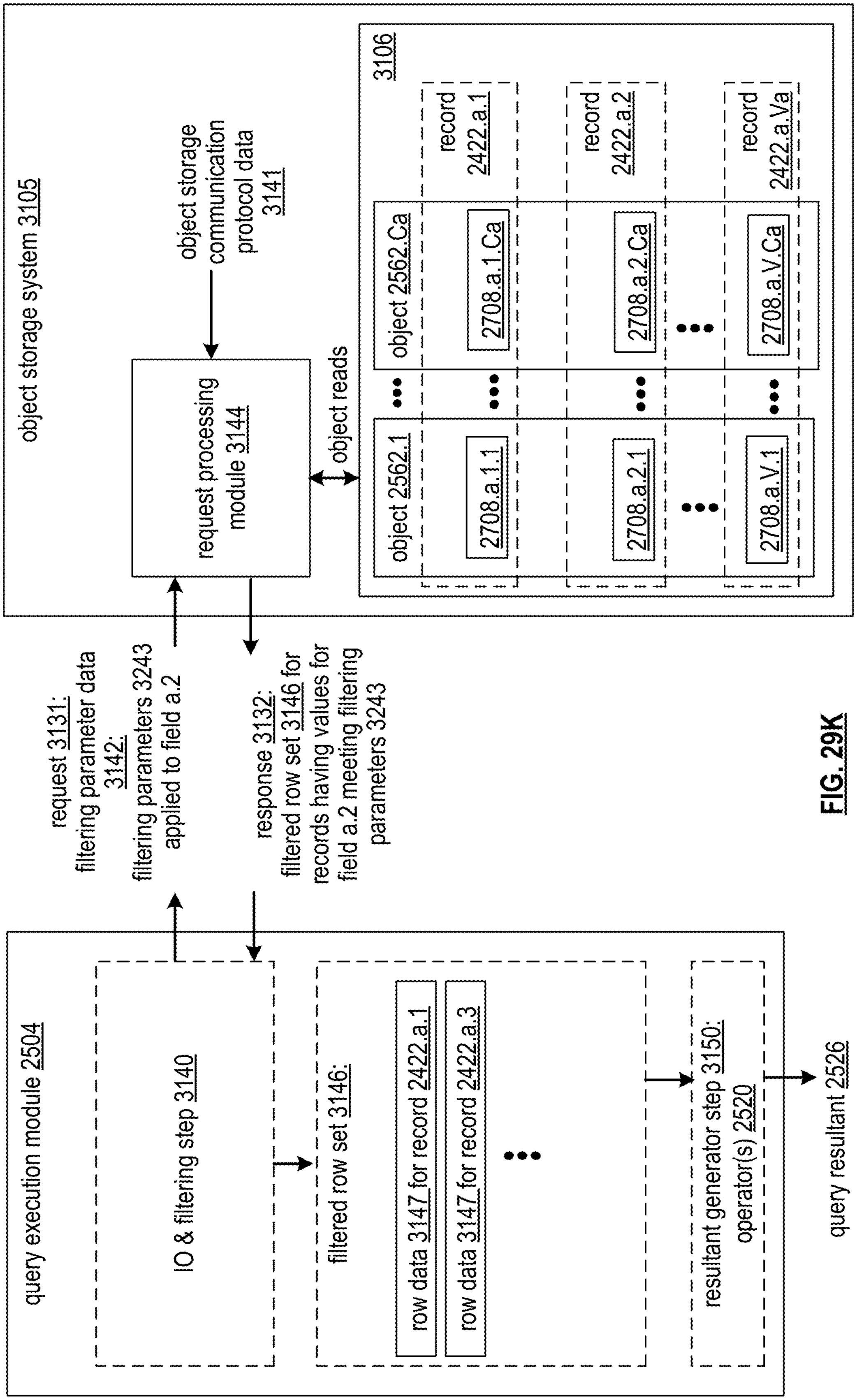
FIG. 29K is a schematic block diagram illustrating query execution based on a query execution module communicating with an object storage system to generate a filtered row set of records having different fields stored in different objects in accordance with various embodiments.

FIG. 29K illustrates query execution based on a query execution module communicating with an object storage system to generate a filtered row set of records having different fields stored in different objects. For example, a given record has Ca fields stored across Cs different objects. A given record's values for the set of fields is optionally mapped to the given object based on a fixed ordering of records across all Ca objects and/or the ordering of fields in some or all objects being mapped to object identifiers. Other mapping data stored in the object metadata of these objects and/or stored separately (e.g. in a designated object) can be utilized to map a given row to the location of its respective fields. Note that additional objects beyond the Ca objects can be stored, for example, corresponding to other records/other datasets.

In this example, filtering parameters 3243 are applied to field a.2. Additional filtering parameters for different fields can optionally be applied for further filtering and/or to generate additional filtered row subsets. The request processing module can generate the filtered row set 3146 based on accessing a corresponding object 2562 (e.g. 2562.2) storing values 2708 for field a.2 (e.g. 2708.*a*.1.2, 2708.*a*.2.2, 2708.*a*.3.2, . . . ). Thus, while a given record is stored in other objects as well, access to these other objects is not necessary for evaluating the filtering parameter applied to field a.2. Alternatively or in addition, index data is accessed to determine the filtered row set, where object 2562.2 is optionally not accessed based on record values not being required.

Some or all features and/or functionality of the query execution module 2504 of FIG. 29K can implement the query execution module 2504 of FIG. 29A and/or any embodiment of the query execution module described herein. Some or all features and/or functionality of the object storage system 3105 of FIG. 29K can implement the object storage system of FIG. 29A and/or any embodiment of the object storage system described herein. Some or all features and/or functionality of the query execution of FIG. 29K can be implemented via the query execution of FIG. 29I and/or any embodiment of query execution described herein.

Figure 29L:
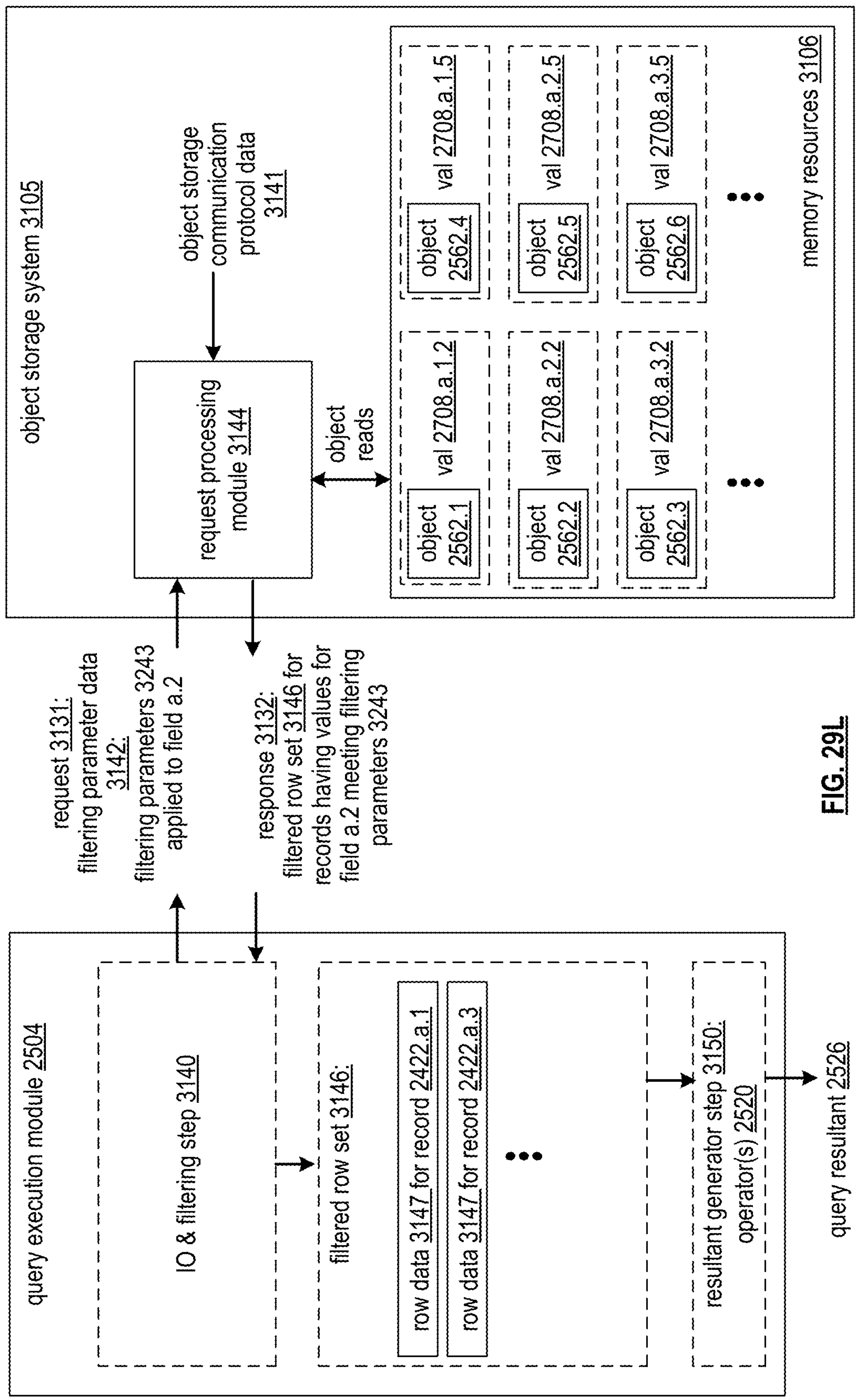
FIG. 29L is a schematic block diagram illustrating query execution based on a query execution module communicating with an object storage system to generate a filtered row set of records having different objects as fields in accordance with various embodiments.

FIG. 29L illustrates query execution based on a query execution module communicating with an object storage system to generate a filtered row set of records having different objects as fields. For example, a given record spans multiple objects, where each object corresponds to one or more fields of the record. As a particular example, one or more fields of a record corresponds to large unstructured data, where a given field is implemented a large text file, image file, audio file, multimedia file, etc. While not illustrated, values of one or more of a given record's fields can correspond to an entire object, while values of one or more other ones of a given record's fields can be stored together in a same object (e.g. also with values of corresponding fields of different records, for example, based on these fields being smaller values).

Applying filtering parameter 3243 can include determining which objects correspond to field a.2 (e.g. based on corresponding mapping data implemented similarly to dataset mapping data), and/or can further include evaluating each object for field a.2 to determine whether the object meets filtering parameters 3243 (e.g. based on comparing the object's metadata to filtering parameters 3243). The filtered row set 3146 can denote an identifier for the corresponding object and/or for the corresponding record. For example, mapping data storing a mapping of records to objects can denote which set of objects make up a given record, and which of these objects correspond to which field. For example, a given object's object metadata denotes which object to which it belongs, and/or further indicates which field this object corresponds to.

Some or all features and/or functionality of the query execution module 2504 of FIG. 29L can implement the query execution module 2504 of FIG. 29K and/or any embodiment of the query execution module described herein. Some or all features and/or functionality of the object storage system 3105 of FIG. 29L can implement the object storage system of FIG. 29K and/or any embodiment of the object storage system described herein. Some or all features and/or functionality of the query execution of FIG. 29L can be implemented via the query execution of FIG. 29K and/or any embodiment of query execution described herein.

Figure 29M:
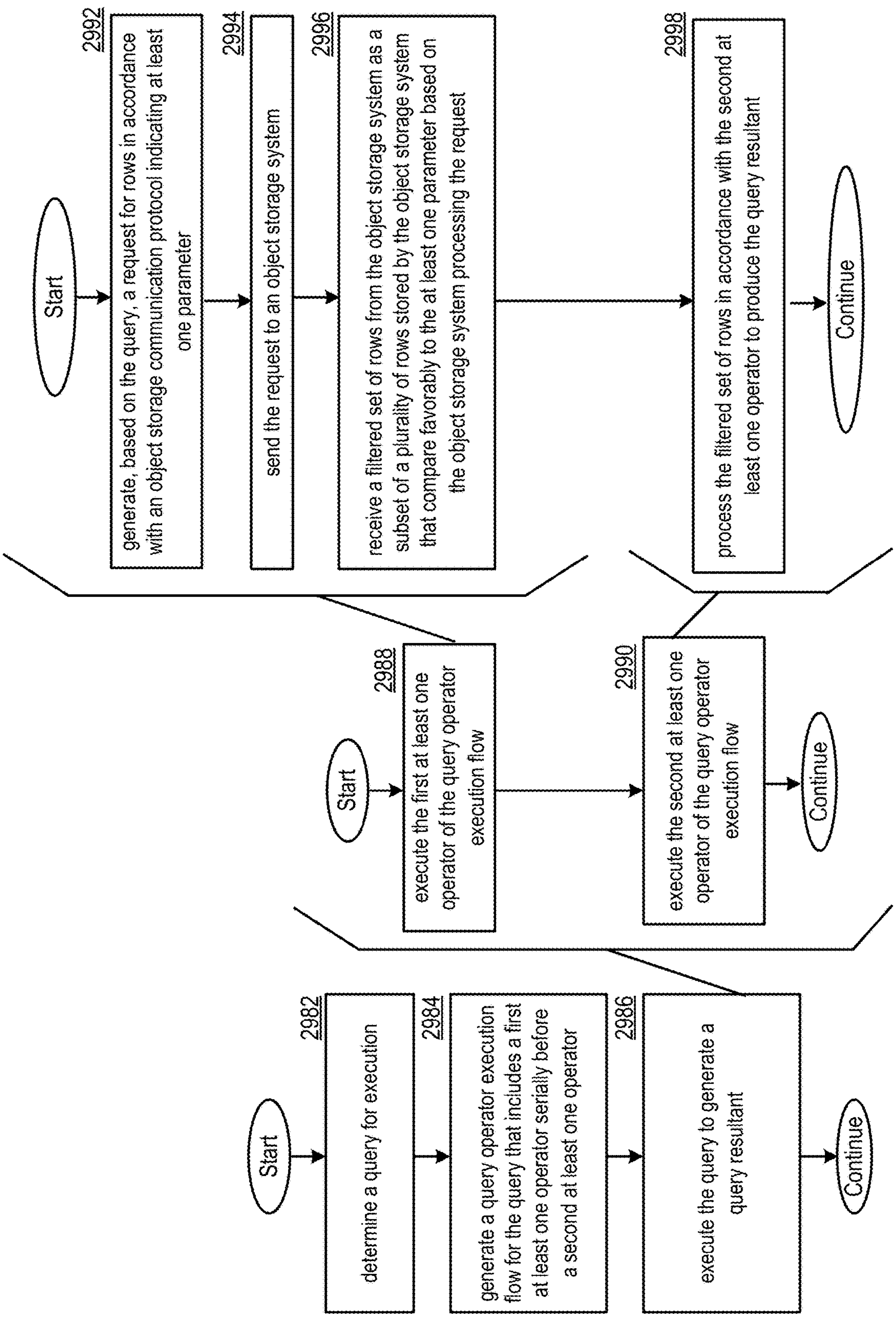
FIG. 29M is a logic diagram illustrating a method for execution in accordance with various embodiments.

FIG. 29M illustrates a method for execution, for example, by a data processing system 3107. For example, the data processing system 3107 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29M. In particular, a node 37 can utilize the query processing module 2435 to execute some or all of the steps of FIG. 29M, where multiple nodes 37 implement their own query processing modules 2435 to independently execute some or all of the steps of FIG. 29M, for example, to facilitate execution of a query as participants in a query execution plan 2405. Some or all of the method of FIG. 29M can be performed by utilizing the operator flow generator module and/or the query execution module 2504 in accordance with some or all features and/or functionality described in conjunction with FIGS. 28A-29L. Some or all of the method of FIG. 29M can be performed based on communicating with an object storage system 3105. Some or all of the method of FIG. 29M can be performed by the object storage system 3105 instead of the data processing system 3107 based on communication between object storage system 3105 and data processing system 3107. Some or all of the steps of FIG. 29M can optionally be performed by database system 10 and/or any other processing module. Some or all of the steps of FIG. 29M can be performed to implement some or all of the functionality of the data processing system 3107 and/or object storage system 3105 as described in conjunction with FIGS. 28A-29L. Some or all of the steps of FIG. 29M can be performed based on communications exchanged in accordance with an API dictated by object storage communication protocol data 3141. Some or all of the steps of FIG. 29M can be performed to implement some or all of the functionality regarding execution of a query via the plurality of nodes in the query execution plan 2405. Some or all steps of FIG. 29M can be performed in accordance with other embodiments of data processing system 3107 described herein. Some or all steps of FIG. 29M can be performed in conjunction with performing some or all steps of any other method described herein.

Step 2982 includes determining a query for execution. Step 2984 includes generating a query operator execution flow for the query that includes a first at least one operator serially before a second at least one operator. Step 2986 includes executing the query to generate a query resultant.

Performing step 2986 can include performing some or all of steps 2988 and/or 2990. Step 2988 includes executing the first at least one operator of the query operator execution flow. For example, performing step 2988 includes performing IO and filtering step 3140. Step 2990 includes executing the second at least one operator of the query operator execution flow. For example, performing step 2990 includes performing resultant generator step 3150.

Performing step 2988 can include performing some or all of steps 2992, 2994, and/or 2996. Step 2992 includes generating, based on the query, a request for rows (e.g. request 3131) in accordance with an object storage communication protocol indicating at least one parameter, such as at least one filtering parameter 3243 of filtering parameter data 3142. Step 2994 includes sending the request to an object storage system. Step 2996 includes receiving a filtered set of rows (e.g. filtered row set 3146) from the object storage system as a subset of a plurality of rows (e.g. records 2422) stored by the object storage system that compare favorably to the at least one parameter based on the object storage system processing the request.

Performing step 2990 can include performing step 2998. Step 2998 includes processing the filtered set of rows in accordance with the second at least one operator to produce the query resultant.

In various examples, the method includes determining a query for execution, generating a query operator execution flow for the query that includes a first at least one operator serially before a second at least one operator, and/or executing the query to generate a query resultant. executing the first at least one operator of the query operator execution flow. In various examples, executing the query to generate the query resultant is based on: generating, based on the query, a request for rows in accordance with an object storage communication protocol indicating filtering parameter data parameter; sending the request to an object storage system; and/or receiving a response indicating a filtered row set from the object storage system as a proper subset of a plurality of records stored by the object storage system that compare favorably to the filtering parameter data based on the object storage system processing the request. In various examples, executing the query to generate the query resultant is based on executing the second at least one operator of the query operator execution flow based on processing the filtered row set indicated in the response in accordance with the second at least one operator to produce the query resultant.

In various examples, the object storage system stores the plurality of records via a plurality of objects in memory resources of the object storage system and further stores configuration data mapping storage of the plurality of records of the plurality of datasets via the plurality of objects. In various examples, the object storage system generates the filtered row set via processing the request for rows based on generating a record identification pipeline for execution based on the filtering parameter data and the configuration data and/or identifying the proper subset of the plurality of records meeting the filtering parameter data based on executing the record identification pipeline by accessing at least one object of the plurality of objects.

In various examples, the object storage system generates the filtered row set via processing the request for rows further based on accessing a first index structure of the set of index structures stored in memory resources accessible by the object storage system.

In various examples, a second plurality of objects stored by the object storage system store the set of index structures indexing the plurality of records, where accessing the first index structure includes accessing at least one of the second plurality of objects. In various examples, the set of index structures are stored via non-object storage memory resources accessible by the object storage system. In various examples, accessing the first index structure includes accessing the non-object storage memory resources.

In various examples, the object storage system automatically generates index structure selection data indicating a determination to generate the first index structure indexing a first field for the ones of the of plurality of records included in a first dataset. In various examples, the object storage system generates the first index structure indexing based on the index structure selection data.

In various examples, the object storage system further stores access control data regarding the plurality of records. In various examples, the object storage system generates, based on the filtering parameter data and the access control data, filtered row set access restriction data indicating whether access to the filtered row set is allowed. In various examples, the response indicating the filtered row set is generated based on the filtered row set access restriction data indicating access to the filtered row set is allowed.

In various examples, the filtered row set indicates row storage location data for a first filtered row set that is a first proper subset of the plurality of records stored by the object storage system based on the object storage system processing the request.

In various examples, the method further includes determining a second filtered row set as a second proper subset of the first filtered row set based on executing at least one query operator, sending a second request for field values that indicates the row storage location data for the second filtered row set in accordance with the object storage communication protocol, and/or sending a second response indicating the field values of the second filtered row set based on processing the request for field values.

In various examples, the query resultant includes a new plurality of records. In various examples, the method further includes generating a second request to store the new plurality of records in accordance with the object storage communication protocol. In various examples, the object storage system stores the new plurality of records in at least one new object based on processing the request to store the new plurality of records.

In various examples, the method further includes sending a second request indicating second filtering parameter data in accordance with the object storage communication protocol. In various examples, the method further includes receiving a second response indicating a second filtered row set identifying a second proper subset of the plurality of records meeting the filtering parameter data. In various examples, the second proper subset of the plurality of records includes at least one row of the new plurality of records. In various examples, the method further includes processing the second filtered row set indicated in the response to produce a second query resultant.

In various examples, the second at least one operator of the query operator execution flow includes at least one aggregation operator.

In various examples, the filtering parameter data includes at least one record-based filtering parameter applied to objects, where the filtered row set indicates ones of the plurality of records satisfying the at least one record-based filtering parameter.

In various examples, the filtering parameter data includes at least one object-based filtering parameter applied to objects, where the filtered row set indicates ones of the plurality of records included in objects satisfying the at least one object-based filtering parameter.

In various examples, a set intersection between a set of records included in a first object of a plurality of objects stored by the object storage system and the proper subset of the plurality of records is non-null. In various examples, a set difference between the set of records included in the first object and the proper subset of the plurality of records is non-null.

In various examples, the object storage communication protocol is defined by an Application Programming Interface (API) implemented to facilitate communications between at least one data processing system that includes the data processing system and at least one object storage system that includes the object storage system.

In various examples, determining the query is based on processing a query request in accordance with the Structure Query Language (SQL).

In various examples, the object storage system stores a plurality of objects via memory resources in conjunction with an object storage service. In various examples, the memory resources store the plurality of objects via a flat storage structure.

In various examples, each object of the plurality of includes a data portion, an object metadata portion, and a globally unique identifier.

In various embodiments, any one of more of the various examples listed above are implemented in conjunction with performing some or all steps of FIG. 29M. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29M described above, for example, in conjunction with further implementing any one or more of the various examples described herein.

In various embodiments, a data processing system includes at least one processor and at least one memory that stores operational instructions. In various embodiments, the operational instructions, when executed by the at least one processor, cause the storage system to perform some or all steps of FIG. 29M, for example, in conjunction with further implementing any one or more of the various examples described herein.

In various embodiments, the operational instructions, when executed by the at least one processor, cause the at least one processor to: determine a query for execution; generate a query operator execution flow for the query that includes a first at least one operator serially before a second at least one operator; and/or execute the query to generate a query resultant. In various embodiments, executing the query to generate the query resultant is based on: executing the first at least one operator of the query operator execution flow and/or executing the executing the second at least one operator of the query operator execution flow. In various embodiments, executing the first at least one operator of the query operator execution flow is based on: generating, based on the query, a request for rows in accordance with an object storage communication protocol indicating at least one parameter; sending the request to an object storage system; and/or receiving a filtered set of rows from the object storage system as a subset of a plurality of rows stored by the object storage system that compare favorably to the at least one parameter based on the object storage system processing the request. In various embodiments, executing the second at least one operator of the query operator execution flow is based on processing the filtered set of rows in accordance with the second at least one operator to produce the query resultant.

Figure 30A:
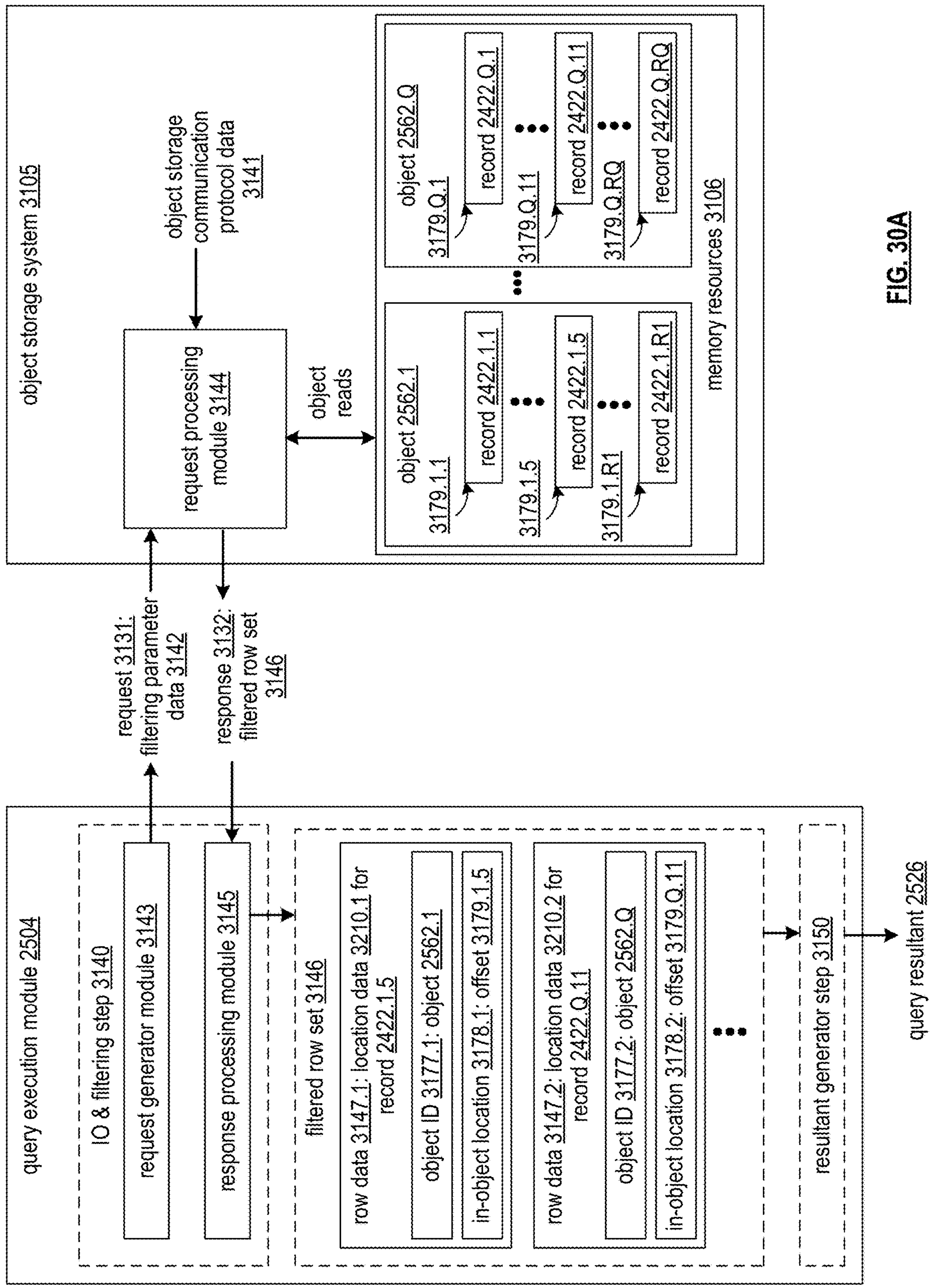
FIG. 30A is a schematic block diagram illustrating query execution based on a query execution module communicating with an object storage system to generate a filtered row set indicating location data for a subset of records of a dataset in accordance with various embodiments.

FIG. 30A presents an embodiment of an object storage system that generates a filtered row set 3146 having row data 3147 that indicates location data 3120 for each respective record 2422. Some or all features and/or functionality of the row data 3147 of FIG. 30A can implement the row data 3147 of FIG. 28B and/or any embodiment of row data 3147 described herein. Some or all features and/or functionality of the object storage system 3105 of FIG. 30A can implement the object storage system 3105 of FIG. 30A can implement the object storage system 3105 of FIG. 28B and/or any embodiment of the object storage system 3105 described herein.

In some embodiments, the row data 3147 can be implemented to include location data 3110 for the respective record, which can indicate the location of the respective record in memory resources 3106, enabling faster retrieval of the corresponding record (e.g. the value of one or more fields) later if needed. This can be preferred over including all record values in row data 3147 if further processing/filtering is performed by query execution module, where the record values are only retrieved as needed after such further processing/filtering is performed.

In this example, object 2562.1 includes a first plurality of R1 records 2422.1.1-2422.1.R1. The location of record 2422.1.1 is denoted by corresponding offset 3179.1.1, the location of record 2422.1.5 is denoted by a corresponding offset 3179.1.5, and the location of record 2422.1.R1 is denoted by corresponding offset 3179.1.R1. In this example, object 2562.Q includes another plurality of RQ records 2422.Q.1-2422.Q.RQ. The location of record 2422.Q.1 is denoted by corresponding offset 3179.Q.1, the location of record 2422.Q.11 is denoted by a corresponding offset 3179.Q.11, and the location of record 2422.Q.RQ is denoted by corresponding offset 3179.Q.RQ.

For example, each offset 3179 corresponds to a byte/bit offset denoting where within the object the record 2422 is written (e.g. where one or more corresponding field values are written). Each offset 3179 can correspond to a location within the given object 2562.1, where locating a given record also requires knowledge of which object it is included within (e.g. the corresponding object ID 3177 identifying the object), as well as this offset 3179 denoting the record's in-object location within the specified object. Such an (object ID, offset) pair implemented as location data 3210 can thus uniquely identify a given record, and can further denote the memory location where the given record can be read. As used herein, a row number uniquely identifying rows across objects can optionally be implemented as and/or based on a corresponding (object ID, offset) pair for the object.

In other embodiments, offset 3179 is simply implemented as a row number for the record, denoting how many records into the object the record is written (e.g. if the records are written to the objects sequentially, with a fixed-length, known offset between records, and/or otherwise known location within the object for a given row number). The row number is optionally unique to the object, but not across objects (e.g. the first row in each object has a row number of '1', where the object ID distinguishes which object includes this first row).

The request processing module 3144 can generate response 3132 to indicate the filtered row set 3148 as a set of row data 3147 as described previously, where each row data 3147 denotes location data 3210 for the respective record, for example, instead of values of one or more fields of the record. In this example, a set of records that includes at least records 2422.1.5 and record 2422.Q.11 are determined to meeting filtering parameter data 3142, and row data for these records 2422 is thus included in the filtered row set 3146. Thus, row data 3147.1 for record 2422.1.5 includes location data 3120 that includes an object ID 3177.1 indicating object 2562.1, based on record 2422.1.5 being contained within this object 2562.1, and that further includes an in-object location 3178.1 indicating offset 3179.1.5 as the location of record 2422.1.5 within object 2562.1. Similarly, row data 3147.2 for record 2422.Q.11 includes location data 3120 that includes an object ID 3177.2 indicating object 2562.Q, based on record 2422.Q.11 being contained within this object 2562.Q, and that further includes an in-object location 3178.2 indicating offset 3179.Q.11 as the location of record 2422.Q.11 within object 2562.Q. The in-object location can be implemented as a bit/byte offset, row number, and/or other information denoting the location of the record within the object, which can enable easy retrieval of the record later as necessary.

In some embodiments, the location data 3120 of FIG. 30A is implemented as row data 3147 of filtered row set 3146 based on a corresponding instruction included in request 3131, for example, in accordance with the object storage communication protocol data 3141. For example, the query execution module 2504 includes this instruction to include location data (e.g. and not record values) based on determining further filtering will be performed by resultant generator step 3150, based on determining record values will be required to be projected/processed for some or all records during resultant generator step 3150, based on determining a size of record values and/or number of expected records compares unfavorably to a memory size threshold where location data is more memory efficient, and/or based on another determination.

In some embodiments, for a given query, multiple such filtered row sets 3146 for multiple different fields can be generated in response(s) 3132 as discussed previously (e.g. as multiple filtered row subsets), for example, in the case where values of multiple different fields may/will require retrieval during query execution and/or later query execution.

Figure 30B:
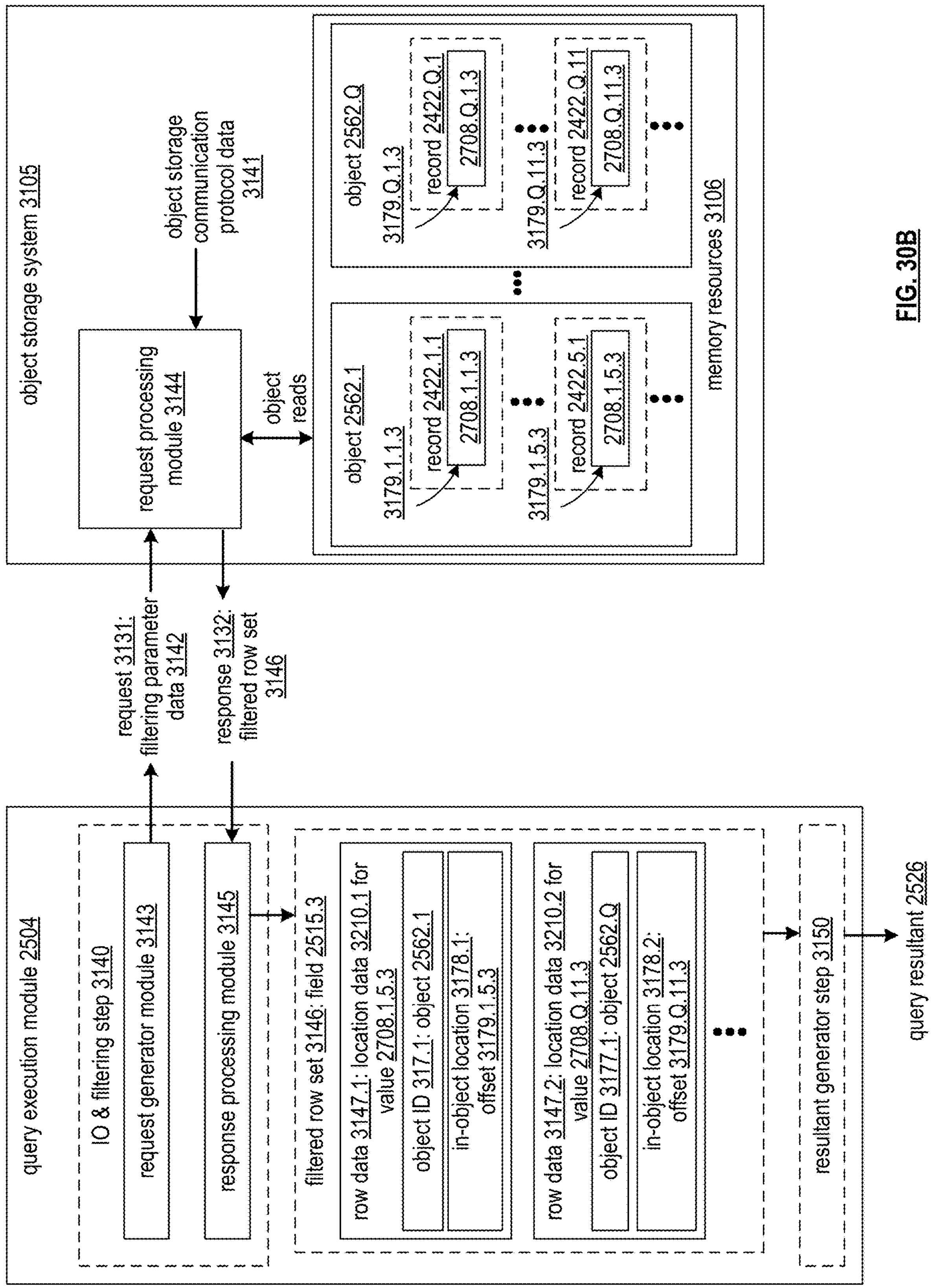
FIG. 30B is a schematic block diagram illustrating query execution based on a query execution module communicating with an object storage system to generate a filtered row set indicating location data for field values of a subset of records of a dataset in accordance with various embodiments.

FIG. 30B illustrates an embodiment where filtered row set 3146 corresponds to a given field, and where the row data 3147 of this filtered row set 3146, indicates for each respective record 2422, location data 3210 for this given record's value for the given field. Some or all features and/or functionality of the row data 3147 of FIG. 30B can implement the row data 3147 of FIG. 30A, of FIG. 28B, of FIG. 29K, of FIG. 29H, and/or any embodiment of row data 3147 described herein. Some or all features and/or functionality of the object storage system 3105 of FIG. 30A can implement the object storage system 3105 of FIG. 30A can implement the object storage system 3105 of FIG. 30A, of FIG. 28B, of FIG. 29K, of FIG. 29H and/or any embodiment of the object storage system 3105 described herein.

The filtered row set 3146 can correspond to a particular field 2515, such as a field (e.g. column) whose values may be required for some or all records during the query execution (and/or a later/different query execution). In particular, for a given record, different fields can be stored in different locations (e.g. within the same object, or optionally across different objects). In the example of FIG. 30B, the location of the value 2708.1.5.3, denoting the value of field 2515.3 for record 2422.1.5, is stored as offset 3719.1.1.3 within object 2562.1. Some or all other fields of record 2422.5.1 are optionally stored within object 2562.1 as well as illustrated in FIG. 30A, for example, adjacently/in consecutive bits, or optionally in different places, for example, if the object is arranged in a column-major format. Alternatively, some or all other fields of given record 2422.5.1 are optionally stored within other objects 2562, for example, as discussed in conjunction with FIG. 29K. In either case, the offset location of other fields of record 2422.5.1 are different, but the in-object location 3178 indicates the offset 3179.1.5.3 denoting the location of field 2515.3 for record 2422.1.5 based on the filtered row set indicating location data for this field 2515.3. Similarly, the in-object location 3178.2 for the value of field 2515.3 for record 2422.Q.11 is indicated as offset 3179.Q.11.3.

In some embodiments, the in-object locations 3178 of filtered row set 3146 for field 2515.3 simply denote the row number of the record within the given object and/or offset of the start of the given record within the given object, where the start of the given field value is deterministic from this information based on records being fixed-sized, based on fields being fixed-sized, based on the given object only storing value of the given field for its records, and/or based on an arrangement/structuring of fields within an object being otherwise deterministic.

In some embodiments, the request processing module 3144 determines the location data 3210 of a given record/given field value satisfying the filtering parameter data 3142 for inclusion within the respective filtered row set based on accessing the corresponding object, extracting some or all records from the object, determining which records satisfy the filtering parameter data 3142, and logging the respective locations of these record accordingly. For example, the record processing system reads a given record sequentially, updating its current offset within the record as each record is read from the respective object, and where the offset of the current record is logged as row data 3147 in filtered row set if the corresponding record satisfies the filtering parameter data. In other embodiments, rather than accessing these records/extracting records from these records, index data can be utilized to generate filtered row set 3146 as discussed previously.

Figure 30C:
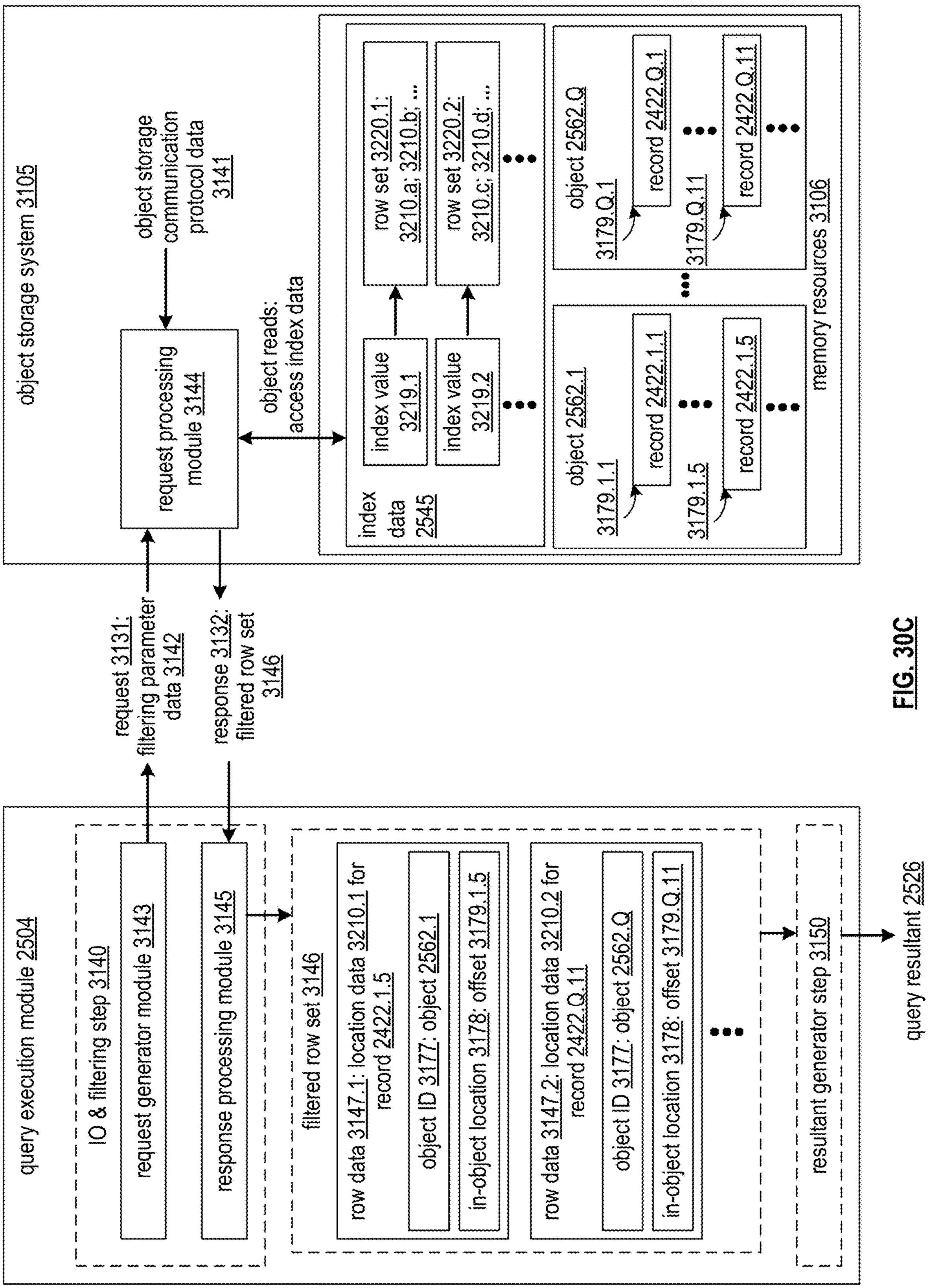
FIG. 30C is a schematic block diagram illustrating query execution based on a query execution module communicating with an object storage system to generate a filtered row set indicating location data for a subset of records of a dataset based on index data in accordance with various embodiments.

FIG. 30C illustrates such an embodiment where index data 2545 stores location data 3010 for records in a given row set 3220 mapped to a given index value 3219. As discussed previously, index data 2545 can be accessed to identify which records 2422 meet filtering parameter data 3142 based on determining which index values 3142 meet filtering parameter data 3142, where the corresponding records for these index values correspond to all (or a superset) of records that satisfy the corresponding filtering parameter data 3142. In some embodiments, each record is identified in a given row set 3220 by its location data 3210 (e.g. its object ID 3177 and/or its in-object location 3178).

In this example, determining filtered row set 3146 can include identifying location data 3210.1 and location data 3210.2 as row data 3147.1 and 3147.2 respectively based on being included in a given row set 3220 (or union of multiple row sets 3220 for multiple index values 3219 meeting filtering parameter data). For example, index value 3219.1 is determined to compare favorable to filtering parameter data, where filtered row set 3146 is generated to include the location data of row set 3220.1 accordingly, where location data 3210.*a* is the location data for record 2422.5.1 and where location data 3210.*b* is the location data for record 3244.Q.11.

Figure 30D:
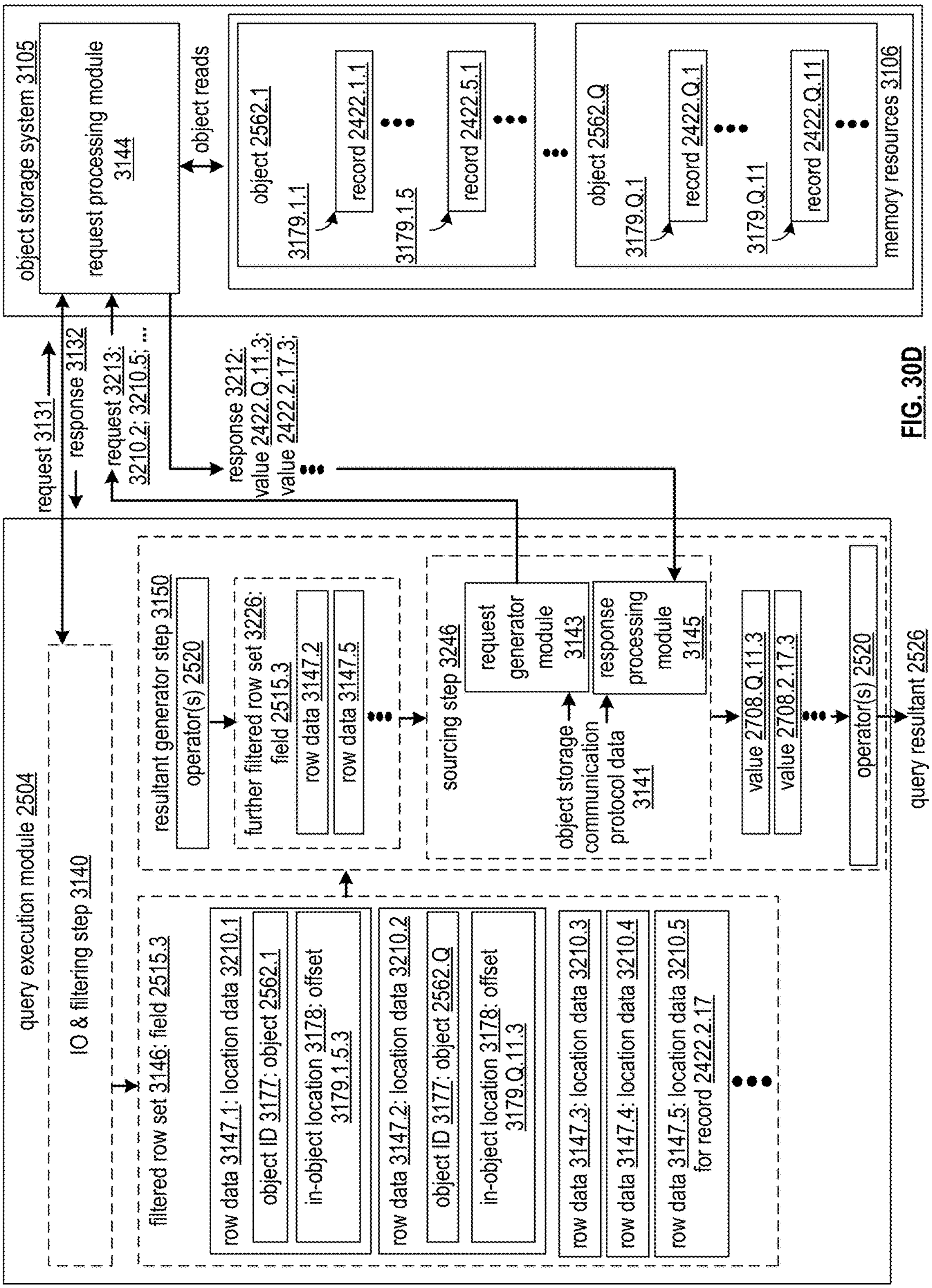
FIG. 30D is a schematic block diagram illustrating query execution based on a query execution module communicating with an object storage system to perform a sourcing step based on location data of a further filtered row set in accordance with various embodiments.

FIG. 30D illustrates an embodiment of a query processing system 2504 that further implements request generator module 3143 in a sourcing step 3246 of resultant generator step 3150 to generate at least one further request 3213 for the given query indicating a further filtered row set 3226, for example, based on applying some or all operators 2520 of the resultant generator step 3150 to filtered row set 3146 to further filter filtered row set 3146. For example, this further filtering may not be possible by object storage system (e.g. an inner join is performed and many records are filtered out based on not having matches as dictated by the equality/match condition of the join, where the object storage system is not operable to perform joins itself).

Some or all features and/or functionality of the query execution module 2504 of FIG. 30D can implement the query execution module 2504 of FIG. 28B and/or any embodiment of query execution module 2504 described herein. Some or all features and/or functionality of the resultant generator step 3150 of FIG. 30D can implement the resultant generator step 3150 of FIG. 30B, FIG. 28D, and/or any embodiment of query execution module 2504 described herein.

The further filtered row set 3226 of request 3213 can indicate the location data 3210 of the remaining records not filtered out, and needing values for further query processing, based on having received the location data 3210 in filtered row set 3146. A corresponding further response 3212 can be generated in response, indicating the values at the locations indicated in request 3213. For example, the request processing module applies this location data 3210 to directly read the respective values 2708 from the corresponding objects at the respective offsets.

The sourced values 2708 generated in sourcing step 3246 can be processed to generate query resultant. For example, the sourced values are projected, for example, where sourcing step 3246 is implemented as a projection step 2546, and/or where the query resultant 2526 includes the values 2708 emitted by sourcing step. As another example, the sourced values are further processed/filtered/manipulated via additional operators 2520 to generate the query resultant as a function of these values 2708.

In this example, filtered row set 3146 includes at least row data 3147.1, 3147.2, 3417.3, 3147.4, and/or 3147.5. For example, row data 3147.1 and 3147.2 are implemented as the row data for field 2515.3 denoting record 2422.1.5 and 2422.Q.11, respectively, continuing with the example of FIG. 30B. Applying operators 2520 renders further filtered row set 3226 that includes row data 3147.2 and 3147.5, but not the row data 3147.1, 3147.3, or 3147.4. This further filtered row set 3226 is indicated in the request 3213, and response 3212 indicates the values of field 2515.3 read from the corresponding locations (and/or as otherwise indicated by the location data/identifiers of the corresponding records), and not other records filtered out by operators 2520. The corresponding values are projected in projection set 2546, for example, for inclusion in the query resultant, and/or for further processed by additional operators 2520.

While not illustrated, values of some or all other fields can be sourced similarly via the same or separate sourcing step 3246, for example, after further filtering a corresponding filtered row set 3146 in accordance with the query, where the query resultant includes and/or is based on values 2708 of multiple different fields.

In some embodiments, the filtered row set 3146 includes row identifiers/numbers, which are mapped to location data 3220 in separate memory resources accessible by the query execution module and/or object storage system. For example, the object storage system, or another intermediate processing system communicating with query execution module 2504 and/or object storage system 3105, caches the location data 3220 for the row identifiers of filtered row set 3146 in generating row set 3146 in response to the original request 3131, for example, based on a corresponding instruction in the request 3131 and/or based on another determination that sourcing for some or all of these values may occur later, where the request 3213 indicates the row IDs of the further filtered row set, and where the response 3212 is generated based on accessing this mapping of row identifiers/numbers to location data 3220.

In some embodiments, the filtered row set 3146 includes row identifiers/numbers, which are mapped values 2708 in separate memory resources accessible by the query execution module and/or object storage system. For example, the object storage system, or another intermediate processing system communicating with query execution module 2504 and/or object storage system 3105, caches the values 2708 of some or all fields of the respective records 2422 for the row identifiers of filtered row set 3146 in generating row set 3146 in response to the original request 3131, for example, based on a corresponding instruction in the request 3131 and/or based on another determination that sourcing for some or all of these values may occur later, where the request 3213 indicates the row IDs of the further filtered row set, and where the response 3212 is generated based on accessing this mapping of row identifiers/numbers to values 2708.

In some embodiments, the sourcing step 3246 is performed in a future query execution of a later executed query. For example, the filtered row set 3146 is cached by query execution module 2504 in resources accessible in later query execution (e.g. filtered row set 3146 is optionally stored as a query resultant for the query), and/or is sent to other memory resources accessible by another query execution module that executes this later query. A later query indicates same filtering requirements, references the given query, and/or indicates the filtered row set 3146. The same or different query execution module can perform the sourcing step 3246 in response to send request 3213 to object storage system 3105 for processing accordingly. This delayed means of processing can leverage the static nature of objects stored by object storage system 3105, as objects storing the records are guaranteed and/or expected to not change over time.

Any features and/or functionality of generating, processing, and/or otherwise implementing request 3131 described herein can be utilized implement the generating, processing, and/or other implementing of request 3213. Any features and/or functionality of generating, processing, and/or otherwise implementing response 3132 described herein can be utilized implement the generating, processing, and/or other implementing of response 3211.

In some embodiments, while the embodiment of FIG. 30D requires additional exchanges between query execution module 2504 and object storage system 3105 and/or additional processing by object storage system 3105, this can be preferred over requesting all values initially, for example, based on: the values being large, a large proportion of records being expected to be filtered in generating the further filtered row set, the number of records in filtered row set 3146 being expected to be large, the filtered row set being expected to consume an unreasonable amount of memory resources of the query execution module, processing of request 3131 by object storage system being expected/known to require reading an unreasonable number of records and/or being expected/known to require reading an unreasonable number of objects to determine the values (e.g. vs. simply accessing an index structure storing location data/identifiers for these rows), and/or other factors.

In other embodiments, reading all values initially is preferred over the embodiment of FIG. 30D, for example, based on: the values being small, a small proportion of records being expected to be filtered in generating the further filtered row set, the number of records in filtered roe set 3146 being expected to be small, filtered row set being expected to consume a reasonable amount of memory resources of the query execution module, processing of request 3131 by object storage system being expected/known to require reading a reasonable number of records and/or being expected/known to require reading a reasonable number of objects to determine the values (e.g. vs. simply accessing an index structure storing location data/identifiers for these rows), and/or other factors. For example, while more values may be read than necessary, the exchange of communications between query execution module and object storage system can be reduced and/or the processing performed by object storage system can be reduced.

Figure 30E:
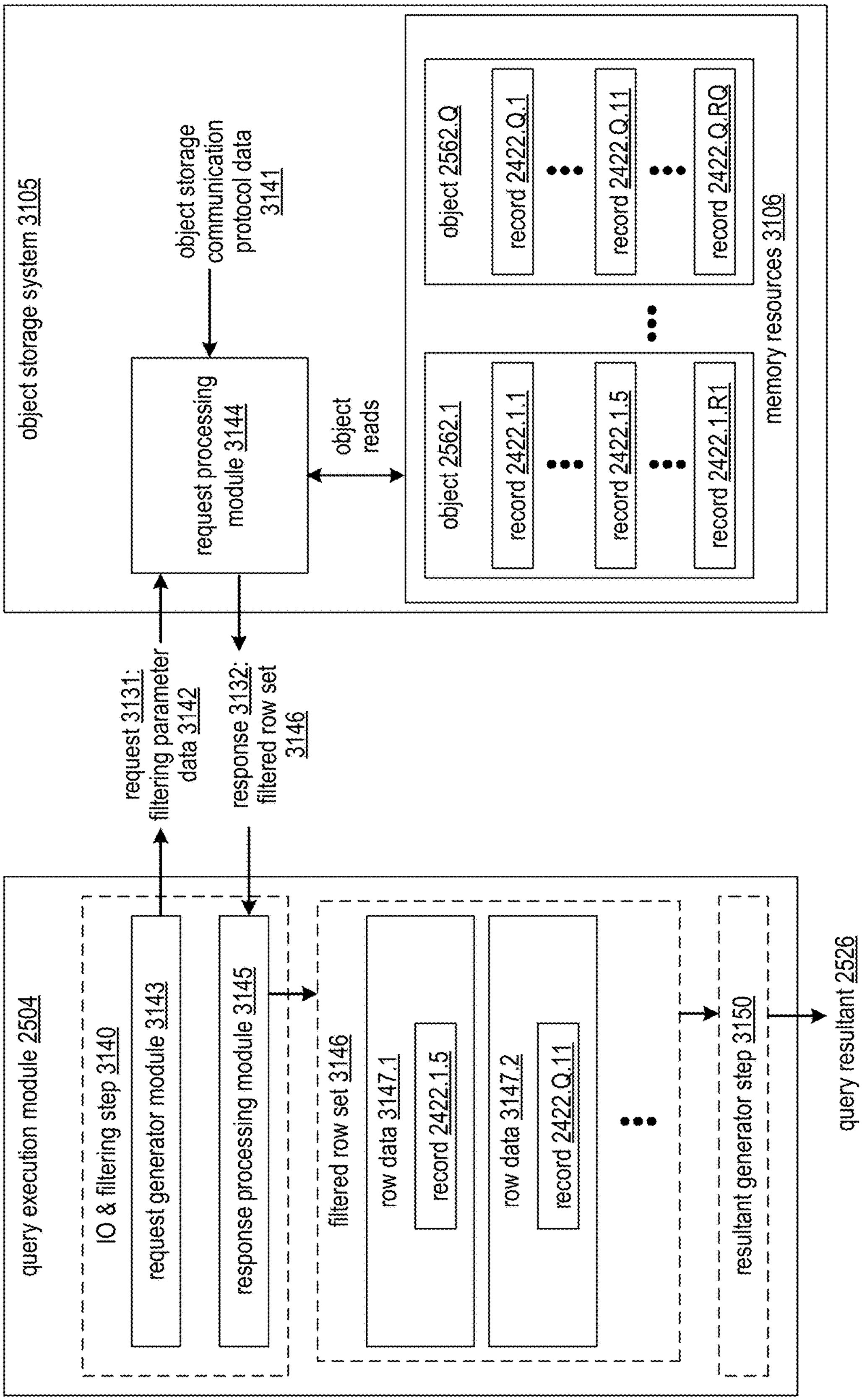
FIG. 30E is a schematic block diagram illustrating query execution based on a query execution module communicating with an object storage system to generate a filtered row set that includes records stored by the object storage system in accordance with various embodiments.
Figure 30F:
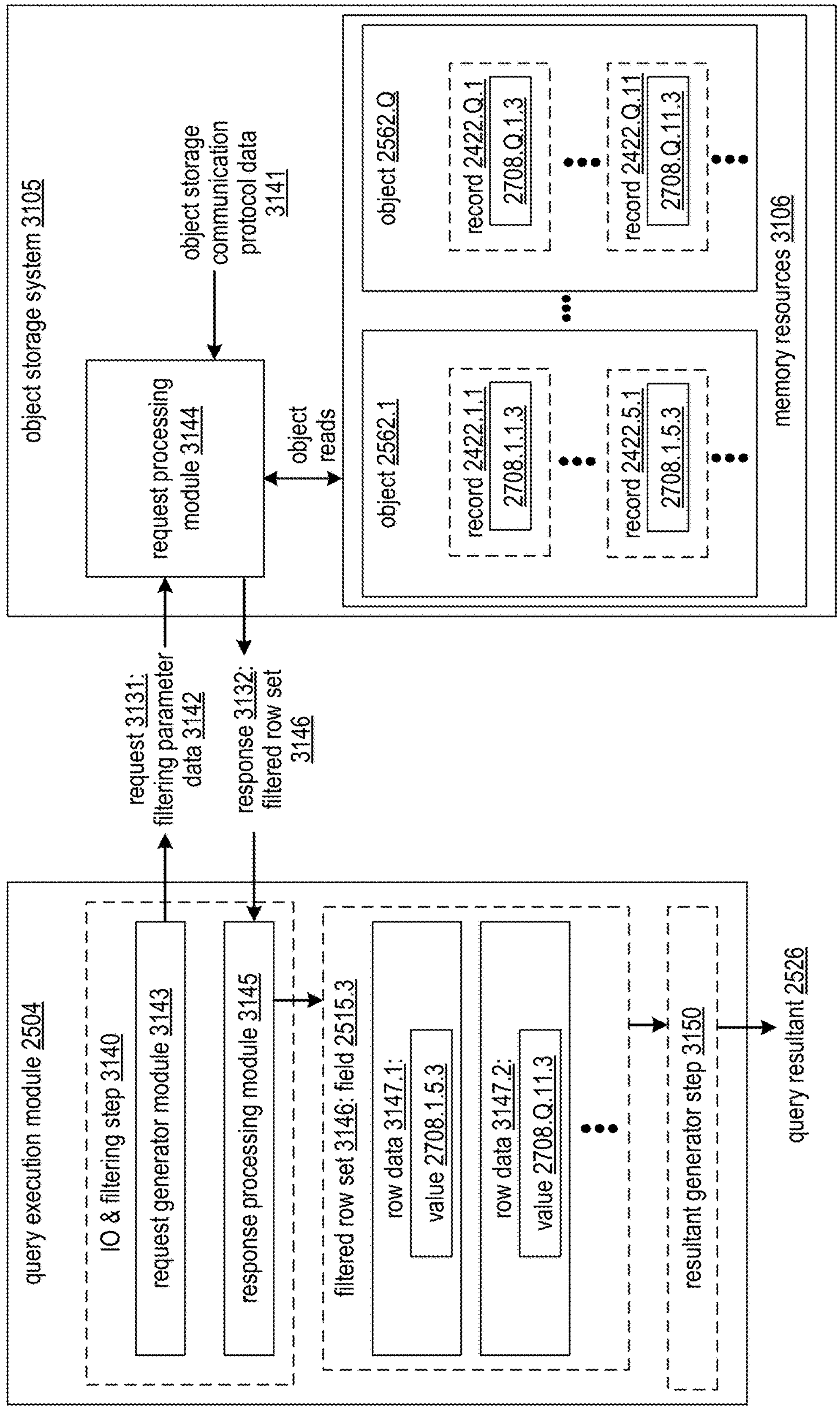
FIG. 30F is a schematic block diagram illustrating query execution based on a query execution module communicating with an object storage system to generate a filtered row set that includes field values of records stored by the object storage system in accordance with various embodiments.

FIG. 30E illustrates such an embodiment where row data 3147 of filtered row set includes some or all of the respective records 2422. FIG. 30F illustrates a particular embodiment where row data 3147 of filtered row set includes some or all values 2708 of the respective records 2422 for the respective field 2515 (e.g. 2515.3). Some or all features and/or functionality of the query execution module 2504 of FIG. 30E and/or 30F can implement the query execution module 2504 of FIG. 28B and/or any embodiment of query execution module 2504 described herein. Some or all features and/or functionality of the filtered row set 3146 of FIG. 30E and/or 30F can implement the filtered row set 3146 of FIG. 28B and/or any embodiment of filtered row set 3146 described herein.

In some embodiments, the implementation of row data 3146 as values 2708 is always implemented by object storage system 3105 in generating responses 3132. In some embodiments, the implementation of row data 3146 as location data and/or row identifier is always implemented by object storage system 3105 in generating responses 3132.

In some embodiments, how the row data is implemented is determined on a query by query basis, for example, by the query execution module 2504, or by the object storage system 3105. The decision made by query execution module 2504 can be communicated to the object storage system 3105 in the request and/or the decision made by object storage system can be communicated to the query execution module 2504 in response 3132, for example, in accordance with corresponding syntax/keywords of object storage communication protocol data 3141. For example, the decision is made automatically on a per-query basis based on: size of the dataset, cardinality of the dataset, expected and/or known number of records meeting filtering parameter data, expected and/or known number of objects storing records meeting filtering parameter data, size of the records, size of the values of a given field requiring sourcing, whether the query requires sourced values for correct execution during any part of the query, a determination/estimate of which means of producing filtered row set 3146 will render faster execution of the query, a determination/estimate of which means of producing filtered row set 3146 will render more memory-efficient execution of the query, current processing and/or memory availability of object storage system 3105 or query execution module 2504, or other factors.

Figure 30G:
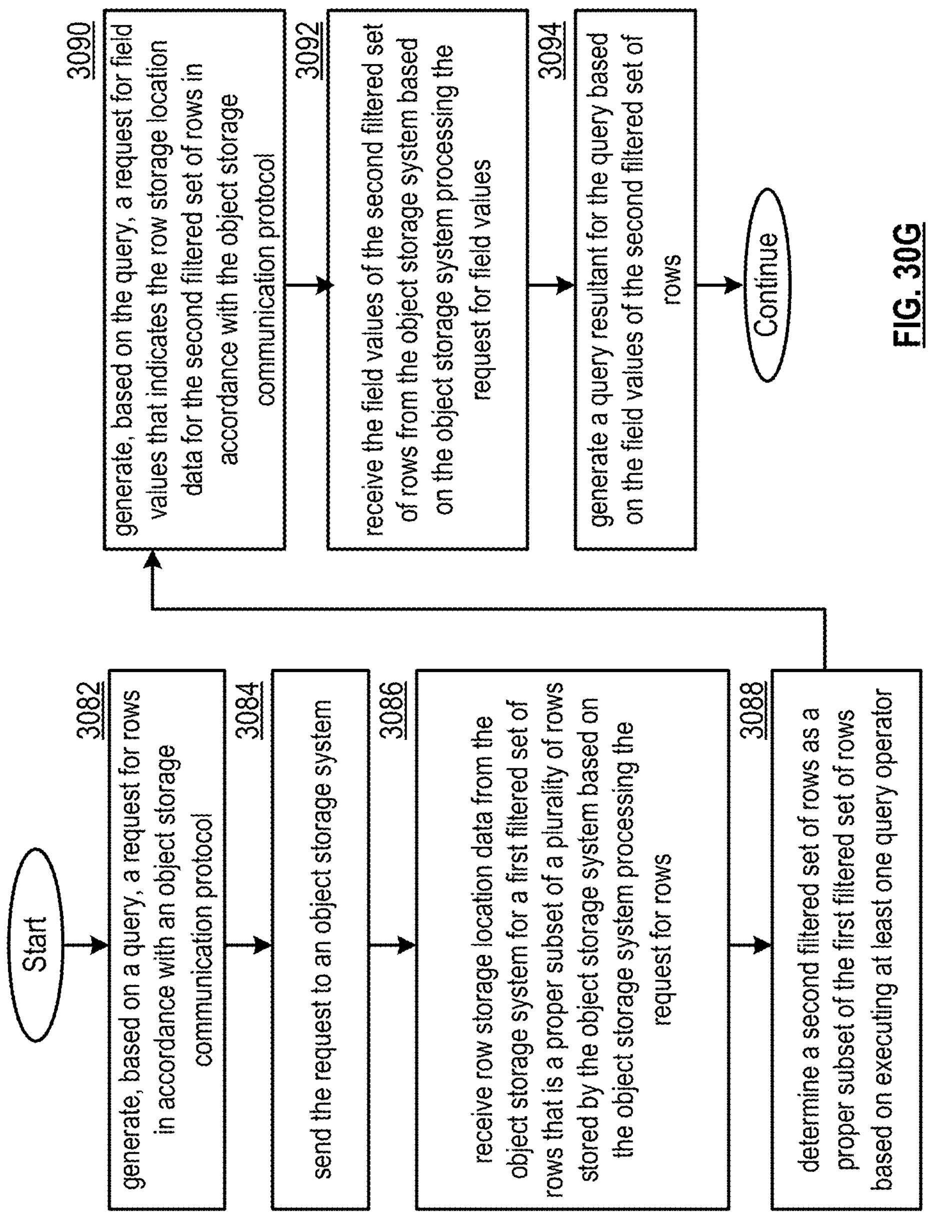
FIG. 30G is a logic diagram illustrating a method for execution in accordance with various embodiments.

FIG. 30G illustrates a method for execution, for example, by a data processing system 3107. For example, the data processing system 3107 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30G. In particular, a node 37 can utilize the query processing module 2435 to execute some or all of the steps of FIG. 30G, where multiple nodes 37 implement their own query processing modules 2435 to independently execute some or all of the steps of FIG. 30G, for example, to facilitate execution of a query as participants in a query execution plan 2405. Some or all of the method of FIG. 30G can be performed by utilizing the query execution module 2504 in accordance with some or all features and/or functionality described in conjunction with FIGS. 30A-30F. Some or all of the method of FIG. 30G can be performed based on communicating with an object storage system 3105. Some or all of the method of FIG. 30G can be performed by the object storage system 3105 instead of the data processing system 3107 based on communication between object storage system 3105 and data processing system 3107. Some or all of the steps of FIG. 30G can optionally be performed by database system 10 and/or any other processing module. Some or all of the steps of FIG. 30G can be performed to implement some or all of the functionality of the data processing system 3107 and/or object storage system 3105 as described in conjunction with FIGS. 30A-30F. Some or all of the steps of FIG. 30G can be performed based on communications exchanged in accordance with an API dictated by object storage communication protocol data 3141. Some or all of the steps of FIG. 30G can be performed to implement some or all of the functionality regarding execution of a query via the plurality of nodes in the query execution plan 2405. Some or all steps of FIG. 30G can be performed in accordance with other embodiments of data processing system 3107 described herein. Some or all steps of FIG. 30G can be performed in conjunction with performing some or all steps of the method of FIG. 29M, and/or any other method described herein.

Step 3082 includes generating, based on a query, a request for rows (e.g. request 3131) in accordance with an object storage communication protocol. Step 3084 includes sending the request to an object storage system. Step 3086 includes receiving row storage location data from the object storage system for a first filtered set of rows (e.g. filtered row set 3146) that is a proper subset of a plurality of rows (e.g. plurality of records 2422) stored by the object storage system based on the object storage system processing the request for rows. Step 3088 includes determining a second filtered set of rows (e.g. further filtered row set 3226) as a proper subset of the first filtered set of rows based on executing at least one query operator. Step 3090 includes generating, based on the query, a request for field values that indicates the row storage location data for the second filtered set of rows in accordance with the object storage communication protocol. Step 3092 includes receiving the field values of the second filtered set of rows from the object storage system based on the object storage system processing the request for field values. Step 3094 includes generating a query resultant for the query based on the field values of the second filtered set of rows.

In various embodiments, any one of more of the various examples listed above are implemented in conjunction with performing some or all steps of FIG. 30G. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30G described above, for example, in conjunction with further implementing any one or more of the various examples described herein.

In various embodiments, a data processing system includes at least one processor and at least one memory that stores operational instructions. In various embodiments, the operational instructions, when executed by the at least one processor, cause the storage system to perform some or all steps of FIG. 30G, for example, in conjunction with further implementing any one or more of the various examples described herein.

In various embodiments, the operational instructions, when executed by the at least one processor, cause the at least one processor to: generate, based on a query, a request for rows in accordance with an object storage communication protocol; send the request to an object storage system; receive row storage location data from the object storage system for a first filtered set of rows that is a proper subset of a plurality of rows stored by the object storage system based on the object storage system processing the request for rows; determine a second filtered set of rows as a proper subset of the first filtered set of rows based on executing at least one query operator; generate, based on the query, a request for field values that indicates the row storage location data for the second filtered set of rows in accordance with the object storage communication protocol; receive the field values of the second filtered set of rows from the object storage system based on the object storage system processing the request for field values; and/or generate a query resultant for the query based on the field values of the second filtered set of rows.

Figure 31A:
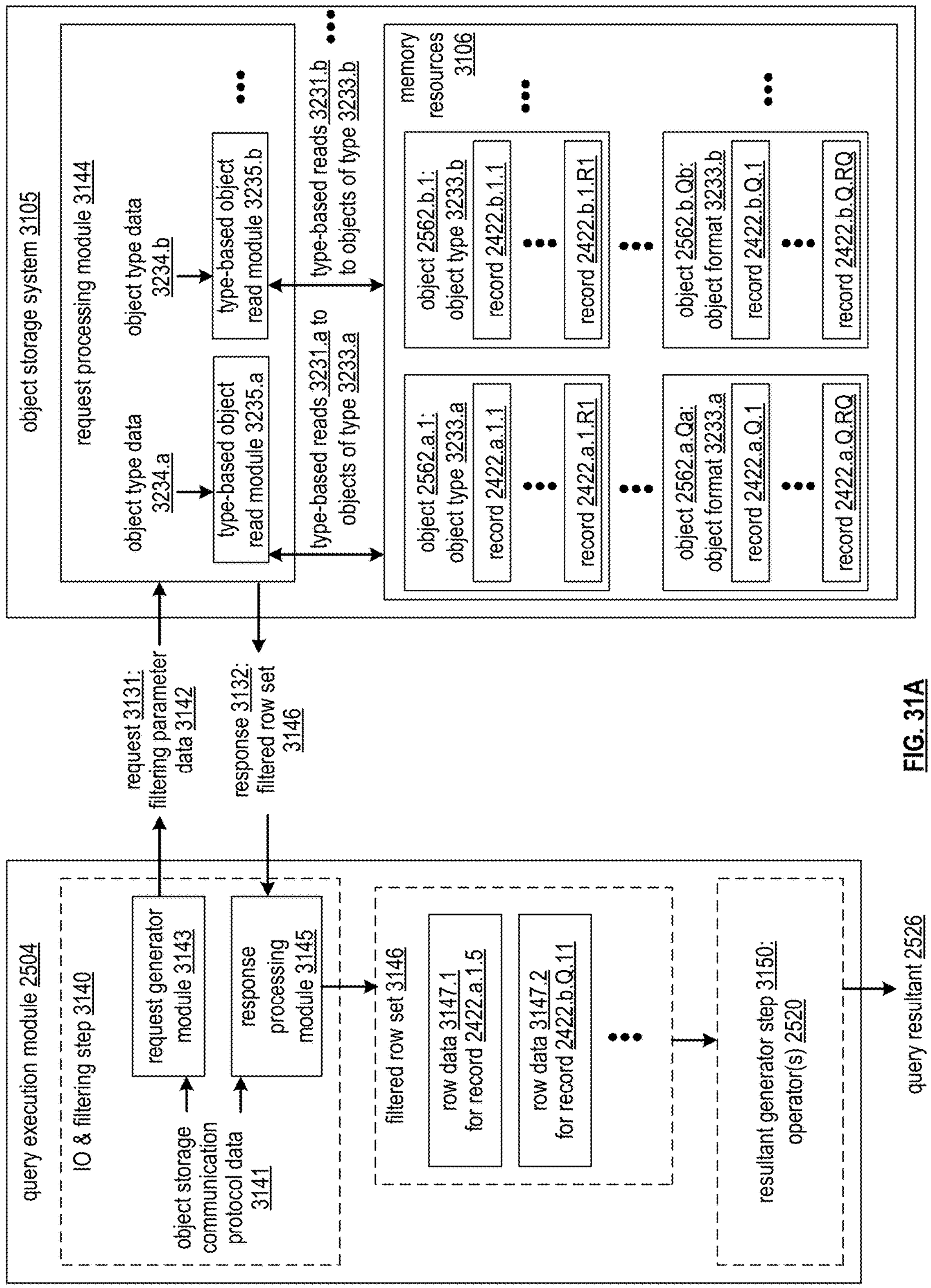
FIG. 31A is a schematic block diagram illustrating query execution based on an object storage system performing type-based reads to multiple types of objects in accordance with various embodiments.

FIG. 31A illustrates an embodiment of object storage system 3105 operable to process a request 3131 based on generating filtered row set 3146 to indicate records 2422 included in different types of objects having different object types 3233. Some or all features and/or functionality of the object storage system 3105 of FIG. 31A can implement the object storage system 3105 of FIG. 28B and/or any other embodiment of the object storage system 3105 described herein. Some or all features and/or functionality of query execution of FIG. 31A can implement the query execution of FIG. 28B and/or any other embodiment of query execution described herein.

In this example, the memory resources 3106 of record storage system 3105 stores a plurality of objects of a plurality of different object types 3233. As illustrated in FIG. 31A, a first plurality of objects 2562.*a*.1-2562.*a*.Qa includes Qa objects of type 3233.*a*, and a second plurality of objects 2562.*b*.1-2562.*b*.Qa includes Qb objects of type 3233.*b*. Any number of additional object types can be implemented by any respective number of additional objects stored in object storage system 3105.

In some embodiments, the set of different object types 3233 of object storage system 3105 includes two or more of: comma-separated values (CSV), Parquet, JavaScript Object Notation (JSON), Avro, Optimized Row Columnar (ORC), Delta, Arrow, Pickle, Feather, hdf5, ASCII, binary, XML or other file formats for data storage. Alternatively or in addition, the set of different object types 3233 includes one or more of: at least one image file format; at least one audio file format; at least one text file format; at least one document file format; at least one video file format; at least one multimedia file format; at least one video game file format; at least one executable program; and/or at least one or any other file format and/or data formatting. Alternatively or in addition, the set of different object types includes at least one of the following file types: JPEG, PNG, GIF, AVI, WMV, MPG, MP3, MP4, WAV, TXT, EXE, and/or ZIP.

Alternatively or in addition, the set of different object types includes multiple custom file types and/or user defined types, for example, specific to different types of data generated by one or more particular data providers.

Alternatively or in addition, the set of different object types can correspond to object type tags that are configured as tags to objects (e.g. in object metadata of the object), where a given tag and/or group of tags specifies/is mapped to the objects type (e.g. denotes its formatting, how records are extractable, type of fields included, means by which the records/particular fields are extractable, etc.)

Alternatively or in addition, the set of different object types includes one or more object types implemented to render some or all functionality described herein, such as objects formatted to store one or more types of index data 2545 (e.g. different types of index structures), objects formatted to store dataset mapping data or any other mapping data described herein, objects formatted to store query resultants 2526 generated by data processing system 3107 having records accessible in future query execution (e.g. as described in conjunction with FIGS. 32A-32E), and/or other formatting employed by objects storing data enabling some or all functionality described herein.

Object type 3233.*a* and 3233.*b* of FIG. 31A can be implemented by any two such formats and/or file types, and/or any other two different formats of respective objects.

Processing a given request 3131 can include accessing multiple objects of different types. For example, the request indicating filtering parameter data 3142 indicating one or more datasets spanning multiple types of objects, and/or otherwise applying to records stored across multiple types of objects.

For example, the request processing module implements a plurality of different type-based object read modules 3235 to read different corresponding types of objects based on corresponding object type data 3234, for example, denoting a structuring of the corresponding type, layout of records within the corresponding type, and/or instructions for extracting records from the corresponding type. A given object read module 3235 can apply the corresponding object type data to perform type-based reads to some or all objects of the respective type as required by the corresponding request 3131. For example, some or all records 2422 of some or all objects of a given type-based object read module 3235 are extracted as discussed previously to determine whether these records meet the requirements of the filtering parameter data, where records meeting the filtering parameter data are denoted by corresponding row data 3147 of filtered row set 3146 as discussed previously.

In this example, filtered row set includes row data 3147.1 for record 2422.*a*.1.5 stored in object 2562.*a*.1 of type 3233.*a*, and further includes row data 3147.2 for record 2422.*b*.Q.11 stored in object 2562.*b*.Qb. of type 3233.*b*. For example, these records are included based on: type-based object read module 3233.*a* accessing at least object 2562.*a*.1 of type 3233.*a* (and/or additional objects of this type) to extract record 2422.*a*.1.5 from object 2562.*a*.1 via a first means of extraction, based on applying the object type data 3234.*a*; and/or type-based object read module 3233.*b* accessing at least object 2562.*b*.1 of type 3233.*b* (and/or additional objects of this type) to extract record 2422.*b*.Q.11 from object 2562.*b*.Qb via a second means of extraction, based on applying the object type data 3234.*b*.

The first means of extraction can be different from the second means of extraction. For example, the first means of extraction can be applied to any object of type 3232.*a* to render correct extraction/reads of its records 2422, but would not render correct extraction/reads of records 2422 stored in object of type 3233.*b* based on these objects being formatted differently. Similarly, the second means of extraction can be applied to any object of type 3232.*b* to render correct extraction/reads of its records 2422, but would not render correct extraction/reads of records 2422 stored in object of type 3233.*a* based on these objects being formatted differently.

As a particular example, 3233.*a* corresponds to the CSV file type and 3233.*b* corresponds to the Parquet file type. Thus, record 2422.*a*.1.5 is included in a CSV file stored as object 2562.*a*.1, while record 2422.*b*.Q.11 is included in a Parquet file stored as object 2562.*b*.Qb. Record 2422.*a*.1.5 can have corresponding row data 3147 included in filtered row set 3146 based on object 2562.*a*.1 being accessed via a type-based read 3231.*a* via the first means of extraction performed by type-based object read module 3235.*a* in accordance with applying object type data 3234.*a* (e.g. indicating formatting of CSV files and/or indicating how records, and/or particular values of particular fields, be extracted from CSV files). Record 2422.*b*.Q.11 can have corresponding row data 3147 included in filtered row set 3146 based on object 2562.*b*.Qb being accessed via a type-based read 3231.*b* via the second means of extraction performed by type-based object read module 3235.*b* in accordance with applying object type data 3234.*b* (e.g. indicating formatting of Parquet files and/or indicating how records, and/or particular values of particular fields, be extracted from Parquet files).

In some embodiments, while different records 2422 stored in different types of objects are optionally indicated in row data of a given filtered row set generated in response to a given request 3131, the type-based reads are optionally not performed. For example, the records are instead identified via access to one or more index structures stored as index data 2546 (e.g. via access to corresponding objects, via one or more different type-based reads to one or more different types of respective indexes). In such cases, the values of one or more fields are optionally never read, for example, based on not being required. In some embodiments, values records stored across various different types of objects are optionally later read as illustrated in FIG. 31A in response to requests 3213 implemented in performing a sourcing step 3246.

In some embodiments, execution of a given query renders filtering records stored across different types of objects that are stored across different storage systems, such as multiple different object storage systems 3105 and/or one or more different other storage systems 3104 (e.g. alternatively or in addition to one or more object storage systems 3105).

For example, one storage system stores data formatted via a first means (e.g. stores a plurality of files of a first type) and another storage system stores data formatted via a second means (e.g. stores a plurality of files of a second type). The different type-based object read modules 3235 are optionally implemented via different respective storage systems storing the respective types. Requests to different storage systems renders receiving filtered row sets denoting records stored via different formatting/different file formats by different storage types.

In some embodiments, different storage systems store some or all data via a formatting/file type that is common with formatting/file type utilized by another storage system. For example, one storage system stores some data formatted via a first means (e.g. stores a plurality of files of a first type) and also other data formatted via a second means (e.g. also stores a plurality of other files of a second file type). Another storage system stores some data formatted via this first means (e.g. stores a plurality of other files of the first type) and also other data formatted via a third means (e.g. also stores a plurality of other files of a third file type). Requests to different storage systems renders receiving filtered row sets denoting records stored via different formatting/different file formats by different storage types, where some types are optionally unique to a given storage system, and/or where some or all types are optionally common across some or all of the different storage systems.

Figure 31B:
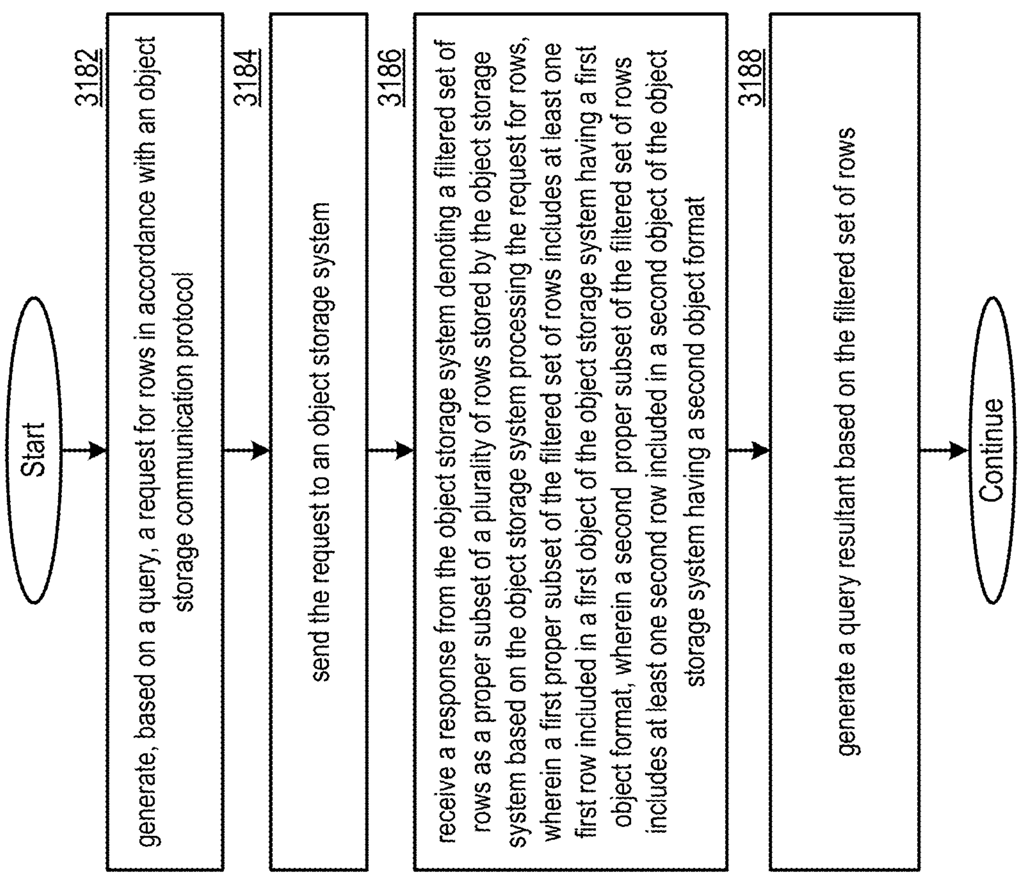
FIG. 31B is a logic diagram illustrating a method for execution in accordance with various embodiments.

FIG. 31B illustrates a method for execution, for example, by a data processing system 3107. For example, the data processing system 3107 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31B. In particular, a node 37 can utilize the query processing module 2435 to execute some or all of the steps of FIG. 31B, where multiple nodes 37 implement their own query processing modules 2435 to independently execute some or all of the steps of FIG. 31B, for example, to facilitate execution of a query as participants in a query execution plan 2405. Some or all of the method of FIG. 31B can be performed by utilizing the query execution module 2504 in accordance with some or all features and/or functionality described in conjunction with FIGS. 31A. Some or all of the method of FIG. 31B can be performed based on communicating with an object storage system 3105. Some or all of the method of FIG. 31B can be performed by the object storage system 3105 instead of the data processing system 3107 based on communication between object storage system 3105 and data processing system 3107. Some or all of the steps of FIG. 31B can optionally be performed by database system 10 and/or any other processing module. Some or all of the steps of FIG. 31B can be performed to implement some or all of the functionality of the data processing system 3107 and/or object storage system 3105 as described in conjunction with FIGS. 30A-30F. Some or all of the steps of FIG. 31B can be performed based on communications exchanged in accordance with an API dictated by object storage communication protocol data 3141. Some or all of the steps of FIG. 31B can be performed to implement some or all of the functionality regarding execution of a query via the plurality of nodes in the query execution plan 2405. Some or all steps of FIG. 31B can be performed in accordance with other embodiments of data processing system 3107 described herein. Some or all steps of FIG. 31B can be performed in conjunction with performing some or all steps of the method of FIG. 29M, FIG. 30G, and/or any other method described herein.

Step 3182 includes generating, based on a query, a request for rows (e.g. records) in accordance with an object storage communication protocol. Step 3184 includes sending the request to an object storage system. Step 3186 includes receiving a response from the object storage system denoting a filtered set of rows (e.g. filtered row set 3146) as a proper subset of a plurality of rows (e.g. records) stored by the object storage system based on the object storage system processing the request for rows. In various examples, a first proper subset of the filtered set of rows includes at least one first row (e.g. a first record 2422) included in a first object of the object storage system having a first object format, and/or a second proper subset of the filtered set of rows includes at least one second row (e.g. a second record 2422) included in a second object of the object storage system having a second object format. Step 3188 includes generating a query resultant based on the filtered set of rows.

In various embodiments, any one of more of the various examples listed above are implemented in conjunction with performing some or all steps of FIG. 31B. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 31B described above, for example, in conjunction with further implementing any one or more of the various examples described herein.

In various embodiments, a data processing system includes at least one processor and at least one memory that stores operational instructions. In various embodiments, the operational instructions, when executed by the at least one processor, cause the storage system to perform some or all steps of FIG. 31B, for example, in conjunction with further implementing any one or more of the various examples described herein.

In various embodiments, the operational instructions, when executed by the at least one processor, cause the at least one processor to: generate, based on a query, a request for rows in accordance with an object storage communication protocol; send the request to an object storage system; receive a response from the object storage system denoting a filtered set of rows as a proper subset of a plurality of rows stored by the object storage system based on the object storage system processing the request for rows, where In a first proper subset of the filtered set of rows includes at least one first row included in a first object of the object storage system having a first object format, and/or where a second proper subset of the filtered set of rows includes at least one second row included in a second object of the object storage system having a second object format; and/or generate a query resultant based on the filtered set of rows.

Figure 31C:
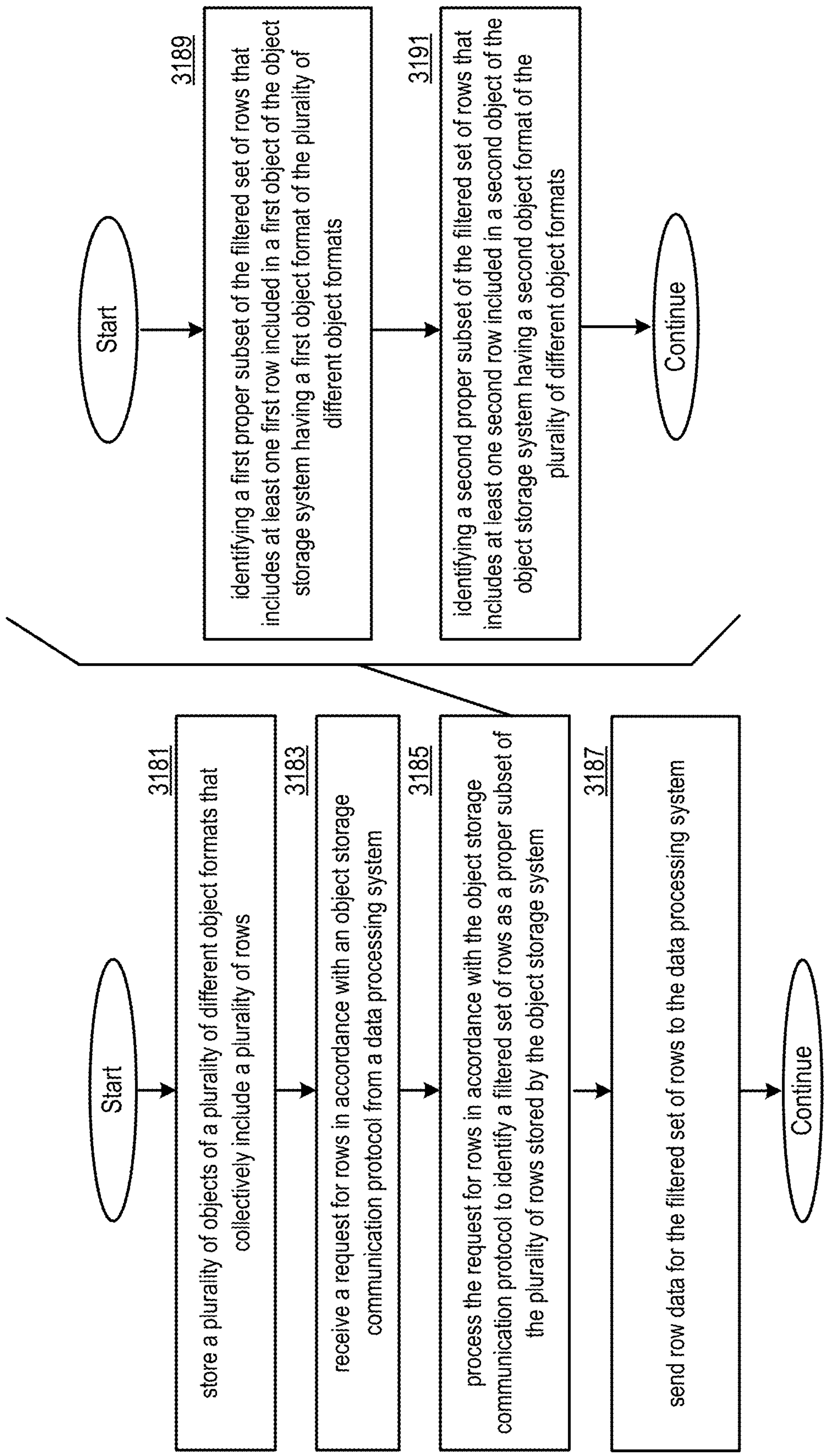
FIG. 31C is a logic diagram illustrating a method for execution in accordance with various embodiments.

FIG. 31C illustrates a method for execution, for example, by an object storage system 3105 and/or a request processing module 3144. For example, the data processing system 3107 can include utilize a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 31C. In particular, a parallelized resource 3050 can implement a corresponding processing module to execute some or all of the steps of FIG. 31C, where multiple parallelized resources 3050 implement their own processing modules to independently execute some or all of the steps of FIG. 31C for example, to facilitate processing of a request 3131 and/or to generate a corresponding response 3132 based on each generating filtered row subsets 3148 that collectively constitute a filtered row set 3146.

Some or all of the method of FIG. 31C can be performed based on communicating with a data processing system 3107, for example, in conjunction with the data processing system 3107 and/or a query execution module 2504 performing some or all steps of FIG. 31B. Some or all of the method of FIG. 31C can be performed by the data processing system 3107 instead of the object storage system 3105 based on communication between object storage system 3105 and data processing system 3107. Some or all of the steps of FIG. 31C can optionally be performed by database system 10 and/or any other processing module. Some or all of the steps of FIG. 31C can be performed to implement some or all of the functionality of the data processing system 3107 and/or object storage system 3105 as described in conjunction with FIG. 31A. Some or all of the steps of FIG. 31C can be performed based on communications exchanged in accordance with an API dictated by object storage communication protocol data 3141. Some or all of the steps of FIG. 31C can be performed to implement some or all of the functionality regarding execution of a query via the plurality of nodes in the query execution plan 2405. Some or all steps of FIG. 31C can be performed in accordance with other embodiments of object storage system 3105 described herein. Some or all steps of FIG. 31C can be performed in conjunction with performing some or all steps of any other method described herein.

Step 3181 includes storing a plurality of objects of a plurality of different object formats that collectively include a plurality of rows (e.g. records 2422). Step 3183 includes receiving a request for rows (e.g. request 3131) in accordance with an object storage communication protocol from a data processing system. Step 3185 includes processing the request for rows in accordance with the object storage communication protocol to identify a filtered set of rows (e.g. filtered row set 3146) as a proper subset of the plurality of rows stored by the object storage system. Step 3187 includes sending row data indicating the filtered set of rows to the data processing system.

Performing step 3185 can include performing step 3189 and/or step 3191. Step 3189 includes identifying a first proper subset of the filtered set of rows that includes at least one first row (e.g. a first record 2422) included in a first object of the object storage system having a first object format of the plurality of different object formats. Step 3191 includes identifying a second proper subset of the filtered set of rows that includes at least one second row (e.g. a second record 2422) included in a second object of the object storage system having a second object format of the plurality of different object formats.

In various embodiments, any one of more of the various examples listed above are implemented in conjunction with performing some or all steps of FIG. 31C. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 31C described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 31C, for example, in conjunction with further implementing any one or more of the various examples described herein.

In various embodiments, the operational instructions, when executed by the at least one processor, cause the at least one processor to: store a plurality of objects of a plurality of different object formats that collectively include a plurality of rows; receive a request for rows in accordance with an object storage communication protocol from a data processing system. process the request for rows in accordance with the object storage communication protocol to identify a filtered set of rows as a proper subset of the plurality of rows stored by the object storage system; and/or send row data indicating the filtered set of rows to the data processing system. Processing the request for rows in accordance with the object storage communication protocol to identify the filtered set of rows as the proper subset of the plurality of rows stored by the object storage system can include: identifying a first proper subset of the filtered set of rows that includes at least one first row included in a first object of the object storage system having a first object format of the plurality of different object formats; and/or identifying a second proper subset of the filtered set of rows that includes at least one second row included in a second object of the object storage system having a second object format of the plurality of different object formats.

Figure 32A:
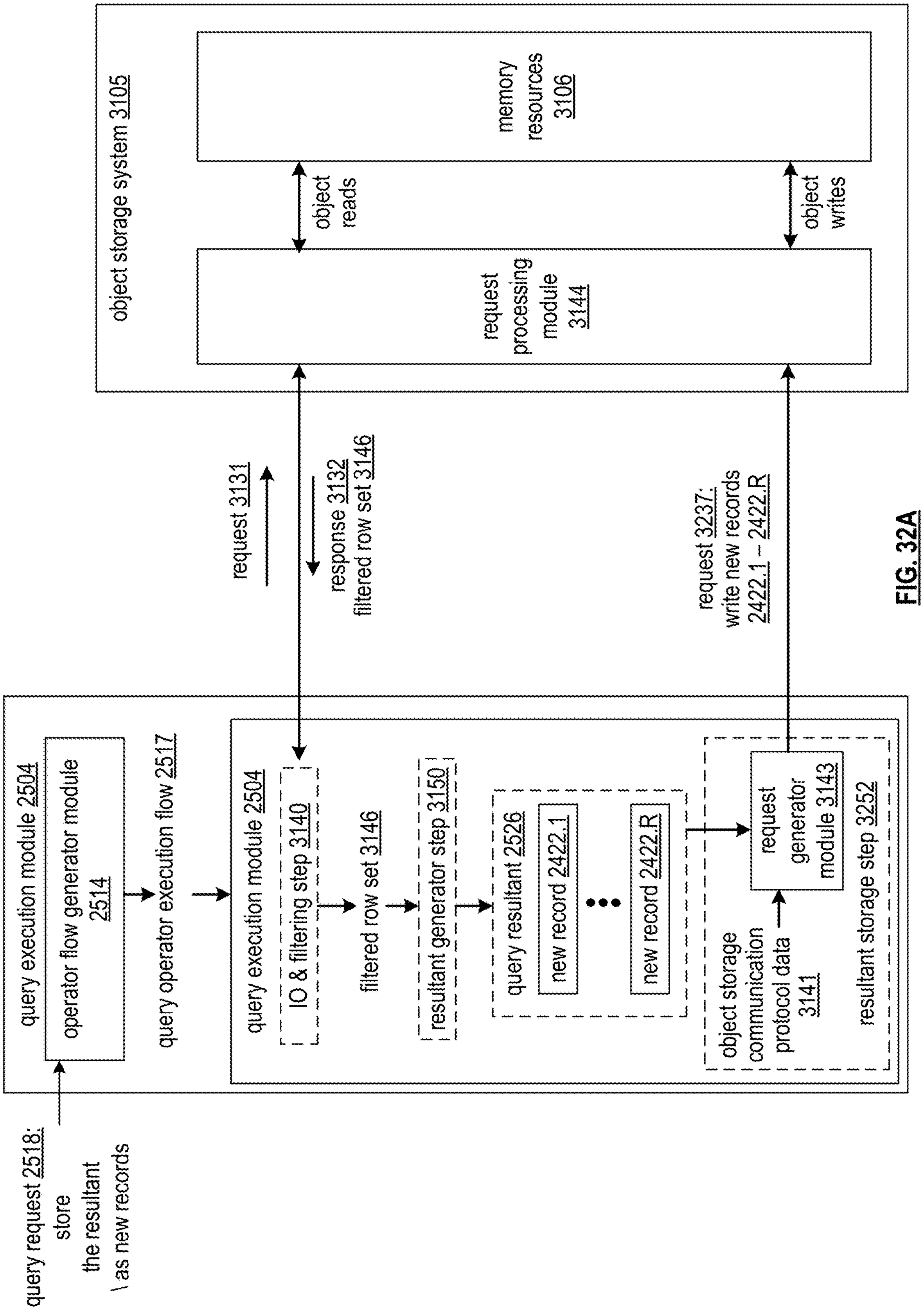
FIG. 32A is a schematic block diagram illustrating query execution based on a query execution module communicating with an object storage system to generate a query resultant of new records for storage in the object storage system in accordance with various embodiments.

FIG. 32A illustrates an embodiment of a query execution module 2504 that performs a resultant storage step 3252 based on generating query resultant 2526 in conjunction with executing a query request indicating that new records included in the query resultant be stored in object storage system. Some or all features and/or functionality of the query execution module 2504 of FIG. 32A can implement the query execution module 2504 of FIG. 28B and/or any embodiment of query execution module 2504 described herein. Some or all features and/or functionality of the object storage system 3105 of FIG. 32A can implement the object storage system 3105 of FIG. 28B and/or any embodiment of object storage system 3105 described herein. Some or all features and/or functionality of the query execution of FIG. 32A can implement the query execution of FIG. 28B and/or any embodiment of query execution described herein.

The query execution module can implement query execution module 2504 can perform resultant storage step 3252 based on implementing request generator module 3143 to generate a corresponding request 3237 indicating a set of new records 2422.1-2422.R of the query resultant 2526 to be written to object storage system. For example, the request 3237 is generated in accordance with syntax/formatting in accordance with the object storage communication protocol data 3141 to indicate this storage request.

The request processing module 3144 can process this request 3137, for example, in accordance with extracting the relevant request and/or new records for storage, for example, in accordance with the object storage communication protocol data 3141 to indicate this storage request. These new records of the resultant can be written to one or more new or existing objects of the object storage system 3105.

Figure 32B:
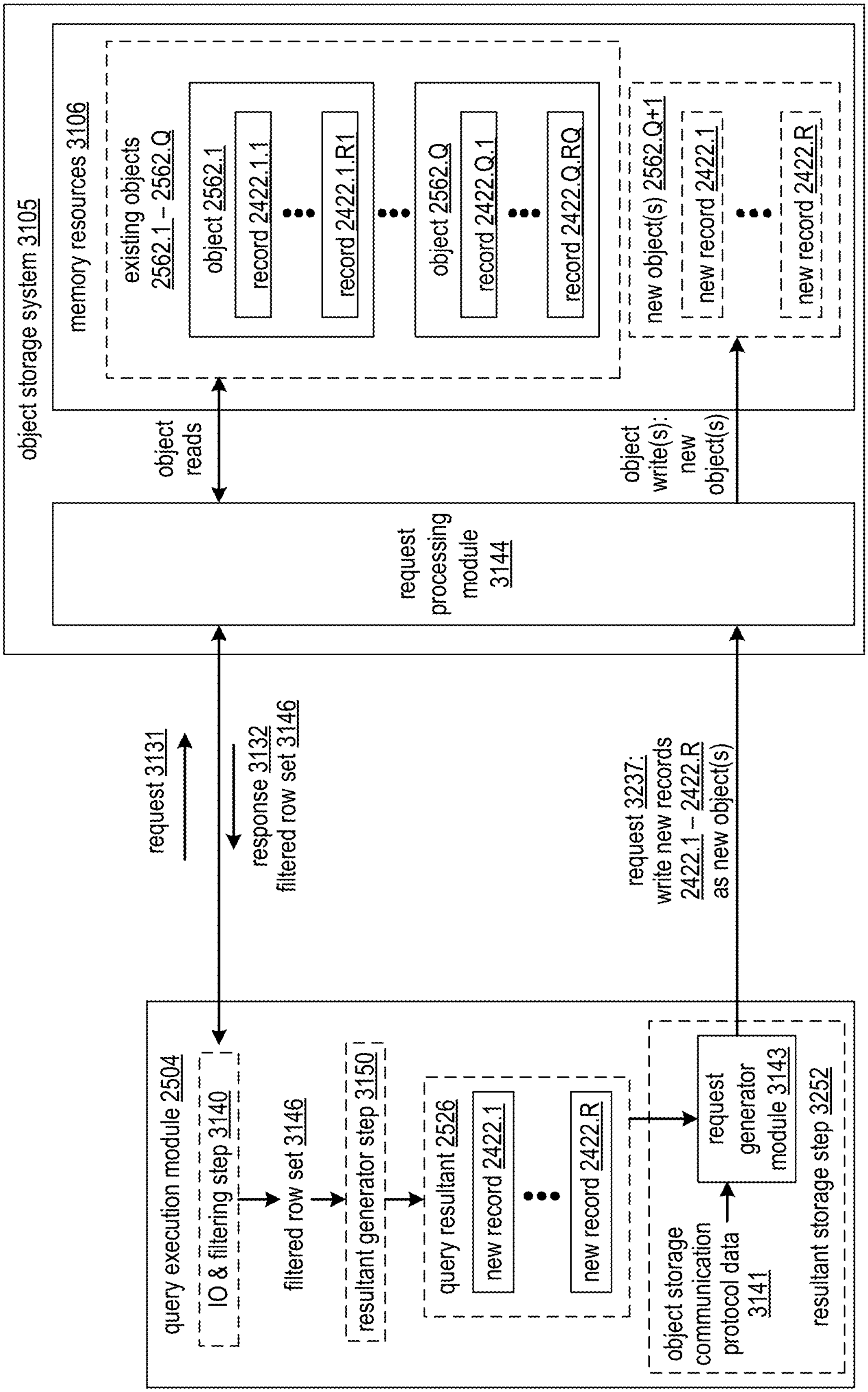
FIG. 32B is a schematic block diagram illustrating query execution based on a query execution module communicating with an object storage system to generate, based on existing object stored in the object storage system, a query resultant for storage as one or more new objects of the object storage system in accordance with various embodiments.

FIG. 32B illustrates an embodiment where these records are written as one or more new objects. The request 3237 can dictate a new object be created from the new records, where the request processing module 3144 creates and stores the new objects accordingly in conjunction with processing request 3237. Alternatively, request 3237 can include the one or more new objects that are first generated by the query processing module 2504 as part of performing the resultant storage step, where the request processing module 3144 stores the received object accordingly in conjunction with processing request 3237.

Figure 32C:
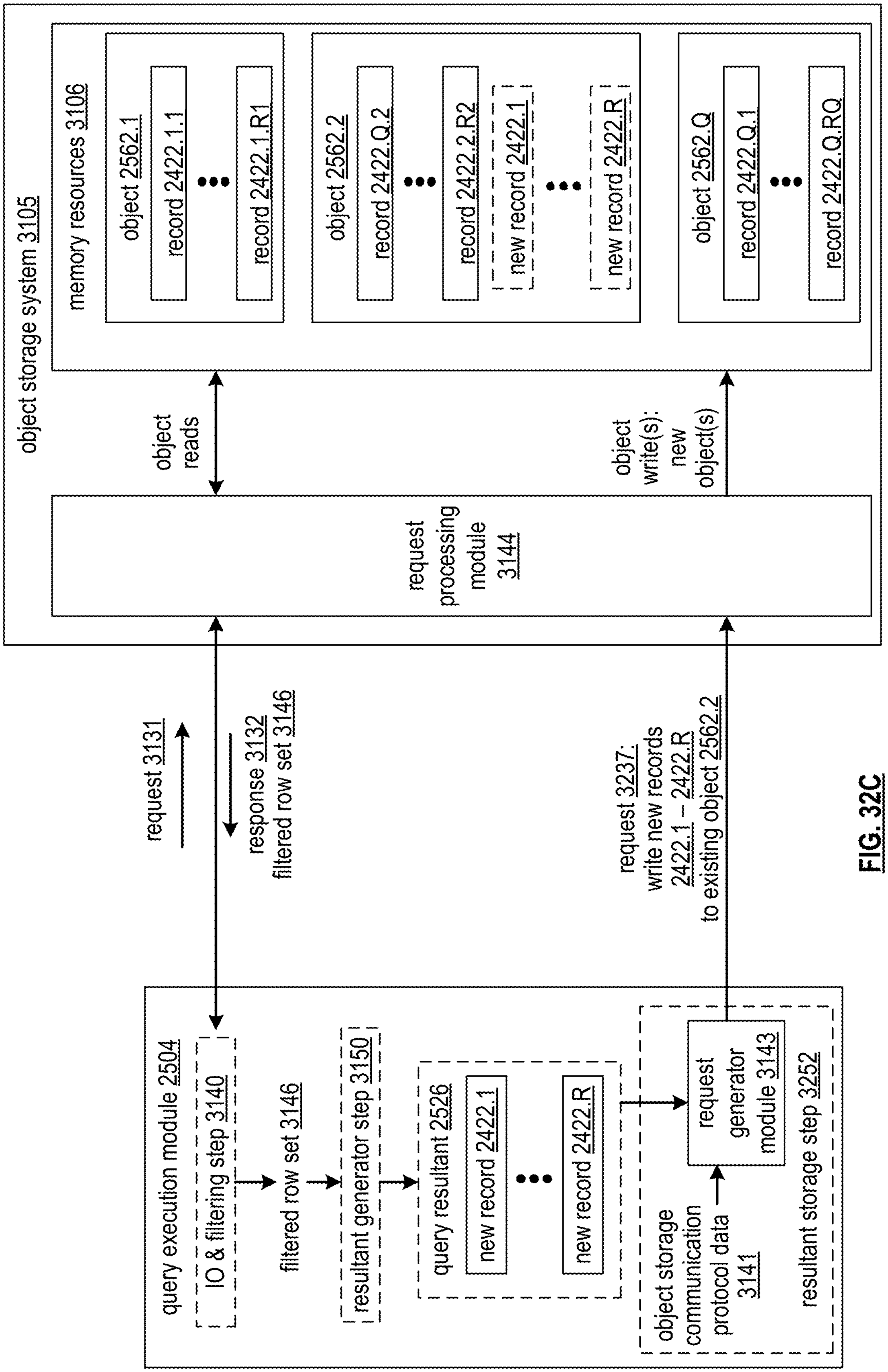
FIG. 32C is a schematic block diagram illustrating query execution based on a query execution module communicating with an object storage system to generate, based on existing object stored in the object storage system, a query resultant for storage within one or more existing objects of the object storage system in accordance with various embodiments.

FIG. 32C illustrates an embodiment where these records are written to one or more existing objects. In cases where the records are written to one or more existing objects, the existing objects are optionally overwritten as a new object that includes both the existing records of the existing object and the new records of the resultant.

In some embodiments, different fields of the resultant 2526 are stored within multiple new objects, where a given record 2422 is stored across multiple new objects, having the same or different file format. In some embodiments, different subsets of new records 2422 of the resultant 2526 are dispersed across multiple new objects. In some embodiments, each new record 2422 of the resultant is written as its own new object. The means by which objects are generated from the resultant/the dispersal of the resultant's records and/or fields across multiple objects can be specified in the request 3237. Alternatively, the query processing module generates all such new objects via its own such dispersal of the resultant's records and/or fields across multiple objects, if applicable, (e.g. based on the query request, other instructions, and/or an automatic determination), where these new objects are sent to the object storage system 3105 in the request 3237.

Subsequent queries processed by data processing system 3107 can render requests 3131 that are processed via accessing the new objects generated to include such resultant data. In such embodiments, a filtered row set generated by object storage system processing a request 3131 of such a future query can include row data indicating one or more of the new records 2422 of this resultant (e.g. via access to new corresponding objects) and/or optionally older, existing records that were stored prior to storing the new records.

For example, a first filtered row set generated by object storage system processing a first request 3131 corresponding to a first query execution can include a first record based on this first record satisfying first filtering parameter data indicated in the first request. A first resultant can be generated from this first filtered row set to include a set of new records that includes a second record. This new set of records can be stored, for example, as a final step of the first query execution. A second filtered row set generated by object storage system processing a second request 3131 corresponding to a second, later query execution can include the first record, and also the second record, based on the first record and the second record satisfying second filtering parameter data indicated in the second request. The second filtering parameter data can be different from the first filtering parameter data. A second resultant can be generated from this second filtered row set to generate a corresponding resultant, which is optionally similarly stored, or is optionally not stored.

Some or all query executions can include such storage of query resultants, for example, based on the request. For example, the query request is implemented as a Create Table as Select (CTAS) query and/or indicates that new records be inserted into an existing table. For example, SQL table can optionally be implemented as a dataset 3211 and/or as part of a dataset 3211. Some query executions alternatively or additionally involve storage of resultants elsewhere (e.g. in one or more other storage system 3104). Some query executions involve no storage of resultants, (e.g. where the resultant is simply sent to the requesting entity, for example, for display to the requesting entity and/or for further processing by the client device of the requesting entity and/or other processing resources of the requesting entity).

In some embodiments, new records are specified to be included in new datasets 3211 and/or existing datasets 3211. In such cases, dataset mapping data denoting which objects store records of various datasets can be automatically updated by the object storage system 3105 as part of processing request 3237. For example, request 3237 indicates which dataset(s) the new records be included in (e.g. in accordance with the object storage communication protocol data 3141) and the request 3237 is thus processed by request processing module 3144 to not only write the new records to one or more new/existing objects, but to also update dataset mapping data (e.g. update the respective object storing this information and/or overwrite this object with a new object that includes the updated information as well as all the old mapping information). In the case where a new dataset (e.g. new table) is generated, schema data for the new dataset (e.g. the set of fields, types of the fields, etc.) is optionally generated/determined and indicated in the dataset mapping data. In the case where dataset mapping data is stored as object metadata of respective objects, the new object or updated object can be generated/updated to include the dataset mapping data denoting which one or more datasets this object has records for as some or all of its object metadata. The new/existing dataset to which new records be allocated can be indicated in the query request.

In some embodiments, the new records are indexed in index data 2545 for use in future queries. In such cases, one or more new index structures can be generated by the object storage system 3105 as part of processing request 3237; and/or one or more existing index structures can be automatically updated by the object storage system 3105 as part of processing request 3237. For example, the request 3237 is processed by request processing module 3144 to not only write the new records to one or more new/existing objects, but to also update index data 2545/generate new index data 2545 (e.g. update the respective object storing this information and/or overwrite this object with a new object that includes the updated information as well as all the old mapping information, or generate a new object storing new index data). In the case where index data is stored as object metadata of respective objects, the new object or updated object can be generated/updated to include the index data indexing its records as object metadata for this object.

In some embodiments, the new records are stored in new objects based on the query processing system generating an object that includes the new records of the query resultant, where the request 3237 includes the new object itself. For example, a file/document containing the new records of the resultant is created by query processing module 2504 as part of the resultant storage step, and this file is sent in request 3237 for storage as a respective new object. The file format for this object can be indicated in the query request (e.g. configured by the end user) and/or can be automatically determined by the query processing module 2504. For example, all new objects storing query resultants are generated in accordance with a same file format, or are formatted differently on a per-query basis, where some query resultants optionally have different formatting from other query resultants. For example, a single file (and/or multiple different files) generated to include the set of multiple records 2422 of a given resultant 2526 can be implemented via a format such as: CSV, Parquet, JSON, Avro, ORC, Delta, Arrow, Pickle, Feather, hdf5, or other file formats for data storage of multiple records. In the case where the resultant is stored across multiple objects, the different objects can be stored in accordance with the same type of file or different types of files (e.g. different fields are stored via different files based on datatype of the different fields).

Figure 32D:
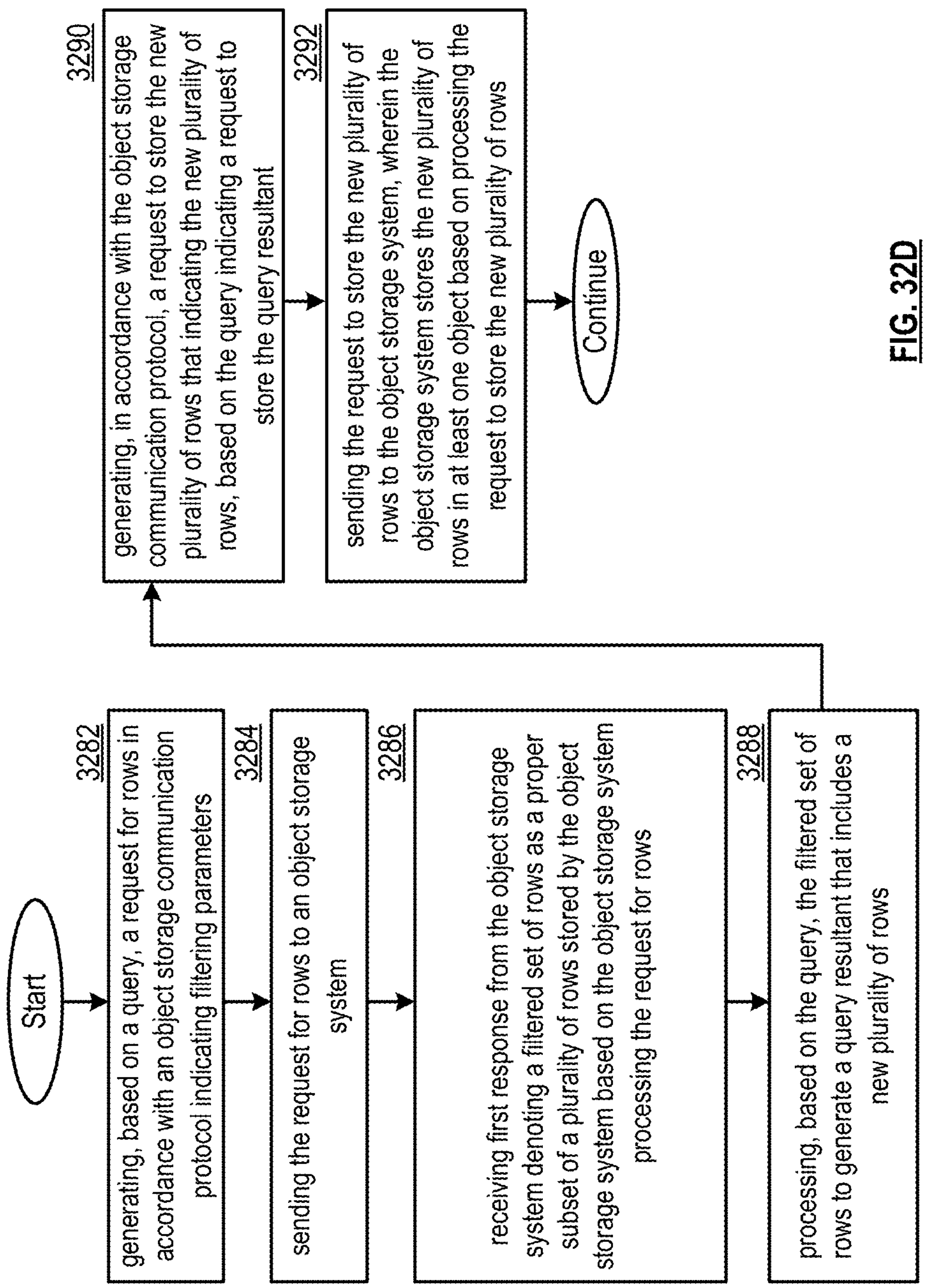
FIG. 32D is a logic diagram illustrating a method for execution in accordance with various embodiments.

FIG. 32D illustrates a method for execution, for example, by a data processing system 3107. For example, the data processing system 3107 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32D. In particular, a node 37 can utilize the query processing module 2435 to execute some or all of the steps of FIG. 32D, where multiple nodes 37 implement their own query processing modules 2435 to independently execute some or all of the steps of FIG. 32D, for example, to facilitate execution of a query as participants in a query execution plan 2405. Some or all of the method of FIG. 32D can be performed by utilizing the query execution module 2504 in accordance with some or all features and/or functionality described in conjunction with FIGS. 32A-32C. Some or all of the method of FIG. 32D can be performed based on communicating with an object storage system 3105. Some or all of the method of FIG. 32D can be performed by the object storage system 3105 instead of the data processing system 3107 based on communication between object storage system 3105 and data processing system 3107. Some or all of the steps of FIG. 32D can optionally be performed by database system 10 and/or any other processing module. Some or all of the steps of FIG. 32D can be performed to implement some or all of the functionality of the data processing system 3107 and/or object storage system 3105 as described in conjunction with FIGS. 32A-32C. Some or all of the steps of FIG. 32D can be performed based on communications exchanged in accordance with an API dictated by object storage communication protocol data 3141. Some or all of the steps of FIG. 32D can be performed to implement some or all of the functionality regarding execution of a query via the plurality of nodes in the query execution plan 2405. Some or all steps of FIG. 32D can be performed in accordance with other embodiments of data processing system 3107 described herein. Some or all steps of FIG. 32D can be performed in conjunction with performing some or all steps of the method of FIG. 29M, FIG. 30G, FIG. 31B, and/or any other method described herein.

Step 3282 includes generating, based on a query, a request for rows (e.g. request 3131) in accordance with an object storage communication protocol indicating filtering parameters. Step 3284 includes sending the request for rows to an object storage system. Step 3286 includes receiving a first response from the object storage system denoting a filtered set of rows as a proper subset of a plurality of rows stored by the object storage system based on the object storage system processing the request for rows. Step 3288 includes processing, based on the query, the filtered set of rows to generate a query resultant that includes a new plurality of rows. Step 3290 includes generating, based on the query indicating a request to store the query resultant, and/or in accordance with the object storage communication protocol, a request to store the new plurality of rows (e.g. request 3227) indicating the new plurality of rows. Step 3292 includes sending the request to store the new plurality of rows to the object storage system. In various examples, the object storage system stores the new plurality of rows in at least one object based on processing the request to store the new plurality of rows.

In various embodiments, any one of more of the various examples listed above are implemented in conjunction with performing some or all steps of FIG. 32D. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 32D described above, for example, in conjunction with further implementing any one or more of the various examples described herein.

In various embodiments, a data processing system includes at least one processor and at least one memory that stores operational instructions. In various embodiments, the operational instructions, when executed by the at least one processor, cause the storage system to perform some or all steps of FIG. 32D, for example, in conjunction with further implementing any one or more of the various examples described herein.

In various embodiments, the operational instructions, when executed by the at least one processor, cause the at least one processor to: generate, based on a query, a request for rows in accordance with an object storage communication protocol indicating filtering parameters; send the request for rows to an object storage system; receive first response from the object storage system denoting a filtered set of rows as a proper subset of a plurality of rows stored by the object storage system based on the object storage system processing the request for rows; process, based on the query, the filtered set of rows to generate a query resultant that includes a new plurality of rows; generate, in accordance with the object storage communication protocol, a request to store the new plurality of rows that indicates the new plurality of rows, based on the query indicating a request to store the query resultant; and/or send the request to store the new plurality of rows to the object storage system, where the object storage system stores the new plurality of rows in at least one object based on processing the request to store the new plurality of rows.

Figure 32E:
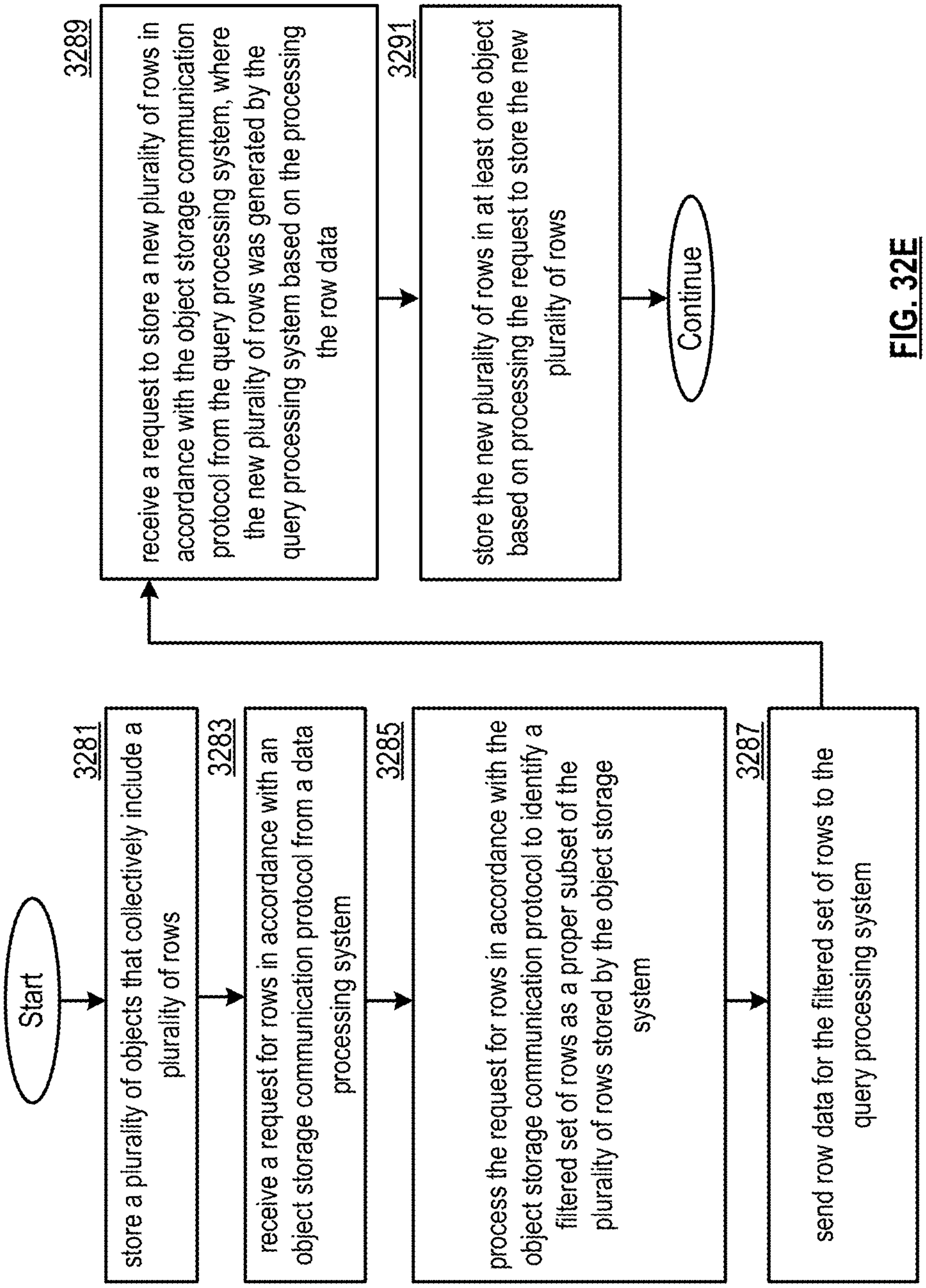
FIG. 32E is a logic diagram illustrating a method for execution in accordance with various embodiments.

FIG. 32E illustrates a method for execution, for example, by an object storage system 3105 and/or a request processing module 3144. For example, the data processing system 3107 can include utilizing a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 32E. In particular, a parallelized resource 3050 can implement a corresponding processing module to execute some or all of the steps of FIG. 32E, where multiple parallelized resources 3050 implement their own processing modules to independently execute some or all of the steps of FIG. 32E for example, to facilitate processing of a request 3131 and/or to generate a corresponding response 3132 based on each generating filtered row subsets 3148 that collectively constitute a filtered row set 3146.

Some or all of the method of FIG. 32E can be performed based on communicating with a data processing system 3107, for example, in conjunction with the data processing system 3107 and/or a query execution module 2504 performing some or all steps of FIG. 32E. Some or all of the method of FIG. 32E can be performed by the data processing system 3107 instead of the object storage system 3105 based on communication between object storage system 3105 and data processing system 3107. Some or all of the steps of FIG. 32E can optionally be performed by database system 10 and/or any other processing module. Some or all of the steps of FIG. 32E can be performed to implement some or all of the functionality of the data processing system 3107 and/or object storage system 3105 as described in conjunction with FIG. 32A-32C. Some or all of the steps of FIG. 32E can be performed based on communications exchanged in accordance with an API dictated by object storage communication protocol data 3141. Some or all of the steps of FIG. 32E can be performed to implement some or all of the functionality regarding execution of a query via the plurality of nodes in the query execution plan 2405. Some or all steps of FIG. 32E can be performed in accordance with other embodiments of object storage system 3105 described herein. Some or all steps of FIG. 32E can be performed in conjunction with performing some or all steps of FIG. 31C, and/or some or all steps of any other method described herein.

Step 3281 includes storing a plurality of objects that collectively include a plurality of rows (e.g. records 2422). Step 3283 includes receiving a request for rows (e.g. request 3131) in accordance with an object storage communication protocol from a data processing system. Step 3285 includes processing the request for rows in accordance with the object storage communication protocol to identify a filtered set of rows (e.g. filtered row set 3146) as a proper subset of the plurality of rows stored by the object storage system. Step 3287 includes sending row data for the filtered set of rows to the query processing system. Step 3289 includes receiving a request to store a new plurality of rows in accordance with the object storage communication protocol from the query processing system. In various examples, the new plurality of rows was generated by the query processing system based on the processing the row data. Step 3291 includes storing the new plurality of rows in at least one object based on processing the request to store the new plurality of rows.

In various embodiments, any one of more of the various examples listed above are implemented in conjunction with performing some or all steps of FIG. 32E. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 32E described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 32E, for example, in conjunction with further implementing any one or more of the various examples described herein.

In various embodiments, the operational instructions, when executed by the at least one processor, cause the at least one processor to: store a plurality of objects that collectively include a plurality of rows; receive a request for rows in accordance with an object storage communication protocol from a data processing system; process the request for rows in accordance with the object storage communication protocol to identify a filtered set of rows as a proper subset of the plurality of rows stored by the object storage system; send row data for the filtered set of rows to the query processing system; receive a request to store a new plurality of rows in accordance with the object storage communication protocol from the query processing system, where the new plurality of rows was generated by the query processing system based on the processing the row data; and/or store the new plurality of rows in at least one object based on processing the request to store the new plurality of rows.

Figure 33A:
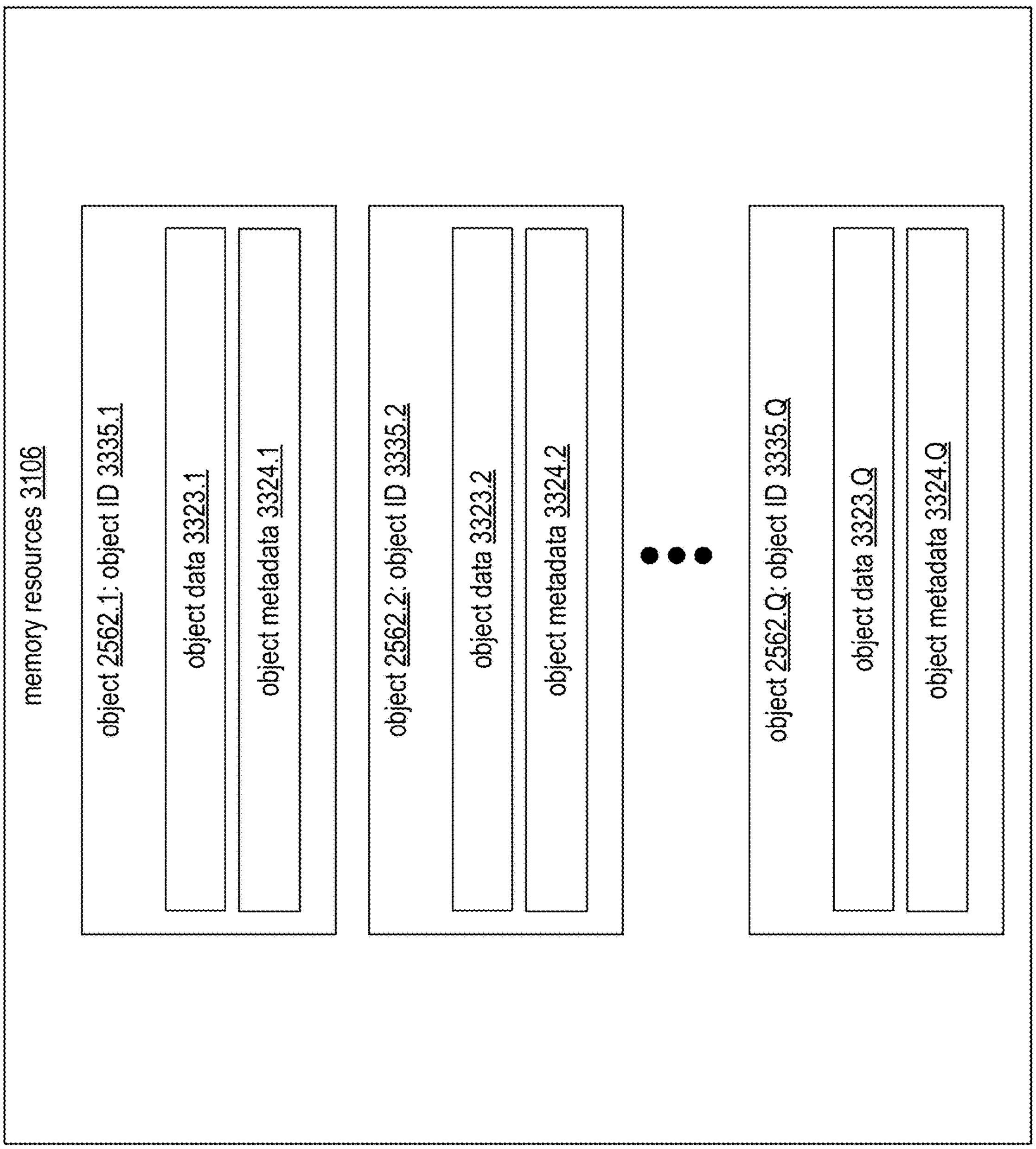
FIG. 33A illustrates a plurality of objects that include object data and object metadata in accordance with various embodiments.

FIG. 33A illustrates a plurality of objects 2562.1-2562.Q stored in memory resources 3106 of an object storage system 3105. Some or all of the plurality of objects 2562 can each have and/or be identified via a corresponding object identifier 3555 (e.g. a name, or other identifier utilized to locate the respective object in memory resources 3106 for access). Alternatively or in addition, some or all of the plurality of objects 2562 can each have object data 3323 (e.g. data corresponding to the content/main information stored by the respective object). Alternatively or in addition, some or all of the plurality of objects 2562 can each have object metadata 3324 (e.g. values of one or more metadata fields describing the object data and/or other characteristics of the respective object). include object data and object metadata in accordance with various embodiments. Some or all features and/or functionality of the objects 2562 of FIG. 33A can implement the plurality of objects of FIG. 28A and/or any embodiment of objects 2562 described herein.

The object metadata 3324 can included system-defined metadata (e.g. fixed and/or autogenerated metadata maintained/generated by object storage system 2562 based on configuration/operations of object storage system 2562). The object metadata 3324 can alternatively or additionally include user-defined metadata (e.g. user defined fields which can be populated to describe various objects).

The object metadata 3324 can include: current date; current time; caching policies (e.g. as a general header field); object presentational information; object size (E.g. in bytes); object type; date/time the object was created; date/time the object was last modified; information regarding specific version of an object (e.g. ETag); encryption information (e.g. whether server-side encryption is enabled); checksum information (e.g. checksum and/or digest of the object); object version (e.g. assigned to objects when added to a bucket); storage class for storing the object; a redirect location to redirect requests for the associated object to another object in the same bucket or external URL; ID of a symmetric encryption key that was used for the object if applicable; an indication of whether server-side encryption with customer-provided encryption keys is enabled; and/or a tag-set for the object (e.g. encoded as URL query parameters), configuration data for the object, configuration data for one or more other objects, and/or other information regarding the object data 3323 and/or other aspects of the object 2562.

Some or all of the metadata 3324 can be automatically generated by the object storage system 3105 and/or request processing module 3144 (e.g. upon creation/storage of the respective object). Some or all of the metadata 3324 can be modified/configured via user input/autogenerated input (E.g. modified/configured by: a user/administrator/employee/engineer/processing system associated with a requesting entity, such as the user/system that requesting queries in query requests 2518); a user/administrator/employee/engineer/processing system associated with a data provider that stores/creates/collects the underlying data stored in object data 3323; a user/administrator/employee/engineer/processing system associated with the request processing system 3144; an administrator/employee/engineer/processing system associated with the API indicated by object storage communication protocol data 3141; a user administrator/employee/engineer/processing system associated with the data processing system 3107, and/or other user/system).

Some or all of the metadata fields (e.g. key value pairs, or other categories, fields of user-defined metadata) included in metadata 3324 can be automatically selected by the object storage system 3105 and/or request processing module 3144 (e.g. upon creation/storage of the respective object). Some or all of the metadata fields can be modified/configured via user input/autogenerated input (E.g. modified/configured by: a user/administrator/employee/engineer/processing system associated with a requesting entity, such as the user/system that requesting queries in query requests 2518; a user/administrator/employee/engineer/processing system associated with a data provider that stores/creates/collects the underlying data stored in object data 3323; a user/administrator/employee/engineer/processing system associated with the request processing system 3144; an administrator/employee/engineer/processing system associated with the API indicated by object storage communication protocol data 3141; a user administrator/employee/engineer/processing system associated with the data processing system 3107, and/or other user/system).

In some embodiments, some or all objects are structured in a different fashion. In some embodiments, the structuring of objects 2562 (e.g. the object identifier 3335, object data 3323, and/or object metadata 3324 of some or all objects 2562 of memory resources 3106) can be in accordance with object structuring of any object storage system. For example, the objects 2562 are structures in a same or similar fashion as objects of the Amazon Simple Storage Service (S3), the Azure Blob storage, the Google Cloud Platform (GCP), the Oracle Cloud Infrastructure Object Storage service, the IBM Cloud Object Storage, and/or other object storage services.

Figure 33B:
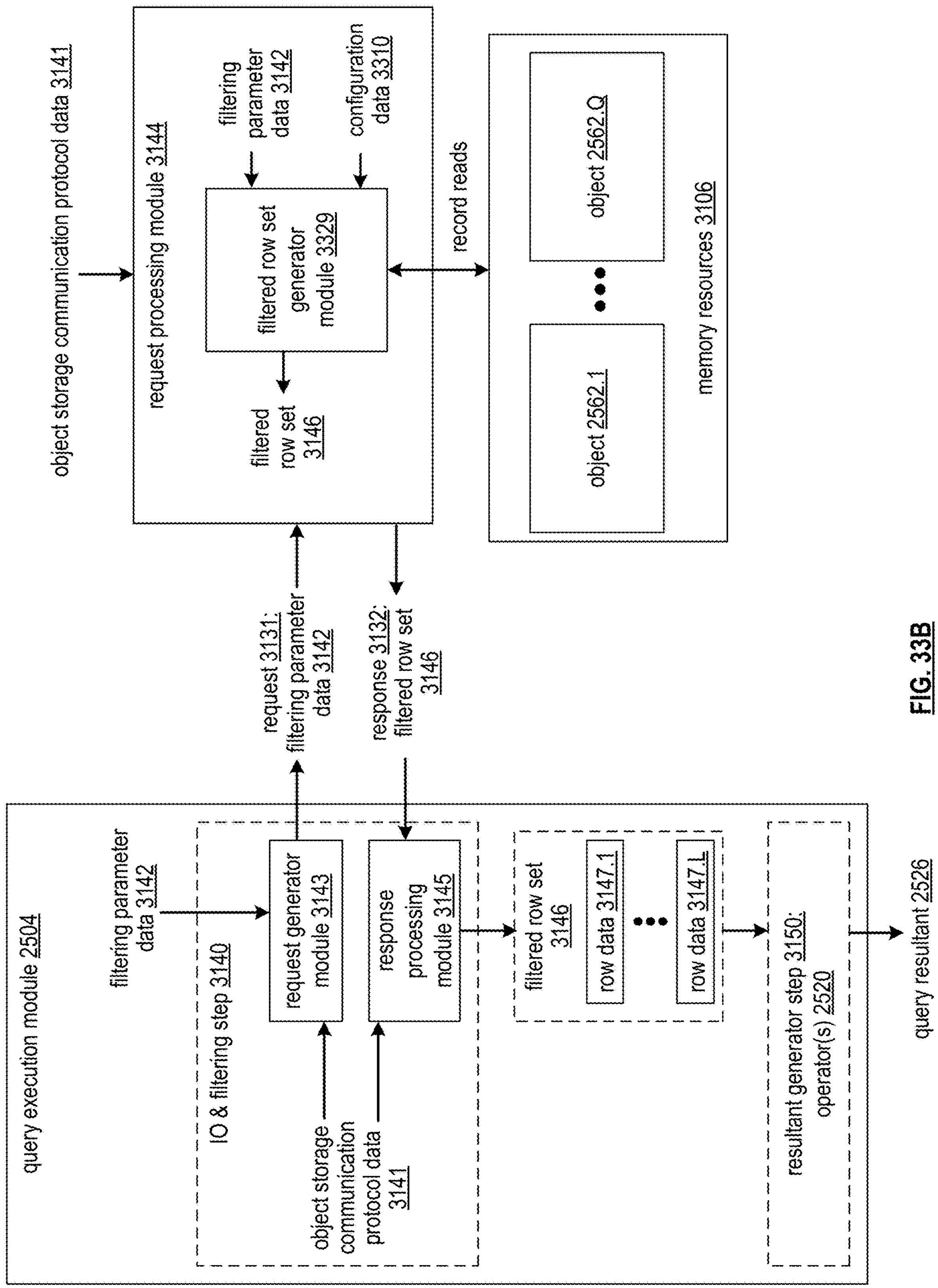
FIG. 33B illustrates a schematic block diagram illustrating query execution based on a query execution module communicating with an object storage system that generates a filtered row set based on configuration data in accordance with various embodiments.

FIG. 33B illustrates a query execution module communicating with an object storage system that generates a filtered row set 3146 for a request 3131 based on configuration data 3310. Some or all features and/or functionality of the data processing system 3107 of FIG. 33B can implement the data processing system 3107 of FIG. 28A and/or any embodiment of the data processing system 3107 described herein. Some or all features and/or functionality of the object storage system 3105 of FIG. 33B can implement the object storage system 3105 of FIG. 28A and/or any embodiment of the object storage system 3105 described herein. Some or all features and/or functionality of the request processing module 3144 of FIG. 33B can implement any embodiment of the request processing module 3144 described herein. Some or all features and/or functionality of the query execution of FIG. 33B can implement the query execution of FIG. 28A and/or any embodiment of the query execution described herein.

In some embodiments, the configuration data 3310 can store data indicating how/where a dataset's records are stored across one or more objects of memory resources, formatting of respective objects, whether the data is indexed in index data 2545, and/or other configuration information describing how various sets of objects of the object storage system are configured to store records of one or more datasets. For example, the configuration data 3310 indicates one or more configurations of records of a dataset being stored within/across/as objects as discussed in conjunction with one or more examples of FIGS. 29A-29L. In some embodiments, configuration data 3310 can store data indicating how records are stored in object data 3323 of various objects 3335, how the object metadata 3324 relates to the storage of records in object data 3323, and/or other information regarding how various object data and/or object metadata is structured.

A filtered row set generator module 3329 can process the filtering parameter data 3142 extracted from the request in conjunction with the configuration data 3310 to determine how the filtered row set 3146 be generated, and to then generate the filtered row set 3146 accordingly. This can include determining, based on the configuration data 3310 and the filtering parameter data 3142: which datasets 3211 are involved, which objects 2562 require access based on which objects store the involved data sets, how the respective records 2422 be extracted from these objects, which fields 2515 need be read, how field values be extracted from respective objects, whether relevant fields are indexed as index data 2545, the type of index structure stored for the relevant field, whether the index data for a field be used instead of/in addition to sourcing values for the given field, whether different portions of the dataset need be accessed via different means based on being stored differently (e.g. in different types of objects as discussed in conjunction with FIG. 31A), whether different portions of the dataset need be processed via different corresponding indexing structures (e.g. different subsets of the dataset are indexed differently and/or some portions of the dataset are indexed and some are not), whether object metadata 3324 of some or all relevant objects need be accessed instead of/in addition to accessing object data 3323 of these objects, and/or other determinations relevant in generating the filtered row set 3146 properly.

Some or all of configuration data 3310 can be processed by filtered row set generator module based on: the configuration data 3310 being stored and accessed in memory accessible by the request processing module 3144; the configuration data 3310 being automatically generated by request processing module in conjunction with processing one or more prior requests (e.g. request to processing incoming data for storage as new objects, where the configuration data is generate/updated in conjunction with storing the new objects in conjunction with processing the request; request to generate/update the configuration data for new/existing objects; etc.); the configuration data 3310 being automatically generated by the object storage system (e.g. to characterize datasets 3211 stored by the object storage system in objects 2562, for example, based on accessing object data 3323 and/or object metadata 3324 for various objects storing records for these datasets 3211); the configuration data 3310 being read from one or more objects 2562 (e.g. from the object data 3323 and/or the object metadata 3324); the configuration data 3310 being configured by a user (e.g. administrator, software engineer, employee, owner, etc.) associated with the object storage system 3105 and/or the request processing module 3144; the configuration data 3310 of at least one dataset being configured by a user (e.g. administrator, software engineer, employee, owner, etc.) associated with a data provider that provided the at least one dataset; and/or the configuration data 3310 otherwise being received, configured via user input, automatically generated, stored, accessed, and/or otherwise determined.

Figure 33C:
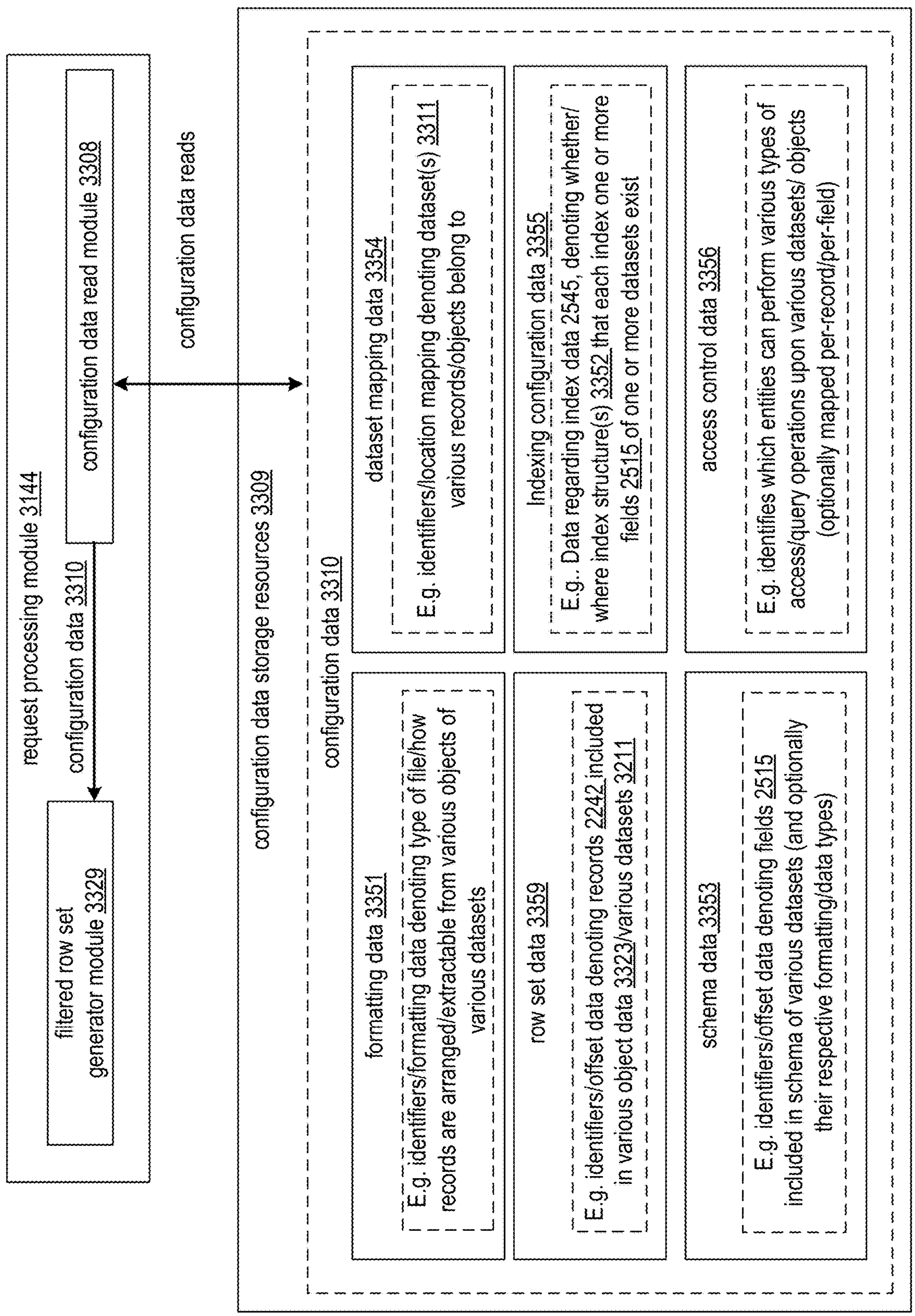
FIG. 33C is a schematic block diagram illustrating configuration data stored in configuration data storage resources that is accessed by a configuration data read module of a request processing module in accordance with various embodiments.

FIG. 33C illustrates example configuration data 3310 that is accessed in configuration data storage resources 3309 by a configuration data read module 3308 of a request processing module 3144. Some or all features and/or functionality of the configuration data 3310 of FIG. 33C can implement the configuration data 3310 of FIG. 33B and/or any other embodiment of the configuration data 3310 described herein. Some or all features and/or functionality of the request processing module 3144 of FIG. 33C can implement the request processing module 3144 of FIG. 33B and/or any other embodiment of the c request processing module 3144 described herein.

The configuration data read module 3308 can access configuration data 3310 (and/or only a portion of the configuration data 3310 as relevant to processing the given filtering parameter data 3142) in configuration data storage resources 3309. The configuration data storage resources 3309 can be implemented via any memory resources accessible by the request processing module 3144, which can be shared with and/or separate from the memory resources 3106 of the object storage system 3105. The configuration data 3310 can be stored in a single memory location and/or can be dispersed across multiple different memory locations implemented as configuration data storage resources 3309.

In some embodiments, the configuration data 3310 can include/indicate formatting data 3351. For example, the formatting data can indicate formatting identifiers and/or information regarding formatting data denoting how various records are arranged in and/or extractable from various objects. As another example, the formatting data can indicate file type/file extensions and/or information regarding file types of different objects storing records. As another example, the formatting data can indicate schemas and/or information regarding how various records are compressed, encoded, encrypted, etc. in respective objects. As another example, the formatting data can indicate a mapping of tags to respective formatting, where the tags implemented via object tagging, and are thus included in object metadata of respective objects having the respective formatting. The formatting data can optionally include a mapping of different objects 2562 to respective formatting data (e.g. file type of different objects, how the data is compressed/encoded/encrypted, and/or information regarding how their data is extractable). Different objects can be formatted differently to store respective sets of records/portions of one or more records in a different arrangement/structuring. In some embodiments, the formatting data 3351 can indicate/be based on object type data 3234 of different objects (e.g. the object type data 3234 of each object accessed FIG. 31A is determined based on the configuration data 3310, and the correct type-based read module 3235 is selected for accessing each relevant object based on the configuration data 3310).

Alternatively or in addition, the configuration data 3310 can include/indicate row set data 3352. For example, the row set data can indicate record identifiers, offset data 3179 corresponding to various records, object identifiers 3335 indicating which object various records are stored within, location data 3210 indicating where various records are stored, row data 3147 for various records, and/or other information. The row set data can optionally map individual records to datasets and/or to objects in which they are included. The row set data can indicate how/whether various rows are access controlled; how/whether various rows are indexed; and/or other information. The row set data can optionally map individual records to data providers that generated/sent the respective records for storage.

Alternatively or in addition, the configuration data 3310 can include/indicate schema data 3353. For example, the schema data can indicate identifiers and/or offset data denoting fields 2515 included in the schema of one or more datasets. This can indicate the set of fields for a given dataset (e.g. their ordering, respective names/identifiers/etc.); how the fields are stored/formatted with objects; what type of data is stored in each field and/or across some or all fields of the given record (e.g. geospatial data vs. machine learning models, etc.); the datatype of each field (e.g. int vs. char vs. string etc.); whether each field is fixed length or variable length; size of each fixed length field; how/whether various fields are access controlled; how/whether various fields are indexed; whether various fields are compressed/encoded/encrypted; whether various fields store reference to values stored elsewhere (e.g. object identifiers for the underlying data in the same or different object storage system 3106, identifiers for the underlying data in another storage system 3104, memory reference in other memory for access of the underlying data, key values for uncompressed values stored in a compression dictionary, etc.); and/or other information.

Alternatively or in addition, the configuration data 3310 can include/indicate dataset mapping data 3354. For example, the dataset mapping data indicates which datasets various objects/various records belong to. This can include a mapping of dataset (e.g. by name/identifier) to object identifiers denoting, for each respective dataset, all objects storing records of the respective dataset. In some embodiments, the set of objects included in a given dataset are denoted via object tagging, where a given tag denotes a given dataset, and where all objects that include records of the given dataset are assigned the respective tag in their object metadata. Datasets can alternatively or additionally be mapped to corresponding schema data, access control data, data provider, indexes, and/or row identifiers for rows included. A given dataset 3211 can correspond to a database table, a set of records/files that are grouped based on being generated by a same provider and/or otherwise being grouped in a same set of data based on other criteria (e.g. size, age, type of file/record; data provider, etc.) A given dataset can have multiple sub-groupings (e.g. a dataset is all data from a data provider, which includes many database tables and/or many different types of files).

Alternatively or in addition, the configuration data 3310 can include/indicate indexing configuration data 3355. For example, the indexing configuration data includes information regarding various index data 2545. This can include a mapping of which fields have corresponding index structures; a mapping of which objects are indexed objects vs. unindexed objects for a given dataset; a mapping of different subsets of records/objects of a same dataset that are indexed differently (e.g. have different set of fields indexed, have different types and/or separate index structures for a same field, etc.). The indexing configuration data 3355 can further indicate, for various index structures of the object storage system, where each index structure is stored (e.g. memory location data, an object identifier for a corresponding object storing the index structure, memory reference/offset/other location data locating the index structure in other memory resources; etc.), an index structure type of each index structure, whether each index structure is a probabilistic index structure or non-probabilistic index structure, etc. The indexing configuration data can further indicate performance data for various indexes and/or indication of whether the respective field/records/objects are candidates for reindexing (e.g. via automatic selection of a more optimal indexing scheme to render greater filtering and/or faster generation of filtered row sets, etc.). The indexing configuration data 3355 can optionally store some or all of the indexing data 2545 directly, where index data 2545 is optionally accessed within the configuration data. Alternatively, the index data 2545 is stored separately from the configuration data 3355 (e.g. in different memory locations and/or via different memory resources).

Alternatively or in addition, the configuration data 3310 can include/indicate access control data 3356. For example, the access control data includes information regarding which entities (E.g. which types of users/which set of user identifiers) can perform various types of access/query operations upon various datasets, various objects, various individual records, various individual fields, etc. For example, a given requesting entity and/or given user category that dictates access for all users within this access category can be mapped to access control data indicating the given user's/user category's permissions to write/modify/read various datasets, various objects, various individual records, various individual fields, etc. Some datasets, objects, individual records, individual fields, etc. can have permissions applied across all users. The access control data is optionally enforced by request processing module 3144 when performing various requests, such as when generating filtered row sets, where some requests are rejected/not performed in their entirety by request processing module 3144 when access control data denotes the respective operation is not allowed.

Some or all of these portions of configuration data illustrated in FIG. 33C can be included in/derivable from other ones of these portions rather than being stored/written separately. Some or all of these portions can be stored separately/differently. Some or all of these portions can otherwise collectively be indicated by configuration data 3310. The configuration data 3310 optionally does not store/indicate some or all of the types of information described above. The configuration data 3310 optionally stores additional information not described above. The configuration data 3310 optionally includes/indicates/is based on any type/category of object metadata that includes the respective information/from which the respective information was derived.

Some or all of this information of configuration data 3310 can be segregated/mapped separately for different datasets, different data providers, different requesting entities, different objects, different fields, and/or different groups/types/categories of: record; object; dataset; index structure; field; requesting entity; data provider.

Figure 33D:
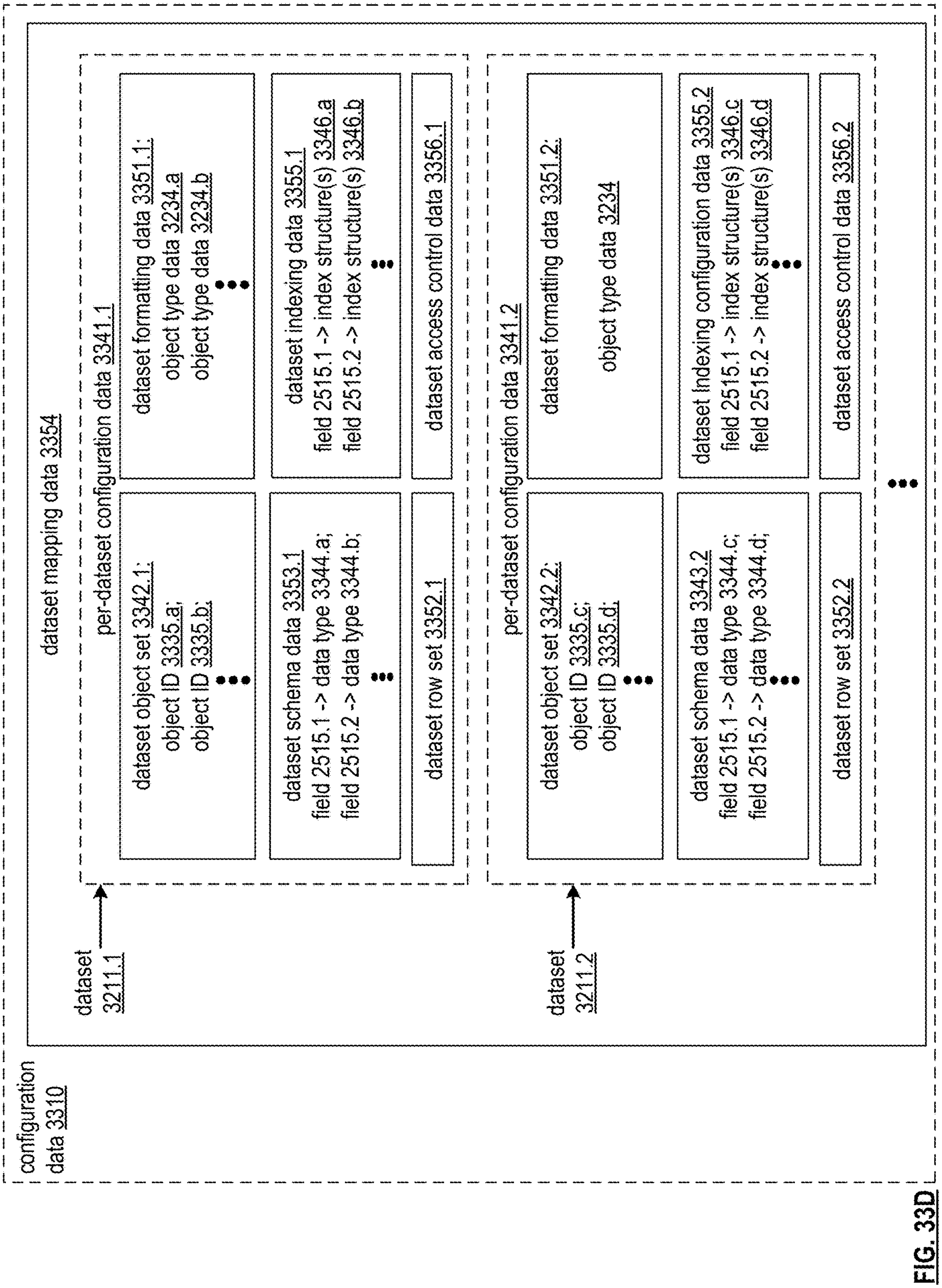
FIG. 33D illustrates dataset mapping data of configuration data that includes per-dataset configuration data for a plurality of datasets in accordance with various embodiments.

FIG. 33D illustrates dataset mapping data 3354 of configuration data 3310 that includes per-dataset configuration data (e.g. 3310.1, 3310.2, and so on) for a plurality of datasets (e.g. 3210.1, 3210.2, and so on). Some or all features and/or functionality of the configuration data 3310 of FIG. 33D can implement the configuration data of FIG. 33B and/or any embodiment of the configuration data 3310 described herein. Some or all features and/or functionality of the dataset mapping data 3354 of FIG. 33D can implement the dataset mapping data 3354 of FIG. 33C and/or any embodiment of the dataset mapping data described herein.

Some or all of the configuration data 3310 of FIG. 33C and/or as described herein can be mapped/maintained at the dataset level, and/or per-dataset configuration data 3341 can otherwise be derivable from the configuration data 3310. Different datasets (e.g. different data providers, different tables/sets of data of same or different data provider, etc.) can have same or different schemas, indexing, access control data, object formatting, etc. The specific configuration of how/where each dataset is stored/indexed/accessible can be denoted in the configuration data 3310.

A dataset of object set 3342 can indicate the objects included in the dataset. For example, a set of object identifiers are mapped to a first given dataset 3210.1 and another set of object identifiers are mapped to a second given dataset 3210.2 denoting which objects store records for which dataset. In some embodiments, object tagging is implemented, where the dataset mapping data 3354 optionally denotes a different dataset tag mapped to each different dataset, where the object set 3342 for a given dataset 3211 optionally denotes which dataset tag is mapped to this given dataset, where the set of object identifiers for a given dataset are derivable based on determining which objects have the dataset tag of the given dataset included in their object metadata 3324. Some objects can be included in multiple dataset object sets based on storing records common to multiple datasets, or storing some records included in one dataset and other records included in another dataset.

Dataset formatting data 3346 for a given dataset can indicate how respective objects of the dataset are formatted based on indicating object type data 3234 for its objects. If multiple types of formatting for objects of the same dataset are employed a mapping of different objects in the dataset to different formatting can be indicated/derivable. In some embodiments, object tagging is implemented, where the dataset formatting data 3351 for a given dataset 3211 optionally denotes a set of formatting tags mapped to different object type data 3234, and where objects having a given object type are tagged with the corresponding formatting tag in their object metadata. Some objects are formatted via multiple object types (e.g. a given file type, a given compression type, a given layout of records within the object, which one or more fields the object corresponds to if records are split across multiple objects, etc.) where a given object is tagged with multiple corresponding tags.

Dataset schema data 3353 of a given dataset is optionally common across the given dataset, where all records of the dataset follow a same schema (e.g. have a same given set of fields and/or other same structuring) dictated by dataset schema data (e.g. list of fields by identifier/name, mapped to their datatype, size, other characteristics/requirements). In some cases, different records of a given dataset fall under multiple schemas, and different objects/records of different schemas can be mapped to their respective schema in the dataset schema data. In some embodiments, object tagging is implemented, dataset schema data 3353 for a given object optionally denotes a set of schema tags mapped to different schemas, and where objects having a given schema are tagged with the corresponding schema tag in their object metadata. In the case where a dataset has exactly one schema, the schema tag can be implemented as the dataset tag, where only one such tag identifying the dataset is required, and where the corresponding schema is mapped to the dataset in the dataset schema data 3353.

Dataset indexing data 3355 of a given dataset can indicate how each field of the dataset is indexed (e.g. if a common schema is applied across the whole dataset). For example, a type/location/other identifying information for the respective index of each field (if applicable) can be denoted in the dataset indexing data. In cases where different records/ objects of a given dataset have one or more fields indexed differently/separately, the dataset indexing data can further map which objects/records are mapped to each index. In the case where different objects of a given dataset have one or more fields indexed differently/separately, object tagging can be implemented, where dataset indexing data 3355 for a given dataset optionally denotes a set of index tags mapped to different indexing schemes applied to different objects (e.g. each indexing schemes denotes which set of fields are indexed and how/where each indexed field is indexed), and where objects having a given indexing scheme are tagged with the corresponding indexing tag in their object metadata. In some cases, if different fields are indexed via different sets of objects rather than a full indexing schema being followed by all of a set of objects (e.g. index 1 indexes field 1 of objects 1, 2, and 3, index 2 indexes field 2 of objects 2 and 3 only, index 3 indexes field 3 of object 1 only), different individual indexes can have corresponding indexing tags (e.g. a given indexing tag denotes that a particular field is indexed via a particular index structure), where the set of indexes applied to records of the object are tagged via a set of corresponding indexing tags in the object metadata of the given object.

The dataset row set 3359 of a given dataset can indicate the full set of records of the dataset. This can be optionally derivable based on the set of objects mapped to the dataset, and/or can otherwise indicate identifiers/locations for records of the dataset. In the case where some objects store records of multiple different objects, the dataset row set 3359 can indicate which records within a given object/given type of object correspond to records of the given dataset (e.g. can indicate location/offset for the relevant records within such objects, and/or instructions for how the relevant records be extracted).

The dataset access control data 3356 of a given dataset can indicate how the records of the given dataset are access controlled. In some cases, different access control schemes are applied to different objects/records/fields of the dataset, and/or are applied to different individual users or groups of users accessing the dataset via requests 3131. Different access control data mapped to different objects/records/fields/users can be further indicated in dataset access control data 3356.

Figure 33E:
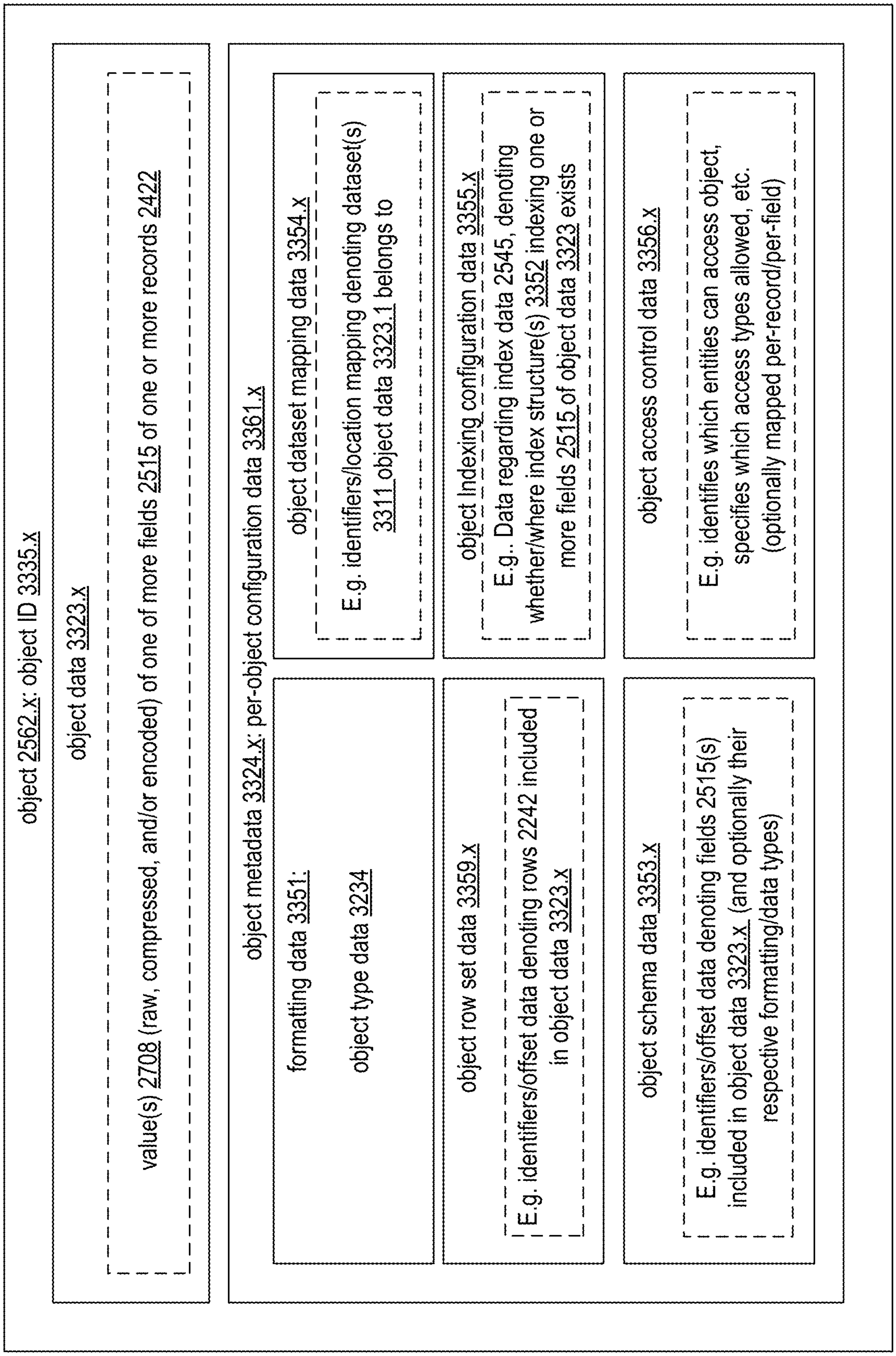
FIG. 33E illustrates an object that includes object metadata that stores per-object configuration data for the object data of the object in accordance with various embodiments.

FIG. 33E illustrates an object 2562 that includes object metadata 3324 that stores per-object configuration data 3310 for the object data 3323 of the object in accordance with various embodiments. Some or all features and/or functionality of the configuration data 3310 of FIG. 33E can implement the configuration data of FIG. 33A and/or any embodiment of the configuration data 3310 described herein. Some or all features and/or functionality of the object metadata 3324 of FIG. 33E can implement the object metadata 3324 of FIG. 33A and/or any other embodiment of the object metadata described herein.

Some or all of the configuration data 3310 of FIG. 33C and/or as described herein can be mapped/maintained at the object level, and/or per-object configuration data can otherwise be derivable from the configuration data 3310. Different objects (e.g. of same of different data providers/of same or different datasets) can have same or different schemas, indexing, access control data, formatting, etc. The specific configuration of a given object can be described in its per-object configuration data 3361.

The per-object configuration data 3361 can optionally indicate which records the object included (e.g. locations, identifiers, etc.), which records correspond to which dataset, which field values are included for each row, where the field values are stored/how they are formatted/how they are extractable; access control applied to the object as a whole; access control applied on a per-record basis or per-field basis (E.g. different access control mapped to different records or fields within the object); which index structures index which fields of the object; whether different subsets of records within the object are indexed differently via different index structures; how the object is formatted (e.g. object type data 3234; file type of the object; how the object as a whole is encrypted, encoded, compressed, etc.); how the records/respective field values are formatted (e.g. their locations within the object, how they are individually compressed/encoded/encrypted); links/identifiers of related objects 2562 (e.g. some or all other objects of the same dataset; objects storing different fields of the same set of records; objects storing additional configuration data 3310; objects storing index structures indexing the records within the object 2562; etc.) and/or other information.

Some or all of the per-object configuration data 3361 of a given object can be included in/derivable from the object metadata 3324 of the given object. The object metadata 3324 across a plurality of objects 2562 can collectively implement some or all of the configuration data storage resources 3309 of FIG. 33C.

Some or all different types/categories of information denoted in object configuration data 3361 of a given object can be indicated via object tagging of the object metadata 3324. For example, the metadata includes a set of tags, and the value of each tag identifies information regarding the corresponding object. One or more tags for various objects can be implemented in the object metadata of these various objects to indicate: the one or more datasets to which the object belongs; the schema for records included in the object and/or one or more individual fields included in the object; the formatting/object type data 3234 of the object; the access control scheme applied to the object; the indexing scheme for records of the object, or one or more individual index structures that index the records included in the object; and/or other information. Some or all different types/categories of information denoted in object configuration data 3361 of a given object can be described via user-defined aspects of the metadata or system aspects of the metadata. Some or all different types/categories of information denoted in object configuration data 3361 of a given object can be described via any structuring/formatting/implementation of object metadata 3324.

Some or all of the per-object configuration data 3361 of a given object can be stored elsewhere alternatively or in addition to being included in object metadata 3324 of the respective objects 2562. Some or all of the per-object configuration data 3361 for one or more objects can be stored in a separate object from these objects (e.g. as object data 3323 of this separate object). Some or all of the per-object configuration data 3361 for one or more objects can be stored in other, non-object memory.

Figure 33F:
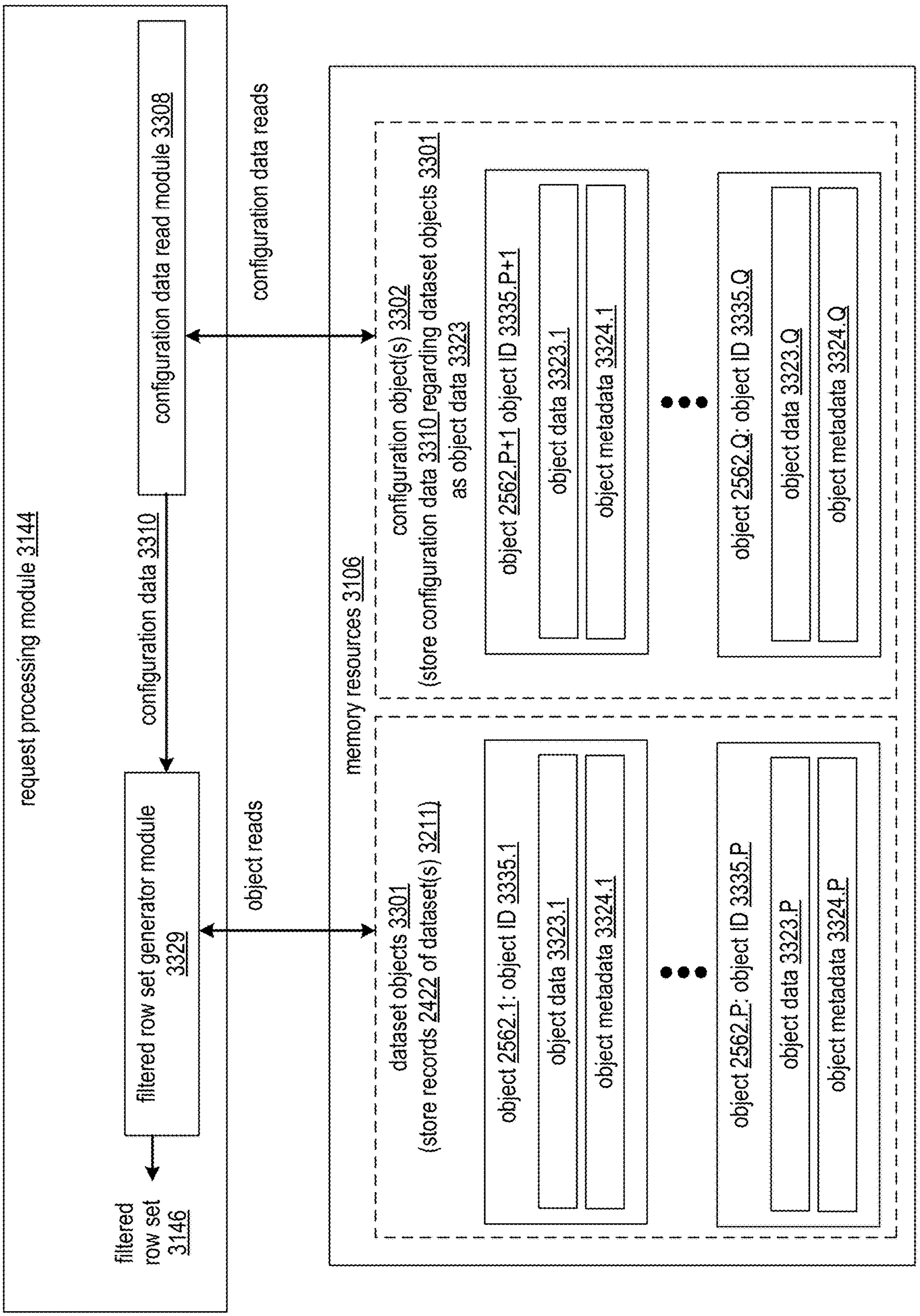
FIG. 33F is a schematic block diagram illustrating access to configuration objects by a configuration data read module of a request processing module in accordance with various embodiments.

FIG. 33F illustrates access to one or more configuration objects 3302 by a configuration data read module 3308 of a request processing module 3144 to extract configuration data 3310 stored in the one or more configuration objects 3302 for use by filtered row set generator module 3329 in generating filtered row set 3146. Some or all features and/or functionality of the request processing module 3144 of FIG. 33F can implement the request processing module 3144 of FIG. 28B and/or any embodiment of the request processing module 3144 described herein. Some or all features and/or functionality of the configuration data 3310 of FIG. 33F can implement the configuration data of FIG. 33B and/or any other embodiment of configuration data 3310 described herein.

Some or all configuration data 3310 can be stored in objects 2562 of the memory resources 3106 of the same or different object storage system 3105. For example, the object storage system 3105 stores a plurality of dataset objects 3301 that includes a first plurality of objects 2562.1-2562.P collectively storing records 2422 of datasets 3211 (e.g. as object data 3323). The same object storage system 3105 can further store a plurality of configuration objects 3302 that includes a second set of objects 2562.P+1-2562.Q (e.g. a single object or multiple objects) collectively storing configuration 2422 of datasets 3211 (e.g. as object data 3323). The request processing module 3144 can thus process requests 3131 based on accessing both configuration objects and dataset objects as illustrated in FIG. 33F. In such embodiments, some or all features and/or functionality of the configuration objects 3302 and/or memory resources 3106 can implement some or all of the configuration data storage resources 3309 of FIG. 33C.

Figure 33G:
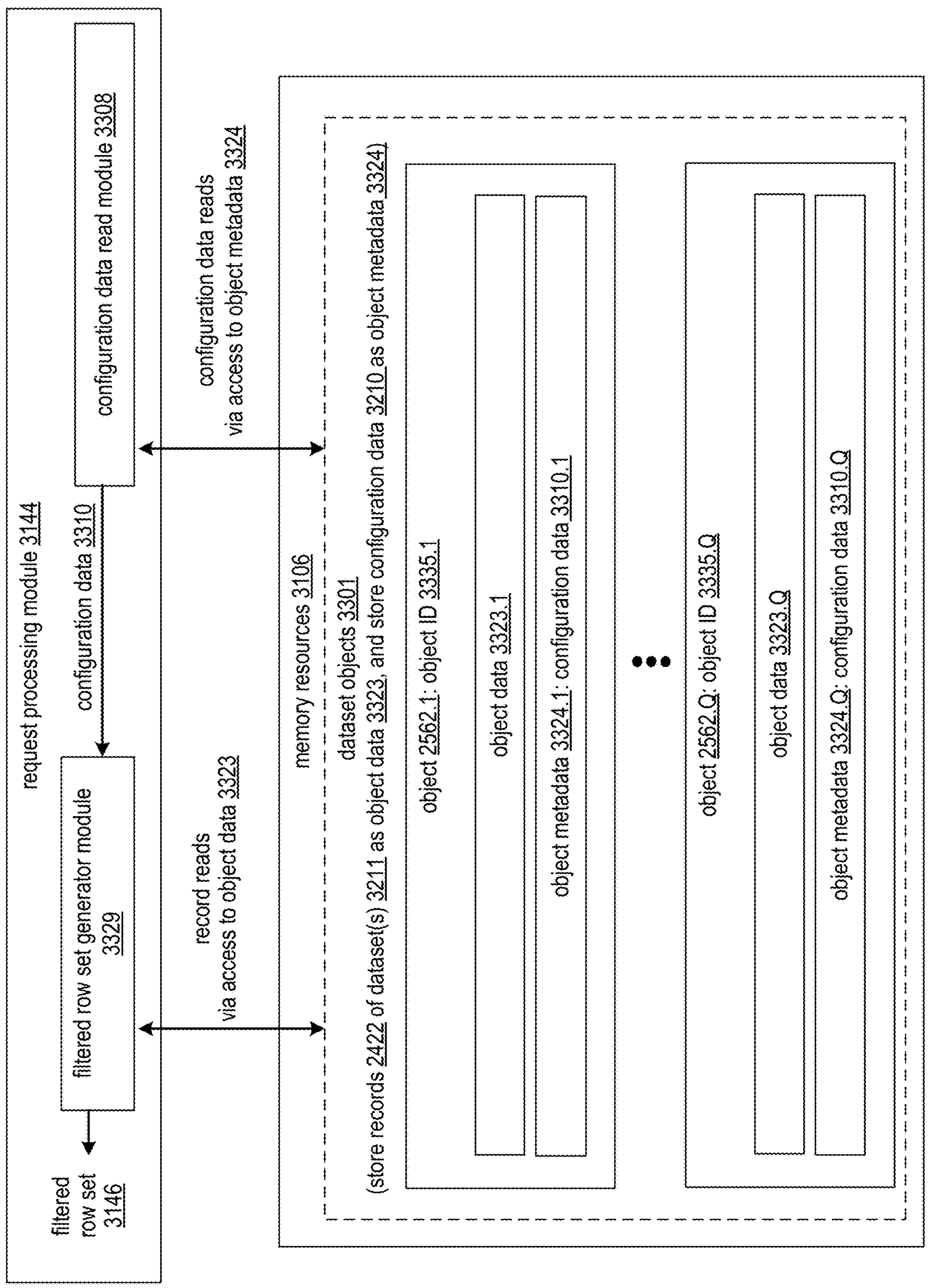
FIG. 33G is a schematic block diagram illustrating access to configuration data by a configuration data read module via access to object metadata in accordance with various embodiments.

FIG. 33G illustrates access to configuration data 3310 by a configuration data read module 3308 via access to object metadata 3324 to extract configuration data 3310 stored in the one or more configuration objects 3302 for use by filtered row set generator module 3329 in generating filtered row set 3146. Some or all features and/or functionality of the request processing module 3144 of FIG. 33G can implement the request processing module 3144 of FIG. 28B and/or any embodiment of the request processing module 3144 described herein. Some or all features and/or functionality of the configuration data 3310 of FIG. 33G can implement the configuration data of FIG. 33B and/or any other embodiment of configuration data 3310 described herein.

Some or all configuration data 3310 can be stored in objects 2562 of the memory resources 3106 as object metadata 3324. In particular the dataset objects 3301 can store records 2422 of various datasets 3211 as object data, and can store corresponding configuration data 3210 as object metadata 3324. For example, the object metadata 3324 of a given object includes per-object configuration data 3361 for the given object as discussed in conjunction with FIG. 33E. A given object 2562 can thus be first accessed by configuration data read module 3308 to extract configuration data 3310 from its object metadata 3324, and can be further accessed by the filtered row set generator module, in accordance with having processed the configuration data 3310, to extract records (e.g. field values) from its object data 3323. In such embodiments, some or all features and/or functionality of the object metadata 3323, dataset objects 3301, and/or memory resources 3106 can implement some or all of the configuration data storage resources 3309 of FIG. 33C.

Figure 33H:
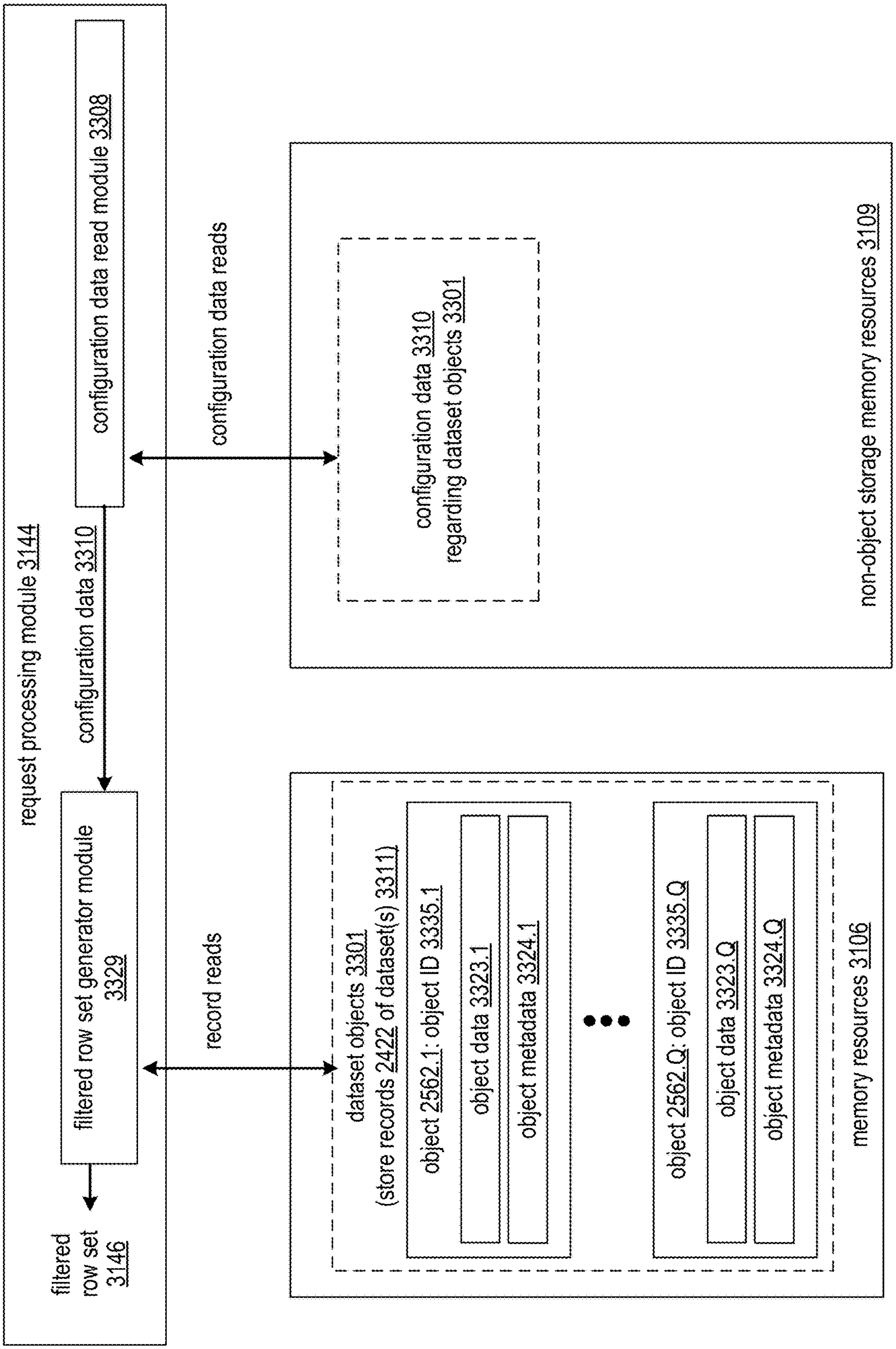
FIG. 33H is a schematic block diagram illustrating access to configuration data stored in non-object storage memory resources by a configuration data read module of a request processing module in accordance with various embodiments.

FIG. 33H illustrates access to configuration data 3310 stored in non-object storage memory resources 3109 by a configuration data read module 3308 of a request processing module 3144 in accordance with various embodiments. Some or all features and/or functionality of the request processing module 3144 of FIG. 33H can implement the request processing module 3144 of FIG. 28B and/or any embodiment of the request processing module 3144 described herein. Some or all features and/or functionality of the configuration data 3310 of FIG. 33H can implement the configuration data of FIG. 33B and/or any other embodiment of configuration data 3310 described herein.

Some or all configuration data 3310 can be stored in memory separate from the memory resources 3108. For example, the non-object storage memory resources correspond to cache memory, local memory, and/or other memory resources that optionally do not store objects, but are still accessible by the object storage system 3105 and/or the request processing module 3144. For example, the non-object storage memory resources 3109 correspond to faster memory resources and/or memory resources more efficient in performing reads of configuration data by request processing module 3144. This can be useful in facilitating faster access of configuration data 3310 to quickly understand the layout of the records across objects to render faster determination of how the filtered row set generator module 3329 generate the filtered row set 3146. Furthermore, the configuration data 3310 can be implemented to be space efficient (for example, in comparison to the vast collection of records across many objects), where local/more IO efficient storage of this information is reasonable. As a particular example, a local Solid State Drive of the API endpoint implementing the request processing module for requests in accordance with the object storage communication protocol data 3141 implements the non-object storage memory resources. Any other type of non-object storage memory resources 3109 can store the configuration data 3310.

In some embodiments, some or all of the configuration data 3310 is optionally stored in at least one other storage system 3104 and/or at least one other object storage system 3105 (different from that storing some or all dataset objects 3302 its data described). In some embodiments, some or all of the configuration data 3310 is optionally stored in multiple locations. In some embodiments, a relevant portion of configuration data 3310 is cached in local and/or faster memory after being retrieved from non-local and/or slower memory (e.g. based on being recent accessed and/or based on requests involving records described in this relevant portion being known/expected to having upcoming high access frequency relative to other records, etc.) where this portion of configuration data 3310 is accessed in processing subsequent requests when relevant. In some embodiments, some or all of the configuration data 3310 is received in at least one request 3131 (and/or any request received, for example, that is structured in accordance with the object storage communication protocol data 3141), where the received configuration data is subsequently stored in configuration data storage resources 3309 and/or where this received configuration data 3131 is processed accordingly (e.g. a request 3131 indicates the filtering parameter data 3142 and also indicates the configuration data 3310 relevant to the filtering parameter data 3142 to enable execution of the request 3131 properly).

Figure 34A:
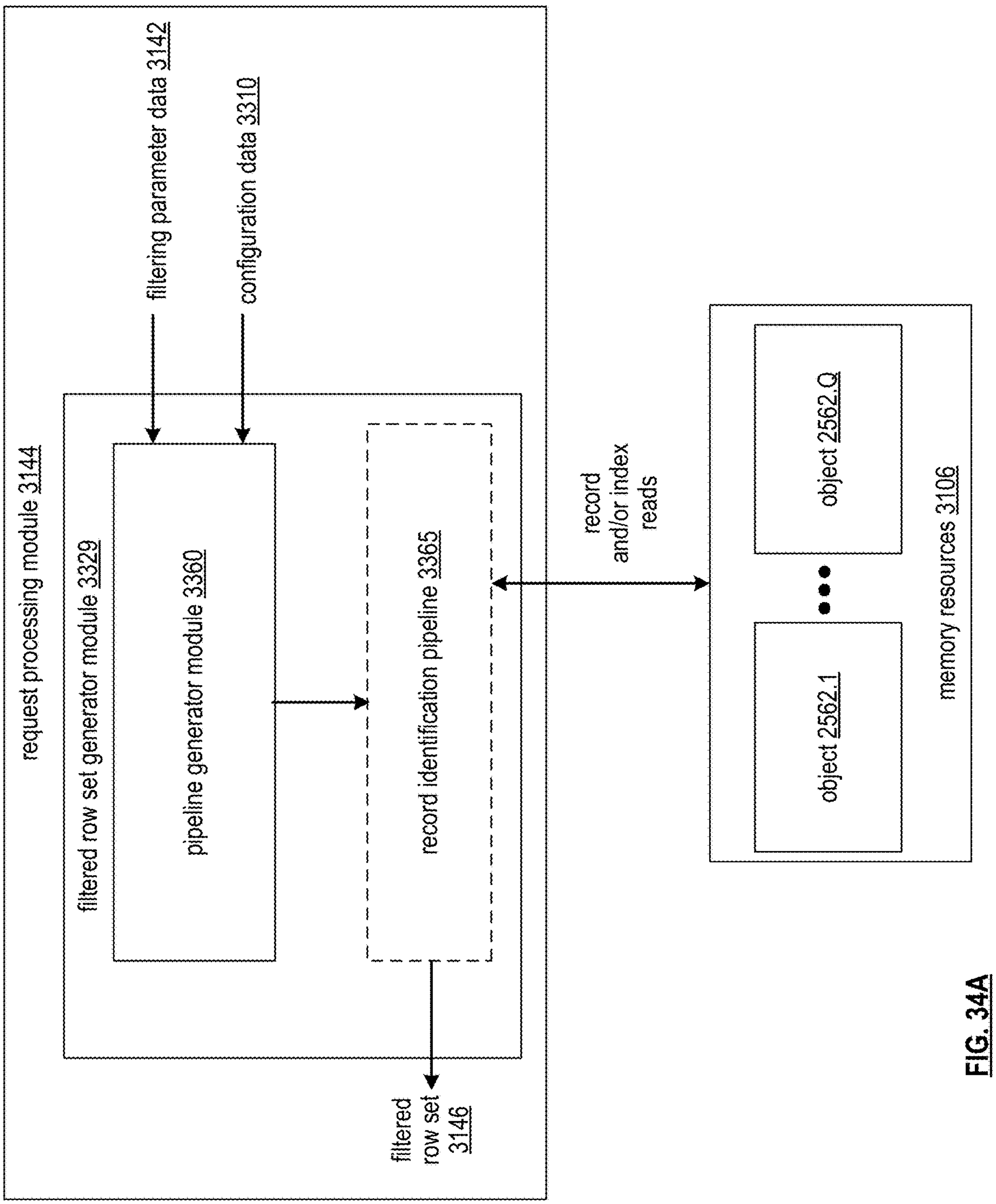
FIG. 34A is a schematic block diagram illustrating generation of a filtered row set by a filtered row set generator module based on executing a record identification pipeline generated by a pipeline generator module in accordance with various embodiments.

FIG. 34A illustrates generation of a filtered row set 3146 by a filtered row set generator module 3329 based on executing a record identification pipeline 3365 generated by a pipeline generator module 3360. Some or all features and/or functionality of the request processing module 3144 of FIG. 34A can implement the request processing module 3144 of FIG. 28B and/or any other embodiment of request processing module 3144 described herein.

A given filtered row set can be generated by filtered row set generator module 3329 in processing of a corresponding request 3131 based on executing a record identification pipeline generated based on the filtering parameter data 3142 (e.g. indicated by request 3131) and/or the configuration data 3310 (e.g. accessed via configuration data read module 3308).

Execution of the record identification pipeline 3365 can involve performing record and/or index reads, for example, via access to corresponding objects 2562 in memory resources 3106 (and/or other memory access, for example, if index data is stored elsewhere).

The record identification pipeline 3365 can be structured based on where data is stored/how the data be extracted/ whether respective fields are indexed, etc.

The record identification pipeline 3365 can include a plurality of elements arranged serially and/or in parallel (e.g. in a same or similar fashion as operators 2520 of an operator execution flow, where the elements are optionally configured to perform IO and filtering only to generate filtered row set 3142). For example, data can flow serially, where corresponding row sets are filtered along the way and/or have values sources along the way to ultimately render the filtered row set 3142. Parallelized paths can render processing of corresponding filtered row sets ultimately combined, for example, via at least one set operation (e.g. set intersection, set union, set difference, or other operation that renders a single set from the multiple incoming sets), to ultimately generate the filtered row set 3141.

The record identification pipeline 3365 can optionally be executed in multiple parallel instances by parallel resources 3050.1-3050.V, for example, upon respective proper subsets of the plurality of objects 2562.1-2562.Q (and/or subset of these objects identified to be relevant for access in the configuration data 3310), where each filtered row subset 3148 generated by a given parallelized resource 3050 is generated as output of performing the record identification pipeline 3365 upon the given parallelized resource's assigned proper subset of objects, where the filtered row set 3142 is generated as a union of the filtered row subsets 3148.1-3148.V.

Some or all of these parallelized executions of record identification pipeline 3365 can correspond to execution of the same record identification pipeline 3365, for example, based on this record identification pipeline 3365 being applicable across all of the relevant objects (e.g. based on being indexed in an identical fashion, based on being formatted in an identical fashion, and/or other similarities rendering the record identification pipeline 3365 as being usable across all objects).

Alternatively, multiple different record identification pipelines 3365 may be required for different subsets of objects, for example, based on objects in a given subset being indexed differently from other objects, being formatted differently from other objects, and/or having other differences necessitating different record identification pipelines 3365 and/or rendering use of record identification pipelines 3365 being favorable in processing respective object subsets efficiently (e.g. utilizing relevant indexes when available, even if all objects could be processed identically with no index access). An example embodiment of processing different record subsets via different record identification pipelines is discussed in conjunction with FIG. 34E.

Figure 34B:
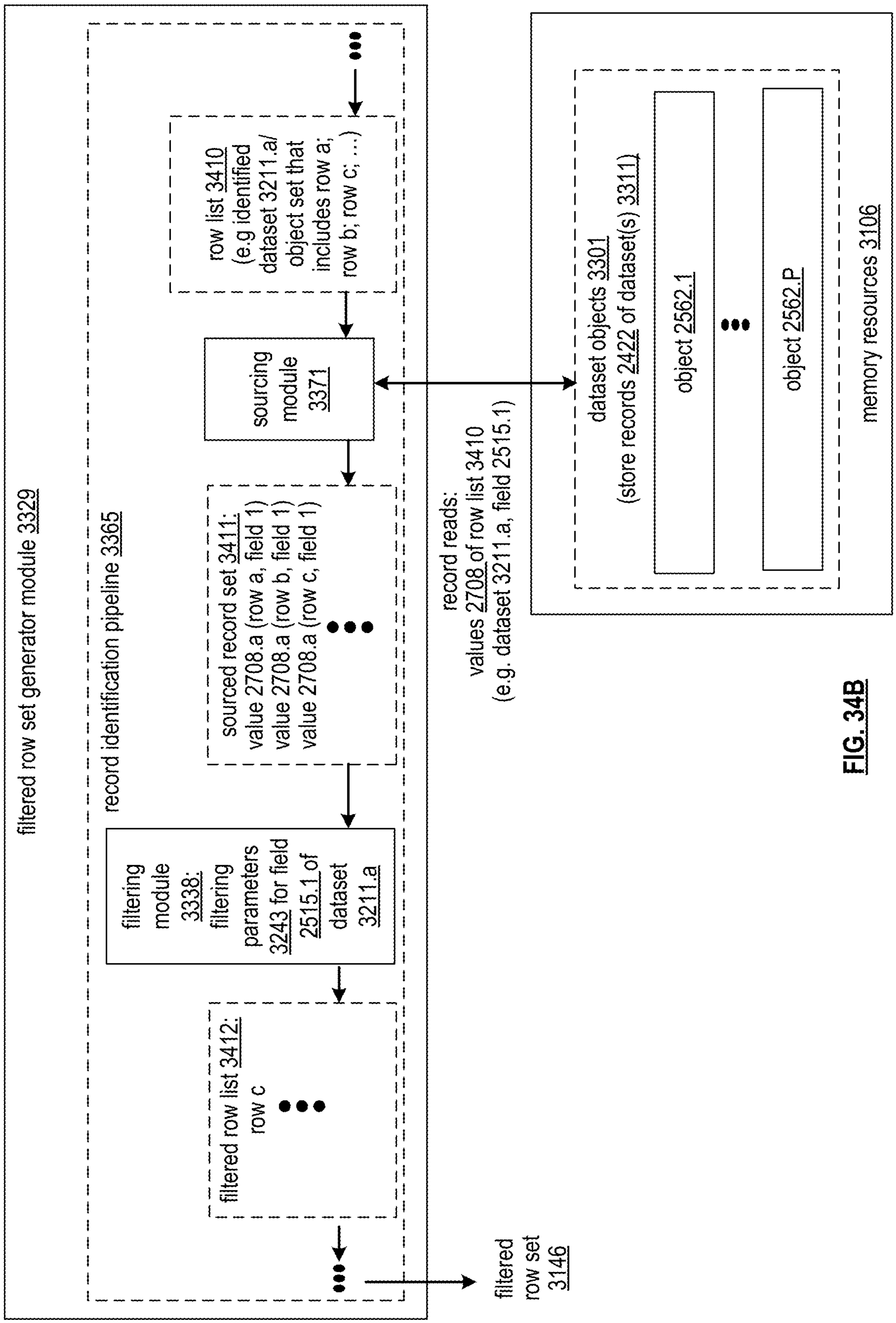
FIG. 34B is a schematic block diagram illustrating execution of a record identification pipeline that includes a sourcing module and a filtering module in accordance with various embodiments.

FIG. 34B illustrates execution of an example record identification pipeline 3365 that includes a sourcing module 3371 and a filtering module 3338. Some or all features and/or functionality of the record identification pipeline 3365 of FIG. 34B can implement the record identification pipeline 3365 of FIG. 34A and/or any embodiment of the record identification pipeline 3365 described herein. Some or all features and/or functionality of the filtered row set generator module 3329 of FIG. 34B can implement the filtered row set generator module 3329 of FIG. 34A and/or any embodiment of the filtered row set generator module 3329 described herein. Some or all features and/or functionality of the request processing module 3144 of FIG. 34B can implement the request processing module 3144 of FIG. 28B and/or any embodiment of the request processing module 3144 described herein.

In this example, the sourcing module 3371 and the filtering module 3338 can be implemented as serialized elements of the record identification pipeline 3365, where the sourcing module 3371 is executed before the filtering module 3338. This arrangement of the elements of the record identification pipeline 3365 can be generated via the pipeline generator module 3360 based on the filtering parameter data 3142 and/or configuration data 3310. For example, sourcing and filtering is applied instead of applying an index structure based on no index structure being available for the respective set of records (e.g. for the field to which the filtering parameters apply).

In this example of executing the record identification pipeline 3365, a row list 3410 is processed by sourcing module 3371 to generate a sourced record set 3411. For example, the row list 3410 indicates identifiers of records to be read and/or otherwise indicates which objects/records be read (e.g. the objects and/or dataset from which records are read; in this example, denoting a list of records that includes row a, row b, row c, . . . ). The row list 3410 can correspond to all records of a given dataset (e.g. based on the filtering parameter data indicating filtering from this full set of records) and/or can corresponding to a partially filtered list (e.g. based on having applied other filtering via prior elements of the record identification pipeline 3365).

The sourced record set 3411 can indicate sourced field values for a given field 2515.1 for all records 2422 indicated in row list 3410. The sourcing module 3371 can generate the sourced record set 3411 based on extracting the field values for this given field 2515.1 from one or more respective dataset objects 3301 (e.g. by applying one or more corresponding type-based object read module 3235 and/or by applying instructions for value extraction of field 2515.1 indicated in the configuration data 3210).

The record identification pipeline 3365 can include generation of sourced record set 3411 indicating sourced field values for a given field 2515.1 based on the filtering parameter data requiring filtering of records based on a condition applied to field 2515.1 (e.g. " . . . FROM table_A WHERE col_1=10", where col_1 is the field identifier for col_1, where table_A is the corresponding dataset 3210.*a*, where row list 3410 indicates all rows of table_A).

The filtering module 3338 can be executed based on applying filtering parameters 3243 for field 2515.1 indicated in the filtering parameter data 3142 (e.g. WHERE col_1=10) The filtered row list 3412 can include identifiers/values for only the rows meeting the corresponding condition applied by the filtering module 3338. In this case, rows a and b are filtered out based on their values in value in sourced record set 3411 not meeting filtering parameters 3243 for field 2515.1, but row c is included in the filtered row list 3412 based on its value in sourced record set 3411 meeting filtering parameters 3243 for field 2515.1 The filtered row list 3412 can be implemented as the filtered row set 3146 (e.g. based on no further filtering being required by filtering parameter data 3142), or can be further processed via subsequent elements of the pipeline to optionally render further filtering and/or sourcing of values for other fields for only rows not previously filtered out.

Figure 34C:
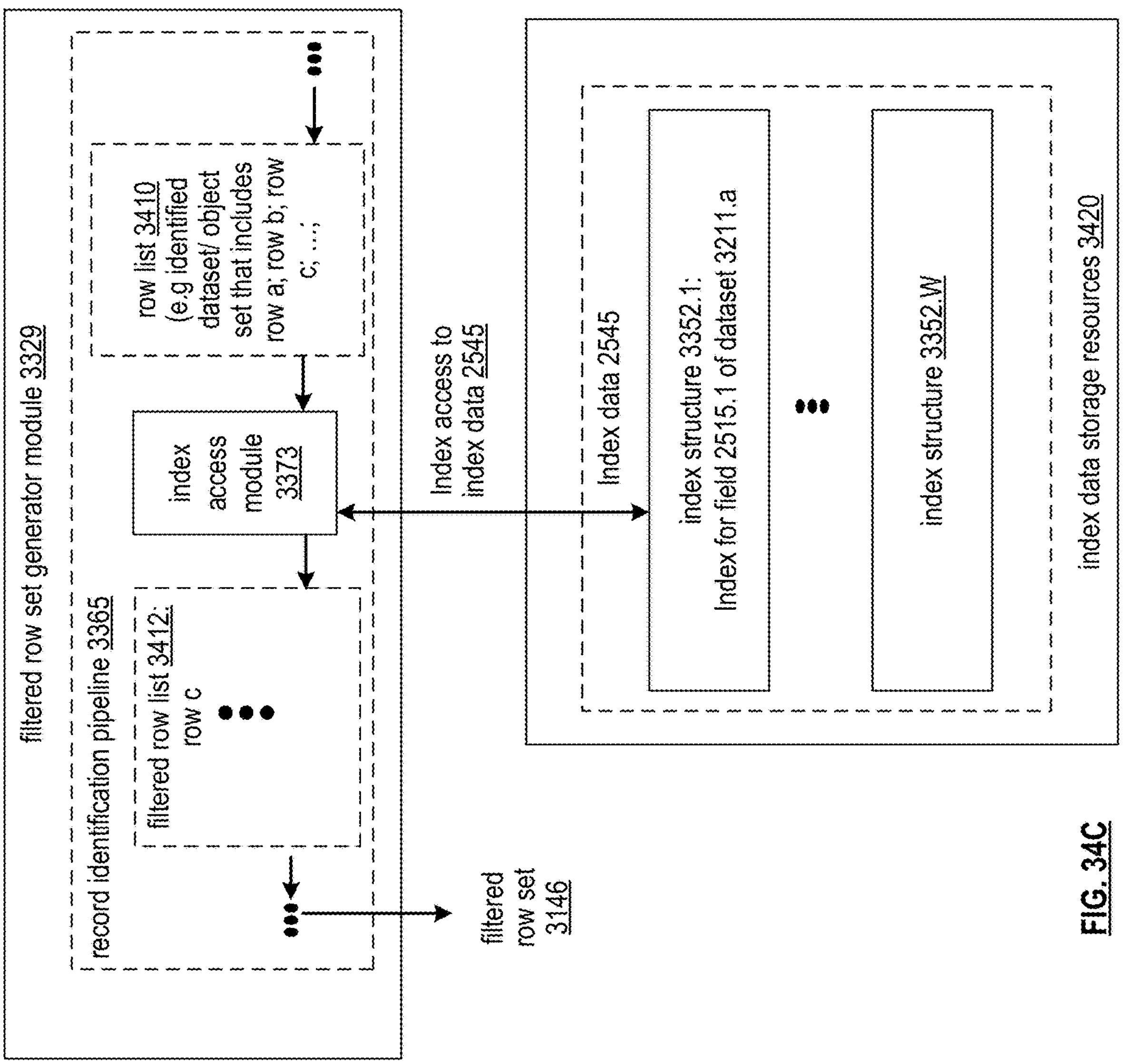
FIG. 34C is a schematic block diagram illustrating execution of a record identification pipeline that includes an index access module in accordance with various embodiments.

FIG. 34C illustrates execution of a record identification pipeline that includes an index access module 3373. Some or all features and/or functionality of the record identification pipeline 3365 of FIG. 34C can implement the record identification pipeline 3365 of FIG. 34A and/or any embodiment of the record identification pipeline 3365 described herein. Some or all features and/or functionality of the filtered row set generator module 3329 of FIG. 34C can implement the filtered row set generator module 3329 of FIG. 34A and/or any embodiment of the filtered row set generator module 3329 described herein. Some or all features and/or functionality of the request processing module 3144 of FIG. 34C can implement the request processing module 3144 of FIG. 28B and/or any embodiment of the request processing module 3144 described herein.

In this example, the index access module 3373 can be implemented as serialized element of the record identification pipeline 3365. This arrangement of the elements of the record identification pipeline 3365 can be generated via the pipeline generator module 3360 based on the filtering parameter data 3142 and/or configuration data 3310. For example, access to index data is applied instead of sourcing and filtering based on an index structure being available for the respective set of records (e.g. for the field to which the filtering parameters apply).

In this example of executing the record identification pipeline 3365, a row list 3410 is processed by index access module 3373 to generate a filtered row list 3412. For example, the row list 3410 indicates identifiers of records to be read and/or otherwise indicates which objects/records be read (e.g. the objects and/or dataset from which records are read; in this example, denoting a list of records that includes row a, row b, row c, . . . ). The row list 3410 can correspond to all records of a given dataset (e.g. based on the filtering parameter data indicating filtering from this full set of records) and/or can corresponding to a partially filtered list (e.g. based on having applied other filtering via prior elements of the record identification pipeline 3365).

The index access module 3373 can access an index structure 3352 of index data 2545 accessed in index data storage resources 3420 to determine which rows meet corresponding filtering parameters 3243 for field 2515.1 (e.g. WHERE col_1=10). Filtered row list 3412 indicates the subset of row list 3410 meeting the respective filtering parameters 3243 for field 2515.1. In this example row c is determined to meet the respective filtering parameters 3243 for field 2515.1, while row a and row b are not, as indicated by the index structure 3352.1. For example, an index value 3219 meeting the filtering parameters 3243 for field 2515.1 (e.g. the value 10) indicates a row set 3220 that includes row c and not rows b or a, where filtered row list 3412 is implemented as row set 3220, and/or only ones of the rows in row set 3220 also included in the incoming row list 3410.

The filtered row list 3412 can be implemented as the filtered row set 3146 (e.g. based on no further filtering being required by filtering parameter data 3142), or can be further processed via subsequent elements of the pipeline to optionally render further filtering and/or sourcing of values for other fields for only rows not previously filtered out (e.g. based on further sourcing and filtering being required due to the index structure corresponding to a probabilistic index returning a superset of rows meeting the filtering parameters 3243; based on other index access to other index structures for other fields being applied; or based on other further filtering/processing being required by filtering parameter data 3142)

The record identification pipeline 3365 of FIG. 34C can optionally be semantically identical to the record identification pipeline 3365 of FIG. 34B, where an identical filtered row set is generated, based on the same filtering parameters being applied to the same field for the same dataset/incoming row list 3410. For example, the record identification pipeline 3365 of FIG. 34C is performed instead of the record identification pipeline 3365 of FIG. 34B based on an index structure being available for the respective field; while the record identification pipeline 3365 of FIG. 34B is performed instead of the record identification pipeline 3365 of FIG. 34C based on an index structure not being available for the respective field.

In some cases, to process filtering parameter data 3142 of a given request 3131, the record identification pipeline 3365 of FIG. 34C is performed for a first subset of records (e.g. included in a first subset of objects that are indexed via indexing structure index structure 3352.1), while the record identification pipeline 3365 of FIG. 34B is performed for a second subset of records (e.g. included in a second subset of objects that are not indexed via indexing structure index structure 3352.1). An example of applying different record identification pipelines in processing a given request to handle for different sets of records/objects that are indexed/formatted/configured differently is illustrated in FIG. 34E.

Figure 34D:
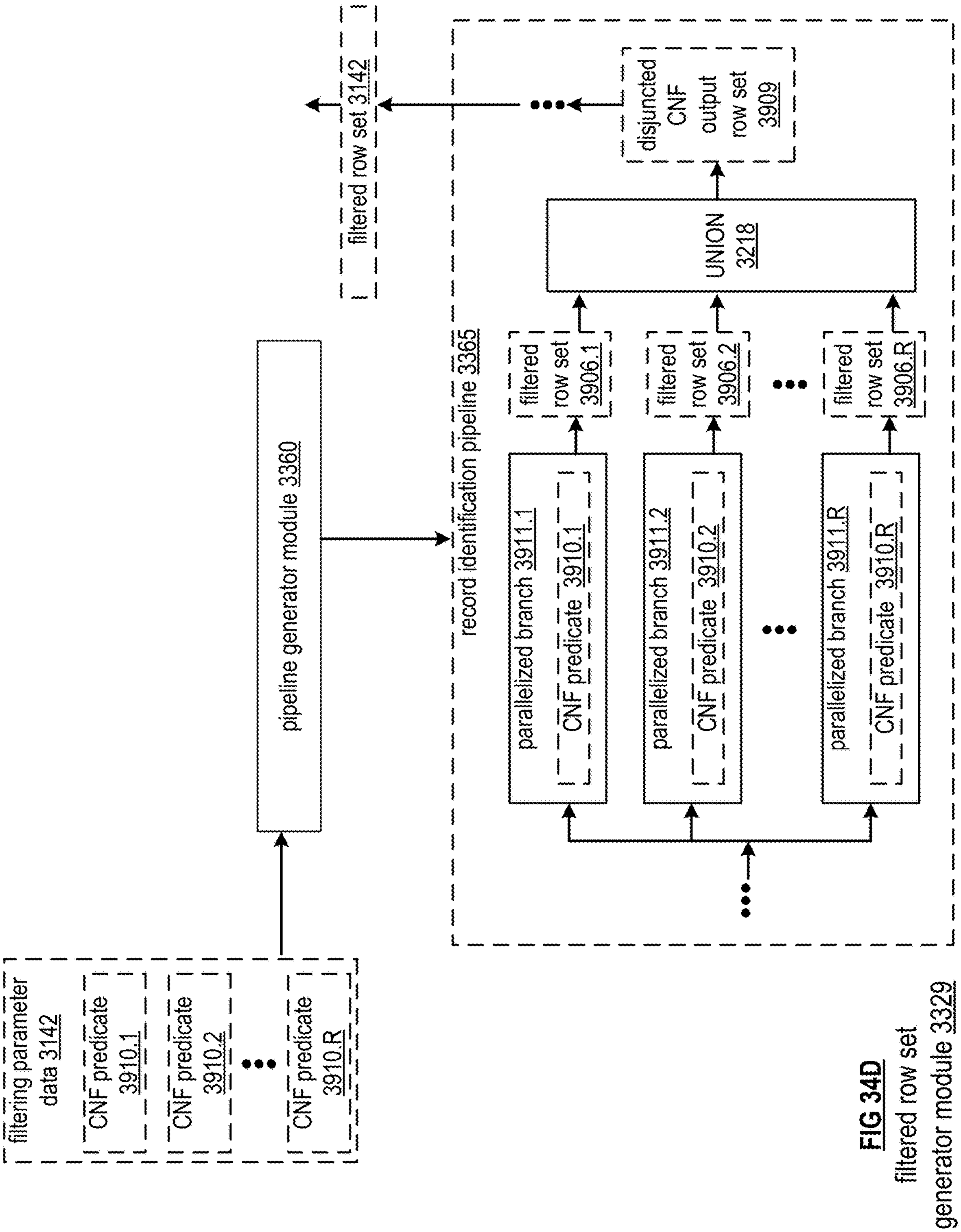
FIG. 34D is a schematic block diagram illustrating execution of a record identification pipeline that includes a plurality of parallelized branches in accordance with various embodiments.
Figure 34E:
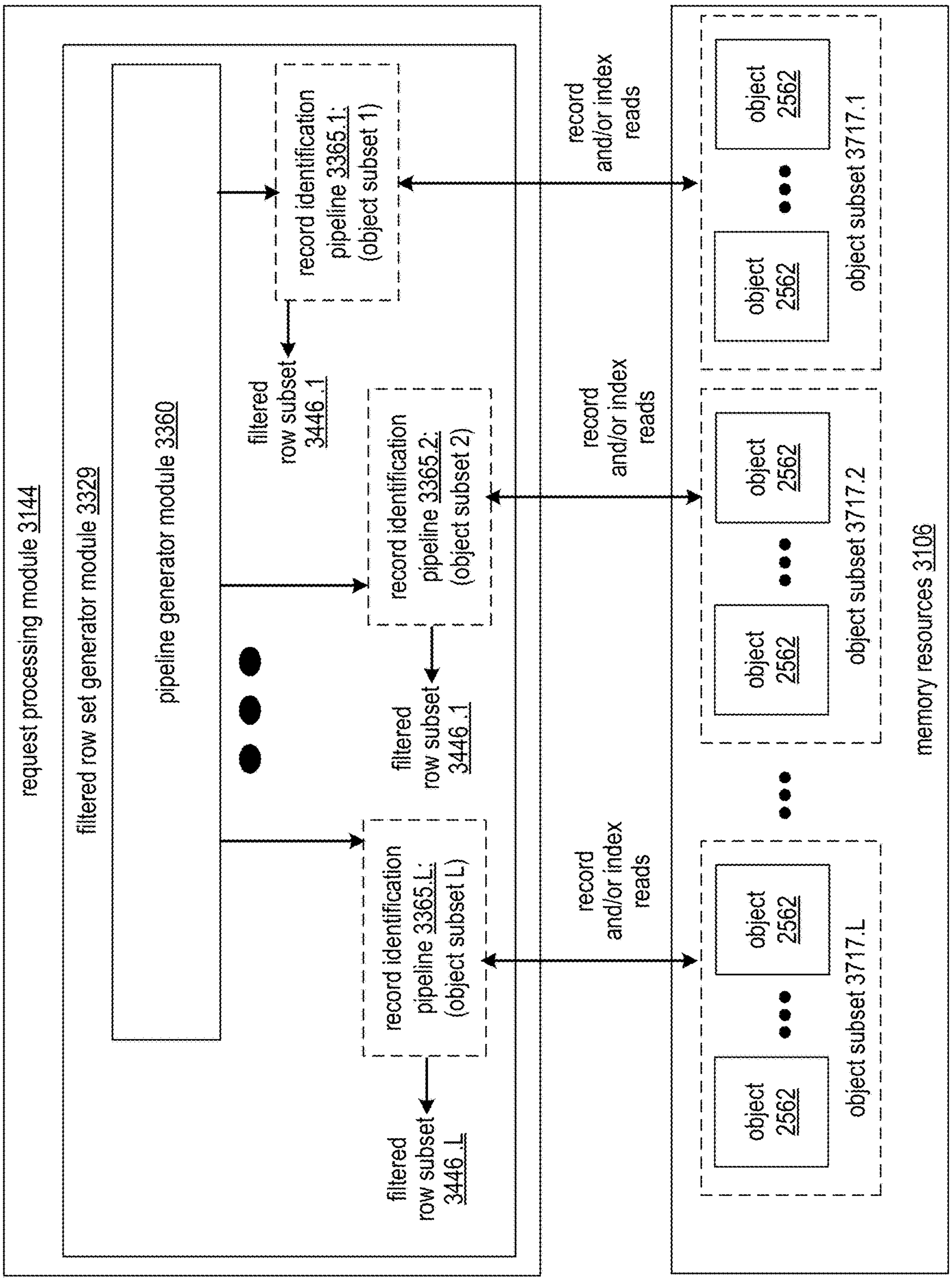
FIG. 34E is a schematic block diagram illustrating execution of a plurality of record identification pipelines to generate a plurality of filtered row subsets in accordance with various embodiments.

FIG. 34D illustrates execution of a record identification pipeline 3365 that includes a plurality of parallelized branches 3911.1-3911.R, generated from filtering parameter data 3142 that includes a corresponding plurality of conjunctive normal form (CNF) predicates 3910.1-3910.R. Some or all features and/or functionality of the record identification pipeline 3365 of FIG. 34D can implement the record identification pipeline 3365 of FIG. 34A and/or any embodiment of the record identification pipeline 3365 described herein. Some or all features and/or functionality of the filtered row set generator module 3329 of FIG. 34D can implement the filtered row set generator module 3329 of FIG. 34A and/or any embodiment of the filtered row set generator module 3329 described herein.

The filtering parameter data 3142 can indicate a plurality of CNF predicates 3910.1-3910.R (e.g. a disjunction of the plurality of CNF predicates, based on corresponding filtering predicates being indicated in the query request 2518 for which the request 3131 indicating filtering parameter data 3142 is generated). Each CNF predicate can be implemented as a corresponding filtering parameter 3243 (e.g. predicate) of the filtering parameter data 3142, and/or can be implemented as a plurality of filtering parameters 3243, such as a conjunction of the plurality of filtering parameters in conjunctive normal form (e.g. conjunction of disjunctions with no further nested conjunctions). As used herein, a conjunction can be implemented as a logical AND and/or a disjunction can be implemented as a logical OR.

Each parallelized branch can optionally include its own nested parallelized and/or serialized arrangement of elements to implement the respective CNF predicate 3910. For example, the conjuncted predicates (e.g. A AND B AND C, where A, B, and C are predicates/filtering parameters 3243) are serialized in a given branch and/or are parallelized with a set intersection element applied. and/or the disjuncted predicates (e.g. D OR E, where D and E are predicates/filtering parameters 3243) are parallelized in parallelized branches, for example, to which a set union element is applied. Different parallelized branches can thus be considered different nested record identification pipelines 3365 within the record identification pipeline.

In some embodiments, filtering parameter data 3142 and/or other portions of the request can optionally further indicate one or more fields requiring values (rather than row identifiers/location data), where the filtered row set 3142 is generated to include values for these fields accordingly. For example, the request indicates values be returned for fields to be projected in the resultant, for fields to be further processed by their respective values via additional operators 2520, and/or other reasons as discussed previously. The record identification pipeline can be generated further based on these indicated fields requiring values (e.g. where sourcing modules 3371 are included in the record identification pipeline accordingly, for example, even if not required to further filter rows).

FIG. 34E illustrates generation and execution of a plurality of record identification pipelines 3365.1-3365.L to generate a corresponding plurality of filtered row subsets 3446.1-3446.L Each record identification can be applied to a corresponding object subset 3717 to generate a filtered row subset as a subset of rows of the respective object subset. Different object subsets can be grouped in the configuration data and/or identified as having like-characteristics rendering processing under a same record identification pipelines 3365 as acceptable (e.g. having same index structure for a relevant field; having same formatting to render use of the same type-based object read module 3235 to implement sourcing module 3371; and/or other characteristics). Different record identification pipelines 3365.1-3365.L can be semantically equivalent to render correct filtering in accordance with the common filtering parameter data 3142 applied across all object subsets 3717.1-3717.L, but can have different elements based on these differences. For example, different record identification pipelines 3365.1-3365.L include different sourcing modules 3371 implemented via different type-based object read modules 3235 to handle the different object formatting across different object subsets. As another example, one record identification pipeline 3365.1 includes an index access module 3373 for a given field 2515.1 while another record identification pipeline 3365.2 does not include the index access module 3373 for the given field 2515.1 based on the field 2515.1 being indexed for the first object subset 3717.1 and not the second object subset 3717.2 (e.g. the first object subset 3717.1 is indexed for the first field and the second object subset 3717.2 is not based on having different object formatting making the raw values easier vs. harder to extract, based on their records having cardinality differences for the field rendering indexing being optional/selected for one object subset's set of records and not the other's, etc.) As another example, one record identification pipeline 3365.1 includes a first index access modules 3373 for accessing a first index structure indexing the given field 2515.1 across the first object subset 3717.1, while another record identification pipeline 3365.2 includes a second index access module 3373 for accessing a second index structure indexing the given field 2515.2 across the second object subset 3717.2 (e.g. the second index structure is a same or different index type from the first index structure, where the object subsets are indexed differently/separately based on their records having cardinality differences for the field rendering different optional index selection for the different sets of records, etc.)

Figure 34F:
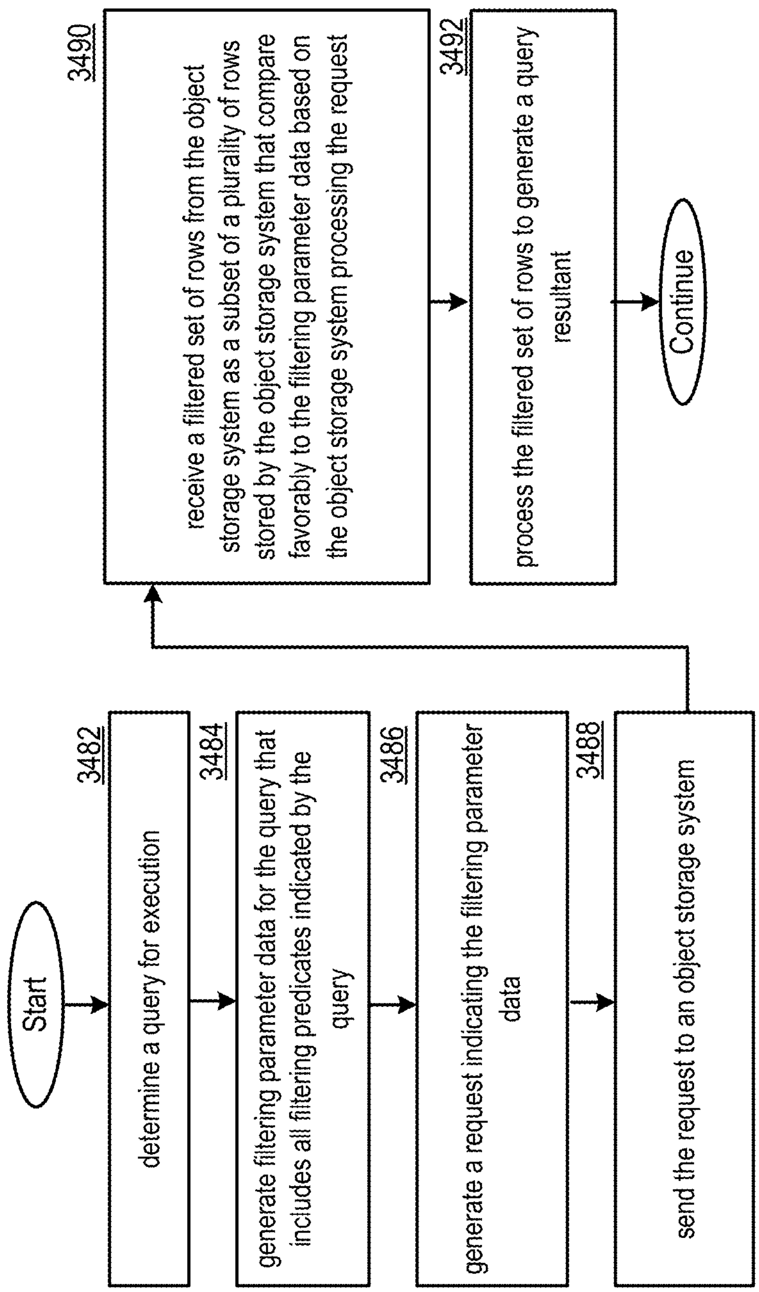
FIG. 34F is a logic diagram for execution in accordance with various embodiments.

FIG. 34F illustrates a method for execution, for example, by a data processing system 3107. For example, the data processing system 3107 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34F. In particular, a node 37 can utilize the query processing module 2435 to execute some or all of the steps of FIG. 34F, where multiple nodes 37 implement their own query processing modules 2435 to independently execute some or all of the steps of FIG. 34F, for example, to facilitate execution of a query as participants in a query execution plan 2405. Some or all of the method of FIG. 34F can be performed by utilizing the query execution module 2504 in accordance with some or all features and/or functionality described in conjunction with FIGS. 34A-34F. Some or all of the method of FIG. 34F can be performed based on communicating with an object storage system 3105. Some or all of the method of FIG. 34F can be performed by the object storage system 3105 instead of the data processing system 3107 based on communication between object storage system 3105 and data processing system 3107. Some or all of the steps of FIG. 34F can optionally be performed by database system 10 and/or any other processing module. Some or all of the steps of FIG. 34F can be performed to implement some or all of the functionality of the data processing system 3107 and/or object storage system 3105 as described in conjunction with FIGS. 34A-34C. Some or all of the steps of FIG. 34F can be performed based on communications exchanged in accordance with an API dictated by object storage communication protocol data 3141. Some or all of the steps of FIG. 34F can be performed to implement some or all of the functionality regarding execution of a query via the plurality of nodes in the query execution plan 2405. Some or all steps of FIG. 34F can be performed in accordance with other embodiments of data processing system 3107 described herein. Some or all steps of FIG. 34F can be performed in conjunction with performing some or all steps of the method of FIG. 29M, FIG. 30G, FIG. 31B, FIG. 32D, and/or any other method described herein.

Step 3482 includes determining a query for execution. Step 3484 includes generating filtering parameter data for the query that includes all filtering predicates indicated by the query. Step 3486 includes generating a request indicating the filtering parameter data. Step 3488 includes sending the request to an object storage system. Step 3490 includes receiving a filtered set of rows from the object storage system as a subset of a plurality of rows stored by the object storage system that compare favorably to the filtering parameter data based on the object storage system processing the request. Step 3492 includes processing the filtered set of rows to generate a query resultant.

In various embodiments, any one of more of the various examples listed above are implemented in conjunction with performing some or all steps of FIG. 34F. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 34F described above, for example, in conjunction with further implementing any one or more of the various examples described herein.

In various embodiments, a data processing system includes at least one processor and at least one memory that stores operational instructions. In various embodiments, the operational instructions, when executed by the at least one processor, cause the storage system to perform some or all steps of FIG. 34F, for example, in conjunction with further implementing any one or more of the various examples described herein.

In various embodiments, the operational instructions, when executed by the at least one processor, cause the at least one processor to: determine a query for execution; generate filtering parameter data for the query that includes all filtering predicates indicated by the query; generate a request indicating the filtering parameter data; send the request to an object storage system; receive a filtered set of rows from the object storage system as a subset of a plurality of rows stored by the object storage system that compare favorably to the filtering parameter data based on the object storage system processing the request; and/or process the filtered set of rows to generate a query resultant.

Figure 34G:
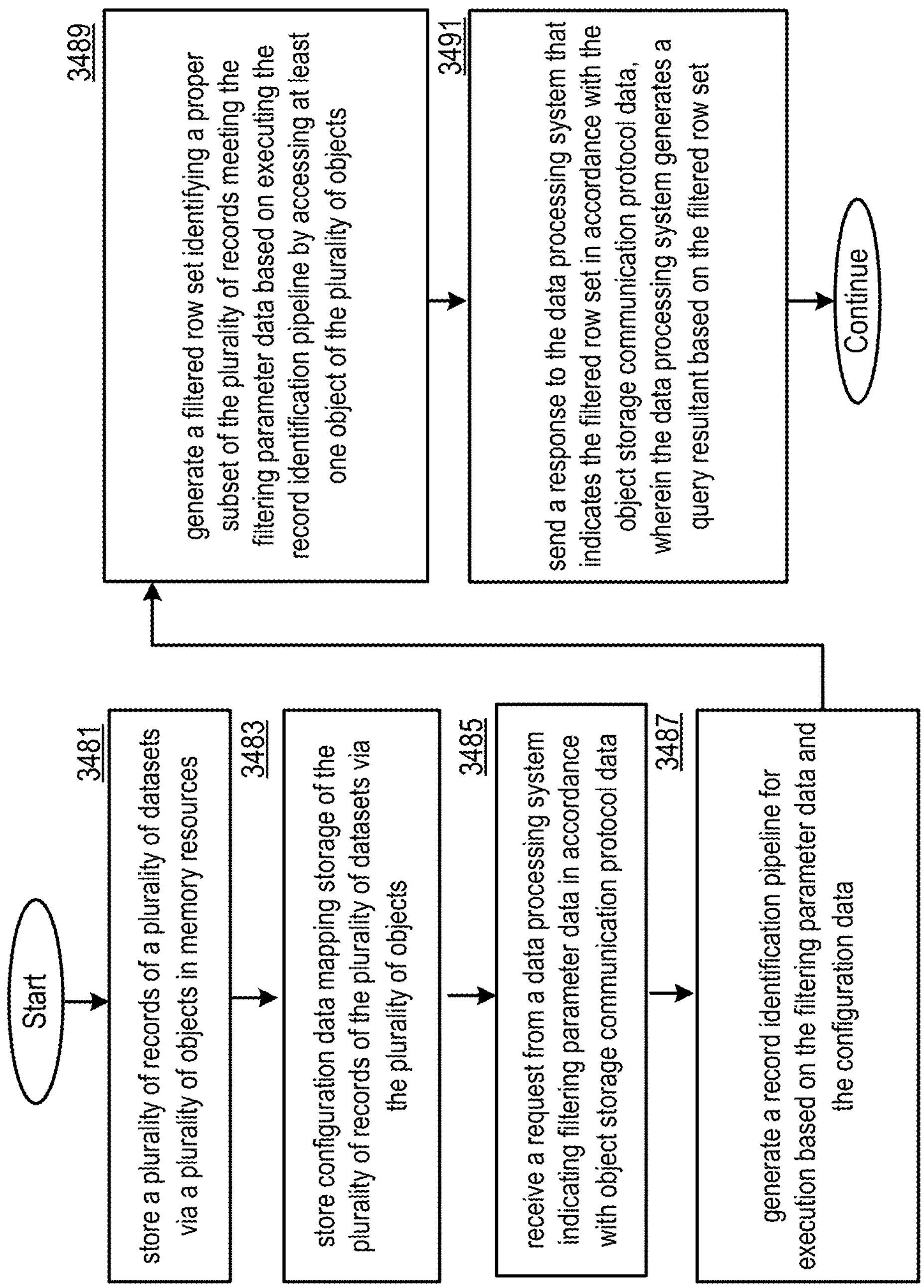
FIG. 34G is a logic diagram for execution in accordance with various embodiments.

FIG. 34G illustrates a method for execution, for example, by an object storage system 3105 and/or a request processing module 3144. For example, the data processing system 3107 can include utilizing a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 34G. In particular, a parallelized resource 3050 can implement a corresponding processing module to execute some or all of the steps of FIG. 36F, where multiple parallelized resources 3050 implement their own processing modules to independently execute some or all of the steps of FIG. 36F for example, to facilitate processing of a request 3131 and/or to generate a corresponding response 3132 based on each generating filtered row subsets 3148 that collectively constitute a filtered row set 3146, and/or based on each generating filtered row set access restriction data for their respective filtered row subsets 3148.

Some or all of the method of FIG. 34G can be performed based on communicating with a data processing system 3107, for example, in conjunction with the data processing system 3107 performing some or all steps of FIG. 34F. Some or all of the method of FIG. 34G can be performed by the data processing system 3107 instead of the object storage system 3105 based on communication between object storage system 3105 and data processing system 3107. Some or all of the steps of FIG. 34G can optionally be performed by database system 10 and/or any other processing module. Some or all of the steps of FIG. 34G can be performed to implement some or all of the functionality of the data processing system 3107 and/or object storage system 3105 as described in conjunction with FIG. 34A-34F. Some or all of the steps of FIG. 34G can be performed based on communications exchanged in accordance with an API dictated by object storage communication protocol data 3141. Some or all of the steps of FIG. 34G can be performed to implement some or all of the functionality regarding execution of a query via the plurality of nodes in the query execution plan 2405. Some or all steps of FIG. 34G can be performed in accordance with other embodiments of object storage system 3105 described herein. Some or all steps of FIG. 34G can be performed in conjunction with performing some or all steps of FIG. 31C, 32E, and/or some or all steps of any other method described herein.

Step 3481 includes storing a plurality of records of a plurality of datasets via a plurality of objects in memory resources. Step 3483 includes storing configuration data mapping storage of the plurality of records of the plurality of datasets via the plurality of objects. Step 3485 includes receiving a request from a data processing system indicating filtering parameter data in accordance with object storage communication protocol data. Step 3487 includes generating a record identification pipeline for execution based on the filtering parameter data and the configuration data. Step 3489 includes generating a filtered row set identifying a proper subset of the plurality of records meeting the filtering parameter data based on executing the record identification pipeline by accessing at least one object of the plurality of objects. Step 3491 includes sending a response to the data processing system that indicates the filtered row set in accordance with the object storage communication protocol data. In various examples, the data processing system generates a query resultant based on the filtered row set.

In various examples, the method includes: storing a plurality of records of a plurality of datasets via a plurality of objects in memory resources of an object storage system; storing configuration data mapping storage of the plurality of records of the plurality of datasets via the plurality of objects; receiving a request from a data processing system indicating filtering parameter data in accordance with object storage communication protocol data; generating a record identification pipeline for execution based on the filtering parameter data and the configuration data; generating a filtered row set identifying a proper subset of the plurality of records meeting the filtering parameter data based on executing the record identification pipeline by accessing at least one object of the plurality of objects; and/or sending a response to the data processing system that indicates the filtered row set in accordance with the object storage communication protocol data. In various examples, the data processing system generates a query resultant based on the filtered row set.

In various examples, the data processing system sends the request indicating the filtering parameter data in conjunction with execution of a query by the data processing system. In various examples, the data processing system generates the query resultant for the query based on the filtered row set.

In various examples, the data processing system executes the query based on generating a query operator execution flow for the query that includes a first at least one operator serially before a second at least one operator and/or executing the query operator execution flow for the query to generate the query resultant. In various examples, executing the query operator execution flow is based on executing the first at least one operator of the query operator execution flow based on generating the request. In various examples, the filtering parameter data indicated in the request is automatically determined based on the query. In various examples, the request is sent to the object storage system. In various examples, executing the query operator execution flow is based on executing the second at least one operator of the query operator execution flow based on processing the filtered set of rows in accordance with the second at least one operator to produce the query resultant.

In various examples, the record identification pipeline includes a plurality of parallelized branches that implement a plurality of predicates determined based on the filtering parameter data, and/or a union element that applies a set union to output of the plurality of parallelized branches.

In various examples, the method further includes storing access control data regarding the plurality of datasets and/or generating, based on the filtering parameter data and the access control data, filtered row set access restriction data indicating whether access to the filtered row set is allowed. In various examples, the response indicating the filtered row set is generated based on the filtered row set access restriction data indicating access to the filtered row set is allowed.

In various examples, the filtered row set indicates row storage location data for a first filtered set of rows that is a first proper subset of the plurality of records stored by the object storage system based on the object storage system processing the request.

In various examples, the data processing system determines a second filtered set of rows as a second proper subset of the first filtered set of rows based on executing at least one query operator. In various examples, the method further includes receiving a second request for field values that indicates the row storage location data for the second filtered set of rows in accordance with the object storage communication protocol; and/or sending a second response indicating the field values of the second filtered set of rows based on processing the request for field values.

In various examples, the plurality of objects correspond to a plurality of different object formats that collectively include the plurality of records. In various examples, the method further includes process the request in accordance with the object storage communication protocol to generate the filtered set of rows based on identifying a first proper subset of the filtered set of rows that includes at least one first row included in a first object of the object storage system having a first object format of the plurality of different object formats, and/or identifying a second proper subset of the filtered set of rows that includes at least one second row included in a second object of the object storage system having a second object format of the plurality of different object formats.

In various examples, the method further includes receiving a request to store a new plurality of records in accordance with the object storage communication protocol from the data processing system. In various examples, the new plurality of records was generated by the data processing system based on processing the filtered row set. In various examples, the method further includes storing the new plurality of records in at least one new object based on processing the request to store the new plurality of records.

In various examples, the method further includes receiving a second request indicating second filtering parameter data in accordance with the object storage communication protocol data. In various examples, the method further includes generating a second filtered row set identifying a second proper subset of the plurality of records meeting the filtering parameter data by accessing a second at least one object of the plurality of objects. In various examples, the second at least one object includes the at least one new object and/or the second filtered row set includes at least one row of the new plurality of records. In various examples, the method further includes sending a second response that indicates the second filtered row set in accordance with the object storage communication protocol data. In various examples, a second query resultant is generated based on the second filtered row set.

In various examples, the configuration data includes: formatting data indicating arrangement of records in objects of the plurality of objects; dataset mapping data indicating datasets to which records in objects of the plurality of objects belong; row set data indicating records included in various datasets; indexing configuration data indicating at least one indexing structure for at least one field of at least one dataset; schema data indicating dataset fields of datasets which records in objects of the plurality of objects belong; and/or access control data indicating accesses allowed for performance by at least one entity that executes queries against the plurality of records.

In various examples, at least some of the configuration data is stored as object metadata of at least one of the plurality of objects. In various examples, at least some of the configuration data is stored in a second plurality of objects distinct from the plurality of objects.

In various examples, the method further includes storing a set of index structures indexing the plurality of records for at least one dataset of the plurality of datasets for at least one field of the at least one dataset. In various examples, the filtered row set is generated based on accessing a first index structure indexing a first field for ones of the of plurality of records included in a first dataset.

In various examples, a second plurality of objects stored by the object storage system store the set of index structures indexing the plurality of records of the at least one dataset. In various examples, accessing the first index structure includes accessing at least one of the second plurality of objects. In various examples, the set of index structures are stored via non-object storage memory resources accessible by the object storage system. In various examples, accessing the first index structure includes accessing the non-object storage memory resources.

In various examples, the configuration data indicates the first index structure indexes the first field for the ones of the of plurality of records included in the first dataset. In various examples, the record identification pipeline includes an index element, and/or the first index structure is accessed to generate the filtered row set based on executing the index element of the record identification pipeline.

In various examples, the method further includes processing the configuration data to automatically generate index structure selection data indicating a determination to generate the first index structure indexing the first field for the ones of the of plurality of records included in the first dataset, and/or generating the first index structure indexing based on the index structure selection data.

In various examples, the object storage system implements the memory resources in conjunction with an object storage service, and/or the memory resources store the plurality of objects via a flat storage structure.

In various examples, each of the plurality of objects include a data portion, an object metadata portion, and a globally unique identifier.

In various embodiments, any one of more of the various examples listed above are implemented in conjunction with performing some or all steps of FIG. 34G. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 34G described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 34G, for example, in conjunction with further implementing any one or more of the various examples described herein.

In various embodiments, the operational instructions, when executed by the at least one processor, cause the at least one processor to: store a plurality of records of a plurality of datasets via a plurality of objects in memory resources; store configuration data mapping storage of the plurality of records of the plurality of datasets via the plurality of objects; receive a request from a data processing system indicating filtering parameter data in accordance with object storage communication protocol data; generate a record identification pipeline for execution based on the filtering parameter data and the configuration data; generate a filtered row set identifying a proper subset of the plurality of records meeting the filtering parameter data based on executing the record identification pipeline by accessing at least one object of the plurality of objects; and/or send a response to the data processing system that indicates the filtered row set, where the data processing system generates a query resultant based on the filtered row set.

Figure 35A:
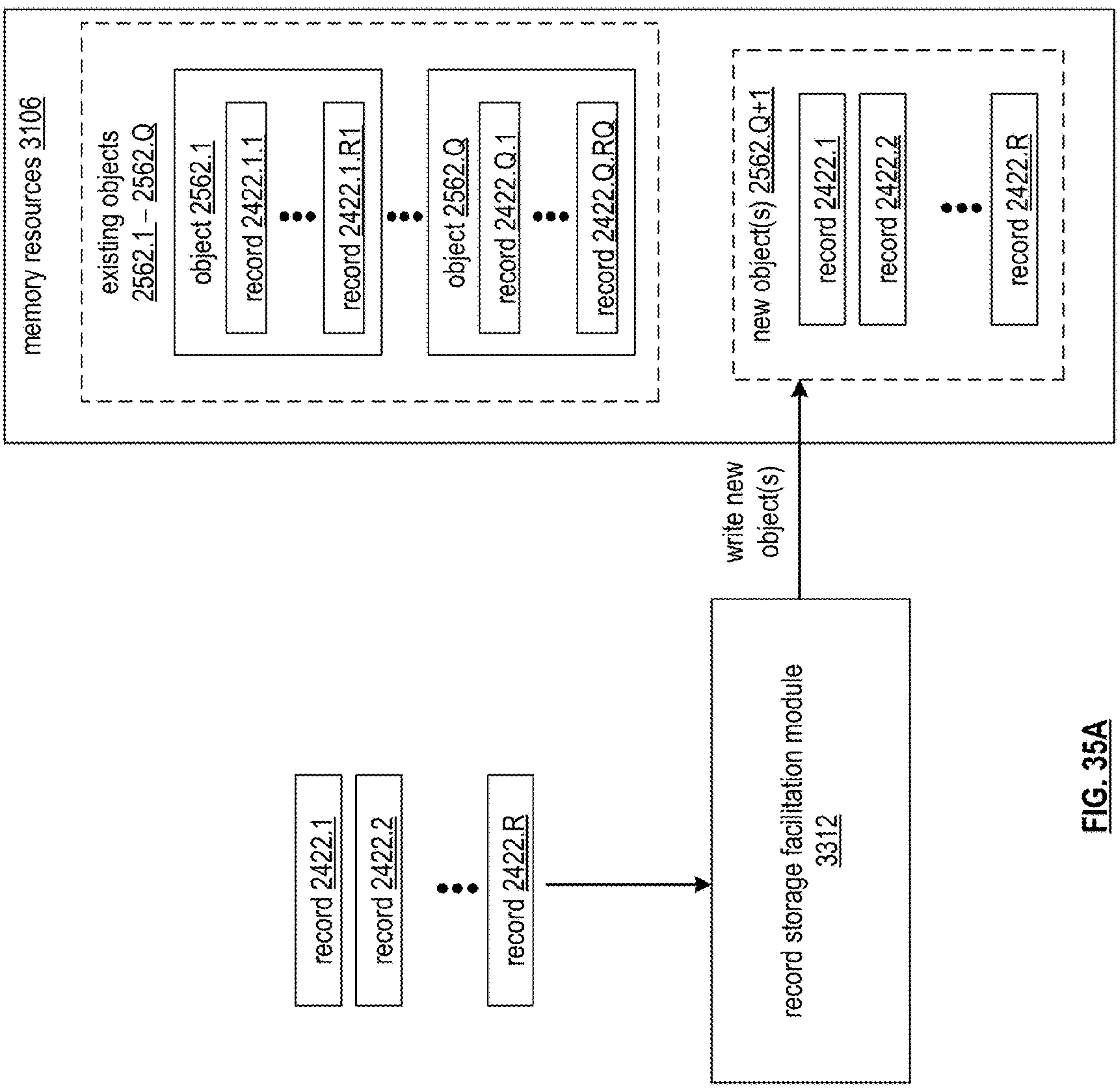
FIG. 35A is a schematic block diagram illustrating a record storage facilitation module that writes at least one new object to memory resources in accordance with various embodiments.

FIG. 35A illustrates a record storage facilitation module 3312 that writes/sends a request to write at least one new object 2562 to memory resources 3106 of object storage system 3105, where the at least one new object 2562 includes a set of records 2422.1-2422.R. Some or all features and/or functionality of the record storage facilitation module 3312 can implement any writing of objects/any storage of incoming records described herein.

The record storage facilitation module 3312 can implement some or all features and/or functionality of generating/processing request 3237 in the case where new records 2422.1-2422.R are generated as a query resultant 2526 as discussed in conjunction with FIGS. 32A-32E. In some cases, some or all records are not generated as resultants from filtered row sets generated from existing objects, but are otherwise generated/collected elsewhere/via other means. The record storage facilitation module 3312 can implement any sending/writing of new records for storage via object storage system 3105.

Figure 35B:
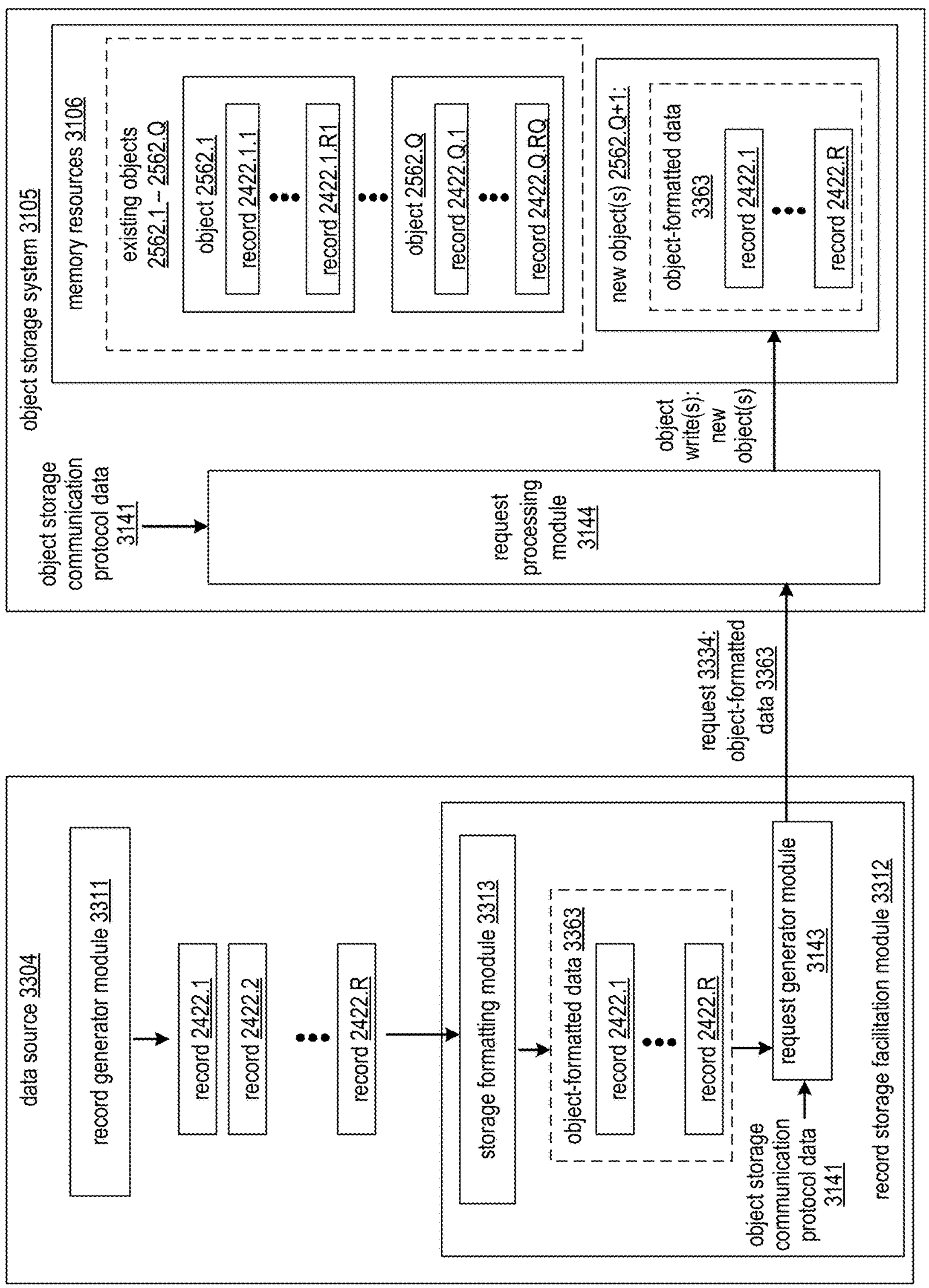
FIG. 35B is a schematic block diagram illustrating a data source that implements a record storage facilitation module that generates object-formatted data included in a request processed by an object storage system that writes at least one new object based on the object-formatted data in accordance with various embodiments.

FIG. 35B illustrates a data source 3304 that implements a record storage facilitation module 3312 that generates object-formatted data 3363 included in a request 3334 processed by request processing module 3144 for an object storage system 3105 that writes at least one new object 2652 based on the object-formatted data 3363. Some or all features and/or functionality of the record storage facilitation module 3312 of FIG. 35B can implement the record storage facilitation module 3312 of FIG. 35A and/or any embodiment of the record storage facilitation module 3312 described herein. Some or all features and/or functionality of the data source 3304 of FIG. 35B can implement the data source of FIG. 35A and/or any embodiment of a data source described herein. Some or all features and/or functionality of the request processing module 3144 of FIG. 35B can implement any embodiment of the request processing module 3144 described herein.

The data source 3304 can correspond to any entity that collects/generates/measures/receives records 2422 and that further sends the records 2422 to the object storage system 3105 for storage. The data source 3304 can be the originating entity creating the records; or can copy/derive the data included in the records from other records/data (e.g. copied/derived from data stored elsewhere such as in a different storage system 3104 and/or 3105, and/or copied/derived from data already/previously stored in the object storage system 3105 where these new records are to be written).

Various different records/objects/datasets of the object storage system can be received from the same data source 3304 or different data sources 3304. One or more data sources 3304 providing records to object storage system 3105 can be implemented as/associated with data processing systems 3107 (e.g. an entity stores data via object storage system 3105 and also executes queries against this data; and/or a data processing system 3107 acts as a data provider 3304 in sending a query resultant to the object storage system for storage as discussed in conjunction with FIGS. 32A-32E). One or more data sources 3304 providing records to object storage system 3105 are optionally not associated with data processing systems 3107 (e.g. one entity supplies data for storage via object storage system 3105 as a data provider and a different entity queries against this data).

The record storage facilitation module 3312 implemented by a data source 3304 can implement the request generator module 3143. The request generator module 3143 can be further operable to generate write requests (e.g. instead of or in addition to read requests for filtered row sets 3142 as discussed previously) in accordance with the object storage communication protocol data 3141. For example, the object storage communication protocol data 3141 further facilitates communication with object storage system 3105 to enable requests to store data in object storage system via write requests 3334 alternatively or in addition to enable requests to read/filter data from object storage system via requests 3131, in accordance with corresponding keywords/syntax/structuring/etc.

In some embodiments request 3334: is implemented in a same or similar fashion as a PUT, POST, and/or PATCH request of an existing object storage system framework; is implemented in a same or similar fashion as a PUT, POST, and/or PATCH HTTP verb, includes the keyword "PUT", "POST", and/or "PATCH"; and/or is interpreted via request processing module 3144 to render request processing module 3144 performing the corresponding request based on performing at least one PUT, POST, and/or PATCH request of an existing object storage system framework and/or via PUT, POST, and/or PATCH HTTP verb.

The request 3334 can indicate object-formatted data 3363 generated by the data source 3304, where the record storage facilitation module 3312 implemented by a data source 3304 implements a storage formatting module 3313 to generate this object-formatted data 3363 from the plurality of records 2422.1-2422.R for storage. For example, the object-formatted data 3363 is the object data 3323 for one or more objects 2562 and/or is a corresponding file/structuring of data. The object-formatted data 3363 can further include some or all of the object metadata 3324 (e.g. user-supplied fields) and/or instructions for generation of the object metadata 3324, where some or all of the object metadata 3324 (e.g. system-supplied data) is generated by the object storage system in conjunction with writing/maintaining storage of/access to the respective one or more objects 2562. Alternatively or in addition, some or all formatting of the records 2422.1-2422.R into one or more respective objects is performed by the object storage system 3105, for example, as illustrated in FIG. 35C.

Figure 35C:
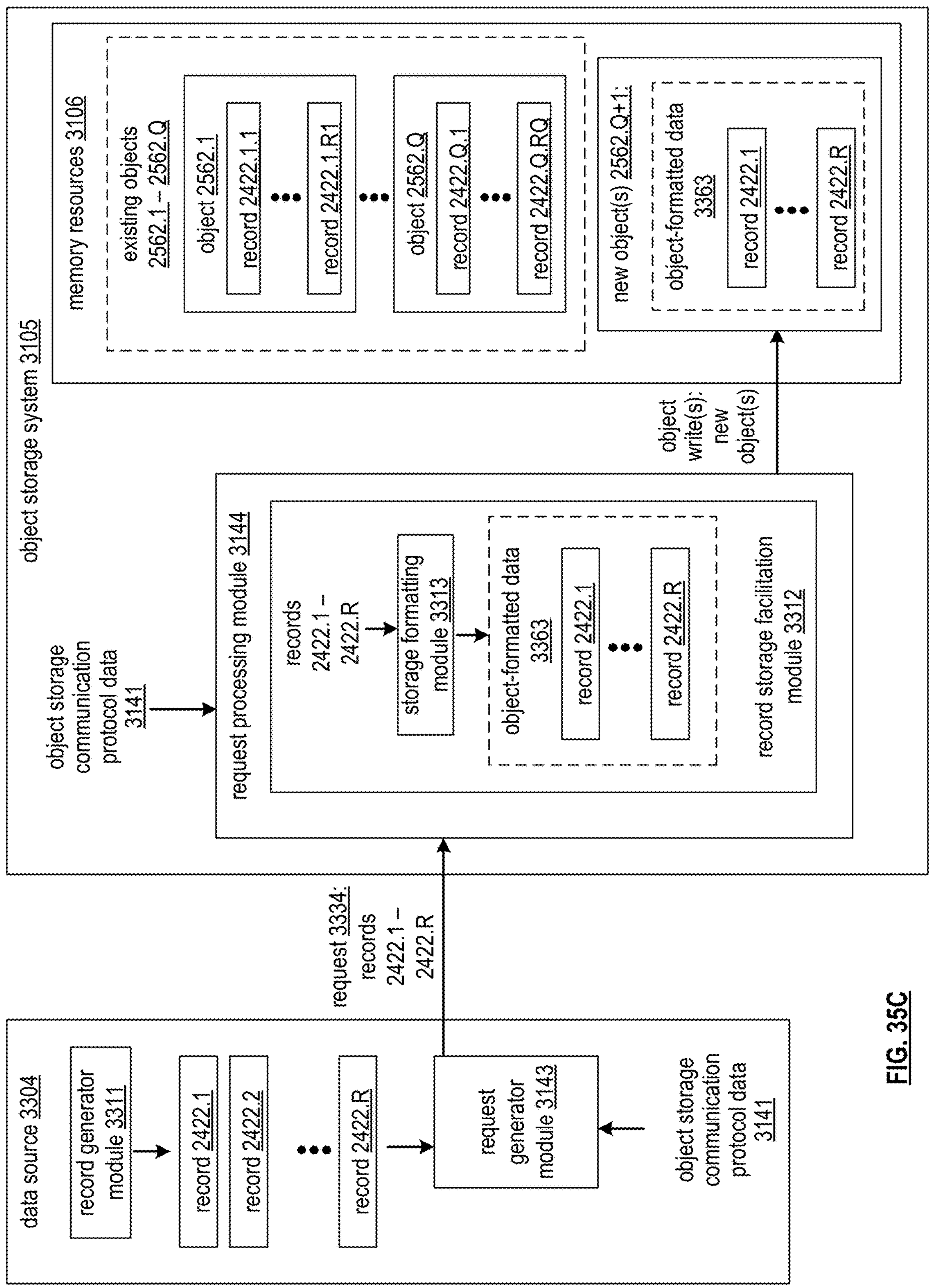
FIG. 35C is a schematic block diagram illustrating an object storage system that implements a record storage facilitation module that generates object-formatted data based on records included in a request received by the object storage system to write at least one new object in accordance with various embodiments.

FIG. 35C illustrates a request processing module 3144 for an object storage system 3105 that implements the record storage facilitation module 3312 to generates some or all of the object-formatted data 3363 based on records 2422.1-2422.R included in a request 3334 received by the object storage system to write at least one new object. For example, the generation of some or all object-formatted data 3363 for the set of records 2422.1-2422.R to be stored is performed by the request processing module 3144. Some or all features and/or functionality of the record storage facilitation module 3312 of FIG. 35C can implement the record storage facilitation module 3312 of FIG. 35A and/or any embodiment of the record storage facilitation module 3312 described herein. Some or all features and/or functionality of the data source 3304 of FIG. 35C can implement the data source of FIG. 35A and/or any embodiment of a data source described herein. Some or all features and/or functionality of the request processing module 3144 of FIG. 35B can implement any embodiment of the request processing module 3144 described herein. The record storage facilitation module 3312 of the object storage system 3105 of FIG. 35C can be implemented alternatively or in addition to the record storage facilitation module 3312 of the data source 3304 of FIG. 35B.

In some embodiments, the object-formatted data 3363 can be generated in accordance with object formatting (e.g. object type data 3234) that is selected/configured by the data provider, where the request 3444 further indicates instructions for how the respective objects be generated (e.g. in accordance with syntax/structuring as defined by the object storage communication protocol data 3141). This can enable the data provider to configure how its objects are formatted (e.g. how they are structured/divided into objects, the file type of the objects, whether the records/objects are compressed/encoded/encrypted, etc.). For example, these instructions can be implemented as configuration data 3210 and/or can be utilized to determine the configuration data 3210.

Alternatively or in addition, the object-formatted data 3363 can be generated in accordance with object formatting (e.g. object type data 3234) that is selected/configured by the object storage system 3105 and/or the corresponding request processing module 3144. For example, the object storage system 3105 and/or the corresponding request processing module 3144 can configure how records from this particular data provider/across all data providers are formatted (e.g. how they are structured/divided into objects, the file type of the objects, whether the records/objects are compressed/encoded/encrypted, etc.). This can be selected on a request by request basis, a record by record basis, an object by object basis, a dataset by dataset basis, a data provider by data provider basis, etc.

Such selections can optionally be based on generating object-formatted data 3363 in accordance with predetermined configuration data 3210. For example, a request 3334 indicates which dataset to which these records belong (e.g. in accordance with syntax/structuring as defined by the object storage communication protocol data 3141), and the per-dataset configuration data for the denoted dataset is applied to generate these new records. Other predetermined configuration data that applies universally and/or applies to the given data source/applies to given attributes of the received records/the received request can be utilized to generate the object-formatted data 3363 accordingly.

Such selections can alternatively or additionally be based on generating objects 2562 in accordance with selections to optimize/balance access efficiency, storage efficiency, filtering efficiency by filtered row set generator module 3329 in processing subsequent requests 3131, and/or other optimizations. For example, some or all formatting selections dictating how the object-formatted data 3363 be generated is based on the data provider supplying the records in the request 3334, the dataset these records belong to, data distribution/cardinality of one or more fields; expected access frequency to this data in requests 3131; number of records R received; fixed/average/max/min size of the records 2422 and/or of one or more underlying fields; type of data depicted by the records and/or one or more underlying fields; and/or other information derived from the given request 3334. Such selections on a per-request basis can include generating custom configuration data 3210 for the respective records in the request (e.g. where per-object configuration data of the one or more new objects indicates this new configuration data 3210; where per-dataset configuration data of the set of records indicates this new configuration data 3120, for example, where the newly received set of records corresponds to a new dataset rather than records of an existing dataset, etc.)

Figure 35D:
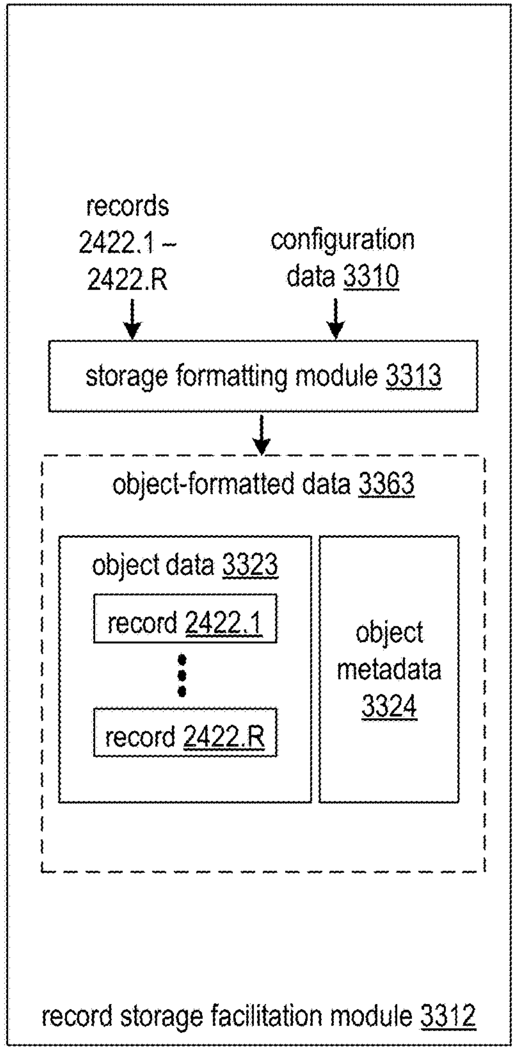
FIG. 35D is a schematic block diagram illustrating a record storage facilitation module that generates, from a plurality of records based on configuration data, object-formatted data for an object that includes the plurality of records in accordance with various embodiments.

FIG. 35D illustrates a record storage facilitation module 3312 that generates, from a plurality of records 2422.1-2422.R based on configuration data 3120, object-formatted data 3363 for an object 2562 that includes the plurality of records. Some or all features and/or functionality of the record storage facilitation module 3312 of FIG. 35D can implement the record storage facilitation module 3312 of FIG. 35A, 35B, 35C, and/or any embodiment of the record storage facilitation module 3312 described herein.

In this example, a given plurality of records is processed into object-formatted data 3363 corresponding to a single object 2562. For example, the corresponding configuration data 3210 can dictate that the given plurality of records be included in a single object rather than multiple objects.

In embodiments where the request 3444 indicates the object-formatted data 3363 as illustrated in FIG. 35B, the request processing module can process the object-formatted data 3363 of an incoming request to write a single corresponding object 2562. In embodiments where a given request 3444 includes the set of records 2422 for processing into object-formatted data 3363 by record processing module 3144 as illustrated in FIG. 35C, the record processing module 3144 can generate the object-formatted data 3363 for a single object 2562 from the records 2422 of a given request 3444.

The given object-formatted data 3363 can be generated in accordance with the configuration data (e.g. for the given dataset/given data source/autogenerated based on the incoming records, etc.). Some or all of configuration data 3210 can be generated by/configured by/received from/accessed from storage in: the object storage system 3105, the request processing module 3144, the data source 3405, the data processing system 3107, and/or other entity.

For example, in cases where the object-formatted data 3363 is generated by the data source, the data source can receive the configuration data 3210 from the object storage system 3105 (e.g. where the object storage system 3105 generated/selected the configuration data 3210 to control how incoming records be configured in its storage) and generate its object-formatted data 3363 accordingly. Alternatively or in addition, the data source can select/generate the configuration data 3210 to be applied to its records itself, where the data source controls how its records are configured in storage of object storage system 3105.

Figure 35E:
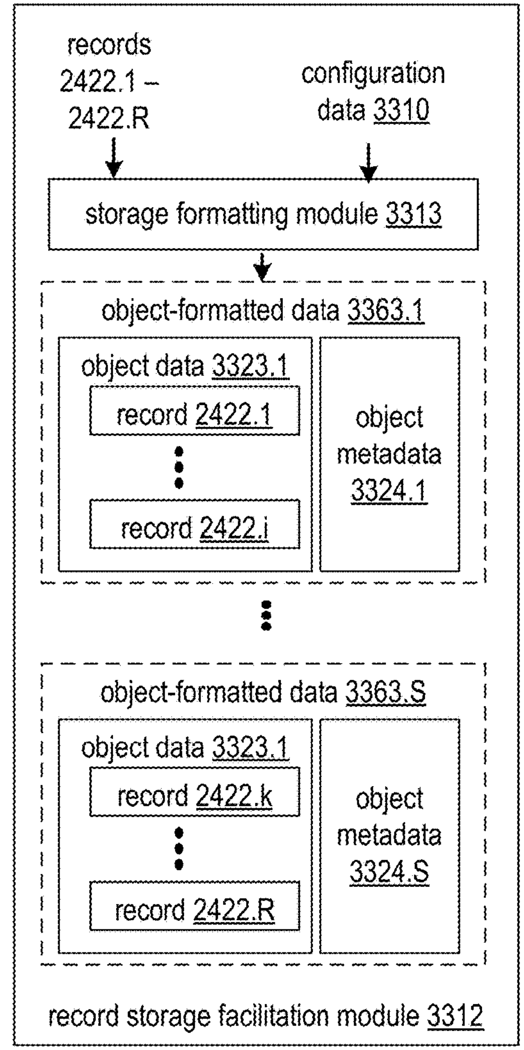
FIG. 35E is a schematic block diagram illustrating a record storage facilitation module that generates, from a plurality of records based on configuration data, object-formatted data for a plurality of objects that collectively include the plurality of records in accordance with various embodiments.

FIG. 35E illustrates a record storage facilitation module 3312 that generates, from a plurality of records based on configuration data 3210, object-formatted data 3334 for a plurality of objects that collectively include the plurality of records 2422.1-2422.R. Some or all features and/or functionality of the record storage facilitation module 3312 of FIG. 35E can implement the record storage facilitation module 3312 of FIG. 35A, 35B, 35C, and/or any embodiment of the record storage facilitation module 3312 described herein.

In this example, a given plurality of records is processed into object-formatted data 3363 corresponding to a multiple objects 2562.1-2562.S, where a corresponding plurality of object-formatted data 3363.1-3363.S is generated. For example, the corresponding configuration data 3210 can dictate that the given plurality of records be included in a multiple object rather than a single objects (e.g. different fields in different objects; different subsets of the records across different objects; and/or any configuration of multiple records across multiple objects described herein, for example, as illustrated in conjunction with one or more of the examples of FIGS. 29A-29M.

Figure 35G:
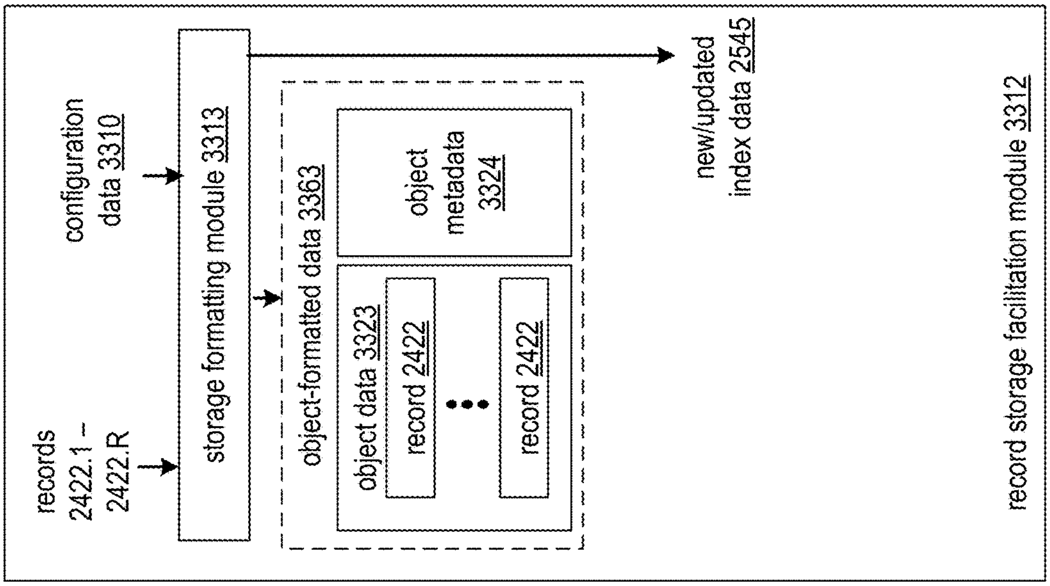
FIG. 35G is a schematic block diagram illustrating a record storage facilitation module that generates, from a plurality of records based on configuration data, object-formatted data for at least one object and corresponding index data in accordance with various embodiments.
Figure 35F:
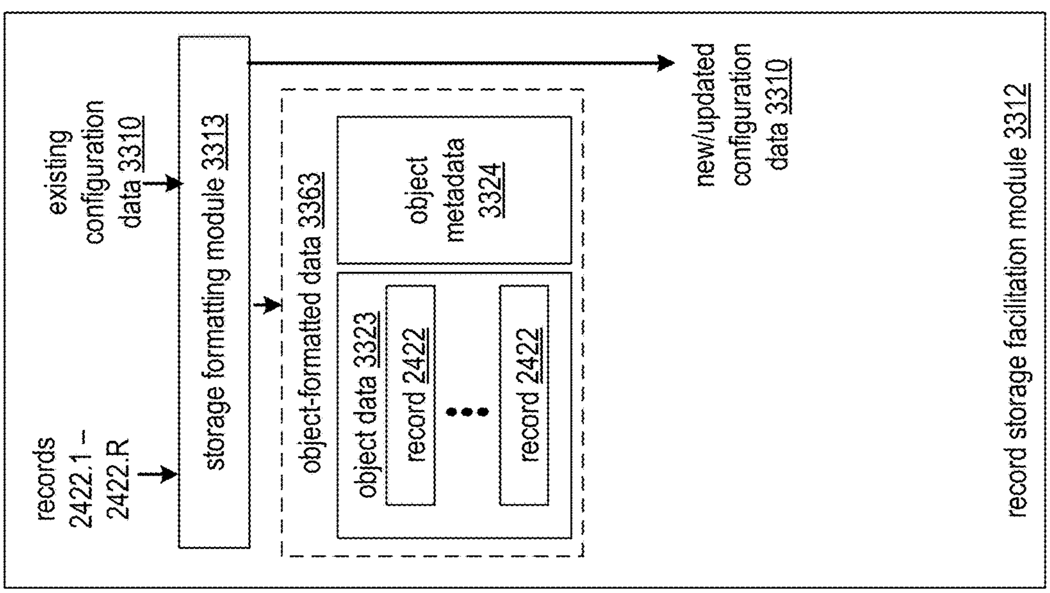
FIG. 35F is a schematic block diagram illustrating a record storage facilitation module that generates, from a plurality of records based on existing configuration data, object-formatted data for at least one object and corresponding configuration data in accordance with various embodiments.

FIG. 35F illustrates a record storage facilitation module that generates, from a plurality of records based on existing configuration data 3210, object-formatted data 3334 for at least one new object 2562, as well as corresponding configuration data 3210 for the at least one new object 2562. For example, the new configuration data indicates how the new objects are configured (e.g. which datasets they have records for; how they are formatted; how/whether they be indexed/etc.). Some or all features and/or functionality of the record storage facilitation module 3312 of FIG. 35D can implement the record storage facilitation module 3312 of FIG. 35A, 35B, 35C, and/or any embodiment of the record storage facilitation module 3312 described herein.

This new/updated configuration data 3210 can be added to/can replace the existing configuration data 3210 to reflect the additions of the new objects as configuration data 3210 is accessed in processing requests 3131. For example, the request processing module 3144 performs this updating of the existing configuration data 3210 via additional writes/modification of the existing configuration data 3210 in respective configuration data storage resources 3309 accordingly, based on having generated the new configuration data 3210 in processing request 3444 and/or based on having received the new configuration data 3210 in request 3444. This can include generating corresponding configuration objects and/or updating the object metadata of the new objects in cases where the configuration data 3210 is stored in objects.

The new configuration data can optionally be generated separately from generating the some or all of the object-formatted data 3363. For example, the data source 3304 generates the new configuration data for inclusion in the request 3444 and the record processing system 3144 generates the object-formatted data 3363 based on the request 3444. As another example, the data source 3304 generates the object-formatted data 3363 for inclusion in the request 3444 and the record processing system 3144 generates the new configuration data based on the request 3444.

FIG. 35G illustrates a record storage facilitation module 3312 that generates, from a plurality of records based on new and/or existing configuration data 3210, object-formatted data 3334 for at least one object 2562, as well as corresponding index data 2545. For example, the index data is generated based on the configuration data 3210 indicating which fields of the set of records 2422 be indexed and/or how each field be indexed (e.g. which type of index structure to employ). Some or all features and/or functionality of the record storage facilitation module 3312 of FIG. 35G can implement the record storage facilitation module 3312 of FIG. 35A, 35B, 35C, and/or any embodiment of the record storage facilitation module 3312 described herein.

This new/updated index data can be added to/can replace the existing index data 2545 (e.g. the new index structures can be added). The configuration data can also be updated accordingly to indicate these indexes for the new objects/new records. For example, the request processing module 3144 performs this updating of the existing index data 2545 via additional writes (e.g. generating and writing the new structures to index data storage resources 3420 accordingly, based on having generated the new index data 2545 in processing request 3444 and/or based on having received the new index data 2545 in request 3444. This can include generating corresponding index objects and/or updating the object metadata of the new objects in cases where the index data 2545 is stored in objects.

The new index data 2545 can optionally be generated separately from generating the some or all of the object-formatted data 3363. For example, the data source 3304 generates the new index data 2545 for inclusion in the request 3444 and the record processing system 3144 generates the index data 2545 based on the request 3444. As another example, the data source 3304 generates the index data 2545 for inclusion in the request 3444 and the record processing system 3144 generates the new configuration data based on the request 3444.

Figure 35H:
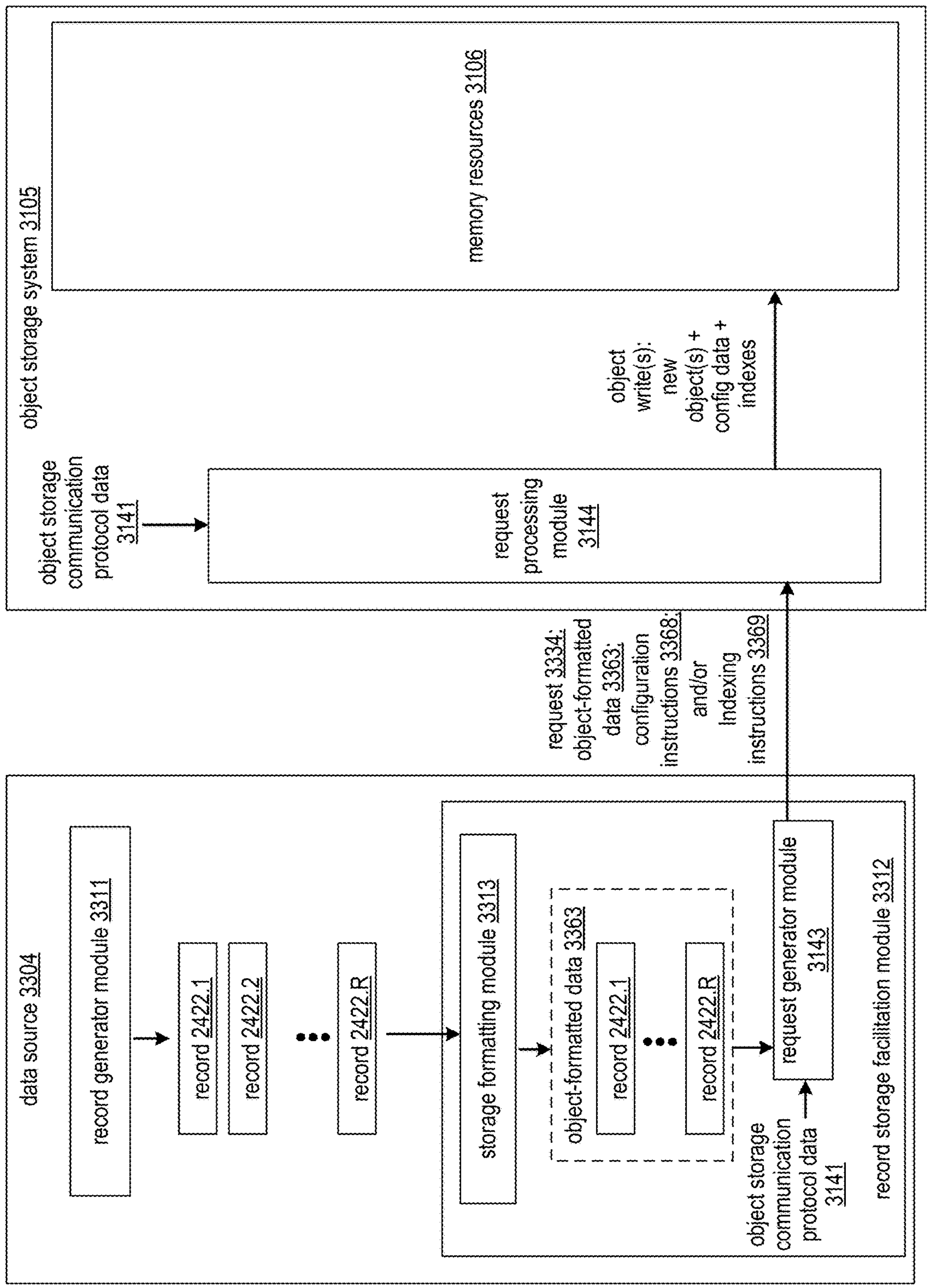
FIG. 35H is a schematic block diagram illustrating a data source that implements a record storage facilitation module that generates a request that includes object-formatted data, configuration instructions, and/or indexing instructions for processing by a request processing module of an object storage system in accordance with various embodiments.

FIG. 35H illustrates a data source 3304 that implements a record storage facilitation module 3312 that generates a request 3334 that includes object-formatted data 3363, configuration instructions 3368, and/or indexing instructions 3369 for processing by a request processing module of an object storage system 3105. The request processing module can generate and/or store corresponding configuration data 3210 and/or corresponding index data 2545 based on the configuration instructions 3368 and/or indexing instructions 3369 respectively, for example, based on the request 3444 indicating the configuration instructions 3368 and/or indexing instructions 3369 in accordance with structuring/syntax of the object storage communication protocol data 3141. Some or all features and/or functionality of the record storage facilitation module 3312 of FIG. 35H can implement the record storage facilitation module 3312 of FIG. 35A and/or any embodiment of the record storage facilitation module 3312 described herein. Some or all features and/or functionality of the data source 3304 of FIG. 35H can implement the data source of FIG. 35A and/or any embodiment of a data source described herein. Some or all features and/or functionality of the request processing module 3144 of FIG. 35H can implement any embodiment of the request processing module 3144 described herein.

Figure 36A:
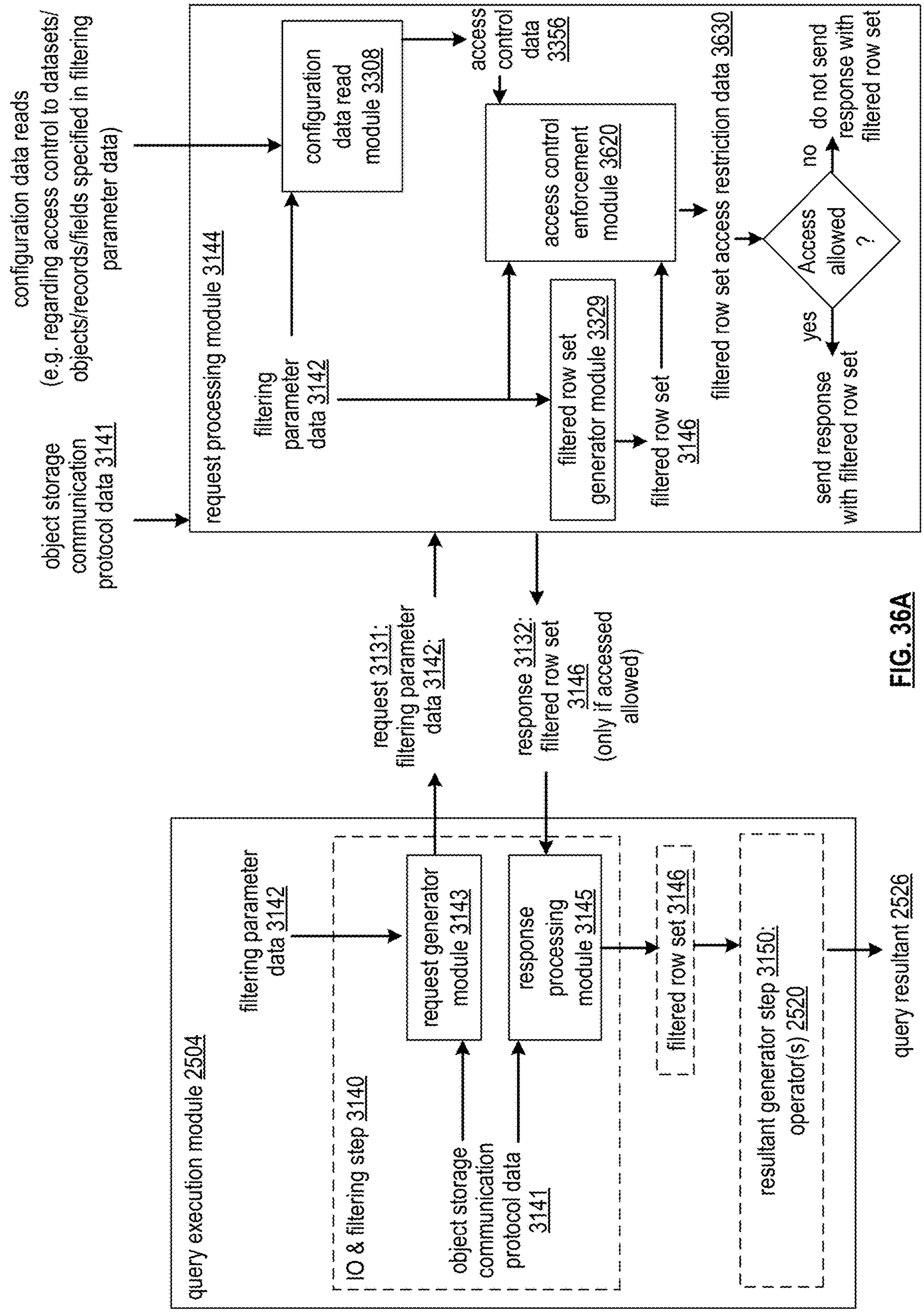
FIG. 36A is a schematic block diagram illustrating query execution based on a query execution module communicating with an object storage system that generates access restriction data for a filtered row set based on access control data in accordance with various embodiments.

FIG. 36A illustrates an embodiment of a request processing module 3144 that implements an access control enforcement module 3620 operable to generate filtered row set access restriction data 3630 based on access control data 3356 indicating whether the filtered row set 3146 can be sent in response 3132 to the data processing system. Some or all features and/or functionality of the request processing module 3144 of FIG. 36A can implement any embodiment of the request processing module 3144 described herein.

A configuration data read module 3308 can read access control data 3356 (e.g. from configuration data 3310 in any one or more configuration data storage resources 3309 as discussed herein). In some embodiments, all access control data 3356 is accessed. Alternatively, only relevant access control data 3356 is accessed (E.g. for at least one respective dataset 3211 indicated in the filtering parameter data 3142 of request 3131; for at least one respective object 2562 storing the records to be accessed as indicated in the filtering parameter data 3142 of request 3131; for at least one respective record 2422 to be accessed as indicated in the filtering parameter data 3142 of request 3131; for at least one respective field 2515 to be accessed/have values 2708 returned in response 3132 as indicated in the filtering parameter data 3142 of request 3131; for at least one filtering operation or other query operation to be performed in generating filtered row set 3146; and/or any other aspect of the access).

An access control enforcement module 3620 can determine whether the access control data 3356 is adhered to in processing the request 3131. This can be based on comparing the filtering parameter data 3142 of request 3131 to requirements of access control data 3356 to determine whether or not the request 3131 is allowed. Alternatively or in addition, some or all of access control data 3356 may depend on the content of the resulting filtered row set 3146, where adherence to access control data 3356 is determined once filtered row set 3146 is produced (e.g. based on which record it includes, the number of records it includes based on the access control data 3356 denoting a maximum or minimum number of rows, etc.).

The access control enforcement module 3620 can thus generate filtered row set access restriction data 3630 denoting whether the filtered row set 3146 corresponding to the given request is allowed to be accessed, prior to its generation or after its generation. When the filtered row set access restriction data 3630 indicates filtered row set is allowed to be accessed (e.g. based on all the requirements of access control data 3356 being met), the response can be generated to include the filtered row set 3146 (e.g. where the filtered row set 3146 is generated if not already generated). When the filtered row set access restriction data 3630 indicates filtered row set is not allowed to be accessed (e.g. based on one or more requirements of access control data 3356 not being met), the response 3132 that includes the filtered row set 3146 is not sent to data processing system 3107. For example, the response 3132 instead included only an acceptable portion of filtered row set 3146 and/or includes a notification indicating access to filtered row set 3146 is denied/that the request 3131 is not allowed. Such adaptation of response 3132 in cases where access to filtered row set 3146 is not allowed and/or where the request 3131 cannot be fulfilled as request can be structured in accordance with the object storage communication protocol data 3141.

Figure 36B:
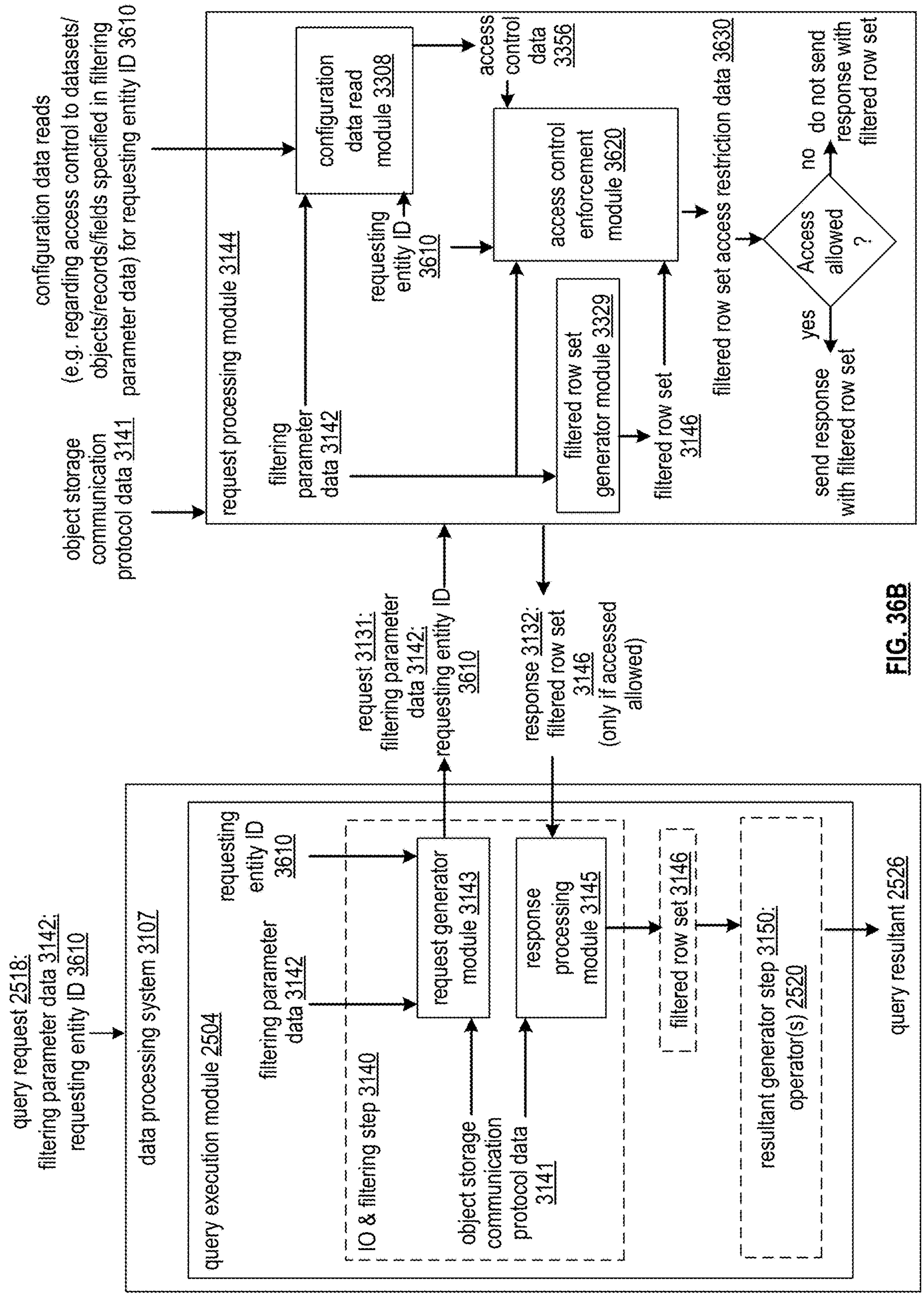
FIG. 36B is a schematic block diagram illustrating query execution of a query requested by a requesting entity based on a query execution module communicating with an object storage system that generates access restriction data for a filtered row set based on access control data for a requesting entity ID in accordance with various embodiments.

FIG. 36B illustrates an embodiment where access control data 3356 is based on requesting entity. For example, different requesting entities have different access privileges. The requesting entity can correspond to a user/computing device/company/other entity that generated and/or sent the query request for which the request 3131 is generated by data processing system 3107. Alternatively or in addition, the requesting entity can correspond to the data processing system 3107 itself, where different data processing systems 3107 have different access privileges. Whether the filtered row set 3146 for request 3131 is allowed to be accessed can thus be further based on the restrictions in access control data 3356 applied to the given requesting entity, for example based on a requesting entity ID 3610, and/or credentials/other characteristics of requesting entity, which can be indicated in the request 3131, for example, in accordance with syntax/structuring of the object storage communication protocol data 3141. Some or all features and/or functionality of the request processing module 3144 of FIG. 36B can implement the request processing module 3144 of FIG. 36A and/or any embodiment of the request processing module 3144 described herein.

Figure 36C:
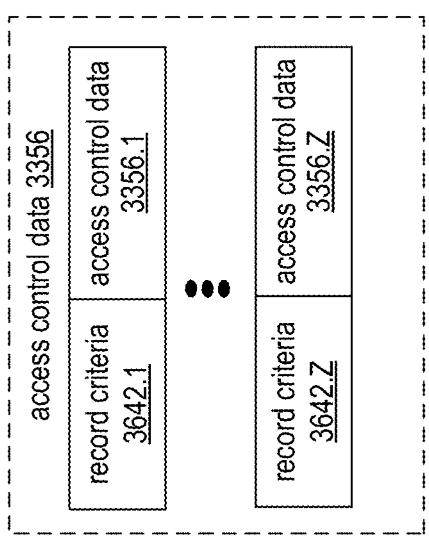
FIG. 36C illustrates access control data that includes access control data for each of a plurality of record criteria in accordance with various embodiments.
Figure 36D:
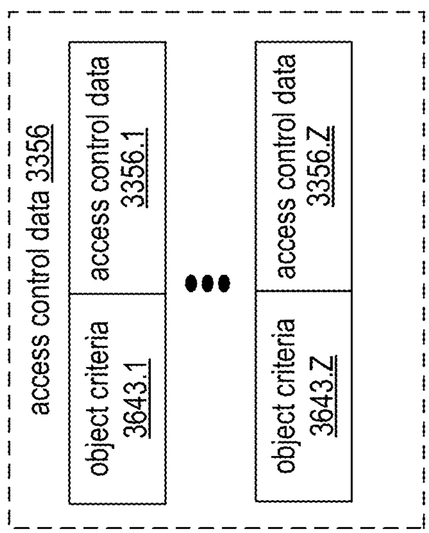
FIG. 36D illustrates access control data that includes access control data for each of a plurality of object criteria in accordance with various embodiments.
Figure 36E:
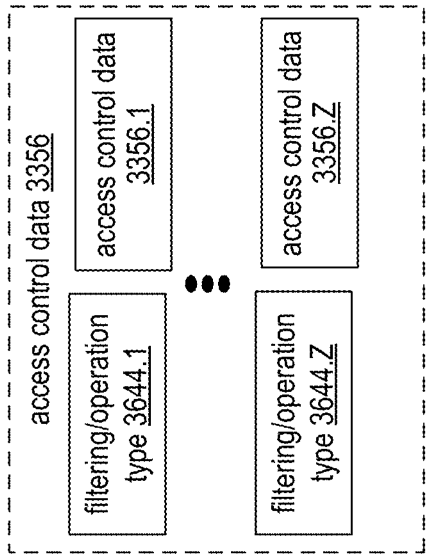
FIG. 36E illustrates access control data that includes access control data for each of a plurality of filtering and/or operation criteria in accordance with various embodiments.

FIGS. 36C-36E illustrate various examples of types of access control data 3356. Some or all embodiments of the access control data 3356 of FIG. 36C, 36D, and/or 36E can implement the access control data 3356 of FIG. 36A and/or any embodiment of access control data 3356 and/or configuration data described herein.

As illustrated in FIG. 36C, different records 2422 having different record criteria 3642 can have different access control data 3356 (e.g. across all requesting entities, or configured differently for different requesting entities). Different record criteria 3642 can correspond to/be based on: different record identifiers, different data providers of different records; different ages of different records; different datasets 3211 of different records; types of data included in one or more fields of the records; and/or other differences. Access control data 3356 can thus be configured on a per-record basis, even for different records included within a same dataset 3211 and/or a same object 2562. For example, when access control data 3356 indicates records meeting given record criteria 3642 cannot be included in (or cannot be accessed even if filtered out) in generating filtered row set 3146 (e.g. for a given requesting entity), and the filtered row set 3146 is determined to include/involve access to these records, the filtered row set 3146 is thus optionally not included in response 3132.

Alternatively or in addition, as illustrated in FIG. 36D, different objects 2562 having different object criteria 3643 can have different access control data 3356 (e.g. across all requesting entities, or configured differently for different requesting entities). Different object criteria 3643 can correspond to/be based on: different object identifiers, different object types, different data providers of different objects; different ages of different objects; different datasets 3211 of different objects; the number of records included in different objects; the field/data type of different objects; and/or other differences. Access control data 3356 can thus be configured on a per-object basis, even for different objects included within a same dataset 3211 and/or having a same object type. For example, when access control data 3356 indicates objects meeting given record criteria 3642 cannot be included in (or cannot be accessed even if filtered out) in generating filtered row set 3146 (e.g. for a given requesting entity), and the filtered row set 3146 is determined to include records of/involve access to these objects, the filtered row set 3146 is thus optionally not included in response 3132.

Alternatively or in addition, as illustrated in FIG. 36E, different types of filtering and/or operations having different filtering/operation types 3644 can have different access control data 3356 (e.g. across all requesting entities, or configured differently for different requesting entities). Different filtering/operation types 3644 can correspond to/be based on: different levels of filtering, such as types of filtering operators, percentage of records filtered, size of the filtered row set, whether aggregation/sorting/further processing is performed, etc., types of operations (e.g. query operations) performed to generate filtered row set or subsequently performed upon filtered row set, or other differences. Access control data 3356 can thus be configured on a per-filtering type/operation type basis. For example, when access control data 3356 indicates filtering/operations meeting given filtering/operation type 3644 cannot be utilized to generate filtered row set 3146/cannot be characterized by the resulting filtered row set 3146 (e.g. for a given requesting entity), and the filtered row set 3146 is determined to be generated via such filtering/operation types, the filtered row set 3146 is thus optionally not included in response 3132.

While not depicted, different fields and/or different datasets can similarly have different access control data (e.g. across all requesting entities, or configured differently for different requesting entities). Different field criteria can correspond to/be based on: different data types of different fields, different fixed/average size of the corresponding values of the field, different data providers/equipment that generated/measured the underlying values, privacy associated with different fields, monetary value associated with information stored by the different fields, and/or other differences. Access control data 3356 can thus be configured on a per-field basis, even for different fields included within a same dataset 3211/same object 2562/same record 2422. For example, when access control data 3356 indicates fields meeting given field criteria cannot have values included in (or cannot be accessed/utilized to generate filtered row set 3146 via filtering parameters) in generating filtered row set 3146 (e.g. for a given requesting entity), and the filtered row set 3146 is determined to include values of/involve access to these fields, the filtered row set 3146 is thus optionally not included in response 3132.

Figure 36F:
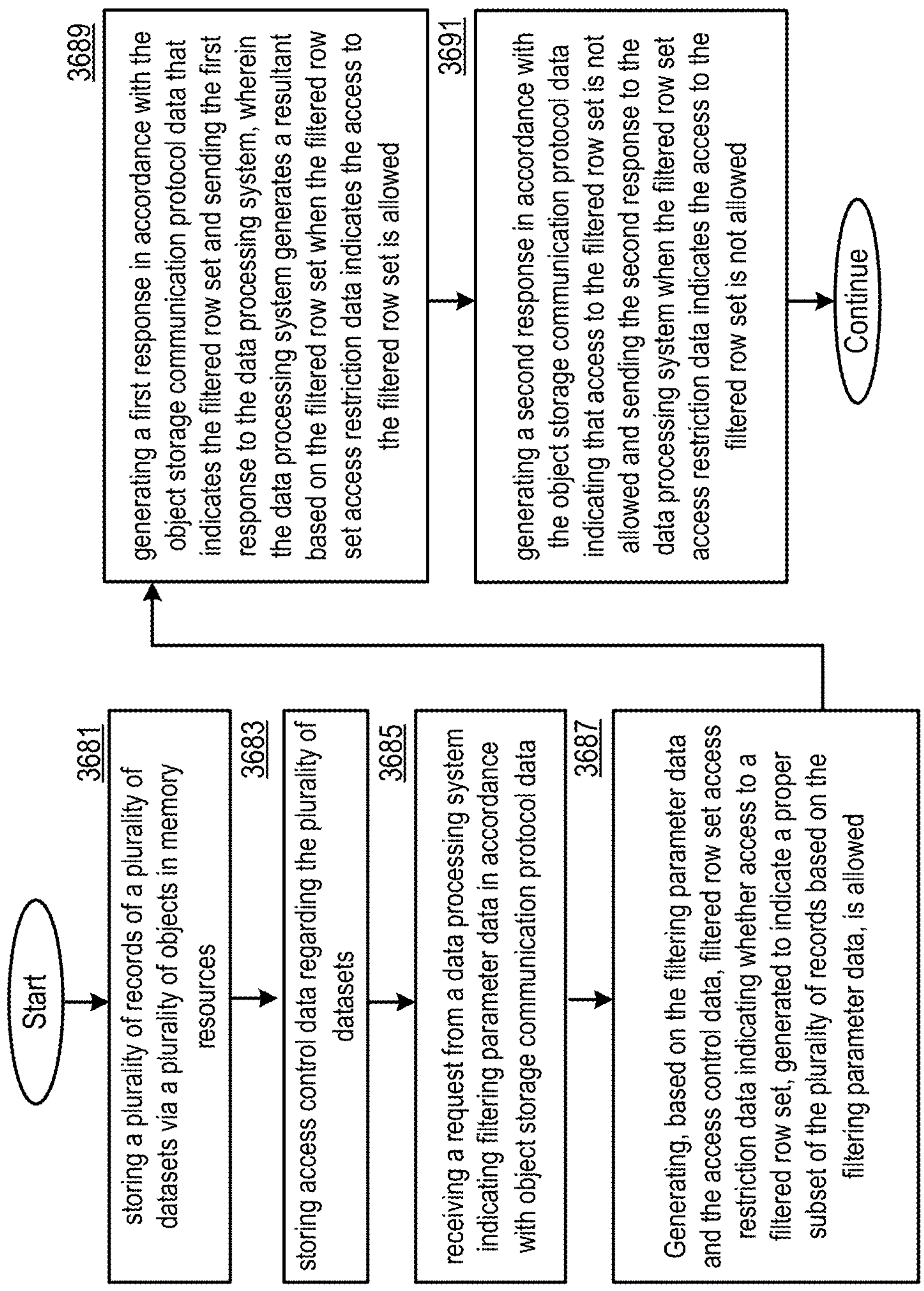
FIG. 36F is a logic diagram illustrating a method for execution in accordance with various embodiments.

FIG. 36F illustrates a method for execution, for example, by an object storage system 3105 and/or a request processing module 3144. For example, the data processing system 3107 can include utilize a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 36F. In particular, a parallelized resource 3050 can implement a corresponding processing module to execute some or all of the steps of FIG. 36F, where multiple parallelized resources 3050 implement their own processing modules to independently execute some or all of the steps of FIG. 36F for example, to facilitate processing of a request 3131 and/or to generate a corresponding response 3132 based on each generating filtered row subsets 3148 that collectively constitute a filtered row set 3146, and/or based on each generating filtered row set access restriction data for their respective filtered row subsets 3148.

Some or all of the method of FIG. 36F can be performed based on communicating with a data processing system 3107. Some or all of the method of FIG. 36F can be performed by the data processing system 3107 instead of the object storage system 3105 based on communication between object storage system 3105 and data processing system 3107. Some or all of the steps of FIG. 36F can optionally be performed by database system 10 and/or any other processing module. Some or all of the steps of FIG. 36F can be performed to implement some or all of the functionality of the data processing system 3107 and/or object storage system 3105 as described in conjunction with FIG. 36A-36F. Some or all of the steps of FIG. 36F can be performed based on communications exchanged in accordance with an API dictated by object storage communication protocol data 3141. Some or all of the steps of FIG. 36F can be performed to implement some or all of the functionality regarding execution of a query via the plurality of nodes in the query execution plan 2405. Some or all steps of FIG. 36F can be performed in accordance with other embodiments of object storage system 3105 described herein. Some or all steps of FIG. 36F can be performed in conjunction with performing some or all steps of FIG. 31C, 32E, 34G, and/or some or all steps of any other method described herein.

Step 3681 includes storing a plurality of records of a plurality of datasets via a plurality of objects in memory resources. Step 3683 includes storing access control data regarding the plurality of datasets. Step 3685 includes receiving a request from a data processing system indicating filtering parameter data in accordance with object storage communication protocol data. Step 3687 includes generating. based on the filtering parameter data and the access control data, filtered row set access restriction data indicating whether access to a filtered row set generated to indicates a proper subset of the plurality of records based on the filtering parameter data is allowed.

Step 3689 includes generating a first response in accordance with the object storage communication protocol data that indicates the filtered row set and sending the first response to the data processing system, where the data processing system generates a resultant based on the filtered row set when the filtered row set access restriction data indicates the access to the filtered row set is allowed. Step 3691 includes generating a second response in accordance with the object storage communication protocol data indicating that access to the filtered row set is not allowed and sending the second response to the data processing system when the filtered row set access restriction data indicates the access to the filtered row set is not allowed. In various examples, when the filtered row set access restriction data indicates the access to the filtered row set is allowed, step 3689 is performed and step 3691 is not performed. In various examples, when the filtered row set access restriction data indicates the access to the filtered row set is not allowed, step 3689 is not performed and step 3691 is performed.

In various embodiments, any one of more of the various examples listed above are implemented in conjunction with performing some or all steps of FIG. 36F. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 36F described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 36F, for example, in conjunction with further implementing any one or more of the various examples described herein.

In various embodiments, the operational instructions, when executed by the at least one processor, cause the at least one processor to: store a plurality of records of a plurality of datasets via a plurality of objects in memory resources; store access control data regarding the plurality of datasets; receive a request from a data processing system indicating filtering parameter data in accordance with object storage communication protocol data; and/or generate. based on the filtering parameter data and the access control data, filtered row set access restriction data indicating whether access to a filtered row set generated to indicates a proper subset of the plurality of records based on the filtering parameter data is allowed. In various examples, when the filtered row set access restriction data indicates the access to the filtered row set is allowed, the operational instructions, when executed by the at least one processor, further cause the at least one processor to: generate a first response in accordance with the object storage communication protocol data that indicates the filtered row set; and/or send. the first response to the data processing system, where the data processing system generates a resultant based on the filtered row set. In various examples, when the filtered row set access restriction data indicates the access to the filtered row set is not allowed, the operational instructions, when executed by the at least one processor, further cause the at least one processor to: generate a second response in accordance with the object storage communication protocol data indicating that access to the filtered row set is not allowed; and/or send the second response to the data processing system.

FIG. 37A illustrates query execution of a query based on a query execution module 2504 communicating with a request processing module 3144 for an object storage system 3105 that accesses index data 2545. Some or all features and/or functionality of the query execution module 2504 of FIG. 37A can implement the query execution module 2504 of FIG. 28B and/or any other embodiment of query execution module 2504 described herein. Some or all features and/or functionality of the request processing module 3144 of FIG. 37A can implement the request processing module 3144 of FIG. 28A and/or any embodiment of the request processing module 3144 described herein. Some or all features and/or functionality of the index data 2545 can implement the index data 2545 of FIG. 28D and/or any other embodiment of index data 2545 described herein.

The index data 2545 can indicate a plurality of index structures 3352.1-3352.S, each indexing at least one field of a set of records of at least one dataset. A given index structure 3352 can indicate a plurality of index values 3219 each mapped to a corresponding row set 3220, identifying which rows meet a corresponding condition denoted by index value 3219 and/or otherwise being associated with the index value (e.g. for a respective field).

Some or all of the plurality of index structures 3352 can be implemented via same or different types of index structures. A set of types of index structures implemented by some or all of the plurality of index structures 3352 can include: at least one probabilistic index structure, at least one non-probabilistic index structure, a bloom filter, a projection index, a data-backed index, a filtering index, a composite index, a zone map, a bit map, a B-tree, a secondary index, a primary index, a cluster key index, and/or any one or more other types of index structures.

The index data reads can include access to one or more index structures 3352, for example, based on the filtering parameter data. Different index structures can be stored in different locations via different memory resources. One or more index structures can be stored in same/similar locations via shared memory resources.

FIG. 37B illustrates index structure storage resources 3708 storing a plurality of index data 2545 for a plurality of datasets stored in memory resources 3106 of an object storage system 3105, where index data 2545 of each dataset stores at least one index structure 3352 for at least one field 2515. One or more index structures 3352 can optionally store index data for groups of multiple fields. Index data 2545 for a given dataset 3211 can optionally have multiple index structures for a same field/same group of fields, for example, indexing different subsets of records within the given dataset (e.g. stored in different sets of objects). Some or all fields of a given dataset are optionally not indexed (e.g. in this example, fields 2515.*a*.1 and 2515.*a*.4 are indexed via index structures, where fields 2515.*a*.2 and 2515.*a*.3 are optionally not indexed via any index structures). Some or all features and/or functionality of the index data 2545 of FIG. 37B can implement the index data 2545 of FIG. 37A and/or any other embodiment of index data 2545 described herein.

FIG. 37C illustrates index structure storage resources 3706 storing an index structure 3352 for a given field 2515.*a*.1 of a given dataset 3211.*a*, indexing records of the dataset in an indexed object set 3713.*a*.1 and not indexing record of the dataset in an unindexed object set 3714.*a*.1. Some or all features and/or functionality of the index data 2545 of FIG. 37B can implement the index data 2545 of FIG. 37A and/or any other embodiment of index data 2545 described herein.

In some embodiments, additional index structures for dataset 3211.*a* can index other fields for some or all records the same indexed object set 3713.*a*.1 and/or not for some or all records of the same unindexed object set 3714.*a*.1. In some embodiments, additional index structures for dataset 3211.*a* can index other fields for some of all records of the unindexed object set 3714.*a*.1 and/or not for some or all records of the indexed object set 3713.*a*.1.

FIG. 37D illustrates a filtered row set generator module 3329 of a request processing module 3144 that implements an index access module 3373 that accesses at least one index structure 3352 in index structure storage resources 3708. Some or all features and/or functionality of the request processing module 3144 of FIG. 37D can implement the request processing module 3144 of FIG. 37A and/or any embodiment of request processing module 3144 described herein. Some or all features and/or functionality of the filtered row set generator module 3329 of FIG. 37D can implement the filtered row set generator module 3329 of FIG. 34A and/or any embodiment of the filtered row set generator module 3329 described herein. Some or all features and/or functionality of the one or more index access modules 3373 of FIG. 37D can implement the index access module 3373 of FIG. 34C and/or any other embodiment of index access module 3373 described herein. For example, the index access modules 3373 is executed to access at least one index structure 3352 to generate a filtered row list 3412 for a corresponding filtering parameter 3243 in conjunction with executing a corresponding record identification pipeline 3365 as discussed previously.

FIGS. 37E and 37F illustrate a filtered row set generator module 3329 of a request processing module 3144 that implements an index access module 3373 that accesses at least one index structure 3352 in index structure storage resources 3708, and that further implements at least one sourcing module 3371 that accesses at least one value of at least one field 2515 of at least one record 2422 in memory resources 3106 of an object storage system. The filtered row set generator module 3329 of FIG. 37E and/or 37F can implement the filtered row set generator module 3329 of FIG. 37A and/or any embodiment of the filtered row set generator module 3329 described herein. Some or all features and/or functionality of the index access module 3373 of FIG. 37E and/or 37F can implement the index access module 3373 of FIG. 37A and/or any other embodiment of index access module 3373 described herein. Some or all features and/or functionality of the sourcing module 3371 of FIG. 37E and/or 37F can implement the sourcing module 3371 of FIG. 34C and/or any other embodiment of sourcing module 3371 described herein.

For example, the index access module 3373 of FIG. 37E and/or 37F is executed to access at least one index structure 3352 to generate a filtered row list 3412 for a corresponding filtering parameter 3243 in conjunction with executing a corresponding record identification pipeline 3365 as discussed previously. Executing index access module 3373 can include accessing the at least one index structure 3352 via access to index structure storage resources 3708.

In the example of FIG. 37E, the sourcing module 3371 is applied serially after the index access module 3373. For example, the filtered row list 3412 generated by the index access module 3373 can be further filtered/processed prior to applying sourcing module 3371 and/or is inputted directly to sourcing module 3371 for sourcing of values for the respective rows. For example, the sourcing module 3371 sources values for all rows in filtered row list 3412, only the rows in filtered row list 3412 not further filtered out, and/or additional rows included in an incoming row list via additional elements between the index access module 3373 and the sourcing module 3371. The sourcing module can source the required fields based on accessing objects in memory resources 3106 of object storage system 3105.

In the example of FIG. 37F, the sourcing module 3371 is applied in a first parallelized track in parallel with a second parallelized track in which the index access module 3373 is applied. For example, the resulting row sets generated via serialized elements of each parallelized track are processed via a set operation 3811 (e.g. set intersection, set union, set difference, etc.) to generate a singular set as output, which can correspond to the filtered row set and/or can be further processed to generate the filtered row set.

The index structure storage resources 3708 from which the at least one index structure 3352 is accessed to generate filtered row list 3412 can be implemented as memory resources 3106 of object storage system 3105, for example, where the index structure 3352 is accessed via accessing at least one object 2562 storing the index structure 3352. Alternatively or in addition, the index structure storage resources 3708 can be implemented as separate memory resource separate from the memory resources 3106 of object storage system 3105, such as non-object storage resources. Embodiments of index structure storage resources 3708 from which index structures 3352 are accessed by filtered row set generator module 3329 are discussed in further detail in conjunction with FIGS. 38A-39E.

The sourcing module 3371 and index access module 3373 of FIG. 37E and/or 37F can correspond to the same field (e.g. the index access module 3373 accesses an index structure 3352 for a given field 2515, and the sourcing module 3371 sources the values for this given field). The sourcing module 3371 and index access module 3373 of FIG. 37E and/or 37F can correspond to different fields (e.g. the index access module 3373 accesses an index structure 3352 for a first given field 2515, and the sourcing module 3371 sources the values for a different given field).

In some embodiments, the sourcing module 3371 is applied after the index access module 3373 based on the index access module 3373 accessing a probabilistic index, where the sourcing module sources values for a superset of rows satisfying filtering parameters 3243, and/or where a filtering module 3372 further filters the rows based on their sourced values to identify the true set of rows satisfying filtering parameters 3243.

In some embodiments, the sourcing module 3371 is applied after/in parallel with index access module 3373 based on the values for the respective field being included in the filtered row set 3142, for example, based on being requested in request 3131 based on being required by data processing system 3107 for generating the query resultant (e.g. to be included in the resultant and/or to be further processed/manipulated to generate the resultant).

FIG. 37G illustrates a filtered row set generator module 3329 of a request processing module that executes a first record identification pipeline 3365.1 to generate a first filtered row subset 3446.1 based on accessing at least one index structure 3352 indexing records in an indexed object set 3713.*a*.1, and that further executes a second record identification pipeline 3365.2 to generate a second filtered row subset 3446.2 based on reading values from objects in an unindexed object set 3714.*a*.1. For example, the first record identification pipeline 3365.1 is implemented via an index access module 3373 for the corresponding field 2515.*a*.1 based on applying corresponding filtering parameters 3243 (e.g. as illustrated in FIG. 34B) while the second record identification is implemented via a sourcing module 3371 for the corresponding field 2515.*a*.1 serially followed by a filtering module 3372 filtering the records by their sourced value based on the corresponding filtering parameters 3243 (e.g. as illustrated in FIG. 34C). The filtered row set generator module 3329 of FIG. 37G can implement the filtered row set generator module 3329 of FIG. 37A and/or any embodiment of the filtered row set generator module 3329 described herein. The record identification pipelines 3365.1 and/or 3365.2 of FIG. 37G can implement different record identification pipelines 3365.1 and/or 3365.2, respectively, of FIG. 34E applied to different object subsets (e.g. where record identification pipelines 3365.1 of FIG. 37G optionally involves access to index structures instead of access to corresponding indexed objects within the corresponding indexed object set 3713.*a*.1).

FIG. 37H illustrates a method for execution, for example, by an object storage system 3105 and/or a request processing module 3144. For example, the data processing system 3107 can include utilizing a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 37H. In particular, a parallelized resource 3050 can implement a corresponding processing module to execute some or all of the steps of FIG. 37H, where multiple parallelized resources 3050 implement their own processing modules to independently execute some or all of the steps of FIG. 37H for example, to facilitate processing of a request 3131 and/or to generate a corresponding response 3132 based on each generating filtered row subsets 3148 that collectively constitute a filtered row set 3146.

Some or all of the method of FIG. 37H can be performed based on communicating with a data processing system 3107. Some or all of the method of FIG. 37H can be performed by the data processing system 3107 instead of the object storage system 3105 based on communication between object storage system 3105 and data processing system 3107. Some or all of the steps of FIG. 37H can optionally be performed by database system 10 and/or any other processing module. Some or all of the steps of FIG. 37H can be performed to implement some or all of the functionality of the data processing system 3107 and/or object storage system 3105 as described in conjunction with FIG. 37A-37G. Some or all of the steps of FIG. 37H can be performed based on communications exchanged in accordance with an API dictated by object storage communication protocol data 3141. Some or all of the steps of FIG. 37H can be performed to implement some or all of the functionality regarding execution of a query via the plurality of nodes in the query execution plan 2405. Some or all steps of FIG. 37H can be performed in accordance with other embodiments of object storage system 3105 described herein. Some or all steps of FIG. 37H can be performed in conjunction with performing some or all steps of FIG. 31C, 32E, 34G, 36F, and/or some or all steps of any other method described herein.

Step 3781 includes storing a plurality of records of at least one dataset via a plurality of objects in memory resources of an object storage system. Step 3783 includes storing at least one index structure indexing the plurality of records of the at least one dataset for at least one field of the at least one dataset. Step 3785 includes receiving a request from a data processing system indicating filtering parameter data to filter the plurality of records based on a first field of a first dataset in accordance with object storage communication protocol data. Step 3787 includes generating a filtered row set identifying a proper subset of the plurality of records meeting the filtering parameter data based on accessing a first index structure indexing the plurality of records of the first dataset for the first field. Step 3789 includes sending a response to the data processing system that indicates the filtered row set. In various examples, the data processing system generates a query resultant based on the filtered row set.

In various embodiments, any one of more of the various examples listed above are implemented in conjunction with performing some or all steps of FIG. 39E. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 39E described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 39E, for example, in conjunction with further implementing any one or more of the various examples described herein.

In various embodiments, the operational instructions, when executed by the at least one processor, cause the at least one processor to: store a plurality of records of at least one dataset via a plurality of objects in memory resources of an object storage system; store at least one index structure indexing the plurality of records of the at least one dataset for at least one field of the at least one dataset; receive a request from a data processing system indicating filtering parameter data to filter the plurality of records based on a first field of a first dataset accordance with object storage communication protocol data; generate a filtered row set identifying a proper subset of the plurality of records meeting the filtering parameter data based on accessing a first index structure indexing the plurality of records of the first dataset for the first field; send a response to the data processing system that indicates the filtered row set, where the data processing system generates a query resultant based on the filtered row set.

FIG. 38A illustrates memory resources 3106 of an object storage system 3105 that stores a plurality of dataset objects 3301 and a plurality of index objects 3805. For example, some or all of the index structures 3352 of index data can be stored as the object data 3323 of corresponding index objects 3805 implemented as additional objects stored in the memory resources 3106 of object storage system 3105. Some or all features and/or functionality of index objects 3805 and/or memory resources 3106 can implement some or all of the index structure storage resources 3706.

In some embodiments, a given object 2562 implemented as an index object 3805 can store a single index structure 3352. Alternatively or in addition, a given object 2562 implemented as an index object 3805 can store a multiple index structures 3352. Alternatively or in addition, a given object 2562 implemented as an index object 3805 can store a portion of an index structure 3352, where a given index structure 3352 is stored across multiple index objects.

In embodiments where configuration objects 3302 are implemented as objects 2562 of object storage system, the index objects 3805 can be stored in addition to the dataset objects 3301 and configuration objects 3302. Alternatively or in addition, in embodiments where configuration objects 3302 are implemented as objects 2562 of object storage system, the index objects 3805 can be implemented as configuration objects 3302, where a given configuration object 3302 stores at least one index structure 3352 in addition to other configuration data 3210 (e.g. the index structure 3352 is stored as indexing configuration data 3355 of the configuration data 3210).

FIG. 38B illustrates memory resources 3106 of an object storage system 3105 that stores a plurality of dataset objects 3301 and an index object 3805 storing an index structure 3352 indexing records across multiple dataset objects of the plurality of dataset objects. In particular, a given index structure can index records stored in multiple objects 2562, for example, in accordance with indexing some or all records of a corresponding dataset for at least one corresponding field of the dataset. Alternatively or in addition, a given index structure can index only some or all records stored in a single object 2562, for example, in accordance with indexing some or all records of a corresponding dataset for at least one corresponding field of the dataset. Some or all features and/or functionality of the index object 3805 and/or index structure 3352 of FIG. 38B can implement the index object 3805 and/or index structure 3352 of FIG. 38A and/or any index object 3805 and/or index structure 3352 described herein.

FIG. 38C illustrates a filtered row set generator module 3329 of a request processing module 3144 that generates a filtered row set 3146 based on accessing at least one index object 3805 in memory resources 3106 of an object storage system 3105. The filtered row set generator module 3329 of FIG. 38C can implement the filtered row set generator module 3329 of FIG. 37D (e.g. where the index structure 3352 is accessed via index access module 3373 via accessing a corresponding index object 3805 in memory resources 3106). The index structure 3352 of FIG. 38C can implement the index structure 3352 of FIG. 37D, 38A, and/or any embodiment of the index structure 3352 described herein.

FIGS. 38D and 38E illustrates a filtered row set generator module 3329 of a request processing module 3144 that generates a filtered row set 3146 based on accessing at least one index object 3805 in memory resources 3106 of an object storage system 3105 via an index access module 3373, and based on further reading values from at least one dataset object 3301 in the memory resources 3106 of the object storage system 3105 via a sourcing module 3371. The filtered row set generator module 3329 of FIG. 38D and/or 38E can implement the filtered row set generator module 3329 of FIG. 37E and/or 37F, respectively (e.g. where the index structure 3352 is accessed via index access module 3373 via accessing a corresponding index object 3805 in memory resources 3106). The index structure 3352 of FIG.

38D and/or can implement the index structure 3352 of FIG. 37E, 37F, 38A, and/or any embodiment of the index structure 3352 described herein.

FIG. 38F illustrates a method for execution, for example, by an object storage system 3105 and/or a request processing module 3144. For example, the data processing system 3107 can include utilize a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 38F. In particular, a parallelized resource 3050 can implement a corresponding processing module to execute some or all of the steps of FIG. 38F, where multiple parallelized resources 3050 implement their own processing modules to independently execute some or all of the steps of FIG. 38F for example, to facilitate processing of a request 3131 and/or to generate a corresponding response 3132 based on each generating filtered row subsets 3148 that collectively constitute a filtered row set 3146.

Some or all of the method of FIG. 38F can be performed based on communicating with a data processing system 3107. Some or all of the method of FIG. 38F can be performed by the data processing system 3107 instead of the object storage system 3105 based on communication between object storage system 3105 and data processing system 3107. Some or all of the steps of FIG. 38F can optionally be performed by database system 10 and/or any other processing module. Some or all of the steps of FIG. 38F can be performed to implement some or all of the functionality of the data processing system 3107 and/or object storage system 3105 as described in conjunction with FIG. 38A-38E. Some or all of the steps of FIG. 38F can be performed based on communications exchanged in accordance with an API dictated by object storage communication protocol data 3141. Some or all of the steps of FIG. 38F can be performed to implement some or all of the functionality regarding execution of a query via the plurality of nodes in the query execution plan 2405. Some or all steps of FIG. 38F can be performed in accordance with other embodiments of object storage system 3105 described herein. Some or all steps of FIG. 38F can be performed in conjunction with performing some or all steps of FIG. 31C, 32E, 34G, 36F, 37H, and/or some or all steps of any other method described herein.

Step 3881 includes storing a first plurality of objects in memory resources of an object storage system. In various examples, the first plurality of objects store a plurality of records of at least one dataset. Step 3883 includes storing a second plurality of objects in memory resources of the object storage system. In various examples, the second plurality of objects store a set of index structures indexing the plurality of records of the at least one dataset. Step 3885 includes receiving a request from a data processing system indicating filtering parameter data to filter the plurality of records. Step 3887 includes generating a filtered row set identifying a proper subset of the plurality of records meeting the filtering parameter data based on at least one index structure of the set of index structures based on accessing at least one object of the second plurality of objects. Step 3889 includes sending a response to the data processing system that indicates the filtered row set. In various examples, the data processing system generates a query resultant based on the filtered row set.

In various examples, the method includes: storing a first plurality of objects and a second plurality of objects in memory resources of an object storage system, where the first plurality of objects store a plurality of records of at least one dataset, and/or where the second plurality of objects store a set of index structures indexing the plurality of records of the at least one dataset; receiving a request from a data processing system indicating filtering parameter data to filter the plurality of records in accordance with an object storage communication protocol; generating a filtered row set identifying a proper subset of the plurality of records meeting the filtering parameter data based on accessing at least one index structure of the set of index structures via accessing at least one object of the second plurality of objects; and/or sending a response to the data processing system that indicates the filtered row set, where the data processing system generates a query resultant based on the filtered row set.

In various examples, the data processing system sends the request indicating the filtering parameter data in conjunction with execution of a query by the data processing system, where the data processing system generates the query resultant for the query based on the filtered row set.

In various examples, the data processing system executes the query based on generating a query operator execution flow for the query that includes a first at least one operator serially before a second at least one operator and/or executing the query operator execution flow for the query to generate the query resultant. In various examples, executing the query operator execution flow for the query to generate the query resultant is based on executing the first at least one operator of the query operator execution flow based on generating the request, where the filtering parameter data indicated in the request is automatically determined based on the query, and/or sending the request to the object storage system. In various examples, executing the query operator execution flow for the query to generate the query resultant is further based on executing the second at least one operator of the query operator execution flow based on processing the filtered row set in accordance with the second at least one operator to produce the query resultant.

In various examples, the method further includes generating a record identification pipeline for execution based on the filtering parameter data. In various examples, the record identification pipeline includes a plurality of parallelized branches that implement a plurality of predicates determined based on the filtering parameter data and/or a union element that applies a set union to output of the plurality of parallelized branches. In various examples, the filtered row set is generated based on executing the record identification pipeline.

In various examples, the record identification pipeline includes an index element. In various examples, the at least one index structure is accessed to generate the filtered row set based on executing the index element of the record identification pipeline.

In various examples, the method further includes storing access control data regarding the at least one dataset and/or generating, based on the filtering parameter data and the access control data, filtered row set access restriction data indicating whether access to the filtered row set is allowed. In various examples, the response indicating the filtered row set is generated based on the filtered row set access restriction data indicating access to the filtered row set is allowed.

In various examples, the filtered row set indicates row storage location data for a first filtered row set that is a first proper subset of the plurality of records stored by the object storage system based on the object storage system processing the request. In various examples, the data processing system determines a second filtered row set as a second proper subset of the first filtered row set based on executing at least one query operator. In various examples, the method further includes receiving a second request for field values that indicates the row storage location data for the second filtered row set in accordance with the object storage communication protocol and/or sending a second response indicating the field values of the second filtered row set based on processing the request for field values.

In various examples, the first plurality of objects correspond to a plurality of different object formats that collectively include the plurality of records. In various examples, the method further includes processing the request in accordance with the object storage communication protocol to generate the filtered row set based on identifying a first proper subset of the filtered row set that includes at least one first row included in a first object of the object storage system having a first object format of the plurality of different object formats and/or identifying a second proper subset of the filtered row set that includes at least one second row included in a second object of the object storage system having a second object format of the plurality of different object formats.

In various examples, the method further includes receiving a request to store a new plurality of records in accordance with the object storage communication protocol from the data processing system, where the new plurality of records was generated by the data processing system based on processing the filtered row set. In various examples, the method further includes storing the new plurality of records in at least one new object based on processing the request to store the new plurality of records.

In various examples, the method further includes receiving a second request indicating second filtering parameter data in accordance with the object storage communication protocol. In various examples, the method further includes generating a second filtered row set identifying a second proper subset of the plurality of records meeting the filtering parameter data by accessing a second at least one object of the first plurality of objects, where the second at least one object includes the at least one new object and/or where the second filtered row set includes at least one row of the new plurality of records. In various examples, the method further includes sending a second response that indicates the second filtered row set in accordance with the object storage communication protocol, where a second query resultant is generated based on the second filtered row set.

In various examples, the at least one index structure is accessed to generate the filtered row based on configuration data that includes at least one of: formatting data indicating arrangement of records in objects of the first plurality of objects; dataset mapping data indicating datasets to which records in objects of the first plurality of objects belong; row set data indicating records included in various datasets; indexing configuration data indicating a set of indexing structures that includes the at least one indexing structure; schema data indicating dataset fields of datasets which records in objects of the first plurality of objects belong; and/or access control data indicating accesses allowed for performance by at least one entity that executes queries against the plurality of records.

In various examples, at least some of the configuration data is stored as object metadata of at least one of the first plurality of objects. In various examples, at least some of the configuration data is stored in a third plurality of objects distinct from the first plurality of objects.

In various examples, the method further includes automatically generating index structure selection data indicating a determination to generate a first index structure of the at least one index structure indexing a first field for ones of the plurality of records included in a first dataset. In various examples, the method further includes generating the first index structure indexing based on the index structure selection data.

In various examples, the first index structure is generated in accordance with a first indexing type based on the index structure selection data indicating selection of the first indexing type for indexing the first field. In various examples, the method further includes automatically generating second index structure selection data indicating a determination to generate a second index structure of the at least one index structure via a second indexing type that is different from the first indexing type, and/or generating the second index structure in accordance with the second indexing type based on the second index structure selection data.

In various examples, the second indexing type is selected to be different from the first indexing type based on the first index structure being selected to index a first subset of the set of records having a first record type and the second index structure being selected to index a second subset of the set of records having a second record type different from the first record type. In various examples, the second indexing type is selected to be different from the first indexing type based on the first index structure being selected to index the first field having a first field type and the second index structure being selected to index a second field of having a second field type different from the first field type. In various examples, the second indexing type is selected to be different from the first indexing type based on the first index structure being selected to index records of a first set of objects having a first object type and the second index structure being selected to index a second set of objects having a second object type different from the first object type.

In various examples, the object storage system implements the memory resources in conjunction with an object storage service, and/or the memory resources store the first plurality of objects and the second plurality of objects via a flat storage structure.

In various examples, each object of the first plurality of objects and the second plurality of objects includes a data portion, an object metadata portion, and a globally unique identifier.

In various embodiments, any one of more of the various examples listed above are implemented in conjunction with performing some or all steps of FIG. 39E. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 39E described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 39E, for example, in conjunction with further implementing any one or more of the various examples described herein.

In various embodiments, the operational instructions, when executed by the at least one processor, cause the at least one processor to: storing a first plurality of objects in memory resources of an object storage system, where the first plurality of objects store a plurality of records of at least one dataset; storing a second plurality of objects in memory resources of the object storage system, where the second plurality of objects store a set of index structures indexing the plurality of records of the at least one dataset; receiving a request from a data processing system indicating filtering parameter data to filter the plurality of records; generating a filtered row set identifying a proper subset of the plurality of records meeting the filtering parameter data based on at least one index structure of the set of index structures based on accessing at least one object of the second plurality of objects; and/or sending a response to the data processing system that indicates the filtered row set. In various examples, the data processing system generates a query resultant based on the filtered row set.

FIG. 39A illustrates non-object storage memory resources 3109 that stores index data 2545 indexing records included in a plurality of dataset objects 3301 stored in memory resources 3106 of an object storage system 3105. The non-object storage memory resources 3109 can be separate from the memory resources 3106 of the object storage system 3105. Some or all features and/or functionality of non-object storage memory resources 3109 of FIG. 39A can implement some or all of the index structure storage resources 3706 described herein. The non-object storage memory resources 3109 of FIG. 39A can be implemented via some or all features and/or functionality of the non-object storage memory resources 3109 of FIG. 33H. The non-object storage memory resources 3109 of FIG. 39A can be implemented to store some or all features and/or functionality of the non-object storage memory resources 3109 of FIG. 33H.

In embodiments where non-object storage memory resources 3109 stores configuration data 3210, the index data 2545 can be stored by non-object storage memory resources 3109 in addition to the configuration data 3210. Alternatively or in addition, in embodiments where non-object storage memory resources 3109 stores configuration data 3210, the index data 2545 can be stored by non-object storage memory resources 3109 as configuration objects 3302, where configuration data 3210 of non-object storage memory resources 3109 stores at least one index structure 3352 in addition to other configuration data 3210 (e.g. the index structure 3352 is stored as indexing configuration data 3355 of the configuration data 3210).

FIG. 39B illustrates a filtered row set generator module of a request processing module that generates a filtered row set based on accessing index data in non-object storage memory resources. The filtered row set generator module 3329 of FIG. 39B can implement the filtered row set generator module 3329 of FIG. 37D (e.g. where the index structure 3352 is accessed via index access module 3373 via accessing a corresponding index object 3805 in non-object storage memory resources 3109). The index structure 3352 of FIG. 39B can implement the index structure 3352 of FIG. 37D, 37E, 37F, 39A, and/or any embodiment of the index structure 3352 described herein.

FIG. 39C illustrates non-object storage memory resources 3109 that stores index data 2545 that includes at least one index structure 3352 that is also stored in at least one index object 3805 stored in memory resources 3106 of an object storage system 3106. Some or all features and/or functionality of the at least one index object 3805 of FIG. 39C can be implemented via some or all features and/or functionality of the index object 3805 of FIG. 38A and/or 38B, and/or via any embodiment of index object 3805 described herein. Some or all features and/or functionality of non-object storage memory resources 3109 storing index data 2545 of FIG. 39C can implement the non-object storage memory resources 3109 storing index data 2545 of FIG. 39A and/or any embodiment of non-object storage memory resources 3109 described herein.

In particular, some or all index structures 3352.1-3352.S can be stored in both index objects 3508 of memory resources 3106 and in non-object storage memory resources 3109 at a given time. For example, in cases where an index structure 3352 is stored in both an index object 3805 of memory resources 3106 and in non-object storage memory resources 3109 at a given time, the index structure 3352 is optionally accessed via the non-object storage memory resources 3109 by filtered row set generator module 3329 when executing index access module 3373 as illustrated in FIG. 39B based on the non-object storage memory resources 3109 being faster/more efficient to access the given index structure 3352 than the index object 3805. Alternatively or in addition, the means of accessing index structure 3352 is selected based on other factors. Alternatively or in addition, the index structure 3352 is stored in such duplicate instances for redundancy.

FIG. 39D illustrates a filtered row set generator module 3329 of a request processing module 3144 that caches an index structure 3352 in non-object storage memory resources 3109 via an index structure caching module 3379 based on accessing the index structure 3352 in memory resources 3106 of an object storage system 3105 in generating filtered row set 3146. For example, in subsequent execution of a later request, the filtered row set generator module 3329 of a request processing module 3144 accesses the index structure 3352 in non-object storage memory resources 3109. Some or all features and/or functionality of the filtered row set generator module 3329 of FIG. 39D can implement the filtered row set generator module 3329 of FIG. 38C, 38D, and/or 38E. Some or all features and/or functionality of the non-object storage memory resources 3109 of FIG. 39D can implement the non-object storage memory resources 3109 of FIG. 39A.

FIG. 39E illustrates a method for execution, for example, by an object storage system 3105 and/or a request processing module 3144. For example, the data processing system 3107 can include utilize a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 39E. In particular, a parallelized resource 3050 can implement a corresponding processing module to execute some or all of the steps of FIG. 39E, where multiple parallelized resources 3050 implement their own processing modules to independently execute some or all of the steps of FIG. 39E for example, to facilitate processing of a request 3131 and/or to generate a corresponding response 3132 based on each generating filtered row subsets 3148 that collectively constitute a filtered row set 3146.

Some or all of the method of FIG. 39E can be performed based on communicating with a data processing system 3107. Some or all of the method of FIG. 39E can be performed by the data processing system 3107 instead of the object storage system 3105 based on communication between object storage system 3105 and data processing system 3107. Some or all of the steps of FIG. 39E can optionally be performed by database system 10 and/or any other processing module. Some or all of the steps of FIG. 39E can be performed to implement some or all of the functionality of the data processing system 3107 and/or object storage system 3105 as described in conjunction with FIG. 39A-39D. Some or all of the steps of FIG. 39E can be performed based on communications exchanged in accordance with an API dictated by object storage communication protocol data 3141. Some or all of the steps of FIG. 39E can be performed to implement some or all of the functionality regarding execution of a query via the plurality of nodes in the query execution plan 2405. Some or all steps of FIG. 39E can be performed in accordance with other embodiments of object storage system 3105 described herein. Some or all steps of FIG. 39E can be performed in conjunction with performing some or all steps of FIG. 31C, 32E, 34G, 36F, 37H, 38F, and/or some or all steps of any other method described herein.

Step 3981 includes storing a first plurality of objects via an object storage memory resources of an object storage system. In various examples, the first plurality of records store a plurality of records of at least one dataset. Step 3983 includes storing a set of index structures indexing the plurality of records of the at least one dataset via non-object storage memory resources accessible by the object storage system. Step 3985 includes receiving a request from a data processing system indicating filtering parameter data to filter the plurality of records. Step 3987 includes generating a filtered row set identifying a proper subset of the plurality of records meeting the filtering parameter data based on at least one index structure of the set of index structures based on accessing the at least one index structure in the non-object storage memory resources. Step 3989 includes sending a response to the data processing system that indicates the filtered row set. In various examples, the data processing system generates a query resultant based on the filtered row set.

In various embodiments, any one of more of the various examples listed above are implemented in conjunction with performing some or all steps of FIG. 39E. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 39E described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 39E, for example, in conjunction with further implementing any one or more of the various examples described herein.

In various embodiments, the operational instructions, when executed by the at least one processor, cause the at least one processor to: store a first plurality of objects via an object storage memory resources of an object storage system, where the first plurality of records store a plurality of records of at least one dataset; store a set of index structures indexing the plurality of records of the at least one dataset via non-object storage memory resources accessible by the object storage system; receive a request from a data processing system indicating filtering parameter data to filter the plurality of records; generate a filtered row set identifying a proper subset of the plurality of records meeting the filtering parameter data based on at least one index structure of the set of index structures based on accessing the at least one index structure in the non-object storage memory resources; send a response to the data processing system that indicates the filtered row set, where the data processing system generates a query resultant based on the filtered row set.

FIG. 40A illustrates an index generator module 3940 that generates index data 2545 based on indexing scheme selection data 2532 generated by an indexing scheme selection module 2530. Some or all features and/or functionality of the index data 2545 of FIG. 40A can implement any embodiment of the index data 2545 described herein.

The indexing scheme selection data 2532 can be generated by any processing system implementing indexing scheme selection module 2530. For example, the request processing module 3144 implements the indexing scheme selection module 2530 to generate index data 2545 for incoming data received for storage in requests 3334. Alternatively or in addition, the data source 3304 implements the indexing scheme selection module 2530 to generate index data 2545 to include in requests 3334, for example, in conjunction with corresponding records/object-formatted data 3363. Alternatively or in addition, the indexing scheme selection module 2530 to generate index data 2545 is implemented to select how records of various objects are indexed in conjunction with generating/applying configuration data 3210.

The indexing scheme selection data 2532 can indicate selected indexing types 3933 for some or all fields 2515 of a given set of records. The set of records being indexed can correspond to records of a given dataset, of a given object set, of a given request 3444 for storage, and/or other set of records stored/to be stored in object storage system 3106 in objects 2562.

In some embodiments, not all fields are selected to be indexed. Each field selected for indexing as a selected field can further have an indexing type selected. The selected indexing type 3933 can be selected from indexing types 3932.1-3932.M indicated in indexing scheme option data (e.g. a plurality of possible index types that can be applied). The selected indexing type 3933 can be further configured via configuring configurable parameters 3934 for each respective index via corresponding parameter selections. Different fields can be configured via different types of indexing structures and/or same types indexing structures having different configured parameter selections for some or all of the configurable parameters of this type of indexing structure.

FIG. 40B illustrates an indexing scheme selection module 2530 that generates indexing scheme selection data 2532 for indexing a given dataset 3211.*a* based on dataset schema data 3914.*a* for the given dataset. Different fields of a given dataset, as denoted in a corresponding schema 3914 (e.g. having different datatypes/different sizes/etc.) can be indexed differently. Some or all features and/or functionality of the indexing scheme selection module 2530 and/or indexing scheme selection data 2532 of FIG. 40B can implement the indexing scheme selection module 2530 and/or indexing scheme selection data 2532 of FIG. 40A and/or any embodiment of indexing scheme selection module 2530 and/or indexing scheme selection data 2532 described herein.

FIG. 40C illustrates an indexing scheme selection module 2530 that generates indexing scheme selection data 2532 for indexing a plurality of rows based on configuration data 3120 for the plurality of rows. The configuration data 3120 can dictate how various sets of records/fields/objects be indexed. Some or all features and/or functionality of the indexing scheme selection module 2530 and/or indexing scheme selection data 2532 of FIG. 40C can implement the indexing scheme selection module 2530 and/or indexing scheme selection data 2532 of FIG. 40A and/or any embodiment of indexing scheme selection module 2530 and/or indexing scheme selection data 2532 described herein.

FIG. 40D illustrates an indexing scheme selection module 2530 that generates indexing scheme selection data 2532 for indexing a plurality of rows based on local distribution data 2542 of the plurality of records. For example, the local distribution data is generated from the corresponding set of records via a local distribution data generator 3941. The selection of indexing (e.g. type, whether or not indexing be applied) for a given field and/or set of fields can be based on the cardinality/value distribution of corresponding field. Some or all features and/or functionality of the indexing scheme selection module 2530 and/or indexing scheme selection data 2532 of FIG. 40D can implement the indexing scheme selection module 2530 and/or indexing scheme selection data 2532 of FIG. 40A and/or any embodiment of indexing scheme selection module 2530 and/or indexing scheme selection data 2532 described herein.

FIG. 40E illustrates an indexing scheme selection module 2530 that generates indexing scheme selection data 2532 for indexing a plurality of rows based on record types 3921 of different ones of the plurality of records and further based on indexing scheme option data 3931 mapping different record types 3921 to corresponding indexing types 3933. Different sets of records of different types can be grouped and/or indexed differently based on having different respective record types (e.g. different datasets, different providers, different schemas, different ages, different access frequency, different access control data, different configuration data 3210, and/or other differences). Some or all features and/or functionality of the indexing scheme selection module 2530 and/or indexing scheme selection data 2532 of FIG. 40D can implement the indexing scheme selection module 2530 and/or indexing scheme selection data 2532 of FIG. 40A and/or any embodiment of indexing scheme selection module 2530 and/or indexing scheme selection data 2532 described herein.

FIG. 40F illustrates an indexing scheme selection module 2530 that generates indexing scheme selection data 2532 for indexing a plurality of rows based on field types 3922 of different fields 2515 of the plurality of records and further based on indexing scheme option data 3931 mapping different field types 3922 to corresponding indexing types 3933. Different fields can be indexed differently based on respective differences in the fields (e.g. type/size/cardinality/etc.). Some or all features and/or functionality of the indexing scheme selection module 2530 and/or indexing scheme selection data 2532 of FIG. 40D can implement the indexing scheme selection module 2530 and/or indexing scheme selection data 2532 of FIG. 40A and/or any embodiment of indexing scheme selection module 2530 and/or indexing scheme selection data 2532 described herein.

FIG. 40G illustrates an indexing scheme selection module 2530 that generates indexing scheme selection data 2532 for indexing a plurality of rows based on object types 3923 of different objects that include different subsets of the plurality of records and further based on indexing scheme option data 3931 mapping different object types 3923 to corresponding indexing types 3933. Different objects can have their objects indexed differently based on having different object types 3923 (e.g. different object type data 3234, other formatting differences, different per-object configuration data 3210, different object metadata 3324, different file types, etc.). Some or all features and/or functionality of the indexing scheme selection module 2530 and/or indexing scheme selection data 2532 of FIG. 40D can implement the indexing scheme selection module 2530 and/or indexing scheme selection data 2532 of FIG. 40A and/or any embodiment of indexing scheme selection module 2530 and/or indexing scheme selection data 2532 described herein.

FIG. 40H illustrates a method for execution, for example, by an object storage system 3105 and/or a request processing module 3144. For example, the data processing system 3107 can include utilizing a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 40H. In particular, a parallelized resource 3050 can implement a corresponding processing module to execute some or all of the steps of FIG. 40H, where multiple parallelized resources 3050 implement their own processing modules to independently execute some or all of the steps of FIG. 40H for example, to facilitate processing of a request 3131 and/or to generate a corresponding response 3132 based on each generating filtered row subsets 3148 that collectively constitute a filtered row set 3146.

Some or all of the method of FIG. 40H can be performed based on communicating with a data processing system 3107. Some or all of the method of FIG. 40H can be performed by the data processing system 3107 instead of the object storage system 3105 based on communication between object storage system 3105 and data processing system 3107. Some or all of the steps of FIG. 40H can optionally be performed by database system 10 and/or any other processing module. Some or all of the steps of FIG. 40H can be performed to implement some or all of the functionality of the data processing system 3107 and/or object storage system 3105 as described in conjunction with FIG. 40A-40G. Some or all of the steps of FIG. 40H can be performed based on communications exchanged in accordance with an API dictated by object storage communication protocol data 3141. Some or all of the steps of FIG. 40H can be performed to implement some or all of the functionality regarding execution of a query via the plurality of nodes in the query execution plan 2405. Some or all steps of FIG. 40H can be performed in accordance with other embodiments of object storage system 3105 described herein. Some or all steps of FIG. 40H can be performed in conjunction with performing some or all steps of FIG. 31C, 32E, 34G, 36F, 37H, 38F, 39E, and/or some or all steps of any other method described herein.

Step 4071 includes determining a first plurality of records of at least one dataset for storage via a plurality of objects in memory resources of an object storage system. Step 4073 includes determining type-based index mapping data that maps a plurality of index structure types to a plurality of data criteria. Step 4075 includes determining a first data criteria of the plurality of data criteria is met by a first proper subset of data included in the plurality of records. Step 4077 includes generating a first index structure for the first proper subset of data having a first index structure type of the plurality of index structure types based on the first data criteria being mapped to the first index structure type in the type-based index mapping data. Step 4079 includes determining a second data criteria of the plurality of data criteria is met by a second proper subset of data included in the plurality of records. Step 4081 includes generating a second index structure for the second proper subset of data having a second index structure type of the plurality of index structure types based on the second data criteria being mapped to the second index structure type in the type-based index mapping data.

In various examples, a first request from a data processing system indicating first filtering parameter data to filter the plurality of records is processed based on generating of a first filtered row set identifying a first proper subset of the plurality of records meeting the first filtering parameter data based on accessing the first index structure. In various examples, generating of the first filtered row set is further based on accessing the second index structure. In various examples, generating of the first filtered row set is not based on accessing the second index structure.

In various examples, a second request from a data processing system indicating second filtering parameter data to filter the plurality of records is processed based on generating of a second filtered row set identifying a second proper subset of the plurality of records meeting the second filtering parameter data based on accessing the second index structure. In various examples, generating of the second filtered row set is further based on accessing the first index structure. In various examples, generating of the second filtered row set is not based on accessing the first index structure.

In various embodiments, any one of more of the various examples listed above are implemented in conjunction with performing some or all steps of FIG. 40H. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 40H described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 40H, for example, in conjunction with further implementing any one or more of the various examples described herein.

In various embodiments, the operational instructions, when executed by the at least one processor, cause the at least one processor to: determine a first plurality of records of at least one dataset for storage via a plurality of objects in memory resources of an object storage system; determining type-based index mapping data that maps a plurality of index structure types to a plurality of data criteria; determine a first data criteria of the plurality of data criteria is met by a first proper subset of data included in the plurality of records; generate a first index structure for the first proper subset of data having a first index structure type of the plurality of index structure types based on the first data criteria being mapped to the first index structure type in the type-based index mapping data; determine a second data criteria of the plurality of data criteria is met by a second proper subset of data included in the plurality of records; and/or generate a second index structure for the second proper subset of data having a second index structure type of the plurality of index structure types based on the second data criteria being mapped to the second index structure type in the type-based index mapping data.

FIG. 40I illustrates a method for execution, for example, by an object storage system 3105 and/or a request processing module 3144. For example, the data processing system 3107 can include utilizing a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 40I. In particular, a parallelized resource 3050 can implement a corresponding processing module to execute some or all of the steps of FIG. 40I, where multiple parallelized resources 3050 implement their own processing modules to independently execute some or all of the steps of FIG. 40I for example, to facilitate processing of a request 3131 and/or to generate a corresponding response 3132 based on each generating filtered row subsets 3148 that collectively constitute a filtered row set 3146.

Some or all of the method of FIG. 40I can be performed based on communicating with a data processing system 3107. Some or all of the method of FIG. 40I can be performed by the data processing system 3107 instead of the object storage system 3105 based on communication between object storage system 3105 and data processing system 3107. Some or all of the steps of FIG. 40H can optionally be performed by database system 10 and/or any other processing module. Some or all of the steps of FIG. 40I can be performed to implement some or all of the functionality of the data processing system 3107 and/or object storage system 3105 as described in conjunction with FIG. 40A-40G. Some or all of the steps of FIG. 40I can be performed based on communications exchanged in accordance with an API dictated by object storage communication protocol data 3141. Some or all of the steps of FIG. 40I can be performed to implement some or all of the functionality regarding execution of a query via the plurality of nodes in the query execution plan 2405. Some or all steps of FIG. 40I can be performed in accordance with other embodiments of object storage system 3105 described herein. Some or all steps of FIG. 40I can be performed in conjunction with performing some or all steps of FIG. 31C, 32E, 34G, 36F, 37H, 38F, 39E, 40H, and/or some or all steps of any other method described herein.

Step 4083 includes storing a first plurality of records of at least one dataset via a plurality of objects in memory resources of an object storage system. Step 4085 includes storing configuration data mapping storage of the plurality of records of the plurality of datasets via the plurality of objects. Step 4087 includes processing the configuration data to automatically generate index structure selection data indicating a determination to generate an index structure indexing a set of records in the plurality of records for at least one field of the at least one dataset. Step 4089 includes generating an index structure indexing the set of records in the plurality of records for at least one field of the at least one dataset based on the index structure selection data. Step 4091 includes receiving a request from a data processing system indicating filtering parameter data to filter the plurality of records based on a first field of a first dataset accordance with object storage communication protocol data. Step 4093 includes generating a filtered row set identifying a proper subset of the plurality of records meeting the filtering parameter data based on accessing the index structure indexing the plurality of records of the first dataset for the first field. Step 4095 includes sending a response to the data processing system that indicates the filtered row set. In various examples, the data processing system generates a query resultant based on the filtered row set.

In various embodiments, any one of more of the various examples listed above are implemented in conjunction with performing some or all steps of FIG. 40I. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 40I described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 40I, for example, in conjunction with further implementing any one or more of the various examples described herein.

In various embodiments, the operational instructions, when executed by the at least one processor, cause the at least one processor to: store a first plurality of records of at least one dataset via a plurality of objects in memory resources of an object storage system; store configuration data mapping storage of the plurality of records of the plurality of datasets via the plurality of objects; process the configuration data to automatically generate index structure selection data indicating a determination to generate an index structure indexing a set of records in the plurality of records for at least one field of the at least one dataset; generate an index structure indexing the set of records in the plurality of records for at least one field of the at least one dataset based on the index structure selection data; receive a request from a data processing system indicating filtering parameter data to filter the plurality of records based on a first field of a first dataset accordance with object storage communication protocol data; generate a filtered row set identifying a proper subset of the plurality of records meeting the filtering parameter data based on accessing the index structure indexing the plurality of records of the first dataset for the first field; and/or send a response to the data processing system that indicates the filtered row set, where the data processing system generates a query resultant based on the filtered row set.

FIG. 41A is a schematic block diagram illustrating query execution based on a query execution module 2504 communicating with an object storage system 3105 that generates further processed filtered row set data 4146 based on processing a request 3131 that indicates both filtering parameter data 3142 and further operators 2520 to be applied to the filtering parameter data 3142. Some or all features of object storage system 3105, request processing module 3144, query processing system 2504, request 3131, and/or response 3132 of FIG. 41A can implement the object storage system 3105, request processing module 3144, query processing system 2504, request 3131, and/or response 3132, respectively, of FIG. 28B and/or any other embodiments of query execution described herein.

In some embodiments, the request 3131 can indicate additional operators 2520 to be applied to rows in generating a response 3132 that indicates further processed filtered row set data 4146 accordingly. For example, the additional operators 2520 are indicated in the request 3131 in addition to the filtering parameter data 3142 in accordance the object storage communication protocol data 3141 (e.g. in accordance with structuring/syntax/keywords as dictated by the object storage communication protocol data 3141/corresponding API).

The additional operators can be determined based on a corresponding query operator execution flow sub-portion 4117 of query operator execution flow 2517 generated for the corresponding query request 2518. For example, the additional operators 2520 and filtering parameter data 3142 collectively represent a bottom/lowest level portion of the query operator execution flow 2517, where the resultant operator generator step 3150 applies remaining operators serially after the additional operators 2520 in the query operator execution flow 2517.

The additional operators 2520 can be applied in generating further processed filtered row set data 4146, where the records in filtered row set are further processed accordingly to render generation of further processed filtered row set data 4146. For example, the further processed filtered row set data 4146 is generated based on request processing module performing the additional operators 2520 upon filtered row set 3146 and/or otherwise executing the additional operators in conjunction with generating filtered row set 3146. The additional operators 2520 can include one or more: join operators (e.g. outer join, inner join, left join, right join, etc.), aggregator operators (e.g. summation, average, max, min, etc.), blocking operators, set operators (e.g. set intersection, set union, set difference), machine learning operators (e.g. to train a machine learning model and/or apply a machine learning model to generate inference data), linear algebra operators, non-relational operators, any SQL operators, any custom operators, and/or other operators.

The response 3132 can indicate the further processed filtered row set data 4146 (e.g. in accordance with the object storage communication protocol data 3141 (e.g. in accordance with structuring/syntax/keywords as dictated by the object storage communication protocol data 3141/corresponding API). The further processed filtered row set data 4146 can be processed in resultant generator step 3150, where any remaining operators of query operator execution flow 2517 not implemented in the generation of further processed filtered row set data 4146 are applied to generate query resultant 2526.

FIG. 41B is a schematic block diagram illustrating query execution based on a query execution module 2504 communicating with an object storage system 3105 that generates further processed filtered row set data 4146 based on processing a request 3131 that indicates both filtering parameter data 3142 and further operators 2520 to be applied to the filtering parameter data 3142 via a plurality of parallelized resources 3050 that each generate further processed filtered row subset data 4146. Some or all features of object storage system 3105, request processing module 3144, query processing system 2504, request 3131, and/or response 3132 of FIG. 41B can implement the object storage system 3105, request processing module 3144, query processing system 2504, request 3131, and/or response 3132, respectively, of FIG. 41A and/or any other embodiments of query execution described herein. Some or all features and/or functionality of the parallelized resources 3050 of FIG. 41B can be implemented via the parallelized resources 3050 of FIG. 28H and/or any other embodiment of the parallelized resources 3050 described herein.

Each further processed filtered row subset data 4146 can be generated by a corresponding parallelized resource 3050 via performance of some or all operators 2520 upon/in conjunction with generating a corresponding filtered row subset 3148. For example, some or all operators 2520 that are not blocking operators and/or can otherwise be partially or fully performed upon subsets of the full row set to render correct results can be applied in parallel in this fashion. The further processed filtered row subset data 4146 can be generated via applying a union and/or aggregation/set operation to the plurality of further processed filtered row subset data 4148.1-4148.V, and/or based on otherwise collectively processing the plurality of further processed filtered row subset data 4148.1-4148.V.

FIG. 41C is a schematic block diagram illustrating query execution based on a query execution module 2504 communicating with an object storage system 3105 that generates further processed filtered row set data 4146 based on processing a request 3131 that indicates both filtering parameter data 3142 and further operators 2520 to be applied to the filtering parameter data 3142. The filtering parameter data 3142 is processed plurality of parallelized resources 3050 that each generate filtered row subsets 3146. The set of filtered row subsets 3146.1-3146.V generated via the plurality of parallelized resources 3050.1-3050.V are then processed via one or more further operator execution modules 4150 to generate the further processed filtered row set data 4146. Some or all features of object storage system 3105, request processing module 3144, query processing system 2504, request 3131, and/or response 3132 of FIG. 41C can implement the object storage system 3105, request processing module 3144, query processing system 2504, request 3131, and/or response 3132, respectively, of FIG. 41A and/or any other embodiments of query execution described herein. Some or all features and/or functionality of the parallelized resources 3050 of FIG. 41C can be implemented via the parallelized resources 3050 of FIG. 28H and/or any other embodiment of the parallelized resources 3050 described herein. Some or all features and/or functionality of the filtered row subsets 3148 of FIG. 41C can be implemented via the filtered row subsets 3148 of FIG. 28H and/or any other embodiment of the filtered row subsets 3148 described herein.

Filtered row subsets 3148.1-3148.V (and/or corresponding further processed filtered row subset data 4148.1-4148.V) can be collectively processed via further operator execution modules 4150. For example, blocking operators (e.g. aggregations, joins, etc.) can be applied upon the filtered row subsets collectively (e.g. their union) to render correct processing in conjunction with the query request.

The further operator execution modules 4150 of FIG. 41C can be implemented via some or all features and/pr functionality of a parent node 37 of a query execution plan 2504 (e.g. at an inner level) receiving data blocks from child nodes (e.g. at an immediately lower level, such as the IO level). However, unlike nodes 37 of database system 10, the further operator execution modules 4150 optionally are not implemented by the query execution module 2504 and/or are instead implemented as processing resources of the separate object storage system 3105 and/or the corresponding request processing module 3144. The further processed filtered row set data 4146 can otherwise be implemented via a hierarchical application of operators 2520, for example, in a same or similar fashion as embodiments of query operator execution flow 2517 and/or query execution plan 2405 described herein.

FIG. 41D illustrates a method for execution, for example, by a data processing system 3107. For example, the data processing system 3107 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 41D. In particular, a node 37 can utilize the query processing module 2435 to execute some or all of the steps of FIG. 41D, where multiple nodes 37 implement their own query processing modules 2435 to independently execute some or all of the steps of FIG. 41D, for example, to facilitate execution of a query as participants in a query execution plan 2405. Some or all of the method of FIG. 41D can be performed by utilizing the query execution module 2504 in accordance with some or all features and/or functionality described in conjunction with FIGS. 41A-41C. Some or all of the method of FIG. 41D can be performed based on communicating with an object storage system 3105. Some or all of the method of FIG. 41D can be performed by the object storage system 3105 instead of the data processing system 3107 based on communication between object storage system 3105 and data processing system 3107. Some or all of the steps of FIG. 41D can optionally be performed by database system 10 and/or any other processing module. Some or all of the steps of FIG. 41D can be performed to implement some or all of the functionality of the data processing system 3107 and/or object storage system 3105 as described in conjunction with FIGS. 41A-41C. Some or all of the steps of FIG. 41D can be performed based on communications exchanged in accordance with an API dictated by object storage communication protocol data 3141. Some or all of the steps of FIG. 41D can be performed to implement some or all of the functionality regarding execution of a query via the plurality of nodes in the query execution plan 2405. Some or all steps of FIG. 41D can be performed in accordance with other embodiments of data processing system 3107 described herein. Some or all steps of FIG. 41D can be performed in conjunction with performing some or all steps of the method of FIG. 29M, FIG. 30G, FIG. 31B, FIG. 32D, FIG. 34F, and/or any other method described herein.

Step 4182 includes determining a query for execution. Step 4184 includes generating a query operator execution flow for the query that includes a plurality of operators. Step 4186 includes identifying a query operator execution flow sub-portion of the query operator execution flow that includes a first subset of the plurality of operators for execution by a request processing module. In various examples, the first subset of the plurality of operators indicates: a plurality of IO and/or filtering operators that apply a filtering parameter data; and/or at least one additional operator serially after at least one of the plurality of IO and/or filtering operators in the query operator execution flow. Step 4188 includes generating a request indicating the plurality of IO and/or filtering operators and the at least one additional operator of the query operator execution flow sub-portion. Step 4190 includes sending the request to an object storage system. Step 4192 includes receiving further processed filtered row set data from the object storage system based on applying the at least one additional operator to a subset of a plurality of rows stored by the object storage system that compare favorably to the filtering parameter data based on the object storage system processing the request. Step 4194 includes processing the further processed filtered row set data via a second subset of the plurality of operators of the query operator execution flow to generate a query resultant. In various examples, the second subset of operators are serially after the first subset of the plurality of operators in the query operator execution flow.

In various embodiments, any one of more of the various examples listed above are implemented in conjunction with performing some or all steps of FIG. 41D. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 41D described above, for example, in conjunction with further implementing any one or more of the various examples described herein.

In various embodiments, a data processing system includes at least one processor and at least one memory that stores operational instructions. In various embodiments, the operational instructions, when executed by the at least one processor, cause the storage system to perform some or all steps of FIG. 41D, for example, in conjunction with further implementing any one or more of the various examples described herein.

In various embodiments, the operational instructions, when executed by the at least one processor, cause the at least one processor to: determine a query for execution; generate a query operator execution flow for the query that includes a plurality of operators; identify a query operator execution flow sub-portion of the query operator execution flow that includes a first subset of the plurality of operators for execution by a request processing module, where the first subset of the plurality of operators indicates a plurality of IO and/or filtering operators that apply a filtering parameter data and/or at least one additional operator serially after at least one of the plurality of IO and/or filtering operators in the query operator execution flow; generating a request indicating the plurality of IO and/or filtering operators and the at least one additional operator of the query operator execution flow sub-portion; sending the request to an object storage system; receiving further processed filtered row set data from the object storage system based on applying the at least one additional operator to a subset of a plurality of rows stored by the object storage system that compare favorably to the filtering parameter data based on the object storage system processing the request; and/or processing the further processed filtered row set data via a second subset of the plurality of operators of the query operator execution flow to generate a query resultant, where the second subset of operators are serially after the first subset of the plurality of operators in the query operator execution flow.

FIG. 41E illustrates a method for execution, for example, by an object storage system 3105 and/or a request processing module 3144. For example, the data processing system 3107 can include utilizing a plurality of parallelized resources 3050, where the plurality of parallelized resources 3050 execute operational instructions stored in memory accessible by the plurality of parallelized resources 3050, and where the execution of the operational instructions causes the plurality of parallelized resources 3050 to execute, independently or in conjunction, the steps of FIG. 41E. In particular, a parallelized resource 3050 can implement a corresponding processing module to execute some or all of the steps of FIG. 41E, where multiple parallelized resources 3050 implement their own processing modules to independently execute some or all of the steps of FIG. 40I for example, to facilitate processing of a request 3131 and/or to generate a corresponding response 3132 based on each generating filtered row subsets 3148 and/or further processed filtered row subset data 4148 that collectively constitute a filtered row set 3146 and/or further processed filtered row set data 4146.

Some or all of the method of FIG. 41E can be performed based on communicating with a data processing system 3107. Some or all of the method of FIG. 41E can be performed by the data processing system 3107 instead of the object storage system 3105 based on communication between object storage system 3105 and data processing system 3107. Some or all of the steps of FIG. 40H can optionally be performed by database system 10 and/or any other processing module. Some or all of the steps of FIG. 41E can be performed to implement some or all of the functionality of the data processing system 3107 and/or object storage system 3105 as described in conjunction with FIG. 41A-41C. Some or all of the steps of FIG. 41E can be performed based on communications exchanged in accordance with an API dictated by object storage communication protocol data 3141. Some or all of the steps of FIG. 41E can be performed to implement some or all of the functionality regarding execution of a query via the plurality of nodes in the query execution plan 2405. Some or all steps of FIG. 41E can be performed in accordance with other embodiments of object storage system 3105 described herein. Some or all steps of FIG. 41E can be performed in conjunction with performing some or all steps of FIG. 31C, 32E, 34G, 36F, 37H, 38F, 39E, 40H, 40I, and/or some or all steps of any other method described herein.

Step 4181 includes storing a plurality of records of a plurality of datasets via a plurality of objects in memory resources. Step 4183 includes receiving a request from a data processing system indicating filtering parameter data and at least one additional operator. Step 4185 includes generating, based on the configuration data, a further processed filtered row set data based on executing the at least one additional operator upon a proper subset of the plurality of records meeting the filtering parameter data based on accessing at least one object of the plurality of objects. Step 4187 includes sending a response to the data processing system that indicates the further processed filtered row set data. In various examples, the data processing system generates a query resultant based on the further processed filtered row set data.

In various examples, the method further includes storing configuration data mapping storage of the plurality of records of the plurality of datasets via the plurality of objects. In various examples, the further processed filtered row set data is generated based on the configuration data.

In various embodiments, any one of more of the various examples listed above are implemented in conjunction with performing some or all steps of FIG. 41E. In various embodiments, any one of more of the various examples listed above can implemented conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 41E described above, for example, in conjunction with further implementing any one or more of the various examples described herein.

In various embodiments, an object storage system includes at least one processor and at least one memory that stores operational instructions. In various embodiments, the operational instructions, when executed by the at least one processor, cause the storage system to perform some or all steps of FIG. 41E, for example, in conjunction with further implementing any one or more of the various examples described herein.

In various embodiments, the operational instructions, when executed by the at least one processor, cause the at least one processor to: store a plurality of records of a plurality of datasets via a plurality of objects in memory resources; receive a request from a data processing system indicating filtering parameter data and at least one additional operator in accordance with object storage communication protocol data; generate a further processed filtered row set data based on executing the at least one additional operator upon a proper subset of the plurality of records meeting the filtering parameter data based on accessing at least one object of the plurality of objects; and/or send a response to the data processing system that indicates the further processed filtered row set data, where the data processing system generates a query resultant based on the further processed filtered row set data.

In some embodiments, one or more embodiments of the data processing system 3107 one or more embodiments of the object storage system 3105, one or more embodiments of the request processing module 3144, one or more embodiments of the object storage communication protocol data 3141, one or more embodiments of requests and responses received, sent, processed, and/or generated by the request processing module 3144, and/or one or more embodiments of query execution described herein implement interfacing for operations (e.g. filtering operations and/or additional operations) on an object storage system. In some embodiments, this can include implementing requirements and/or a standard for requests for performing leaf operations in the object store. In some embodiments, this can include can include generation and processing of customized requests: in accordance with a customized format; having specified parameters; configuring/structuring/processing the requests in accordance with the type of data and/or objects being accessed; configuring/structuring/processing the requests in accordance with different leaf operators; and/or applying specified keywords, structuring; and/or syntax in the requests (e.g. in accordance with a corresponding API).

In some embodiments, this interfacing for on an object storage system can include some or all requests (e.g. requests 3131) can be implemented as an "extension" of a GET operation, and/or or of some batch GET operation that retrieves multiple objects. In some embodiments, the corresponding API can outline a language/syntax where leaf operations can be performed in a sequence and/or in a nested fashion in conjunction with traditional GET operations. In some embodiments, the API and/or corresponding functionality enabled for request processing system is configured based on applying push-down operations.

In some embodiments, the interfacing for operations additional operations on an object storage system can have operations are constrained to just select (e.g. SELECT query operations) with filtering (e.g. filtering parameter data), where these operations are parallelized by a corresponding API back-end (e.g. request processing module 3144) to run over many objects. In some embodiments, a pipeline can be implemented to enable performance of further operations such as aggregations, which can render a hierarchical tree/graph similar query execution plan 2405 and/or query operator execution flow 2517. In some embodiments, sorts/joins/other operations are further enabled.

In embodiments where the interfacing for operations on an object storage system can have operations that include selection and/or filtering, the API can be implemented more generally. For example, the API can support operations such as/similar to GET([leaf operation output from this specified set of data], or leaf operation(GET([specified set of data]). In some embodiments, the API can be implemented to allow for SQL result sets of SELECT statements as input (or something similar) to specify the requested data. In some embodiments, the corresponding request can indicate: a list of columns to output; and/or a set of one or more filter CNFs to which a UNION operation is applied (e.g. as illustrated in FIG. 34D) This can effectively allow a corresponding plan to specify filters in their most concise normal form. Under the hood, the API endpoint can perform various optimizations of how the respective filtering in applying the UNION of CNFs is implemented, especially by building indexes (e.g. index data 2545).

In some embodiments, the interfacing for operations on an object storage system can enable functionality with integration/extension of PUT( ), for example, where output of leaf operations are stored as new objects (e.g. as discussed in conjunction with FIGS. 32A-32E). For example, the API can support operations such as/similar to put (leaf operation (get([specified set of data]))). In some embodiments, such functionality is supported in only a subset of cases that can be performed via simple filtering.

In some embodiments, query plans on a different system accessing the object store (e.g. query plans on data processing system 3107 accessing object storage system 3105) automatically interface with the object storage system by automatically building/sending these requests via the standard accordingly. In some embodiments, an analytics system (e.g. data processing system 3107) receives a query request for large analytical process, identifies a query plan which includes accessing filtered data in the object store (or output of other leaf operation), automatically generates/sends the respective request(s) to the object store to receive this filtered data, and then performs the further analytics upon this filtered data via remainder of the query plan via its own processing resources. In some embodiments, the results received in responses from the object storage system can be implemented as rows (e.g. multiple streams in a corresponding format). In some embodiments, the results received in responses from the object storage system can be implemented object names+row numbers/byte offsets into the underlying objects for the query engine to fetch itself. In some embodiments, if row numbers are returned in responses, the set of columns is not necessarily needed to read in the request, which can optionally simplify the functionality down to a search/filtering API.

In some embodiments, a user (e.g. a person) can also write their own requests "manually" following the standard (e.g. the API). Alternatively or in addition, in the case where the "bulkier" portion of the intended query would still need to be performed once we do some level of filtering/sorting, the analytics system performing the rest of the computation can perform all of this interfacing itself as it will end up further processing the fetched data.

In some embodiments, one or more embodiments of the data processing system 3107 one or more embodiments of the object storage system 3105, one or more embodiments of the request processing module 3144, one or more embodiments of the object storage communication protocol data 3141, one or more embodiments of requests and responses received, sent, processed, and/or generated by the request processing module 3144, and/or one or more embodiments of query execution described herein implement generation of indexing structures on an object storage system for performing leaf operations (e.g. filtering).

In some embodiments, this includes implementing functionality where objects are "annotated"/indexed. In some embodiments, the corresponding API can enable user "annotating" of objects. For example, a particular user accesses some data, and realizes that they'll want to access it again in a certain way/with a certain query pattern, so they can "manually" push down an annotation (i.e. index) for this data. In some embodiments, a system interfacing with the object store can also "annotate" objects automatically via the API. For example, an analytics system determines/predictively "expects" that certain query patterns will be utilized later, and annotates data in the object store upon initial storage, or after executing a query and automatically determining indexing that would be useful in these future expected access patterns.

In some embodiments, some/all indexing of the object store is "hidden"/automatic (e.g. hidden from the analytics system and/or end users). For example, the automatic indexing enforces "standards" for types of data (e.g. object type data and/or types of object formatting) that can be stored on the object store so that their known structure can be utilized for the object store to know what the data is (e.g. corresponding object type data/formatting types as described herein), and build indexes accordingly, which can include some level of processing as the data is received for storage to index the data based on identifying and leveraging the known structure. In some embodiments, if object type standard is not enforced but many "standardized" objects are still expected to come into the object store, the object store can attempt to index an incoming object based on testing whether or not it corresponds to a known standard type, and if so, the structure is leveraged to generate the index. The indexing for a given type can be leveraged for queries calling data of a certain type already (e.g. send a sorted list of specified geospatial data objects meeting specified parameters). This can result in some data being unindexed if its type is unknown, which can be acceptable in some circumstances (e.g. filtering via indexing automatically isn't utilized in queries where we know we might need to fetch some unindexed objects in the object store).

In some embodiments, for a given API request, the caller does not necessarily know whether indexes exist. In some embodiments, the API endpoint can handle a mix of data with and without indexes. In some embodiments, lazy/opportunistic indexing is thus implemented on a large dataset stored in objects of an object store without requiring atomicity/coordination.

In some embodiments, the object store optionally has further interfacing for storing new data objects and/or for modifying existing data objects. For example, requests to store new data objects include additional parameters specifying the type, specifying indexing, etc. Such functionality can be implemented as an "extension" of the PUT( ) operation. In some embodiments, this information can be utilized by the object store in generating its own indexes and/or statistical information for its stored data objects.

In some embodiments, the API receives a bulk/stream of records and then decides how to write them to objects based on configuration data. In some embodiments, for indexing, schema management, etc. configuration data (e.g. configuration data 3210) denoting information about how objects correspond to datasets is stored. Then, specific columns can be annotated as being a good candidate for indexing (either manually or automatically) in that metadata (e.g. in the configuration data) for example, rather than on an object-by-object basis.

In some embodiments, indexes can be generated for one or more various characteristics detected for the data objects. For example, indexes applied to values of one or more "fields" stored within the data object (e.g. numeric values/strings/fields with sortable data types/etc.), which can be detected based on the known/expected structure denoting location of these fields. In some embodiments, indexes are optionally applied to other characteristics of the object not explicitly stored within the object and/or stored in/derivable from object metadata 3324 of objects (e.g. the data source, the data type, age/time stamp of being added/last modification/last access etc., for the case where we are requesting/filtering based on this information). In some embodiments, different data objects can be indexed via different types/numbers of indexes based on differences in characteristics/which characteristics are indexed by the object store.

In some embodiments, the object store can be "over indexed" to leverage the increase in space available to store indexes. For example, many indexes are applied to datasets, many different indexes are applied to one or more fields, etc. For example, a given record/object is indexed in many indexes corresponding to various different characteristics.

In various examples, implementation-wise, indexes can be stored inside objects (one index object might cover 1-many data objects) and/or also in faster direct storage (for example a local SSD in the API endpoint). In some embodiments, indexes are cached in local storage even when they are available in objects as well, for example, to support faster access of these indexes (e.g. as discussed in conjunction with FIGS. 39C and/or 39D).

In some embodiments, one or more embodiments of the data processing system 3107 one or more embodiments of the object storage system 3105, one or more embodiments of the request processing module 3144, one or more embodiments of the object storage communication protocol data 3141, one or more embodiments of requests and responses received, sent, processed, and/or generated by the request processing module 3144, and/or one or more embodiments of query execution described herein implement leaf operations are performed upon objects in object store. In some embodiments, indexes generated for the object store can be applied to enable filtering/other leaf operations so that not all objects need be read unnecessarily. For example, Filtering strategies are employed via corresponding IO operator pipelines (e.g. record identification pipelines 3365), which can be generated and executed to process leaf operations, for example, where filtering is pushed to the leaf level. In some embodiments, the object store/API endpoint automatically generates and executes these strategies (e.g. record identification pipelines 3365) based on the received leaf operation requests (e.g. return only objects/records meeting x filtering criteria) from a user/analytics system/etc. In some embodiments, the filtering is applied at row/record granularity to filter a plurality of rows within one or more given objects. In some embodiments, the filtering is applied for rows/bytes within the data objects.

In some embodiments, some or all filtering strategy (e.g. record identification pipelines 3365) is specified by the requesting user/system (e.g. in the case where the user/analytics system is the entity dictating which/how the indexes be generated and/or is the entity storing distribution data/statistics data for the dataset, and thus "instructs" the object store to apply the indexes accordingly, for example, as part of the structure of the leaf operation request in accordance with the interfacing standard. In some embodiments, ordering of applying different indexes is determined via known and/or estimated cardinality information (e.g. based on probability distribution function data/other statistical information). In some embodiments, the object store side optionally automatically generates/stores statistical information in addition to indexes, for example, based on doing some level of processing (e.g. based on leveraging a known structure for the data). In some embodiments, different indexing types can be applied for different types of objects/data. The different indexing types can include geospatial filters (e.g. filter for geospatial objects that intersect with this particular polygon). The different indexing types can include machine filters (e.g. correlation is >x).

In some embodiments, executing a single given leaf operation optionally includes IO operators applying indexing for multiple different types of objects in the object store. In some embodiments, parallelization can be leveraged in object access/processing of leaf operations to leverage leaf operation characteristic of not having dependencies.

In some embodiments, one or more embodiments of the data processing system 3107 one or more embodiments of the object storage system 3105, one or more embodiments of the request processing module 3144, one or more embodiments of the object storage communication protocol data 3141, one or more embodiments of requests and responses received, sent, processed, and/or generated by the request processing module 3144, and/or one or more embodiments of query execution described herein implement data of an object store being stored/processed in addition to storing/processing of data stored other storage formats. For example, a single analytics system accesses/executes queries over a combination of data from one or more object stores and from one or more other places (e.g. relational database table/file system/etc.). In some embodiments, an IO portion of a query execution plan specifies reads to these different storage structures. This can be applied in a same or similar fashion to having different IO pipelines generated for different segments having heterogeneous indexing structures, where some nodes access data from certain places via corresponding types of interfacing/indexing, and where other nodes access data from other places via other corresponding types of interfacing/indexing, and where these differences are configured in the plan to still guarantee query correctness. In some embodiments, the object store itself (e.g. that is accessed via users/other analytics systems) can be capable of implementing other data storage (e.g. also implements file system) and the interface enables accessing/processing data across different storage system types. In some embodiments, the interfacing with the object store can enable selection of which data be accessed (e.g. which "mode" to operate under: is the access for the file system or the object store, etc.). In some embodiments, the object store automatically identifies which storage system is relevant to the request and/or accesses data from multiple different types of storage systems. In some embodiments, the corresponding API can abstract over multiple data stores and even when backed by objects, different data formats (e.g. parquet, csv, etc.).

In some embodiments, one or more embodiments of the data processing system 3107 one or more embodiments of the object storage system 3105, one or more embodiments of the request processing module 3144, one or more embodiments of the object storage communication protocol data 3141, one or more embodiments of requests and responses received, sent, processed, and/or generated by the request processing module 3144, and/or one or more embodiments of query execution described herein implement extension of object store functionality (e.g. security, access control, management, reliability, data integrity) to leaf operations. In some embodiments, access control can be implemented to specify which users can perform/receive output of leaf operations (e.g. via access control data as described herein). The access control can be specified by type (e.g. user A can perform aggregations but not sorts). The access control can be optionally based on their access restrictions to data directly (e.g. user A can perform a leaf operation on data as long as user A has access permissions for the data itself). In some embodiments, the access control can specify that a user can access an aggregation across a set of data even if they don't have access to all the data directly (e.g. its ok for user A to count the #objects so long as user A can't read the objects). The access controls can be extended down to row/record/operation level via corresponding functionality enabled via the API, In some embodiments, one or more embodiments of the data processing system 3107 one or more embodiments of the object storage system 3105, one or more embodiments of the request processing module 3144, one or more embodiments of the object storage communication protocol data 3141, one or more embodiments of requests and responses received, sent, processed, and/or generated by the request processing module 3144, and/or one or more embodiments of query execution described herein implement storing/processing of same data via different interface types. For example, rather than just having one interface standard for the object store, the same data can be accessed different ways via different "modes"/interface standards. For example, a given object can be accessed via an object interface, and/or a file interface, and/or a geospatial interface, and/or a leaf operation interface, etc.

In some embodiments, the record identification pipeline 3365 implements some or all features and/or functionality of the IO pipeline 2835 as disclosed by: U.S. Utility application Ser. No. 17/303,437, entitled "QUERY EXECUTION UTILIZING PROBABILISTIC INDEXING", filed May 28, 2021, which is hereby incorporated herein by reference in its entirety and made part of the present U.S. Utility Patent Application for all purposes; U.S. Utility application Ser.

No. 17/450,109 entitled "MISSING DATA-BASED INDEXING IN DATABASE SYSTEMS", filed Oct. 6, 2021, which is hereby incorporated herein by reference in its entirety and made part of the present U.S. Utility Patent Application for all purposes; and/or U.S. Utility application Ser. No. 17/211,278, entitled "PER-SEGMENT SECONDARY INDEXING IN DATABASE SYSTEMS" filed Mar. 24, 2021, which is hereby incorporated herein by reference in its entirety and made part of the present U.S. Utility Patent Application for all purposes. For example, the pipeline generator module 3360 is implemented via some or all features and/or functionality of IO pipeline generator module 2834; the sourcing module 3371 is implemented via some or all features and/or functionality of source element 3014; the filtering module 3372 is implemented via some or all features and/or functionality of filter element 3016; the index access module 3373 is implemented via some or all features and/or functionality of index element 3012 and/or index element 3512; the index data 2545 is implemented via some or all features and/or functionality of secondary index data 2545; the index data generator module 3375 is implemented via some or all features and/or functionality of segment indexing module 2510 and/or secondary index generator module; the indexing scheme selection module 3376 is implemented via some or all features and/or functionality of secondary indexing scheme selection module; and/or the filtering parameter data 3142 is implemented via some or all features and/or functionality of predicates 2822.

In some embodiments, the filtering parameters 2556 implement some or all features and/or functionality of a union of CNF predicates and/or other combination of CNF predicates as disclosed by U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES", filed Oct. 12, 2023, which is hereby incorporated herein by reference in its entirety and made part of the present U.S. Utility Patent Application for all purposes. For example, record identification pipeline 3365 is implemented via some or all features and/or functionality of any embodiment of IO pipelines disclosed by U.S. Utility application Ser. No. 18/485,861, based on applying a union of CNF predicates or other combination of predicates.

In some embodiments, the access control data 3356 implements some or all features and/or functionality of the ruleset 550 as disclosed by: U.S. Utility application Ser. No. 16/668,402, entitled "ENFORCEMENT OF SETS OF QUERY RULES FOR ACCESS TO DATA SUPPLIED BY A PLURALITY OF DATA PROVIDERS", filed May 28, 2021, which is hereby incorporated herein by reference in its entirety and made part of the present U.S. Utility Patent Application for all purposes. For example, the access control enforcement module 3620 is implemented via some or all features and/or functionality of compliance module 580. For example, the access control enforcement module 3620 is implemented via some or all features and/or functionality of the pre-execution compliance module 610 where filtered row set access restriction data 3620 is generated prior to generation of filtered row set 3146, where filtered row set 3146 is optionally only generated if filtered row set access restriction data 3620 indicated access is allowed. Alternatively or in addition, the access control enforcement module 3620 is implemented via some or all features and/or functionality of the runtime compliance module 625 where filtered row set access restriction data 3620 is generated after generation of filtered row set 3146, based on filtered row set 3146 itself (e.g. which records it contains, how many records it includes, etc.). In some embodiments, request processing module 3144 (e.g. the filtered row set generator module) can be implemented via some or all features and/or functionality of query processing system 114.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a data processing system comprising:

determining a query for execution;

generating a query operator execution flow for the query that includes a first at least one operator serially before a second at least one operator; and executing the query to generate a query resultant based on:

executing the first at least one operator of the query operator execution flow based on:

generating, based on the query, a request for rows in accordance with an object storage communication protocol, wherein the request for rows indicates filtering parameter data;

sending the request indicating the filtering parameter data to an object storage system in accordance with the object storage communication protocol, wherein the object storage system stores a plurality of records via a plurality of objects in memory resources of the object storage system and further stores configuration data mapping storage of the plurality of records of a plurality of datasets via the plurality of objects; wherein the object storage system processes the request to generate a filtered row set via processing the request for rows based on:

executing a record identification pipeline for execution based on applying the filtering parameter data and the configuration data, wherein a proper subset of the plurality of records meeting the filtering parameter data is identified based on executing the record identification pipeline by accessing at least one object of the plurality of objects; and receiving a response from the object storage system in accordance with the object storage communication protocol indicating the filtered row set generated by the object storage system as the proper subset of the plurality of records stored by the object storage system that compare favorably to the filtering parameter data based on the object storage system processing the request; and executing the second at least one operator of the query operator execution flow via a plurality of parallelized nodes of a query execution plan based on:

processing the filtered row set indicated in the response in accordance with the second at least one operator to produce the query resultant based on multiple nodes of the plurality of parallelized nodes each processing corresponding subsets of the filtered row set in parallel with other ones of the multiple nodes.

2. The method of claim 1, wherein the object storage system generates the filtered row set via processing the request for rows further based on:

generating the record identification pipeline for execution based on the filtering parameter data and the configuration data.

3. The method of claim 2, wherein the object storage system generates the filtered row set via processing the request for rows further based on accessing a first index structure of the set of index structures stored in memory resources accessible by the object storage system.

4. The method of claim 3, wherein at least one of:

a second plurality of objects stored by the object storage system store the set of index structures indexing the plurality of records, wherein accessing the first index structure includes accessing at least one of the second plurality of objects; or the set of index structures are stored via non-object storage memory resources accessible by the object storage system, and wherein accessing the first index structure includes accessing the non-object storage memory resources.

5. The method of claim 3, wherein the object storage system automatically generates index structure selection data indicating a determination to generate the first index structure indexing a first field for the ones of the plurality of records included in a first dataset; and wherein the object storage system generates the first index structure indexing based on the index structure selection data.

6. The method of claim 1, wherein the object storage system further stores access control data regarding the plurality of records; wherein the object storage system generates, based on the filtering parameter data and the access control data, filtered row set access restriction data indicating whether access to the filtered row set is allowed, and wherein the response indicating the filtered row set is generated based on the filtered row set access restriction data indicating access to the filtered row set is allowed.

7. The method of claim 1, wherein the filtered row set indicates row storage location data for a first filtered row set that is a first proper subset of the plurality of records stored by the object storage system based on the object storage system processing the request.

8. The method of claim 7, further comprising:

determining a second filtered row set as a second proper subset of the first filtered row set based on executing at least one query operator;

sending a second request for field values that indicates the row storage location data for the second filtered row set in accordance with the object storage communication protocol; and sending a second response indicating the field values of the second filtered row set based on processing the request for field values.

9. The method of claim 1, wherein the query resultant includes a new plurality of records, further comprising:

generating a second request to store the new plurality of records in accordance with the object storage communication protocol, wherein the object storage system stores the new plurality of records in at least one new object based on processing the request to store the new plurality of records.

10. The method of claim 9, further comprising:

sending a second request indicating second filtering parameter data in accordance with the object storage communication protocol;

receiving a second response indicating a second filtered row set identifying a second proper subset of the plurality of records meeting the second filtering parameter data, wherein the second proper subset of the plurality of records includes at least one row of the new plurality of records; and processing the second filtered row set indicated in the second response to produce a second query resultant.

11. The method of claim 1, wherein the second at least one operator of the query operator execution flow includes at least one aggregation operator.

12. The method of claim 1, wherein the filtering parameter data includes at least one record-based filtering parameter applied to objects, and wherein the filtered row set indicates ones of the plurality of records satisfying the at least one record-based filtering parameter.

13. The method of claim 1, wherein the filtering parameter data includes at least one object-based filtering parameter applied to objects, and wherein the filtered row set indicates ones of the plurality of records included in objects satisfying the at least one object-based filtering parameter.

14. The method of claim 1, wherein a set intersection between a set of records included in a first object of a plurality of objects stored by the object storage system and the proper subset of the plurality of records is non-null, and wherein a set difference between the set of records included in the first object and the proper subset of the plurality of records is non-null.

15. The method of claim 1, wherein the object storage communication protocol is defined by an Application Programming Interface (API) implemented to facilitate communications between at least one data processing system that includes the data processing system and at least one object storage system that includes the object storage system.

16. The method of claim 1, wherein determining the query is based on processing a query request in accordance with the Structured Query Language (SQL).

17. The method of claim 1, wherein the object storage system stores the plurality of objects via memory resources in conjunction with an object storage service, and wherein the memory resources store the plurality of objects via a flat storage structure.

18. The method of claim 17, wherein each object of the plurality of objects includes a data portion, an object metadata portion, and a globally unique identifier.

19. A data processing system comprising:

at least one processor; and at least one memory storing operational instructions that, when executed by the at least one processor, cause the at least one processor to perform operations that include:

determining a query for execution;

generating a query operator execution flow for the query that includes a first at least one operator serially before a second at least one operator; and executing the query to generate a query resultant based on:

executing the first at least one operator of the query operator execution flow based on:

generating, based on the query, a request for rows in accordance with an object storage communication protocol, wherein the request for rows indicates filtering parameter data;

sending the request indicating the filtering parameter data to an object storage system in accordance with the object storage communication protocol, wherein the object storage system stores a plurality of records via a plurality of objects in memory resources of the object storage system and further stores configuration data mapping storage of the plurality of records of a plurality of datasets via the plurality of objects; wherein the object storage system processes the request to generate a filtered row set via processing the request for rows based on:

executing a record identification pipeline for execution based on applying the filtering parameter data and the configuration data, wherein a proper subset of the plurality of records meeting the filtering parameter data is identified based on executing the record identification pipeline by accessing at least one object of the plurality of objects; and receiving a response from the object storage system in accordance with the object storage communication protocol indicating the filtered row set generated by the object storage system as the proper subset of the plurality of records stored by the object storage system that compare favorably to the filtering parameter data based on the object storage system processing the request; and executing the second at least one operator of the query operator execution flow via a plurality of parallelized nodes of a query execution plan based on:

processing the filtered row set indicated in the response in accordance with the second at least one operator to produce the query resultant based on multiple nodes of the plurality of parallelized nodes each processing corresponding subsets of the filtered row set in parallel with other ones of the multiple nodes.

20. A non-transitory computer readable storage medium comprises:

at least one memory section that stores operational instructions that, when executed by at least one processing module that includes a processor and a memory, causes the at least one processing module to perform operations that include:

determining a query for execution;

generating a query operator execution flow for the query that includes a first at least one operator serially before a second at least one operator; and executing the query to generate a query resultant based on:

executing the first at least one operator of the query operator execution flow based on:

generating, based on the query, a request for rows in accordance with an object storage communication protocol, wherein the request for rows indicates filtering parameter data;

sending the request indicating the filtering parameter data to an object storage system in accordance with the object storage communication protocol, wherein the object storage system stores a plurality of records via a plurality of objects in memory resources of the object storage system and further stores configuration data mapping storage of the plurality of records of a plurality of datasets via the plurality of objects; wherein the object storage system processes the request to generate a filtered row set via processing the request for rows based on:

executing a record identification pipeline for execution based on applying the filtering parameter data and the configuration data, wherein a proper subset of the plurality of records meeting the filtering parameter data is identified based on executing the record identification pipeline by accessing at least one object of the plurality of objects; and receiving a response from the object storage system in accordance with the object storage communication protocol indicating the filtered row set generated by the object storage system as the proper subset of the plurality of records stored by the object storage system that compare favorably to the filtering parameter data based on the object storage system processing the request; and executing the second at least one operator of the query operator execution flow via a plurality of parallelized nodes of a query execution plan based on:

processing the filtered row set indicated in the response in accordance with the second at least one operator to produce the query resultant based on multiple nodes of the plurality of parallelized nodes each processing corresponding subsets of the filtered row set in parallel with other ones of the multiple nodes.

* * * * *